US011062615B1

(12) United States Patent
Speciner et al.

(10) Patent No.: US 11,062,615 B1
(45) Date of Patent: Jul. 13, 2021

(54) METHODS AND SYSTEMS FOR REMOTE LANGUAGE LEARNING IN A PANDEMIC-AWARE WORLD

(71) Applicant: Intelligibility Training LLC, Palo Alto, CA (US)

(72) Inventors: Michael Speciner, Acton, MA (US); Norman Abramovitz, Cupertino, CA (US); Alice J. Stiebel, Palo Alto, CA (US); Jonathan Stiebel, Cambridge, MA (US)

(73) Assignee: Intelligibility Training LLC, Palo Alto, CA (US)

( * ) Notice: Subject to any disclaimer, the term of this patent is extended or adjusted under 35 U.S.C. 154(b) by 38 days.

(21) Appl. No.: 14/951,374

(22) Filed: Nov. 24, 2015

Related U.S. Application Data

(63) Continuation-in-part of application No. 13/223,492, filed on Sep. 1, 2011, now Pat. No. 10,019,995.
(Continued)

(51) Int. Cl.
*G10L 15/183* (2013.01)
*G09B 5/06* (2006.01)

(52) U.S. Cl.
CPC ................ *G09B 5/06* (2013.01); *G09B 5/065* (2013.01)

(58) Field of Classification Search
CPC ......... G09B 5/06–5/067; G10L 15/183; G10L 15/18–187; G10L 15/25
See application file for complete search history.

(56) References Cited

U.S. PATENT DOCUMENTS 2,524,276 A 10/1950 Slesinger
3,199,115 A 8/1965 Lasky
(Continued)

FOREIGN PATENT DOCUMENTS

AU 2014201912 A1 4/2014
AU 2015101078 A4 9/2015
(Continued)

OTHER PUBLICATIONS

Winther-Nielsen et al.;Transliteration of Biblical Hebrew for the Role-Lexical Module; Hiphil. vol. 6, pp. 1-17, Hiphil 6 [http://hiphil.see-j.net] (2009). (Year: 2009).*
(Continued)

*Primary Examiner* — Abul K Azad
(74) *Attorney, Agent, or Firm* — Morgan, Lewis & Bockius LLP

(57) ABSTRACT

Embodiments of the present application relate to language learning techniques. According to exemplary embodiments, a pronunciation dictionary and/or a verse dictionary may be provided. The pronunciation dictionary and/or verse dictionary may be used to train a student's pronunciation of words and phrases, particularly in cantillated languages. According to some embodiments, words appearing on a screen may be visually distinguished (e.g., highlighted) in a sequence of a text. The text may be made to change smoothly and continuously in a manner that allows the changes to be easily followed by a student with a disability. Further embodiments provide techniques for performing generalized forced alignment. For example, forced alignment may be performed based on a phonetic analysis, based on an analysis of pitch patterns, and/or may involve breaking a large audio file into smaller audio files on a verse-by-verse basis. Furthermore, the present application describes capabilities related to learning and searching for tropes or cantillations.

17 Claims, 193 Drawing Sheets

Related U.S. Application Data

(60) Provisional application No. 61/448,142, filed on Mar. 1, 2011, provisional application No. 62/258,944, filed on Nov. 23, 2015, provisional application No. 62/244,561, filed on Oct. 21, 2015, provisional application No. 62/243,600, filed on Oct. 19, 2015, provisional application No. 62/239,969, filed on Oct. 11, 2015, provisional application No. 62/203,913, filed on Aug. 12, 2015.

(56) References Cited

U.S. PATENT DOCUMENTS 3,532,806 A 10/1970 Wicklund
3,715,812 A 2/1973 Novak
3,891,792 A 6/1975 Kimura
3,952,423 A 4/1976 Gentry
3,979,557 A 9/1976 Schulman et al.
4,055,749 A 10/1977 Kraushaar
4,178,700 A 12/1979 Dickey
4,260,229 A 4/1981 Bloomstein
4,270,284 A 6/1981 Skellings
4,310,854 A 1/1982 Baer
4,354,418 A 10/1982 Moravec et al.
4,463,650 A 8/1984 Rupert
4,797,930 A 1/1989 Goudie
4,859,994 A 8/1989 Zola
4,884,972 A 12/1989 Gasper
4,969,194 A 11/1990 Ezawa et al.
5,042,816 A 8/1991 Davis
5,071,133 A 12/1991 Smith
5,091,950 A * 2/1992 Ahmed .................. G10L 15/26 704/277
5,145,377 A 9/1992 Tarvin et al.
5,152,535 A 10/1992 Roberts
5,167,504 A 12/1992 Mann
5,199,077 A 3/1993 Wilcox et al.
5,212,731 A 5/1993 Zimmermann
5,349,645 A 9/1994 Zhao
5,387,104 A 2/1995 Corder
5,393,236 A 2/1995 Blackmer et al.
5,402,339 A 3/1995 Nakashima et al.
5,429,513 A 7/1995 Diaz-Plaza
5,449,177 A 9/1995 Naylor
5,453,570 A 9/1995 Umeda et al.
5,475,796 A 12/1995 Iwata
5,529,308 A 6/1996 Masakayan
5,563,358 A 10/1996 Zimmerman
5,567,901 A 10/1996 Gibson et al.
5,584,698 A 12/1996 Rowland
5,616,876 A 4/1997 Cluts
5,634,086 A 5/1997 Rtischev et al.
5,642,466 A 6/1997 Narayan
5,649,060 A 7/1997 Ellozy et al.
5,649,826 A 7/1997 West et al.
5,741,136 A 4/1998 Kirksey et al.
5,748,840 A 5/1998 La Rue
5,788,503 A 8/1998 Shapiro et al.
5,799,276 A 8/1998 Komissarchik et al.
5,810,599 A 9/1998 Bishop
5,874,686 A 2/1999 Ghias
5,893,132 A 4/1999 Huffman et al.
5,920,838 A 7/1999 Mostow et al.
5,931,469 A 8/1999 Stichnoth
5,950,162 A 9/1999 Corrigan et al.
5,953,693 A 9/1999 Sakiyama et al.
5,963,957 A 10/1999 Hoffberg
5,973,252 A 10/1999 Hildebrand
6,006,187 A 12/1999 Tanenblatt
6,009,397 A 12/1999 Siegel
6,035,271 A 3/2000 Chen
6,057,501 A 5/2000 Hale
6,073,099 A 6/2000 Sabourin et al.
6,076,059 A 6/2000 Glickman et al.
6,081,772 A 6/2000 Lewis
6,101,470 A 8/2000 Eide et al.
6,108,640 A 8/2000 Slotznick
6,121,530 A 9/2000 Sonoda
6,126,447 A 10/2000 Engelbrite
6,140,568 A 10/2000 Kohler
6,173,298 B1 1/2001 Smadja
6,224,383 B1 5/2001 Shannon
6,227,863 B1 5/2001 Spector
6,236,965 B1 5/2001 Kim et al.
6,260,011 B1 7/2001 Heckerman et al.
6,273,726 B1 8/2001 Kirksey et al.
6,317,711 B1 11/2001 Muroi
6,334,776 B1 1/2002 Jenkins et al.
6,347,300 B1 2/2002 Minematsu
6,366,882 B1 4/2002 Bijl et al.
6,389,394 B1 5/2002 Fanty
6,390,015 B1 5/2002 Germano
6,397,185 B1 5/2002 Komissarchik et al.
6,405,167 B1 6/2002 Cogliano
6,438,515 B1 8/2002 Crawford
6,510,413 B1 1/2003 Walker
6,519,558 B1 2/2003 Tsutsui
6,568,939 B1 5/2003 Edgar
6,632,094 B1 10/2003 Falcon et al.
6,639,139 B2 10/2003 Santen
6,697,457 B2 2/2004 Petrushin
6,718,303 B2 4/2004 Tang et al.
6,778,950 B2 8/2004 Gohari
6,785,652 B2 8/2004 Bellegarda et al.
6,823,184 B1 11/2004 Nelson
6,856,958 B2 2/2005 Kochanski et al.
6,865,533 B2 3/2005 Addison et al.
6,884,075 B1 4/2005 Tropoloc
6,884,076 B2 4/2005 Clark et al.
6,898,411 B2 5/2005 Ziv-el et al.
6,953,343 B2 10/2005 Townshend
6,970,185 B2 11/2005 Halverson
7,003,120 B1 2/2006 Smith et al.
7,013,273 B2 3/2006 Kahn
7,021,626 B2 4/2006 Butler
7,031,922 B1 4/2006 Kalinowski et al.
7,047,255 B2 5/2006 Imaichi et al.
7,062,482 B1 6/2006 Madan et al.
7,080,317 B2 7/2006 Lebow
7,130,790 B1 10/2006 Flanagan et al.
7,149,690 B2 12/2006 August et al.
7,153,139 B2 12/2006 Wen et al.
7,230,176 B2 6/2007 Kosonen
7,233,899 B2 6/2007 Fain et al.
7,236,144 B2 6/2007 Ari
RE39,830 E 9/2007 Balabanovic
7,272,563 B2 9/2007 Nelson
7,277,851 B1 10/2007 Henton
7,280,963 B1 10/2007 Beaufays et al.
7,280,964 B2 10/2007 Wilson et al.
7,280,969 B2 10/2007 Eide et al.
7,299,183 B2 11/2007 Abe et al.
7,299,188 B2 11/2007 Gupta et al.
7,309,826 B2 12/2007 Morley
7,345,955 B1 3/2008 Campbell
7,346,500 B2 3/2008 Puterbaugh et al.
7,346,506 B2 3/2008 Lueck et al.
7,349,920 B1 3/2008 Feinberg et al.
7,365,263 B2 4/2008 Schwartz
RE40,458 E 8/2008 Fredenburg
7,458,019 B2 11/2008 Gumz et al.
7,462,772 B2 12/2008 Salter
7,469,494 B2 12/2008 Katz
7,472,061 B1 12/2008 Alewine et al.
7,483,833 B2 1/2009 Peters
7,514,620 B2 4/2009 Friedman et al.
7,524,191 B2 4/2009 Marmorstein et al.
7,563,099 B1 7/2009 Iftikhar
7,614,880 B2 11/2009 Bennett
7,619,155 B2 11/2009 Teo et al.
7,629,527 B2 12/2009 Hiner et al.
7,636,884 B2 12/2009 Goffin
7,665,733 B1 2/2010 Swanson, Sr.
7,668,718 B2 2/2010 Kahn et al.

(56) References Cited

U.S. PATENT DOCUMENTS

| | | | |
|---|---|---|---|
| 7,671,266 B2 | 3/2010 | Lemons | |
| 7,671,269 B1 | 3/2010 | Krueger et al. | |
| 7,702,509 B2 | 4/2010 | Bellegarda | |
| 7,825,321 B2 | 11/2010 | Bloom et al. | |
| 7,912,721 B2 | 3/2011 | Dow et al. | |
| 7,962,327 B2 | 6/2011 | Kuo et al. | |
| 7,982,114 B2 | 7/2011 | Applewhite et al. | |
| 7,996,207 B2 | 8/2011 | Atkin | |
| 8,008,566 B2 | 8/2011 | Walker, II et al. | |
| 8,016,596 B2 | 9/2011 | Blank | |
| 8,024,191 B2 | 9/2011 | Kim et al. | |
| 8,083,523 B2 | 12/2011 | De Ley et al. | |
| 8,109,765 B2 | 2/2012 | Beattie et al. | |
| 8,118,307 B2 | 2/2012 | Young | |
| 8,128,406 B2 | 3/2012 | Wood | |
| 8,137,106 B2 | 3/2012 | De Ley et al. | |
| 8,145,999 B1 | 3/2012 | Barrus et al. | |
| 8,190,433 B2 | 5/2012 | Abrego et al. | |
| 8,202,094 B2 | 6/2012 | Spector | |
| 8,210,850 B2 | 7/2012 | Blank | |
| 8,230,345 B2 | 7/2012 | Rosenshein et al. | |
| 8,271,281 B2 | 9/2012 | Jayadeva et al. | |
| 8,280,724 B2 | 10/2012 | Chazan et al. | |
| 8,281,231 B2 | 10/2012 | Berry et al. | |
| 8,301,447 B2 | 10/2012 | Yoakum et al. | |
| 8,326,637 B2 | 12/2012 | Baldwin et al. | |
| 8,337,305 B2 | 12/2012 | Aronzon | |
| 8,342,850 B2 | 1/2013 | Blank | |
| 8,342,854 B2 | 1/2013 | Parmer et al. | |
| 8,346,879 B2 | 1/2013 | Meunier et al. | |
| 8,380,496 B2 | 2/2013 | Ramo et al. | |
| 8,439,684 B2 | 5/2013 | MacGregor et al. | |
| 8,452,603 B1 | 5/2013 | Liu et al. | |
| 8,473,280 B2 | 6/2013 | Al-Omari et al. | |
| 8,473,911 B1 | 6/2013 | Baxter | |
| 8,494,857 B2 | 7/2013 | Pakhomov | |
| 8,515,728 B2 | 8/2013 | Boyd et al. | |
| 8,528,576 B2 | 9/2013 | Lohrke | |
| 8,595,004 B2 | 11/2013 | Koshinaka | |
| 8,595,015 B2 | 11/2013 | Lee et al. | |
| 8,620,665 B2 | 12/2013 | Hasdell et al. | |
| 8,632,341 B2 | 1/2014 | Calabrese | |
| 8,645,121 B2 | 2/2014 | Boyd et al. | |
| 8,645,141 B2 | 2/2014 | Wong et al. | |
| 8,672,681 B2 | 3/2014 | Markovitch | |
| 8,678,826 B2 | 3/2014 | Rolstone | |
| 8,678,896 B2 | 3/2014 | Pitsch et al. | |
| 8,682,671 B2 | 3/2014 | Meyer et al. | |
| 8,688,600 B2 | 4/2014 | Barton et al. | |
| 8,700,388 B2 | 4/2014 | Edler et al. | |
| 8,716,584 B1 | 5/2014 | Wieder | |
| 8,719,009 B2 | 5/2014 | Baldwin et al. | |
| 8,719,021 B2 | 5/2014 | Koshinaka | |
| 8,738,380 B2 | 5/2014 | Baldwin et al. | |
| 8,743,019 B1 * | 6/2014 | Eng | G06F 3/1454 345/1.1 |
| 8,762,152 B2 | 6/2014 | Bennett et al. | |
| 8,768,701 B2 | 7/2014 | Cohen et al. | |
| 8,775,184 B2 | 7/2014 | Deshmukh et al. | |
| 8,793,133 B2 | 7/2014 | Kurzweil et al. | |
| 8,798,366 B1 | 8/2014 | Jones et al. | |
| 8,825,486 B2 | 9/2014 | Meyer et al. | |
| 8,840,400 B2 | 9/2014 | Keim et al. | |
| 8,862,511 B2 | 10/2014 | Ralev | |
| 8,914,291 B2 | 12/2014 | Meyer et al. | |
| 8,921,677 B1 | 12/2014 | Severino | |
| 8,954,175 B2 | 2/2015 | Smaragdis et al. | |
| 8,965,832 B2 | 2/2015 | Smaragdis et al. | |
| 8,983,638 B2 | 3/2015 | Green | |
| 8,996,380 B2 | 3/2015 | Wang et al. | |
| 9,028,255 B2 | 5/2015 | Massaro | |
| 9,031,845 B2 | 5/2015 | Kennewick et al. | |
| 9,063,641 B2 | 6/2015 | Patterson et al. | |
| 9,069,767 B1 | 6/2015 | Hamaker et al. | |
| 9,105,266 B2 | 8/2015 | Baldwin et al. | |
| 9,111,457 B2 | 8/2015 | Beckley et al. | |
| 9,142,201 B2 | 9/2015 | Good et al. | |
| 10,019,995 B1 * | 7/2018 | Abramovitz | G10L 17/06 |
| 2001/0051870 A1 | 12/2001 | Okazaki et al. | |
| 2002/0015042 A1 * | 2/2002 | Robotham | G06F 3/14 345/581 |
| 2002/0086268 A1 | 7/2002 | Shpiro | |
| 2002/0086269 A1 | 7/2002 | Shpiro | |
| 2002/0156632 A1 | 10/2002 | Haynes | |
| 2003/0040899 A1 | 2/2003 | Ogilvie | |
| 2003/0110021 A1 | 6/2003 | Atkin | |
| 2003/0145278 A1 | 7/2003 | Nielsen | |
| 2003/0182111 A1 | 9/2003 | Handal | |
| 2003/0203343 A1 | 10/2003 | Milner | |
| 2003/0207239 A1 | 11/2003 | Langlois | |
| 2004/0030555 A1 | 2/2004 | van Santen | |
| 2004/0076937 A1 | 4/2004 | Howard | |
| 2004/0111272 A1 | 6/2004 | Gao et al. | |
| 2004/0183817 A1 * | 9/2004 | Kaasila | G06F 16/9577 345/660 |
| 2004/0215445 A1 | 10/2004 | Kojima | |
| 2004/0224291 A1 | 11/2004 | Wood | |
| 2004/0224292 A1 | 11/2004 | Fazio | |
| 2004/0225493 A1 | 11/2004 | Jung | |
| 2004/0253565 A1 | 12/2004 | Park | |
| 2004/0257301 A1 * | 12/2004 | Ari | B42D 19/005 345/30 |
| 2005/0021387 A1 * | 1/2005 | Gottfurcht | G06F 3/04892 705/14.54 |
| 2005/0033575 A1 | 2/2005 | Schneider | |
| 2005/0048449 A1 | 3/2005 | Marmorstein | |
| 2005/0064374 A1 | 3/2005 | Spector | |
| 2005/0064375 A1 | 3/2005 | Blank | |
| 2005/0069849 A1 | 3/2005 | McKinney et al. | |
| 2005/0137880 A1 | 6/2005 | Bellwood et al. | |
| 2005/0137881 A1 | 6/2005 | Bellwood et al. | |
| 2005/0144001 A1 | 6/2005 | Bennett et al. | |
| 2005/0181336 A1 | 8/2005 | Bakalian | |
| 2005/0187769 A1 | 8/2005 | Hwang et al. | |
| 2005/0207733 A1 | 9/2005 | Gargi | |
| 2005/0216253 A1 * | 9/2005 | Brockett | G06F 40/58 704/5 |
| 2005/0243658 A1 | 11/2005 | Mack | |
| 2005/0252362 A1 | 11/2005 | Mchale | |
| 2005/0255441 A1 | 11/2005 | Martin | |
| 2005/0260547 A1 | 11/2005 | Moody | |
| 2005/0268230 A1 | 12/2005 | Bales | |
| 2006/0004567 A1 | 1/2006 | Russell | |
| 2006/0021494 A1 | 2/2006 | Teo | |
| 2006/0089928 A1 * | 4/2006 | Johnson | G06F 3/018 |
| 2006/0115800 A1 | 6/2006 | Daley | |
| 2006/0194175 A1 | 8/2006 | De Ley et al. | |
| 2006/0218490 A1 | 9/2006 | Fink | |
| 2006/0242557 A1 | 10/2006 | Nortis | |
| 2007/0020592 A1 | 1/2007 | Cornale | |
| 2007/0055514 A1 | 3/2007 | Beattie | |
| 2007/0055523 A1 | 3/2007 | Yang | |
| 2007/0088547 A1 | 4/2007 | Freedman | |
| 2007/0182734 A1 * | 8/2007 | Levanon | G06T 17/005 345/420 |
| 2007/0238077 A1 | 10/2007 | Strachar | |
| 2007/0244703 A1 | 10/2007 | Adams et al. | |
| 2007/0256540 A1 | 11/2007 | Salter | |
| 2008/0005656 A1 | 1/2008 | Pang | |
| 2008/0010068 A1 | 1/2008 | Seita | |
| 2008/0027726 A1 | 1/2008 | Hansen et al. | |
| 2008/0027731 A1 | 1/2008 | Shpiro | |
| 2008/0070203 A1 | 3/2008 | Franzblau | |
| 2008/0153074 A1 | 6/2008 | Miziniak | |
| 2008/0189105 A1 | 8/2008 | Yen et al. | |
| 2008/0215965 A1 * | 9/2008 | Abrams | G06F 16/958 715/246 |
| 2008/0221862 A1 | 9/2008 | Guo et al. | |
| 2008/0221866 A1 * | 9/2008 | Katragadda | G06F 40/44 704/8 |
| 2008/0221893 A1 | 9/2008 | Kaiser | |
| 2008/0235271 A1 | 9/2008 | Wang | |
| 2008/0243473 A1 | 10/2008 | Boyd et al. | |

(56) References Cited

U.S. PATENT DOCUMENTS

| | | | |
|---|---|---|---|
| 2008/0270115 | A1 | 10/2008 | Emam et al. |
| 2008/0274443 | A1 | 11/2008 | Lemons |
| 2009/0004633 | A1 | 1/2009 | Johnson et al. |
| 2009/0047639 | A1 | 2/2009 | Kamenetzky |
| 2009/0070099 | A1 | 3/2009 | Anisimovich |
| 2009/0070112 | A1 | 3/2009 | Li et al. |
| 2009/0111077 | A1 | 4/2009 | Buchheim et al. |
| 2009/0144049 | A1* | 6/2009 | Haddad ................ G06F 40/129 704/3 |
| 2009/0183227 | A1 | 7/2009 | Isaacs et al. |
| 2009/0202226 | A1 | 8/2009 | McKay |
| 2009/0226863 | A1 | 9/2009 | Thieberger Ben-Haim et al. |
| 2009/0226865 | A1 | 9/2009 | Thieberger Ben-Haim et al. |
| 2009/0235808 | A1 | 9/2009 | Salter |
| 2009/0239201 | A1 | 9/2009 | Moe |
| 2009/0240671 | A1 | 9/2009 | Torres |
| 2009/0248960 | A1 | 10/2009 | Sunderland et al. |
| 2009/0253107 | A1 | 10/2009 | Marggraff |
| 2009/0254831 | A1 | 10/2009 | Dolny et al. |
| 2009/0258333 | A1 | 10/2009 | Yu |
| 2009/0271175 | A1 | 10/2009 | Bodin et al. |
| 2009/0287486 | A1 | 11/2009 | Chang |
| 2009/0305203 | A1 | 12/2009 | Okumura |
| 2010/0057681 | A1 | 3/2010 | Willeford |
| 2010/0094630 | A1 | 4/2010 | Yoakum |
| 2010/0159426 | A1 | 6/2010 | Thieberger Ben-Haim et al. |
| 2010/0185435 | A1 | 7/2010 | Deshmukh et al. |
| 2010/0198586 | A1 | 8/2010 | Edler et al. |
| 2010/0198627 | A1 | 8/2010 | Moed |
| 2010/0216549 | A1 | 8/2010 | Salter |
| 2010/0233661 | A1 | 9/2010 | Franzblau |
| 2010/0268535 | A1 | 10/2010 | Koshinaka |
| 2010/0305732 | A1 | 12/2010 | Serletic |
| 2010/0307321 | A1 | 12/2010 | Mann et al. |
| 2010/0319517 | A1 | 12/2010 | Savo et al. |
| 2010/0322042 | A1 | 12/2010 | Serletic et al. |
| 2010/0323332 | A1 | 12/2010 | Keim et al. |
| 2010/0332230 | A1 | 12/2010 | Shu |
| 2011/0065079 | A1 | 3/2011 | Boswell |
| 2011/0081635 | A1 | 4/2011 | Ollivierre |
| 2011/0134321 | A1 | 6/2011 | Berry et al. |
| 2011/0143323 | A1 | 6/2011 | Cohen |
| 2011/0143631 | A1 | 6/2011 | Lipman et al. |
| 2011/0196666 | A1 | 8/2011 | Ruetz et al. |
| 2011/0207095 | A1 | 8/2011 | Narayanan et al. |
| 2011/0257977 | A1 | 10/2011 | Greenberg et al. |
| 2011/0259178 | A1 | 10/2011 | Hiner et al. |
| 2011/0270605 | A1 | 11/2011 | Qin et al. |
| 2011/0275037 | A1 | 11/2011 | Alghamdi |
| 2011/0276327 | A1 | 11/2011 | Foxenland |
| 2011/0300516 | A1 | 12/2011 | Wigdor et al. |
| 2012/0010870 | A1 | 1/2012 | Selegey |
| 2012/0034939 | A1 | 2/2012 | Al-Omari |
| 2012/0035910 | A1* | 2/2012 | Awaida ................ G06F 40/109 704/5 |
| 2012/0094259 | A1 | 4/2012 | Lipsky et al. |
| 2012/0116767 | A1 | 5/2012 | Hasdell et al. |
| 2012/0134480 | A1 | 5/2012 | Leeds et al. |
| 2012/0164612 | A1 | 6/2012 | Gillick et al. |
| 2012/0178066 | A1 | 7/2012 | Drum |
| 2012/0219932 | A1 | 8/2012 | Eshed et al. |
| 2012/0224459 | A1 | 9/2012 | Rosenshen et al. |
| 2012/0245922 | A1 | 9/2012 | Kozlova |
| 2012/0297958 | A1 | 11/2012 | Rassool et al. |
| 2012/0297959 | A1 | 11/2012 | Serletic et al. |
| 2012/0302336 | A1 | 11/2012 | Garza et al. |
| 2012/0310642 | A1 | 12/2012 | Cao et al. |
| 2013/0000463 | A1 | 1/2013 | Grover |
| 2013/0018892 | A1 | 1/2013 | Castellanos |
| 2013/0025437 | A1 | 1/2013 | Serletic et al. |
| 2013/0050276 | A1* | 2/2013 | Moriya .............. G05B 19/4069 345/672 |
| 2013/0055141 | A1 | 2/2013 | Arriola et al. |
| 2013/0098225 | A1 | 4/2013 | Murphy |
| 2013/0121511 | A1 | 5/2013 | Smaragdis et al. |
| 2013/0124200 | A1 | 5/2013 | Mysore et al. |
| 2013/0144625 | A1 | 6/2013 | Kurzweil et al. |
| 2013/0167707 | A1 | 7/2013 | Shimizu et al. |
| 2013/0220102 | A1 | 8/2013 | Savo et al. |
| 2013/0319209 | A1 | 12/2013 | Good et al. |
| 2013/0326361 | A1 | 12/2013 | Kendal |
| 2013/0332162 | A1 | 12/2013 | Keen |
| 2013/0338997 | A1 | 12/2013 | Boyd et al. |
| 2014/0032216 | A1 | 1/2014 | Roth et al. |
| 2014/0033899 | A1 | 2/2014 | Dripps et al. |
| 2014/0039871 | A1 | 2/2014 | Crawford |
| 2014/0039872 | A1 | 2/2014 | Patel |
| 2014/0041512 | A1 | 2/2014 | Mastran et al. |
| 2014/0053710 | A1 | 2/2014 | Serletic, II et al. |
| 2014/0053711 | A1 | 2/2014 | Serletic, II et al. |
| 2014/0067398 | A1 | 3/2014 | Verna |
| 2014/0074459 | A1 | 3/2014 | Chordia et al. |
| 2014/0088969 | A1 | 3/2014 | Verna et al. |
| 2014/0093855 | A1 | 4/2014 | Waldman |
| 2014/0100852 | A1 | 4/2014 | Simons et al. |
| 2014/0122621 | A1 | 5/2014 | Feller |
| 2014/0140536 | A1 | 5/2014 | Serletic, II et al. |
| 2014/0143682 | A1 | 5/2014 | Druck |
| 2014/0149109 | A1 | 5/2014 | Ruetz et al. |
| 2014/0149384 | A1 | 5/2014 | Krishna et al. |
| 2014/0149599 | A1 | 5/2014 | Krishna et al. |
| 2014/0149771 | A1 | 5/2014 | Krishna et al. |
| 2014/0157113 | A1 | 6/2014 | Krishna et al. |
| 2014/0161250 | A1 | 6/2014 | Leeds et al. |
| 2014/0177813 | A1 | 6/2014 | Leeds et al. |
| 2014/0178050 | A1 | 6/2014 | St. Clair |
| 2014/0210828 | A1 | 7/2014 | Fleizach et al. |
| 2014/0244668 | A1 | 8/2014 | Barrus et al. |
| 2014/0245120 | A1 | 8/2014 | Schwartz et al. |
| 2014/0245121 | A1 | 8/2014 | Barrus et al. |
| 2014/0258827 | A1 | 9/2014 | Gormish et al. |
| 2014/0259106 | A1 | 9/2014 | Barrus |
| 2014/0272823 | A1 | 9/2014 | Christian |
| 2014/0278369 | A1 | 9/2014 | Cassimatis et al. |
| 2014/0343936 | A1 | 11/2014 | Thapar |
| 2014/0365216 | A1 | 12/2014 | Gruber et al. |
| 2015/0019229 | A1 | 1/2015 | Fish |
| 2015/0024366 | A1 | 1/2015 | Graham et al. |
| 2015/0035935 | A1 | 2/2015 | Sontag et al. |
| 2015/0037777 | A1 | 2/2015 | Kushner |
| 2015/0045003 | A1 | 2/2015 | Vora et al. |
| 2015/0062114 | A1 | 3/2015 | Ofstad |
| 2015/0074556 | A1 | 3/2015 | Bader-Natal et al. |
| 2015/0106103 | A1 | 4/2015 | Fink, IV |
| 2015/0121251 | A1 | 4/2015 | Kadirvel et al. |
| 2015/0127753 | A1 | 5/2015 | Tew et al. |
| 2015/0141154 | A1 | 5/2015 | Yuan et al. |
| 2015/0149478 | A1 | 5/2015 | Krishna et al. |
| 2015/0206445 | A1 | 7/2015 | Modde et al. |
| 2015/0206540 | A1 | 7/2015 | Green |
| 2015/0221298 | A1 | 8/2015 | Beutnagel et al. |
| 2015/0228259 | A1 | 8/2015 | Valente et al. |
| 2015/0235567 | A1 | 8/2015 | Dohring et al. |
| 2015/0262573 | A1 | 9/2015 | Brooks et al. |
| 2015/0279371 | A1 | 10/2015 | Fujioka |
| 2015/0286621 | A1 | 10/2015 | Henery |
| 2015/0302866 | A1 | 10/2015 | Sobol Shikler |

FOREIGN PATENT DOCUMENTS

| | | | |
|---|---|---|---|
| CA | 2644327 | A1 | 5/2009 |
| CA | 2764042 | A1 | 12/2010 |
| CA | 2821302 | A1 | 8/2012 |
| CA | 2843438 | A1 | 3/2013 |
| CA | 2670560 | C | 10/2014 |
| DE | 3700796 | A1 | 7/1988 |
| DE | 19652225 | A1 | 6/1998 |
| EP | 1479068 | A2 | 11/2004 |
| EP | 2156652 | B1 | 4/2012 |
| EP | 2535821 | A1 | 12/2012 |
| EP | 2700070 | A1 | 2/2014 |
| EP | 2862039 | A1 | 4/2015 |
| EP | 2897086 | A1 | 7/2015 |
| JP | 10500783 | A | 1/1998 |

(56) References Cited

FOREIGN PATENT DOCUMENTS

| | | | |
|---|---|---|---|
| JP | 2003186379 | A | 7/2003 |
| JP | 2005516262 | A | 6/2005 |
| JP | 2009266236 | A | 11/2009 |
| JP | 2013507637 | A | 3/2013 |
| JP | 2013539560 | A | 10/2013 |
| JP | 2014170544 | A | 9/2014 |
| JP | 2014219969 | A | 11/2014 |
| WO | WO 2012005970 | A2 | 1/2012 |
| WO | WO 2013078144 | A2 | 5/2013 |
| WO | WO 2014168949 | A1 | 10/2014 |
| WO | WO 2015066204 | A1 | 5/2015 |
| WO | WO 2015112250 | A1 | 7/2015 |
| WO | WO 2015165003 | A1 | 11/2015 |

OTHER PUBLICATIONS

U.S. Appl. No. 11/329,344, filed Jul. 12, 2007, Apple Computer, Inc.
U.S. Appl. No. 11/495,836, filed Jan. 31, 2008, Hansen, Eric Louis.
U.S. Appl. No. 13/338,383, filed Jul. 5, 2012, EnglishCentral, Inc.
U.S. Appl. No. 12/483,479, filed Oct. 16, 2012, Laurent An Minh Nguyen Edward J Et al.
U.S. Appl. No. 11/495,836, filed Jan. 31, 2008, Eric Louis Hansen Reginald David Hody.
U.S. Appl. No. 10/738,710, filed Jun. 23, 2005, Thomas Bellwood Robert Chumbley Matthew Rutkowski Lawrence Weiss.
U.S. Appl. No. 12/845,340, filed Jul. 28, 2010, Mansour M. Alghamdi.
U.S. Appl. No. 12/548,291, filed Aug. 26, 2009, Paris Smaragdis Gautham J. Mysore.
U.S. Appl. No. 13/665,528, filed May 7, 2010, Mansour M. Alghamdi.
U.S. Appl. No. 08/845,863, filed Aug. 17, 1999, William E. Kirksey.
U.S. Appl. No. 08/310,458, filed Apr. 21, 1998, William E. Kirskey Kyle S. Morris.
U.S. Appl. No. 12/955,558, filed Jun. 23, 2011, Shawn Yazdani Amirreza Vaziri Solomon Cates Jason Kace.
U.S. Appl. No. 12/302,633, filed Jun. 11, 2009, Mitsuru Endo.
2010_Lee_Dependency Parsing using Prosody Markers from a Parallel Text.
2004_Lavie Rapid Prototyping of a Transfer-based Hebrew-to-English Machine Translation System.
2002_Itai A Corpus Based Morphological Analyzer for Unvocalized Modern Hebrew.
2008_Goldwasser Transliteration as Constrained Optimization.
2010_Regmi Understanding the Processes of Translation and Transliteration in Qualitative Research.
2009_Li Whitepaper of News 2009 Machine Transliteration Shared Task.
2009_Deselaers A Deep Learning Approach to Machine Transliteration.
2003_Goto Transliteration Considering Context Information based on the Maximum Entropy Method.
2003_Virga Transliteration of Proper Names in Cross-Lingual Information Retrieval.
2007_Habash On Arabic Transliteration.
2002_Oh An English-Korean Transliteration Model Using Pronunciation and Contextual Rules.
1994_Content-aware visualizations of audio data in diverse contexts by Steven Ness.
2001_Fujii Japanese English Cross-Language Information Retrieval Exploration of Query Translation and Transliteration.
2007_Named Entity Translation with Web Mining and Transliteration.
2004_Phoneme-based Transliteration of Foreign Names for OOV Problem.
2003_Lee. Acquisition of English-Chinese Transliterated Word Pairs from Parallel-Aligned Texts using a Statistical Machine Transliteration Model.
2008_Goldberg Identification of Transliterated Foreign Words in Hebrew Script.
2003_Ornan Latin Conversion of Hebrew Grammatical, Full and Deficient.
2010_Itai How to Pronounce Hebrew Names.
2008_Dresher Between music and speech the relationship between Gregorian and Hebrew chant.
2010-2011_Chabad_Org Judaism, Torah and Jewish Info—Chabad Lubavitch.
2010_Winther-Nielsen Transliteration of Biblical Hebrew for the Role-Lexical Module.
1999_Palackal The Syriac Chant Traditions in South India.
2006_An Unsupervised Morpheme-Based HMM for Hebrew Morphological Disambiguation Meni Adler and Michael Elhadad Noun Phrase Chunking in Hebrew: Influence of Lexical and Morphological Features Yoav Goldberg, Meni Adler and Michael Elhadad.
2008_Goldwasser Active Sample Selection for Named Entity Transliteration.
2001_Fuller Orality, literacy and memorisation priestly education in contemporary south India.
2009_Ming-Wei Chang_Unsupervised Constraint Driven Learning for Transliteration Discovery.
2010_Korn Parthian Iranian Cantillation.
2001_Kang English to Korean Transliteration using Multiple Unbounded Overlapping Phoneme Chunk.
2006_Malik Punjabi Machine Transliteration.
2003_Qu Automatic transliteration for Japanese-to-English text retrieval.
2008_Wentland Building a Multilingual Lexical Resource for Named Entity Disambiguation, Translation and Transliteration.
2007_Goldberg_A Case Study in Hebrew NP Chunking.
2006_Cross Linguistic Name Matching in English and Arabic a One to Many Mapping Extension of the Levenshtein Edit Distance Algorithm.
2012_Monger-Accents, Punctuation or Cantillation Marks.
2008_Finch_Phrase-based Machine Transliteration.
1994_haralambous—a typesetting system for Biblical Hebrew.
2007_Andi_Wu_A Hebrew Tree Bank Based on Catillation Marks.
2010_Malin_Modal Analysis and Music-Text Relations in Ashkenazic Jewish Traditions of Biblical Cantillation.
2012_Salamon_ISMIR_Melody_Statistical Characterisation of Melodic Pitch Contours and Its Application for Melody Extraction.
1999_A Simple Technique for Typesetting Hebrew with Vowel Points.
1993_Boomershine_Biblical Megatrends Towards a Paradigm for the Interpretation of the Bible in Electronic Media.
2001_Toledo_An Anotated Bibliography of Hebrew Typesetting.
1983_Heller_Errors in Transmission as Indicators of East-West Differences a Study of Jewish Music in Toronto.
2010_Hendel_Biblical Cantillations.
1993_Rubin_Rhythmic and Structural Aspects of the Masoretic Cantillation of the Pentateuch.pdf.
2009_Ness_Content-aware web browsing and visualization tools for cantillation and chant research.
2010_Oh Text Visualization of Song Lyrics—Cantillation.
2012_Biro On Computational Transcription and Analysis of Oral and Semi-Oral Chant Traditions Jewish Torah Trope.
2011_Kranenburg A Computational Investigation of Melodic Contour Stability in Jewish Torah Trope Performance Traditions.
2002_Mashiah Synagogal Chanting of the Bible Linking of Linguistics and Ethnomusicology.
1993_Mitchell The Origins of Early Christian Liturgical Music.
2008_Pardo Machine Perception of Music and Audio-Chromagrams.
2003_Stuttle A Gaussian Mixture Model Spectral Representation for Speech Recognition.
2012_Walters The Intervalgram an Audio Feature for Large-scale Melody Recognition.pdf.
2004_Darch Formant Prediction from MFCC Vectors.
2011_Kranenburger_A Computational Investigation of Melodic Contour Stability in Jewish Torah Trope Performance Traditions.
2011_Atwell_An Artificial Intelligence approach to Arabic and Islamic content on the internet.
2007_Tzanetakis_Computational Ethnomusicology (Non-Western Music).

(56) References Cited

OTHER PUBLICATIONS

2010_Schoenfeld-Too-Much-Bar-and-Not-Enough-Mitzvah-A-Proposed-Research-Agenda-on-Bar-Bat-Mitzvah.
2008_Kol Kore—Bar Mitzvah and Bat Mitzvah Trope Learning Multimedia, Torah chanting, Hafatarh and Megilot.
2008_Ness_Chants and Orcas Semi-automatic Tools for Audio Annotation and Analysis in Niche Domains.
2000_Blackburn_Content Based Retrieval and Navigation of Music Using Melodic Pitch Contours.
1985_VanWijk_From Sentence Structure to Intonation Contour.
2007_Zhao_A Processing Method for Pitch Smoothing Based on Autocorrelation and Cepstral F0 Detection Approaches.
2003_vanSanten Quantitative Modeling of Pitch Accent Alignment.
2006_Soong_Automatic Detection of Tone Mispronunciation in Mandarin.
2003_McLeod A_Smarter_Way_to_Find_Pitch.
2000_Sutton_CSLU Toolkit represents an effort to make the core technology.
2000 Cambouropoulos_Extracting 'Significant' Patterns from Musical Strings.
2010_Sharda Sounds of melody—Pitch patterns of speech in autism.
2010_Shachter—Why Bonnie Cant Read the Siddur.
2006_Hazen_Automatic Alignment and Error Correction of Human Generated Transcripts for Long Speech Recordings.
2000 Witt Phone-level pronunciation scoring and assessment for interactive language learning.
1998_Eskenazi—The Fluency Pronunciation Trainer.
2006_Fujihara_Automatic synchronization between lyrics and music CD recordings based on Viterbi alignment of segregated vocal signals.
2007_Keshet_A Large Margin Algorithm for Speech-to-Phoneme and Music-to-Score Alignment.pdf.
2005_Li_How Speech/Text Alignment Benefits Web-based Learning.
2001_Boersma_PRAAT_a_system_for_doing_phonetics_by_computer.
2006_Pauws_A Fully Operational Query by Humming System.
2005_Typke_A Survey of Music Information Retrieval Systems.
2003_Hu Polyphonic Audio Matching and Alignment for Music Retrieval.
2004_Dannenberg_The MART Testbed for Query-by-Humming Evaluation.
2006_Dannenberg_A Comparative Evaluation of Search Techniques for Query-by-Humming.
2001_Birmingham Music Retrieval Via Aural Queries.
2003 Raju A Query-By-Humming Based Music Retrieval System.
2004_Time Series Alignment for Music Information Retrieval.
2003_DeCaen_On the Distribution of Major and Minor Pause in Tiberian Hebrew in the Light of the Variants of the Second Person Independent Pronouns.
2002_Chai Folk Music Classification Using Hidden Markov Models.
2008 Lartillot A Matlab Toolbox for Music Information Retrieval.
2006 Scaringella_Automatic genre classification of music content.
Stephen. 2003. Music information retrieval.
2000 Lemström SEMEX_-_An_efficient_Music_Retrieval_Prototype.
1999_Uitdenbogerd Melodic Matching Techniques for Large Music Databases.
1999_Rolland Musical Content-Based Retrieval an Overview of the Melodiscov Approach and System.
2002_Song Mid-Level Music Melody Representation of Polyphonic Audio for Query-by-Humming System.
2002_Meredith_Discovering Repeated Patterns in Music.
2002_Pienimaki_Indexing Music Databases Using Automatic Extraction of Frequent Phrases.
2008_Chew_Challenging_Uncertainty_in_Query_by_Humming_Systems_A_Finger printing_Approach.
LU 2001—Indexing and Retrieval of Audio—A Survey.
2003_Vercoe_Structural analysis of musical signals for indexing and thumbnailing.
2010_Magic Yad Hebrew chanting.
2011_Learn Hebrew—Speak Hebrew—Learn Hebrew Software—Rosetta Stone.
2009_Beverly_Hills_Chabad.
2011_Trope_Trainer_Standard.
2010_Navigating the Bible II.
2011_Pocket_Torah.
2010_Reading_Assistant.
2011_Cantillation—Wikipedia, the free encyclopedia (slides) 2011_Cantillation—Wikipedia, the free encyclopedia (text).
2009_elietorah.
Uknown_AtHomeWithHebrew Learn to Read the Hebrew Alphabet in Only 13 Days.
2003_Adami_Modeling Prosodic Dynamics for Speaker Recognition.
1993_bigelow The design of a Unicode font.pdf.
2013_From Neumes to Notes_The Evolution of Music Notation.
2010_Byzantine vs. Western Notation.
2010_Rules of Byzantine Music Orthography.
2010_Byzantine Music Notation.pdf.
Apr. 29, 2010BlessingsAfterHaftorah.
Apr. 13, 2011Darga.
1999_Dowling_Melodic and Rhythmic Contour in Perception and Memory.pdf.
2014_Johnston_WebRTC APIs and RTCWEB Protocols of the HTML5 Real-Time Web.
2013_Wilson_Node.js the Right Way Practical, Server-Side JavaScript That Scales.
2015_Nahavandipoor_iOS 8 Swift Programming Cookbook.
2006—Loy_Musimathics_The Mathematical Foundations(41pages).
1998 De Roure Content based navigation of music using melodic pitch contours.
2003 Hosom Automatic Phoneme Alignment Based on Acoustic-Phonetic Modeling.
2003_Ang_Prosody-Based Automatic Detection of Annoyance and Frustration in Human-Computer Dialog.
2001_Ceyssens On the Construction of a Pitch Conversion System.
2004 Lin Language Identification Using Pitch Contour Information.
2011_Sohn_New Orthographic Methods for Teaching Novice Hebrew Readers.Pdf.
2011_Cuthbert_Ariza_Friedland_Feature-Extraction.
2005_McEnnis_jAudio A Feature Extraction Library.pdf.
2005_Lidy_Evaluation of Feature Extractors and Psycho-Acoustic Transformations for Music Genre Classification.
2005_Mierswa_Morik_Automatic Feature Extraction for Classifying Audio Data.
2006_Patel_An Empirical Method for Comparing Pitch Patterns in Spoken and Musical Melodies.
2011_Habudova_Representation and Pattern Matching Techniques for Music Data.
2010_Weninger_Robust Feature Extraction for Automatic Recognition of Vibrato Singing in Recorded Polyphonic Music.pdf.
2012_Humphrey_Deep Architectures and Automatic Feature Learning in Music Informatics.
2002_Martens_A Tonality-oriented Symbolic Representation of Musical Audio Generated by Classification Trees.
2001_Toiviainen_A Method for Comparative Analysis of Folk Music Based on Musical Feature Extraction and Neural Networks.
2010_Eyben_openSMILE—The Munich Versatile and Fast Open-Source Audio Feature Extractor.
2005_Mishra_Decomposition of Pitch Curves in the General Superpositional Intonation Model.
1986_Schoenfeld_Analysis-of-Adult-Bat-Mitzvah.pdf.
1995_Alessandro_Automatic_Pitch_Contour-Stylization.
1995_Wertheimer_Conservative_Synagogues_and_Their_Members.
1997_Huron_Melodic_Arch_Western_Folksongs.
1999_Ahmadi_Cepstrum-Based Pitch Detection Using a New Statistical.
2001_Brondsted_A System for Recognition of Hummed Tunes.
2004 Mertens Semi-Automatic Transcription of Prosody Based on a Tonal Perception Model.

(56) References Cited

OTHER PUBLICATIONS

2006_Kohler_Timing and communicative functions of pitch contours.
2010_Friedmann_The Victory of Confession_Ashamnu the Shirah and Musical Symbolism.
1993_Vrooman_Duration and intonation in emotional speech.
2000_Burkhardt_Verification of Acoustical Correlates of Emotional Speech using Formant-Synthesis.
2003_Paulo_Automatic Phonetic Alignment and Its Confidence Measures.
2014-Levent-Levi_BlogGeekMe-WebRTC-for-Business-People.pdf.
1987_Patent DE3700796A1—Language trainer—interactive video unit with digital voice processing.
1996_Patent DE19652225A1—Process for automatic identification of melodies.
2002_Patent EP1479068A4—Text to speech.
2011_Quran reciter Word by Word, Memorization tool, for beginners, iphone , ipad , android.
2009_World of Islam Portal—Islam, Quran, Hadith, Nasheeds and more . . . pdf.
2007_Camacho_Swipe_Sawtooth Waveform Inspired Pitch Estimator for Speech and Music.
2007_Typke-Music Retrieval based on Melodic Similarity.pdf.
CS498_Audio Features.
2014_Schmidhuber_Deep Learning in Neural Networks an Overview.
2009_Lee_Unsupervised feature learning for audio classification using convolutional deep belief networks.
2015_Merrienboer_Blocks and Fuel Frameworks for deep learning.pdf.
2014_Martinez_The role of auditory features in deep learning approaches.
2004_Peeters_Audio Features for Sound Description.
2006_Gomez_identifying versions of the same piece using tonal descriptors.pdf.
Cantillizer—Cantillation Results.pdf.
Cantillizer—Cantillation History & Interpretation.pdf.
2015_Miao_Kaldi+PDNN Building DNN-based ASR Systems with Kaldi and PDNN.
2013_Rath_Improved feature processing for Deep Neural Networks.pdf.
2013_Chen_Quantifying the Value of Pronunciation Lexicons for Keyword Search in Low Resource Languages.pdf.
2011_Povey_kaldi_The Kaldi Speech Recognition Toolkit.pdf.
2014_Ghahremani_A Pitch Extraction Algorithm Tuned for Automatic Speech Recognition.
2014_Srivastava_A Simple Way to Prevent Neural Networks from Overfitting.
2011_Salamon_Musical Genre Classification Using Melody Features Extracted From Polyphonic Music Signals.
2013_Hansson_Voice-operated Home Automation Affordable System using Open-source Toolkits.pdf.
2009_Lee_Unsupervised feature learning for audio classification using convolutional deep belief networks.pdf.
2014_Platek_Free on-line speech recogniser based on Kaldi ASR toolkit producing word posterior lattices.
2001_Hoos_Experimental Musical Information Retrieval System based on GUIDO Music Notation.
2013_Accurate and Compact Large Vocabulary Speech Recognition on Mobile Devices.
2015_Ko_Audio Augmentation for Speech Recognition.
2003_McKinney Features for Audio and Music Classification.
2014_Huang_Deep Learning for Monaural Speech Separation.
2014_Chilimbi_Building an Efficient and Scalable Deep Learning Training System.pdf.
2015_Muellers_Musical Genre Classification.pdf.
2004_Krishnan_representation of pitch contours in Chinese tones.
Phonetically conditioned prosody transplantation for TTS: 2-stage phone-level unit-selection framework, Mythri Thippareddy, M. G. Khanum Noor Fathima, D. N. Krishna, A. Sricharan, V. Ramasubramanian, PES Institute of Technology, South Campus, Bangalore, India, Jun. 3, 2016, Speech Prosody, Boston University, Boston, MA.
Feb. 24, 2017_13223492_c1_2016_Promon_Common_Prosody_Platform_CPP; Santitham Prom-on, Yi Xu.
Feb. 24, 2017_13223492_c2_2014_Xu_Toward_invariant_functional_representations; Yi Xu, Santitham Prom-on.
Feb. 24, 2017_13223492_c3_2017_Birkholz_Manipulation_Prosodic_Features_Synthesis; Peter Birkholza, Lucia Martinb, Yi Xuc, Stefan Scherbaumd, Christiane Neuschaefer-Rubeb.
Feb. 24, 2017_13223492_c4_Oct. 27, 2016_Aytar_SoundNet-Learning_Sound_Representations_Unlabeled_Video; Yusuf Aytar, Carl Vondrick, Antonio Torralba.
Feb. 24, 2017_13223492_c5_May 17, 2010_mitzvahtools_com.
Aug. 8, 2011, http://learntrope.com/, https://web.archive.org/web/20110808144924/http://learntrope.com/.
Feb. 2, 2011, http://www.virtualcantor.com, https://web.archive.org/web/20110202041051/http://www.virtualcantor.com/.
Feb. 2, 2011, http://www.mechon-mamre.org, https://web.archive.org/web/20110202041051/http://www.mechon-mamre.org/.
Jan. 18, 2010, https://www.hebcal.com, https://web.archive.org/web/20100118105837/http://www.hebcal.com/sedrot/.
Dec. 2, 2010, http://www.sacred-texts.com/bib//tan/, https://web.archive.org/web/20101202144451/http://www.sacred-texts.com/bib/tan/index.htm.
May 6, 2010, http://www.sacred-texts.com/bib//tan/, https://web.archive.org/web/20100506035848/http://www.sacred-texts.com/bib/tan/gen001.htm#001.
Jan. 4, 2011, https://www.sbl-site.org, https://web.archive.org/web/20110104150402/https://www.sbl-site.org/educational/BiblicalFonts_SBLHebrew.aspx.
Dec. 14, 2010, http://biblical-studies.ca/, https://web.archive.org/web/20101214020212/http://biblical-studies.ca/biblical-fonts.html.
Sep. 1, 2010, http://fedoraproject.org/, https://web.archive.org/web/20100901215327/http://fedoraproject.org/wiki/SIL_Ezra_fonts.
Feb. 5, 2011, http://scrollscraper.adatshalom.net/, https://web.archive.org/web/20110205071040/http://scrollscraper.adatshalom.net/.
Mar. 17, 2011, Pockettorah.com, https://web.archive.org/web/20110317025611/http://www.pockettorah.com/.
Jan. 8, 2011, http://jplayer.org/latest/demos, https://web.archive.org/web/20110108184406/http://jplayer.org/latest/demos/.
Feb. 1, 2009, http://yutorah.org/, https://web.archive.org/web/20090201190139/http://yutorah.org/ https://web.archive.org/web/20090130034805/http://www.yutorah.org/speakers/speaker.cfm?
Dec. 27, 2010, http://www.ling.upenn.edu/phonetics/, https://web.archive.org/web/20101227200229/http://www.ling.upenn.edu/phonetics/.
Dec. 27, 2010, http://htk.eng.cam.ac.uk/, https://web.archive.org/web/20101227040127/http://htk.eng.cam.ac.uk/.
Jan. 1, 2010, www.speech.cs.cmu.edu/, https://web.archive.org/web/20100101000000/http://www.speech.cs.cmu.edu/.
Sep. 10, 2009, youtube.com, Torah Cantillation part one https://www.youtube.com/watch?v=1ft5XW3AoA8.
Jan. 26, 2011, youtube.com, Torah and Haftorah Readings in 3 different nusachs https://www.youtube.com/watch?v=Ty1P2FzZhEA.
Jul. 8, 2008, http://torahreading.dafyomireview.com, https://web.archive.org/web/20080708183320/http://torahreading.dafyomireview.com/.
Dec. 30, 2010, http://www.tanakhml.org/, https://web.archive.org/web/20101230035949/http://tanakhml2.alacartejava.net/cocoon/tanakhml/index.htm.
Sep. 7, 2015, http://learn.shayhowe.com, https://web.archive.org/web/20150907210215/http://learn.shayhowe.com/advanced-html-css/css-transforms/.
Aug. 24, 2011, yassarnalquran.wordpress.com/, https://web.archive.org/web/20110824132255/http://yassarnalquran.wordpress.com/.
Sep. 3, 2011, www.houseofquran.com/qsys/quranteacher1.html, https://web.archive.org/web/20110903014802/http://www.houseofquran.com/qsys/quranteacher1.html.
Sep. 2, 2011, www.houseofquran.com/, https://web.archive.org/web/20110902170459/http://www.houseofquran.com/.

(56) References Cited

OTHER PUBLICATIONS

Sep. 2, 2011, http://allahsquran.com/, https://web.archive.org/web/20110902074136/http://www.allahsquran.com/ https://web.archive.org/web/20110812070551/http://www.allahsquran.com/learn/?
Aug. 6, 2011, corpus.quran.com/, https://web.archive.org/web/20110806210340/http://corpus.quran.com/.
Feb. 18, 2009, quran.worldofislam.info/index.php?page=quran_download, https://web.archive.org/web/20090218224311/http://quran.worldofislam.info/index.php?page=quran_download.
Dec. 30, 2010, http://www.stanthonysmonastery.org/music/ByzMusicFonts.html, https://web.archive.org/web/20101230183636/http://www.stanthonysmonastery.org/music/ByzMusicFonts.html.
Dec. 30, 2010, http://www.stanthonysmonastery.org/music/NotationB.htm, https://web.archive.org/web/20101230181034/http://www.stanthonysmonastery.org/music/NotationB.htm.
Dec. 18, 2010, http://chandrakantha.com/articles/indian_music//lippi.html, https://web.archive.org/web/20101218003121/http://chandrakantha.com/articles/indian_music//lippi.html.
Apr. 13, 2011, http://www.darga.org/, https://web.archive.org/web/20110413063010/http://www.darga.org/.
Oct. 14, 2010, wiki/Vedic_chant, https://web.archive.org/web/20101014010135/http://en.wikipedia.org/wiki/Vedic_chant.
Dec. 15, 2010, wiki/Carnatic_music, https://web.archive.org/web/20101215100947/http://en.wikipedia.org/wiki/Carnatic_music.
Nov. 29, 2010, wiki/Musical_notation, https://web.archive.org/web/20101129031202/http://en.wikipedia.org/wiki/Musical_notation.
Feb. 28, 2011, wiki/Byzantine_music, https://web.archive.org/web/20110228164902/http://en.wikipedia.org/wiki/Byzantine_music.
Dec. 14, 2010, wiki/Writing_system, https://web.archive.org/web/20101214225831/http://en.wikipedia.org/wiki/Writing_system.
Dec. 14, 2010, wiki/Intonation_%28linguistics%29, https://web.archive.org/web/20101214231356/http://en.wikipedia.org/wiki/Intonation_%28linguistics%29.
Dec. 14, 2010, wiki/Inflection, https://web.archive.org/web/20101214225923/http://en.wikipedia.org/wiki/Inflection.
Dec. 14, 2010, wiki/Diacritic, https://web.archive.org/web/20101214230503/http://en.wikipedia.org/wiki/Diacritic.
Apr. 1, 2010, wiki/Abjad, https://web.archive.org/web/20100401000000/https://en.wikipedia.org/wiki/Abjad.
Dec. 14, 2010, wiki/Prosody_%28linguistics%29, https://web.archive.org/web/20101214225947/http://en.wikipedia.org/wiki/Prosody_%28linguistics%29.
May 5, 2010, wiki/Neume, https://web.archive.org/web/20100505083924/http://en.wikipedia.org/wiki/Neume.
Aug. 30, 2011, musicnotation.org, https://web.archive.org/web/20110830105429/http://musicnotation.org/.
Jun. 12, 2010, http://sourceforge.net/projects/cantillion/, https://web.archive.org/web/20100612224709/http://sourceforge.net/projects/cantillion/.
Dec. 2, 2015, http://marsyas.info/tutorial/tutorial.html, https://web.archive.org/web/20151202164051/http://marsyas.info/tutorial/tutorial.html.
Oct. 7, 2011, tinyurl.com/365oojm MIR Toolbox, https://web.archive.org/web/20111007102314/https://www.jyu.fi/hum/laitokset/musiikki/en/research/coe/materials/mirtoolbox.
Dec. 17, 2013, tinyurl.com/3yomxwl Auditory Toolbox, https://web.archive.org/web/20131217083143/https://engineering.purdue.edu/~malcolm/interval/1998-010/AuditoryToolboxTechReport.pdf.
Oct. 16, 2011, clam-project.org/, https://web.archive.org/web/20111016012556/http://clam-project.org/.
Jan. 26, 2011, tinyurl.com/6cvtdz D.Ellis Code, https://web.archive.org/web/20110126044852/http://www.ee.columbia.edu/~dpwe/resources/matlab/.
Jun. 2, 2012, tinyurl.com/3ah8ox9 jAudio, https://web.archive.org/web/20120602001926/http://sourceforge.net/projects/jmir/files/jAudio/.
Dec. 27, 2010, pampalk.at/ma/, https://web.archive.org/web/20101227091153/http://www.pampalk.at/ma/.
Apr. 11, 2011, cmusphinx.sourceforge.net/, https://web.archive.org/web/20110411140757/http://cmusphinx.sourceforge.net/.
Dec. 21, 2010, http://www.sagreiss.org/cantillizer/cantillation.htm#mozTocId21322, https://web.archive.org/web/20101221092254/http://www.sagreiss.org/cantillizer/cantillation.htm.
Chanting the Hebrew Bible by Joshua R. Jacobson 2002, Jewish Publication Society ISBN 0-827-0693-1 (hardback).
The Art of Cantillation, vol. 2: A Step-By-Step Guide to Chanting Haftarot and Mgilot with CD, Marshall Portnoy, Josee Wolff, 2002.
Nicolai Winther-Nielsen, "Biblical Hebrew parsing on display: The Role-Lexical Module (RLM) as a tool for Role and Reference Grammar". SEE-J Hiphil 6 [http://www.see-j.net/hiphil] (2009).
The Leipzig Glossing Rules: Conventions for interlinear morpheme-by-morpheme glosses, Max Planck Institute for Evolutionary Anthropology (2006).
Matthew Anstey, "Towards a Topological Representation of Tiberian Hebrew," (2006).

* cited by examiner

*Data Structure*

Trope 28 — Symbolic Representation 18 — Phonetic Representation 30

<MERKHA>SHAMA SH AA1 M AA0 sp
<MERKHA>SHAQER SH AA1 K EH0 R sp
<MERKHA>SHAT SH AA1 T sp
<MERKHA>SHATU SH AA1 T UW1 sp
<MERKHA>SHAV SH AA1 V sp
<MERKHA>SHAV<MERKHA>RA SH AA1 V R AA1 sp
<MERKHA>SHA`AR SH AA1 sp AA0 R sp
<MERKHA>SHE<TIPEHA>HEIM SH EH1 HH EY1 M sp
<MERKHA>SHEIM SH EY1 M sp
<MERKHA>SHEISH SH EY1 SH sp
<MERKHA>SHEISHET SH EY1 SH EH0 T sp
<MERKHA>SHEIV SH EY1 V sp
<MERKHA>SHEIVET SH EY1 V EH0 T sp
<MERKHA>SHEMEN SH EH1 M EH0 N sp
<MERKHA>SHEMESH SH EH1 M EH0 SH sp
<MERKHA>SHEQEL SH EH1 K EH0 L sp
<MERKHA>SHEQER SH EH1 K EH0 R sp
<MERKHA>SHEQETS SH EH1 K EH0 T S sp
<MERKHA>SHEVA` SH EH1 V AA0 sp sp
<MERKHA>SHEVER SH EH1 V EH0 R sp
<MERKHA>SHEVET SH EH1 V EH0 T sp
<MERKHA>SHIM<METEG>`A SH IH1 M sp AA1 sp
<MERKHA>SHIYR SH IY1 R sp
<MERKHA>SHIYRU SH IY1 R UW1 sp
<MERKHA>SHIYT SH IY1 T sp
<MERKHA>SHO<METEG>LEIF SH OW1 L EY1 F sp
<MERKHA>SHOCHAD SH OW1 HH AA0 D sp
<MERKHA>SHOD SH OW1 D sp
<MERKHA>SHOFTEY SH OW1 F T EY1 sp
<MERKHA>SHOKHVEY SH OW1 K V EY1 sp
<MERKHA>SHOLFEY SH OW1 L F EY1 sp
<MERKHA>SHOMU SH OW1 M UW1 sp
<MERKHA>SHOQ SH OW1 K sp
<MERKHA>SHOR SH OW1 R sp
<MERKHA>SHORESH SH OW1 R EH0 SH sp
<MERKHA>SHUV SH UW2 V sp
<MERKHA>SHUVA SH UW1 V AA0 sp
<MERKHA>SHUVIY SH UW2 V IY0 sp
<MERKHA>SHUVU SH UW2 V UW1 sp
<MERKHA>SHUVU SH UW1 V UW1 sp
<MERKHA>SIYM S IY1 M sp
<MERKHA>SIYMU S IY1 M UW1 sp
<MERKHA>SOBIY S OW1 B IY0 sp
<MERKHA>SOBU S OW1 B UW1 sp
<MERKHA>SOD S OW1 D sp

*Fig. 3B*

```
if (first consonant cluster has a sheva)
{ if (segment doesn't start sh!t*) {make the sheva vocal} }
else
{
   if (second consonant cluster has a sheva)
   {
      if (first consonant cluster is oo without a meteg) {do nothing}
      else
      {
         if (first consonant cluster is one of ba,ha,ka,la)
         {
            if (second consonant cluster's consonant has a dagesh)
            {
               if (rest of the segment starting at the second consonant cluster is a word
               segment) {make the sheva vocal}
            }
         }
         else if (first consonant cluster is one of bi,ki,li) {do nothing}
         else if (first consonant cluster is mi or she)
         {
            if (rest of the segment starting at the second consonant cluster is a word
            segment) {make the sheva vocal}
         }
         else if (first consonant cluster is wa && second consonant cluster's consonant is y)
         {remove the sheva (y! -> y:)}
      }
   }
}
```

*Fig. 3C*

```
for any undotted alef
{
   if aleph has no vowel
   {
      if (aleph isn't first consonant cluster)
      {
         move aleph's meteg/stress/cms to the previous consonant cluster
      }
      if(aleph is first consonant cluster && there is a next consonant cluster)
      {
         move aleph's meteg/stress/cms to the next consonant cluster
      }
      delete aleph's consonant cluster
   }
   else
   {
      if(aleph isn't first consonant cluster && aleph has a shuruq && previous consonant
      cluster has no vowel or qubuts)
      {
         make aleph's shuruq the previous consonant cluster's vowel
         move aleph's meteg/stress/cms to the previous consonant cluster
         delete aleph's consonant cluster
      }
   }
}
```

Fig. 3D

```
if (there are at least 2 consonant clusters && the final consonant cluster is hha or wa or
cha)
{
  if the penultimate consonant cluster has no vowel
  {
    make the penultimate consonant cluster's vowel a (patah)
    move meteg/stress from final consonant cluster to penultimate consonant cluster
  }
  else
  {
    insert a new penultimate consonant cluster, either y*a if the old penultimate consonant
cluster's vowel was one of i,ei,ai,oi or w*a otherwise
    delete the patah and any meteg/stress from the final consonant cluster
  }
}

if (there are at least 3 consonant clusters &&the penultimate consonant cluster is y:)
{
  if ( (the final consonant cluster's consonant is w && the antepenultimate consonant
cluster's vowel is o) or (the final consonant cluster's consonant is kh or h && the
antepenultimate consonant cluster's vowel is e) )
  {
    move the penultimate consonant cluster's meteg/stress/cms to the antepenultimate consonant
    cluster, then delete the penultimate consonant cluster (containing the y)
  }
}
```

*Fig. 3E*

```
for(any consonant cluster but the last)
{
  if(consonant cluster's vowel is a sheva with a meteg)
  {
      if(consonant cluster's consonant is a y)
      { replace the sheva with a hiriq }
      else if (next consonant cluster's consonant is one of ^,h,`,r)
      { copy the next consonant cluster's vowel to this consonant cluster }
      else
      { replace the sheva with a patah }
      remove the meteg
  }
```

*Fig. 3F*

```
check all interior consonant clusters (not first or last) in order as follows:
if(consonant cluster's vowel is a sheva or vocal sheva)
{
  if (previous consonant cluster has a meteg and its vowel is not one of
!,?,e!,a!,o!,e,a,o?,i,u) or (this consonant cluster's consonant is identical to next consonant
cluster's consonant)
  { make the sheva vocal ? }
  if the next consonant cluster's vowel is !
  { make the next consonant cluster's vowel ? (a vocal sheva) }
}
```

*Fig. 3G*

UW0
UW2
UW1
V
HH
EH0
EH1
EY1
EY2
IY1
AY1
IH0
sil
B
D
F
K
M
L
N
S
R
T
AO0
Y
Z
OW1
OW0
sp
AH0
SH
AA1
AA0

```
Algorithm for converting between Jewish date and Julian day:

  HOUR = 60*18  [halaqim]
  DAY = 24*HOUR
  WEEK = 7*DAY
  MONTH = DAY + 12*HOUR + 793

  method days_from_3744(y) where y is Jewish year:
    y -= 3744
    m = y*12 + (y*7+1)//19
    r = (y*7+1)%19
    p = m*MONTH + 7*HOUR + 779
    d = m*28 + p//DAY - 2
    pd = p%DAY
    w = p%WEEK//DAY
    if r < 12 and w == 3 and pd > 15*HOUR+204 or
       r < 7 and w == 2 and pd > 21*HOUR+589
            d += 1
            w += 1
    if w == 1 or w == 4 or w == 6
            d += 1
    return d

  Given hdate year, month, day :        # with hdate.hdate
                                        #   month numbering
    dd = days_from_3744(year)
    ly = days_from_3744(year+1)-dd      # length of this year
                                        #   [353,354,355,383,384,385]
    if month >= 13                      # AdarI or AdarII
      if month==13
        day += 30                       # length of AdarI
      month = 6
    day += dd+(59*(month-1)+1)//2       # each pair of months is
                                        #   usually 59 days
    if ly%10 > 4 and month > 2
      day += 1                                  # long month
    elif ly%10 < 4 and month > 3
      day -= 1                                  # short month
    if ly > 365 and month > 6
      day += 30                                 # leap month
    return day + 1715118
```

*Fig. 9A*

```
Given Julian day j, compute hdate.hdate year, month, day :

  year = 3743+(j-1715119)*492480//179876755     # guess at Jewish year
  d0 = days_from_3744(year)+1715119   # Julian day of Rosh Hashana
  d1 = days_from_3744(year+1)+1715119
  while d1 <= j                       # find the real Jewish year
    year += 1
    d0 = d1
    d1 = days_from_3744(year+1)+1715119
  ly = d1-d0                          # length of Jewish year
  d = j-d0                            # dayofyear
  if d >= ly-236                      # final 8 months always
                                      #   30+29+30+29+30+29+30+29
    d -= ly-236
    month = d*2//59
    day = d - (month*59+1)//2 + 1
    month += 5
    if ly > 355 and month <= 6
        month += 8                    # AdarI or AdarII
  else                                # need to handle leap days
    if ly%10 > 4 and d == 59
        month = 1                     # 30 Cheshvan
        day = 30
    elif ly%10 > 4 and d > 59
        month = (d-1)*2//59           # beyond Cheshvan, which has 30
                                      #   days this year
        day = d - (month*59+1)//2
    elif ly%10 < 4 and d > 87
        month = (d+1)*2//59           # beyond Kislev, which has 29
                                      #   days this year
        day = d - (month*59+1)//2 + 2
    else
        month = d*2//59               # other cases alternate 30+29
                                      #   until this day
        day = d - (month*59+1)//2 + 1
    month += 1
  return year, month, day
```

Fig. 9B

```
Algorithm for converting from Julian day j to Gregorian date :

  k = j + 68569
  n = 4*k//146097
  k -= (146097*n+3)//4
  i = 4000*(k+1)//1461001
  k -= 1461*i//4 - 31
  m = 80*k//2447
  d = k - 2447*m//80
  k = m//11
  return (100*(n-49)+i+k, m+2-12*k, d)
```

Fig. 9C

Readings for The Singing Torah

| | Sunday | Monday | Tuesday | Wednesday | Thursday | Friday | Saturday | (Shabbat) |
|---|---|---|---|---|---|---|---|---|
| April 27 | | | | Rosh Chodesh | Rosh Chodesh | | Emor<br>Behar Mincha | 3 Iyyar |
| May 4 | | Behar | | | Behar | | Behar<br>Bechukotai Mincha | 10 Iyyar |
| May 11 | | Bechukotai | | | Bechukotai | | Bechukotai<br>Bamidbar Mincha | 17 Iyyar |
| May 18 | | Bamidbar | | | Bamidbar | | Bamidbar<br>Nasso Mincha | 24 Iyyar |
| May 25 | | Nasso | | | Nasso | Rosh Chodesh | Nasso<br>Beha'alotcha Mincha | 2 Sivan |
| June 1 | | Beha'alotcha | | Shvuot | Shvuot 2 | | Beha'alotcha<br>Sh'lach Mincha | 9 Sivan |
| June 8 | | Sh'lach | | | Sh'lach | | Sh'lach<br>Korach Mincha | 16 Sivan |

Fig. 9D
Calendar

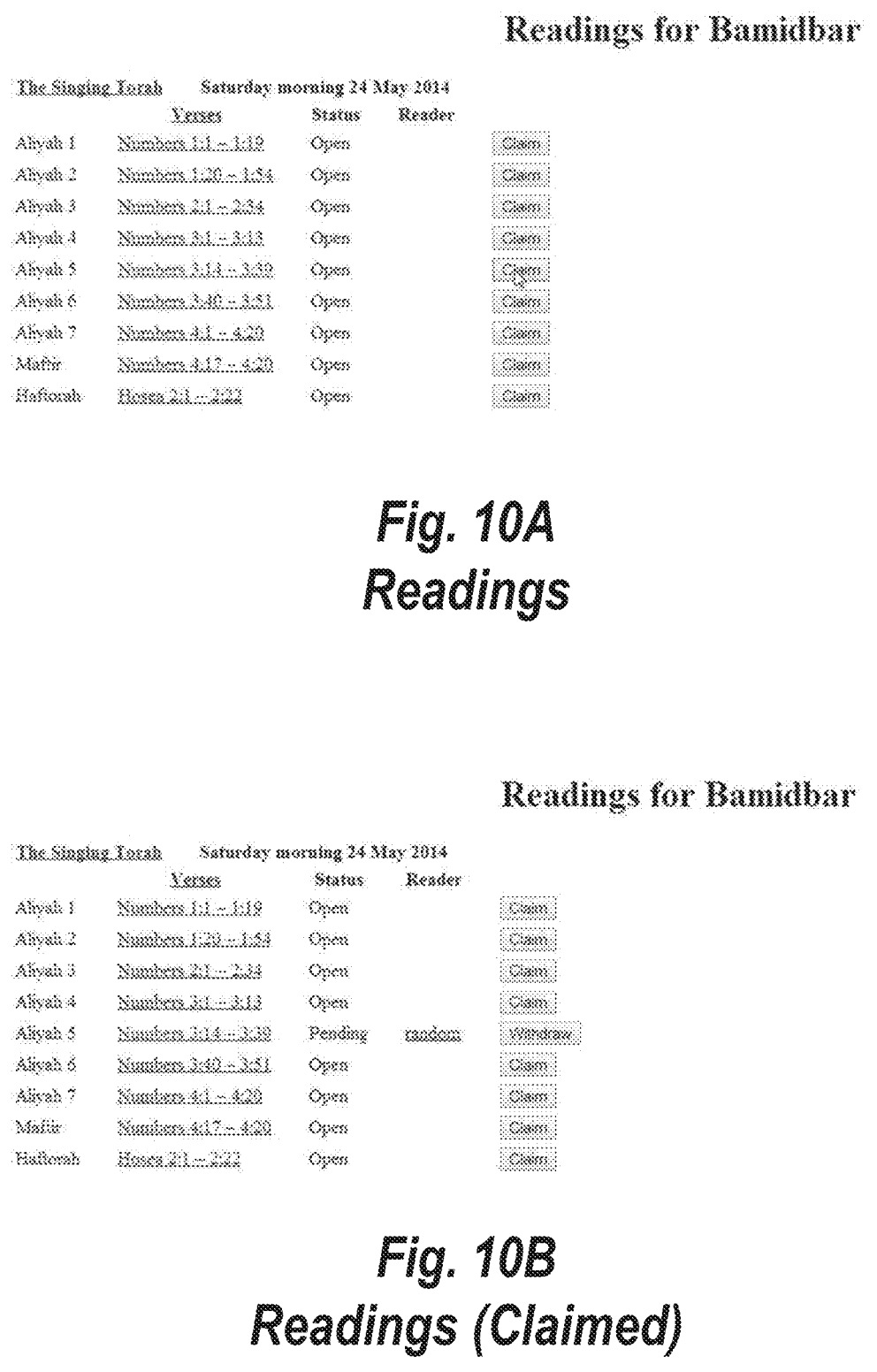

Readings for Bamidbar

The Singing Torah    Saturday morning 24 May 2014

| | Verses | Status | Reader | |
|---|---|---|---|---|
| Aliyah 1 | Numbers 1:1 – 1:19 | Open | | Claim |
| Aliyah 2 | Numbers 1:20 – 1:54 | Open | | Claim |
| Aliyah 3 | Numbers 2:1 – 2:34 | Open | | Claim |
| Aliyah 4 | Numbers 3:1 – 3:13 | Open | | Claim |
| Aliyah 5 | Numbers 3:14 – 3:39 | Open | | Claim |
| Aliyah 6 | Numbers 3:40 – 3:51 | Open | | Claim |
| Aliyah 7 | Numbers 4:1 – 4:20 | Open | | Claim |
| Maftir | Numbers 4:17 – 4:20 | Open | | Claim |
| Haftorah | Hosea 2:1 – 2:22 | Open | | Claim |

*Fig. 10A*
*Readings*

Readings for Bamidbar

The Singing Torah    Saturday morning 24 May 2014

| | Verses | Status | Reader | |
|---|---|---|---|---|
| Aliyah 1 | Numbers 1:1 – 1:19 | Open | | Claim |
| Aliyah 2 | Numbers 1:20 – 1:54 | Open | | Claim |
| Aliyah 3 | Numbers 2:1 – 2:34 | Open | | Claim |
| Aliyah 4 | Numbers 3:1 – 3:13 | Open | | Claim |
| Aliyah 5 | Numbers 3:14 – 3:39 | Pending | random | Withdraw |
| Aliyah 6 | Numbers 3:40 – 3:51 | Open | | Claim |
| Aliyah 7 | Numbers 4:1 – 4:20 | Open | | Claim |
| Maftir | Numbers 4:17 – 4:20 | Open | | Claim |
| Haftorah | Hosea 2:1 – 2:22 | Open | | Claim |

*Fig. 10B*
*Readings (Claimed)*

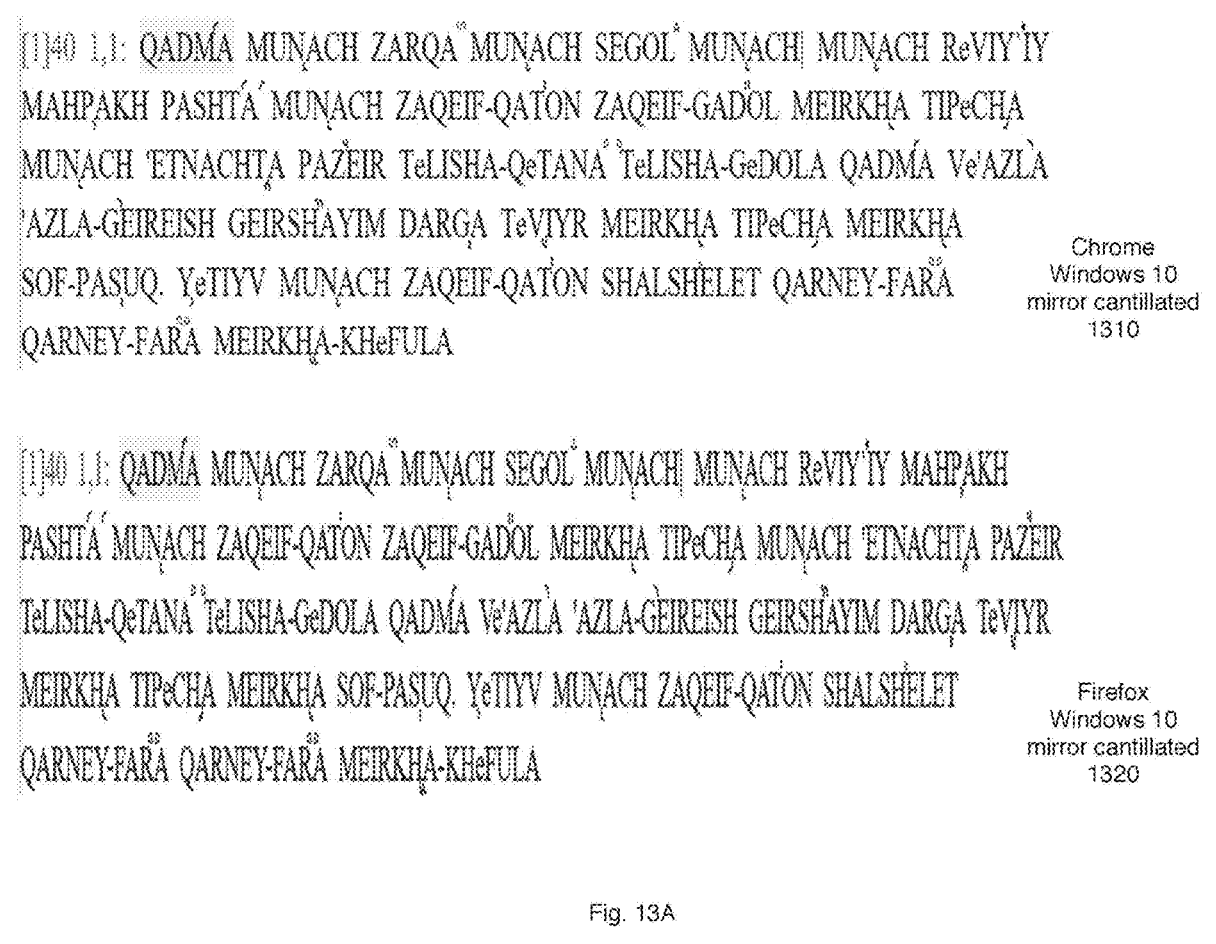

[1]40 1,1: QADMA MUNACH ZARQA MUNACH SEGOL MUNACH| MUNACH ReVIY'IY MAHPAKH PASHTA MUNACH ZAQEIF-QATON ZAQEIF-GADOL MEIRKHA TIPeCHA MUNACH 'ETNACHTA PAZEIR TeLISHA-QeTANA TeLISHA-GeDOLA QADMA Ve'AZLA 'AZLA-GEIREISH GEIRSHAYIM DARGA TeVIYR MEIRKHA TIPeCHA MEIRKHA SOF-PASUQ. YeTIYV MUNACH ZAQEIF-QATON SHALSHELET QARNEY-FARA QARNEY-FARA MEIRKHA-KHeFULA

Chrome Windows 10 mirror cantillated 1310

[1]40 1,1: QADMA MUNACH ZARQA MUNACH SEGOL MUNACH| MUNACH ReVIY'IY MAHPAKH PASHTA MUNACH ZAQEIF-QATON ZAQEIF-GADOL MEIRKHA TIPeCHA MUNACH 'ETNACHTA PAZEIR TeLISHA-QeTANA TeLISHA-GeDOLA QADMA Ve'AZLA 'AZLA-GEIREISH GEIRSHAYIM DARGA TeVIYR MEIRKHA TIPeCHA MEIRKHA SOF-PASUQ. YeTIYV MUNACH ZAQEIF-QATON SHALSHELET QARNEY-FARA QARNEY-FARA MEIRKHA-KHeFULA

Firefox Windows 10 mirror cantillated 1320

Fig. 13A

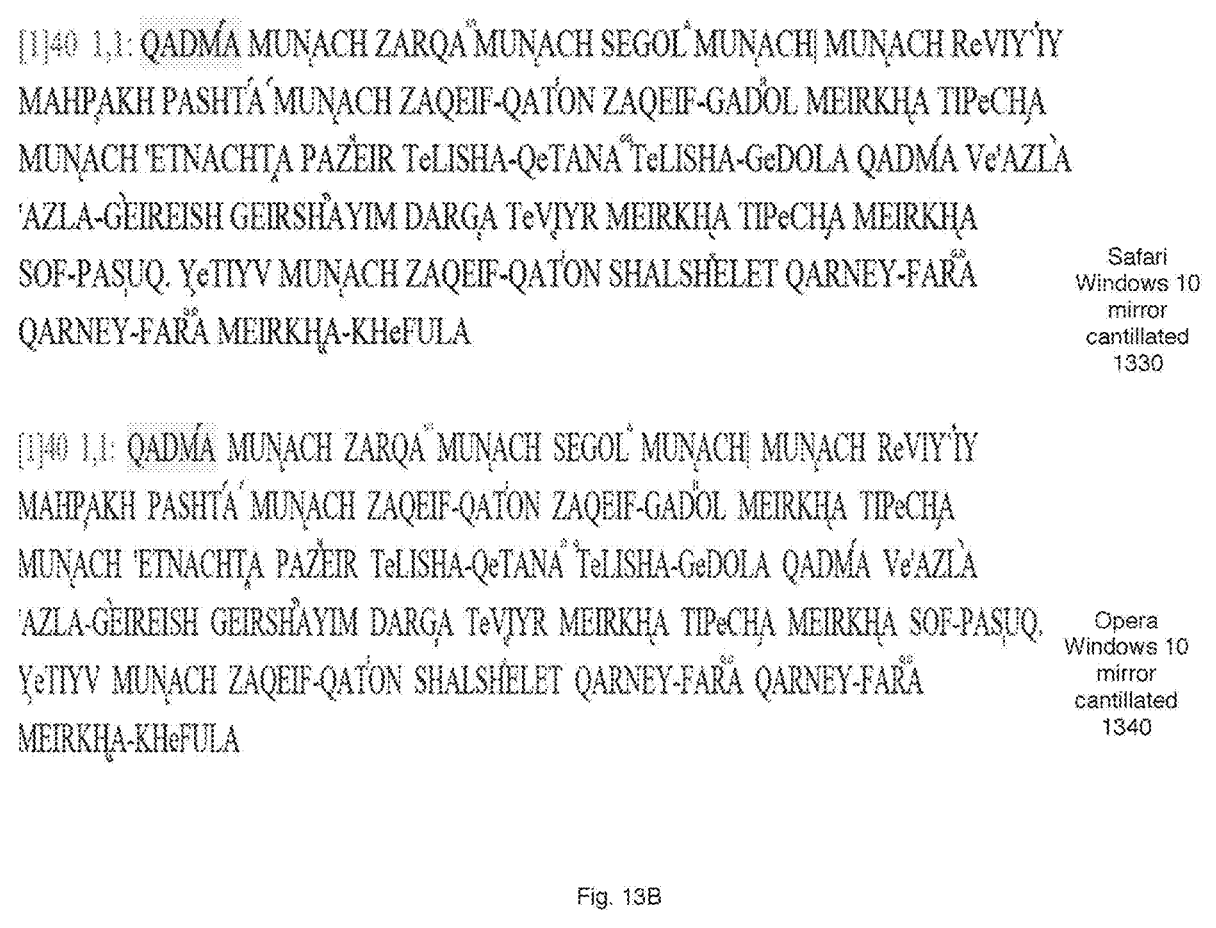

[1]40 1,1: QADMA MUNACH ZARQA MUNACH SEGOL MUNACH| MUNACH ReVIY'IY MAHPAKH PASHTA MUNACH ZAQEIF-QATON ZAQEIF-GADOL MEIRKHA TIPeCHA MUNACH 'ETNACHTA PAZEIR TeLISHA-QeTANA TeLISHA-GeDOLA QADMA Ve'AZLA 'AZLA-GEIREISH GEIRSHAYIM DARGA TeVIYR MEIRKHA TIPeCHA MEIRKHA SOF-PASUQ. YeTIYV MUNACH ZAQEIF-QATON SHALSHELET QARNEY-FARA QARNEY-FARA MEIRKHA-KHeFULA

Safari Windows 10 mirror cantillated 1330

[1]40 1,1: QADMA MUNACH ZARQA MUNACH SEGOL MUNACH| MUNACH ReVIY'IY MAHPAKH PASHTA MUNACH ZAQEIF-QATON ZAQEIF-GADOL MEIRKHA TIPeCHA MUNACH 'ETNACHTA PAZEIR TeLISHA-QeTANA TeLISHA-GeDOLA QADMA Ve'AZLA 'AZLA-GEIREISH GEIRSHAYIM DARGA TeVIYR MEIRKHA TIPeCHA MEIRKHA SOF-PASUQ. YeTIYV MUNACH ZAQEIF-QATON SHALSHELET QARNEY-FARA QARNEY-FARA MEIRKHA-KHeFULA

Opera Windows 10 mirror cantillated 1340

Fig. 13B

| | |
|---|---|
| 1 | מֵרְכָא טִפְּחָא מוּנַח אֶתְנַחְתָּא |
| 2 | טִפְּחָא מוּנַח אֶתְנַחְתָּא |
| 3 | מֵרְכָא טִפְּחָא אֶתְנַחְתָּא |
| 4 | טִפְּחָא אֶתְנַחְתָּא |
| 5 | מֵרְכָא טִפְּחָא מֵרְכָא סוֹף-פָּסוּק |
| 6 | טִפְּחָא מֵרְכָא סוֹף-פָּסוּק |
| 7 | מֵרְכָא טִפְּחָא סוֹף-פָּסוּק |
| 8 | טִפְּחָא סוֹף-פָּסוּק |
| 9 | קַדְמָא מַהְפַּךְ פַּשְׁטָא מוּנַח קָטֹן |
| 10 | מַהְפַּךְ פַּשְׁטָא מוּנַח קָטֹן |
| 11 | מַהְפַּךְ פַּשְׁטָא קָטֹן |
| 12 | פַּשְׁטָא מוּנַח קָטֹן |
| 13 | פַּשְׁטָא קָטֹן |
| 14 | מוּנַח מַהְפַּךְ פַּשְׁטָא מוּנַח קָטֹן |
| 15 | קַדְמָא וְאַזְלָא |
| 16 | קַדְמָא גֵּרֵשׁ |
| 17 | גֵּרֵשׁ |
| 18 | מוּנַח \| מוּנַח רְבִיעִי |
| 19 | מוּנַח רְבִיעִי |
| 20 | רְבִיעִי |
| 21 | גֵּרְשַׁיִם |
| 22 | דַּרְגָּא |
| 23 | תְּבִיר |
| 24 | דַּרְגָּא תְּבִיר |
| 25 | מֵרְכָא תְּבִיר |
| 26 | קַדְמָא דַּרְגָּא תְּבִיר |
| 27 | קַדְמָא מֵרְכָא תְּבִיר |
| 28 | מוּנַח דַּרְגָּא תְּבִיר |
| 29 | מוּנַח תְּלִישָא-גְדוֹלָה |
| 30 | מוּנַח תְּלִישָא-קְטַנָּה |
| 31 | מוּנַח פָּזֵר |
| 32 | זָקֵף-גָּדוֹל |
| 33 | יְתִיב מוּנַח קָטֹן |
| 34 | יְתִיב קָטֹן |
| 35 | מוּנַחזַרְקָא מוּנַח סְגוֹל |
| 36 | זַרְקָא מוּנַח סְגוֹל |
| 37 | זַרְקָא סְגוֹל |
| 38 | שַׁלְשֶׁלֶת |
| 39 | מֵרְכָא-כְפוּלָה |
| 40 | יֶרַח-בֶּן-יוֹמוֹ קַרְנֵי-פָרָה |
| 41 | מֵרְכָא טִפְּחָא מֵרְכָא סוֹף-פָּסוּק |

Fig. 14: Exemplary Predetermined List of Hebrew Bible Trope Families

Style 1: exemplary trope placement on the syllable

BeREISHIYT BARA 'ELOHIYM 'EIT HASHAMAYIM Ve'EIT HA'ARETS:

VeHA'ARETS HAYTA TOHU VAVOHU VeCHOSHEKH `AL-PeNEY TeHOM VeRUWACH 'ELOHIYM MeRACHEFET `AL-PeNEY HAMAYIM

Style 2: exemplary trope placement on the consonant

BeREISHIYT BARA 'ELOHIYM 'EIT HASHAMAYIM Ve'EIT HA'ARETS:

VeHA'ARETS HAYTA TOHU VAVOHU VeCHOSHEKH `AL-PeNEY TeHOM VeRUWACH 'ELOHIYM MeRACHEFET `AL-PeNEY HAMAYIM

Style 3: exemplary trope placement on the syllable

BeREISHIYT BARA 'ELOHIYM 'EIT HASHAMAYIM Ve'EIT HA'ARETS:

VeHA'ARETS HAYTA TOHU VAVOHU VeCHOSHEKH `AL-PeNEY TeHOM VeRUWACH 'ELOHIYM MeRACHEFET `AL-PeNEY HAMAYIM

Style 4: exemplary trope placement on the consonant

BeREISHIYT BARA 'ELOHIYM 'EIT HASHAMAYIM Ve'EIT HA'ARETS:

VeHA'ARETS HAYTA TOHU VAVOHU VeCHOSHEKH `AL-PeNEY TeHOM VeRUWACH 'ELOHIYM MeRACHEFET `AL-PeNEY HAMAYIM

בְּרֵאשִׁ֖ית בָּרָ֣א אֱלֹהִ֑ים אֵ֥ת הַשָּׁמַ֖יִם וְאֵ֥ת הָאָֽרֶץ׃

וְהָאָ֗רֶץ הָיְתָ֥ה תֹ֙הוּ֙ וָבֹ֔הוּ וְחֹ֖שֶׁךְ עַל־פְּנֵ֣י תְה֑וֹם וְר֣וּחַ אֱלֹהִ֔ים מְרַחֶ֖פֶת עַל־פְּנֵ֥י הַמָּֽיִם׃

Fig. 16 setspeed(): Set the audio playbackRate according to the value of the playbackRate slider 6600

↓

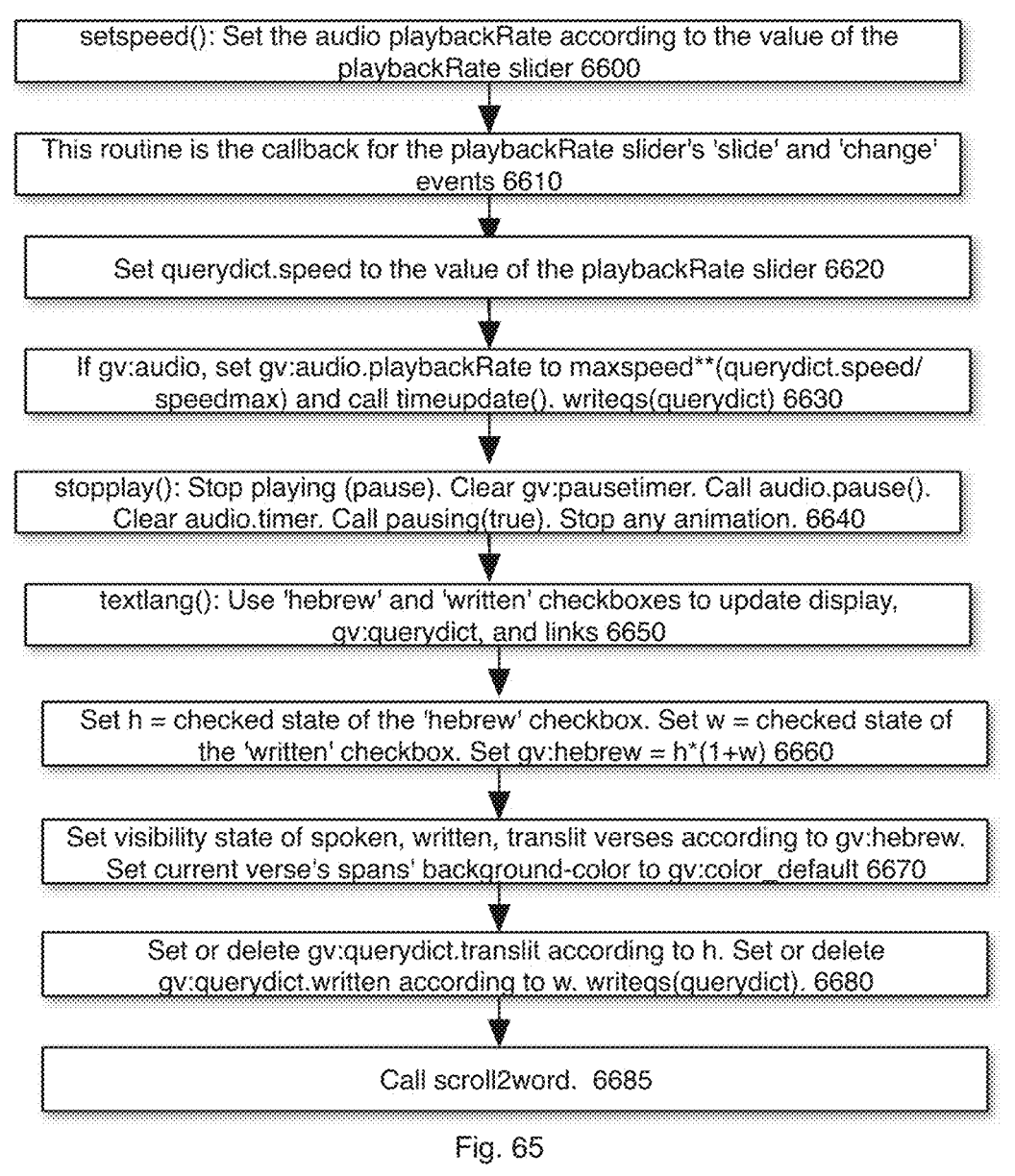

This routine is the callback for the playbackRate slider's 'slide' and 'change' events 6610

↓

Set querydict.speed to the value of the playbackRate slider 6620

↓

If gv:audio, set gv:audio.playbackRate to maxspeed**(querydict.speed/ speedmax) and call timeupdate(). writeqs(querydict) 6630

↓ stopplay(): Stop playing (pause). Clear gv:pausetimer. Call audio.pause(). Clear audio.timer. Call pausing(true). Stop any animation. 6640

↓ textlang(): Use 'hebrew' and 'written' checkboxes to update display, gv:querydict, and links 6650

↓

Set h = checked state of the 'hebrew' checkbox. Set w = checked state of the 'written' checkbox. Set gv:hebrew = h*(1+w) 6660

↓

Set visibility state of spoken, written, translit verses according to gv:hebrew. Set current verse's spans' background-color to gv:color_default 6670

↓

Set or delete gv:querydict.translit according to h. Set or delete gv:querydict.written according to w. writeqs(querydict). 6680

↓

Call scroll2word. 6685

Fig. 65

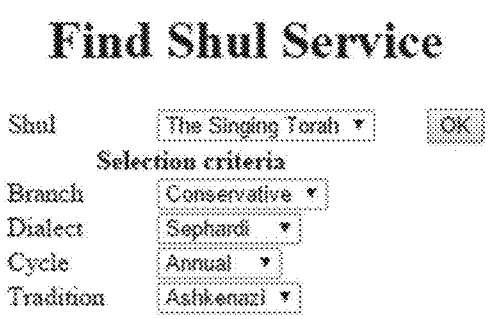
10010
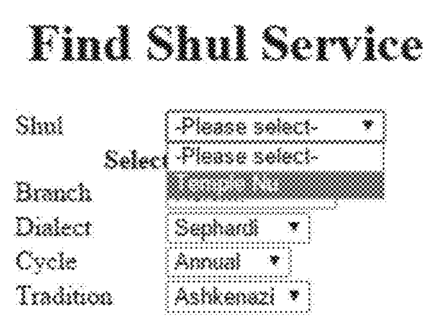
10020
| | | | | | |
|---|---|---|---|---|---|
| legitimate: | 1jan2014 | 2014jan1 | ch 3 5774 | Jan 1, 2001 | 1-jan-2001 |
| illegitimate: | ~~1/1/2014~~ | ~~2100feb29~~ | ~~ma 5 2001~~ | ~~1 jan.2001~~ | ~~AdarI 1, 5772~~ |
| explanation: | *numeric month* | *no such date* | *ambiguous month* | *separator neither space nor ,-/* | *no such date* |
10030
Fig. 92

Readings for Temple Nu

| | Sunday | Monday | Tuesday | Wednesday | Thursday | Friday | Saturday | (Shabbat) |
|---|---|---|---|---|---|---|---|---|
| 2015 August 9 | 9 | Reeh<br>10 | 11 | 12 | Reeh<br>13 | 14 | Reeh (Rosh Chodesh)<br>Shoftim Mincha | 30 Av 5775 |
| 2015 August 16 | Rosh Chodesh<br>16 | Shoftim<br>17 | 18 | 19 | Shoftim<br>20 | 21 | Shoftim<br>Ki Teitzei Mincha | 7 Elul 5775 |
| 2015 August 23 | 23 | Ki Teitzei<br>24 | 25 | 26 | Ki Teitzei<br>27 | 28 | Ki Teitzei<br>Ki Tavo Mincha | 14 Elul 5775 |
| 2015 August 30 | 30 | Ki Tavo<br>31 | 1 | 2 | Ki Tavo<br>3 | 4 | Ki Tavo<br>Nitzavim Mincha | 21 Elul 5775 |
| 2015 September 6 | 6 | Nitzavim<br>7 | 8 | 9 | Nitzavim<br>10 | 11 | Nitzavim<br>Vayeilech Mincha | 28 Elul 5775 |
| 2015 September 13 | 13 | Rosh Hashana I<br>14 | Rosh Hashana II<br>15 | Tzom Gedaliah<br>Tzom Gedaliah Mincha | Vayeilech<br>17 | 18 | Vayeilech (Shabbat Shuva)<br>Ha'Azinu Mincha | 6 Tishri 5776 |
| 2015 September 20 | 20 | Ha'Azinu<br>21 | 22 | Yom Kippur<br>Yom Kippur Mincha | Ha'Azinu<br>24 | 25 | Ha'Azinu<br>Vezot Haberacha Mincha | 13 Tishri 5776 |

Fig. 93

Readings for Temple Nu

| | Sunday | Monday | Tuesday | Wednesday | Thursday | Friday | Saturday | (Shabbat) |
|---|---|---|---|---|---|---|---|---|
| 2015 August 9 | 9 | Reeh<br>10 | 11 | 12 | Reeh<br>13 | 14 | Reeh (Rosh Chodesh)<br>Shoftim Mincha | 30 Av 5775 |
| 2015 August 16 | Rosh Chodesh<br>16 | Shoftim<br>17 | 18 | 19 | Shoftim<br>20 | 21 | Shoftim<br>Ki Teitzei Mincha | 7 Elul 5775 |
| 2015 August 23 | 23 | Ki Teitzei<br>24 | 25 | 26 | Ki Teitzei<br>27 | 28 | Ki Teitzei<br>Ki Tavo Mincha | 14 Elul 5775 |
| 2015 August 30 | 30 | Ki Tavo<br>31 | 1 | 2 | Ki Tavo<br>3 | 4 | Ki Tavo<br>Nitzavim Mincha | 21 Elul 5775 |
| 2015 September 6 | 6 | Nitzavim<br>7 | 8 | 9 | Nitzavim<br>10 | 11 | Nitzavim<br>Vayeilech Mincha | 28 Elul 5775 |
| 2015 September 13 | 13 | Rosh Hashana I<br>14 | Rosh Hashana II<br>15 | Tzom Gedaliah<br>Tzom Gedaliah Mincha | Vayeilech<br>17 | 18 | Vayeilech (Shabbat Shuva)<br>Ha Azinu Mincha | 6 Tishri 5776 |
| 2015 September 20 | 20 | Ha Azinu<br>21 | 22 | Yom Kippur<br>Yom Kippur Mincha | Ha Azinu<br>24 | 25 | Ha Azinu<br>Vezot Habracha Mincha | 13 Tishri 5776 |

Fig. 94

| Temple Nu | Saturday morning 15 August 2015 | | | |
|---|---|---|---|---|
| | Verses | Status | Reader | |
| Aliyah 1 | Deuteronomy 11:26 – 12:10 | Open | | Claim |
| Aliyah 2 | Deuteronomy 12:11 – 12:28 | Open | | Claim |
| Aliyah 3 | Deuteronomy 12:29 – 13:19 | Open | | Claim |
| Aliyah 4 | Deuteronomy 14:1 – 14:21 | Open | | Claim |
| Aliyah 5 | Deuteronomy 14:22 – 14:29 | Open | | Claim |
| Aliyah 6 | Deuteronomy 15:1 – 15:18 | Open | | Claim |
| Aliyah 7 | Deuteronomy 15:19 – 16:17 | Open | | Claim |
| Maftir | Numbers 28:9 – 28:15 | Pending | rhea | Withdraw |
| Haftorah | Isaiah 66:1 – 66:24 | Open | | Claim |

Fig. 96

11010
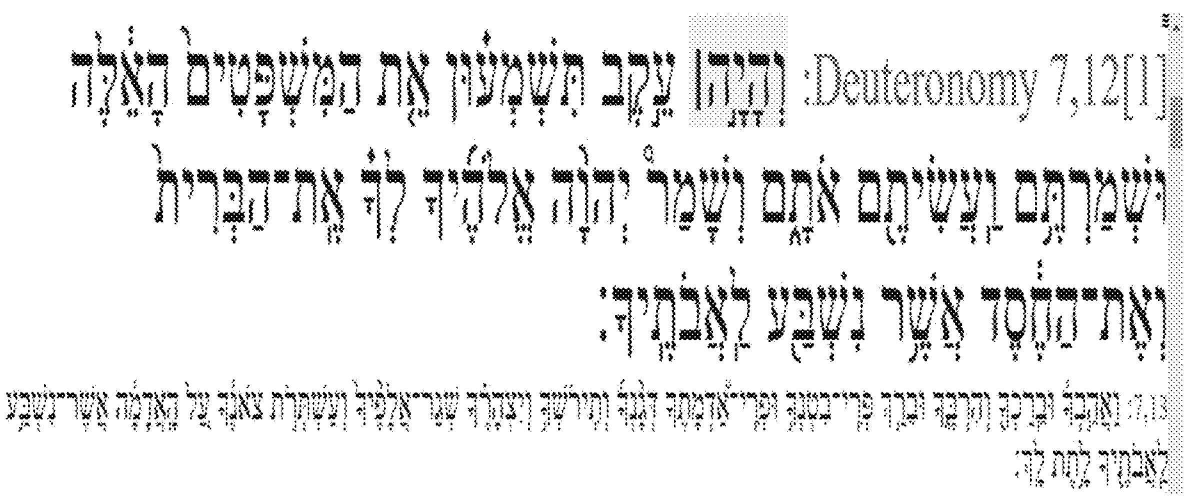
11020
Fig. 102

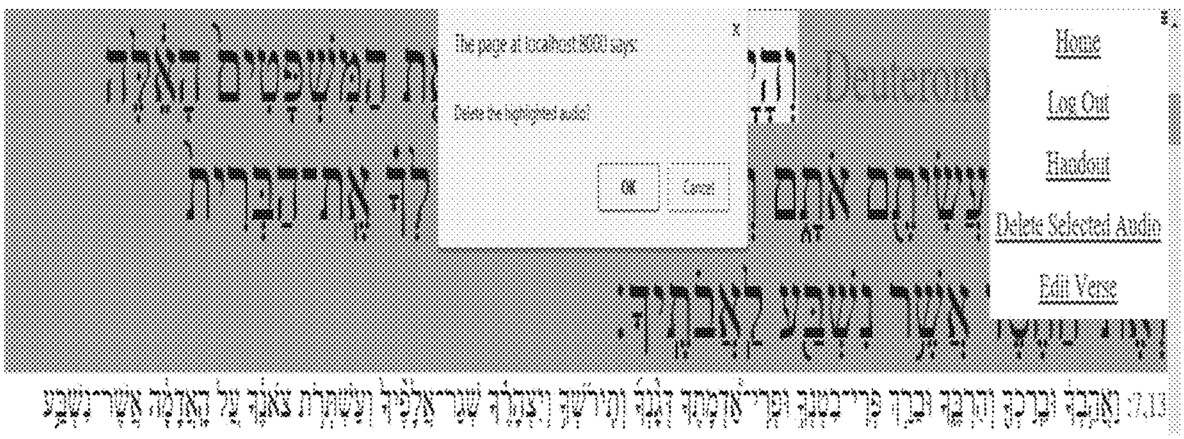
11210
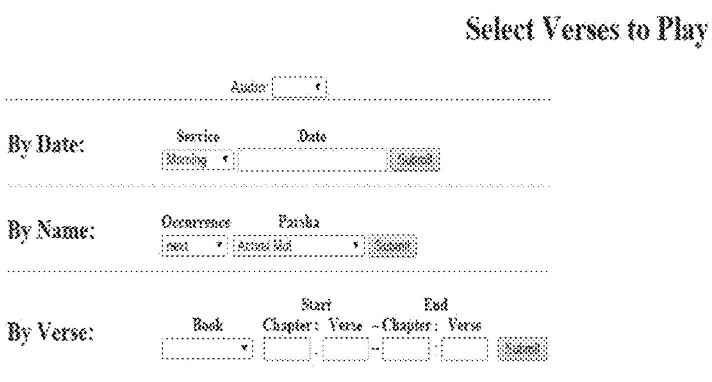
11220
Fig. 104

וְהָיָה ׀ עֵקֶב תִּשְׁמְעוּן אֵת הַמִּשְׁפָּטִים הָאֵלֶּה וּשְׁמַרְתֶּם וַעֲשִׂיתֶם אֹתָם
וְשָׁמַר יְהוָה אֱלֹהֶיךָ לְךָ אֶת־הַבְּרִית וְאֶת־הַחֶסֶד אֲשֶׁר נִשְׁבַּע לַאֲבֹתֶיךָ׃

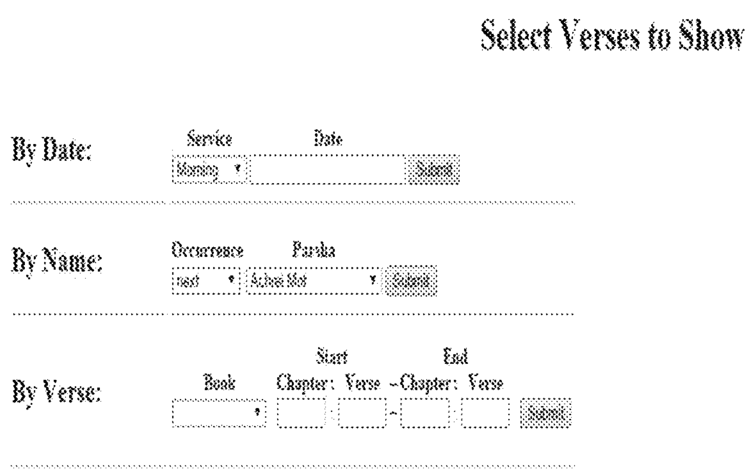
11410
11420
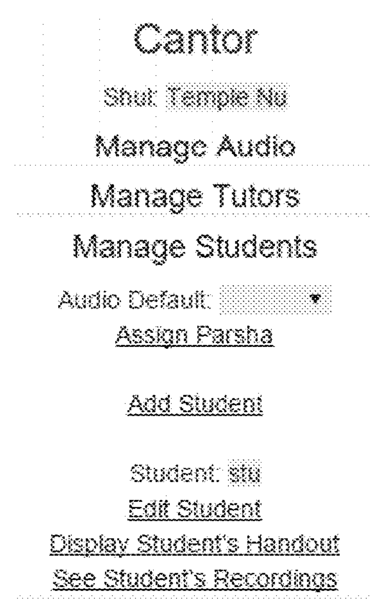
11430
Fig. 106

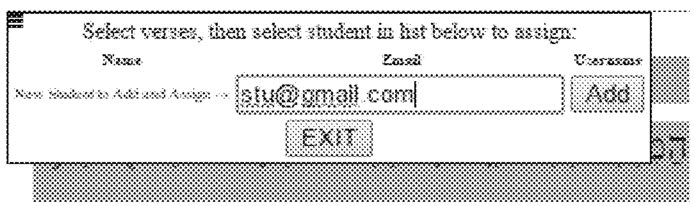
11910
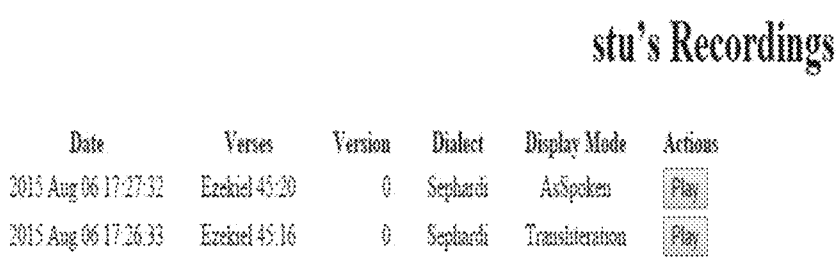
11920
Fig. 111

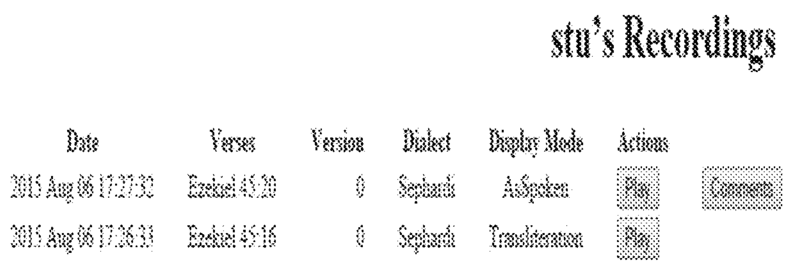
12210
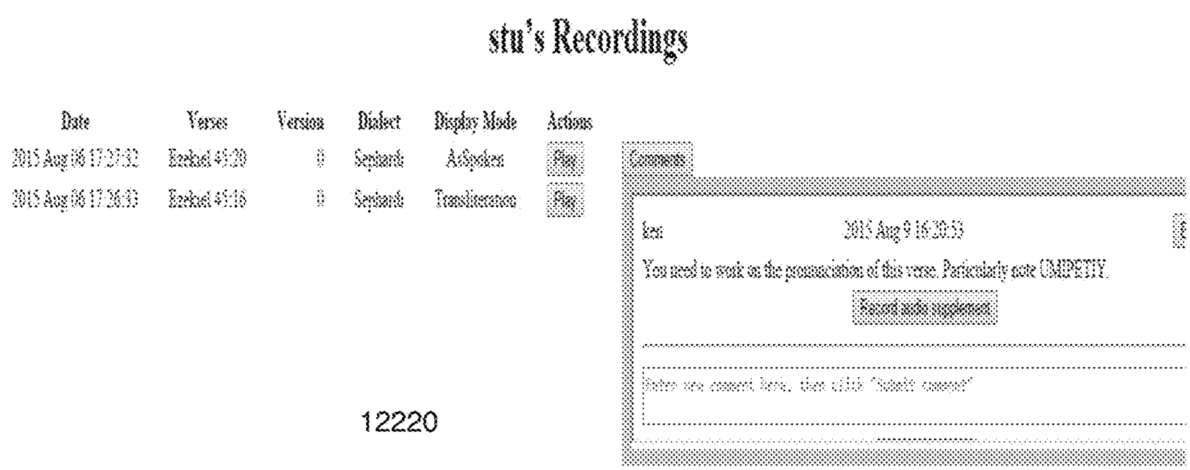
12220
Fig. 114

Tutor

Student: stu
Edit Student
Play Student's Verses
Display Student's Handout
See Student's Recordings

12310

Student

My Profile
Cantor: ken
See My Recordings
Record Verses
Play Verses
Display Handout

12320

Parent

Child: stu
Child's Profile
Play Child's Verses
Display Child's Handout
See Child's Recordings

12330

Gabbai

Shul: Temple Nu
Calendar
Manage Readers
Show Pending Readings
Show Open Readings
Show Claimed Readings

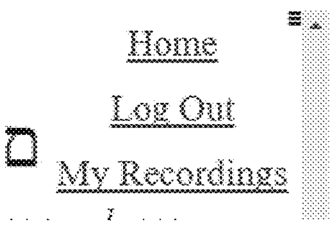
12410
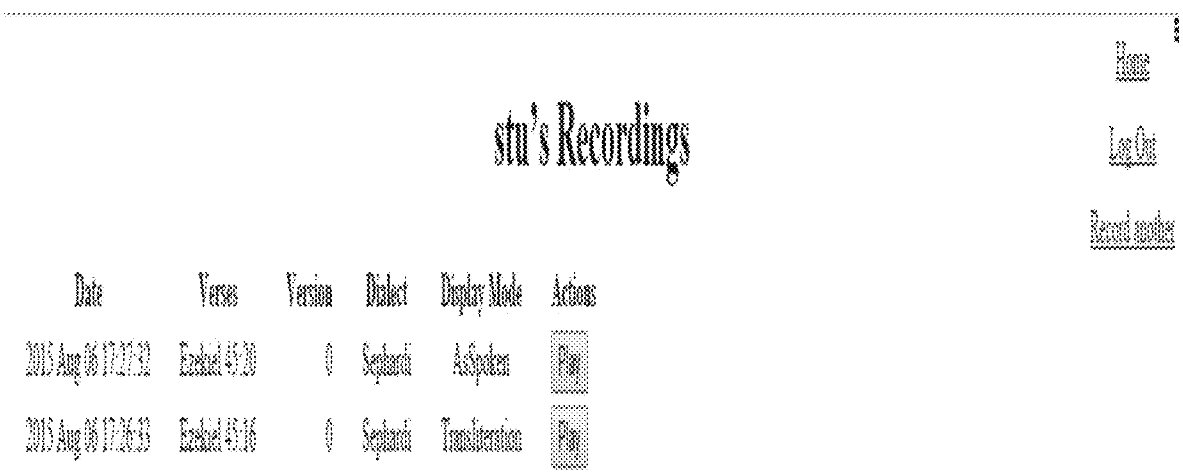
12420
Fig. 116

Readings for Temple Nu

| | Sunday | Monday | Tuesday | Wednesday | Thursday | Friday | Saturday | (Shabbat) |
|---|---|---|---|---|---|---|---|---|
| 2015 August 9 | 9 | Reeh<br>10 | 11 | 12 | Reeh<br>13 | 14 | Reeh (Rosh Chodesh)<br>Shoftim Mincha | 30 Av 5775 |
| 2015 August 16 | Rosh Chodesh<br>16 | Shoftim<br>17 | 18 | 19 | Shoftim<br>20 | 21 | Shoftim<br>Ki Teitzei Mincha | 7 Elul 5775 |
| 2015 August 23 | 23 | Ki Teitzei<br>24 | 25 | 26 | Ki Teitzei<br>27 | 28 | Ki Teitzei<br>Ki Tavo Mincha | 14 Elul 5775 |
| 2015 August 30 | 30 | Ki Tavo<br>31 | 1 | 2 | Ki Tavo<br>3 | 4 | Ki Tavo<br>Nitzavim Mincha | 21 Elul 5775 |
| 2015 September 6 | 6 | Nitzavim<br>7 | 8 | 9 | Nitzavim<br>10 | 11 | Nitzavim<br>Vayeilech Mincha | 28 Elul 5775 |
| 2015 September 13 | 13 | Rosh Hashana I<br>14 | Rosh Hashana II<br>15 | Tzom Gedaliah<br>Tzom Gedaliah Mincha | Vayeilech<br>17 | 18 | Vayeilech (Shabbat Shuva)<br>Ha Azinu Mincha | 6 Tishri 5776 |
| 2015 September 20 | 20 | Ha Azinu<br>21 | 22 | Yom Kippur<br>Yom Kippur Mincha | Ha Azinu<br>24 | 25 | Ha Azinu<br>Vezot Habracha Mincha | 13 Tishri 5776 |

Fig. 118

Fig. 119
Readings for Re'eh (Rosh Chodesh)
Temple Nu
Saturday morning 15 August 2015
Verses
Status
Reader
Open All
Aliyah 1
Deuteronomy 11:26 - 12:10
Pending
Open
Aliyah 2
Deuteronomy 12:11 - 12:28
Pending
Open
Aliyah 3
Deuteronomy 12:29 - 13:19
Pending
Open
Aliyah 4
Deuteronomy 14:1 - 14:21
Pending
Open
Aliyah 5
Deuteronomy 14:22 - 14:29
Pending
Open
Aliyah 6
Deuteronomy 15:1 - 15:18
Pending
Open
Aliyah 7
Deuteronomy 15:19 - 16:17
Pending
Open
Maftir
Numbers 28:9 - 28:15
Pending
Open
Haftarah
Isaiah 66:1 - 66:24
Pending
Open

Temple Nu Saturday morning 15 August 2015

| | Verses | Status | Reader | |
|---|---|---|---|---|
| Aliyah 1 | Deuteronomy 11:26 – 12:10 | Open | | Close |
| Aliyah 2 | Deuteronomy 12:11 – 12:28 | Open | | Close |
| Aliyah 3 | Deuteronomy 12:29 – 13:19 | Open | | Close |
| Aliyah 4 | Deuteronomy 14:1 – 14:21 | Open | | Close |
| Aliyah 5 | Deuteronomy 14:22 – 14:29 | Open | | Close |
| Aliyah 6 | Deuteronomy 15:1 – 15:18 | Open | | Close |
| Aliyah 7 | Deuteronomy 15:19 – 16:17 | Open | | Close |
| Maftir | Numbers 28:9 – 28:15 | Open | | Close |
| Haftorah | Isaiah 66:1 – 66:24 | Open | | Close |

Fig. 120

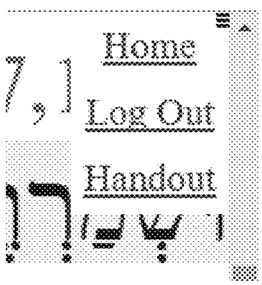
13410
13420
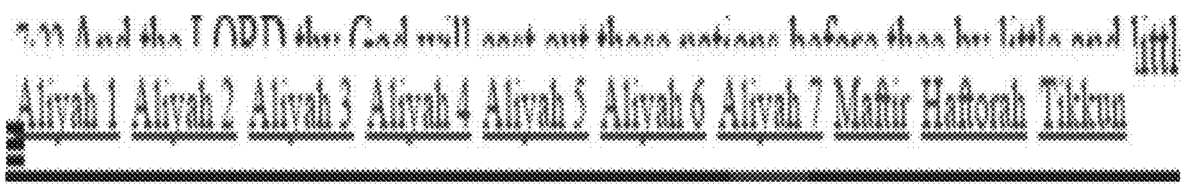
13430
Fig. 126

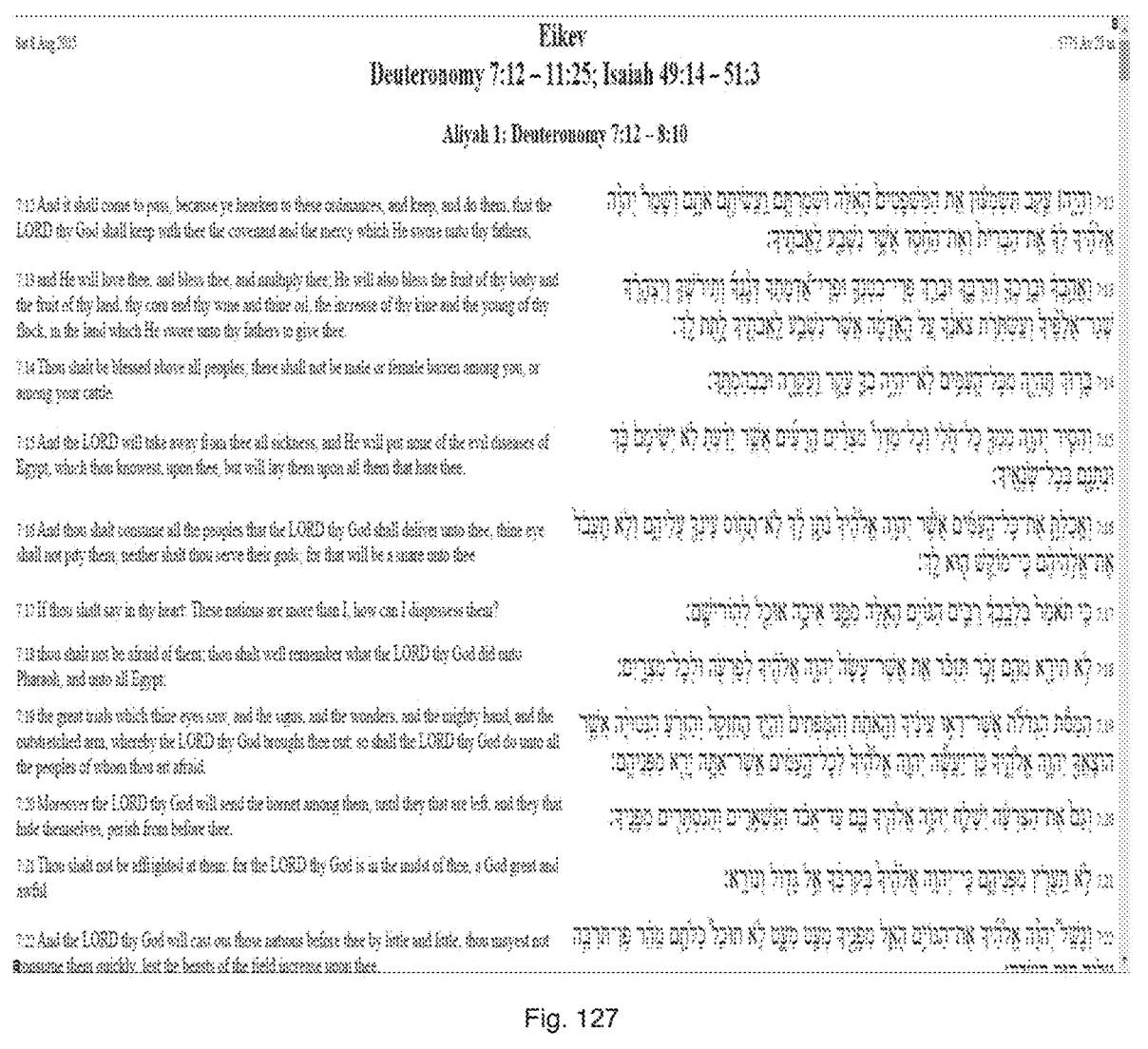

Sat 8 Aug 2015 | 5775 Av 23

Eikev

Deuteronomy 7:12 ~ 11:25; Isaiah 49:14 ~ 51:3

Aliyah 1: Deuteronomy 7:12 ~ 8:10

| | |
|---|---|
| 7:12 And it shall come to pass, because ye hearken to these ordinances, and keep, and do them, that the LORD thy God shall keep with thee the covenant and the mercy which He swore unto thy fathers, | והיה עקב תשמעון את המשפטים האלה ושמרתם ועשיתם אתם ושמר יהוה אלהיך לך את הברית ואת החסד אשר נשבע לאבתיך׃ |
| 7:13 and He will love thee, and bless thee, and multiply thee; He will also bless the fruit of thy body and the fruit of thy land, thy corn and thy wine and thine oil, the increase of thy kine and the young of thy flock, in the land which He swore unto thy fathers to give thee. | ואהבך וברכך והרבך וברך פרי בטנך ופרי אדמתך דגנך ותירשך ויצהרך שגר אלפיך ועשתרת צאנך על האדמה אשר נשבע לאבתיך לתת לך׃ |
| 7:14 Thou shalt be blessed above all peoples; there shall not be male or female barren among you, or among your cattle. | ברוך תהיה מכל העמים לא יהיה בך עקר ועקרה ובבהמתך׃ |
| 7:15 And the LORD will take away from thee all sickness, and He will put none of the evil diseases of Egypt, which thou knowest, upon thee, but will lay them upon all them that hate thee. | והסיר יהוה ממך כל חלי וכל מדוי מצרים הרעים אשר ידעת לא ישימם בך ונתנם בכל שנאיך׃ |
| 7:16 And thou shalt consume all the peoples that the LORD thy God shall deliver unto thee; thine eye shall not pity them; neither shalt thou serve their gods; for that will be a snare unto thee | ואכלת את כל העמים אשר יהוה אלהיך נתן לך לא תחוס עינך עליהם ולא תעבד את אלהיהם כי מוקש הוא לך׃ |
| 7:17 If thou shalt say in thy heart: These nations are more than I; how can I dispossess them? | כי תאמר בלבבך רבים הגוים האלה ממני איכה אוכל להורישם׃ |
| 7:18 thou shalt not be afraid of them; thou shalt well remember what the LORD thy God did unto Pharaoh, and unto all Egypt: | לא תירא מהם זכר תזכר את אשר עשה יהוה אלהיך לפרעה ולכל מצרים׃ |
| 7:19 the great trials which thine eyes saw, and the signs, and the wonders, and the mighty hand, and the outstretched arm, whereby the LORD thy God brought thee out; so shall the LORD thy God do unto all the peoples of whom thou art afraid. | המסת הגדלת אשר ראו עיניך והאתת והמפתים והיד החזקה והזרע הנטויה אשר הוצאך יהוה אלהיך כן יעשה יהוה אלהיך לכל העמים אשר אתה ירא מפניהם׃ |
| 7:20 Moreover the LORD thy God will send the hornet among them, until they that are left, and they that hide themselves, perish from before thee. | וגם את הצרעה ישלח יהוה אלהיך בם עד אבד הנשארים והנסתרים מפניך׃ |
| 7:21 Thou shalt not be affrighted at them; for the LORD thy God is in the midst of thee, a God great and awful. | לא תערץ מפניהם כי יהוה אלהיך בקרבך אל גדול ונורא׃ |
| 7:22 And the LORD thy God will cast out those nations before thee by little and little; thou mayest not consume them quickly, lest the beasts of the field increase upon thee. | ונשל יהוה אלהיך את הגוים האל מפניך מעט מעט לא תוכל כלתם מהר פן תרבה עליך חית השדה׃ |

Fig. 127

Fig. 130
Tazria (Shabbat HaChodesh, Rosh Chodesh) Aliyah1: Leviticus 12:1 - 13:5
Tazria (Shabbat HaChodesh, Rosh Chodesh) Aliyah2: Leviticus 13:6 - 13:17

METHODS AND SYSTEMS FOR REMOTE LANGUAGE LEARNING IN A PANDEMIC-AWARE WORLD

This application is a continuation-in-part of, and claims priority to, each of (a) U.S. Provisional App. Ser. No. 62/258,944, entitled "Methods and Systems for Display of Musical Notation for Teaching Classic Prosody with Neumes," and filed on Nov. 23, 2015, (b) U.S. Provisional App. Ser. No. 62/244,561, entitled "Methods and Systems for Educational Language Software," and filed on Oct. 21, 2015, (c) U.S. Provisional Patent Application Ser. No. 62/243,600, entitled "Methods and Systems for Teaching Ritual Song" and filed on Oct. 19, 2015, (d) U.S. Provisional App. Ser. No. 62/239,969, entitled "Methods and Systems for Educational Language Software" and filed on Oct. 11, 2015, (e) provisional App. Ser. No. 62/203,913, entitled "Systems and Methods for Learning Hebrew Language Chanting" and filed on Aug. 12, 2015, (f) provisional App. Ser. No. 62/054,733, entitled "Methods and Systems for Educational Language Software" filed on Sep. 24, 2014, (g) application Ser. No. 13/223,492, entitled "Methods and Systems for Language Learning based on a Series of Pitch Patterns" and filed on Sep. 1, 2011, and (h) U.S. provisional App. Ser. No. 61/448,142, entitled "Tools for teachers who teach Jewish Ritual Song such as for Bar Mitzvah or for Bat Mitzvah" and filed on Mar. 1, 2011. The contents of the aforementioned applications are incorporated herein by reference. The contents that are incorporated by reference into the aforementioned applications are incorporated herein by reference.

| Application Number | Continuity Type | Prior Application # | Filing Date |
|---|---|---|---|
| | Claims benefit of | 62/258,944 | 2015 Nov. 23 |
| | Claims benefit of | 62/244,561 | 2015 Oct. 21 |
| | Claims benefit of | 62/243,600 | 2015 Oct. 19 |
| | Claims benefit of | 62/239,969 | 2015 Oct. 11 |
| | Claims benefit of | 62/203,913 | 2015 Aug. 12 |
| | Claims benefit of | 62/054,733 | 2014 Sep. 24 |
| | Continuation in part of | 13/223,492 | 2011 Sep. 1 |
| | Claims benefit of | 61/448,142 | 2011 Mar. 1 |

BACKGROUND

The invention relates to computer technologies for language teaching and learning.

Learning a new language can be a lengthy and difficult process. Although language learning software exists to assist users in the learning of a new language, current language software is limited in some respects.

SUMMARY

According to exemplary embodiments, a pronunciation dictionary may be provided. The pronunciation dictionary may map a written (e.g., symbolic or textual, typically as spoken) representation of a word and/or a pitch pattern (e.g., cantillated) representation of the word to an oral (e.g., phonetic) representation. Another embodiment may map a written representation to a pitch pattern and/or oral representation.

Alternatively, the pronunciation dictionary may map a symbolic representation that includes a symbolic representation of a pitch pattern to a phonetic representation. Moreover, a verse dictionary can map from a verse number to a symbolic pitch pattern representation, which may or may not be cantillated, and/or a phonetic representation.

Based on the mapping in the dictionary, an audio input from a student may be analyzed to determine whether the student's audio input matches the expected oral and/or pitch pattern representations of the word.

The symbolic representation may be, for example, a transliteration, such as a masoretic transliteration. In some embodiments, the transliteration may be stored in a 7-bit ASCII cantillated transliteration file. The pronunciation dictionary may be for (in some embodiments) Hebrew.

The symbolic representation and the oral representation may be the same (e.g., the symbolic representation provides both the textual representation of the word and the phonetic representation).

The dictionary may be a rules-based dictionary. Accordingly, language lessons may proceed without the need for extensive training data and/or training processing resources.

According to some embodiments, words appearing on a screen may be visually distinguished (e.g., highlighted) in a sequence of a text. The highlighting may move between the words with the text scrolling smoothly and continuously in a manner that allows the highlighting to be easily followed by a student with a disability. The words may be highlighted according to a generalized forced alignment procedure that aligns (a) the symbolic representation of the words or a syllabic stress pattern or an oral (phonetic) representation or pitch pattern representation of the words with (b) a corresponding acoustic.

Various techniques for performing generalized forced alignment are disclosed herein. For example, forced alignment may be performed based on a phonetic analysis, based on an analysis of pitch patterns, and/or may involve breaking a large audio file into smaller audio files on a verse-by-verse basis. Forced alignment may also be performed by combinatorial optimization based on observed timings, relative or absolute, of cantillations to determine start or end times for a word or verse.

Furthermore, the present application describes capabilities related to learning and searching for tropes or cantillations. According to one embodiment, a user may enter a requested trope to be played, and the pronunciation dictionary may be searched for words, or phonemes or groups of phonemes exhibiting the requested trope. A concordance may be used to associate a word, or verse, of a dictionary entry with a plurality of one or more verses in which said word or said verse appears. According to one embodiment, a user may enter a requested trope family to be played and the pitch pattern dictionary may be searched for words, or groups of words exhibiting the requested pitch patterns.

An audio file containing the corresponding word, group of words, phonemes or groups of phonemes may be played at appropriate time (e.g., as determined by a forced alignment analysis) in order to play examples of the requested trope or trope family. Words corresponding to the one or more phonemes or one or more pitch patterns may be visually distinguished on a display device as the trope is played. According to some embodiments, tropes may be taught in a particular specified order.

Still further, exemplary embodiments may provide capabilities related to learning the Torah in preparation for a Bar or Bat Mitzvah.

Such capabilities may include, for example, the ability to automatically prepare customized lessons for each bar/bat mitzvah student and in accordance with the Hebrew calendar. This customization may involve calculating the current week's Torah or Haftorah reading, or the readings for any arbitrarily specified date, and playing selections of the appropriate reading for a user. The order of lessons and the times at which certain lessons occur may be determined based on one or more rules or by a student's cantor and/or a student's tutor.

In some circumstances, it may be particularly valuable, before assigning a bar/bat mitzvah portion to a student, to use a computer language instruction system to determine and practice each week's Torah reading in line with traditional chronological practice. For example, when a Jewish adult reads the Torah, including a student at his/her bar/bat mitzvah, it is ritual practice to have two Gabbaim who stand on either side of the Torah reader to correct mistakes of any Torah reader. A computer language instruction system may provide a Rabbi or Cantor with a Gabbai-like function that enables Rabbi or Cantor to be more confident when assigning Bar/Bat Mitzvah readings, because it performs complex calculations independently of that Cantor or Rabbi and can select audio recordings of verses whose rendition thereof will depend thereon.

In some embodiments, lessons may be conducted on-line. In further embodiments, audio representations used in the language learning process may be customized to use the voice of a particular teacher, such as the student's cantor or tutor.

One method comprises: receiving data representative of Hebrew language text cantillated with at least one trope family from a predetermined list of Hebrew Bible trope families, said Hebrew language text being of a Jewish liturgy type in accordance with a user selection of at least one of Torah, Haftorah, Hebrew Bible Scroll and Hebrew prayers; receiving data representative of exemplary verses of Hebrew language text corresponding to said at least one Hebrew Bible trope family of said Jewish liturgy type; receiving audio data corresponding to at least one verse of said exemplary verses of Hebrew language text, said received audio data representing at least one of (a) a chanting of said at least one Hebrew Bible verse and (b) a chanting of trope names of said at least one Hebrew Bible trope family; playing at least some of said received audio data, said played received audio data corresponding to said at least one Hebrew Bible trope family; providing for dynamic display of at least one of said at least one verse of said exemplary verse of Hebrew language text corresponding to said at least one Hebrew Bible trope family, said dynamic display including dynamic highlighting corresponding to said playing audio data; receiving at least one recording of a user chanting at least some of said dynamically displayed data; and receiving data indicative of correctness of said user chanting. Optionally the method can include situations wherein said data indicative of correctness of said user chanting is computer generated. Optionally, in some embodiments, the method may further comprise comparing at least one of said at least one recording of a user chanting at least some of said dynamically displayed data with at least one model chanting of said at least some of said dynamically displayed data. Optionally, in some embodiments, the method may further comprise sending to a user indicia of results of said comparison. Optionally, in some embodiments, the method may further comprise receiving from a user a selection of a Hebrew Bible trope family from a predetermined list of Hebrew Bible trope families.

Optionally, in some embodiments the method can include situations wherein at least one of said data representative of exemplary verses of Hebrew language text and said data representative of exemplary verses is received from a remote server. Optionally, further comprising providing for display of transliterated text corresponding to said Hebrew language text, where said displayed transliterated text includes a plurality of embedded trope symbols corresponding to said Hebrew language text. Optionally, wherein said dynamic display includes coloring in visually distinct colors at least one of individual trope symbols and trope families.

A system comprising: a first store comprising data representative of Hebrew language text cantillated with a first Hebrew Bible trope family from a predetermined list of Hebrew Bible trope families, said data corresponding to a user selection of at least one of Torah, Haftorah, Hebrew Bible Scroll, and Hebrew prayers; a second store comprising data representative of exemplary verses of Hebrew language text corresponding to said first Hebrew Bible trope family; a processor coupled to said first store and said second store, said processor receiving first audio data corresponding to at least one verse of said exemplary verses of Hebrew language text, said first received audio data representing a chanting of trope names of said first Hebrew Bible trope family; said processor further receiving second audio data corresponding to said at least one verse of said exemplary verses of Hebrew language text, said second received audio data representing a chanting of trope names of a non-overlapping second trope family; said processor further creating third audio data, said third audio data including said first audio data and said second audio data; a playing unit in communication with said processor that plays said third audio data; and a dynamic display of at least one of said at least one verse of said exemplary verse of Hebrew language text, said dynamic display in communication with said processor including dynamic highlighting corresponding to said playing third audio data; where said processor receives at least one recording of a user chanting at least some of said dynamically displayed data; and where said processor receives data indicative of correctness of said user chanting. Optionally, wherein said third audio data comprises both said first audio data and said second audio data, wherein said selection of said first Trope Family contains the most disjunctive trope in the said at least one verse and said first Trope Family has the most number of tropes for which a corresponding audio is available to the system. Optionally, wherein said third audio data comprises both said first audio data and said second audio data, wherein said selection of said second Trope Family contains the second most disjunctive trope in said at least one verse that does not correspond to said first Trope family, and said second Trope Family has the most number of tropes for which a corresponding audio is available to the system. Optionally, wherein said dynamic display further provides for display of transliterated text corresponding to said Hebrew language text, where said displayed transliterated text includes a plurality of embedded trope symbols corresponding to said Hebrew language text. Optionally, wherein said dynamic display includes coloring in visually distinct colors at least one of individual trope symbols and trope families.

A non-transitory computer-readable medium storing instructions that, when executed by a processor, cause the processor to: access data representative of transliterated Hebrew language text cantillated with at least one trope family from a predetermined list of Hebrew Bible trope families, said data corresponding to a user selection of at least one of Torah, Haftorah, Hebrew Bible Scroll, and prayers; access data representative of exemplary verses of cantillated transliterated Hebrew language text corresponding to said at least one Hebrew Bible trope family; access audio data corresponding to at least one verse of said exemplary verses of cantillated transliterated Hebrew language text, said received audio data representing at least one of a chanting of said at least one verse and a chanting of trope names of said at least one trope family; play at least some of said received audio data, said played received audio data corresponding to said at least one trope family; dynamically display at least one of said at least one verse of said exemplary verse of cantillated transliterated Hebrew language text corresponding to said at least one Hebrew Bible trope family, said dynamically display including dynamically highlighting text corresponding to said playing audio data; access at least one recording of a user chanting at least some of said cantillated transliterated Hebrew language text; and access data indicative of correctness of said user chanting. Optionally, wherein said dynamically display includes coloring individual trope symbols in visually distinct colors. Optionally, wherein said dynamically display includes coloring trope families in visually distinct colors. Optionally, wherein said dynamically display includes coloring individual trope symbols in the context of their trope families in visually distinct colors. Optionally, wherein said playing occurs in a user-selected musical key. Optionally, wherein said play occurs in a musical key different than the musical key of said received audio data. Optionally, wherein said received audio data was a product of a transposition to a different musical key.

Although examples will be described herein with respect to learning Hebrew and reading from the Torah or Haftorah or Writings, one of ordinary skill in the art will recognize that a computerized language instruction system is not limited to these applications. Rather, the computerized language instruction system may be applicable to non-tonal language learning in general (as the term "non-tonal language" is defined below), and in some embodiments the learning of non-tonal languages having cantillated aspects. The details of various examples of the system are set forth in the accompanying drawings and the description below. Other features, objects, and advantages of the system will be apparent from the description and drawings, and from the claims.

The above advantages and features are of representative embodiments only, and are presented only to assist in understanding the computerized language instruction system. It should be understood that they are not to be considered limitations on the invention as defined by the claims. Additional features and advantages of embodiments of the computerized language instruction system will become apparent in the following description, from the drawings, and from the claims.

DESCRIPTION OF THE DRAWINGS

FIG. 3B depicts an exemplary pronunciation dictionary based on the data structure of FIG. 3A.

FIGS. 3C-3G depict pseudocode in accordance with embodiments of the invention.

FIGS. 9A-9C depict pseudocode for converting dates between the Hebrew calendar and various other formats.

FIG. 9D depicts an example of lessons customized according to a specified chronology.

FIGS. 10A-10B depict exemplary interfaces for allowing a student to claim and record selected lessons.

FIGS. 13A, 13B depict a plurality of embodiments with exemplary mirror-cantillated masoretic transliterations of a Hebrew symbolic.

FIG. 14 depicts exemplary trope families for Trope and for Haftorah Trope.

FIG. 15 depicts a plurality of exemplary mirror-cantillated masoretic transliterations of a Hebrew symbolic. Style 1 depicts exemplary trope placement on the syllable. Style 2 depicts exemplary trope placement on the consonant.

FIG. 16 depicts a plurality of exemplary cantillated masoretic transliterations of a Hebrew symbolic. Style 3 depicts exemplary trope placement on the syllable. Style 4 depicts exemplary trope placement on the consonant.

FIG. 65 depicts exemplary embodiment(s) containing exemplary functions.

FIGS. 91-135 depict exemplary embodiment(s) containing exemplary explanations written to potential users of such embodiments. Many other embodiments are possible, these are exemplary.

DESCRIPTION

Figure 1:
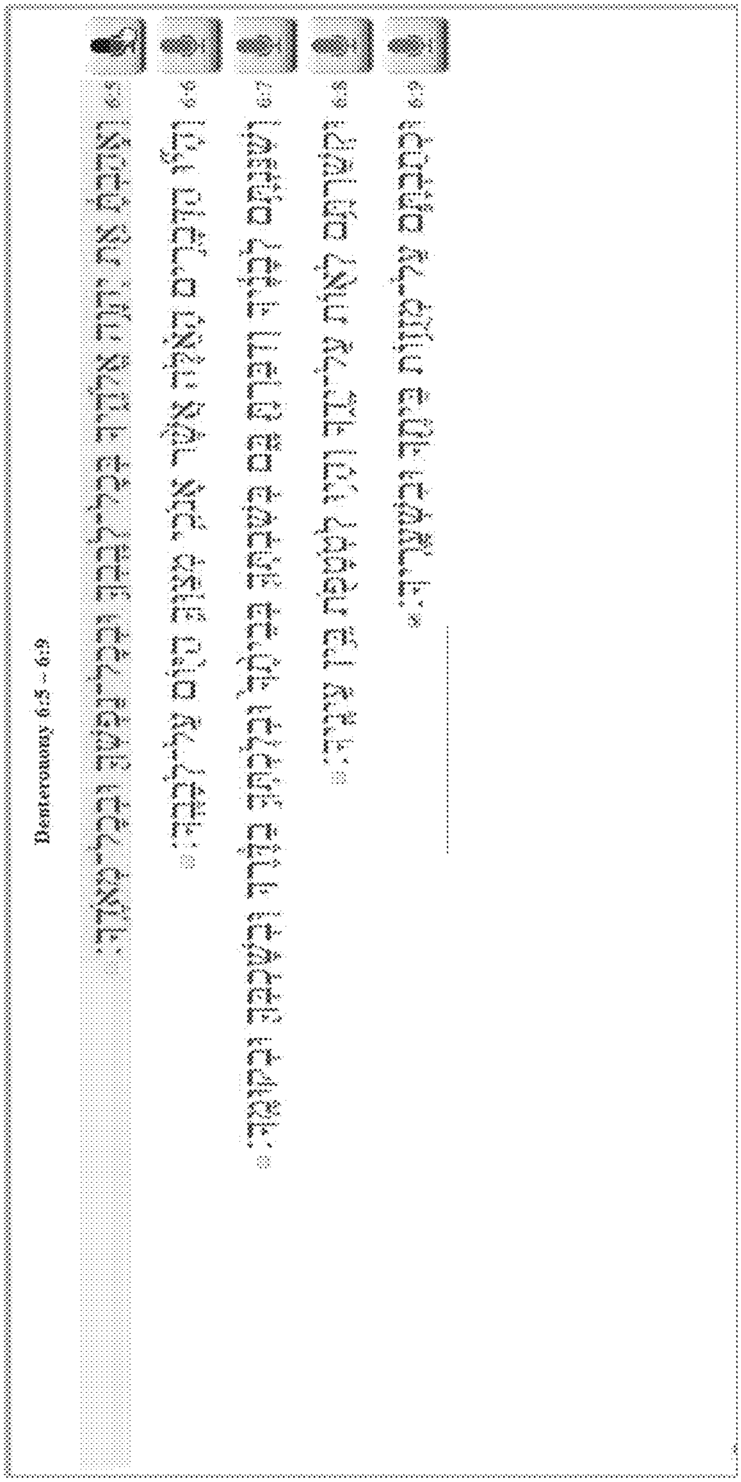
FIG. 1 depicts an example of an interface for recording a verse in a practice session.

An effective computerized language instruction system may be particularly useful for pitch-pattern symbolic languages (especially, but not limited to, Biblical Hebrew) and is well-suited to teaching languages to learners with disabilities or handicaps that may make it difficult for these students to effectively utilize conventional language-learning software.

Exemplary embodiments of this computerized language instruction system typically may comprise: (a) a combination of (i) a pitch-pattern notation symbolic representation of a vocalization, (ii) a transliteration symbolic representation of the vocalization, (iii) a sound representation of the vocalization.

Exemplary embodiments of this computerized language instruction system typically may comprise an at least one of: (a) transforming a transliteration symbolic representation, using an at least one css transform, (b) transform, using an at least one css selector, a transliteration symbolic representation, (c) transform, using an at least one HTML class attribute, a transliteration symbolic representation, (d) transforming, using an at least one HTML span tag, a transliteration symbolic representation, (e) enlarge an at least one pitch-pattern symbolic, using an at least one css property, (f) enlarge an at least one pitch-pattern symbolic, using an at least one css transform, (g) enlarge an at least one pitch-pattern symbolic, using an at least one css font property, (h) enlarge an at least one pitch-pattern symbolic, using an at least one css font-size property, OR (i) transforming, using an at least one css selector selected from a group of an at least one HTML inline element selected from the group of "b", "big", "i", "small", "tt", "abbr", "acronym", "cite", "code", "dfn", "em", "kbd", "strong", "samp", "var", "a", "bdo", "br", "img", "map", "object", "q", "script", "span", "sub", "sup", "button", "input", "label", "select", "textarea", an at least one pitch-pattern symbolic.

Exemplary embodiments of this computerized language instruction system typically may comprise an at least one of: (a) a computer-spliced chanting of an at least one pitch-pattern name corresponding to the pitch-pattern notation symbolic representation for a user-selected Jewish liturgical Hebrew Bible verse such as a Torah, Haftorah, or Five Scroll reading, (b) dynamic display of said transliteration symbolic representation, said dynamic display including dynamic highlighting corresponding to a computer-spliced chanting of an at least one pitch-pattern name, OR (c) a computer-spliced chanting of an at least one pitch-pattern family corresponding to the pitch-pattern notation symbolic representation.

Exemplary embodiments of this computerized language instruction system typically may comprise an at least one of: (a) a system for collection of emails of an at least one user with an affiliation to a house of worship by receiving a vocalization of a pitch-pattern symbolic, transmitting the vocalization to a second at least one user, (b) receiving an at least one email address of a user displaying an at least one communal calendar to the user based on indicia of membership in a community, (c) an at least one recording of a vocalization of an at least one symbolic representation, cantillated with an at least one trope family from a predetermined list of pitch-pattern families; displaying indicia of a holiness classification of the at least one recording into one of the group of Torah, Haftorah, scroll of Esther, book of Lamentations, three scrolls, (d) an at least one recording of a vocalization of an at least one symbolic representation; displaying indicia of a genre classification of the at least one recording into one of the group of Torah, Haftorah, Scrolls, Shabbat Prayers, Weekday Prayers, Festival Prayers, New Year's Prayers, Day of Atonement Prayers, Shabbat Songs, OR (e) receiving at least one recording of a vocalization of an at least one symbolic representation; sending the at least one recording of the symbolic representation to a remote server; providing a liturgical calendar; displaying a date which indicates a next occurrence in accordance with the liturgical calendar of the symbolic representation.

Exemplary embodiments of this computerized language instruction system typically may comprise elements such as an at least one of: (a) receiving an audio recording of a symbolic representation, cantillated with at least one trope family from a predetermined list of pitch-pattern families; (b) computing pronunciation correctness of the audio recording by evaluating at least one of the following correctness of: (b1) individual phonemes, (b2) cantillation placement, (b3) stress patterns, (b4) whether word meaning has been maintained, (b5) whether phrase or verse meaning has been maintained; (c) computing melody correctness of the audio recording by evaluating at least one of the following: (c1) whether the audio recording substantially reflects predicted symbolic cantillatations, (c2) whether cantillations are chanted with substantially appropriate disjunctive or conjunctive qualities, and (c3) whether cantillations are compliant with holiness and occasion classification; (d) computing performance correctness of the audio recording by evaluating at least one of the following: (d1) volume, (d2) projection, (d3) clarity, (d4) mechanical turk providing aesthetic feedback; (e) displaying indicia of correctness of at least one of following: (e1) pronunciation correctness; (e2) melody correctness; (e3) performance correctness.

Exemplary embodiments of this computerized language instruction system typically may comprise an at least one of: (a) transliteration that is more orthographically precise and arguably more pronounceable that existing transliterations created by ear, (b) transliteration that accounts precisely for masoretic interpretation, OR (c) transliteration that can vary based on ethnic background of a house of worship. Transliteration can be an important instruction assistance especially for children with special needs. Transliteration can typically provide a bridge for those who follow the Reform branch of Judaism or who are not affiliated with any Jewish Temple or synagogue. A more orthographically precise and Mesoretic traditional transliteration may typically provide a solid learning stepping stone for a learner who might have anxiety or low self-esteem to learn Hebrew without starting with the alphabet.

Exemplary embodiments of this computerized language instruction system typically may comprise an at least one of: (a) cantillated transliteration that superimposes Hebrew cantillation onto a transliteration, (b) cantillated transliteration that superimposes Hebrew cantillation onto a transliteration within a web browser, (c) cantillated transliteration that superimposes Hebrew cantillation onto a transliteration on a mobile device such as Android or IOS, (d) cantillated transliteration that superimposes Hebrew cantillation onto a transliteration wherein an at least one cantillation symbol is enlarged, (e) cantillated transliteration that superimposes Hebrew cantillation onto a transliteration wherein an at least one cantillation symbol is enlarged more along a horizontal axis than along a vertical axis, OR (f) cantillated transliteration that superimposes Hebrew cantillation onto a transliteration using tools available in a web-browser. By providing cantillation, a teacher typically may be able to teach a student how to vocalize Jewish ritual chant before teaching alphabetic orthography of a foreign script. Typically, cantillation represents an at least one musical intervals whereas Western Musical Notation may comprise an at least one note denoting absolute pitch and duration. By enlarging cantillation, it typically becomes more accessible to learners with visual limitations. Enlarging cantillation on transliteration optionally balances the increased size of the English letters as against Hebrew letters. Enlarging more along a horizontal axis optionally provides a larger visual cue while maintaining relative vertical proximity to an at least one transliterated symbolic.

Exemplary embodiments of this computerized language instruction system typically may comprise an at least one of: (a) mirror-cantillation that comprises cantillations that are flipped on a vertical axis, (b) mirror-cantillation that comprises cantillations that are transformed and flipped by software inside of a web browser, (c) mirror-cantillation that comprises a cantillation font which is a font wherein an at least one cantillation is flipped on its vertical axis, (e) mirror-cantillation rendered in a web-browser, (f) mirror-cantillation rendered on a transliteration in a web-browser, OR (g) mirror-cantillated transliteration that superimposes Hebrew cantillation onto a transliteration using tools available in a web-browser. Mirror cantillation enables teaching and learning for children with special needs. Mirror cantillation on a transliteration can be more faithful to original text than non-mirrored cantillated transliteration. Thus, a more faithful orthography typically may combine with a more conceptually faithful rendering of cantillation to yield a more faithful computerized language instruction system.

Exemplary embodiments of this computerized language instruction system typically may comprise an at least one of: (a) more accurate and less error-prone and more consistent transliteration as transliteration by hand may introduce time and transliterator-dependent variances, OR (b) more accurate and less error-prone and more consistent mirror cantillation as mirror-cantillation by a professional cantor can be disorienting and error prone-like providing a signature by a right-handed person with a left hand; especially because a mirror image of some cantillation already exists in any cantillation font, such as merkha can be a mirror image of tipkha.

Exemplary embodiments of this computerized language instruction system typically may comprise an at least one of: (a) teaching of an oral tradition by capturing the audio on a computer medium, providing an instructor-empowering intermediary for learners to connect with ancient traditions through innovations embodied in modern technology.

The Description is organized as follows.

I. Overview
II. Vocabulary/Dictionary
III. Verse Dictionary
IV. Audio/Text Playback
V. Forced Alignment and Word Highlighting
VI. Tropes
VII. Teaching Process
VIII. Sequence of Lessons
IX. Disjunctive Tropes
X. Embodiments Displaying Using CSS
X.A. Inline elements:
X.B. Block elements:
X.C. Inline-block elements:
X.D. Inline Elements
X.E. Block-level Elements
X.F. Inline Elements
XI. Torah Trope: Intonation Patterns, Prosody and Punctuation of Hebrew Bible
XI.A. Torah Trope may be natural cadences of speech
XI.B. Torah Trope do not represent absolute pitches
XI.C. Disjunctives and conjunctives
XII. Definitions and Explanations: Phonetics
XIII Overview of the System
XIV. Computer-Related Embodiments
XV. Definitions
XVI. Computer implementation

I. Overview

For example, one such principle is that language learners, particularly those with learning disabilities or handicaps, learn best from a teacher with whom they have experience or a personal relationship. Such learners may find it difficult to interact with a computer-generated voice or the prerecorded voice of a stranger. Learning from a particular teacher, and especially hearing the teacher pronounce words in a way familiar to the community of the student (e.g., in the case of learning Biblical Hebrew, the community of the student may be a particular synagogue or sect), may allow the student to better imitate the teacher's intonation (which is particularly helpful for students with Asperger's Syndrome) and pronunciation pattern, and may allow the teacher to adjust the lesson in the case of ambiguous situations.

Furthermore, languages (such as Biblical Hebrew) are often learned in cultural contexts where the learning of the language allows the student to build ties to the cultural community. By encouraging the student to interact with a particular teacher, the building of those ties may be facilitated, adding to the student's sense of community, and to the actual building of community. Thus, language learning can be leveraged to build a relationship with a teacher/mentor, which may encourage the student to acquire behavioral aspects of the teacher/mentor's cultural, religious, and life practices outside the classroom.

Several aspects of exemplary embodiments (both singly and taken together) may allow the exemplary embodiments to match a language learner with their preferred teacher. For instance, exemplary embodiments may employ a rules-based dictionary for representing words in the target language (and/or in a work of the target language). In one embodiment, the rules-based dictionary may include a phoneme-by-phoneme representation of words and/or phrases.

Accordingly, audible inputs may be more easily matched to the representations in the dictionary, and may therefore be processed using a set of rules specific to the language in question. This facilitates the use of the language learning system when multiple different users are providing inputs. Conventional systems that perform voice recognition typically do so without the benefit of a rules-based dictionary. Problematically, this can cause the language learning software to require becoming trained for a particular voice. It may therefore be difficult to use the language learning software with multiple teachers, particularly if the different teachers are providing inputs that students are expected to mimic. Another advantage of using rules-based dictionaries is that the language teacher or learner can often interact with the system without supplying any training data.

It is noted that, although the use of training data may be reduced or eliminated in certain aspects of the computerized language instruction system, other aspects (such as certain limited examples in which forced alignment is carried out) may make use of training data. Nonetheless, except as disclosed herein, the use of training data can generally be reduced or minimized using the rules-based dictionaries described below.

The use of a rules-based dictionary may also provide cultural advantages. For example, in the case of Biblical Hebrew, the chanted words may be well-defined by centuries of tradition, thus facilitating the use of a rules-based system. By using a rules-based system, the dictionary can be quickly and easily adapted to diverse communities (because the system does not need to be supplied with a great deal of training data, as conventional systems may).

In addition to employing rules-based dictionaries, the language learning environment may be set up as in a networked manner, such that some aspects of the language learning environment are processed by a server and some aspects are processed by a client. This facilitates uploading new audible input files, which makes the system extensible with additional teachers. Still further, the system recognizes input representations in multiple different formats, which allows (e.g.) different teachers having different ways of referencing parts of a work (such as verses in the Bible) to interact with the system.

Moreover, the use of a client/server arrangement facilitates parental engagement in the student's learning by (for example) providing a portal with updates and reports for parents. This may have the further advantage that parents may be intrigued enough to start learning the material and increasing the parent's commitment to the culture being studied by the student.

Another principle is that language learners, particularly those with special needs, exhibit better understanding and retention when they experience the language in several modalities at once. The different modalities might include oral, visual, and aural modalities. For example, a student may experience improved learning if the student sees words represented on a screen (visual modality), and sees those words highlighted as the student reads the words aloud (oral modality).

For instance, FIG. 1 depicts an exemplary interface in which a user can record specific verses for later playback and/or to test their reading abilities. As shown in FIG. 1, the verse in question (or words within the verse, or phonemes within words) may be highlighted as the user reads. In another example, the student might see the words (visual modality) and hear the words read by a teacher (aural modality) as the words are highlighted.

This may be particularly advantageous in connection with certain cultures that have a long oral tradition (such as Judaism). In such cultures, the written text may have meaning only (or at least partly) in the context of the oral representation of the text. For example, when learning from a written text, Jewish young adults who do not learn directly from a teacher may at times mispronounce words or misintonate words. Correcting these mispronunciations or mistakes in intonation (which could be avoided by having heard those words chanted) is a religious imperative because chanting the Torah incorrectly can change the meaning of a word or phrase and because it is a religious requirement to correct such chanting or reading that would result in incorrect meaning.

In order to provide the capability of experiencing the language in several modalities at once, exemplary embodiments provide techniques for performing a forced alignment of different modalities. For example, the highlighting of displayed words may be aligned with timings of the words as they are read in an audio file or received from an audio input device.

Accurate forced alignment may be particularly important when learning Biblical Hebrew, since the written and oral representations are considered to be two facets of a single representation of the Torah. It is not only important to pronounce and chant words correctly, but to learn meaning from other aspects of the oral representation, such as intonation, transitions, emphasis, hesitations, changes in volume, and underlying intention.

Yet another principle is that some students (especially students with certain learning disabilities) learn best when given many examples having a feature in common, or when provided with several ways to visualize information.

Accordingly, exemplary embodiments may store information in a way that is particularly conducive to identifying common patterns. For instance, in some embodiments a word's phonetization may be stored in an input file along with an identification of the word's trope or pitch pattern. Therefore, a student can be provided with many examples of a particular trope or pitch pattern by searching for the trope or pattern in the input file, identifying the corresponding phonetization, and playing an audio file including the phonetization while highlighting a displayed representation of the phonetization.

In addition to the language learning benefit of providing multiple examples, there may be a cultural benefit as well. For example, particularly in the case of Biblical Hebrew, there may be a preference for received, rather than synthesized, learning. By providing many examples, the student can observe and learn more accurately the tradition of his or her teachers. In certain cultures such as Judaism, this traditional learning without deviation is considered to be an important part of the learning experience. This may be contrasted with 20th century first-world language learning, where the emphasis may be on the student's ability to learn basic words and sentence-formation rules and then synthesize new sentences with novel meanings without the need to have heard those sentences before. Examples of other cultures with a strong oral tradition may include the Yoruba of Nigeria and some Hindu practices in India.

Another way of implementing this principle is by presenting the same information in different formats in order to allow the student to gradually become accustomed with less and less familiar representations, or to check their work in a more familiar representation. In the context of Biblical Hebrew, this may assist the student in learning to chant in front of the congregation. There are different liturgical ways that a symbolic representation may be presented during ritual chanting in front of a congregation; however, preserving the accuracy of the oral presentation requires the study of cantillated and/or voweled text. Some congregations focus student learning on the symbolic representation, whereas others consider a better mode to be learning the pronunciation from the oral representation. The presently-described system allows for both methods, thus allowing language learners to learn based on the teaching methods of a particular synagogue and enforcing respect for the synagogue's customs.

Figure 2:
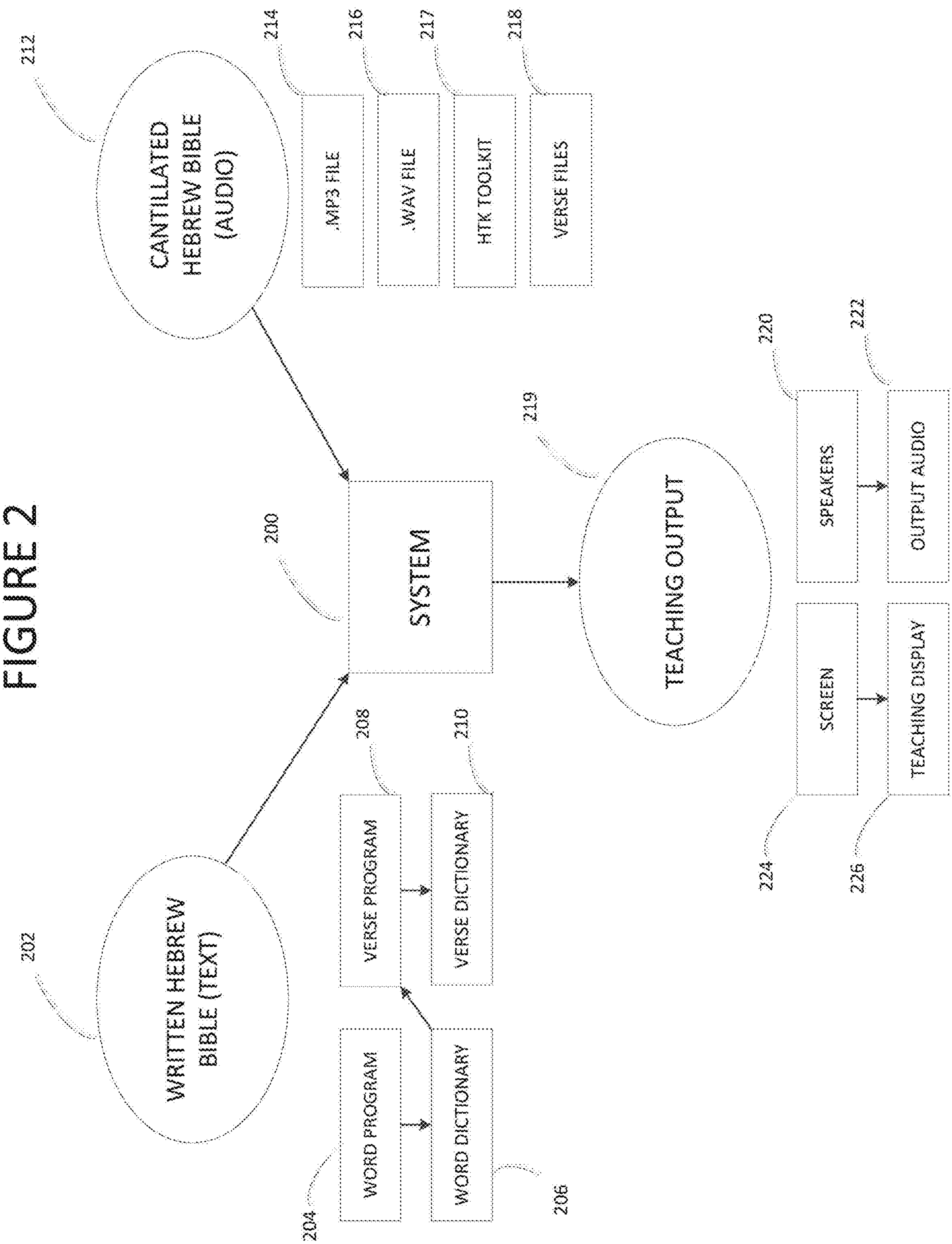
FIG. 2 is a block diagram showing an example overview of the system.
Figure 2A:
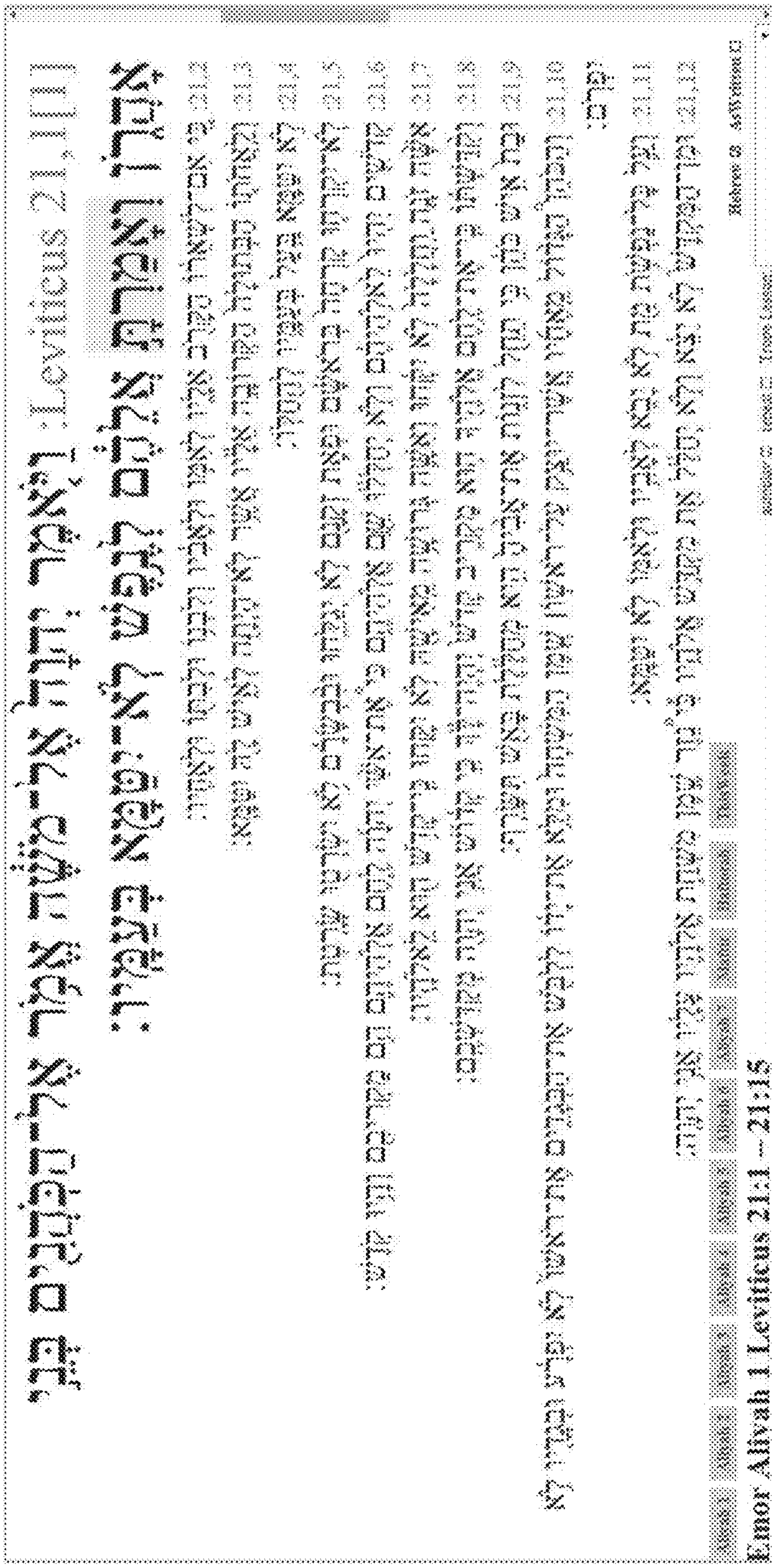
FIGS. 2A-2E depict exemplary displays of symbolic representations of units of expression.
Figure 2B:
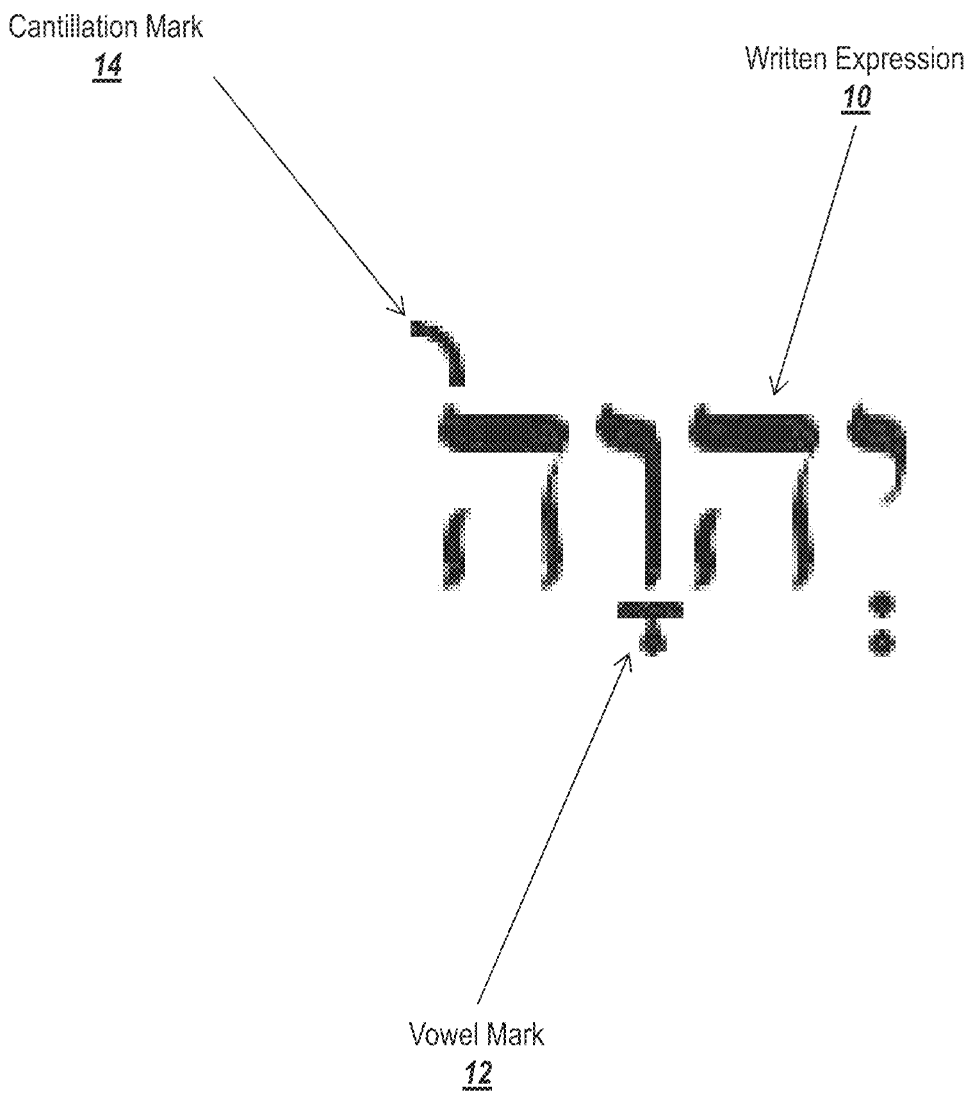

For example, FIG. 2A depicts a Biblical verse displayed in as-spoken Hebrew. As shown in FIG. 2B, the symbols displayed may include a written expression 10 of a word or phoneme, zero or more cantillation marks 12 designating a pitch pattern to be applied to one or more phonemes, and zero or more vowel marks 14 designating vowels applied to the word, syllable, consonant or phoneme. A vowel, in this context, typically represents a change in the pronunciation of the word or consonant or syllable or phoneme to which the vowel is applied.

Figure 2C:
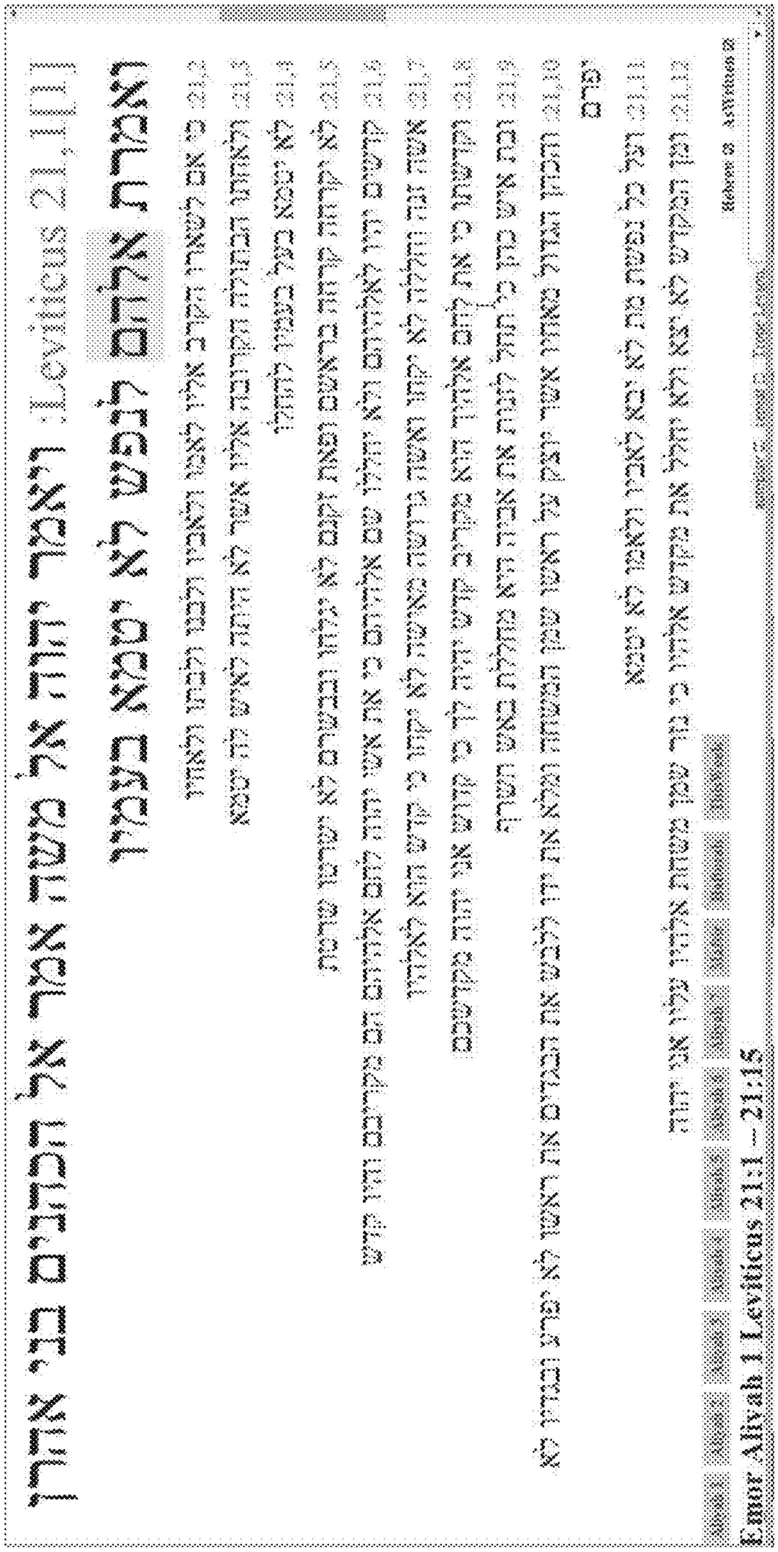

A user may eventually be required to understand each aspect of the representation shown in FIGS. 2A-2B. However, when the user begins learning the language, these representations may be complicated or confusing to the user. By presenting many different ways to visualize the text, the user's understanding of the language may be improved. For example, a simplified version in which the as-spoken of FIG. 2A is displayed in written Hebrew is depicted in FIG. 2C. By removing the cantillation marks and vowels from the written expression (referred to as "Tikkun graphics"), the display may be simplified and the user may be able to concentrate on better learn the symbolic representation of the words. Moreover, in Judaism it is typically mandated that the Torah be read from a scroll without vowels or cantillation. The use of Tikkun graphics makes it easier for the learner to practice on a text that more clearly resembles that of the target text that will be read in front of the congregation.

Figure 2D:
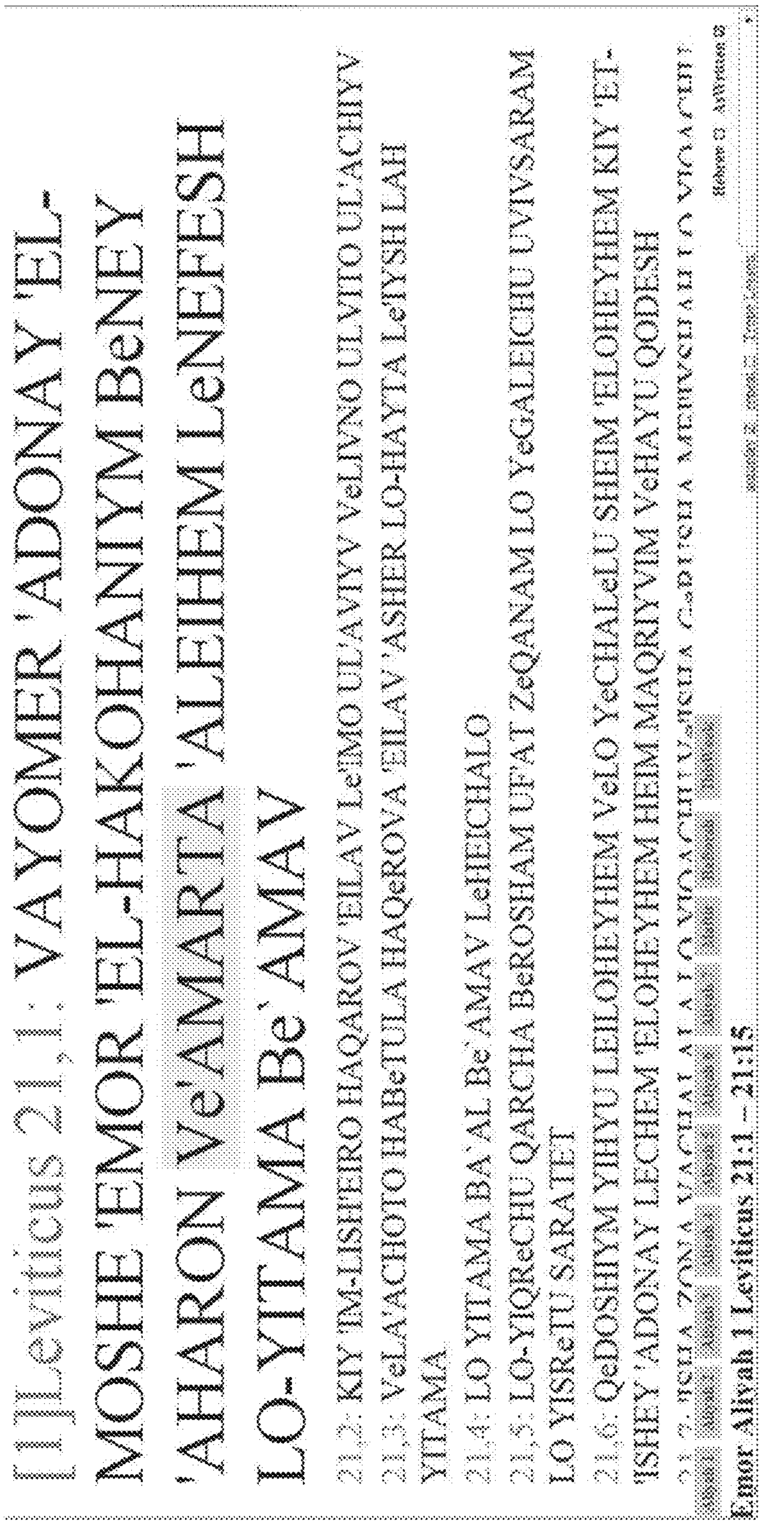

However, because the student may initially be unfamiliar with written Hebrew, the student may also be provided with an option for switching this display into an English transliteration, as shown in FIG. 2D. This more familiar format may (for example) allow the user to better internalize the phonetization of words. Another embodiment is mirror cantillated transliteration text shown in FIG. 15, and another embodiment is cantillated transliteration shown in FIG. 16.

Other mirror cantillated transliteration embodiments are shown in FIG. 13A and FIG. 13B.

Figure 2E:
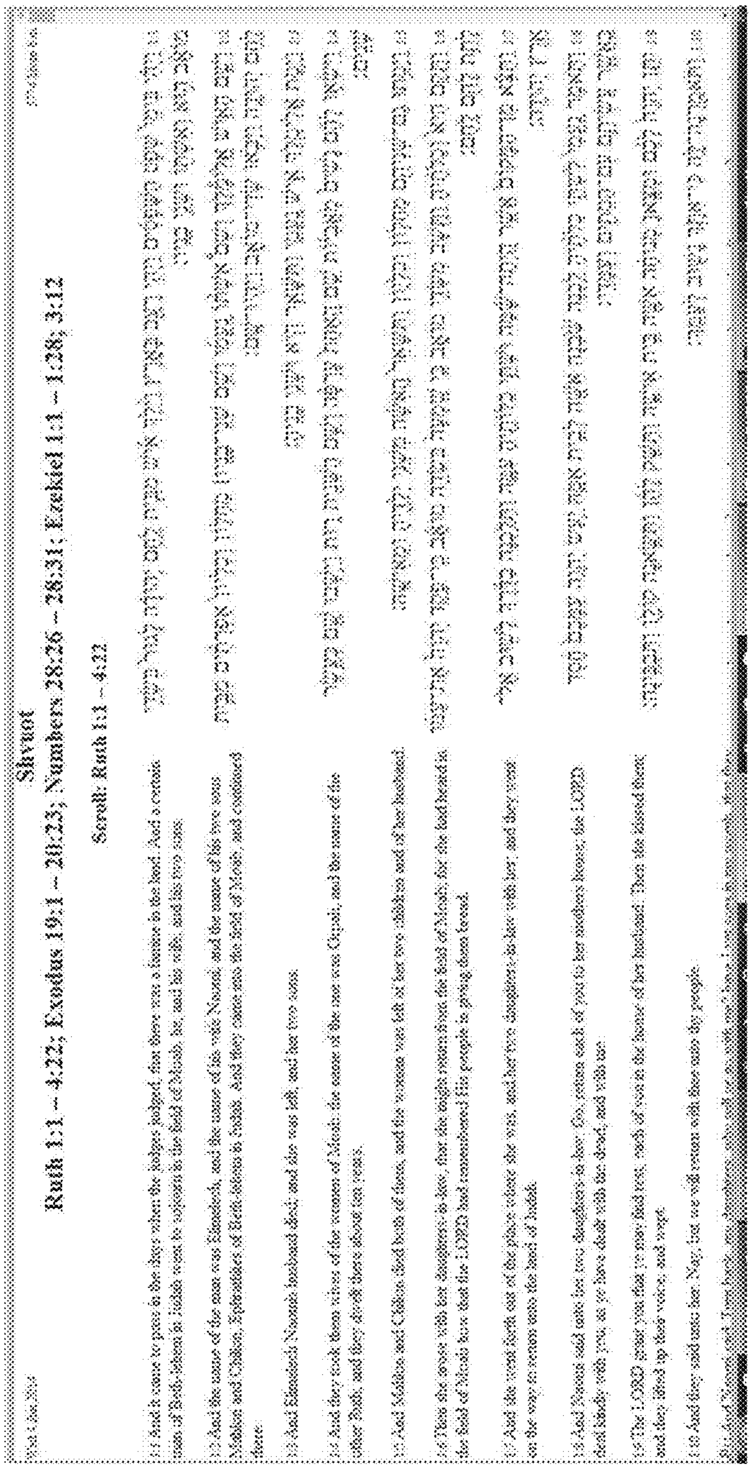

Alternatively or in addition, the user may be given the option of displaying the written Hebrew and an English translation side-by-side, as shown in FIG. 2E.

In the context of Biblical Hebrew, reading Torah with chanting is a defining aspect of Jewish adulthood. Many cantors believe that congregants should be able to pick up any symbolic representation and be capable of chanting the text based entirely on the symbolic. Thus, teaching cantillation examples with and without vowels and cantillation can build what many view as life skill.

Yet another principle is that the language learning system should present information to the students in such a manner that the student is able to process the information without difficulty. In addition to the clear benefits of improved learning, this also helps to build the student/teacher (and, in turn, the student/community) relationship because the teacher works with, rather than against, a student's unique learning methods. One technique for achieving this principle is the application of a procedure referred to herein as smooth scrolling.

Smooth scrolling means that changes to the words (e.g., when certain words are being emphasized, as by highlighting or changing the size of the words) or groups of words are not performed abruptly. Smooth scrolling also means that dependent changes (where a change to one word causes a change in another word) should be reduced or eliminated in some contexts. For example, increasing the size of a word should not cause other words to fall off the line, and vice versa.

This may entail providing an overlap time between times when words change highlighting or colors in order to prevent the change from being too abrupt, fading in and out for highlighting or color changes, increasing or decreasing the size of emphasized words continuously rather than discretely, and holding the position of words and/or lines of text constant or within a predefined tolerance as words sizes are changed, so that the words do not appear to "jump" on the screen.

Yet another principle is that the language learning system should work efficiently in the context in which the language is employed. For example, biblical Hebrew may employ masoretic translations/transliterations. The term "masoretic" refers to portions of a language (e.g., words or parts of words) which have an accepted pronunciation or meaning that is defined by religious law or cultural consensus or tradition. These masoretic portions of the language may have pronunciations or meanings that differ from the pronunciations or meanings which are delineated by what would appear to be the literal pronunciation or meaning in the language. The masoretic portions of the language may therefore override the literal pronunciation or meaning, for example when the language is employed in the context of a particular work (e.g., the Hebrew Bible).

By employing a rules-based system, as described above, masoretic translations/transliterations can be more efficiently processed. For example, a rule can be defined to accomplish masoretic translation/transliteration and applied only when applicable. In contrast, a conventional machine-learning based system might need to apply a filter to every transliterated word to determine if the word has a masoretic translation/transliteration that differs from the conventional translation/transliteration of the word. This may result in decreased processing speed or efficiency.

Moreover, particularly (though not solely) in the case of biblical Hebrew, the context in which the language is learned may be tied to cultural norms that affect the language learning experience. For instance, biblical Hebrew is often learned by a student in preparation for their Bar or Bat Mitzvah. Specific Bible readings may be assigned to, or associated with, particular dates in the Hebrew calendar, which does not directly correspond to the Gregorian calendar. The tools provided by exemplary embodiments therefore may account for these cultural norms and may include features (such as associating readings with particular dates that are converted from one calendar form to another) that assist the language learner in navigating the cultural or contextual landscape that may be involved in the language learning experience.

Exemplary components for implementing the above-described principles are next described.

II. Vocabulary/Dictionary

Exemplary embodiments may make use of a pronunciation dictionary. The pronunciation dictionary may be a collection of units of expression as used in a particular language or work (for example, the Hebrew Bible). The collection of units of expression in the pronunciation dictionary may, collectively, represent a pronunciation guide for the entire work or a portion of the work.

Figure 3A:
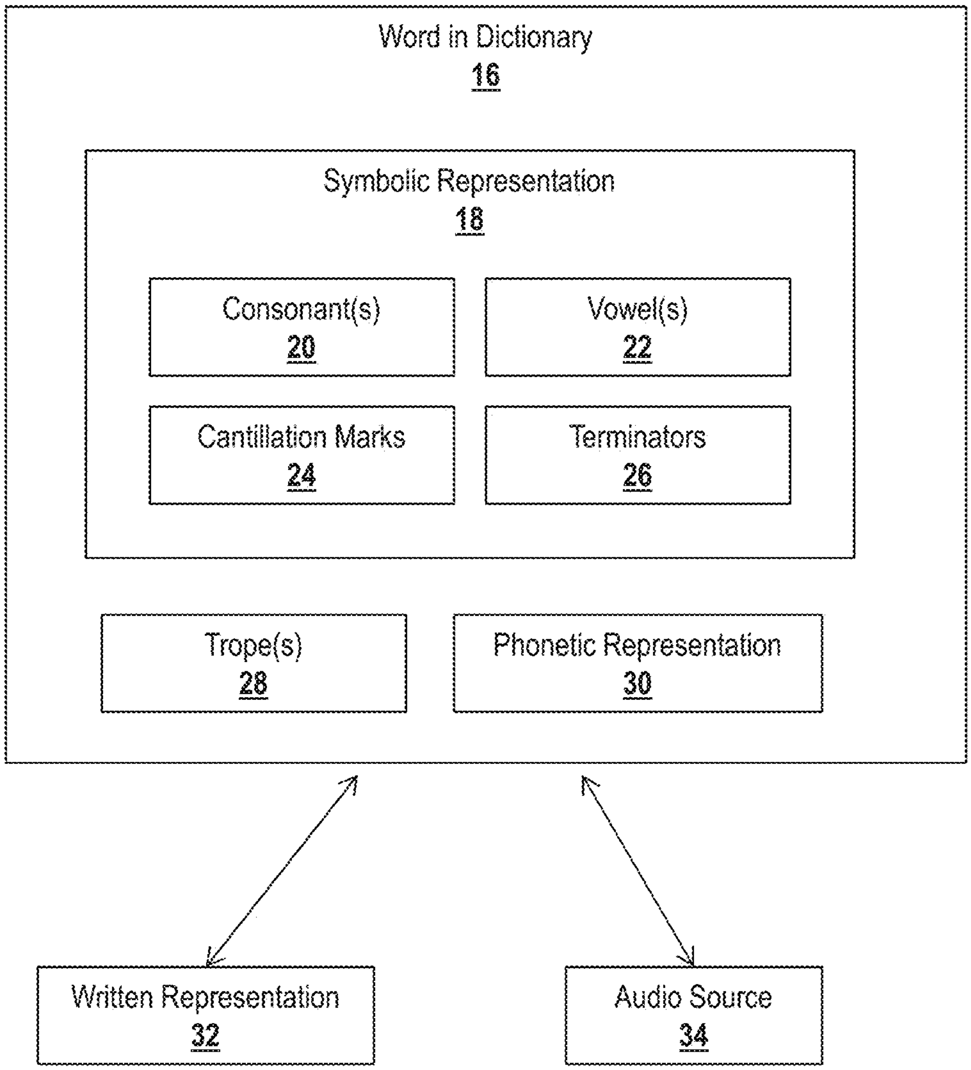
FIG. 3A depicts an example of a data structure for storing a word.

An exemplary data structure for a unit of expression in the pronunciation dictionary is depicted in FIG. 3A. For ease of discussion, FIG. 3A depicts a data structure where the unit of expression represents a word. However, one of ordinary skill in the art will understand that the computerized language instruction system is not limited to units of expression represented as words.

A word in the dictionary 16 may include a symbolic representation 18, a trope 28, and a phonetic representation 30.

The symbolic representation 18 may be a symbolic identifier of the word. The symbolic representation 18 may include consonants 20, vowels 22, cantillation marks 24, and terminators 26, among other possibilities. Examples of consonants 20, vowels 22, cantillation marks 24, and terminators 26 in the context of Biblical Hebrew are depicted below in Tables 1-5.

The trope 28 of the word in the dictionary 16 may represent a pitch pattern representation or pitch contour representation associated with the word in the dictionary 16. The pitch pattern or pitch contour may be identified symbolically (such as by a symbolically-represented name). For example, the trope 28 may be identified by a name or other identifier of the trope 28, and may optionally describe a family of the trope 28. A trope family is a collection of tropes that are often used together and which may be taught in conjunction with each other.

The trope 28 of the word in the dictionary 16 may further include a description of the pitches used in the trope. For example, a contour representing changes in the pitch over time may be presented so that pattern of the trope 28 may be distinguished from other trope patterns. Alternatively or in addition, a normalized audio representation of the trope 28 may be provided. Alternatively or in addition, a canonical or normalized symbolic representation of the trope (e.g., using musical notation) may be provided.

The phonetic representation 30 may include a list of phonemes that represent a correct pronunciation of the word in the dictionary 16. In this context, the term "correct" may mean that the pronunciation is the same as the expected pronunciation and/or that the pronunciation does not change the meaning of the word in the dictionary 16 to another word and/or that the pronunciation does not change the meaning of the verse or sentence containing the word. Thus, an unexpected pronunciation may nonetheless be “correct” so long as it does not change the meaning of the word. The use of a trope different than the expected trope 28 may likewise be associated with “correctness” in that an unexpected trope may be acceptable so long as the unexpected trope does not change the meaning of the word in the dictionary 16 and/or that the cantillation does not change the meaning of the verse or sentence containing the word.

The word in the dictionary 16 may optionally be associated with a written representation 32, and an acoustic representation 34. The written representation 32 may include a representation of the word for display on a display device. For example, the written representation 32 may include an image of the word, such as the image shown in FIG. 2B. The use of a separate written representation 32 may allow the word to be displayed on a display device or browser that may not support language functionality in the target language (for example, if the target language is Biblical Hebrew and the user's web browser does not provide a suitable character set for Biblical Hebrew (particularly supporting cantillation, correct placement and clear representation of vowels and/or crowns on letters.). Alternatively or in addition, the written representation 32 may include an identifier or code representing the word or letters of the word in an identified character set.

The audio source 34 may be an audio file containing an acoustic or spoken recording of the pronunciation of the word. The audio source 34 may be named or otherwise identified to correspond to the word in the dictionary 16 so that the audio source 34 may be quickly retrieved when a user or device requests that the word in the dictionary 16 be played. The audio source 34 may be named or otherwise identified to correspond to the word in the dictionary 16 in the context of a specific sentence or verse so that the audio source 34 may be quickly retrieved when a user or device requests that the word in the dictionary 16 be played. The audio source 34 may be represented, for example, as a path to an audio file. The audio file may be a recording of the language student and/or a language teacher associated with the student. If the same word is employed with different cantillation in the word or a sentence/verse applying the word, the audio source 34 for the different variations of the word.

It is noted that the written representation 32 and/or the audio source 34 may be stored separately (e.g., on a remote device) from the pronunciation dictionary and/or the word in the dictionary 16.

A plurality of words in the dictionary 16 may be combined into a pronunciation dictionary. An example of a pronunciation dictionary is depicted in FIG. 3B. As shown in FIG. 3B, the pronunciation dictionary may include, in some embodiments, an identifier of the trope 28 associated with a word, a symbolic representation 18 of the word (e.g., as written or as spoken), and a phonetic representation 30 of the word (e.g., as spoken).

The phonetic portion 30 of the pronunciation dictionary may be created, for example, according to the following pseudocode (see Tables 1-5 for an explanation of special characters):

(1) Hebrew text is broken into words, separated by whitespace, paseq, or sof pasuq. In some embodiments, a word may be a maximal string of non-whitespace characters.

(2) Each word is parsed and broken into word segments, separated by maqaf

I. Word segments are broken into consonant clusters of the form [cantillation marks (< . . . >), consonant, vowel (!, e!, a!, o!, a, o, e, i, ei, e, a, o, oe, oo, u, ai, oi), terminator (-:#|.)], where the terminator may include meteg and stressed flags. Word segments may be further modified as follows:

(3a) Perform the following replacements: “ . . . y!h:woh” becomes “ . . . ^a!dhoenoy”; “ . . . y:h:woh” becomes “ . . . ^:dhoenoy”; “ . . . y!h:wih” becomes “ . . . ^e!loehiy:m”; “ . . . y:h:wih” becomes “ . . . ^:loehiy:m”

(3b) Replace “ . . . W: ^” with “ . . . Y: ^”

(3c) If a “w” with a shuruq is the first consonant cluster in the segment, then turn the “w” with a shuruq into a consonant-less shuruq. Otherwise, move the shuruq and any meteg/stress/cantillation-marks to the previous consonant cluster (3d) If a “w” with a holam is preceded by a consonant cluster having no vowel, then move the holam and any meteg/stress/cantillation-marks to the previous consonant cluster (3e) Determine whether shevas should be vocal. If there are at least two consonant clusters in the word segment, then perform the pseudocode depicted in FIG. 3C.

(3f) Change the number of syllables and consonant clusters. If the last consonant cluster is h: (naked undotted he), then move any meteg/stress/cantillation-marks on the h: to the penultimate consonant cluster and delete the h:

(3g) Undotted alephs with no vowel, and some other undotted alephs, are eliminated. Perform the pseudocode shown in FIG. 3D.

(3h) Change the penultimate consonant cluster. Perform the pseudocode shown in FIG. 3E.

(3j) Change accents and vowels. Perform the pseudocode shown in FIG. 3F.

(3k) Change vowel pronunciation based on stress/cantillation location. Promote any stressed qamats (o) to a qamats gadol (o*)

(3l) if there is a sheva (even a vocal sheva) on any ^ or h, remove it (3m) Change vowel pronunciation based on the location of the consonant cluster. If the final consonant cluster has a qamats, promote it to qamats gadol.

(3n) Change the vowel denotation based on consonant cluster context.

(3n1) If (there are 4 or 5 consonant clusters && the last 4 are [in order] (bo or vo),t*ti,y:,m: && (there are exactly 4 consonant clusters || the first of the 5 are one of ba,ha,ka,la)) {promote the qamats (o) to qamats gadol (o*)}

(3n2) If (there are exactly 2 consonant clusters && they are ko*l:) {demote o* to o? (qamats gadol to qa tan)}

(3n3) Else, for any consonant cluster but the last,
if the vowel is qamats (o) && the next consonant cluster has a vowel && its consonant does not have
a dagesh hazak
promote it to gadol (o*)
else demote it to a qamats qan tan (o?)

(3o) Change the number of syllables. For any naked yod that isn't first, add ‘y’ to previous consonant cluster's vowel and move meteg/stress/cantillation-marks to previous consonant cluster; delete naked yod's consonant cluster.

(3p) Use tropes to determine accented syllables, and use accenting to determine pronunciation. Perform the pseudocode depicted in FIG. 3G (3q) If the last consonant cluster's vowel is a sheva, delete it. Replace ! or ? with:

(3r) For each consonant cluster, if (the consonant cluster's vowel is a normal sheva (!) && its consonant has dagesh hazak) {promote it to a vocal sheva (?)} else delete it.

(3s) Change the number of syllables and/or consonant clusters. Repeat step (3o).

(4) The pronunciation of the word may be represented as the concatenation of the pronunciations of the words' consonant clusters.

Symbol tables for the above pseudocode are provided below.

TABLE 1

| Hebrew Vowels | |
|---|---|
| sheva | ! [? used internally for vocal sheva] |
| hataf segol | e! |
| hataf patah | a! |
| hataf qamats | o! |
| hiriq | i |
| tsere | ei |
| segol | e |
| patah | a |
| qamats | o [o* used internally for qamats gadol] |
| qamats qatan | o? |
| holam | oe |
| holam haser | oe |
| qubuts | u |
| shuruq dot | oo [see DOTTED vav, below] |
| segol hiriq | ei |
| patah hiriq | ai |
| qamats hiriq | oi |

TABLE 2

Hebrew Letters

| Letter | Undotted | Dotted | Dagesh (Previous Letter is Voweled) |
|---|---|---|---|
| alef | ^ | ^^ | |
| bet | v | b | bb |
| gimel | gh | g | gg |
| dalet | dh | d | dd |
| he | h | hh | |
| vav | w | ww [but if shuruq, treat as undotted, resulting in wu] | |
| zayin | z | zz | |
| chet | ch | chch | |
| tet | t | tt | |
| yod | y | yy | |
| kaf | kh | k | kk |
| lamed | l | ll | |
| mem | m | mm | |
| nun | n | nn | |
| samech | s | ss | |
| ayin | ' | " | |
| pe | f | p | pp |
| tsadi | ts | tsts | |
| qof | q | qq | |
| resh | r | rr | |
| shin shindot | sh | shsh | |
| shin sindot | s* | s*s | |
| shin wout dot | s? | s?s | |
| tav | th | t* | t*t |

TABLE 3

| Cantillation Names |
|---|
| etnahta |
| segol |
| shalshelet |
| zaqef_qatan |
| zaqef_gadol |
| tipeha |
| revia |
| zarqa |
| pashta |

TABLE 3-continued

| Cantillation Names |
|---|
| yetiv |
| tevir |
| geresh |
| geresh_muqdam |
| gershayim |
| qarney_para |
| telisha_gedola |
| pazer_qatan |
| atnah_hafukh |
| munah |
| mahapakh |
| merkha |
| merkha_kefula |
| darga |
| qadma |
| telisha_qetana |
| yerah_ben_yomo |
| ole |
| iluy |
| dehi |
| zinor |
| masoral_circle |

TABLE 4

| Orthography to Pronunciation Table | |
|---|---|
| ^ | sp (but unvoweled ' is nothing) |
| ^^ | sp |
| ' | sp (but unvoweled ' is nothing) |
| " | sp |
| b | B |
| bb | B |
| ch | HE |
| chch | HE |
| d | D |
| dd | D |
| dh | D |
| f | F |
| g | G |
| gg | G |
| gh | G |
| h | HE (but unvoweled h is nothing) |
| hh | HE |
| k | K |
| kh | K |
| kk | K |
| l | L |
| ll | L |
| m | M |
| mm | M |
| n | N |
| nn | N |
| p | P |
| pp | P |
| q | K |
| qq | K |
| r | R |
| rr | R |
| s | S |
| sh | SH |
| shsh | SH |
| ss | S |
| s* | S |
| s*s | S |
| s? | (nothing) |
| s?s | (nothing) |
| t | T |
| th | TH |
| ts | T S |
| tsts | T S |
| tt | T |
| t* | T |
| t*t | T |
| v | V |

TABLE 4-continued

| Orthography to Pronunciation Table | |
|---|---|
| vv | V |
| w | V (but woo is UW1, and woe is OW1) |
| ww | V |
| y | Y |
| yy | Y |
| z | Z |
| zz | Z |

TABLE 5

Ashkenazi and Sefardi Vowel Transliterations

| Vowels | Ashkenazi | Sefardi |
|---|---|---|
| ! | AH0 (but may be nothing!) | |
| e! | EH0 | |
| o! | AA0 | |
| au! | AO0 | |
| i | IH0 | |
| ei | EY0 | |
| e | EH1 | |
| o | AA 1 | |
| au | AO1 | AA1 (when stressed) |
| oa | OW1 | |
| oo | UW1 | |
| u | UW1 | |

Figure 3H:
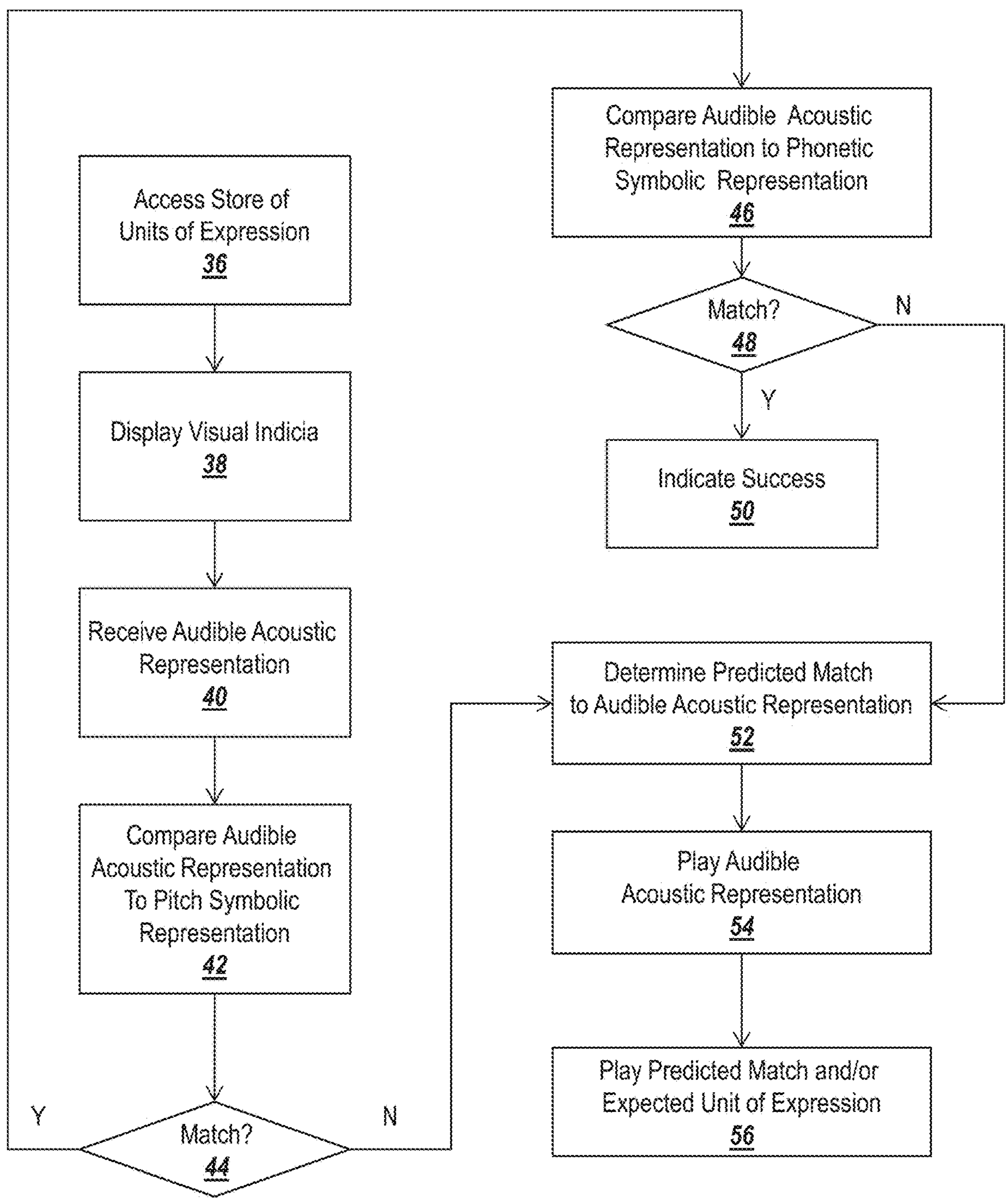
FIG. 3H is a flowchart describing an exemplary procedure for performing a type of language learning involving word-sound pairings.

The pronunciation dictionary may be used to perform one type of language learning involving recognizing word/sound pairings as shown for example in the flowchart of FIG. 3H. According to one embodiment, a store of units of expression (e.g., in the form of a pronunciation dictionary) may be accessed at step 36. Each unit of expression may have a symbolic representation 18 as well as a pitch representation (such as the trope 28 noted above) and/or a phonetic representation (such as the phonetic representation 30 noted above).

One of the units of expression in the pronunciation dictionary may be selected in order to test the student. In one embodiment, the language learning system may test each of the words in a work (such as the Hebrew Bible) in a sequence, and the selected unit of expression may correspond to the next word in the work. Alternatively or in addition, the system may display words in the work on the screen and allow the user to select a word to be tested.

Visual indicia corresponding to a symbolic representation of one of the units of expression and/or the pitch symbolic representation of the selected unit of expression may be displayed at step 38. Step 38 may result in the display of an interface such as the ones depicted in FIGS. 2A-2E.

The symbolic representation may be, for example, an orthographic representation. The symbolic representation may be a representation of consonants and/or vowels, and may include a symbolic representation of a cantillation (such an example is shown in FIG. 3B). More specifically, the symbolic representation may be selected from the group consisting of, or may comprise: a cantillated Hebrew symbolic with vowels, a Hebrew symbolic without cantillation, a Hebrew symbolic without vowels, a cantillated reversible romanization of a Hebrew symbolic, a reversible romanization of a Hebrew symbolic without cantillation, a masoretic transliteration, a masoretic transliteration transformed into a set of one or more phonemes, a cantillated masoretic transliteration of a Hebrew symbolic, or a masoretic transliteration of a Hebrew symbolic without cantillation.

At step 40, an audible acoustic representation may be received. For example, the audible acoustic representation may be an audio representation provided through a microphone, or may be a pre-recorded audio file retrieved from memory. The audible acoustic representation may include one or more input audible pitch representations that may correspond to the selected unit of expression selected in step 38.

At steps 42-48, it may be determined whether the audible acoustic representation corresponds to the selected unit of expression. This may involve determining whether the pitch pattern present in the audible acoustic representation matches the pitch symbolic representation in the pronunciation dictionary, and determining whether the oral component of the audible acoustic representation matches the phonetic symbolic representation in the pronunciation dictionary. In some embodiments, the determining may be performed without the use of training data.

Accordingly, at step 42 the audible acoustic representation may be compared to the pitch symbolic representation. This may involve extracting one or more pitches from the audible acoustic representation and determining one or more transitions between distinct pitches.

In some exemplary embodiments, absolute pitch and absolute meter are not used in order to evaluate a pitch pattern. This is due to the fact that, in some cantillated languages, the absolute pitch and absolute timings of the pitch patterns have no relevance: the same pitch pattern may be represented by different absolute pitches expressed with different absolute timings. It is, instead, the relative pitches involved in a pitch pattern, the timing of the pitch pattern (as a whole), and the proportional timings of transitions within the pitch pattern, that may identify or define a pitch pattern.

Pitch patterns may be identified in a continuous manner based on a continuous amount of rise and/or fall in the recorded pitch. For example, an amount of rise or fall in the pitch of a given audio recording may be determined over a certain time period. One or more reference pitch patterns may be retrieved from a pitch pattern library for comparison to the recorded pitch pattern. As noted above, cantillated languages typically employ a finite number of cantillations; each cantillation may be represented by a reference pitch pattern in the library. Accordingly, by comparing attributes of the recorded pitch pattern to the reference pitch pattern, the system may identify which of the cantillations in the language is best approximated by the recorded pitch pattern.

For example, in some embodiments, the amount of rise and/or or fall in the recorded pitch pattern, and the time period over which the rise and/or fall occurs, may be normalized between the recorded pitch pattern and the reference pitch pattern in order to account for differences in absolute pitch and/or meter between the recorded pitch pattern and the reference pitch pattern. An amount of difference between the recorded pitch pattern and the reference pitch pattern may be calculated, for example by comparing the relative amount of rise and fall and the relative timings between the reference pitch pattern and the recorded pitch pattern. A reference pitch pattern from the library with the least calculated amount of difference to the recorded pitch pattern may be selected as the most likely cantillation chanted by the user.

Alternatively or in addition, pitch patterns may be identified in a discrete manner, based on a threshold amount of difference between neighboring pitches. For instance, starting at the beginning of the audible acoustic representation, a starting pitch may be identified. Once the starting pitch has changed by more than a threshold amount, the starting pitch may be considered to have transitioned to a different pitch. The relative or proportional amount of time that it takes for one pitch to become another pitch may be considered in order to determine the identity of relative pitches. For example, if one pitch transitions into a second pitch before transitioning into at third pitch, the second (intermediate) pitch may or may not represent an independent pitch in the pitch pattern. If the pitch pattern quickly transitions from the second pitch to the third pitch of if the second pitch is only represented for a brief period of time, then the pitch pattern may be represented as a transition from the first pitch directly to the third pitch. On the other hand, if the audible acoustic representation lingers on the second pitch before transitioning to the third pitch, the pitch pattern may instead be represented as a transition from the first pitch to the second pitch to the third pitch. The length of time required to transition from one pitch to another may be based on a predetermined threshold amount, or may be calculated dynamically on a student-by-student basis.

Transitions between different relative pitches may be identified, and proportional timings between transitions may be calculated. The relative pitches and the proportional timings may define the pitch pattern as represented in the audible acoustic representation.

The pitch pattern from the audible acoustic representation may be compared against the pitch symbolic representation of the selected unit of expression from the pronunciation dictionary. In some embodiments, the comparing may account for the at least one cantillation symbol of the selected one of the units of expression. For example, as noted above the pitch symbolic representation may identify a pitch pattern by name. The named pitch pattern in the pronunciation dictionary may be associated with a set of relative pitches and relative timings between transitions among the relative pitches, and in some embodiments an overall timing of the entire pitch pattern. These items may be stored in the pronunciation dictionary or may be stored elsewhere (e.g., in the case of a networked implementation, the pitches and timings defining the pitch pattern may be stored locally at the client or remotely at the server). The pitches and timings of the selected unit of expression from the pronunciation dictionary may be compared to the pitches and timings from the audible acoustic representation to determine if they match, for example by determining if the pitches and timings are within a predetermined threshold error amount. The predetermined threshold error amount may be adjusted to increase or decrease the difficulty of the lesson.

In some embodiments, the pitch pattern used by the student in the audible acoustic representation may not match the expected pitch pattern from the pronunciation dictionary. However, the incorrect pitch pattern may not, in some cases, change the underlying meaning of the unit of expression. In this case, the system may either indicate success at step 44, or may indicate that the pitch pattern was not as expected but that this is not counted as being incorrect.

If the result at step 44 is "YES" (i.e., the pitch pattern of the audible acoustic representation matches the pitch symbolic representation), then processing may proceed to step 46. Otherwise, processing may proceed to step 52.

At step 46, an oral component of the audible acoustic representation (e.g., a representation of the phonemes spoken by the student) may be extracted from the audible acoustic representation and compared to the phonetic symbolic representation from the pronunciation dictionary. This may involve performing language processing on the audible acoustic representation to identify and extract one or more spoken phonemes from the audible acoustic representation. These identified phonemes may be canonized or standardized by matching them to a closest matching phoneme (for example, from a phoneme dictionary storing available phonemes based on information similar to that described above in Tables 1-2 and 4-5).

The identified phonemes may be compared to the phonetic symbolic representation of the selected unit of expression in the pronunciation dictionary to determine whether the audible acoustic representation matches the expected phonetic symbolic representation. For example, the system may determine if the phonemes are within a predetermined threshold amount of the phonetic symbolic representation. The predetermined threshold error amount may be adjusted to increase or decrease the difficulty of the lesson. In some embodiments, machine learning may be employed to improve the phonetic identification of the system.

In some embodiments, the phonetic symbolic representation of the selected unit of expression in the pronunciation dictionary may be a masoretic transliteration. The comparing may account for any variation between a pronunciation of a phoneme that would ordinarily be expected for the phoneme, and the masoretic version of the phoneme.

If the result at step 48 is "YES," then processing may proceed to step 50. Otherwise, processing may proceed to step 52.

In some embodiments, one of steps 42 and 46 may be omitted. Thus, the comparison to the audible acoustic representation may be made based on the pitch symbolic representation alone (i.e., proceeding directly from step 44 to the indication of success at step 50 in the event of a "YES" determination), or based on the phonetic symbolic representation alone (i.e., skipping steps 42 and 44 and proceeding directly to step 46). It is also noted that the order of steps 42 and 46 may be reversed.

If the results at steps 44 and 46 were both "YES," then both the pitch pattern and the oral component of the audible acoustic representation match the expected values for the selected unit of expression from the pronunciation dictionary. In this case, processing may proceed to step 50 where the student's success may be indicated. In some embodiments, at this step the next word in a work may be selected as the next unit of expression to be tested, and processing may return to step 36.

If at least one of the results at steps 44 and 48 was "NO," then the student has failed to accurately match either the expected pitch pattern or the expected phonetic representation from the pronunciation dictionary. In this case, the system may indicate that the expected input was not received and processing may proceed to step 52.

At step 52, a predicted match to the audible acoustic representation is determined. The predicted match may correspond to a unit of expression from the pronunciation dictionary having the pitch pattern and phonetic representation that the student used in the audible acoustic representation, if such a match exists in the pronunciation dictionary.

If either the pitch pattern or the phonetic representation was correctly matched by the student, then the predicted match may be a unit of expression from the pronunciation having the matched element. The unmatched element may be processed as described above in steps 42 and/or 46 in order to determine the pitch pattern and/or phonetic representation that was used by the student.

Once a predicted match is identified, the student's originally recorded audible acoustic representation may be played at step 54. At step 56, a recording of the predicted match may be played (e.g., the audio source 34 associated with the predicted match in the pronunciation dictionary may be played) and/or a recording of the expected unit of expression may be played. By presenting the student's (incorrect) audible acoustic representation side-by-side with the predicted match and/or the expected unit of expression, the system may allow the student to efficiently identify differences between their recording and the expected input. Optionally, a meaning of the predicted match and/or the expected unit of expression may be displayed so that the student may learn how their pronunciation or mispronunciation may change the meaning of a word.

In some embodiments, at this step the next word in a work may be selected as the next unit of expression to be tested, and processing may return to step 36. Alternatively, the same unit of expression may be tested again.

III. Verse Dictionary

Alternatively or in addition to the above-described pronunciation dictionary, exemplary embodiments may use a verse dictionary, in which the units of expression of a work are organized into verses and categorized or indexed by verse. Because the units of expression of the work are expected to be used together in the form of the verses, the work can effectively be broken into units or "chunks" that are larger than the individual units of expression. Therefore, for purposes of speech recognition or forced alignment of text and an audio recording, the verses in the verse dictionary may be treated as discrete units. Thus, providing such a verse dictionary may improve processing or analysis efficiency as compared to a system that utilizes smaller units for speech recognition or forced alignment.

Figure 4A:
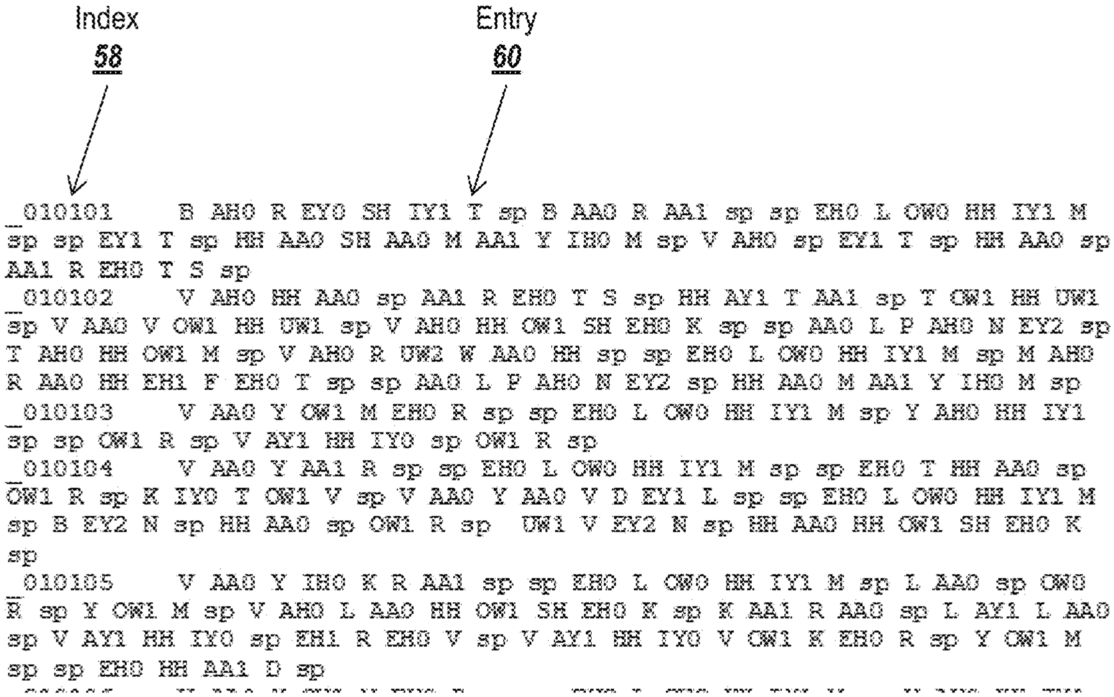
FIG. 4A depicts an example of a verse dictionary.

An exemplary verse dictionary is shown in FIG. 4A. The verse dictionary may include an index 58 that identifies a verse from a series of verses. The index 58 may be any identifier suitable for representing the verse. For example, the index 58 may be a serial number, an alphanumeric code, or a number representing a canonical chapter and verse number of the associated verse, among other possibilities.

The verse dictionary may further include an entry 60 corresponding to a phonetisation of the verse identified by the index 58 associated with the entry 60. The phonetisation may be, for example, similar to the phonetisation described above with respect to the pronunciation dictionary, but may be applied to each of the units of expression in the associated verse.

In some embodiments, multiple indices 58 may be provided for a single entry 60 corresponding to a verse. This may allow, for example, different cultural groups within a given language to represent the verse identifiers in their own format. Such a circumstance may be particularly helpful, for example, in the case of different synagogues from different traditions that refer to verses of the Bible in different ways. If an audio file is associated with an entry 60 containing multiple indices 58, the identification of the verse using any of the indices 58 may trigger the playing of the associated audio file.

In some embodiments, some or all of the verses from the verse dictionary may be associated with audio representations of the verses. For example, each verse may be associated with a distinct audio file that corresponds to that verse. The audio file may be assigned a name or other identifier that corresponds to the index 58 for the verse.

Figure 4B:
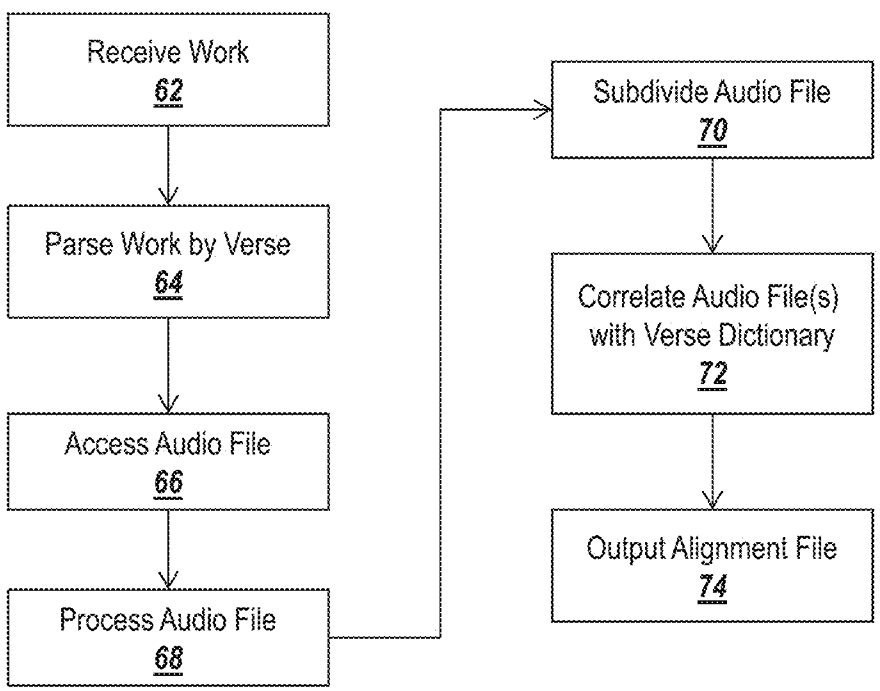
FIG. 4B is a flowchart describing an exemplary procedure for establishing or setting up a verse dictionary and associated audio files.

An exemplary procedure for establishing the verse dictionary and associating the verse dictionary with audio representations of the verses is now described with reference to FIG. 4B.

At step 62, a copy of a work organized into verses may be received by the language learning system. The work may be, for example, the Hebrew Bible. The work may be represented as, for example, one or more text files, one or more image files, or any other format suitable for representing a copy of the work.

At step 64, the received work may be parsed in order to identify verses in the work. The verses may be identified, for example, by an identifier in the copy of the work received at step 62. The identifier may be placed, for example, at the beginning or end of a verse and may be distinguished from words in the verse (e.g., by the use of special characters). In another embodiment, each verse may be provided on a new line or may be otherwise separated from other verses by the use of special characters. Alternatively or in addition, the copy of the work received at step 62 may be cross-referenced with external information providing the locations of verse breaks, such as a verse alignment file containing such information.

Once broken into verses, each verse may be assigned one or more identifiers to be used as indexes 58 into the verse dictionary.

In some embodiments, the language learning system may look up the words in the work in the pronunciation dictionary in order to determine appropriate phonetizations for the words in the work. The phonetizations of the words making up a given verse may be stored as an entry 60 in the verse dictionary corresponding to the above-noted index 58 for the verse.

One or more audio files may also be provided, where the audio file(s) provide audio recordings of the verses in the work. Some or all of the verses in the verse dictionary may be associated with an audio file or portions of an audio file containing a reading of the verse using the below-described procedure. For ease of discussion, it is assumed in the below description that a single audio file is initially provided, where the single audio file includes an audio representation of each of the verses. However, it is understood that the computerized language instruction system is not limited to processing a single audio file, and it will be readily apparent to one of ordinary skill in the art that the below-described procedure may be extended to process multiple input audio files.

The audio file may be accessed at step 66. For example, a path to the audio file may be specified when setting up the verse dictionary, and/or the language processing system may request that a user identify or locate an audio file for one or more verses as the work is being processed.

It is also noted that more than one audio file may be associated with each verse, and this procedure may be extended to associate multiple audio files with a given verse. This may be particularly helpful, for example, when multiple students and/or multiple teachers use the language learning system. For example, multiple teachers may upload individual recordings of themselves reading a given verse. A particular student may then retrieve the reading from a specific teacher, as described in more detail below.

The audio file may (initially) include recordings of multiple verses. For example, an initial audio file may include a reading of an entire work, or a chapter within a work, where the chapter consists of multiple verses (among other possible subdivisions of the work). In this case, the audio file may optionally be processed in order to identify verse start/stop times within the audio file, and/or to subdivide the audio file into multiple audio files, each audio file including a single verse (or a set of verses that is smaller than the initial set of verses in the audio file).

Therefore, at step 68, the audio file may be processed to identify a starting time, an ending time, or a starting time and an ending time for the identified verse in the audio file. In some embodiments, only the ending time of a selected verse is identified. The starting time of the verse following the selected verse is assumed to be the same as the ending time of the selected verse. The starting and/or ending times may be calculated using a forced alignment procedure, as described in more detail below.

Alternatively or in addition, the end of a verse or word may be identified based on an amount of silence or whitespace after the verse or word. For example, a short pause after a word may indicate the end of the word, whereas a longer pause after a word may indicate the end of a verse. The length of the pauses may be set to predetermined threshold periods of time.

At step 70, the audio file may be subdivided into single verses or groups of verses. For example, the audio file may be broken into multiple audio files, using the ending times identified at step 68 as breakpoints between the audio files. Each thus-created audio file may be assigned a name that is consistent with the index or identifier of the verse corresponding to the audio file.

At step 72, the audio file(s) created in step 70 may be correlated with the verse dictionary. For example, each index 58/entry 60 pair associated with a verse within the verse dictionary may be matched to a corresponding audio file containing the associated verse. A logical association may be created between the index 58/entry 60 pair and the audio file; for instance, a path to the audio file may be stored with the index/entry, among other possibilities.

It is noted that, in addition to separating an audio file containing multiple verses into multiple audio files, each containing one or more verses, a similar procedure can be used to subdivide an audio file into individual words. This may be useful for obtaining word audio files for use with the pronunciation dictionary.

Alternatively or in addition to steps 68-72, at step 74 one or more alignment files for the audio file(s) may be created. The alignment file(s) may include an identification of each of the verses in a given audio file, as well as start and/or stop times for verses within the audio file. Such an alignment file may be helpful if an initial audio file containing multiple verses is not split into multiple audio files, or if any of the thus-split audio files include more than one verse. The alignment file may be used when a verse is requested in order to locate the start time of the requested verse within the audio file.

Figure 4C:
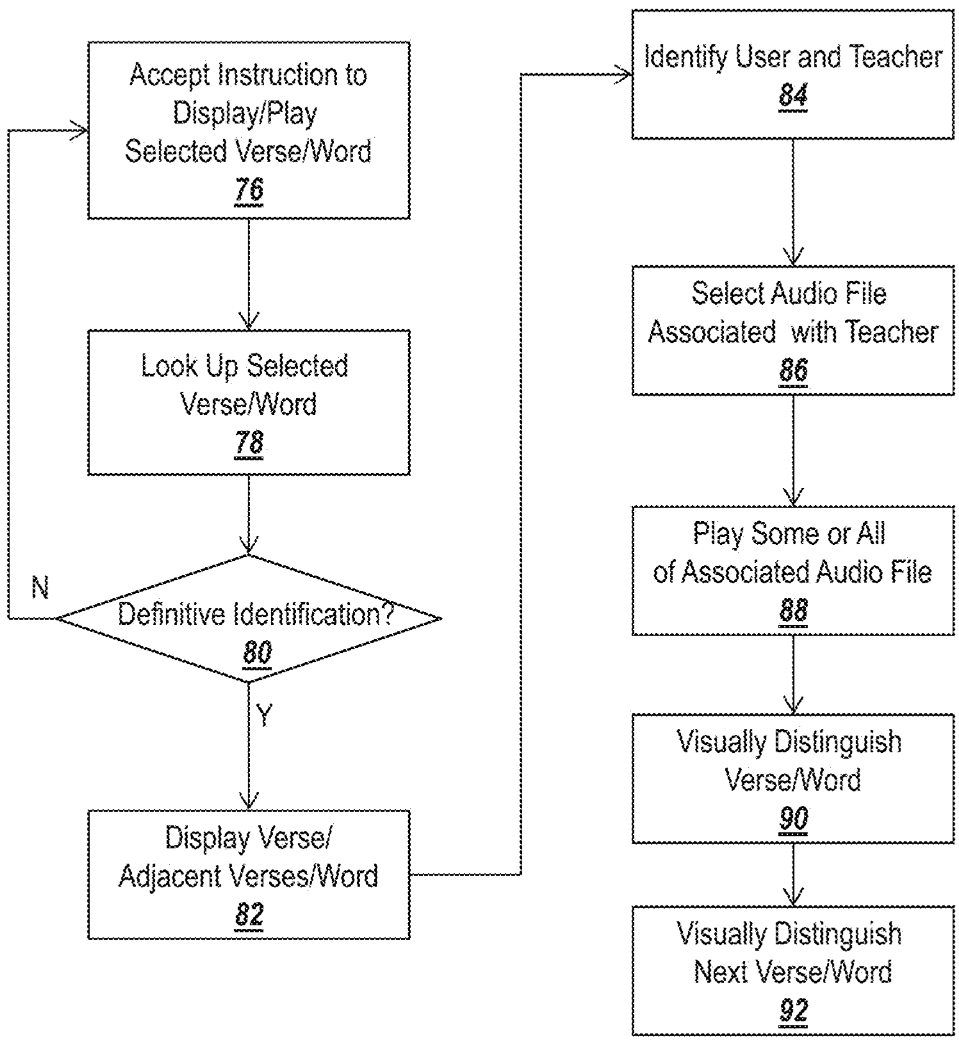
FIG. 4C is a flowchart describing an exemplary procedure for using a verse dictionary to display or play words or verses.

The above-described verse dictionary may be used to display and/or play a verse from the work represented by the verse dictionary. An exemplary procedure for displaying and/or playing a selected verse is depicted in the flowchart of FIG. 4C.

At step 76, a language learning system may accept an instruction to display or play a selected verse. The instruction may be, for example, a selection of a word or verse from among multiple words or verses displayed on a display, a selection of a word verse from a menu, a designation of a verse using a verse identifier (e.g., a verse identifier corresponding to the index 58 of the verse dictionary), a canonical identification of the verse, and other possibilities.

The instruction may also be an identification of some or all of the text of the verse. In some embodiments, the user may enter some or all of the verse in text format into a search tool. Alternatively or in addition, the instruction may be an oral instruction in which a user speaks some or all of the verse. The system may parse the spoken verse and match the verse to a verse in the verse dictionary to identify the index 58 associated with the verse.

It is not necessary to specify the full text of the verse in the instruction, nor a full identifier for the verse. For example, a subset of the text of the verse, which is less than the full text of the verse, may be used to identify the verse. Alternatively or in addition, a range of verse identifiers may be specified, where the range corresponds to a plurality of verses.

The instruction may be, or may include, an identification of a requested date. In some traditions, such as Judaism, specific readings of a work are assigned to particular dates of the year. Hence, the reading for a particular date can be identified based on the date itself. In some cultures, date-based readings may vary depending on geographic location and/or community affiliation, and accordingly this information may also be specified in the instruction. Exemplary pseudocode for selecting a specific reading for a given date, geographic location, and/or community affiliation is provided later in this document.

At step 78, the language learning system may look up the identified verse in the verse dictionary. If the instruction of step 76 identified the verse by an identifier or index, the identifier or index may be used to retrieve the verse from the verse dictionary. If the instruction identified the verse based on some or all of the text of the verse, the entries 60 of the verse dictionary may be searched for the identified text.

At the end of step 78, one or more verses matching the instruction may be identified. If the verse was identified by index, or if the verse was identified by specifying the full text of the verse, or if the verse was specified using a subset of the text of the verse that is unique to one verse, then a definitive match may be possible. If, however, the instruction specified only a portion of the verse or a range of possible verses, then a definitive match may not be possible using the information specified up to this point. Thus, a plurality of verses compatible with the instruction may be identified.

Thus, at step 80, the language learning system determines if a definitive match has been made. If the answer at step 80 is "NO," then processing may return to step 76. At this juncture, the language learning system may accept a second instruction to display or play the selected verse. The second instruction may include further information about the verse, such as a more complete identifier or additional text from the verse. Processing may then proceed to step 78, where the additional information specified in the second instruction may be used to search from among the plurality of verses identified in the first pass through step 78. Processing may then proceed to step 80, where it is determined if a definitive match can be made at this juncture. Steps 76-80 may be repeated until a definitive match has been made. Alternatively, the user may indicate that the plurality of verses identified in the most recent pass through step 80 should be used for the rest of processing.

If the answer at step 80 is "YES," then at step 82 the selected verse may be displayed on a display device. The identification made in step 7 may be used to retrieve the verse or word, for example from the verse dictionary (to display the verse phonetically), a pronunciation dictionary, or another source of the verses/words (e.g., a copy of the work containing the verses, such as the Hebrew Bible).

In addition, one or more verses that are adjacent (e.g., preceding or succeeding the identified verse) to the selected verse may be displayed in the order that the verses are arranged in the work. This may allow, for example, for context to be provided for the selected verse and may assist the language learner in developing a better understanding of the work and the flow of verses and cantillations within the work.

At steps 84-88, the selected verse or word may be played on an audio output device. In some embodiments, once the identification is made at step 78 and the selected verse or word is looked up in the verse/pronunciation dictionary, an associated audio file (as described above) may be retrieved and played. As further described above, multiple audio may optionally be associated with a given verse or word (for example to allow different teachers to provide different recordings of the verse or word).

Therefore, at step 84 a current user of the language learning system may be identified. The current user may be identified, for example, through an authentication process carried out when the user logs into the system, or by retrieving user information from the instruction of step 76, or by prompting for the user to enter an identifier, among other possibilities.

Once the user is identified, the language learning system may consult a database that maps users of the system to teachers assigned to the users. The teachers may be associated with audio recordings submitted by the teachers. Accordingly, at step 86 the language learning system may retrieve an audio file associated with the selected verse or word that is flagged or otherwise identified as being associated with the user's assigned teacher. If no teacher is assigned to the user, or if the user's teacher has not uploaded a recording for a particular verse or word, a default recording of the verse or word may be used. Alternatively or in addition, a randomly selected recording from among the plurality of recordings associated with a particular verse may be used.

Once an appropriate audio recording of the word or verse is selected, some or all of the audio file associated with the identified audio recording may be played at step 88. If the audio file contains the entirety of the word or verse and no other words or verses, then the entire audio file may be played. Alternatively, if the audio file contains other words or verses, then the above-described alignment file may be consulted to determine a starting location of the selected word or verse. The audio file may be played from the starting location of the selected word or verse to an ending location of the current word or verse (e.g., the starting location of the next word or verse in the audio file).

As the audio file plays a word or verse, at step 90 the word or verse may be displayed on a display device, and may be visually distinguished from other words or verses of the work that are also displayed. Visually distinguishing the word or verse may involve, for example, changing the size or position of the word or verse, changing the font or a font attribute of the word or verse, changing the color of the word or verse or the background of the word or verse, and any other technique that creates a differentiation between the selected word or verse and other words or verses displayed on the display device. Visually distinguishing the word may also or alternatively involve changing characteristics of non-selected words, such as by graying out the non-selected words, reducing the size of the non-selected words, etc.

At step 92, the system may continue playing words within a verse, distinguishing each word as it is played, and may continue playing additional verses once the selected verse finishes. This may involve continuing to play the audio file after the current word or verse is complete, or may involve looking up an audio file associated with the next word or verse in a sequence. As the next word or verse in the sequence is played in the audio file, the visual representation of the next word or verse may be visually distinguished in the display device so that the display corresponds to the audio.

In some embodiments, a user may be provided with an option to play only the selected word or verse, or to continue playing the work from the selected word or verse.

Steps 90 and 92 may involve a procedure described herein as "smooth scrolling," in which units of expression displayed on a display device are changed in a smooth and continuous manner in order to improve learning (particularly by students with special needs). Smooth and continuous, in this context, means that the display of the words does not change abruptly, or in an discrete manner. The use of smooth scrolling means that an average user of the system will observe the change in the display to occur slowly enough so that the change from one instant to the next is less than a predetermined threshold amount of change, where the predetermined threshold amount of change is selected to reduce or eliminate abrupt changes to the color, size, position, or format of the words.

It is noted that the average user of the system may be a user with a learning disability. Abrupt changes, this case, are changes that reduce the ability of a user, particularly a user with a learning disability, to be able to follow or understand the words or verses being visually distinguished. For example, the changes should not be made so that words or verses visibly "jump" on the screen, which may cause users with certain learning disabilities to be unable to follow or process the words or verses being presented.

For example, smooth scrolling may entail displaying words or other units of expression on a display device, where the words are associated with visual indicia such as a size of the words or units of expression. The visual indicia may be changed smoothly and continuously in time with a playback of the audio file, such that the words or units of expression are visually distinguished as they are played in the audio file.

Figure 5A:
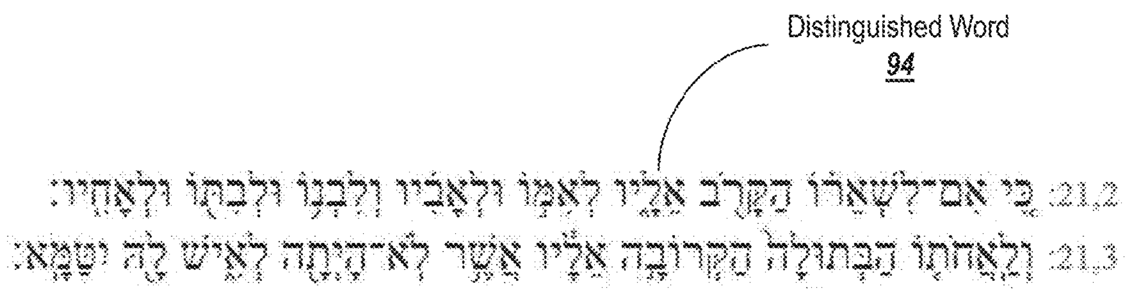
FIGS. 5A-5C depict an example of visually distinguishing words in a series of words.
Figure 5B:
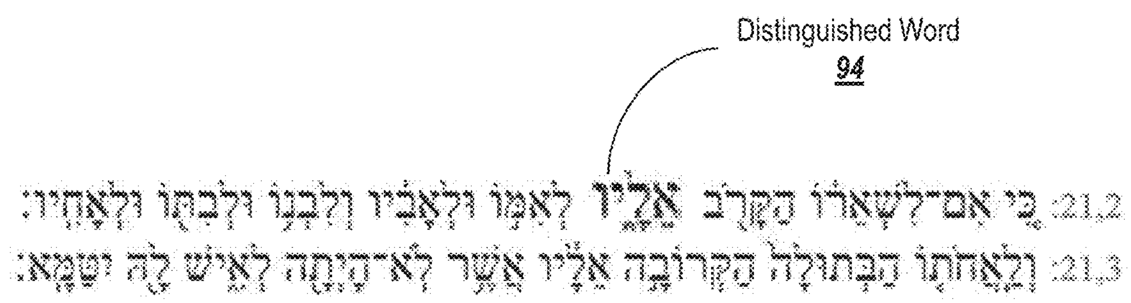
Figure 5C:
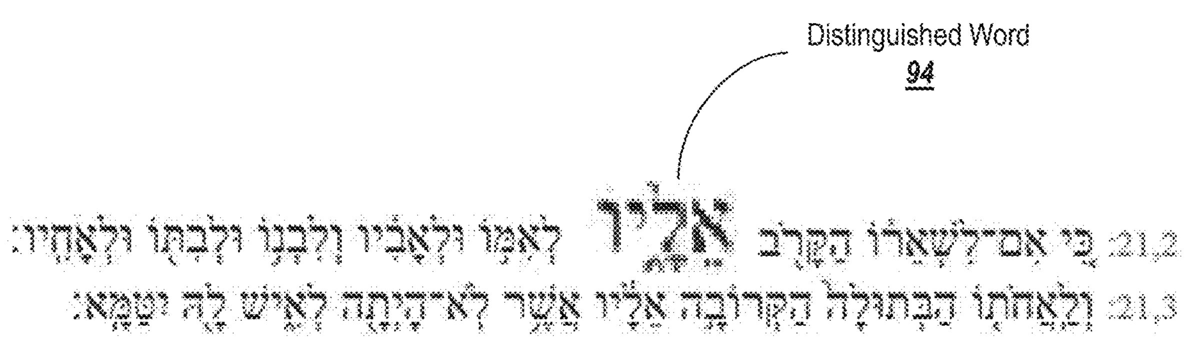

In some cases, multiple words, units of expression, or verses may be displayed on a display device. It may be important to avoid abrupt changes, not only in the placement of the words or verses being visually distinguished, but other words or verses that are not being visually distinguished. For example, as shown in FIGS. 5A-5C, visually distinguishing the words or units of expression 94 may involve changing the size of the words or verses in a continuous manner without discretely shifting a position of the visually distinguished words as more or fewer words or verses fit on a line of text. To the extent possible, words or verses should not shift from one line of text to another as the size of words or verses are changed. If this is not possible, the number of words or verses moved from one line to another should be kept to the smallest reasonable amount. At the same time, as much of the verse that is currently being played should be displayed on-screen. Accordingly, if some words or verses must be moved off the screen due to changes in size of displayed words or verses, the currently played word or verse should be maintained on-screen to the greatest reasonable extent.

In one embodiment, when a new verse begins playing, any other previously-expanded verse(s) are reduced to their default size while the new verse is kept in its same place on the screen. The new verse is then smoothly expanded and simultaneously smoothly moved to the top of the screen while it is playing. Each word in the verse may be highlighted as it is played. If a verse doesn't completely fit on screen (with some margin to handle expansion and rebreaking), the highlighted word is smoothly moved so it is vertically centered on screen as it is played. This keeps as much verse context as possible. Only vertical scrolling is performed.

If a word that is about to be played is not visible (i.e., it is off screen), its verse is expanded and positioned to the top of the screen as long as it fits on screen in its entirety; otherwise the verse is positioned so that the highlighted word is vertically centered on screen.

In some circumstances, when decreasing the size of a previous verse, the current verse may appear to jump on the screen nonlinearly as lines rebreak. In order to avoid this situation, some embodiments decrease the size of the previous verse, and simultaneously hold the current verse in its present position so that the current verse does not move. The size of the current verse may then be gradually increased, but this may occur quickly enough so that the rebreaks of the current verse that invariably occur happen after the currently played word is highlighted so that that word does not jump on the screen. It is noted that, if a word near or after the end of the first line of a verse is clicked on, it may jump while being highlighted.

A different problem occurs on the wrap from last verse to first: the first is probably off the screen, so it's going to jump; our solution is to repeat the set of verses a second time so that the transition is to the next verse, but we simultaneously set the scroll so the first set of verses is displayed (if we show the second set instead, the current verse (second set) will jump when the current verse (first set) rebreaks.

But we've now introduced a new problem:

If the verses do all fit on the screen, then the user will see the duplicates being highlighted as well, which apparently is rather annoying. So, we only highlight and expand the first copy.

Also, if more than two copies fit on screen, scrolling doesn't have sufficient range. So we pad around the text with screenfulls of emptiness. This may not be enough if the user decreases (with cntl –) the scale sufficiently. The user can fix this by decreasing the height of the window.

IV. Audio/Text Playback

At steps 82-92 of FIG. 4C, a symbolic representation of a work (e.g., the above-described verse dictionary) may be combined with audio playback in order to visually distinguish units of expression displayed on a display device as corresponding audio representations of the displayed units of expression are played from an audio file.

Conventionally, displaying text in time with audio playback was performed, for example, by providing a textual representation (e.g., a video display or sequence of images) whose progression is initially synchronized with a corresponding audio representation (e.g., an audio file). One disadvantage to providing these separate audio and textual "tracks" is that they can easily lose synchronization, particularly when employed in a networked environment.

In one embodiment, an audio playback system may use the progress of the audio file as played by the audio playback system in order to synchronize the audio to a corresponding symbolic representation. Basically, the audio playback may represent a progress bar which is matched to, for example, verses in the verse dictionary and/or units of expression within the verses in order to determine which verses or units of expression should be displayed or highlighted on the display device. It is important that the actual progress of the audio file is used (e.g., using a timing reported by a playback device or playback software that is playing the audio file), and not a separate and distinct timing mechanism, in order to maintain proper synchronization (particularly in networked implementations, which may be prone to lagging).

Such a technique is contrasted with a comparative example in which an audio track is maintained with a list of timings for features of the audio track (e.g., the timings of particular words in the audio file). In the comparative example, when the audio track begins playing, a separate timer is started and compared to the list of timings. When the timer indicates that a particular feature is being played in the audio file, an on-screen display of the feature is presented. For example, if the feature is a word in the audio file, then the word may be displayed or highlighted on screen when the word is spoken in the audio file.

Such a comparative example is often employed because it does not require that the developer have access to the inner workings of the audio playback software. Because the comparative example relies on timing information (e.g., from a timing file) and a separate timer that is external to the audio playback functionality, the comparative example can be used with different types of audio playback systems without requiring much (or any) adaptation.

However, the disadvantage of the comparative example is that it is very difficult or impossible to guarantee that the timer accurately reflects the progress through the audio file. Particularly (though not exclusively) when the audio file is played over a networked connection, network delay or other types of lag may cause the (local) timer to become out of synchronization with the (potentially remote) audio playback functionality. Thus, the display of the feature on the screen may not match the playing of the feature on an audio device.

In contrast, according to exemplary embodiments of the computerized language instruction system, the timing of displayed information is tied to the progress of the playing of the audio file, as reported by the hardware and/or software that is playing the audio file.

In one embodiment, text may be displayed on a display device, where the text includes a plurality of symbolic units of expression (e.g., words, portions of words, verses, or portions of verses). The text may be a transliteration of a language. The transliteration may be a masoretic transliteration. The symbolic units of expression may be arranged into verses.

Audio corresponding to the symbolic units of expression may be displayed on audio hardware or software logic. The audio may include, for example, a spoken or chanted rendition of the symbolic units of expression.

As a particular unit of expression is spoken or chanted on the audio file, a corresponding symbolic unit of expression may be visually distinguished in the displayed text (e.g., by highlighting, varying a font or font characteristics, changing color, changing size, changing position, etc).

In one embodiment, visually distinguishing the symbolic units of expression may include changing a size of a verse that is currently being played. Alternatively or in addition, text corresponding to a verse that is currently being played may remain visible on the display device for the entire time that the verse is being played, as in the smooth scrolling embodiments described above. If text corresponding to a verse that is currently being played does not fit on the display device for the entire time that the verse is being played, a current word being played may nonetheless remain visible on the display device.

It is noted that the visually distinguished feature need not be a representation of the word. For example, in some embodiments, the visually distinguished feature may be a cantillation or pitch pattern associated with one or more units of expression. In these embodiments, a cantillation may be selected, and one or more symbolic units of expression may be highlighted whenever the selected cantillation is played. Alternatively or in addition, symbolic units of expression corresponding to the currently-played cantillation or pitch pattern (whether the cantillation or pitch pattern has been previously selected or not) may be highlighted as the cantillation or pitch pattern is played.

The visually distinguishing may be performed based on a progress of the playing of the audio file, and not based on an external timer that is not directly correlated to or associated with the audio hardware or software logic. This is particularly suited to embodiments in which a portion of the technique is performed by a server (e.g., providing the audio file in a streamed manner, performing a forced alignment of the audio to the text, and/or transmitting information regarding the forced alignment to a client) and a second portion of the technique is performed by a client in communication with the server (e.g., playing the audio file locally and maintaining the timing information). The audio may be stored on the server and transmitted to the client, and the visually distinguishing may be performed by the client.

In one embodiment, a request may be received to toggle the display of the text between the transliteration and an original language. The request may originate with a user. In response to the request, the display may be updated to display the original language in place of the transliteration.

The exemplary techniques described above, which relate to playing an audio file and visually distinguishing a displayed rendition of a feature of the audio file, may also be employed in reverse. For example, a selection of one or more of the displayed symbolic units of expression may be received. The audio file may be searched (e.g., using timing information obtained through a forced alignment procedure, described in more detail below) for an acoustic representation corresponding to the selected one or more of the symbolic units of expression, and the acoustic representation may be played from the audio.

V. Forced Alignment and Word Highlighting

As noted above, the playback of an audio recording of a work may be synchronized the display of symbolic units of representation of that work on a display. In some embodiments, a forced alignment procedure may be applied to the work in order to align the audio representation to the displayed symbolic representation. Forced alignment may be performed in several ways, including by analyzing phonemes in the audio representation, by analyzing pitch patterns in the audio representation, by performing a combinatorial best-fit, or any combination of the above, among other possibilities.

Forced alignment can be thought of as the process of finding the times at which individual sounds and words appear in an audio recording under the constraint that words in the recording follow the same order as they appear in the transcript. This is accomplished much in the same way as traditional speech recognition, but the problem is more constrained given the "language model" imposed by the transcript.

A speech recognition system uses a search engine along with an acoustic and language model which contains a set of possible words, phonemes, or some other set of data to match speech data to the correct spoken utterance. The search engine processes the features extracted from the speech data to identify occurrences of the words, phonemes, or whatever set of data it is equipped to search for and returns the results.

Forced alignment is similar to this process, but it differs in one major respect. Rather than being given a set of possible words to search for, the search engine is given an exact transcription of what is being spoken in the speech data. The system then aligns the transcribed data with the speech data, identifying which time segments in the speech data correspond to particular words in the transcription data.

Accordingly, the above-described pronunciation dictionary and/or verse dictionary may be leveraged in order to perform the forced alignment, for example by matching the phonemes and/or pitch patterns identified in the audio file to symbolic representations of the phonemes and/or pitch patterns in the respective dictionaries.

Figures 6A, 6B:
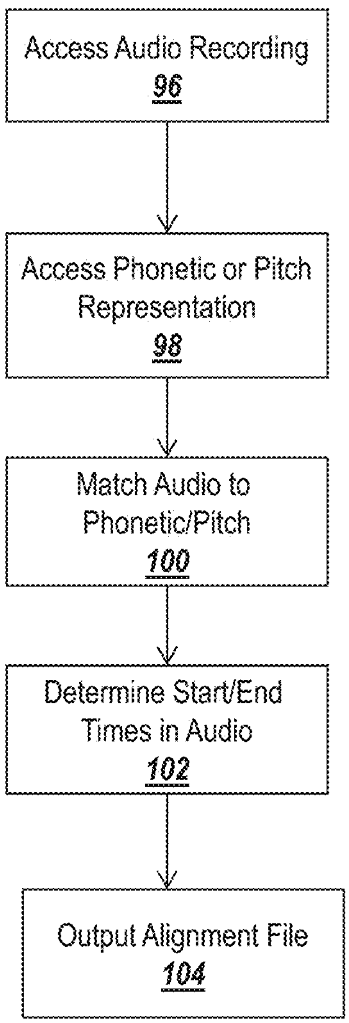
FIG. 6A is a flowchart describing an exemplary forced alignment procedure.
FIG. 6B is an exemplary phones file for use with the forced alignment procedure.

An exemplary forced alignment procedure is shown in FIG. 6A.

At step 96, an audio recording of a series of words (or other units of expression) may be accessed. The audio recording may be, for example, an audio file representing the speaking or chanting of a work (or a portion of a work) as recorded by a particular teacher.

In some embodiments, the audio recording may correspond to a masoretic transliteration of a target language. The target language may be, for example, Biblical Hebrew.

Each of the series of words may correspond to a set of phonemes represented in the audio recording. Alternatively or in addition, one or more words of the series of words may be associated with a pitch pattern or cantillation. Alternatively or in addition, the words may be arranged into verses, and the audio recording may be a recording that is on a verse-by-verse basis (e.g., with distinguishing pauses or noises between the verses, or with different verses arranged into different audio files, among other possibilities.

At step 98, the language learning system may access a phonetic and/or pitch representation of the words read in the audio recording. For example, the language learning system may access the above-described verse dictionary, which may represent a masoretic transliteration of the words in the audio recording broken into one or more groups of textual phonemes.

The textual phonemes may be arranged into groups representing words. At least one of the groups may consist of a single phoneme. Alternatively or in addition, the textual phonemes may be arranged into groups representing verses. The above-described verse dictionary may include, in some embodiments, two prescribed words, SENT_START and SENT_END, that are defined as silence.

Alternatively or in addition to the above, the verse dictionary (or other transliteration of the audio) may be parsed to identify unique phonemes that are present in the audio. The language learning system may build a phones file containing identifiers of these phones, which may be used to identify individual phonemes in the audio recording. An example of a phones file for Biblical Hebrew is depicted in FIG. 6B.

Returning to FIG. 6A, the pitch representation may also include a symbolic representation of pitches, such as a list of names (or other identifiers) of cantillations or pitch patterns. The phonetic representation and the pitch representation may be provided integrally together, such that a representation of the cantillations is present in a transliteration of the series of words. In some embodiments, it may be particularly beneficial if the transliteration is represented as a 7-bit ASCII cantillated transliteration file, for ease of processing.

At step 100, the language learning system may match the audio phonemes in the audio file to the symbolic representation of the phonemes in the phonetic representation, and/or may match the pitch representations in the audio file to the symbolic representation of the pitch patterns in the pitch representation. Because the sequence of phonemes (or cantillations) in the audio file is already known from the verse dictionary, this step entails sequentially matching or delineating the symbolic representation of the phonemes (or cantillations) in the phonetic (or pitch) representation to the corresponding units in the audio file. This may be done using, for example, an acoustic model.

Acoustic models classify inputs into a set of word- or subword-units such as phones, context-dependent subphones etc. In order to train an acoustic model (or, generally, a statistical pattern classifier), a training set of labeled examples may be provided. The acoustic model may generate labels for training data in terms of the units.

The forced alignment procedure may also make use of a Hidden Markov Model (HMM) specifying the phonemes in the audio file. In probability theory and statistics, a Markov process can be thought of as 'memoryless': loosely speaking, a process satisfies the Markov property if one can make predictions for the future of the process based solely on its present state just as well as one could knowing the process's full history. In other words, conditional on the present state of the system, its future and past are independent.

A HMM is a statistical Markov model in which the system being modeled is assumed to be a Markov process with unobserved states. A HMM can be considered the simplest dynamic Bayesian network. Hidden Markov models have application in temporal pattern recognition such as speech, handwriting, gesture recognition, part-of-speech tagging, musical score following, partial discharges and bioinformatics.

The pronunciation of each transliterated word in the dictionary is expected to end with a short pause phoneme (sp); thus, the "sp" unit will also appear in the hidden Markov model. Using the HMM, the language learning system may parse the phonetic representation (potentially alongside the phones file described above) and the audio file, matching symbolic phonemes from the phonetic and/or pitch representation to the audio phonemes in the audio file.

Similarly, the HMM may extract pitch patterns/cantillations from the audio representation and match the extracted pitch patterns to the pitch patterns/cantillations identified in the pitch representation.

In some embodiments, step 100 may be carried out in a similar manner to steps 42-48 from FIG. 3H.

Alternatively or in addition to the techniques described above, the forced alignment may be performed according to a best-fit combinatorial analysis. A combinatorial analysis, from the perspective of a forced alignment technique, uses expected timings of the inputs in order to determine which phoneme/word/cantillation was most likely spoken/chanted in the recording For example, different pitch patterns or chanted words may vary in length from speaker to speaker. However, the length of pitch patterns or chanted words may be consistent for a particular speaker (although in some applications there is a high degree of consistency between speakers).

Thus, the system may learn (e.g., using training data, or by matching particular phonemes/cantillations to average times or time ranges using the procedures discussed above) a set of expected timings for the units of expression in a recording. For example, the timings may be stored in a data structure such as a table, a database, or the above-described phones file, verse dictionary, or pronunciation dictionary. When a new unit of expression is next received, the stored timings may be consulted in order to determine a most-likely match for the unit of expression.

It is noted, however, that a speaker's timings may be varied depending on cultural affiliation, reading type, etc. For example, a reading from two different works, or at different times of the year, may vary in tempo. Thus, a combinatorial analysis may need to be performed while taking these differing contexts into account.

At step 102, the start and end times of words or pitch patterns in the audio may be determined. In the previous step 100, the audio phonemes and/or pitch patterns were identified in the audio file. Using this identification, the system may note an end time in the audio file for each word, phoneme, verse, or pitch pattern in the audio file. For example, the language learning system may query audio playback or audio analysis logic to determine the end time of the phoneme, word, verse, or cantillation. In exemplary embodiments, timings are noted in units of 0.001 seconds, although this value may be varied depending on the application.

In some embodiments, a start time for each phoneme, word, verse, or cantillation may also be noted. In other embodiments, the start time for each phoneme, word, verse, or cantillation may be assumed to be the ending time of the previous phoneme, word, verse, or cantillation (possibly with a buffer for silence, as may be appropriate). The process may also be carried out in reverse, wherein the start time for the phoneme, word, verse, or cantillation is noted, and the ending time of the previous phoneme, word, verse, or cantillation is assumed to be the same as the starting time for the current phoneme, word, verse, or cantillation.

An identification of the phoneme, word, verse, or cantillation may be written to an alignment file. The start and/or end time of the phoneme, word, verse, or cantillation may also be written to the alignment file.

At step 104, the alignment file may be output. For example, the alignment file may be stored to a memory associated with the language learning system, or may the forced alignment may be performed on a server and the alignment file may be transmitted to a remote client.

Optionally, the alignment file may be merged with additional text to produce a playlist containing both the as-written and as-spoken language. In this embodiment, the verse dictionary (or other phonetic representation) may be parsed along with a representation of the as-written text. The as-written text may be parsed into word segments in a similar manner as described above with respect to the phonetic representation; the differences are that most typography is maintained intact and that the as-written text is retained with the corresponding as-spoken language in the data structure.

At the end of the parsing step, the word segments may be merged into words, occasionally requiring the duplication of word segments that are identical in the written and spoken language, but must be merged with different written versus spoken segments. The parsed transliteration playlist is then merged with the above-described data structure; the as-spoken language essentially replaces the transliteration, but the as-written language may be grouped into word sequences and the corresponding collection of cantillations and word identifiers, together with the start and end times for the sequence may be placed in the alignment file.

Following step 104, the alignment file may be used in other aspects of the computerized language instruction system, such as highlighting words or cantillations on a display as they are displayed (where the alignment file is cross-referenced against the play time reported by the audio playback logic).

VI. Tropes

It can be particularly advantageous to be able to select a particular trope, or family of tropes, and to cause the language learning system to play audio corresponding to those trope or trope families. Exemplary embodiments provide such a capability.

Figure 7A:
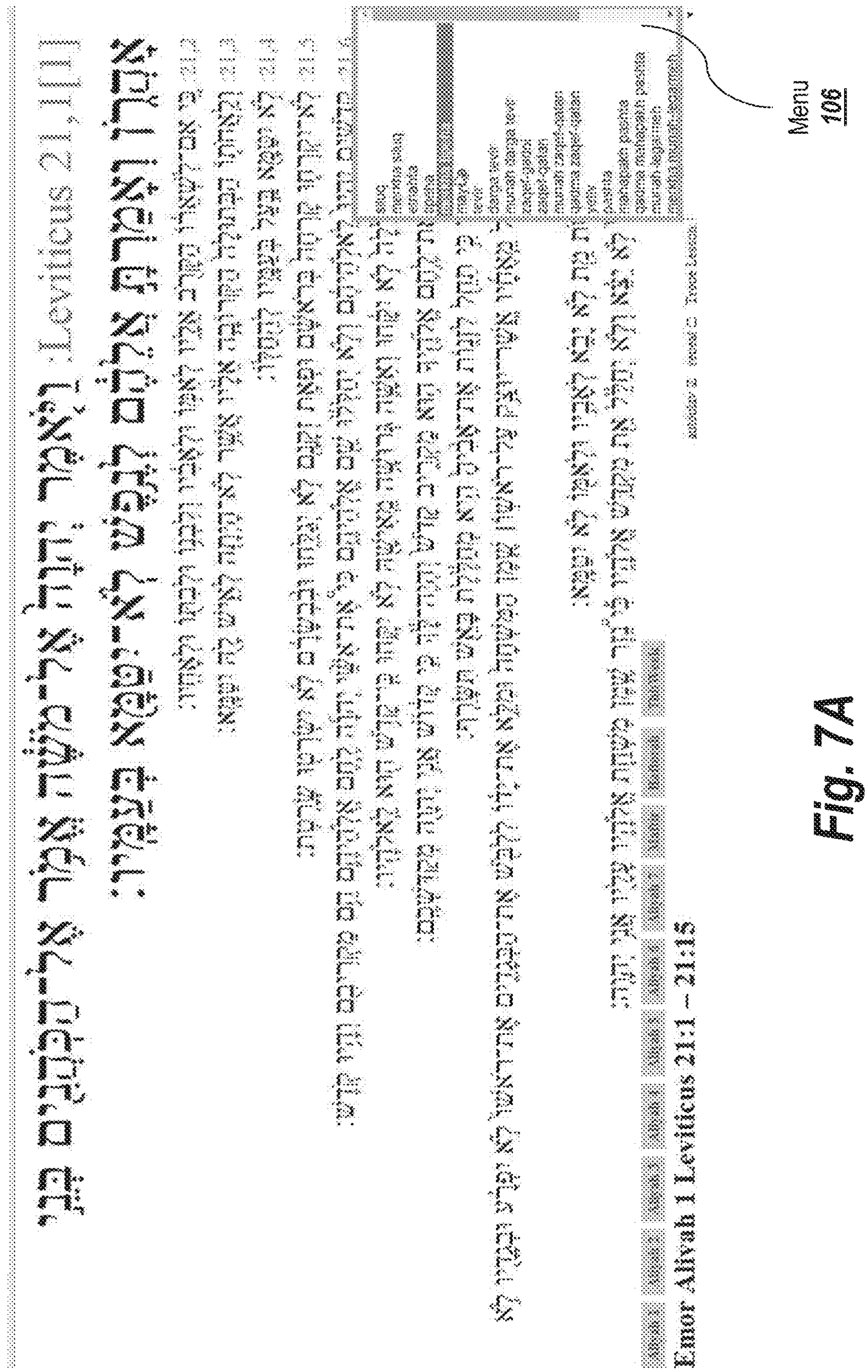
FIGS. 7A-7B depict an example of a trope search.
Figure 7B:
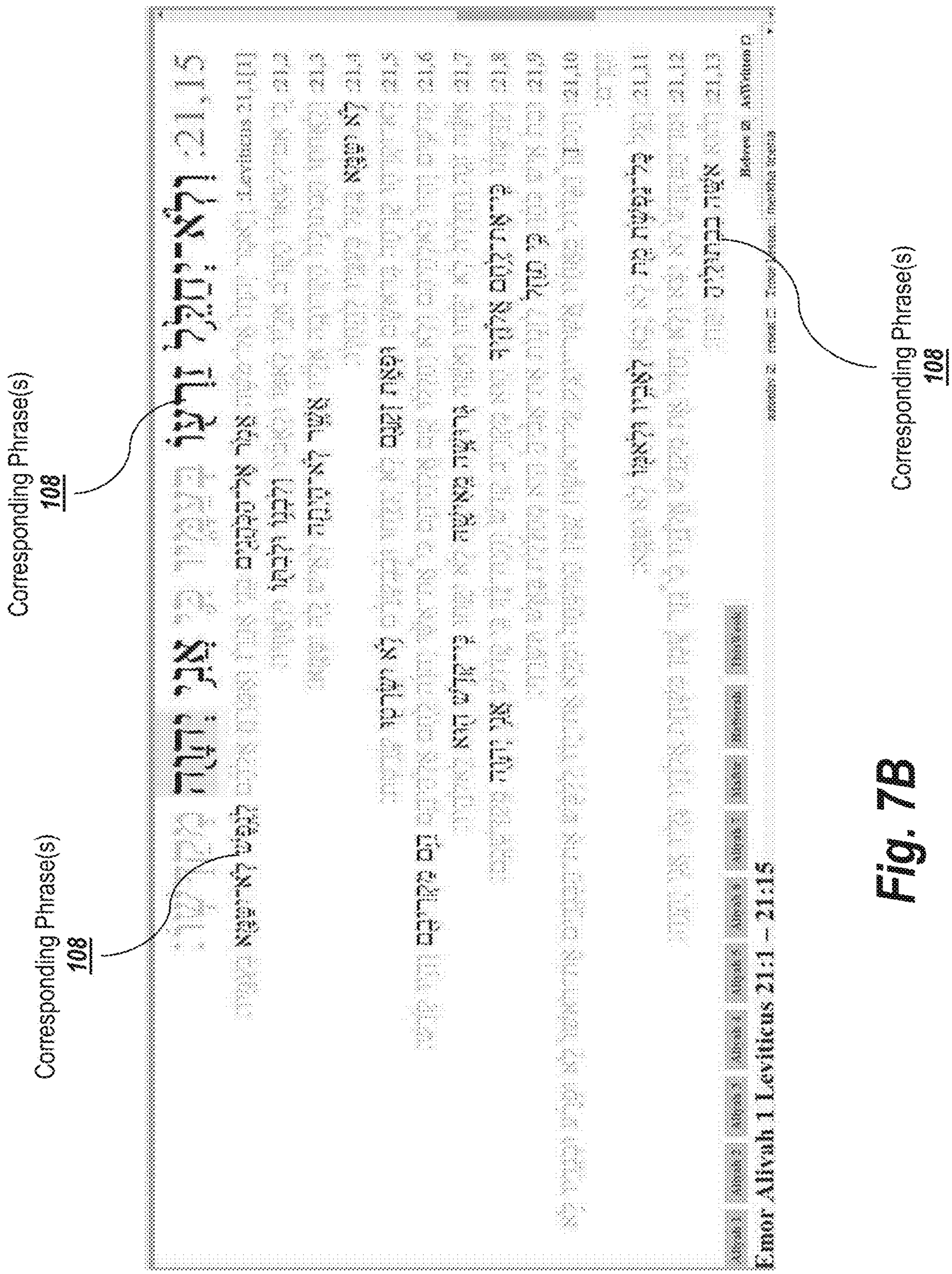

For example, FIGS. 7A-7B depict an exemplary interface for searching a work for a particular trope. As shown in FIG. 7A, a menu 106 of different tropes or trope families may be presented while viewing a work. Upon selecting a particular trope or trope family from the menu 106, the work may be searched for the trope. Words or phrases 108 corresponding to the identified trope may be visually in the display, as shown in FIG. 7B (i.e., the darkened words), and a currently-played word may be further visually distinguished (as also shown in FIG. 7B by the highlighted word).

Figure 8:
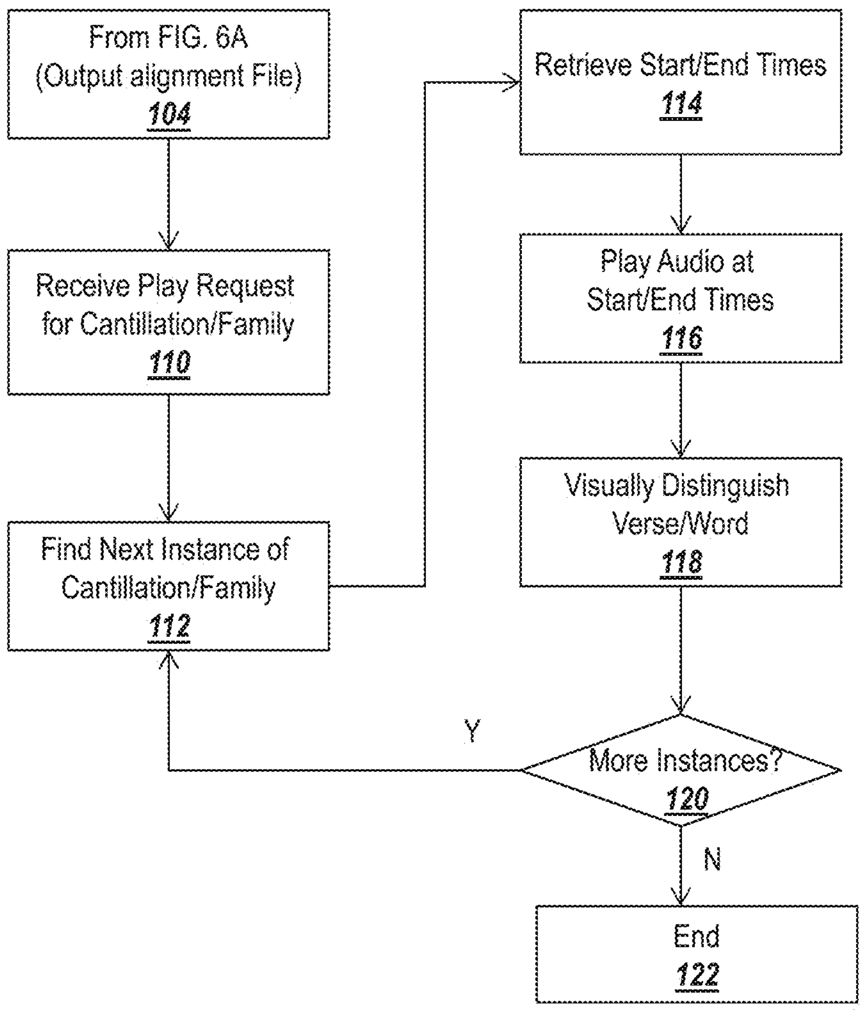
FIG. 8 is a flowchart describing an exemplary procedure for performing a trope search.

FIG. 8 depicts a flowchart of an exemplary method for performing a trope search. It is noted that, prior to the method depicted in FIG. 8, the processing of FIG. 6A may occur so that an alignment file is output. The alignment file may specify timings for the cantillations or pitch patterns in an audio file.

At step 110, a request to play an identified cantillation, group of cantillations organized into a cantillation family, or pitch pattern may be received. The request may specify the pitch pattern, cantillation or cantillation family using an identifier associated with the cantillation or cantillation family (e.g., refer to table 3, above, and table 6, below). The request may be, for example, a selection from a menu, as in FIG. 7A, an identification through textual input, or some other indication of the pitch pattern (e.g., by pressing a key or mouse button while a particular cantillation is otherwise playing).

At step 112, the language learning system may find the next instance of the cantillation or a member of the cantillation family in the text. In one embodiment, the language learning system may look up the requested pitch pattern in the above-noted alignment file to retrieve one or more requested start times and/or one or more requested end times for the requested pitch pattern. The language learning system may search the entire alignment file or the entire work, or only a portion of the alignment file or work. For example, if a portion of the work is currently displayed on a display device or in a web browser, the language learning system may search only a portion of the work corresponding to the displayed portion. Alternatively or in addition, the language learning system may search only within a currently-playing verse or chapter of the work, or a selected verse or chapter.

At step 114, the language learning system may retrieve the start/end times of the identified instance of the cantillation or member of the cantillation family from the alignment file. The language learning system may identify a current location of playback in the audio file, or a current location at which the display of the work is focused, and may search among the instances identified at step 112 for the next instance as compared to the current location. The language learning system may cross reference the current location with the alignment file to determine start times and/or end times for the requested pitch pattern, cantillation, or member of the cantillation family.

At step 116 the language learning system may play the audio file using the timings indicated by the alignment file. This may involve, for example, playing the audio file at the above-identified start time(s) until the above-identified end time(s) to output instances of the requested cantillation, cantillation family, or pitch pattern from the audio file.

At step 118, the language learning system may visually distinguish a word or verse to which the currently-played cantillation or member of the cantillation family is applied. If a textual representation of the work is already displayed, the system may shift focus to the identified next instance of the cantillation or member of the cantillation family (e.g., by making the word or verse corresponding to the identified cantillation or member of the cantillation family the top-most or centered word or verse in the display). If a textual representation of the work is not yet displayed, a textual representation may be displayed.

Within the displayed textual representation, a word or verse of the textual representation corresponding to the currently-played portion of the audio recording may be visually distinguished (such as by highlighting, modifying the font, modifying the size, modifying the position, etc.).

At step 120, the language learning system may determine whether any more instances of the cantillation or cantillation family exist in the searched portion of the work. For example, if multiple instances of the cantillation or cantillation family were identified at step 112, then processing may return to step 112 and the next instance may be selected.

In some embodiments, looking up the requested pitch pattern and playing the audio file may be performed sequentially so that the requested pitch pattern is played as each instance of the requested pitch pattern is located in the alignment file. In other embodiments, looking up the requested pitch pattern and playing the audio file are performed in series such that each instance of the requested pitch pattern is located before the audio file is played.

Alternatively or in addition, the pitch patterns may relate to symbolic units of expression organized into verses and displayed on a display, and looking up the requested pitch pattern and playing the audio file may be performed sequentially by verse such that each instance of the requested pitch pattern in a given verse is located before the audio file is played for the given verse, and then the requested pitch pattern is searched and the audio file is played for a next verse.

Processing may then repeat through steps 112-120 until no further instances of the pitch pattern, cantillation, or cantillation family are identified in the searched portion of the work. Once the answer at step 120 is "NO," then processing may proceed to step 122 and end.

VII. Teaching Process

According to some exemplary embodiments, readings and/or lessons may be associated with particular dates. The dates associated with particular readings and/or lessons may be determined due to traditional practices (as in the case where Bible readings are traditionally performed on designated dates of the Hebrew calendar which may vary from year to year in a 19-year cycle) or may be assigned based on a set of identified best practices (such as a triennial reading).

An exemplary calendar and corresponding set of readings/lessons is shown in FIG. 8. As shown in FIG. 8, dates on the Gregorian calendar (left side) are mapped to dates in the Hebrew calendar (right side), and particular readings (center) are assigned to each date.

Exemplary pseudocode for converting a Gregorian date into a Hebrew date is shown in FIGS. 9A-9C. FIG. 9A depicts pseudocode for converting a Jewish Date (i.e., a date according to the Hebrew Calendar) into a Julian Day. FIG. 9B depicts pseudocode for converting a Julian day into a Jewish Date. FIG. 9C depicts pseudocode for converting a Julian Day into a Gregorian Date.

In the accompanying pseudocode, dates have the following attributes:

tod one of 'e', 'm', 'a'
date datetime.date [note: raise ValueError if out of range]
datetime datetime.datetime [note: raise ValueError if out of range]
hdate (year,month,day,tod) using hdate month numbering
jdate (year,month,day,tod) using jdate month numbering
bdate (year,month,day,tod) using bdate month numbering
year Jewish year
month 1-based numeric Jewish month [depends on whether hdate, jdate, or bdate]
day 1-based numeric day of month
dayofyear day of year, where 0 is RoshHashana
week of year week of year; where weeks end on Shabbat, and RoshHashana falls in week 0
dayofweek day of week, where 0 is Shabbat
yeartype an integer in range (14) specifying
julianday the Julian day [note: a Jewish date with tod 'e' has a 1-smaller julianday than the same Jewish date with 'm' or 'a']
gstrings (year, month, day, day of week) where
  year is the Gregorian year as a string of 3 or 4 digits
  month is the Gregorian month name
    [January, February, March, April, May, June, July, August, September, October, November, December]
  day is the Gregorian day of month as a string of 1 or 2 digits
  day of week is the day name
    [Sunday, Monday, Tuesday, Wednesday, Thursday, Friday, Saturday]
  [note: raise ValueError if out of range]
and the following class attributes:
DOWLOY a tuple to be indexed by yeartype to give (dow,loy), where
  dow is the dayofweek of RoshHashana, and
  loy is the number of days in the year
MONTH a tuple to be indexed by month-1 to give the month name Internally, Jewish dates are stored as a Julian day and a time of day (−1, 0, 1 representing 'e', 'm', 'a', respectively).

The externally visible Julian day, for both input and output, is 1 less than the internal Julian day when the time of day is −1.

The internal Julian day is used for conversion to/from Jewish date, while the externally visible Julian day is used for conversion to/from Gregorian date.

Once the Hebrew date has been calculated, a Torah, Maftir, or Haftorah reading corresponding to the calculated date may be determined. Exemplary pseudocode for selecting a reading is shown below:

parshanum(s,h) returns the parsha number (an index into parshaname) for the date specified by h. If h is not a Shabbat, it returns 0. Only standard parsha numbers (1 thru 61), or 0, are returned. The algorithm used is a straightforward translation of libhdate/hdate_parasha.c.

shabbatparsha(cycle,date,diaspora,namext='') returns a Shabbat shacharit parsha for the specified date and variant, and with the specified namext. It raises an exception if there is no standard parsha for the specified date and variant. shabbatparsha first calls parshanum to get the pnum, and gets the parsha name pname=parshaname [pnum]. It looks up the aliyot in parshot[pname], picking the appropriate set based on cycle and (if cycle is '3' [triennial]) phase=(date.year+1)%3. For Pinchas, it checks if date.day >17, in which case it replaces the Haftorah with the one from Matot, and sets namext to 'after 17 Tammuz'. It checks for Machar Chodesh or Rosh Chodesh, adding ',' to namext if namext is nonempty. If Machar Chodesh (date.day==29), it replaces the Haftorah with '8a2018-42' and appends 'Machar Chodesh' to namext. If Rosh Chodesh (date.day in (1,30)), it replaces the maftir with '42809-15' and the Haftorah with '106601-24' and appends 'Rosh Chodesh' to namext. It then returns the parsha.

shabbat(b,n,d=None), where b is a (morning) bdate, n is an integer, and d is a duration in days, returns a generator yielding pairs of the form (string, bdate).

shabbat first computes shabbat0, the bdate of the (n+1)th shabbat >=b if n>=0 or the -nth shabbat <=b if n<0. If not d, shabbat yields ('',shabbat0). Otherwise, it yields successively (str(k+1), shabbat0+7*k) while shabbat0+7*k<b+d, starting at k=0 and incrementing k. Note that the only holiday for which d is needed is Shabbat Chanukah.

notshabbat(b,d), where b is a (morning) date, and d is an offset, returns a generator yielding ('',b) if b is a weekday and ('',b+d) otherwise. This is used for minor fasts.

sequence(b,d), where b is a (morning) date and d is a duration in days, returns a generator yielding pairs (str(i), b+i) for i in range(d). This is used for Rosh Hashana, Sukkot, Chanukah, Pesach, and Shvuot.

holidays(diaspora,year) returns a SortedDict of holidays in the given Jewish year, ordered chronologically. It chains holidates and holidatesd if diaspora, otherwise it uses holidates directly. It builds the SortedDict d, by going through all the entries of the table(s), and for each entry (name,days):

Set the date to the specified year with the month and day from days[0:2]. If len(days) is 2, this is the exact date, so set d[date] to name. Otherwise, if days[2] is an integer, add days[2] to date, and as long as name doesn't begin with 'Machar' or date falls on Shabbat, set d[date] to name (but if name does begin with 'Machar' and it's a weekday, go on to the next entry). Otherwise, use the generator days[2](date, *days[3:]) to produce (suffix,day) pairs and, for each, set d[day] to name+','+suffix if suffix else name.

When all the entries have been processed, sort d.keyOrder in place and return d.

holiday(diaspora,date) calls holidays(diaspora,date.year) to get the specified year's holidays, and then returns the entry for that date with tod='m', or None.

The following methods are used by find_parsha to construct parsha instances for holidays. As used below, "DCD" is an abbreviation for "date, cycle, diaspora", parameters used to produce the parsha constructor arguments date [date] and variant [2*(cycle=='3')+diaspora].

Fast(pname,cycle,date,diaspora). If date.tod is 'e', date+=1/3. Return parsha based on DCD, parshaname.index (pname), and parshot['Fast'], but remove Haftorah if date.tod is 'm'.

RoshHashana(day,cycle,date,diaspora). If date.tod is 'a', return None. If date.tod is 'e', date+=1/3. Set pname to 'Shabbat Rosh Hashana' if date.dayofweek is Shabbat, 'Rosh Hashana II' if day, else 'Rosh Hashana I'. Return parsha based on DCD, parshaname.index(pname), and parshot[pname].

TzomGedaliah(cycle,date,diaspora). Return Fast('Tzom Gedaliah',cycle,date,diaspora).

ShabbatShuva(cycle,date,diaspora). If date.tod is 'a', return None. If date.tod is 'e', date+=1/3. Take shabbatparsha(cycle,date,diaspora, 'Shabbat Shuva'), replace its Haftorah vlist with '131402-10,180718-20,140215-27', and return it.

YomKippur(cycle,date,diaspora). If date.tod is 'e', date+=1/3. Set oname to 'Yom Kippur'. If date.tod is 'a', set pname to 'Yom Kippur Mincha', else: set oname to 'Shabbat Yom Kippur' if date.dayofweek is Shabbat and set pname to oname. Return parsha based on DCD, parshaname.index(oname) and parshot[pname].

Sukkot(day,cycle,date,diaspora). If date.tod is 'a', return None. If date.tod is 'e', date+=1/3. Set pname to 'Sukkot'+str(day+1). If day is 1, and diaspora, return parsha based on DCD, parshaname.index(pname), and parshot['Sukkot 1'], and with Haftorah vlist replaced by '9a0802-21' [diaspora day 2=day 1 with different Haftorah]. Set p to parshot[pname]. If a weekday, return parsha based on DCD, parshaname.index(pname), and p. Otherwise, set pname to 'Shabbat'+pname. If day not 0, remove ordinal from pname (so pname is 'Shabbat Sukkot') and return parsha based on DCD, parshaname.index(pname), and parshot[pname], with maftir vlist replaced by p['4']. Otherwise (Shabbat Sukkot 1), return parsha based on DCD, parshaname.index(pname), parshot[pname], but with scroll (aliyah 'x') removed if diaspora [because in diaspora, scroll is read on Shmini Atzeret].

ShminiAtzeret(cycle,date,diaspora). If not diaspora, return SimchatTorah(cycle,date,diaspora). Else, if date.tod is 'a', return None. If date.tod is 'e', date+=1/3. Set pname to 'Shmini Atzeret', or 'Shabbat Shmini Atzeret' if on Shabbat. Return parsha based on DCD, parshaname.index(pname), and parshot[pname].

SimchatTorah(cycle,date,diaspora). If date.tod is 'a', return None. Set pname to 'Simchat Torah', or 'Erev Simchat Torah' if date.tod is 'e'. Return parsha based on DCD, parshaname.index('Simchat Torah'), and parshot[pname].

Chanukah(day,cycle,date,diaspora). If date.tod is 'a', return None. If date.tod is 'e', date+=1/3. Set pname to 'Chanukah'+str(day+1). If a weekday, then if also Rosh Chodesh (date.day in (1,30)), return parsha based on DCD, parshaname.index(pname), parshot['Rosh Chodesh'], but with aliyah 4 replaced by aliyah 3 from parshot['Chanukah'+str(day)] and with namext='Rosh Chodesh'; and otherwise return parsha based on DCD, parshaname.index(pname), and parshot[pname]. If Shabbat, set p to shabbatparsha(cycle,date,diaspora,'Shabbat Chanukah'). If Rosh Chodesh (date.day in (1,30)), add aliyah '8' with vlist '42809-15'. Set the maftir vlist to the sequence of verses in parshot[pname]. Set the Haftorah vlist to '230214-407' if day<7 else '9a0740-50'. Return the resulting p.

TenTevet(cycle,date,diaspora). Return Fast('Tenth of Tevet',cycle,date,diaspora).

ShabbatShekalim(cycle,date,diaspora). If date.tod is 'a', return None. If date.tod is 'e', date+=1/3. Set p to shabbatparsha(cycle,date,diaspora,'Shabbat Shekalim'). If Rosh Chodesh, add aliyah '8' with vlist '42809-15'. Set maftir vlist to '23011-16' and Haftorah vlist to '9b1201-17'.

ShabbatZachor(cycle,date,diaspora). If date.tod is 'a', return None. If date.tod is 'e', date+=1/3. Set p to shabbatparsha(cycle,date,diaspora,'Shabbat Zachor'). Set maftir vlist to '52517-19' and Haftorah vlist to '8a1502-34'.

FastOfEsther(cycle,date,diaspora). Return Fast('Fast of Esther',cycle,date,diaspora).

Purim(cycle,date,diaspora). If date.tod is 'a', return None. Set pname to 'Purim'. Return parsha based on DCD, parshaname.index(pname), and parshot[pname], but if date.tod is 'e', remove all the aliyot except for the scroll.

ShabbatParah(cycle,date,diaspora). If date.tod is 'a', return None. If date.tod is 'e', date+=1/3. Set p to shabbatparsha(cycle,date,diaspora,'Shabbat Parah'). Set maftir vlist to '41901-22' and Haftorah vlist to '123616-38'.

ShabbatHaChodesh(cycle,date,diaspora). If date.tod is 'a', return None. If date.tod is 'e', date+=1/3. Set p to shabbatparsha(cycle,date,diaspora,'Shabbat HaChodesh'). If Rosh Chodesh, add aliyah '8' with vlist '42809-15'. Set maftir vlist to '21201-20' and Haftorah vlist to '124516-4618'.

ShabbatHaGadol(cycle,date,diaspora). If date.tod is 'a', return None. If date.tod is 'e', date+=1/3. Set p to shabbatparsha(cycle,date,diaspora,'Shabbat HaGadol'). Set Haftorah vlist to '240304-24'.

FastOfFirstBorn(cycle,date,diaspora). Return Fast('Fast of First Born',cycle,date,diaspora).

Pesach(day,cycle,date,diaspora). If date.tod is 'a', return None. If date.tod is 'e', date+=1/3. Set pname to 'Passover'+str(day+1). If a weekday, return parsha base on DCD, parshaname.index(pname), and parshot[pname]. Else, set pname to 'Shabbat'+pname. If day not in (0,6,7), remove ordinal from pname (so pname is 'Shabbat Passover'). Return parsha based on DCD, parshaname.index(pname), and parshot[pname].

Shvuot(day,cycle,date,diaspora). If date.tod is 'a', return None. If date.tod is 'e', date+=1/3. Set pname to 'Shvuot'. If day [second day of Shvuot], append ' 2' to pname (so 'Shvuot 2') if weekday or set pname to 'Shabbat Shvuot'. Return parsha based on DCD, parshaname.index(pname), and parshot[pname].

SeventeenTammuz(cycle,date,diaspora). Return Fast('Seventeenth of Tammuz',cycle,date,diaspora).

NineAv(cycle,date,diaspora). Set pname to "Tisha B'Av". If date.tod is 'a', return Fast(pname,cycle,date,diaspora). Return parsha based on DCD, parshaname.index(pname), parshot[pname], but remove all aliyot except for the scroll if date.tod is 'e' and otherwise remove the scroll.

It is noted that the reading for the day may also be selected manually (e.g., by a cantor) by providing a range of verses for the reading or by indicating the date, the geographic location of the synagogue, whether the community is Ashkenazi, Sephardic/near-eastern, or Yemenite, and whether the community reads the entire Torah in one year or three years.

Once the appropriate reading is determined, one or more audio files containing a recording of the reading may be selected and played. A written representation of the reading may be displayed, and the audio may be played in synchronicity with the display and/or highlighting of the written representation.

The above-described components may also be used to select an appropriate audio recording for a verse in the reading for the present day. The same verse may be represented in two or more different ways in some circumstances. For example, the pitch pattern used to represent the end of the verse may be a first pitch pattern when the verse falls at the end of a reading and a second pitch pattern when the verse falls in the middle of a reading. Depending on the day, the same verse might fall either in the middle of the reading for the day or the end of the reading for the day. Moreover, some verses will be chanted in a distinctive melody different from the conventional melody for that community depending upon the Hebrew date. For example, the verses read on the High Holidays, Rosh Hashanah and Yom Kippur are chanted in a special holiday melody.

Accordingly, in exemplary embodiments, two or more audio representations of the same reading may be stored in a storage medium. The audio representations may differ, for example, in terms of the ending pitch pattern which is used to designate an endpoint of a reading for a particular date. A first type of audio representation may be designated as an "end of reading" representation, while a second type may be designated as an "end of verse" representation. Alternatively, the audio representations may differ in terms of the cantorial melody used on the entire verse as is the case, for example, on the Jewish New Year or Day of Atonement.

Upon calculating the reading for the day, location, and community, as described above (or upon a manual designation of a range of verses representing a reading), the system may identify the verse that is present at the end of the reading (i.e., the last verse in the range of verses determined or designated above). An audio file corresponding to an "end-of-reading" pitch pattern may be used for this verse. The "end-of-verse" audio files may be used for the other verses in the reading. Moreover, the system may identify a verse that is chanted in a distinctive holiday melody or a regular Shabbat melody.

VIII. Sequence of Lessons

When learning cantillations, tropes, or pitch patterns, the student may learn the cantillation, trope, or pitch pattern according to families. For example, in the context of the Hebrew Bible, each Torah or Haftorah Trope can represent a pitch pattern that corresponds to intonation of a word.

A trope family is set of tropes that commonly occur together. Trope families are often distinguished either by the presence of a particular strong disjunctive trope or by the presence of an uncommon trope. Trope families commonly have four or five tropes. A member of a trope family may have all tropes of the family, however, a member of a trope family may, in some instances, have one or more tropes omitted. For example, a member of a trope family may have one of the non-distinguishing tropes replaced by another non-distinguishing trope.

Phrases may be selected from the Hebrew Bible that match a particular trope family. Embodiments of the computerized language instruction system provide several approaches in this regard. According to one embodiment, an entire work (such as the Hebrew Bible), or any particular collection of verses therefrom, may be scanned to return the verses that satisfy the trope family.

Another approach scans a collection of verses designated by the student's teacher to which the teacher has provided audio of the teacher chanting said collection of verses. With that second approach, the system plays the chanting of a particular trope family with a plurality of one or more examples.

These embodiments may make use of the above-described verse dictionaries and/or forced alignment procedures.

In each lesson, the student may listen to examples of a trope family. The student repeats those examples. It is preferable for the student to recite the examples together with the (recording of) teacher. The student practices chanting with the particular trope examples, with the teacher's chanting volume set lower and lower, and eventually set to silent, so that only the student's chanting remains.

Trope families may be taught sequentially. For example, in the case of biblical Hebrew, the first trope family to be taught may be mercha tipkha merca sof-pasuq. This family is known as the sof-pasuq in denotation of the strongest disjunctive cantillation that can be found within a single verse. A variant on this family includes the intonation for sof-pasuq when it is ending an aliyah, then called sof-aliyah. The tipkha is a highly disjunctive trope and carries some melodic burden of the sof-pasuq/aliyah family. This cantillation denotes the end of a verse or the end of an aliyah. There is no distinction on the verse symbolic level to distinguish sof-aliyah. However, it is known that the last verse in an aliyah should be chanted with the sof-aliyah cantillation instead of sof-pasuq. An embodiment of the computerized language instruction system can provide either a table or an algorithmic calculation that determines sof-aliyah, whether in accordance with the annual or triennial cycle. Exemplary embodiments may also account for cultural differences, such as whether the congregation that the student is from is conservative or reform, in the Diaspora or the land of Israel. Likewise, a teacher may assign an "aliyah" length somewhat arbitrarily.

The second trope family to be taught may be merkha tipkha munach etnachta. This family is known as the etnachta family as the most disjunction trope therein is the etnachta. The etnakhta is present in an overwhelming number of verses. It functions to divide the verse syntactically and semantically, like a semicolon. The tipkha of this family carries some of the burden of the etnakhta.

In a third lesson, the student may learn kadma mahapakh pashta munach zekeif-katon.

Another lesson teaches, darga tavir. Another lesson teaches munach zarqa munach segol. Another lesson is munakh (legarme) munakh revii. Another lesson is kadma v'azla.

The trope lessons may proceed as shown in the table below. The Arabic number roughly corresponds to a lesson plan for which week of teaching to cover each trope family.

TABLE 6

| Trope Families and Lesson Order |
|---|
| First level phrases |
| 1. (Mercha) Tifcha (Mercha) Sof-Pasuq |
| 1. (Mercha) Tifcha (Munach) Etnachta |
| Second level phrases |
| 2. (Mahpach) Pashta (Munach) Zaqef Qaton |
| 2. Zaqef Gadol |
| 3. (Munach) Zarqa (Munach) Segol |
| 3. Shalshelet |
| Third level phrases |
| 4. Munach ǀ Munach Revia |
| 4. Revia |
| 4. Munach Revia |
| 4. Munach-with-Pesiq Revia |
| 4. Munach-with-Pesiq Munach Revia |
| 5. Darga Tevir |
| 5. Darga Munach Revia |
| 5. Tevir is found either alone or preceded by Darga or Mercha. Darga occasionally precedes other combinations (e.g. Darga Munach Revia). |
| 5. Mercha Kefula |
| Fourth level phrases |
| 6. Telisha Qetannah/Gedolah |
| 6. Pazer |
| 7. Yerach ben Yomo |
| 7. Qarnei Farah |

FIGS. 13A, 13B depict a plurality of embodiments with exemplary mirror-cantillated masoretic transliterations of a Hebrew symbolic on Windows 10. At 1310, a Chrome browser-based embodiment of Mirror-cantillation masoretic transliteration of a canonical trope song. At 1320, a Firefox browser-based embodiment of Mirror-cantillation masoretic transliteration of a canonical trope song. At 1330, a Safari browser-based embodiment of Mirror-cantillation masoretic transliteration of a canonical trope song. At 1340, an Opera browser-based embodiment of Mirror-cantillation masoretic transliteration of a canonical trope song.

FIG. 14 depicts exemplary trope families for Torah trope and for Haftorah trope, these may correspond to some trope families described in Table 6, this figure may illustrate additional lessons and the sequences thereof in accordance with at least one embodiment.

FIG. 15 depicts a plurality of exemplary mirror-cantillated masoretic transliterations of a Hebrew symbolic. Style 1 depicts exemplary trope placement on the syllable. Style 2 depicts exemplary trope placement on the consonant. Optionally, it depicts a plurality of exemplary mirror-cantillated reversible romanization of a Hebrew symbolic. Optionally, it depicts an exemplary mirror-cantillated transliteration of a Jewish Ritual text. Further, whereby said mirror-cantillated transliteration flows in the direction of the text. That is left to right. Mirror-cantillated cantillations are flipped 180 degrees along the vertical access. Optionally, it depicts an exemplary mirror-cantillated masoretic transliteration. Any mirror-cantillated text is explicitly and symbolically cantillated as mirror refers to the flipping of an explicit or symbolic cantillation. For example, a mirror-cantillated symbolic results from a transliteration symbolic representation by flipping said at least one cantillation symbol on its vertical axis. It an exemplary embodiment this can be accomplished for example with webkit and/or html transform such as "-webkit-transform:scaleX(−1);" and/or "transform:scaleX(−1);" and/or "display: inline-block;"

FIG. 16 depicts a plurality of exemplary cantillated masoretic transliterations of a Hebrew symbolic. In this figure is an exemplary symbolic-cantillated transliteration representation of an at least one Hebrew Bible verse. Further it depicts an exemplary transliteration symbolic representation comprising an at least one cantillation symbol. Style 3 depicts exemplary trope placement on the syllable. Style 4 depicts exemplary trope placement on the consonant. Optionally, it depicts a plurality of exemplary cantillated reversible romanization of a Hebrew symbolic. Optionally, it depicts an exemplary explicitly-cantillated transliteration of a Jewish Ritual text. Further, whereby said explicitly-cantillated transliteration flows in the same direction as it would flow when present on Hebrew text. That is right to left. Optionally, it depicts an exemplary explicitly-cantillated masoretic transliteration.

An embodiment of the computerized language instruction system picks out recitations of words with specific trope families, or groups, or for individual trope marks from audio files accessible to the language learning system. These audio files may be from the student's synagogue's cantor or rabbi. They may be from that week's assigned readings. An explicitly-cantillated text may be referred to as a symbolically-cantillated text. The symbolically-cantillated text in FIG. 16 flows in the direction of the Hebrew cantillation and hence is not mirror-cantillated in contrast to FIG. 15, FIG. 13A, and FIG. 13B.

In some embodiments, the student may record themselves chanting a phrase/trope combination, and the language learning system may analyze the recording to determine whether the student's chanting matched an expected trope. For example, the method depicted in the flowchart of FIG. 3H, described above, may be used to determine whether a student's recorded reading matched a specified lesson based on the pronunciation dictionary.

Figure 17:
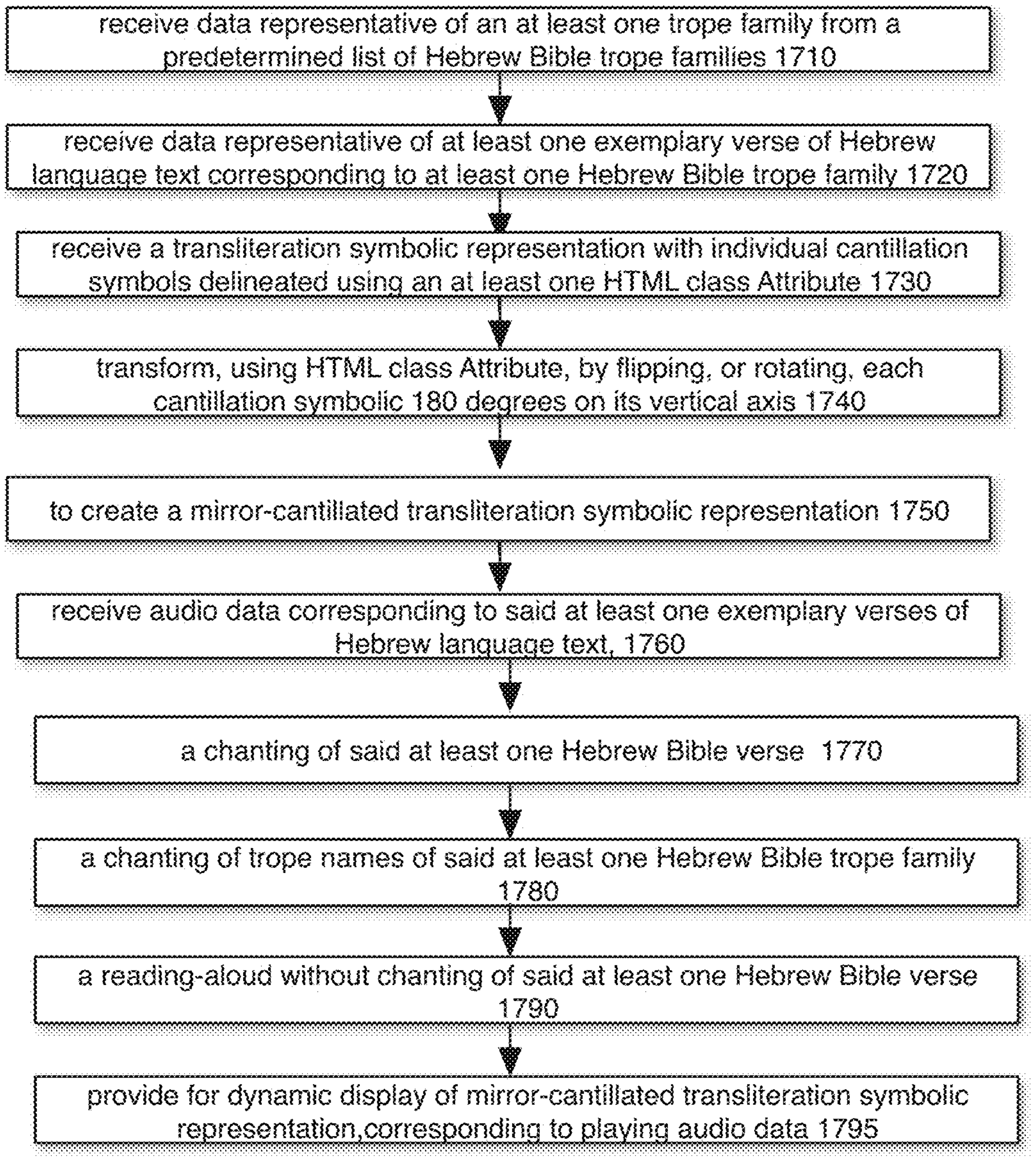
FIG. 17 depicts exemplary embodiment(s) of non-transitory computer-readable medium storing instructions that, when executed by a processor, cause the processor to do one or more of the steps therein.
Figure 18:
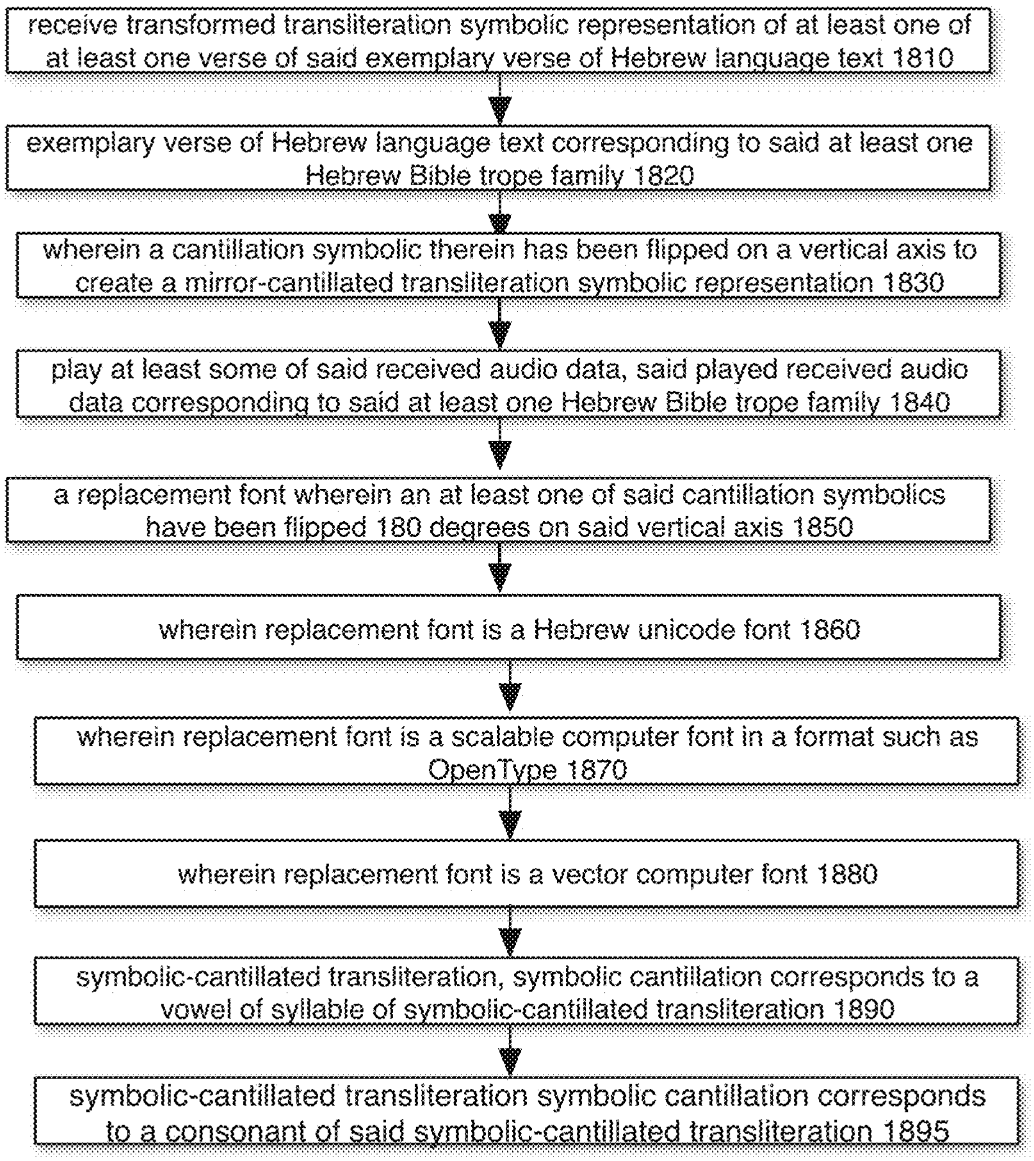
FIG. 18 depicts exemplary embodiment(s) of non-transitory computer-readable medium storing instructions that, when executed by a processor, cause the processor to do one or more of the steps therein.
Figure 20:
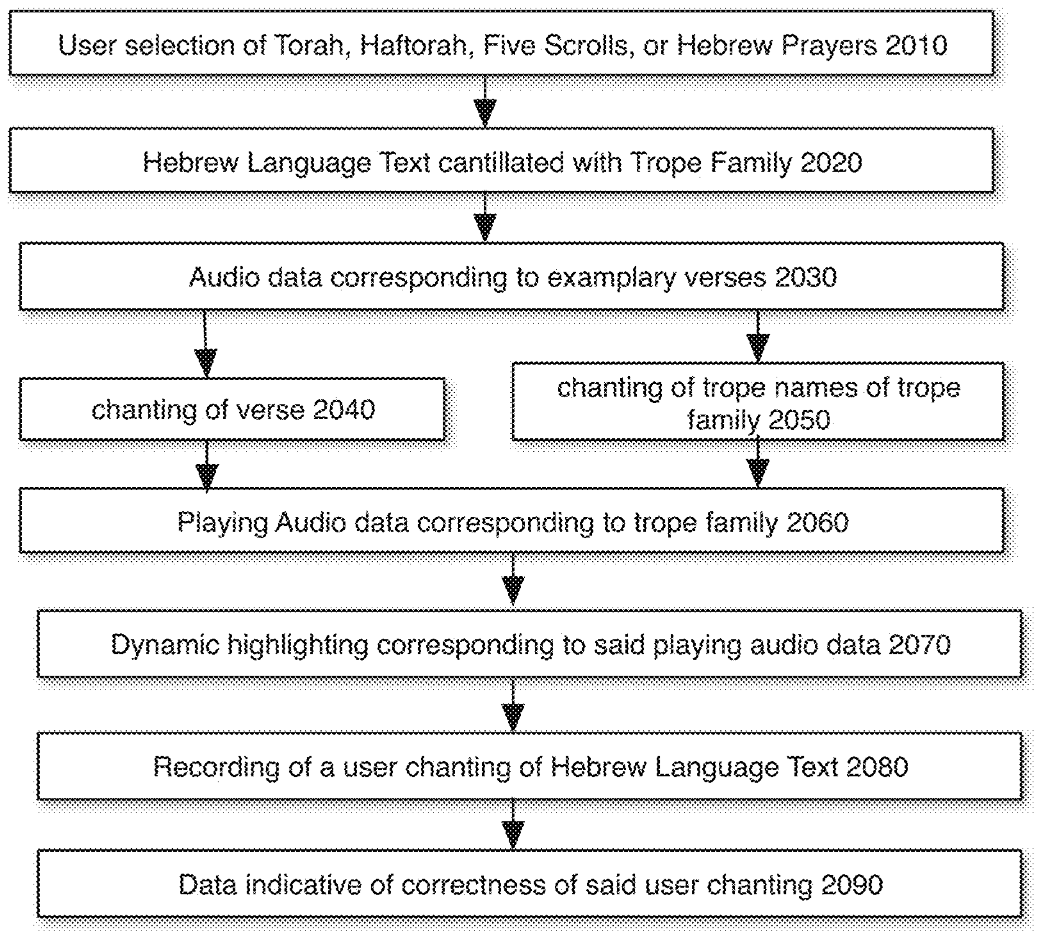
FIG. 20 is a flowchart depicting an exemplary method of a computerized language instruction system for teaching Hebrew Bible chanting.

FIGS. 17, 18, 20 depict exemplary embodiments of language learning according to principles of a plurality of embodiments of the computerized language instruction system. A user selects at least one of Torah, Haftorah, Hebrew Bible Scroll, and Hebrew prayers. Torah comprises the five books of Moses known as the Pentateuch. Haftorah comprise readings from the prophets as specified by the Sages that are read in correspondence to specific Torah readings or occasions during the Jewish year. Hebrew Bible Scroll specifically includes the Five Scrolls: Esther, Lamentations, Ecclesiastes, Song of Songs, and Ruth. Hebrew Bible text has been cantillated according to accepted masoretic tradition by the Masoretes as preserved in the Aleppo Codex, and also (with slight variations in) the Leningrad Codex. Hebrew Prayers for non-limiting example can be found in Siddur Sim Shalom for Shabbat and Festivals, 1998 by Leonard S. Cahan, or in The Koren Mesorat HaRav Siddur, A Hebrew/English Prayer Book with Commentary by Rabbi Joseph B. Soloveitchik, Nov. 1, 2011, or in The Koren Mesorat HaRav Siddur, A Hebrew/English Prayer Book with Commentary by Rabbi Joseph B. Soloveitchik, or in Artscroll Transliterated Linear Siddur: Sabbath and Festival (English and Hebrew Edition). Jewish liturgy includes Torah, Haftorah, Five Scrolls, and Jewish/Hebrew prayers. An examplary predetermined list of Hebrew Bible Trope families can be found in FIG. 14. Text can be any Hebrew or transliterated or transliterated-cantillated Text, but especially word-by-word, or verse-by-verse, or a plurality of words. A dynamic display is a changing display of Text, for example but not limited to word-by-word, or verse-by-verse, or a plurality of words, highlighting of Text in substantial synchrony with chanting of audio such that the highlighting of Text substantially moves as the chanted audio progresses. Dynamic highlighting is word-by-word, or verse-by-verse, or a plurality of words, highlighting of Text in substantial synchrony with chanting of audio such that the highlighting of Text substantially moves as the chanted audio progresses.

Chanting includes but is not limited to ritual recitation of Hebrew Bible Text substantially in accordance with the cantillation as interpreted by the Jewish Sages or as practiced in synagogues or Jewish Temples in North America. Cantillation symbols were defined by the Masoretes circa 900 of the common era. Cantillation has been used in Jewish ritual reading in Jewish houses of worship in the United States, Canada, Israel and abroad.

In Judaism, successful completion of a Bar/Bat Mitzvah may be a rite of passage from childhood to adulthood. Special needs children may have a particular need for a supportive environment and assistive technology to participate as much as possible like "all the other children." Many parents of special needs children may feel an impulsive urge to enable their children to fully feel accepted. Many children with special needs and/or learning style differences may turn around the trajectory of their lives by finding a model for success and emotional support. Many such children may benefit from a warm and supportive religious community that provides such assistive technology.

Upon reading Torah in a Jewish house of worship, typically two people each known as a Gabbai, one on each side of the Torah reader, will listen carefully and will correct the Torah reader in the event of mistakes. Mistakes that require correction include mistakes in either cantillation or pronunciation that may change the meaning of the Text. In many congregations, the Gabbai will correct any mistake that are substantial.

The data indicative of correctness can be generated by a human who listens to the audio and provides feedback such as accuracy of chanting particular Torah or Haftorah trope or accuracy of pronunciation. A special needs child may be particularly sensitive to public embarrassment and may be willing to invest significant self-study time with an embodiment of the computerized language instruction system to be very ready.

Attrition in Jewish Temples and/or synagogues may be reduced by increasing Jewish liturgical literacy and familiarity during the Bar/Bat Mitzvah learning process. Typically, parents may have limited liturgical familiarity and may have limited time to spend teaching their children directly. However, Jews who feel familiar with the liturgy and understand how Jewish ritual life can ground their lives, may be more likely to return and to stay, later in life. Many Jews may learn Hebrew and may learn Jewish ritual practice as a high school student who takes a single year of a foreign language, that may be just enough to get a taste, but not enough to be fluent and to enjoy reading a novel or the newspaper.

Embodiments of the computerized language instruction system may reduce estrangement for children either with or without special needs, by providing a tool for use between lessons to improve Jewish literacy and fluency.

The data indicative of correctness can be generated by a providing a visual graph that shows to the user a juxtaposition of features from a model voice against those features from a user voice. A visual learner may benefit from a graphic representation of features that are essential to chanting and differences with a model.

The data indicative of correctness can be generated by a computer by using machine learning such as sci-kit learn. A special needs child can benefit from the ability to learn without having an adult always present, for example, between lessons. A special needs child may not be emotionally present at lesson, or may not hear the model in session. A special needs child may need more practice that other children. A special needs child may have emotional challenges with a bar/bat mitzvah tutor or cantor, and prefer a more solitary experience between lessons. A special needs child with Asperger's syndrome may benefit as it allows more rapid learning not constrained by the frequency of in-person lessons. An introvert may prefer quiet time with an electronic device such as a phone, tablet, or computer, rather than more time with a human.

For an example implementation, this has resulted in a prediction engine more likely than not to correctly classify an individual trope audio snippet as its correct trope symbol. The process to do so may include feature extraction, with a potential focus on frequencies, notes, and/or pitch patterns. Frequencies that may be outside of human listening, and/or human audio production, range may be eliminated as potentially indicative of silence of the chanting. Frequencies may be converted into notes. Notes may be converted into pitch patterns. Frequencies that may be substantially identical, but not identical may be combined into single notes. Multiple notes that may be substantially identical, such as half-step away, may be combined into single notes of longer duration.

In such an exemplary implementation, an anchor note can start each pitch pattern; it is preferable to not combine all adjacent notes in gradually sloping pitch pattern, as that could be combined into a single long note. Rather, a threshold can be established to compare with the difference between the frequency of an anchor note and the current note, whereby beyond that threshold combination of notes may no longer occur.

In such an exemplary implementation, it is possible to start with a folder of audio clips for full verses and corresponding .htm annotations, it is reasonable to generate a CSV file for each distinct trope in the data set. Each file may contain a header with feature names and a row for each example of the trope with metadata and features. These files may be designed to be used to train classifiers. After the .htm files may be read to determine where each example of each trope may be located (index_trope), it may create individual WAV files for each trope example (make_segment or segment_verse). For each trope example, it may find the frequencies in the audio segment (find_frequencies) and it may translate those frequencies into sequences of notes (find_notes), then it may use those notes to generate features (GenerateFeatures.py). It may write the results to file.

In an example implementation, one may change find_frequencies to only look for frequencies within a specified range, one may change find_frequencies and find_notes to use amplitude to detect pauses between notes, one may make WAV file deletion optional.

In an example implementation, one may improve frequency detection, one may improve/expand features, one may set up mechanism for deleting/selectively saving audio segment WAV files so that large data sets take up reduced space, one may restructure so as to separate what is needed for feature extraction and what is specific to generating a training set.

In an example implementation, one may read the .htm files in the specified directory and may create a dictionary that maps each trope type to a list of its examples' locations, and potentially as well as a dictionary mapping each verse to a optional list of the start and end times for trope examples within it.

In an example implementation, one may takes file name, its directory, start time, and end time (both in milliseconds) and may create a WAV file of the specified segment, returning its file name.

In an example implementation, alternate versions may create multiple segments out of a single verse—one may make the program faster overall by potentially reducing the number of times each MP3 file needs to be decompressed.

In an example implementation, one may take the file name of an audio segment in .wav format and analyze it to produce a sequence of pitches. Each pitch may be paired with its amplitude.

In an example implementation, one may convert the output of find_frequencies into an array of arrays potentially representing notes, with each subarray preferably taking the form [pitch, duration]. Pitch numbers may represent the number of half-steps while duration numbers may represent number of consecutive frequency readings at that pitch. Frequencies whose amplitudes may be below the designated threshold may be assumed to represent silence and may be excluded from the output. Such silence detection may enable the function to combine consecutive notes of the same pitch, or it may still cause consecutive notes of the same pitch to remain separate.

In an example implementation, one may take as arguments a directory of features files and the name of a target file within that directory (excluding the .csv ending). One may use CSV feature files in the specified directory to build and/or test a classifier with the specified target, one may save either or both the model and a text file describing its parameters and/or test results. One may load data from substantially all files in the specified directory to train and/or test with, potentially distinguishing between the target file and all other files.

In an example implementation, one may use one or more of the following:

1. Read arguments
2. Build model
3. Test the provided classifier on the provided data
4. Rank features by importance
5. shuffle split,
6. logistic regression cv
7. adaboost with trees
8. Save model and its stats In an example implementation, one may further refine a classifier as follows with any of the following steps:

1. Test changes made to find_frequencies
2. Make necessary adjustments to find_frequencies and find_notes based on changes made
3. Test efficacy of current features using new frequency detection method
4. Make adjustments to existing features and add new features based on testing
5. Add new features based on interval sequences and combinations
6. Preferably repeat steps 3-5 until test model accuracy is relatively high
7. Build models A model chanting may typically be generated by a cantor or rabbi or bar/bat mitzvah tutor who may chant Hebrew Bible Text. A special needs child can benefit from the potential to build a closer relationship with the child's cantor or rabbi or bar/bat mitzvah tutor by hearing that teacher's voice as part of a potentially immersive system for learning to chant Hebrew Bible.

Indicia of results of comparing may typically be provided by a cantor or rabbi or bat/bar mitzvah tutor, or it may be presented visually to a user or it may be generated by a computer algorithm such as machine learning for example as described herein. Special needs children may benefit from specific indicia of results, for example, children with dyslexia may benefit from feedback related to transposition of letter or cantillation. For example, children with ADHD may benefit from frequent and/or gamified feedback. Children with autism spectrum disorder may benefit from encouraging feedback that remains honest. Children with Asperger's Syndrome may benefit from feedback on many examples. Children with Asperger's Syndrome may benefit from specific and nuanced feedback.

Transliterated Text corresponding to Hebrew Language Text may be text that is substantially orthographically related to the Text, that is substantially written in English letters, and preferably that is substantially able to be pronounced by an English speaker (or other target language of the transliteration). Special needs children may benefit from transliterated text as learning to read Hebrew letters can be perceived as challenging for any Jewish child or even for many Jewish adults.

Transliterated Cantillated Hebrew Bible Text may have the properties of Transliterated Text with embedded Torah and/or Haftorah cantillation symbols. Transliterated Cantillated Hebrew Bible Text may have the properties of Transliterated text with embedded alternative symbols which have a substantial mapping to Torah and/or Haftorah cantillation symbols. Special needs children may benefit from cantillated transliterated Text as learning to read Hebrew letters can be perceived as challenging for any Jewish child or even for many Jewish adults. Special needs children may benefit from cantillated transliterated text so as to learn the Torah and/or Haftorah trope melodies without a prerequisite of learning the Hebrew alphabet.

Coloring in visually distinct colors for Torah and/or Haftorah tropes corresponds to coloring Torah tropes and/or Haftorah tropes so that particularly children ages 11-13 may easily distinguish between specific Torah or Haftorah trope melodies by the visually distinctive coloring. Special needs children may benefit from coloring in visually distinct colors as an alternative or as adjunct to cantillated transliterated Text. Special needs children may benefit from coloring in visually distinct colors for those children who can read the Hebrew orthography, but may struggle with cantillation symbols. Special needs children may benefit from coloring in visually distinct colors for those children who can read the Hebrew orthography, and who may know cantillation symbols but find the coloring assists in learning.

Coloring in visually distinct colors for Torah and/or Haftorah trope families corresponds to coloring Torah tropes families and/or Haftorah trope families particularly so that children ages 11-13 may easily distinguished between specific Torah or Haftorah trope families by the visually distinctive coloring. Please see above note on how Special needs children may benefit form visually distinctive coloring.

User selected musical key means that a user may select a musical key for the system to transpose a model chanting voice into the key of a user, or into another key. Transposition to a different musical key can include adjustment of model voice to match frequency range of a student and/or a user. Special needs children, particularly those with Autism Spectrum Disorder and/or Asperger's Syndrome may have a particular challenge in generalizing from specific examples. For example, such children may have difficulty learning from a voice in an different key than their own. Such children may benefit from a transposition of a model voice to a different key such as that of the special needs child.

IX. Disjunctive Tropes

There are two types of punctuation marks: (1) disjunctive accents—which indicate a pause or separation, and (2) conjunctive accents—which indicate a connection. Each word in the Tanakh typically has one cantillation sign. This may be either a disjunctive, showing a division between that and the following word, or a conjunctive, joining the two words (like a slur in music). Thus, disjunctives divide a verse into phrases, and within each phrase all the words except the last carry conjunctives. (There are two types of exception to the rule about words having only one sign. A group of words joined by hyphens is regarded as one word so they may have a single accent between them. Conversely, a long word may have two—e.g., a disjunctive on the stressed syllable and the related conjunctive two syllables before in place of meteg.) The disjunctives are traditionally divided into four levels, with lower level disjunctives marking less important breaks.

The first level, known as "Emperors", includes sof pasuq/siluq, marking the end of the verse, and atnach/etnachta, marking the middle.

The second level is known as "Kings". The usual second level disjunctive is zaqef qaton (when on its own, this becomes zaqef gadol). This is replaced by tifcha when in the immediate neighbourhood of sof pasuq or atnach. A stronger second level disjunctive, used in very long verses, is segol: when it occurs on its own, this may be replaced by shalshelet.

The third level is known as “Dukes”. The usual third level disjunctive is revia. For musical reasons, this is replaced by zarqa when in the vicinity of segol, by pashta or yetiv when in the vicinity of zakef, and by tevir when in the vicinity of tifcha.

The fourth level is known as “Counts”. These are found mainly in longer verses, and tend to cluster near the beginning of a half-verse: for this reason their musical realization is usually more elaborate than that of higher level disjunctives. They are pazer, geresh, gershayim, telishah gedolah, munach legarmeh and qarne farah.

The general conjunctive is munach. Depending on which disjunctive follows, this may be replaced by mercha, mahpach, darga, qadma, telisha qetannah or yerach ben yomo.

One other symbol is mercha kefulah, double mercha. There is some argument about whether this is another conjunctive or an occasional replacement for tevir.

Disjunctives have a function somewhat similar to punctuation in Western languages. Sof pasuq could be thought of as a full stop, atnach as a semi-colon, second level disjunctives as commas and third level disjunctives as commas or unmarked. Where two words are syntactically bound together (for example, pene ha-mayim, “the face of the waters”), the first invariably carries a conjunctive.

A Trope Family may be said to contain a most disjunctive trope if it contains a siluq. Then next most disjunctive Trope Family contains an etnachta. The next most disjunctive Trope family contains a shalshelet. The next most disjunctive Trope family contains a segol. The next most disjunctive Trope family contains a zaqef gadol. The next most disjunctive Trope family contains a zaqef qaton. The next most disjunctive Trope family contains a Duke. The next most disjunctive Trope family contains a Count. The number of tropes is the number of tropes in a trope family. Typically, a trope family is terminated by a disjunctive trope.

FIG. 17 depicts exemplary embodiment(s) of non-transitory computer-readable medium storing instructions that, when executed by a processor, cause the processor to do one or more of these steps. In step 1710, receive data representative of an at least one trope family from a predetermined list of Hebrew Bible trope families. In step 1720, receive data representative of at least one exemplary verse of Hebrew language text corresponding to at least one Hebrew Bible trope family. In step 1730, receive a transliteration symbolic representation with individual cantillation symbols delineated using an at least one HTML class Attribute. In step 1740, transform, using HTML class Attribute, by flipping, or rotating, each cantillation symbolic 180 degrees on its vertical axis. In step 1750, to create a mirror-cantillated transliteration symbolic representation. In step 1760, receive audio data corresponding to said at least one exemplary verses of Hebrew language text. In step 1770, a chanting of said at least one Hebrew Bible verse. In step 1780, a chanting of trope names of said at least one Hebrew Bible trope family. In step 1790, a reading-aloud without chanting of said at least one Hebrew Bible verse. In step 1795, provide for dynamic display of mirror-cantillated transliteration symbolic representation, corresponding to playing audio data.

FIG. 18 depicts exemplary embodiment(s) of non-transitory computer-readable medium storing instructions that, when executed by a processor, cause the processor to do one or more of these steps. In step 1810, receive transformed transliteration symbolic representation of at least one of at least one verse of said exemplary verse of Hebrew language text. In step 1820, exemplary verse of Hebrew language text corresponding to said at least one Hebrew Bible trope family. In step 1830, wherein a cantillation symbolic therein has been flipped on a vertical axis to create a mirror-cantillated transliteration symbolic representation. In step 1840, play at least some of said received audio data, said played received audio data corresponding to said at least one Hebrew Bible trope family. In step 1850, a replacement font wherein an at least one of said cantillation symbolics have been flipped 180 degrees on said vertical axis. In step 1860, wherein replacement font is a Hebrew unicode font. In step 1870, wherein replacement font is a scalable computer font in a format such as OpenType or TrueType. In step 1880, wherein replacement font is a vector computer font. In step 1890, symbolic-cantillated transliteration, symbolic cantillation corresponds to a vowel of syllable of symbolic-cantillated transliteration. In step 1895, symbolic-cantillated transliteration symbolic cantillation corresponds to a consonant of said symbolic-cantillated transliteration.

Figure 19:
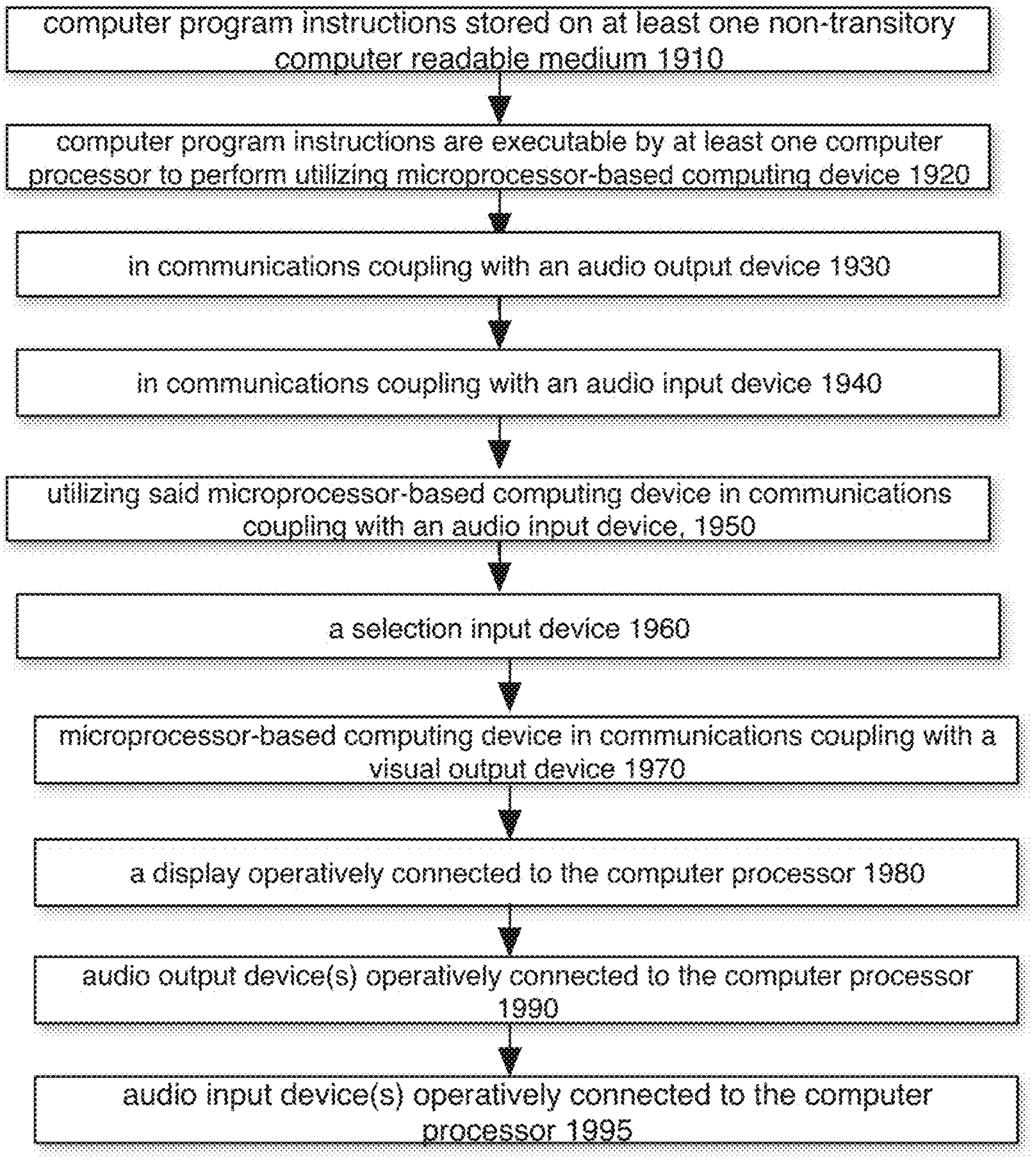
FIG. 19 depicts an exemplary system.

FIG. 19 depicts an exemplary system as follows. At 1910, computer program instructions stored on at least one non-transitory computer readable medium. At 1920, computer program instructions are executable by at least one computer processor to perform utilizing microprocessor-based computing device. At 1930, in communications coupling with an audio output device. At 1940, in communications coupling with an audio input device. At 1950, utilizing said microprocessor-based computing device in communications coupling with an audio input device. The microprocessor-based computing device in communications coupling with the audio input device may be either identical or distinct from the microprocessor-based computing device in communications coupling with the audio output device. At 1960, a selection input device. The selection input device may include such as a mouse, a trackball, or voice-based selection. At 1970, microprocessor-based computing device in communications coupling with a visual output device. At 1980, a display operatively connected to the computer processor. The computer processor connected to the display may be either identical or distinct from the microprocessor-based computing device(s) of 1950 above. At 1990, audio output device(s) operatively connected to the computer processor. At 1995, audio input device(s) operatively connected to the computer processor.

FIG. 20 depicts an exemplary method as follows. In step 2010, receiving data representative of Hebrew language text being of a Jewish liturgy type in accordance with a user selection of at least one of Torah, Haftorah, Hebrew Bible Scroll and Hebrew prayers. In step 2020, receiving data representative of Hebrew language text cantillated with at least one trope family from a predetermined list of Hebrew Bible trope families. Further in step 2020, receiving data representative of exemplary verses of Hebrew language text corresponding to said at least one Hebrew Bible trope family from said Jewish liturgy type. In step 2030, receiving audio data corresponding to at least one verse of said exemplary verses of Hebrew language text. In step 2040, said received audio data representing a chanting of said at least one Hebrew Bible verse. In step 2050, said received audio data representing a chanting of trope names of said at least one Hebrew Bible trope family. In step 2060, playing at least some of said received audio data, said played received audio data corresponding to said at least one Hebrew Bible trope family. In step 2070, providing for dynamic display of at least one of said at least one verse of said exemplary verse of Hebrew language text corresponding to said at least one Hebrew Bible trope family, said dynamic display including dynamic highlighting corresponding to said playing audio data. In step 2080, receiving at least one recording of a user chanting at least some of said dynamically displayed data. In step 2090, receiving data indicative of correctness of said user chanting.

Figure 21:
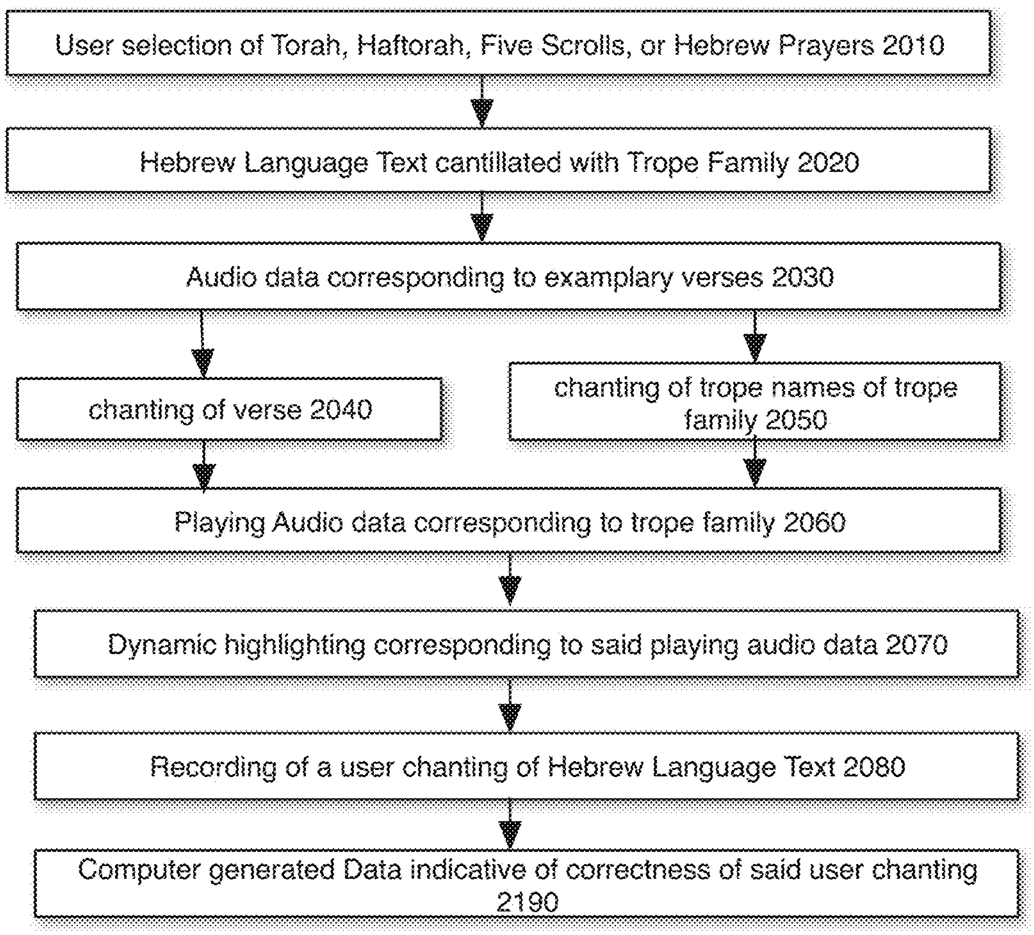
FIGS. 21-27 depict exemplary methods of FIG. 20.

FIG. 21 depicts a method of FIG. 20 as follows. In step 2190, said data indicative of correctness of said user chanting is computer generated.

Figure 22:
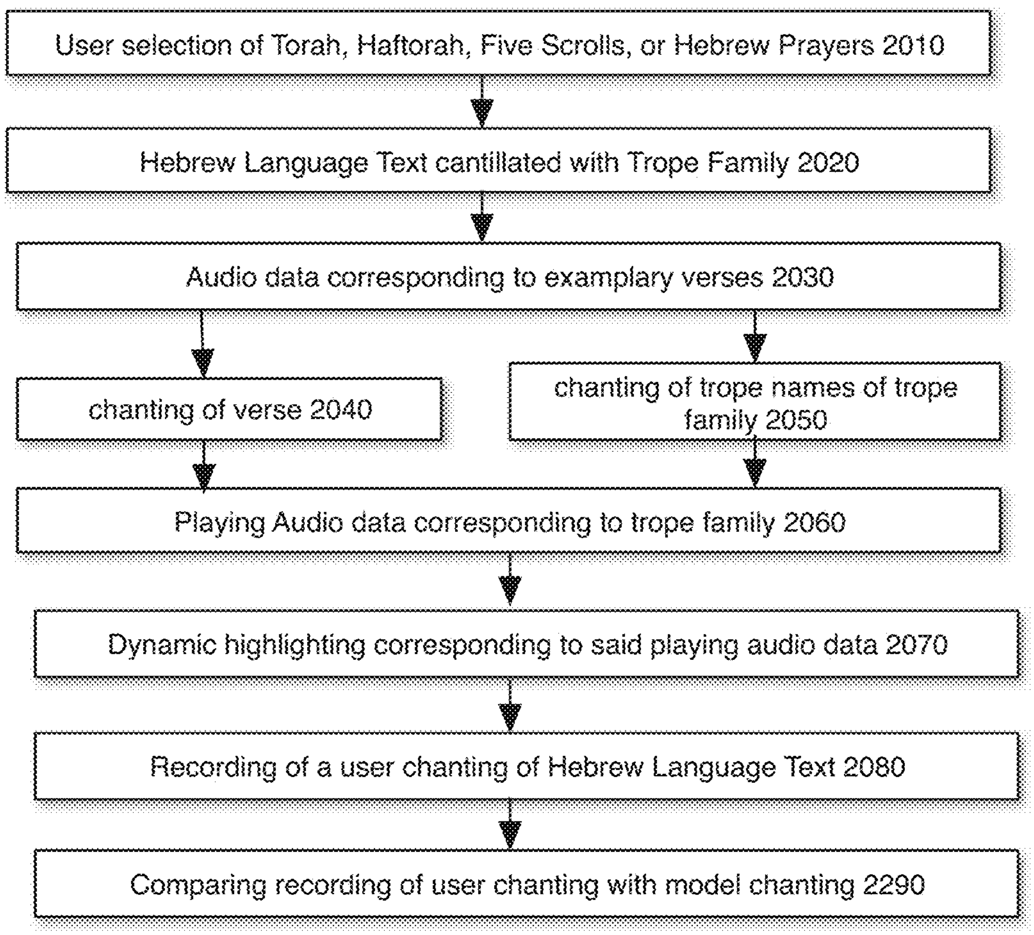

FIG. 22 depicts a method of FIG. 20 as follows. In step 2290, further comprising comparing at least one of said at least one recording of a user chanting at least some of said dynamically displayed data with at least one model chanting of said at least some of said dynamically displayed data.

Figure 23:
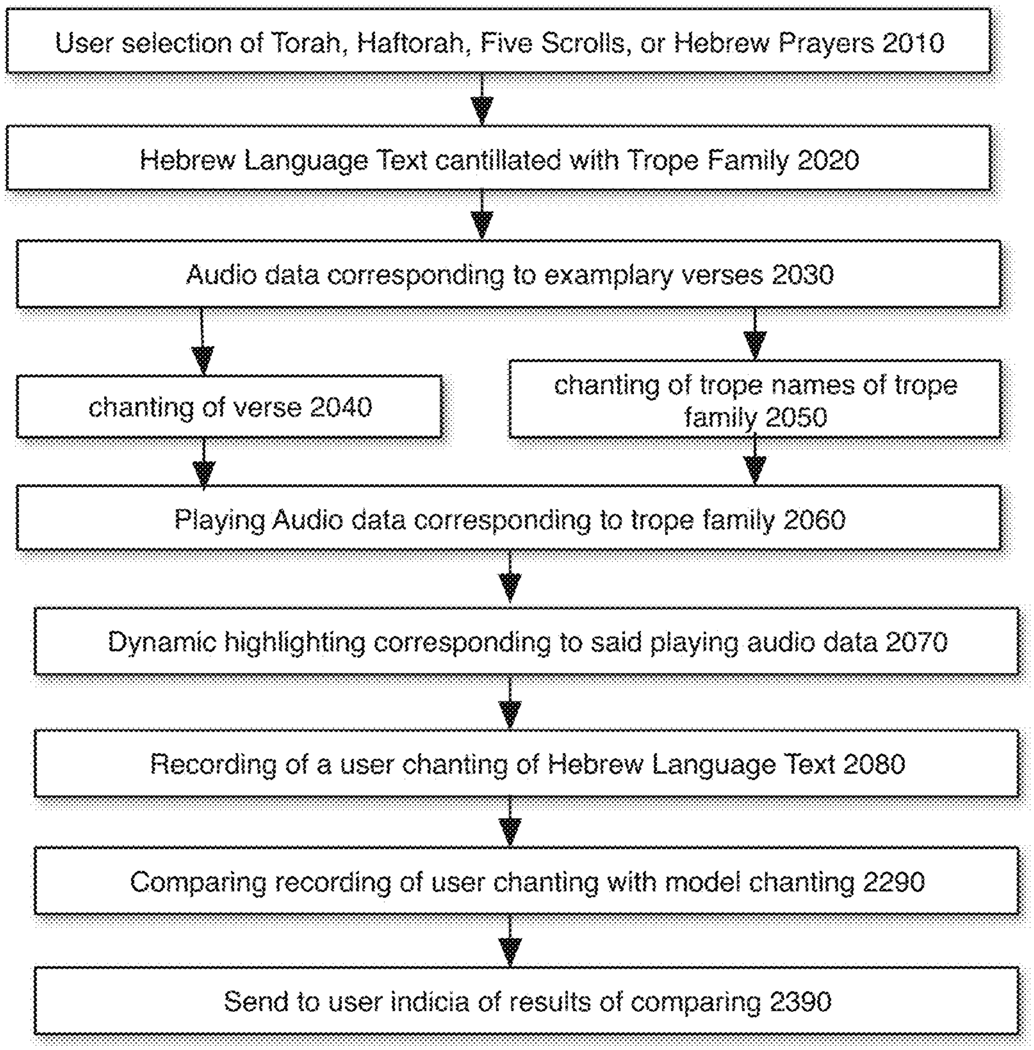

FIG. 23 depicts a method of FIG. 22 as follows. In step 2290, further comprising comparing at least one of said at least one recording of a user chanting at least some of said dynamically displayed data with at least one model chanting of said at least some of said dynamically displayed data. In step 2390, further comprising sending to a user indicia of results of said comparing.

Figure 24:
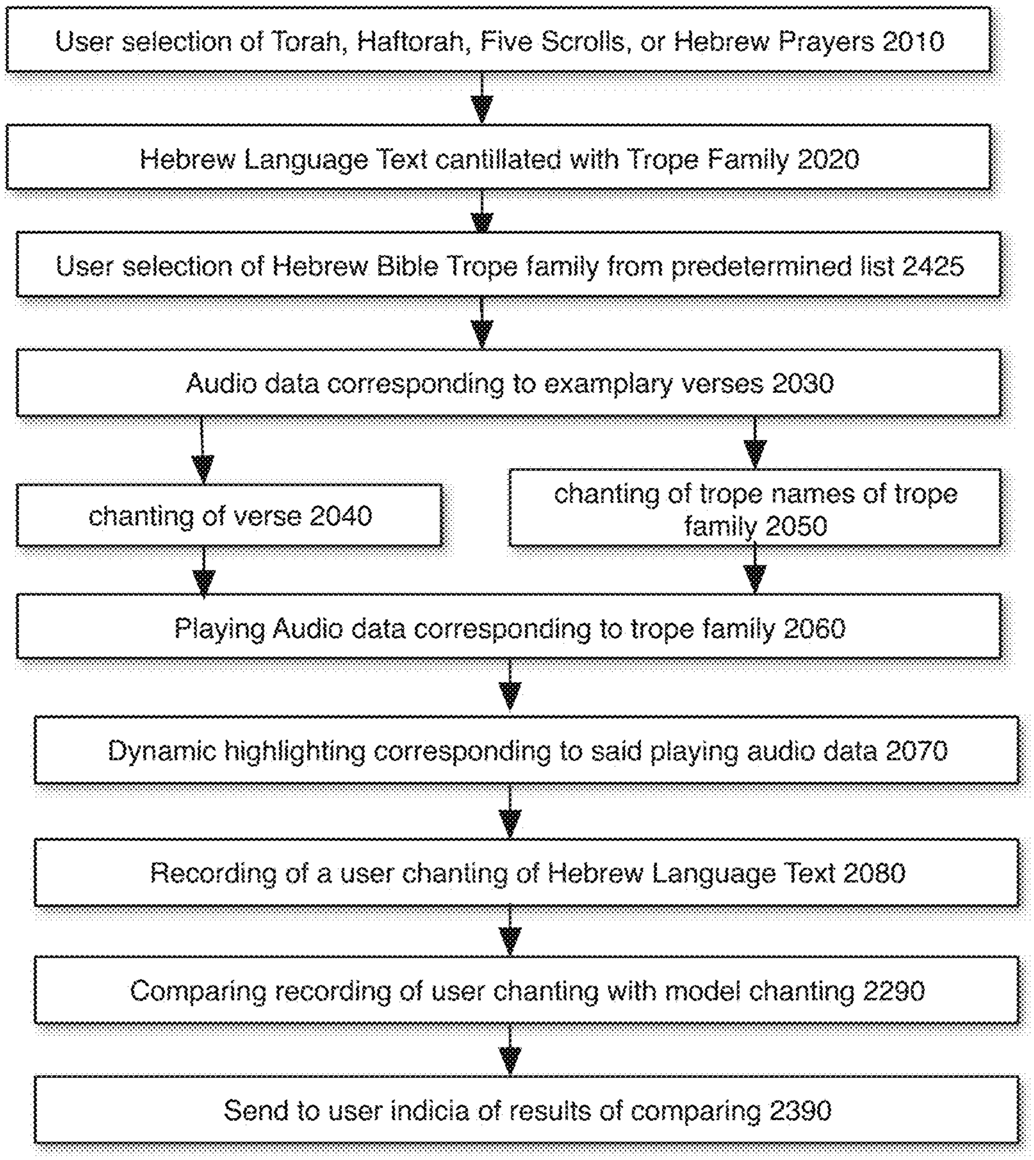

FIG. 24 depicts a method of FIG. 20 as follows. In step 2425, further comprising receiving from a user a selection of a Hebrew Bible trope family from a predetermined list of Hebrew Bible trope families.

Figure 25:
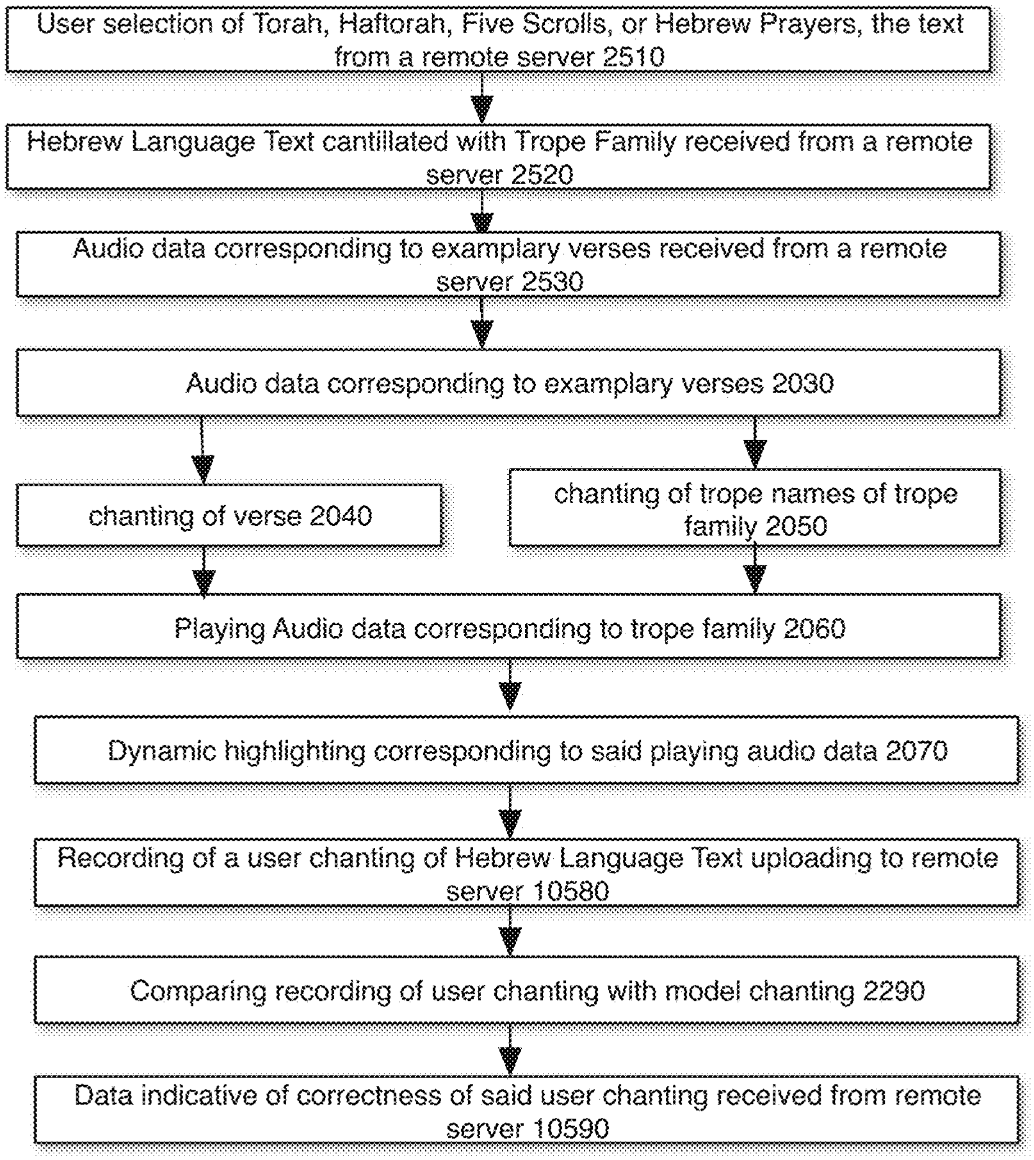

FIG. 25 depicts a method of FIG. 20 as follows. In step 2510, receiving data representative of Hebrew language text being of a Jewish liturgy type in accordance with a user selection of at least one of Torah, Haftorah, Hebrew Bible Scroll and Hebrew prayers, wherein at least one of said data representative of exemplary verses is received from a remote server. In step 2520, receiving data representative of Hebrew language text cantillated with at least one trope family from a predetermined list of Hebrew Bible trope families, wherein at least one of said data representative is received from a remote server. Further in step 2520, receiving data representative of exemplary verses of Hebrew language text corresponding to said at least one Hebrew Bible trope family from said Jewish liturgy type, wherein at least one of said data representative is received from a remote server. In step 2530, receiving audio data corresponding to at least one verse of said exemplary verses of Hebrew language text, wherein at least one of said data representative is received from a remote server. In step 2580, receiving at least one recording of a user chanting at least some of said dynamically displayed data, from a remote server. In step 2590, receiving data indicative of correctness of said user chanting, from a remote server.

Figure 26:
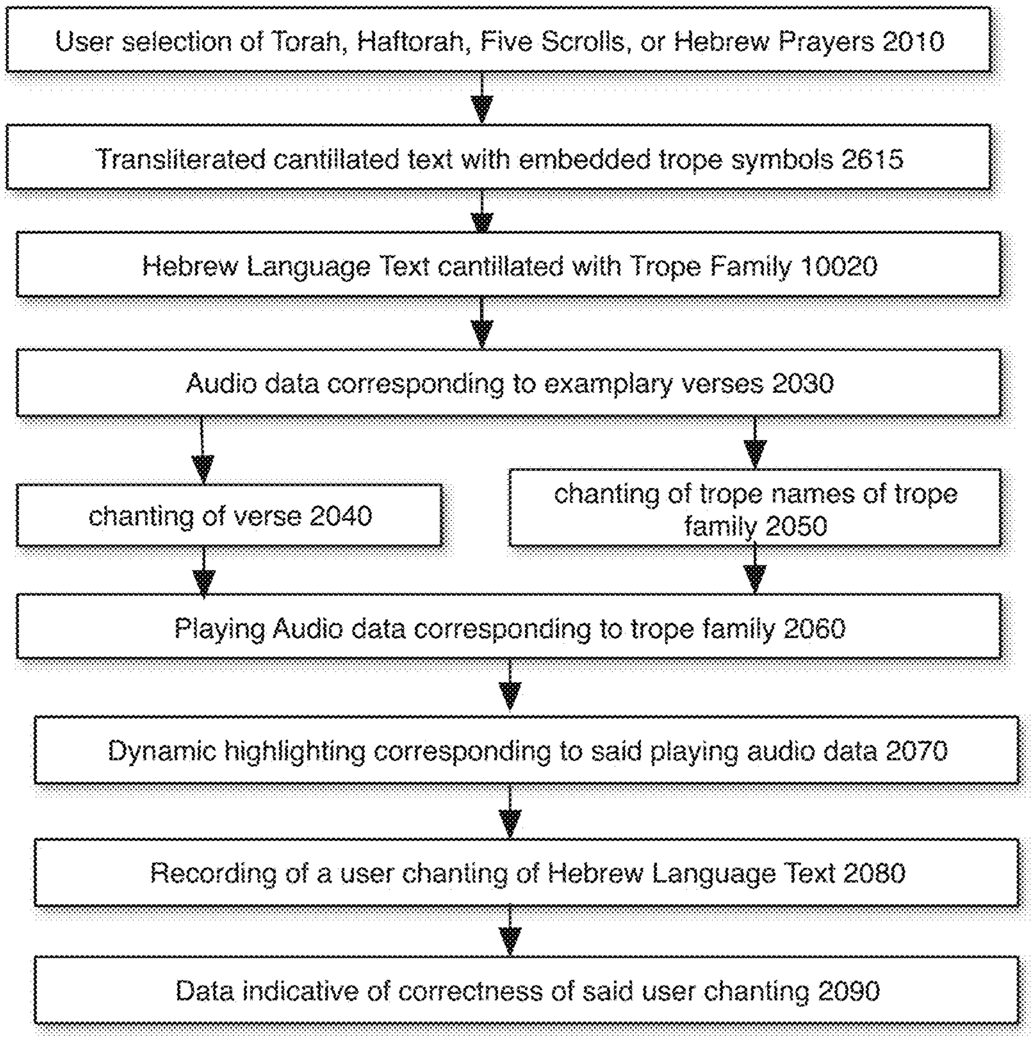

FIG. 26 depicts a method of FIG. 20 as follows. In step 2615, further comprising providing for display of transliterated text corresponding to said Hebrew language text, where said displayed transliterated text includes a plurality of embedded trope symbols corresponding to said Hebrew language text.

Figure 27:
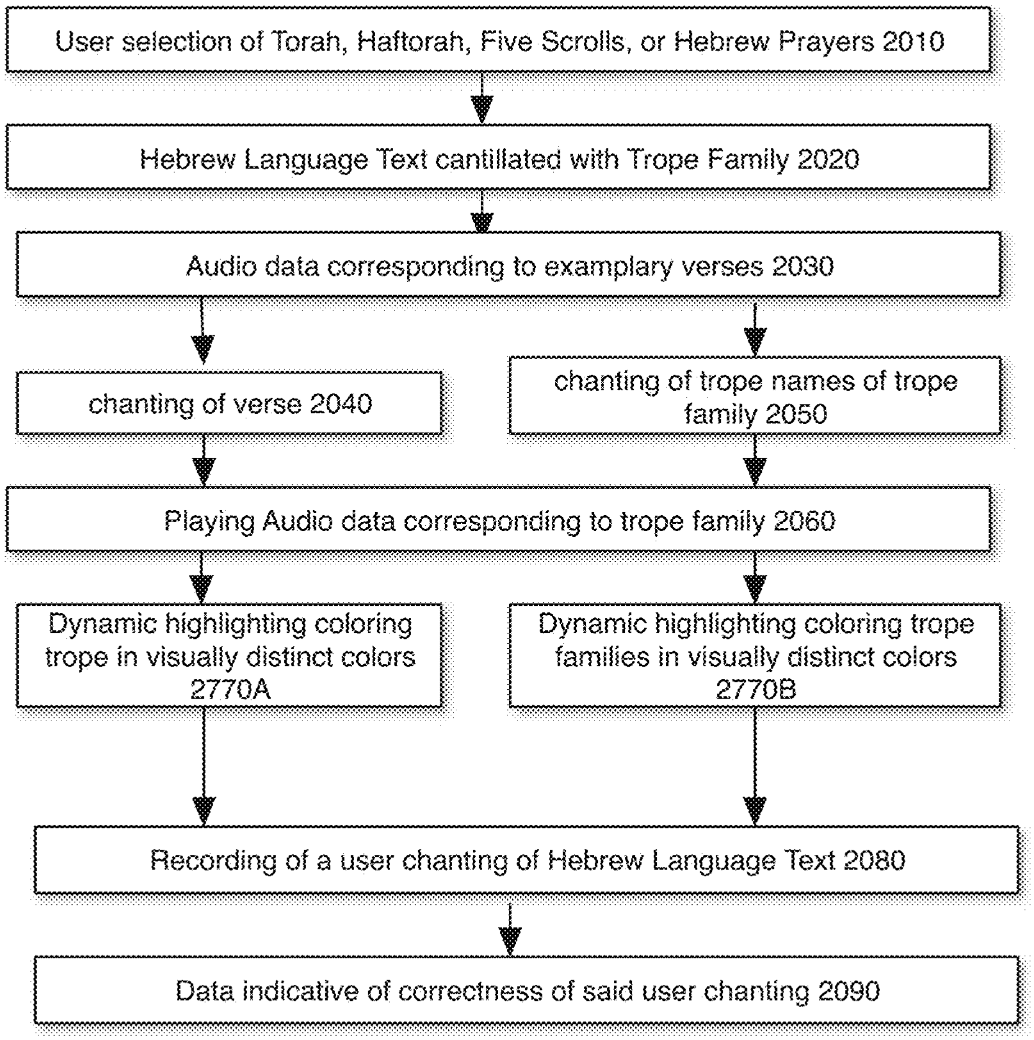

FIG. 27 depicts a method of FIG. 20 as follows. In step 2770A, wherein said dynamic display includes coloring in visually distinct colors at least one of individual trope symbols. In step 2770B, wherein said dynamic display includes coloring in visually distinct colors at least one of trope families.

Figure 28:
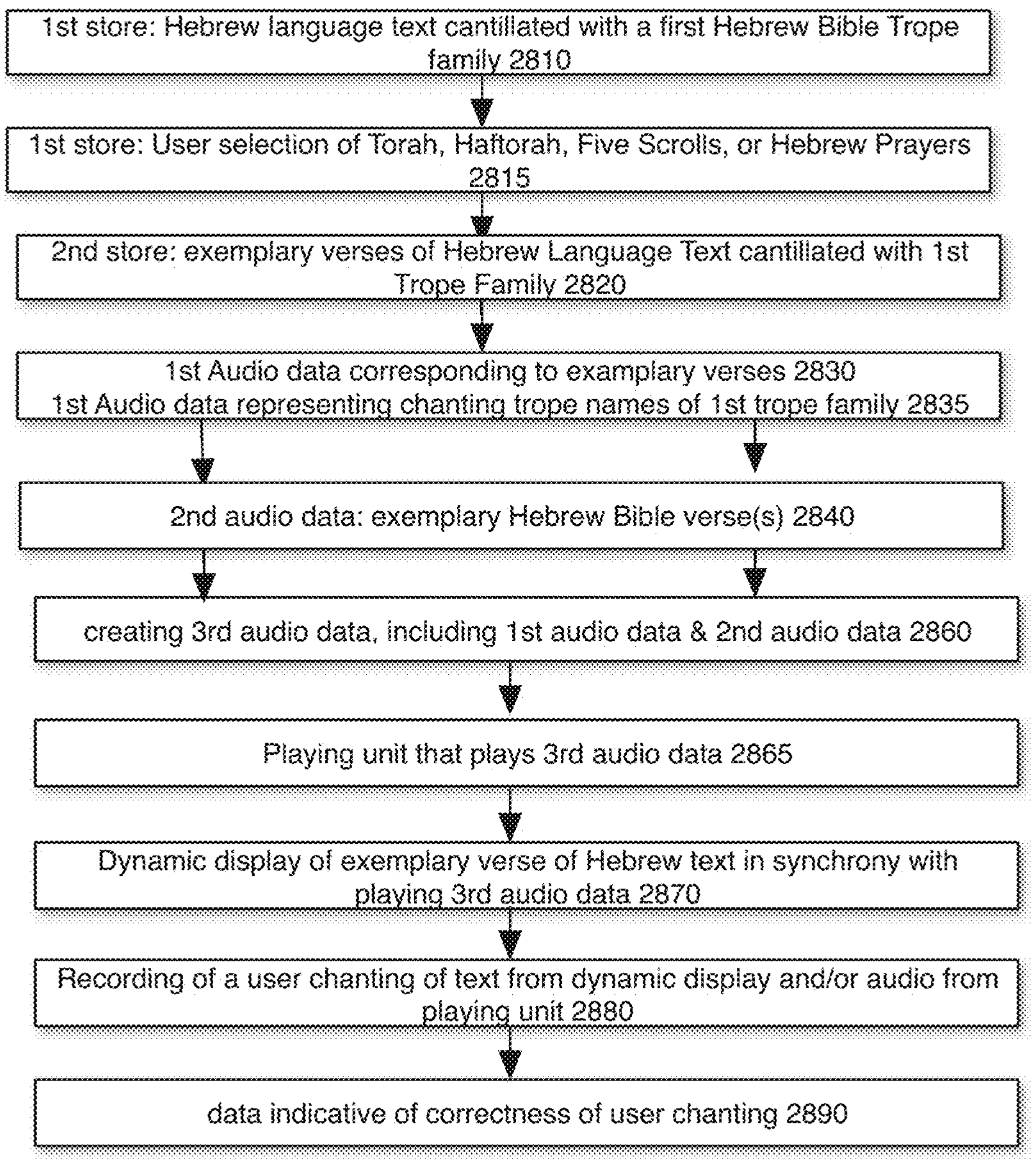
FIG. 28 depicts an exemplary system.

FIG. 28 depicts an exemplary system as follows. At 2810, a first store comprising data representative of Hebrew language text cantillated with a first Hebrew Bible trope family from a predetermined list of Hebrew Bible trope families. At 2815, a first store said data corresponding to a user selection of at least one of Torah, Haftorah, Hebrew Bible Scroll, and Hebrew prayers.

At 2820, a second store comprising data representative of exemplary verses of Hebrew language text corresponding to said first Hebrew Bible trope family. At 2830, receiving first audio data corresponding to at least one verse of said exemplary verses of Hebrew language text. At 2835 said first received audio data representing a chanting of trope names of said first Hebrew Bible trope family. At 2840, receiving second audio data corresponding to said at least one verse of said exemplary verses of Hebrew language text. At 2845, said second received audio data representing a chanting of trope names of a non-overlapping second trope family. At 2860, said processor further creating third audio data, said third audio data including said first audio data and said second audio data. At 2865, a playing unit in communication with said processor that plays said third audio data. At 2870, a dynamic display of at least one of said at least one verse of said exemplary verse of Hebrew language text, said dynamic display in communication with said processor including dynamic highlighting corresponding to said playing third audio data. At 2880, receives at least one recording of a user chanting at least some of said dynamically displayed data. At 2890, where said processor receives data indicative of correctness of said user chanting.

Figure 29:
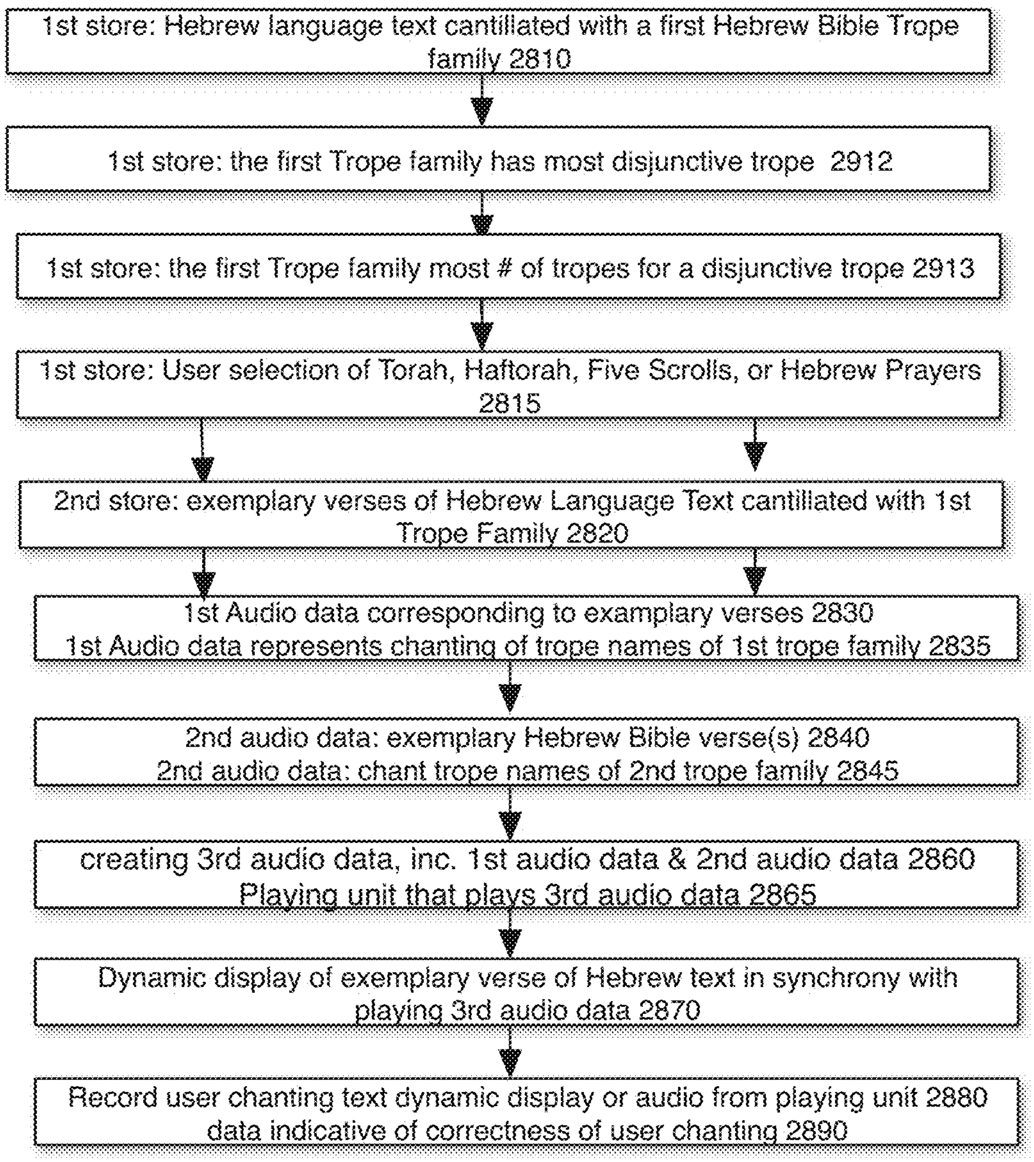
FIGS. 29-31 depict exemplary systems of FIG. 28.

FIG. 29 depicts a system of FIG. 28 as follows. At 2912, wherein said selection of said first Trope Family contains the most disjunctive trope in the said at least one verse. At 2913, first Trope Family has the most number of tropes for which a corresponding audio is available to the system.

Figure 30:
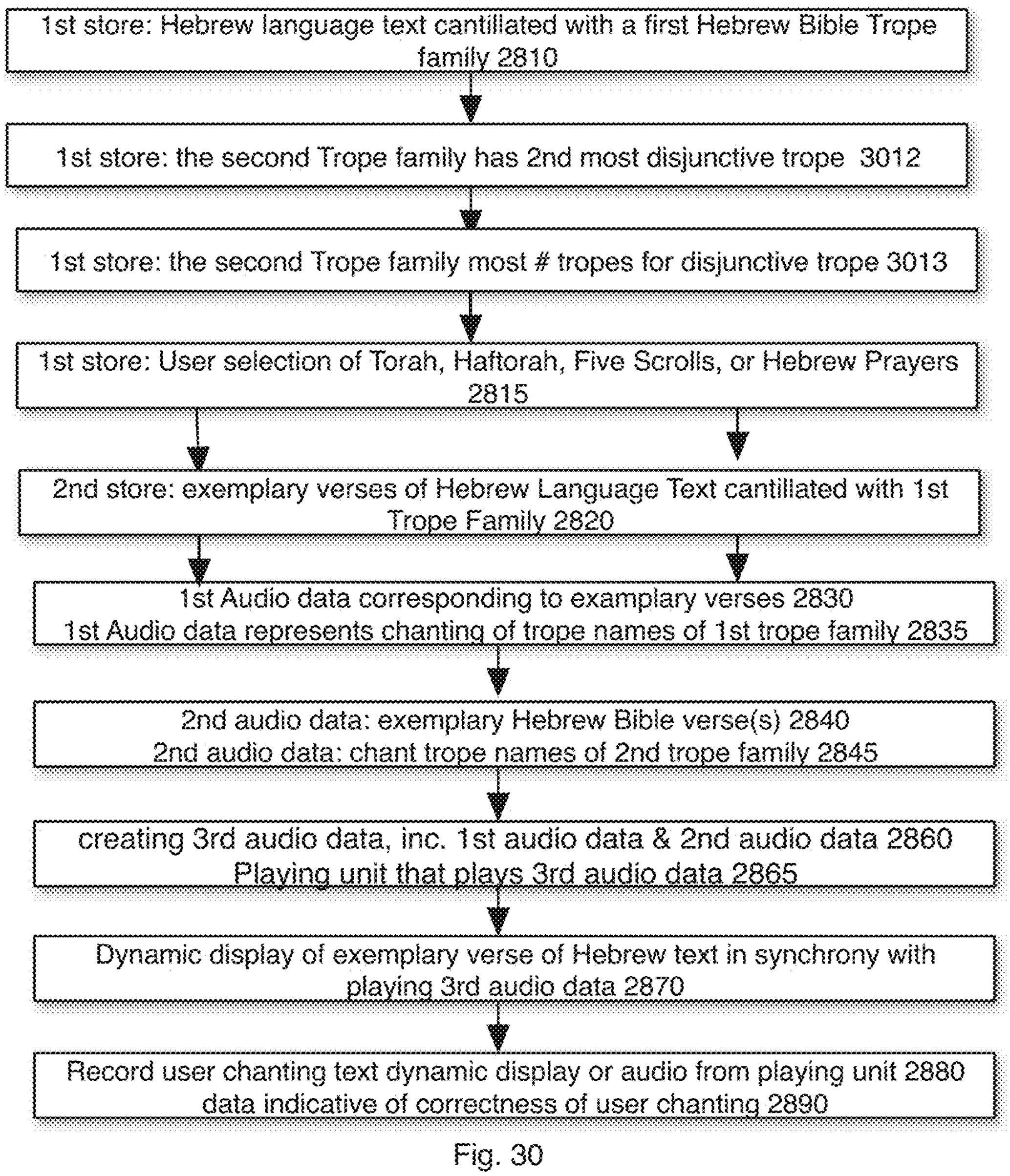

FIG. 30 depicts a system of FIG. 38 as follows. At 3012, wherein said selection of said second Trope Family contains the second most disjunctive trope in said at least one verse that does not correspond to said first Trope family. At 3013, second Trope Family has the most number of tropes for which a corresponding audio is available to the system.

Figure 31:
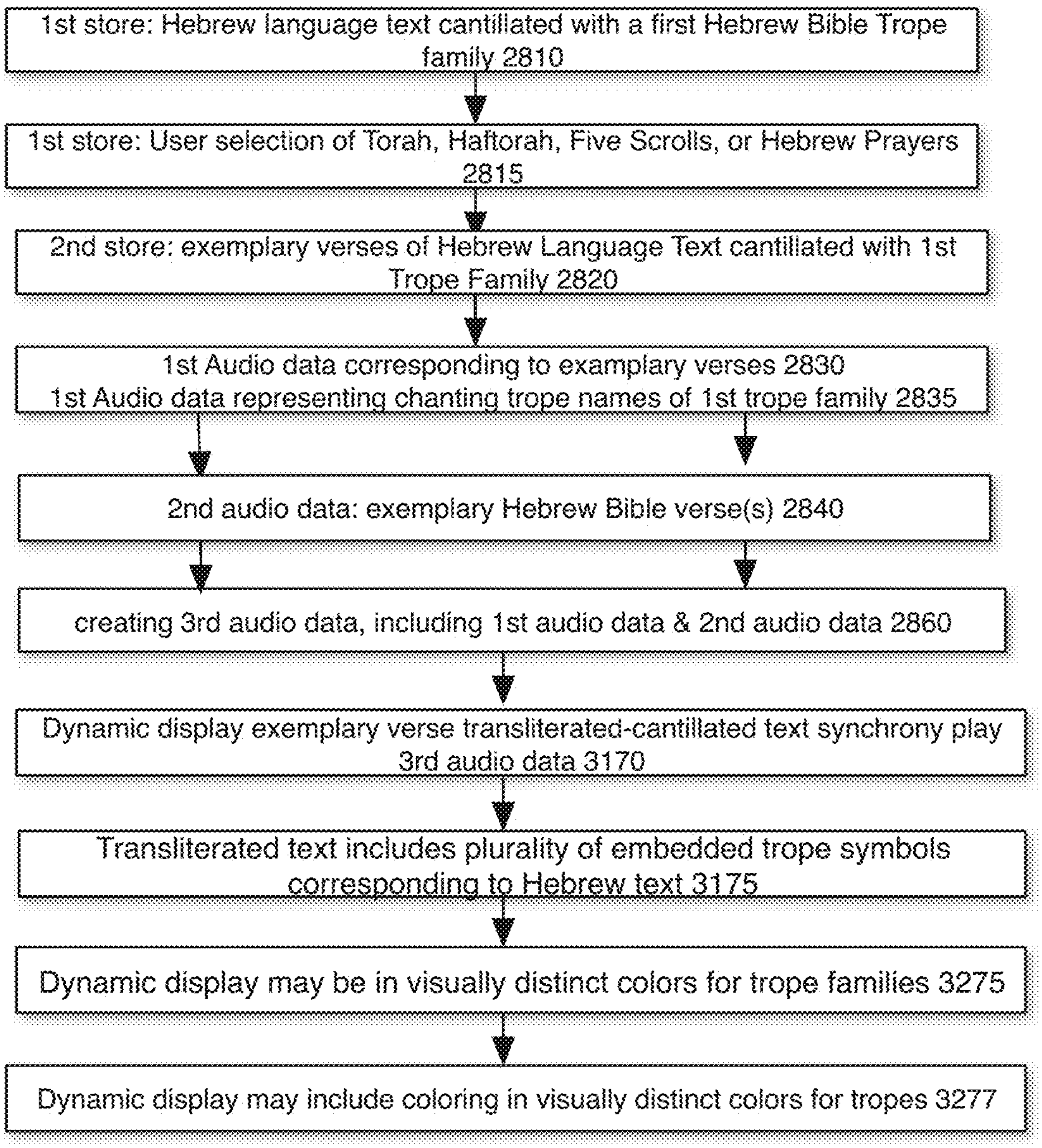

FIG. 31 depicts a system of FIG. 38 as follows. At 3170, wherein said dynamic display further provides for display of transliterated text corresponding to said Hebrew language text. At 3175, where said displayed transliterated text includes a plurality of embedded trope symbols corresponding to said Hebrew language text. At 3275, wherein said dynamic display includes coloring in visually distinct colors at least one of trope families. At 3277, wherein said dynamic display includes coloring in visually distinct colors at least one of individual trope symbols.

Figure 32:
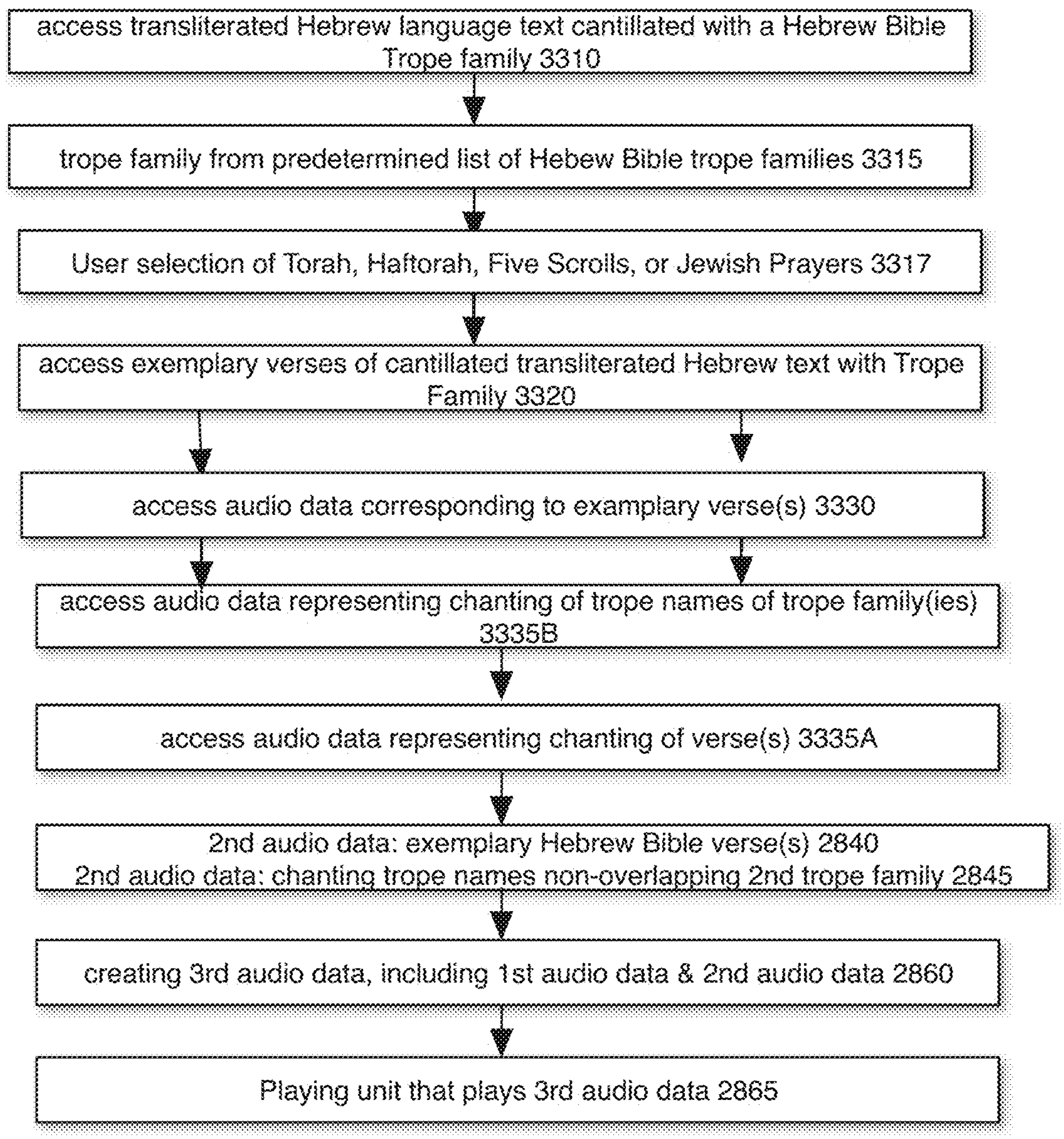
FIG. 32 depicts an exemplary medium.

FIG. 32 depicts an exemplary medium as follows. At 3310, access data representative of transliterated Hebrew language text cantillated with at least one trope family. At 3315, from a predetermined list of Hebrew Bible trope families. At 3317, the data corresponding to a user selection of at least one of Torah, Haftorah, Hebrew Bible Scroll, and Jewish prayers. At 3320, access data representative of exemplary verses of cantillated transliterated Hebrew language text corresponding to said at least one Hebrew Bible trope family. At 3330, access audio data corresponding to at least one verse of said exemplary verses of cantillated transliterated Hebrew language text. At 3335A, said received audio data representing at least one of a chanting of said at least one verse. At 3335B, said received audio data representing at least one of chanting of trope names of said at least one trope family. At 2865, play at least some of said received audio data, said played received audio data corresponding to said at least one trope family. At 2870, dynamically display at least one of said at least one verse of said exemplary verse of cantillated transliterated Hebrew language text corresponding to said at least one Hebrew Bible trope family, said dynamically display including dynamically highlighting text corresponding to said playing audio data. At 2880, access at least one recording of a user chanting at least some of said cantillated transliterated Hebrew language text. At 2890, access data indicative of correctness of said user chanting.

Figure 33:
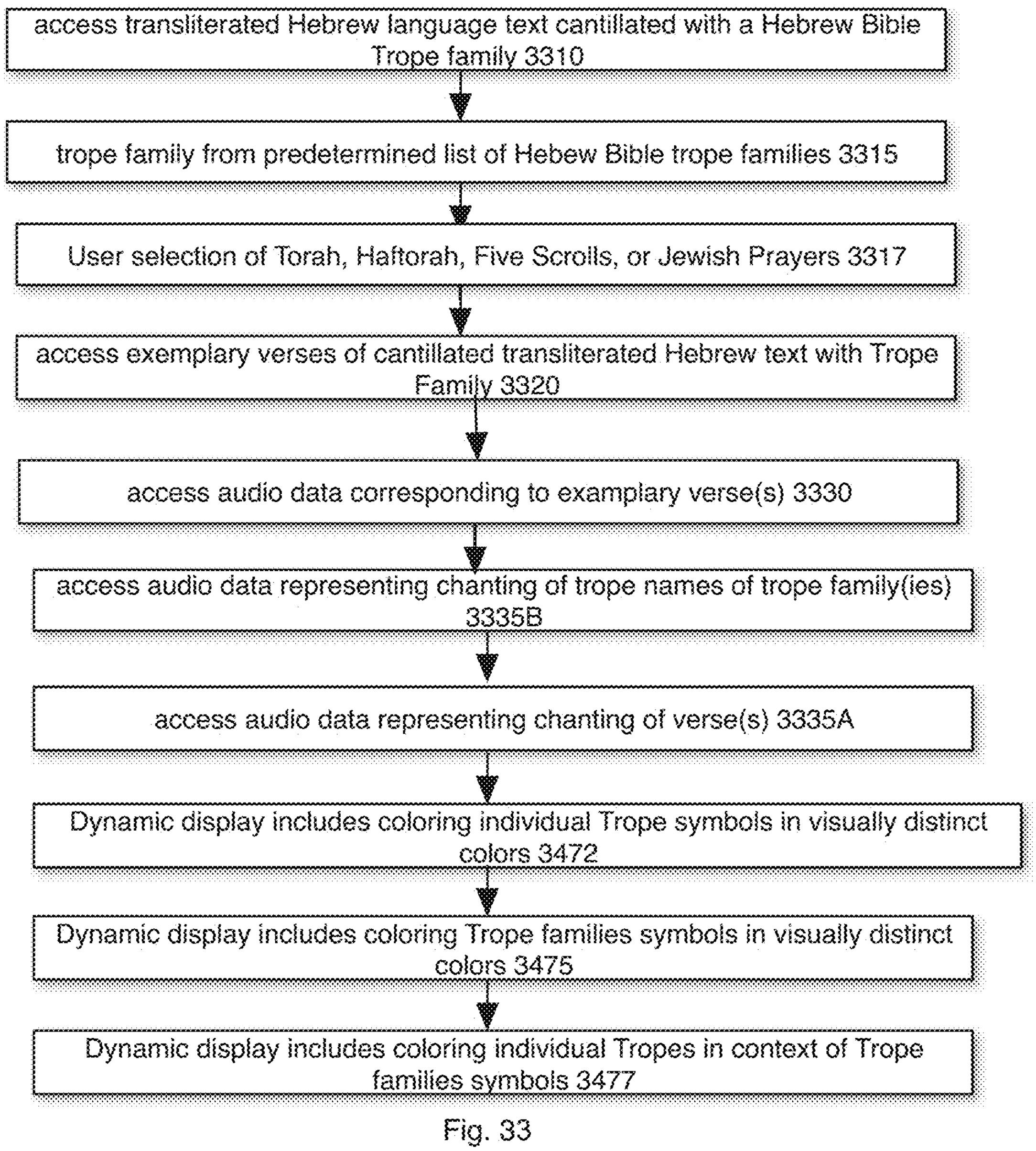
FIGS. 33 and 34 depict exemplary mediums of FIG. 32.

FIG. 33 depicts a medium of FIG. 32 as follows. At 3472, wherein said dynamically display includes coloring individual trope symbols in visually distinct colors. At 3475, wherein said dynamically display includes coloring trope families in visually distinct colors. At 3477, wherein said dynamically display includes coloring individual trope symbols in the context of their trope families in visually distinct colors.

Figure 34:
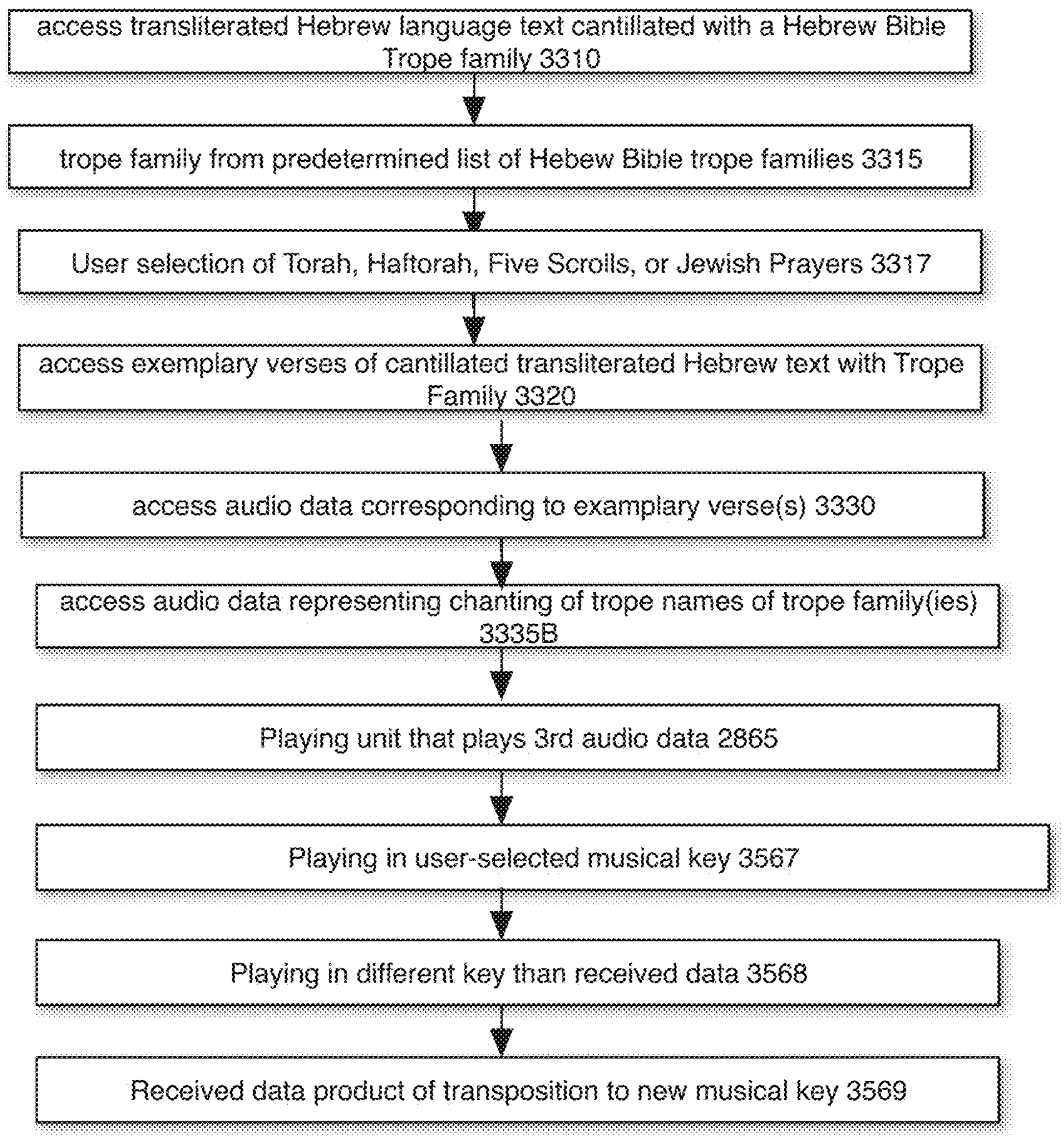

FIG. 34 depicts a medium of FIG. 32 as follows. At 3567, wherein said playing occurs in a user-selected musical key. At 3568, wherein said play occurs in a musical key different than the musical key of said received audio data. At 3569, wherein said received audio data was a product of a transposition to a different musical key.

Figure 35:
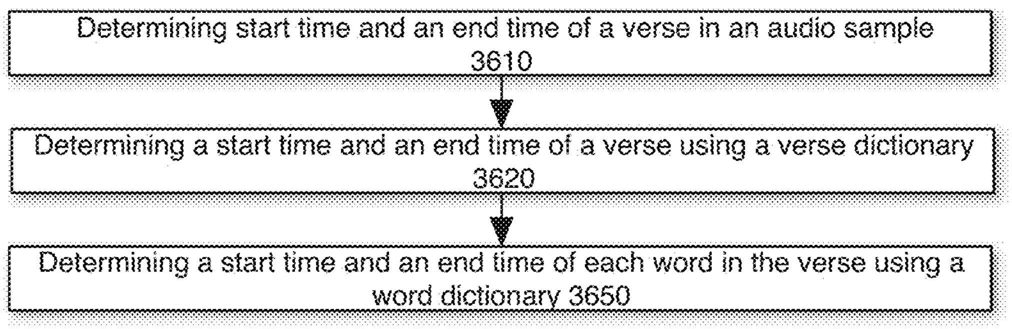
FIG. 35 depicts an exemplary method.

FIG. 35 depicts an exemplary method as follows. In step 3610, determining a start time and an end time of a verse in an audio sample using a verse dictionary. In step 3650, determining a start time and an end time of each word in the verse using a word dictionary.

Figure 36:
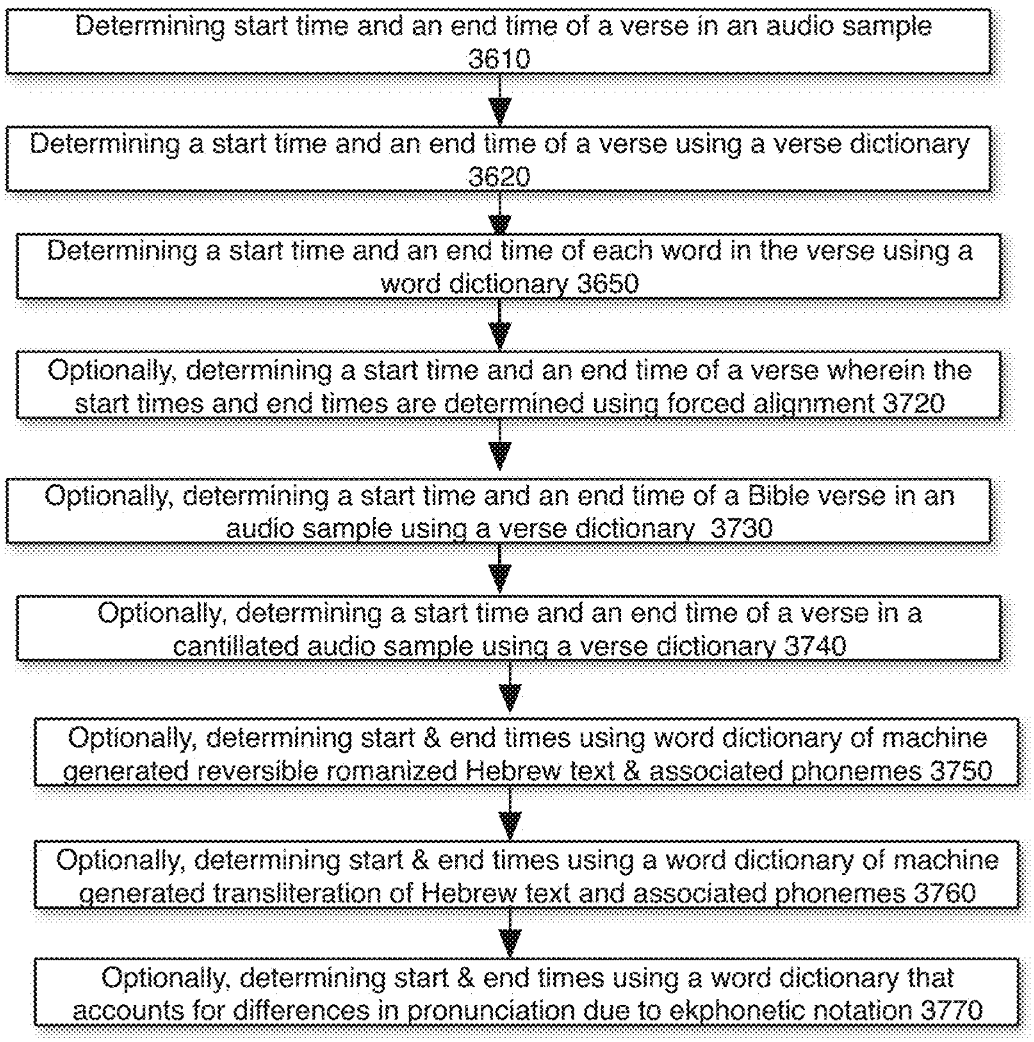
FIGS. 36 and 37 depict exemplary embodiments of methods of FIG. 35.
Figure 37:
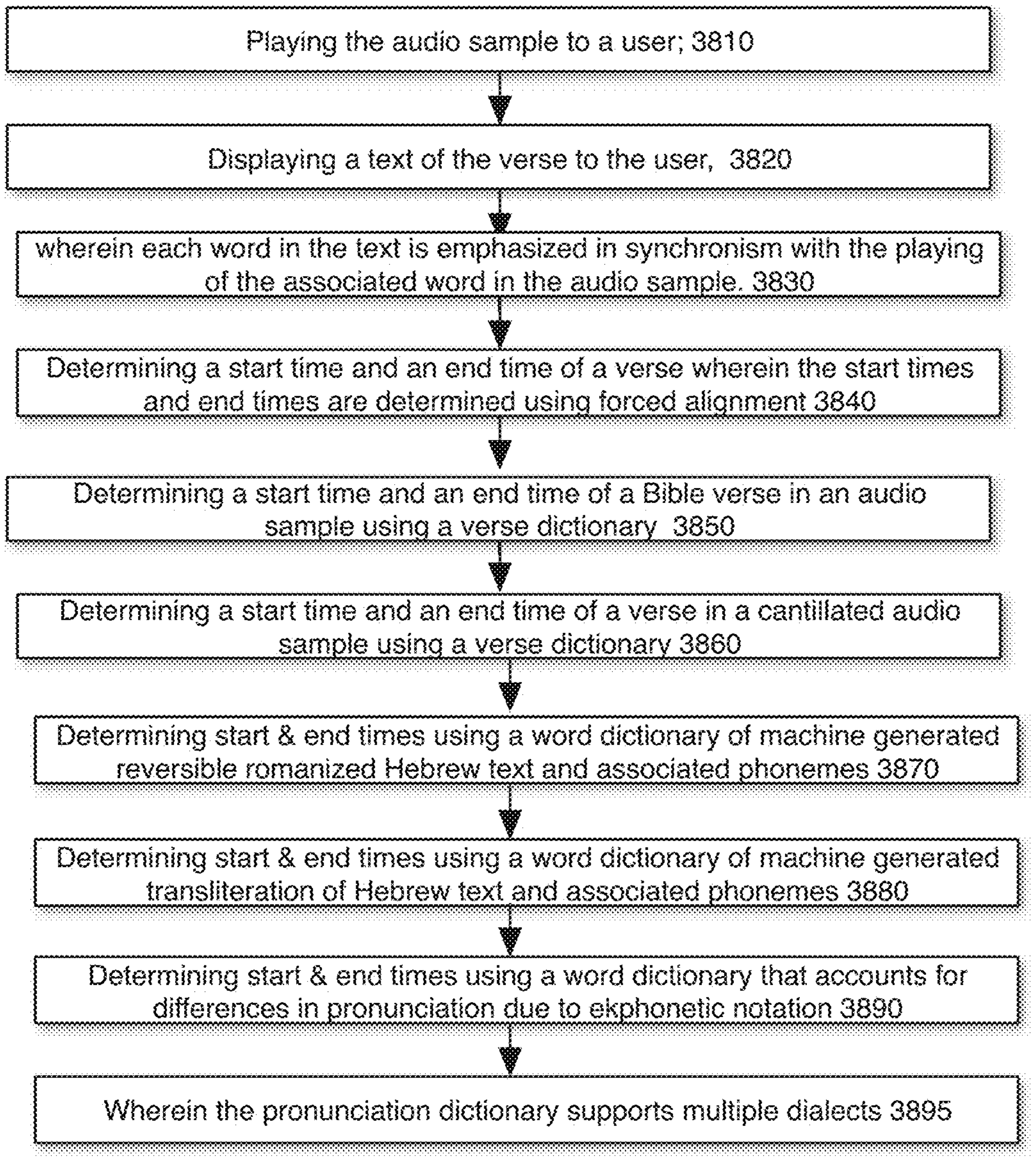

FIGS. 36 and 37 depict exemplary embodiments of methods of FIG. 35 as follows. In step 3720, determining a start time and an end time of a verse in an audio sample using a verse dictionary, wherein the start times and end times are determined using forced alignment. In step 3730, determining a start time and an end time of a Bible verse in an audio sample using a verse dictionary. In step 3740, determining a start time and an end time of a verse in a cantillated audio sample using a verse dictionary. In step 3750, determining a start time and an end time of each word in the verse using a word dictionary that comprises machine generated reversible romanized Hebrew text and associated phonemes. In step 3760, determining a start time and an end time of each word in the verse using a word dictionary that comprises machine generated transliteration of Hebrew text and associated phonemes. In step 3770, determining a start time and an end time of each word in the verse using a word dictionary that accounts for differences in pronunciation due to ekphonetic notation.

In step 3810 further comprising playing the audio sample to a user. In step 3820, displaying a text of the verse to the user. In step 3830, wherein each word in the text is emphasized in synchronism with the playing of the associated word in the audio sample. In step 3840, determining a start time and an end time of a verse wherein the start times and end times are determined using forced alignment. In step 3850, determining a start time and an end time of a Bible verse in an audio sample using a verse dictionary. In step 3860, determining a start time and an end time of a verse in a cantillated audio sample using a verse dictionary. In step 3870, determining start & end times using a word dictionary of machine generated reversible romanized Hebrew text and associated phonemes. In step 3880, determining start & end times using a word dictionary of machine generated transliteration of Hebrew text and associated phonemes. In step 3890, determining start & end times using a word dictionary that accounts for differences in pronunciation due to ekphonetic notation. In step 3895, optionally wherein the pronunciation dictionary supports multiple dialects.

Figure 38:
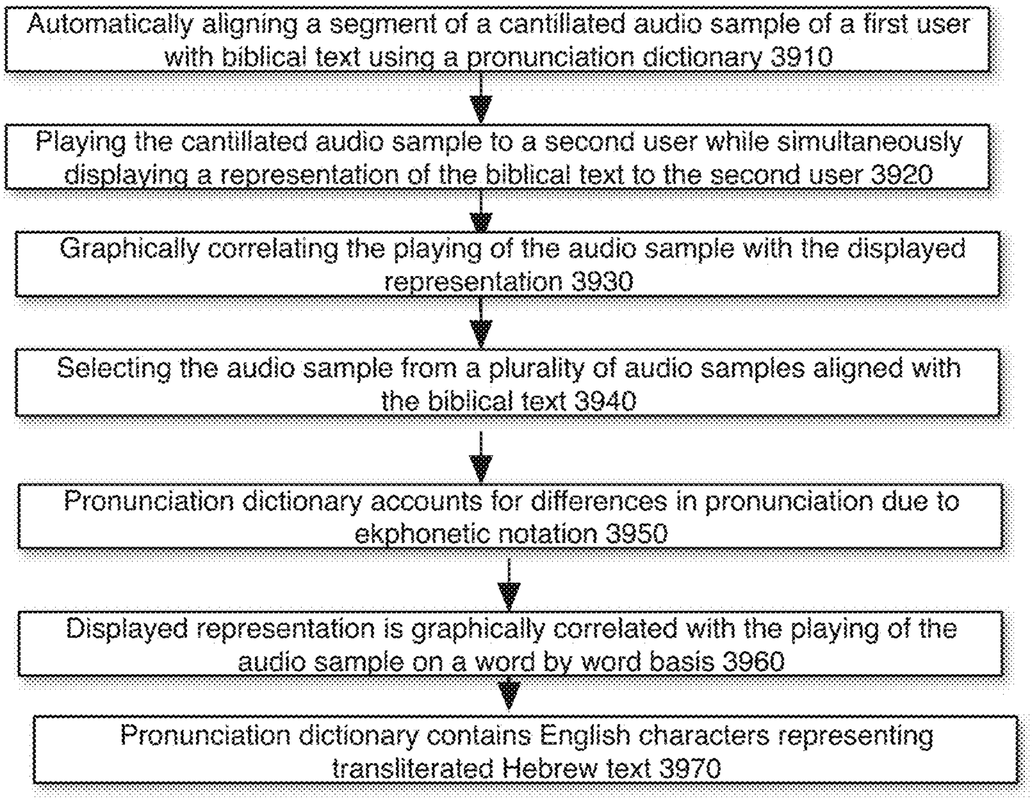
FIG. 38 depicts an exemplary method.

FIG. 38 depicts an exemplary method as follows. In step 3910, automatically aligning a segment of a cantillated audio sample of a first user with biblical text using a pronunciation dictionary. In step 3920, playing the cantillated audio sample to a second user while simultaneously displaying a representation of the biblical text to the second user. In step 3930, graphically correlating the playing of the audio sample with the displayed representation. In step 3940, selecting the audio sample from a plurality of audio samples aligned with the biblical text. In step 3950, pronunciation dictionary accounts for differences in pronunciation due to ekphonetic notation. In step 3960, displayed representation is graphically correlated with the playing of the audio sample on a word by word basis. In step 3970, pronunciation dictionary contains English characters representing transliterated Hebrew text.

Figure 39:
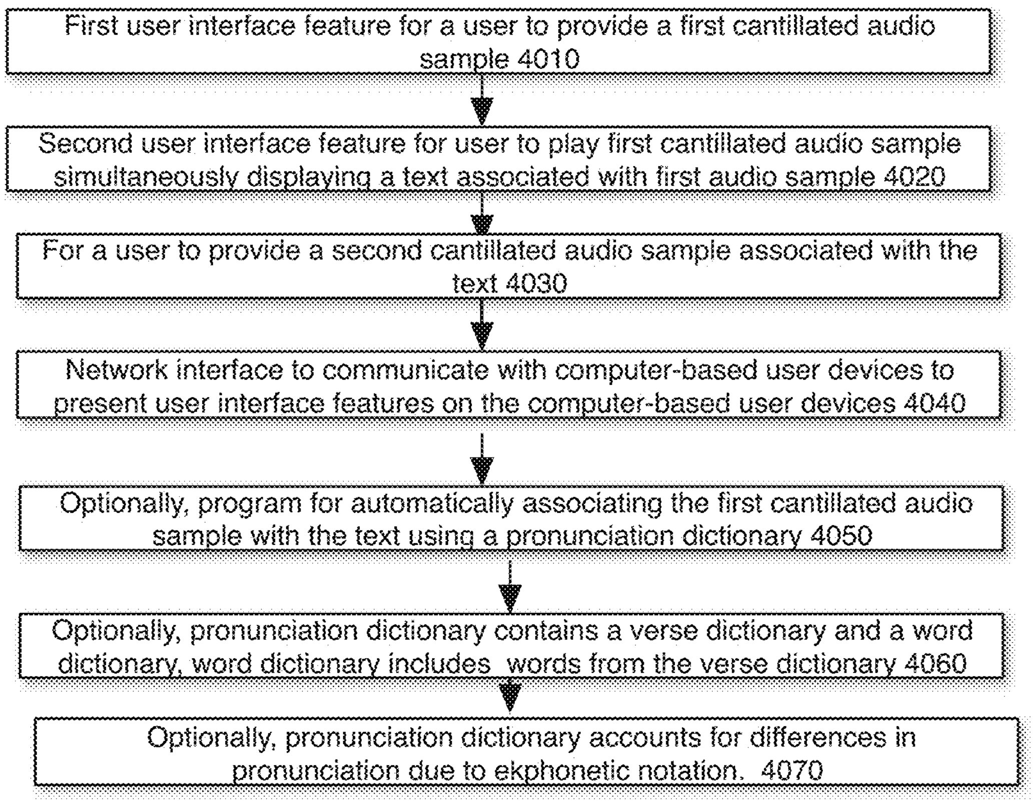
FIG. 39 depicts an exemplary system.

FIG. 39 depicts an exemplary system as follows. At 4010, first user interface feature for a user to provide a first cantillated audio sample. At 4020, second user interface feature for user to play first cantillated audio sample simultaneously displaying a text associated with first audio sample. At 4030, for a user to provide a second cantillated audio sample associated with the text. At 4040, network interface to communicate with computer-based user devices to present user interface features on the computer-based user devices. At 4050 Optionally, program for automatically associating the first cantillated audio sample with the text using a pronunciation dictionary. At 4060, optionally, pronunciation dictionary contains a verse dictionary and a word dictionary, word dictionary includes words from the verse dictionary. At 4070, optionally, pronunciation dictionary accounts for differences in pronunciation due to ekphonetic notation.

A method comprising determining a start time and an end time of a verse in an audio sample using a verse dictionary; and determining a start time and an end time of each word in the verse using a word dictionary. Optionally, wherein the start times and end times are determined using forced alignment. Optionally, wherein the verse is a verse from the Bible. Optionally, wherein the audio sample is cantillated. Optionally, wherein the word dictionary comprises machine generated reversible romanized Hebrew text and associated phonemes. Optionally, wherein the word dictionary comprises machine generated transliteration of Hebrew text and associated phonemes. Optionally, wherein the word dictionary accounts for differences in pronunciation due to ekphonetic notation. Optionally, further comprising playing the audio sample to a user; and displaying a text of the verse to the user, wherein each word in the text is emphasized in synchronism with the playing of the associated word in the audio sample. Optionally, wherein the user is a Bar Mitzvah or Bat Mitzvah student. Optionally, wherein the text of the verse comprises transliterated Hebrew. Optionally, wherein the pronunciation dictionary supports multiple dialects.

A method comprising automatically aligning a segment of a cantillated audio sample of a first user with biblical text using a pronunciation dictionary; playing the segment of the cantillated audio sample to a second user while simultaneously displaying a representation of the biblical text to the second user; and graphically correlating the playing of the audio sample with the displayed representation. Optionally, further comprising selecting the audio sample from a plurality of audio samples aligned with the biblical text. Optionally, wherein the pronunciation dictionary accounts for differences in pronunciation due to ekphonetic notation. Optionally, wherein the displayed representation is graphically correlated with the playing of the audio sample on a word by word basis. Optionally, wherein the displayed representation is Hebrew text and the pronunciation dictionary contains English characters representing transliterated Hebrew text.

A system comprising a first user interface feature for a user to provide a first cantillated audio sample; a second user interface feature for a user to play the first cantillated audio sample while simultaneously displaying a text associated with the first audio sample and for a user to provide a second cantillated audio sample associated with the text; and a network interface to communicate with computer-based user devices to present the user interface features on the computer-based user devices. Optionally, further comprising a program for automatically associating the first cantillated audio sample with the text using a pronunciation dictionary. Optionally, wherein the pronunciation dictionary contains a verse dictionary and a word dictionary in which the word dictionary includes individual words from the verse dictionary. Optionally, wherein the pronunciation dictionary accounts for differences in pronunciation due to ekphonetic notation.

Figure 40A:
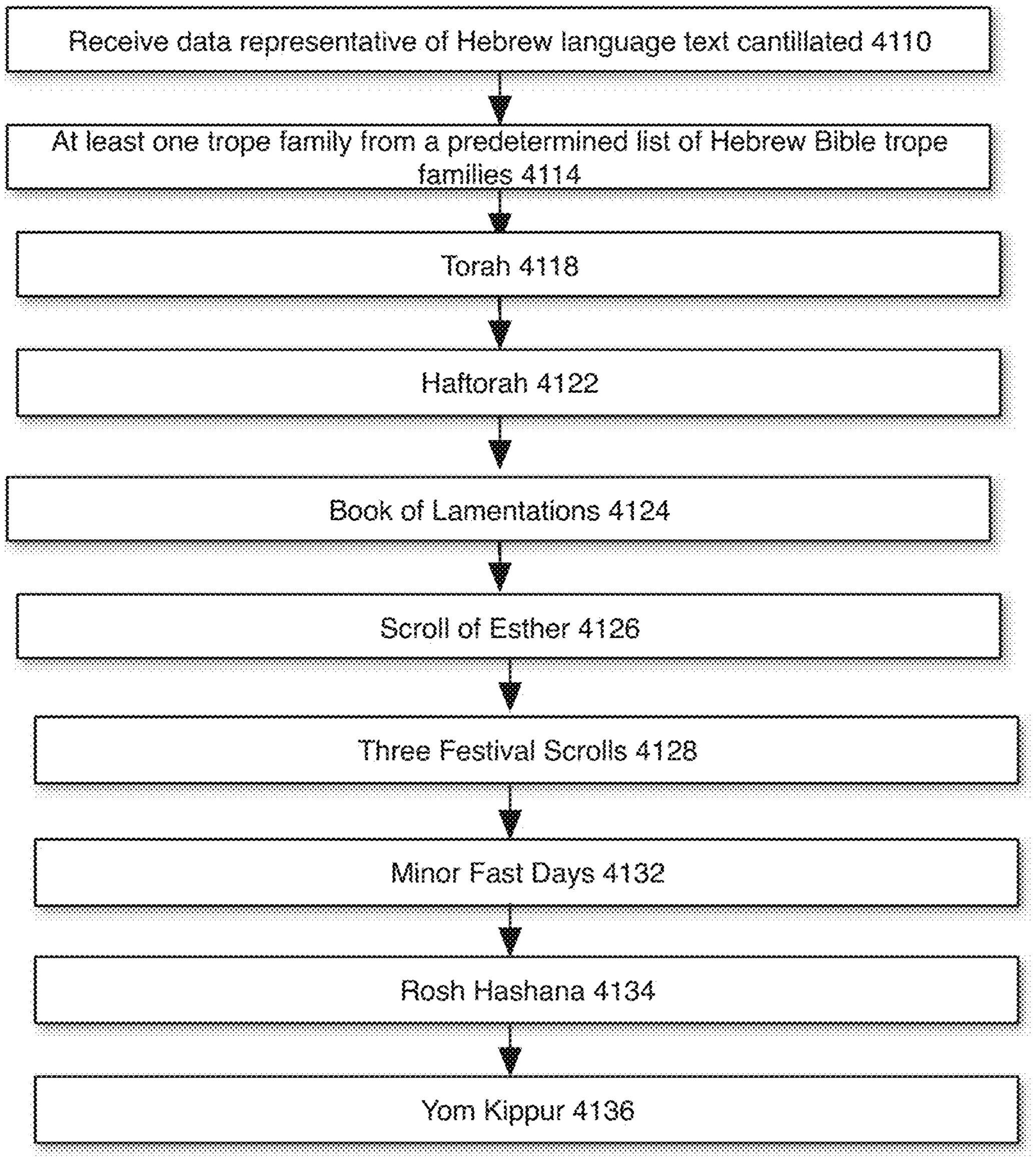
FIGS. 40A-40C depict exemplary embodiments of a method.
Figure 40B:
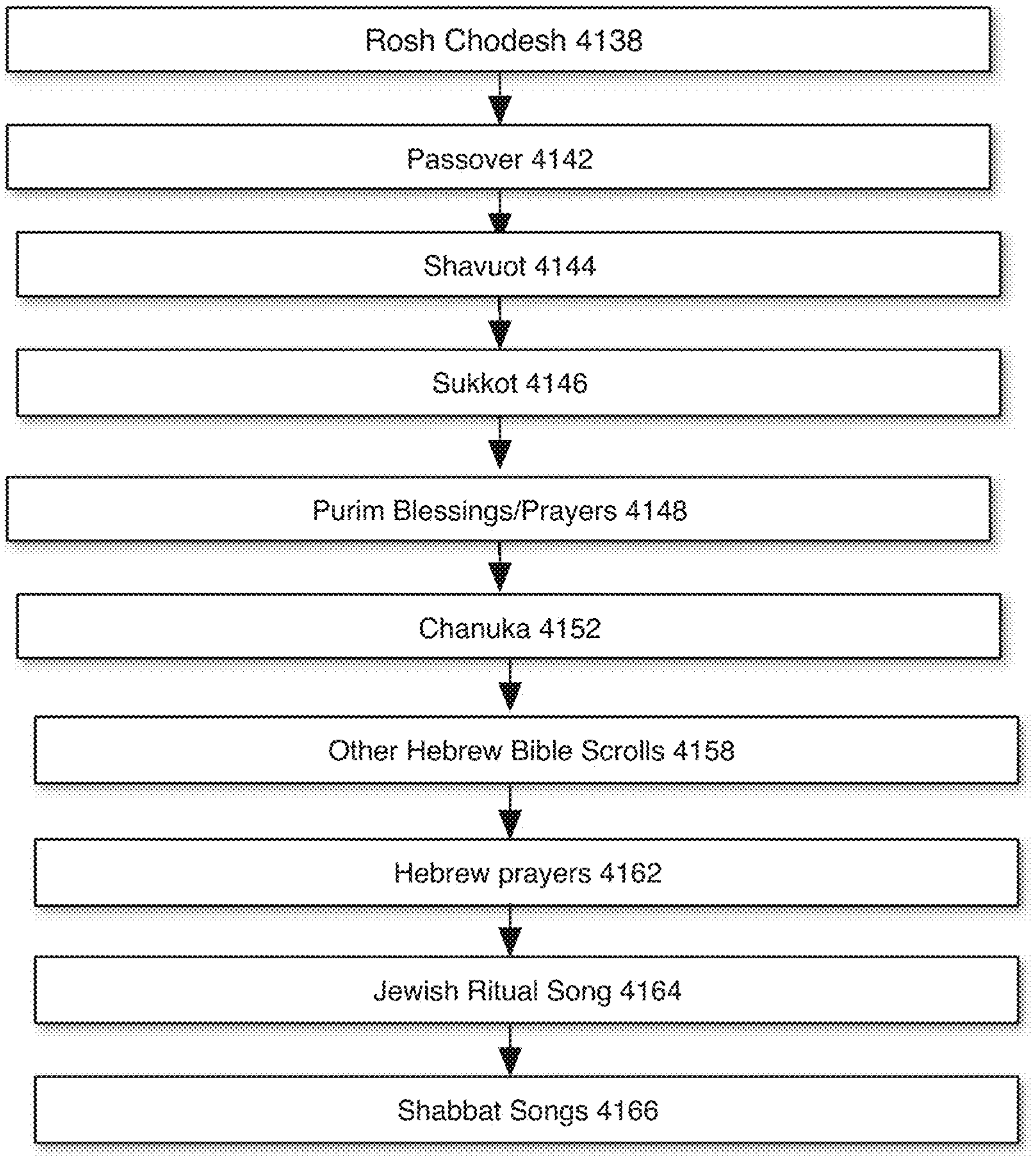
Figure 40C:
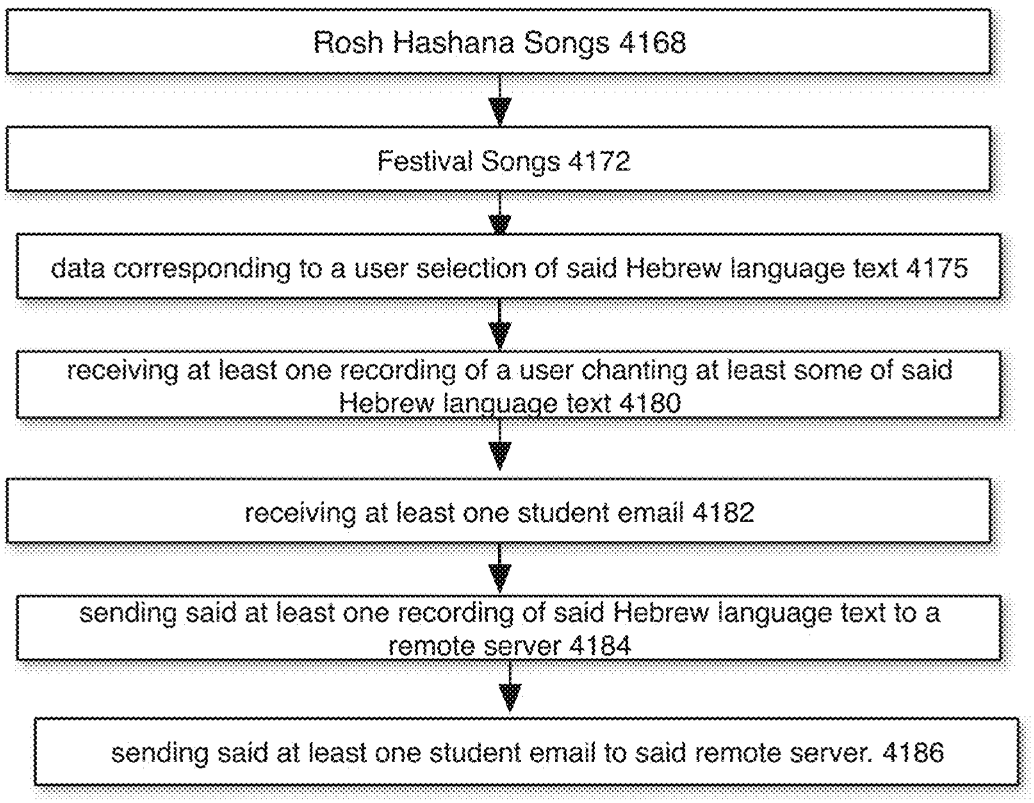

FIGS. 40A-40C depict exemplary embodiments of a method. In step 4110, receive data representative of Hebrew language text cantillated with 4114 at least one trope family from a predetermined list of Hebrew Bible trope families, said Hebrew language text from of at least one of 4118 Torah, 4122 Haftorah, 4124 Book of Lamentations, 4126 Scroll of Esther, 4128 Three Festival Scrolls, 4132 Minor Fast Days, 4134 Rosh Hashana, 4136 Yom Kippur, 4138 Rosh Chodesh, 4142 Pesach, 4144 Shavuot, 4146 Sukkot, 4148 Purim Blessings/Prayers, 4152 Chanuka, 4158 Other Hebrew Bible Scrolls, 4162 Hebrew prayers, 4164 Jewish Ritual Song, 4166 Shabbat Songs, 4168 Rosh Hashana Songs, 4172 Festival Songs, said 4174 data corresponding to a user selection of said Hebrew language text. In Step 4180, receiving at least one recording of a user chanting at least some of said Hebrew language text. In step 4182, receiving at least one student email. In step 4184, sending said at least one recording of said Hebrew language text to a remote server. In step 4186, sending said at least one student email to said remote server.

Figure 41A:
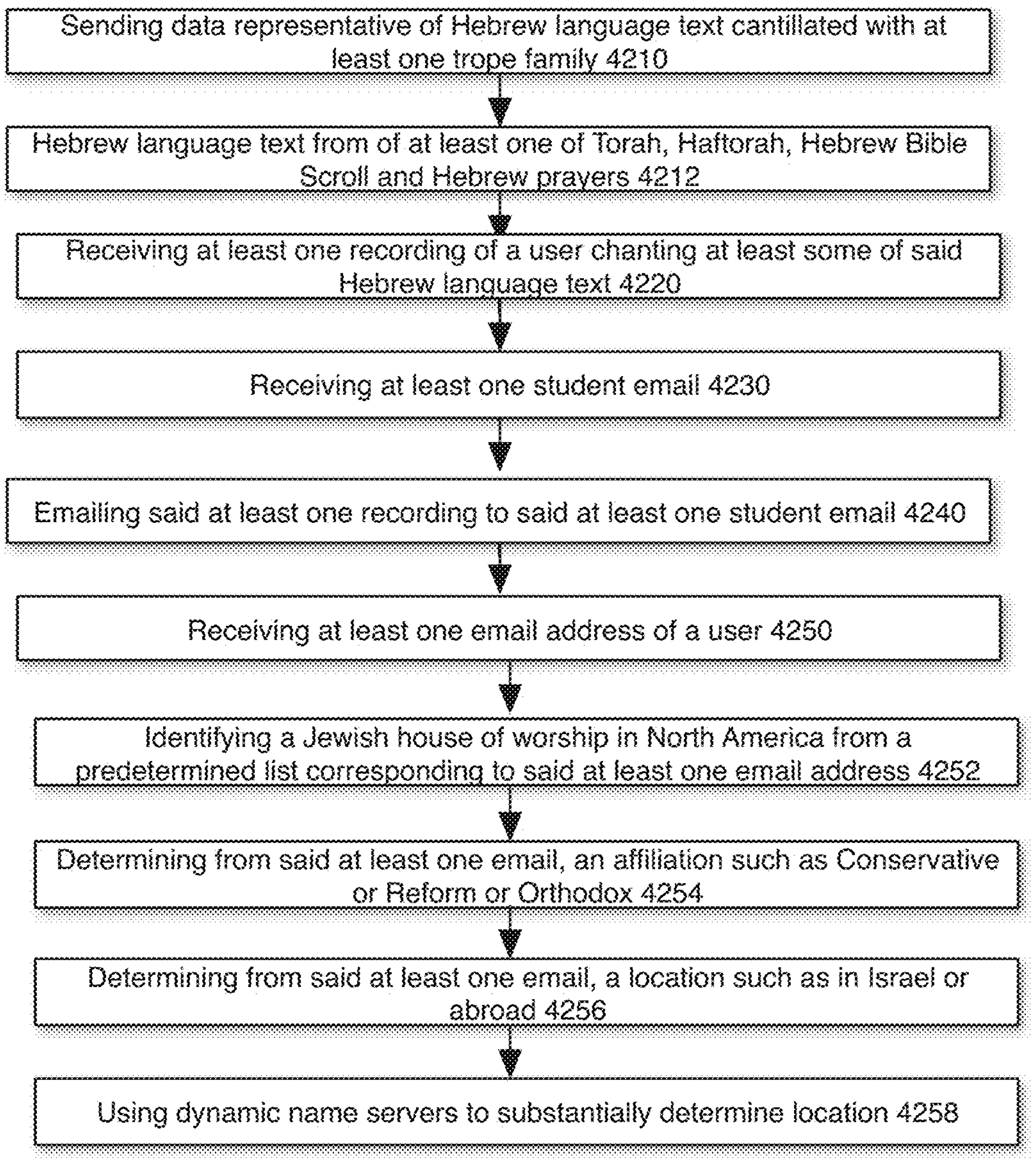
FIGS. 41A and 41B depict exemplary embodiments of a method.
Figure 41B:
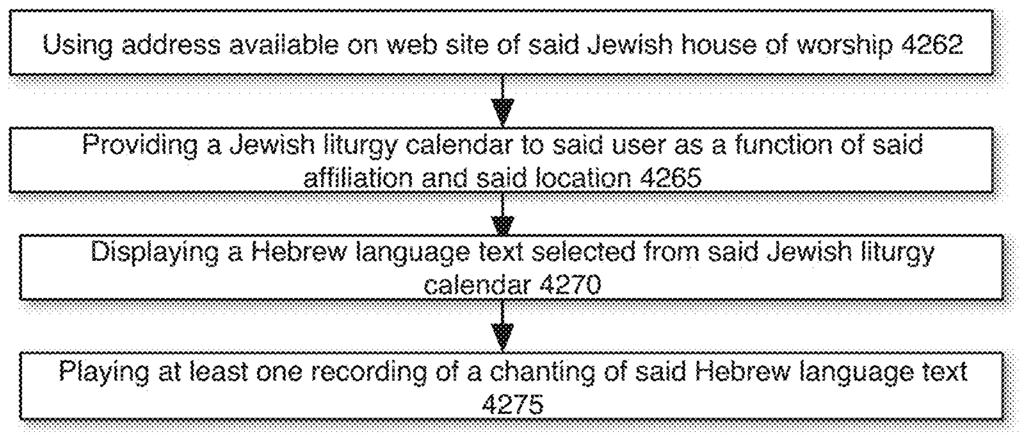

FIGS. 41A and 41B depict exemplary embodiments of a method. In step 4210, sending data representative of Hebrew language text cantillated with at least one trope family from a predetermined list of Hebrew Bible trope families. In step 4212, said Hebrew language text from of at least one of Torah, Haftorah, Hebrew Bible Scroll and Hebrew prayers. In step 4220, receiving at least one recording of a user chanting at least some of said Hebrew language text. In step 4230, receiving at least one student email. In step 4240, emailing said at least one recording to said at least one student email. In step 4250, receiving at least one email address of a user. In step 4252, identifying a Jewish house of worship in North America from a predetermined list, corresponding to said at least one email address. In step 4254, determining from said at least one email, an affiliation such as Conservative or Reform or Orthodox. In step 4256, determining from said at least one email, a location such as in Israel or abroad. In step 4258, using dynamic name servers to substantially determine location. In step 4262, using address available on web site of said Jewish house of worship. In step 4265, providing a Jewish liturgy calendar to said user as a function of said affiliation and said location. In step 4270, displaying a Hebrew language text selected from said Jewish liturgy calendar. In step 4275, playing at least one recording of a chanting of said Hebrew language text.

Figure 42A:
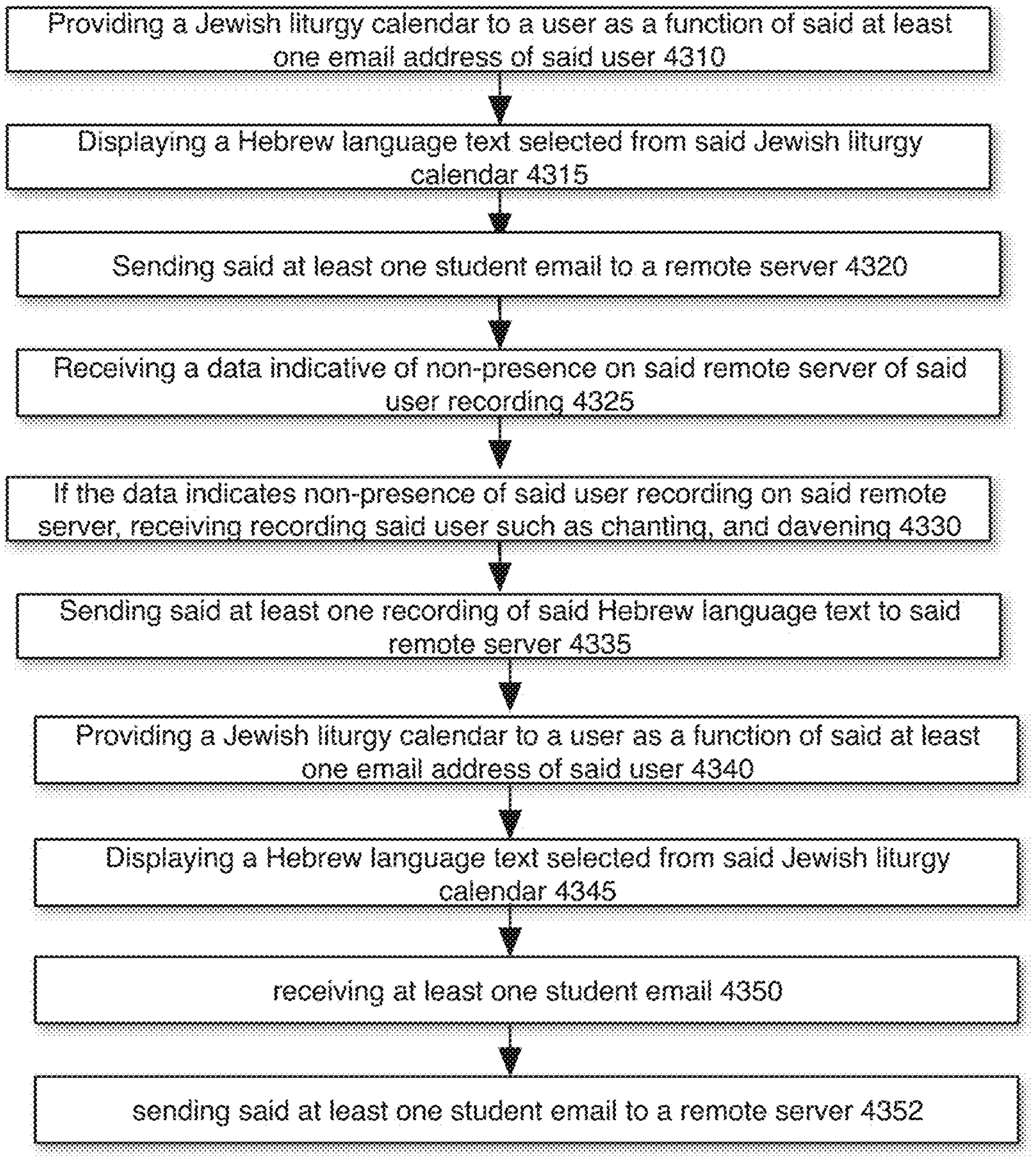
FIGS. 42A and 42B depict exemplary embodiments of a method.
Figure 42B:
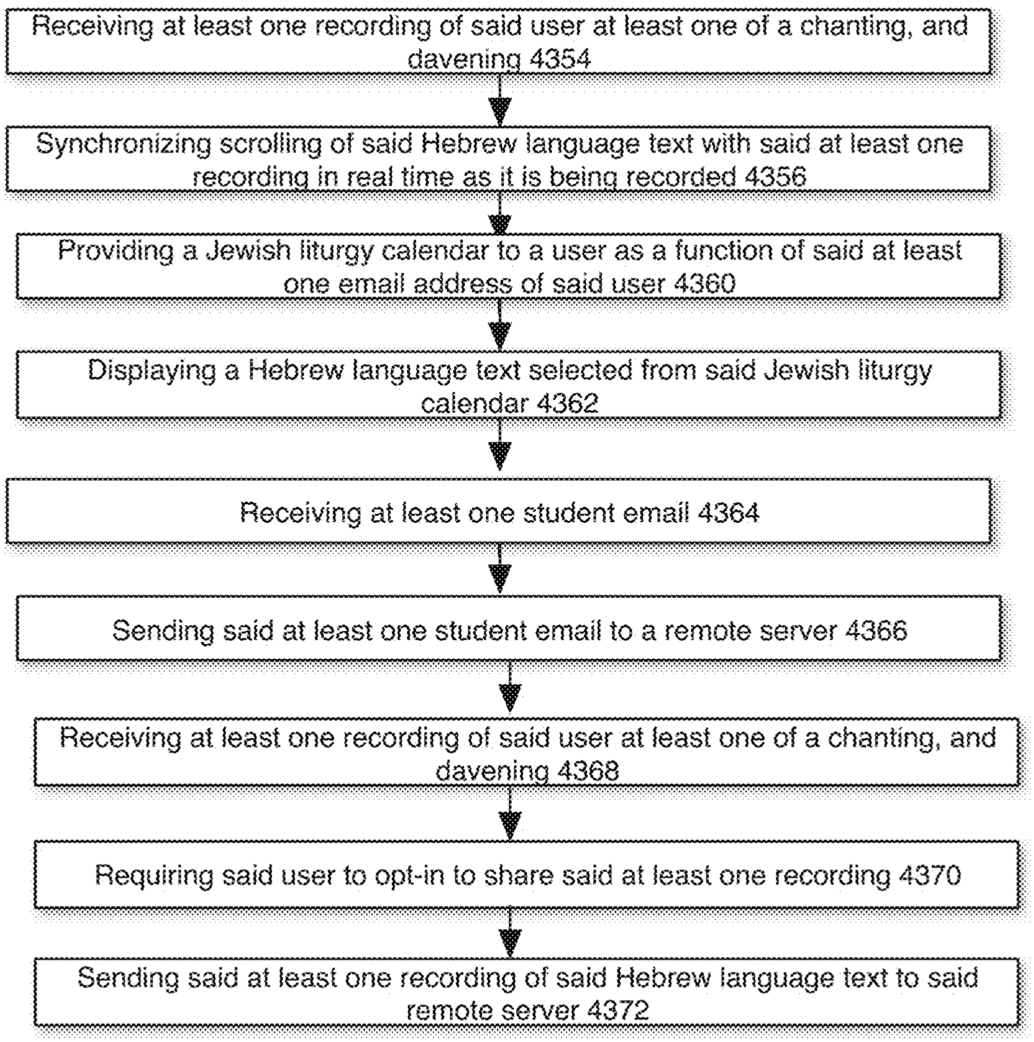

FIGS. 42A and 42B depict exemplary embodiments of a method. In step 4310, providing a Jewish liturgy calendar to a user as a function of said at least one email address of said user. In step 4315, displaying a Hebrew language text selected from said Jewish liturgy calendar. In step 4320, sending said at least one student email to a remote server. In step 4325, receiving a data indicative of non-presence on said remote server of said user recording of said Hebrew language text. In step 4330, if the data indicates non-presence of said user recording on said remote server, receiving at least one recording of said user at least one of a chanting, and davening, of said Hebrew language text. In step 4335, sending said at least one recording of said Hebrew language text to said remote server. In step 4340, providing a Jewish liturgy calendar to a user as a function of said at least one email address of said user. In step 4345, displaying a Hebrew language text selected from said Jewish liturgy calendar. In step 4350, receiving at least one student email. In step 4352, sending said at least one student email to a remote server. In step 4354, receiving at least one recording of said user at least one of a chanting, and davening, of said Hebrew language text. In step 4356, synchronizing scrolling of said Hebrew language text with said at least one recording in real time as said recording is being recorded. In step 4360, providing a Jewish liturgy calendar to a user as a function of said at least one email address of said user. In step 4362, displaying a Hebrew language text selected from said Jewish liturgy calendar. In step 4364, receiving at least one student email. In step 4366, sending said at least one student email to a remote server. In step 4368, receiving at least one recording of said user at least one of a chanting, and davening, of said Hebrew language text. In step 4370, requiring said user to opt-in to share said at least one recording. In step 4372, sending said at least one recording of said Hebrew language text to said remote server.

Figure 43A:
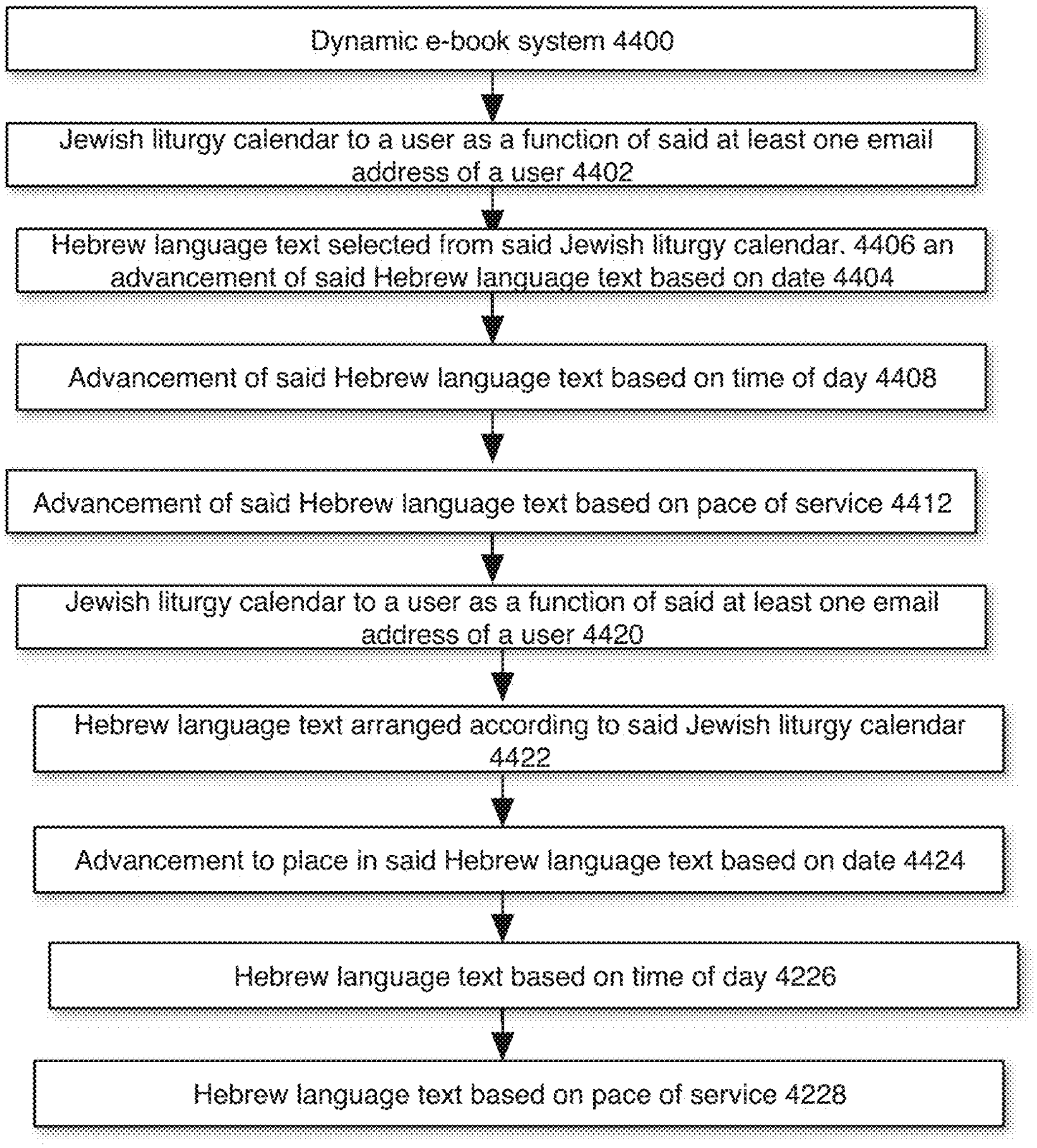
FIGS. 43A and 43B depict exemplary embodiments of a system.
Figure 43B:
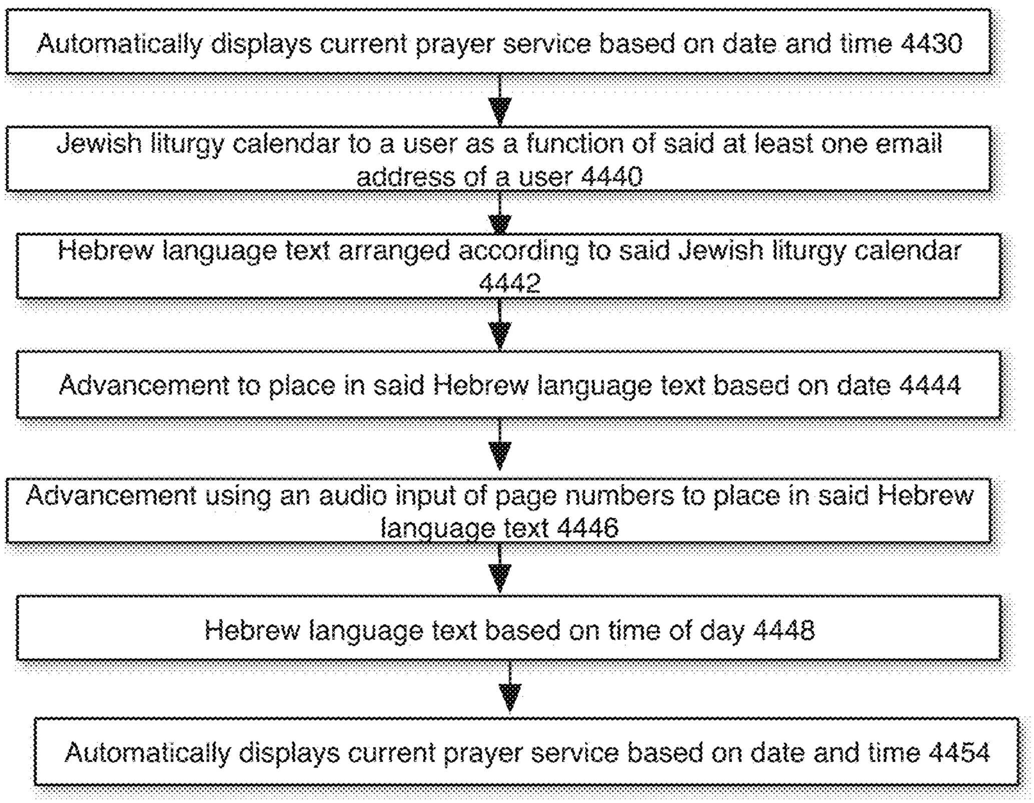
Figure 44A:
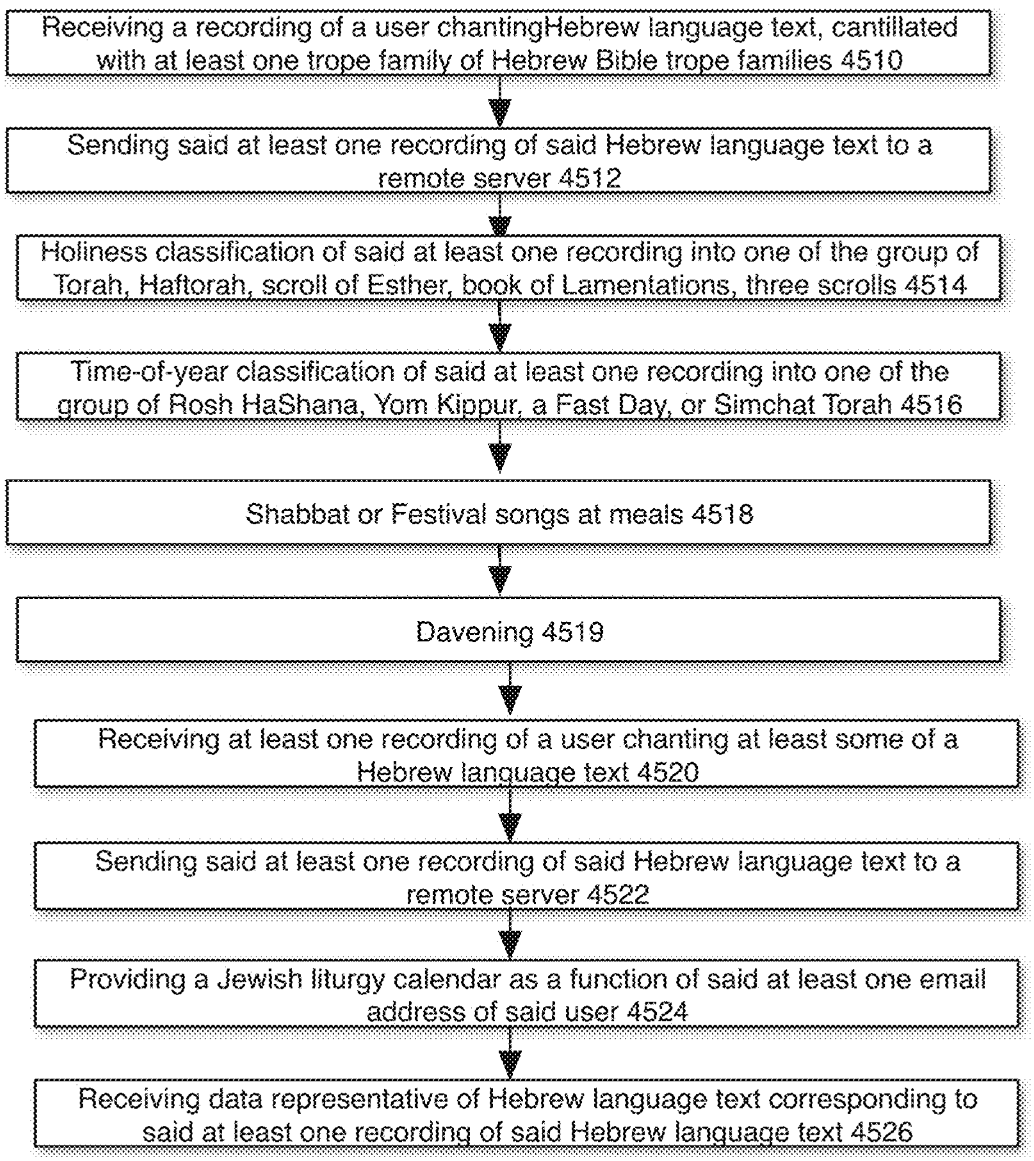
FIGS. 44A-44D depict exemplary embodiments of a method.
Figure 44B:
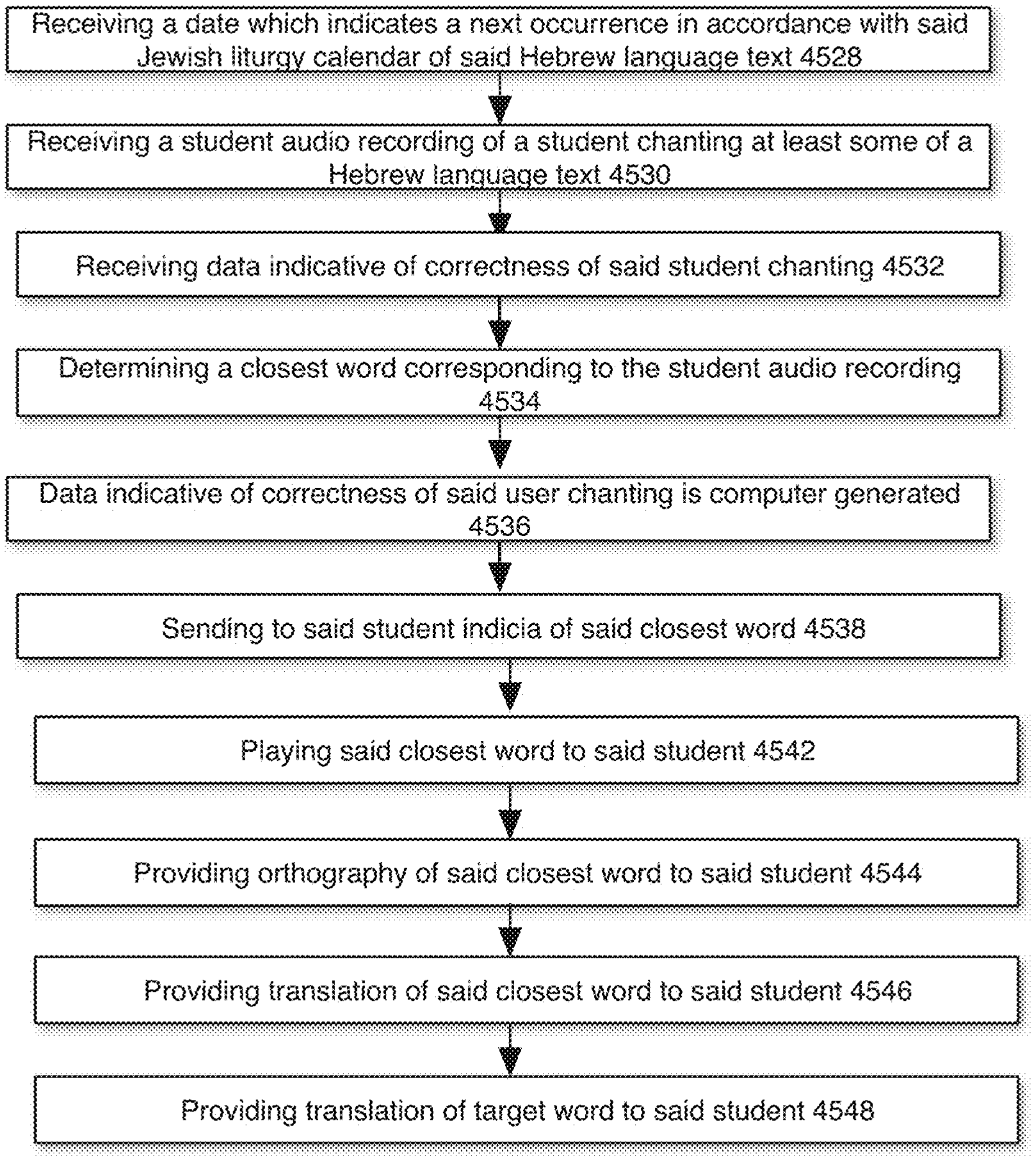
Figure 44C:
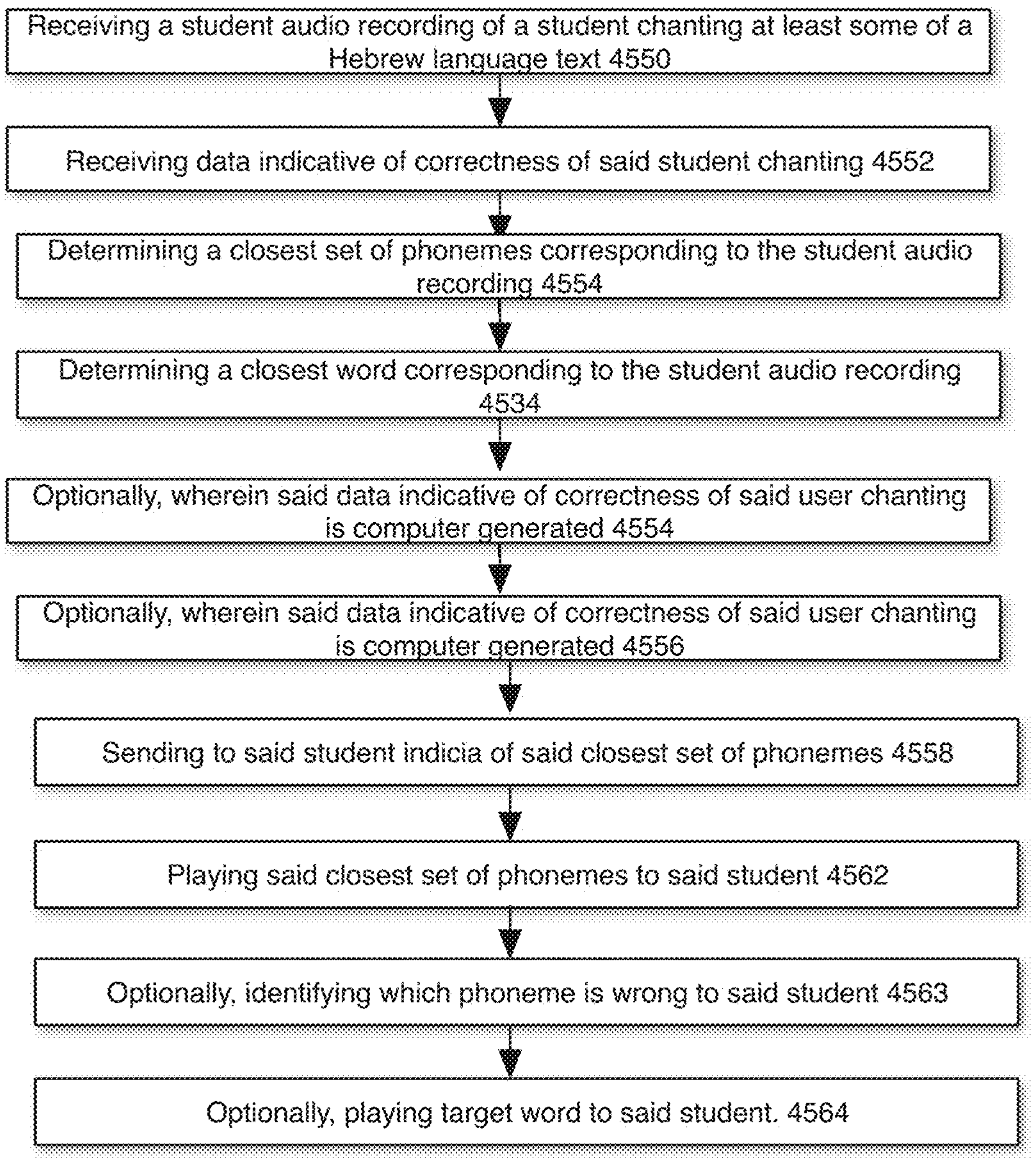
Figure 44D:
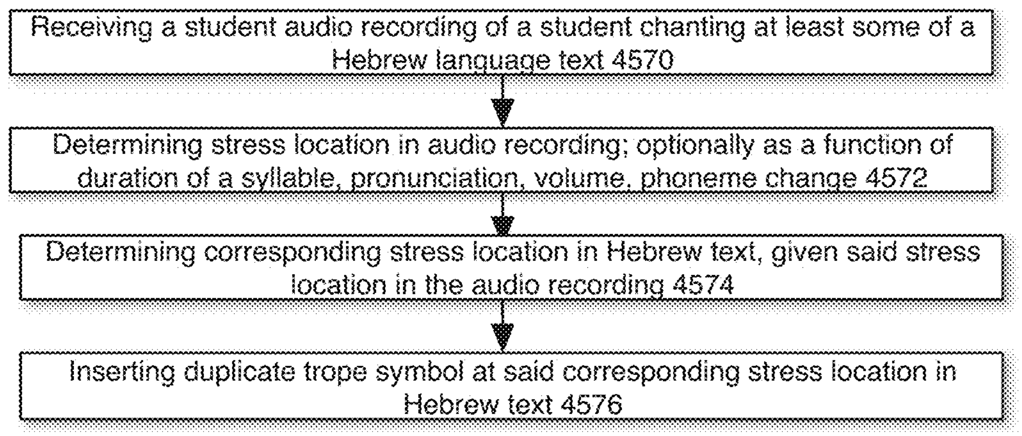

FIGS. 43A and 43B depict exemplary embodiments of a system. 4400 dynamic e-book system. 4402 a Jewish liturgy calendar to a user as a function of said at least one email address of a user. 4404 a Hebrew language text selected from said Jewish liturgy calendar. 4406 an advancement of said Hebrew language text based on date. 4408 an advancement of said Hebrew language text based on time of day. 4412 an advancement of said Hebrew language text based on pace of service. 4420 a Jewish liturgy calendar to a user as a function of said at least one email address of a user. 4422 a compilation of Hebrew language text arranged according to said Jewish liturgy calendar. 4424 an advancement to place in said Hebrew language text based on date. 4426 an advancement in said Hebrew language text based on time of day. 4428 an advancement in said Hebrew language text based on pace of service. 4430 Automatically displays current prayer service based on date and time. 4440 a Jewish liturgy calendar to a user as a function of said at least one email address of a user. 4442 a compilation of Hebrew language text arranged according to said Jewish liturgy calendar. 4444 an advancement to place in said Hebrew language text based on date. 4446 an advancement using an audio input of page numbers to place in said Hebrew language text. 4448 an advancement in said Hebrew language text based on time of day. 4452 an advancement in said Hebrew language text based on pace of service. 4454 Automatically displays current prayer service based on date and time.

FIGS. 44A-44D depict exemplary embodiments of a method. In step 4510, receiving at least one recording of a user chanting at least some of a Hebrew language text, cantillated with at least one trope family from a predetermined list of Hebrew Bible trope families. In step 4512, sending said at least one recording of said Hebrew language text to a remote server. In step 4514, receiving data representative of a holiness classification of said at least one recording into one of the group of Torah, Haftorah, scroll of Esther, book of Lamentations, three scrolls. In step 4516, receiving data representative of a time-of-year classification of said at least one recording into one of the group of Rosh HaShana, Yom Kippur, a Fast Day, or Simchat Torah. In step 4518, including Shabbat or Festival songs at meals. In step 4519, including davening. In step 4520, receiving at least one recording of a user chanting at least some of a Hebrew language text, cantillated with at least one trope family from a predetermined list of Hebrew Bible trope families. In step 4522, sending said at least one recording of said Hebrew language text to a remote server. In step 4524, providing a Jewish liturgy calendar as a function of said at least one email address of said user. In step 4526, receiving data representative of Hebrew language text corresponding to said at least one recording of said Hebrew language text. In step 4528, receiving a date which indicates a next occurrence in accordance with said Jewish liturgy calendar of said Hebrew language text. In step 4530, receiving a student audio recording of a student chanting at least some of a Hebrew language text, cantillated with at least one trope family from a predetermined list of Hebrew Bible trope families. In step 4532, receiving data indicative of correctness of said student chanting. In step 4534, determining a closest word corresponding to the student audio recording. In step 4536, wherein said data indicative of correctness of said user chanting is computer generated. In step 4538, further comprising sending to said student indicia of said closest word. In step 4542, playing said closest word to said student. In step 4544, providing orthography of said closest word to said student. In step 4546, providing translation of said closest word to said student. In step 4548, providing translation of target word to said student. In step 4550, receiving a student audio recording of a student chanting at least some of a Hebrew language text, cantillated with at least one trope family from a predetermined list of Hebrew Bible trope families. In step 4552, receiving data indicative of correctness of said student chanting. In step 4554, determining a closest set of phonemes corresponding to the student audio recording. In step 4556, optionally, wherein said data indicative of correctness of said user chanting is computer generated. In step 4558, further comprising sending to said student indicia of said closest set of phonemes. In step 4562, playing said closest set of phonemes to said student. In step 4563, optionally, identifying which phoneme is wrong to said student. In step 4564, optionally, playing target word to said student. In step 4570, receiving an audio recording of a user chanting at least some of a Hebrew language text, cantillated with at least one trope family from a predetermined list of Hebrew Bible trope families. In step 4572, determining stress location in the audio recording; optionally said determining as a function of duration of a syllable, pronunciation, volume, phoneme change. In step 4574, determining corresponding stress location in Hebrew text, given said stress location in the audio recording. In step 4576, inserting duplicate trope symbol at said corresponding stress location in Hebrew text.

Figure 45:
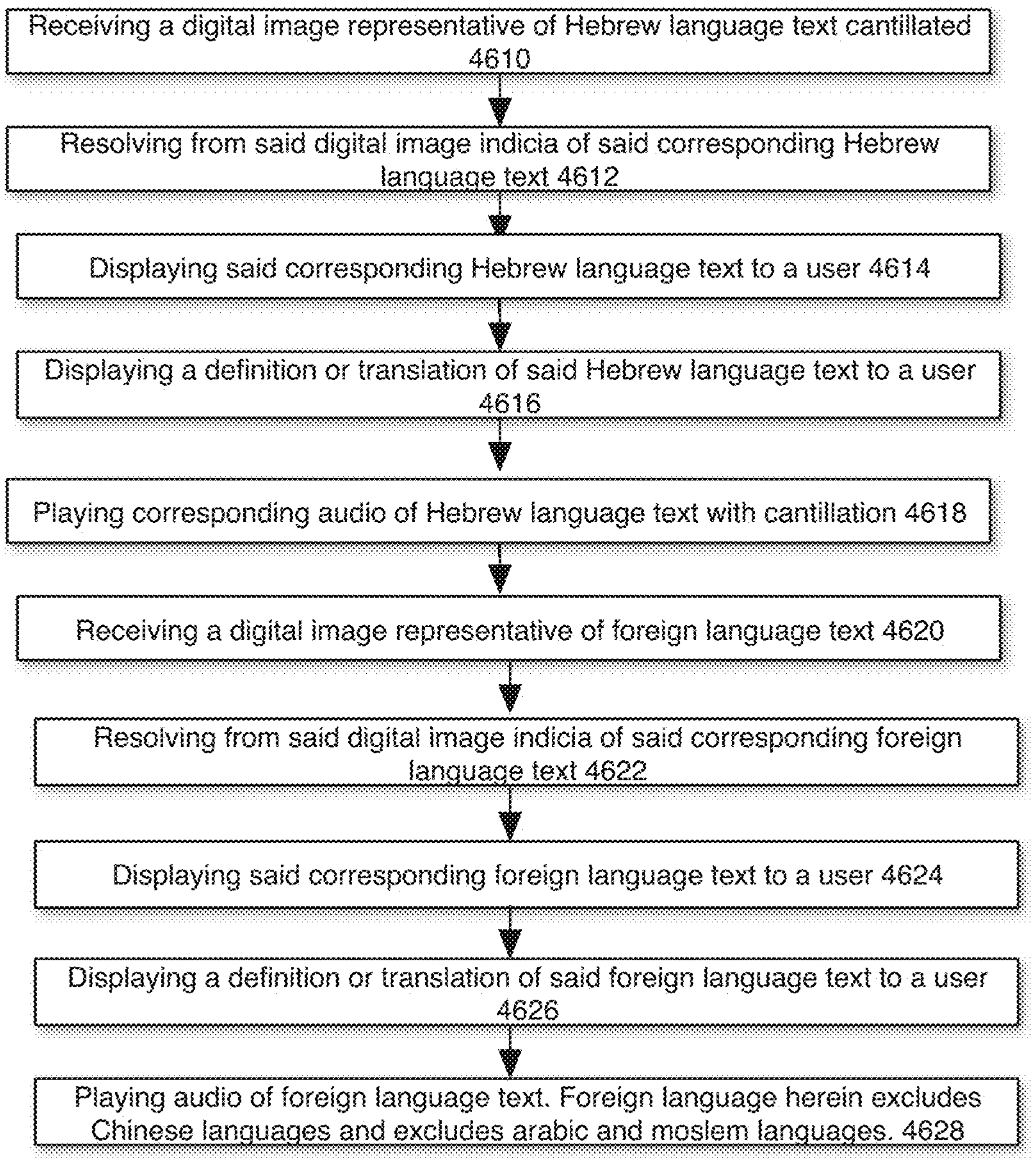
FIG. 45 depicts an exemplary embodiment of a method.

FIG. 45 depicts an exemplary embodiment of a method. In step 4610, receiving a digital image representative of Hebrew language text cantillated with at least one trope family from a predetermined list of Hebrew Bible trope families, said data corresponding to a at least one of Torah, Haftorah, Hebrew Bible Scroll and Hebrew prayers. In step 4612, resolving from said digital image indicia of said corresponding Hebrew language text. In step 4614, displaying said corresponding Hebrew language text to a user. In step 4616, displaying a definition or translation of said Hebrew language text to a user. In step 4618, playing corresponding audio of Hebrew language text with cantillation. In step 4620, receiving a digital image representative of foreign language text. In step 4622, resolving from said digital image indicia of said corresponding foreign language text. In step 4624, displaying said corresponding foreign language text to a user. In step 4626, displaying a definition or translation of said foreign language text to a user. In step 4628, playing corresponding audio of foreign language text. Note foreign language herein excludes Chinese languages and excludes arabic and moslem languages.

Figure 46:
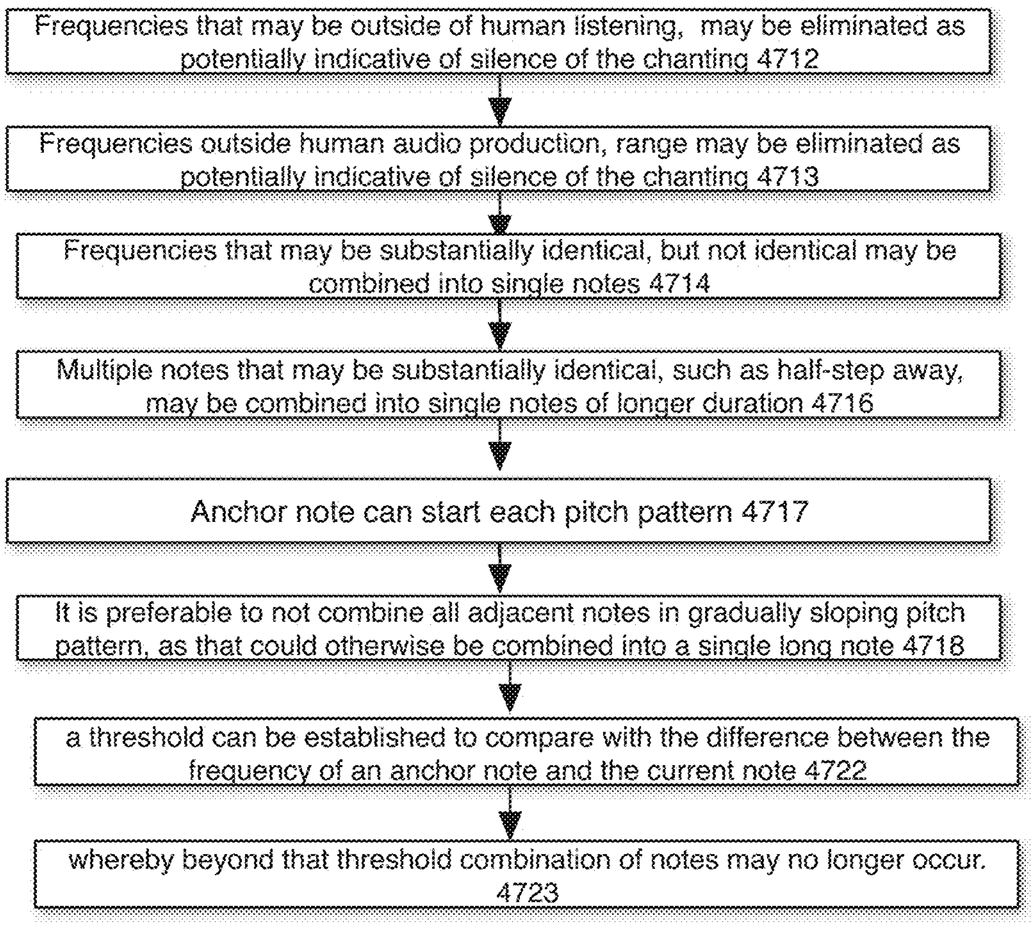
FIG. 46 depicts an exemplary embodiment of a method.

FIG. 46 depicts an exemplary embodiment of a method. In step 4710, receiving data representative of Hebrew language text cantillated with at least one trope family from a predetermined list of Hebrew Bible trope families. In step 4712, frequencies that may be outside of human listening range may be eliminated as potentially indicative of silence of the chanting. In step 4713, frequencies that may be outside of human audio production range may be eliminated as potentially indicative of silence of the chanting. In step 4714, frequencies that may be substantially identical, but not identical may be combined into single notes. In step 4716, multiple notes that may be substantially identical, such as half-step away, may be combined into single notes of longer duration. In step 4717, an anchor note can start each pitch pattern. In step 4718, it is preferable to not combine all adjacent notes in gradually sloping pitch pattern, as that could be combined into a single long note. In step 4722, rather, a threshold can be established to compare with the difference between the frequency of an anchor note and the current note. In step 4723, whereby beyond that threshold combination of notes may no longer occur.

Figure 47A:
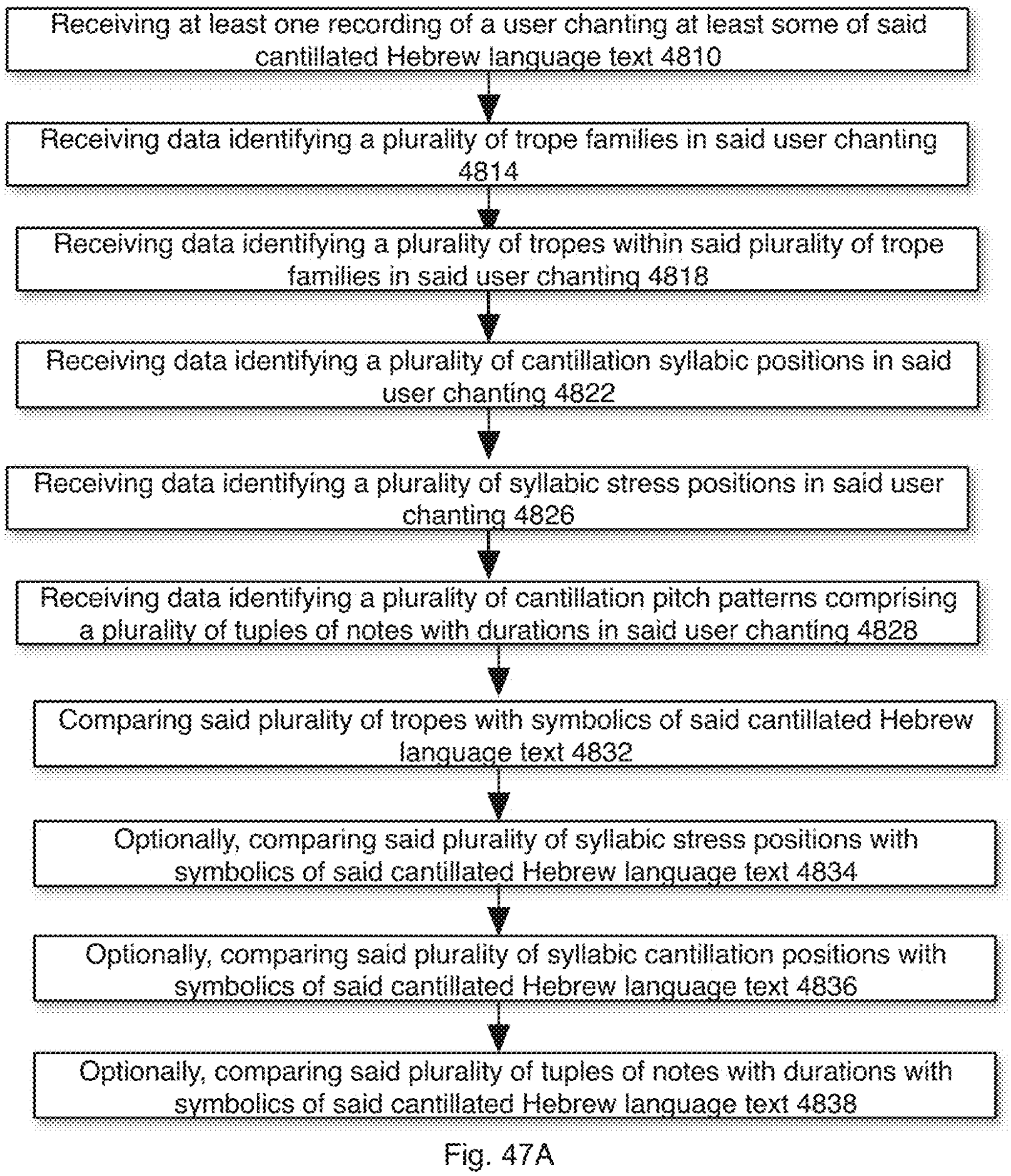
FIGS. 47A and 47B depict exemplary embodiments of a method.
Figure 47B:
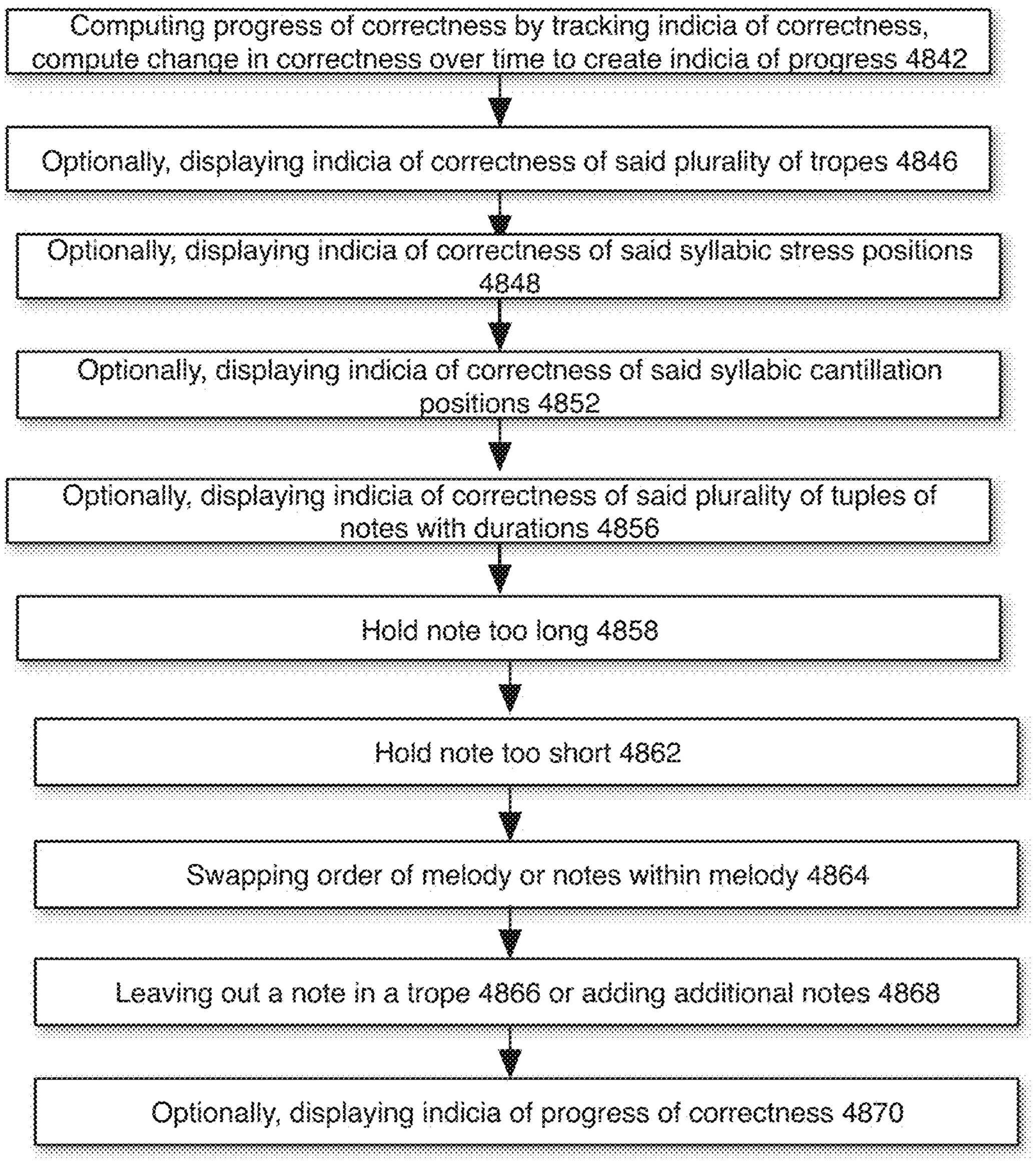

FIGS. 47A and 47B depict exemplary embodiments of a method. In step 4810, receiving at least one recording of a user chanting at least some of said cantillated Hebrew language text. In step 4814, receiving data identifying a plurality of trope families in said user chanting. In step 4818, receiving data identifying a plurality of tropes within said plurality of trope families in said user chanting. In step 4822, receiving data identifying a plurality of cantillation syllabic positions in said user chanting. In step 4826, receiving data identifying a plurality of syllabic stress positions in said user chanting. In step 4828, receiving data identifying a plurality of cantillation pitch patterns comprising a plurality of tuples of notes with durations in said user chanting. In step 4832, comparing said plurality of tropes with symbolics of said cantillated Hebrew language text. In step 4834, optionally, comparing said plurality of syllabic stress positions with symbolics of said cantillated Hebrew language text. In step 4836, optionally, comparing said plurality of syllabic cantillation positions with symbolics of said cantillated Hebrew language text. In step 4838, optionally, comparing said plurality of tuples of notes with durations with symbolics of said cantillated Hebrew language text. In step 4842, optionally, computing progress of correctness by tracking indicia of correctness, computing differential in indicia of correctness over time to create indicia of progress. In step 4846, optionally, displaying indicia of correctness of said plurality of tropes. In step 4848, optionally, displaying indicia of correctness of said syllabic stress positions. In step 4852, optionally, displaying indicia of correctness of said syllabic cantillation positions. In step 4856, optionally, displaying indicia of correctness of said plurality of tuples of notes with durations; optionally further comprising indicia indicating at least one of the following: 4858 hold note too long, or 4862 too short, 4864 swapping order, 4866 leaving out a note in the trope, 4868 adding additional notes. In step 4870, optionally, displaying indicia of progress of correctness.

Figure 48A:
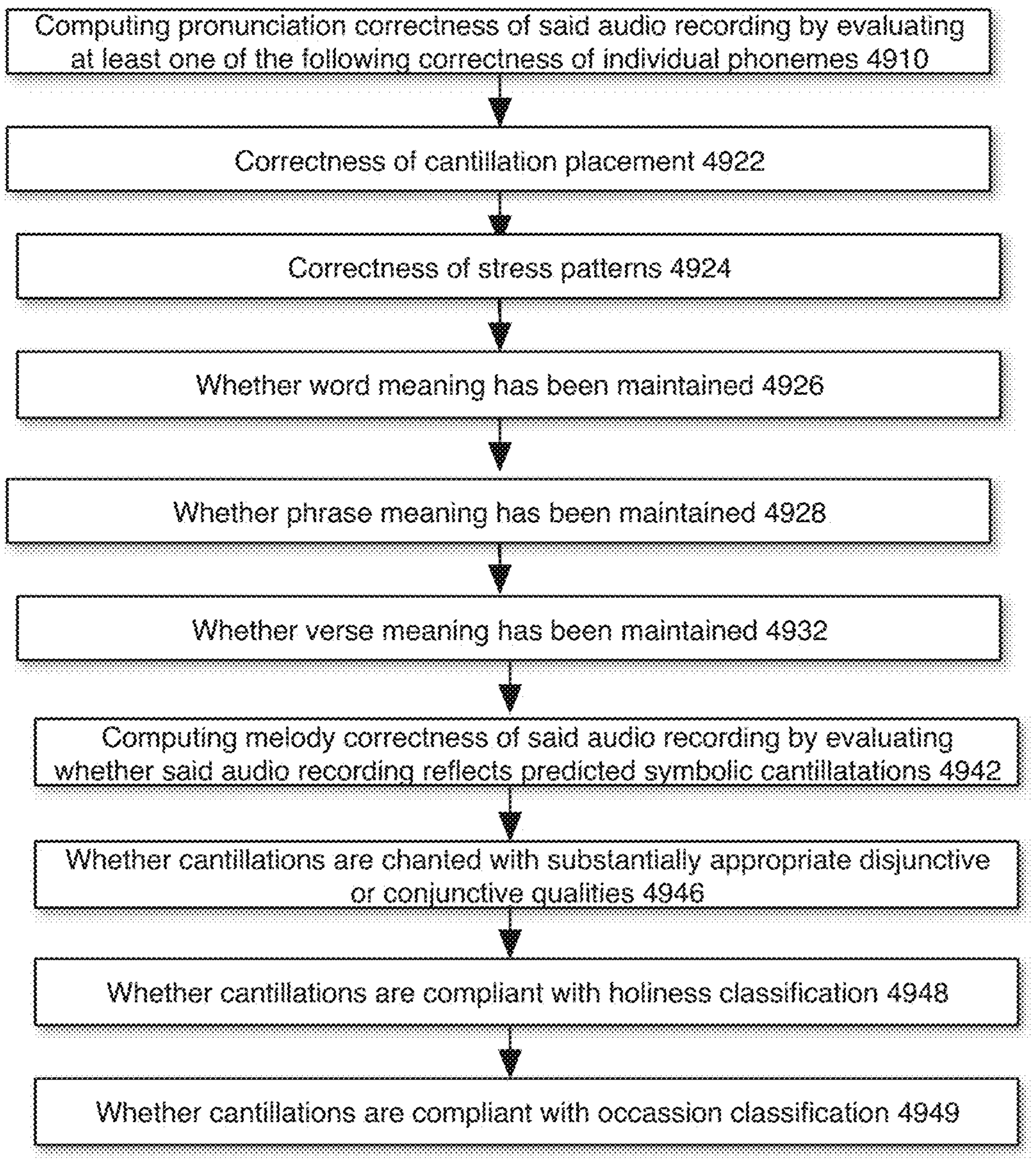
FIGS. 48A and 48B depict exemplary embodiments of a method.
Figure 48B:
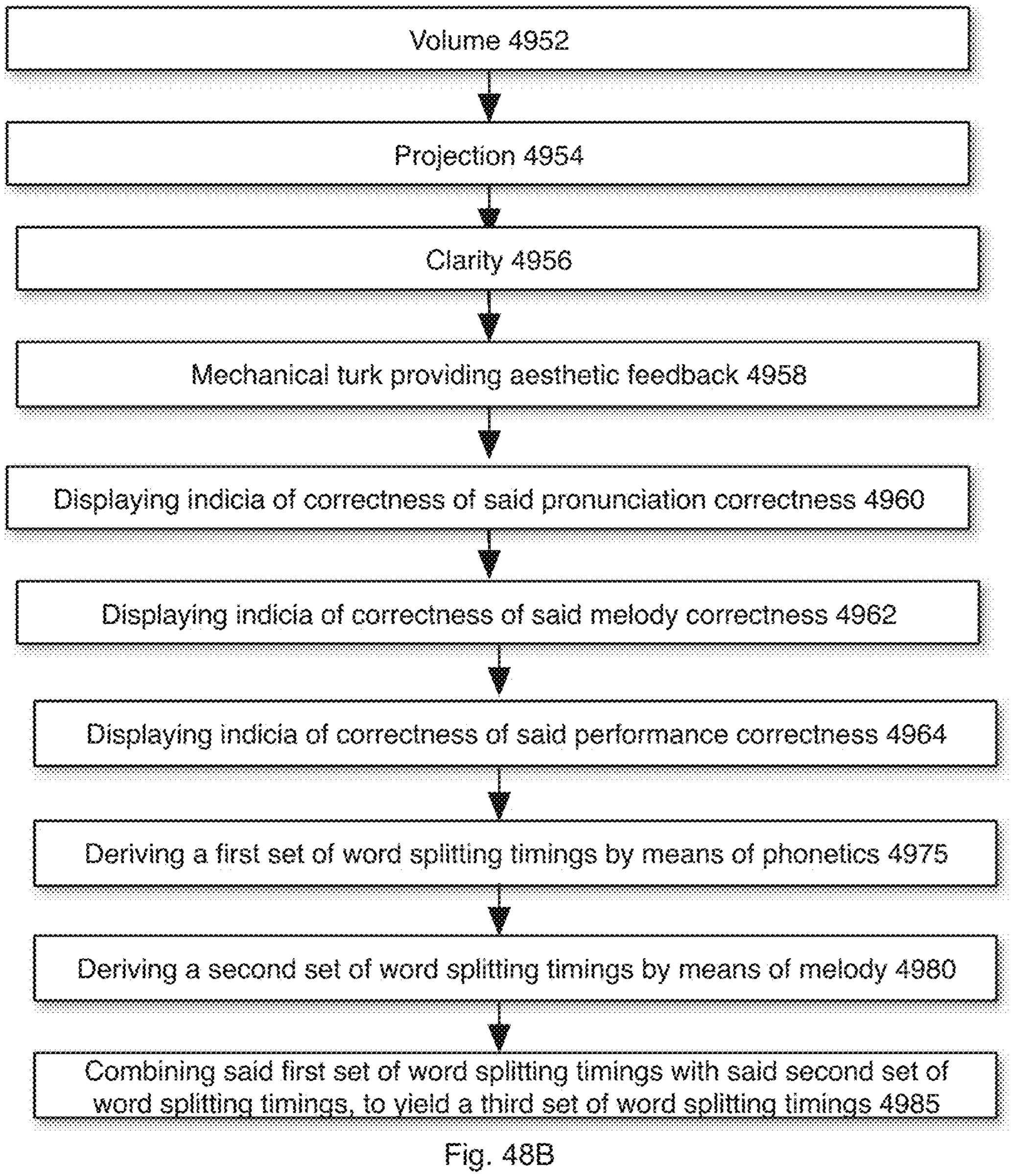

FIGS. 48A and 48B depict exemplary embodiments of a method. In step 4910, receiving an audio recording of a student chanting of a cantillated Hebrew Bible text or an uncantillated Hebrew Bible text, at least some of a Hebrew language text, cantillated with at least one trope family from a predetermined list of Hebrew Bible trope families. In step 4920, computing pronunciation correctness of said audio recording by evaluating at least one of the following correctness of individual phonemes, 4922 correctness of cantillation placement, 4924 correctness of stress patterns, 4926 whether word meaning has been maintained, 4928 whether phrase or 4932 verse meaning has been maintained. In step 4940, computing melody correctness of said audio recording by evaluating whether said audio recording substantially reflects 4942 predicted symbolic cantillatations, 4946 whether cantillations are chanted with substantially appropriate disjunctive or conjunctive qualities, and whether cantillations are compliant with 4948 holiness and 4949 occasion classification. In step 4950, computing performance correctness of said audio recording by evaluating at least one of the following 4952 volume, 4954 projection, 4956 clarity, and 4958 mechanical turk providing aesthetic feedback. In step 4960, optionally, displaying indicia of correctness of said pronunciation correctness. In step 4962, optionally, displaying indicia of correctness of said melody correctness. In step 4964, optionally, displaying indicia of correctness of said performance correctness. In step 4970, receiving an audio recording of chanting of Hebrew Bible Text cantillated with at least one trope family from a predetermined list of Hebrew Bible trope families, said data corresponding to at least one of Torah, Haftorah, Hebrew Bible Scroll and Hebrew prayers. In step 4975, deriving a first set of word splitting timings by means of phonetics. In step 4980, deriving a second set of word splitting timings by means of melody. In step 4985 combining said first set of word splitting timings with said second set of word splitting timings, to yield a third set of word splitting timings. In step 4990, providing for dynamic display of at least one of said at least one verse of said exemplary verse, said dynamic display including dynamic highlighting corresponding to said playing audio data, in accordance with at least one of said set of word splitting timings.

Figure 49:
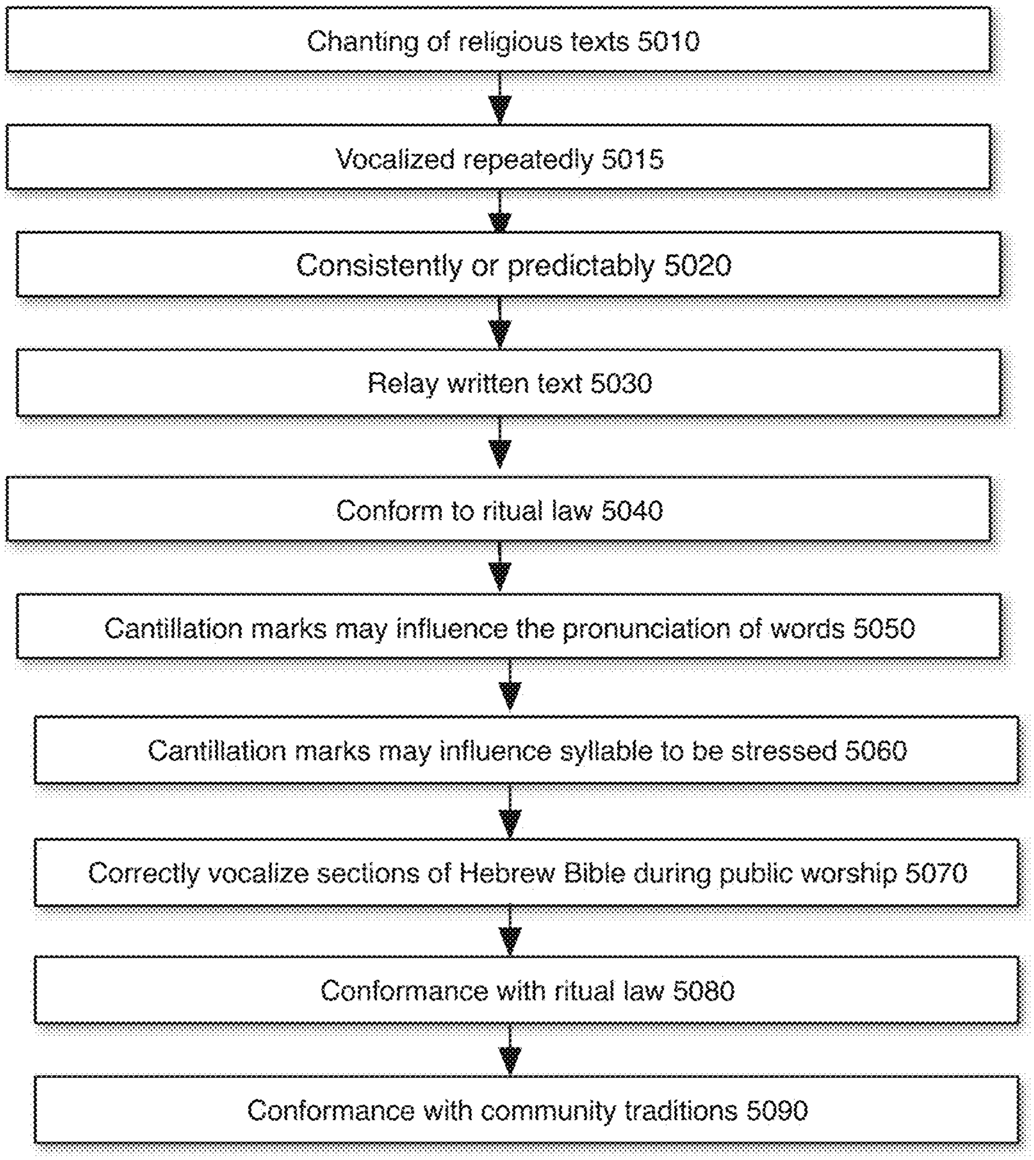
FIG. 49 depicts exemplary embodiment(s) containing exemplary functions.

FIG. 49 depicts exemplary embodiment(s). In step 5010, Chanting of religious texts. In step 5015, Vocalized repeatedly. In step 5020, Consistently or predictably. In step 5030, Relay written text. In step 5040, Conform to ritual law. In step 5050, Cantillation marks may influence the pronunciation of words. In step 5060, Cantillation marks may influence syllable to be stressed. In step 5070, Correctly vocalize sections of Hebrew Bible during public worship. In step 5080, Conformance with ritual law. In step 5090, Conformance with community traditions 5090.

Figure 50:
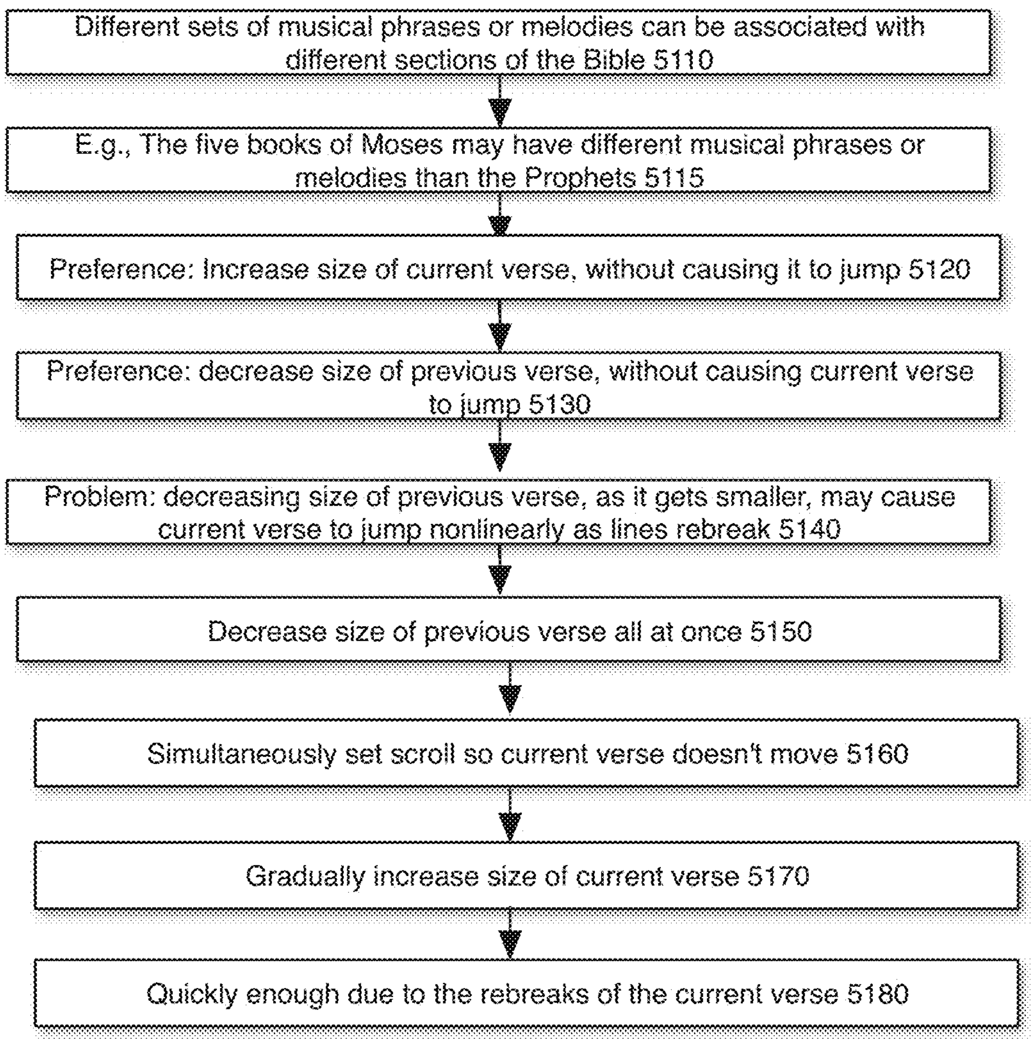
FIG. 50 depicts exemplary embodiment(s) containing exemplary functions.

FIG. 50 depicts exemplary embodiment(s) containing exemplary functions. In step 5110, Different sets of musical phrases or melodies can be associated with different sections of the Bible. In step 5115, E.g., The five books of Moses may have different musical phrases or melodies than the Prophets. In step 5120, Preference: Increase size of current verse, without causing it to jump. In step 5130, Preference: decrease size of previous verse, without causing current verse to jump. In step 5140, Problem: decreasing size of previous verse, as it gets smaller, may cause current verse to jump nonlinearly as lines rebreak. In step 5150, Decrease size of previous verse all at once. In step 5160, Simultaneously set scroll so current verse substantially doesn't move. In step 5170, Gradually increase size of current verse. In step 5180, Quickly enough due to the rebreaks of the current verse.

Figure 51:
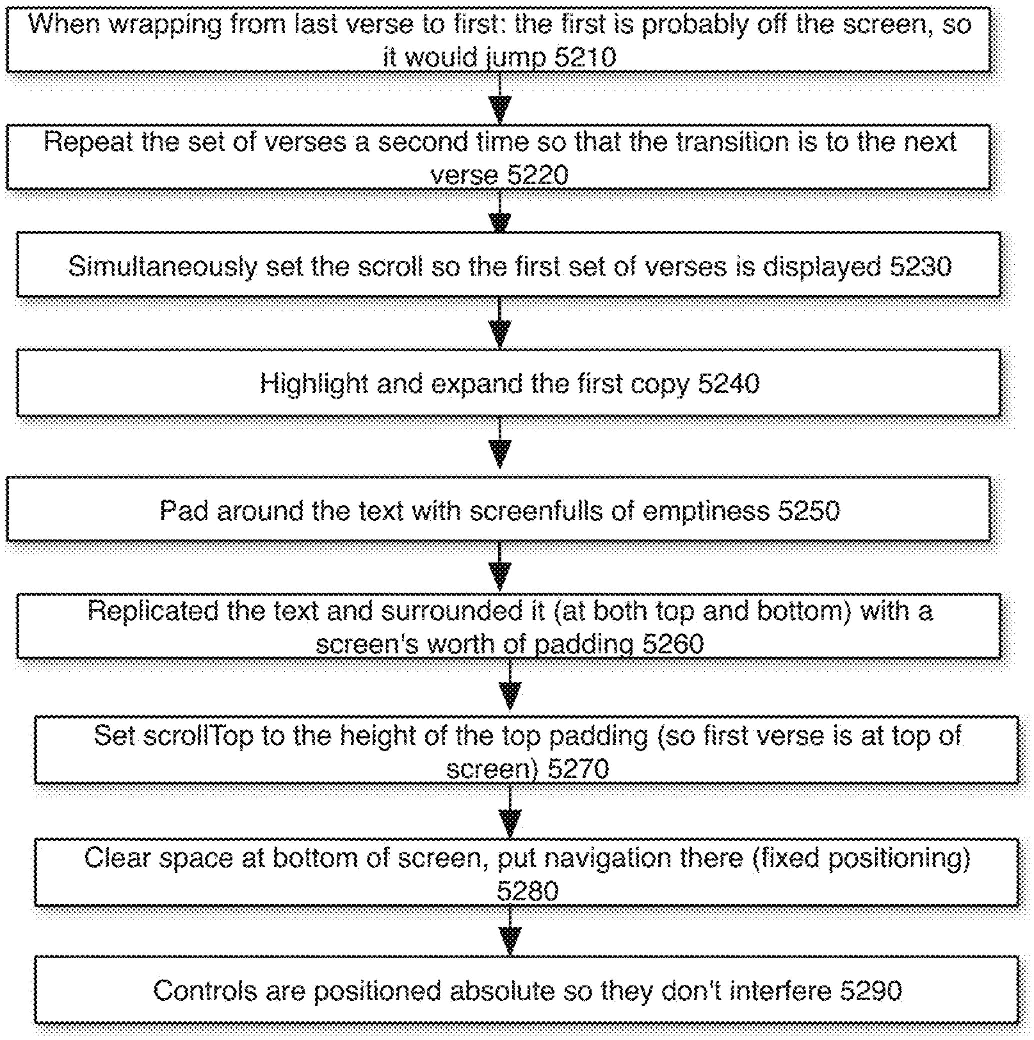
FIG. 51 depicts exemplary embodiment(s) containing exemplary functions.
Figure 52A:
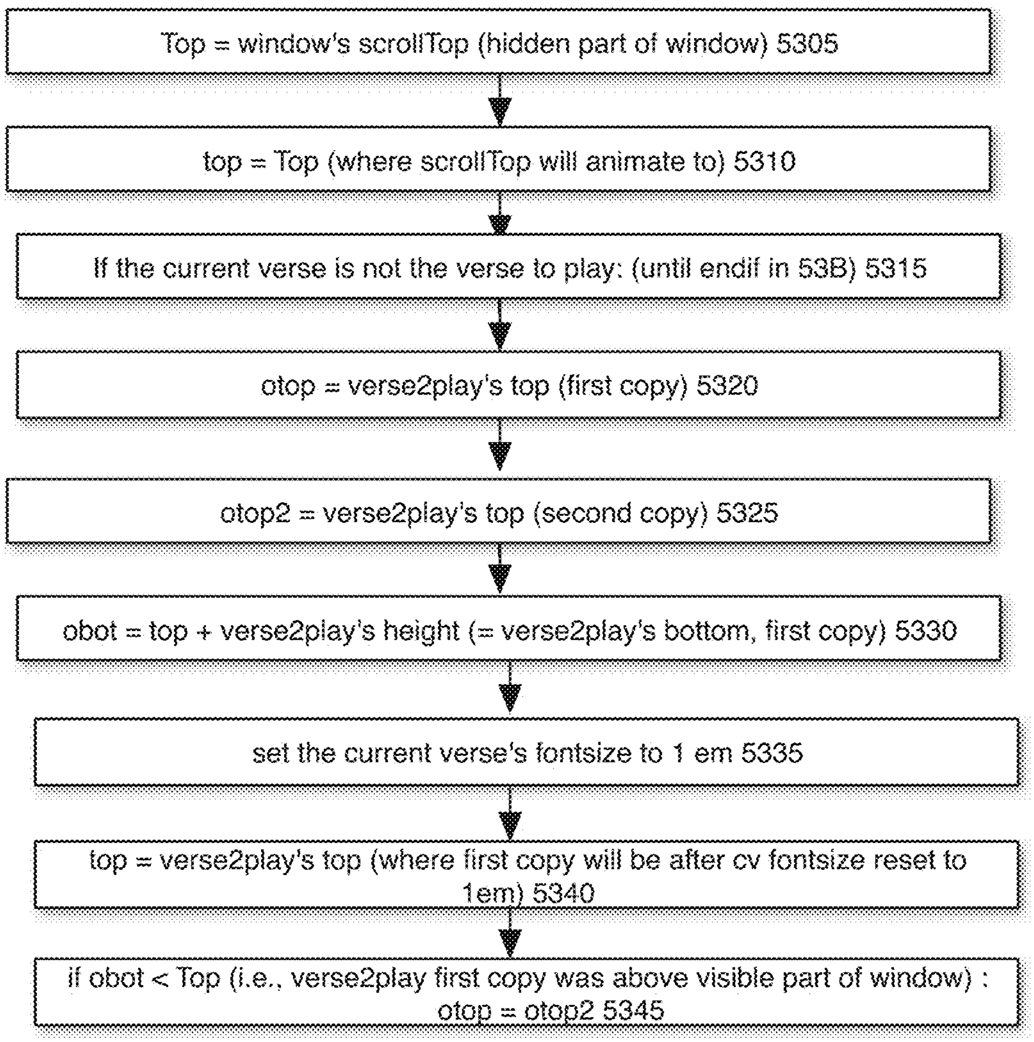
FIGS. 52A and 52B depict exemplary embodiment(s) containing exemplary functions.
Figure 52B:
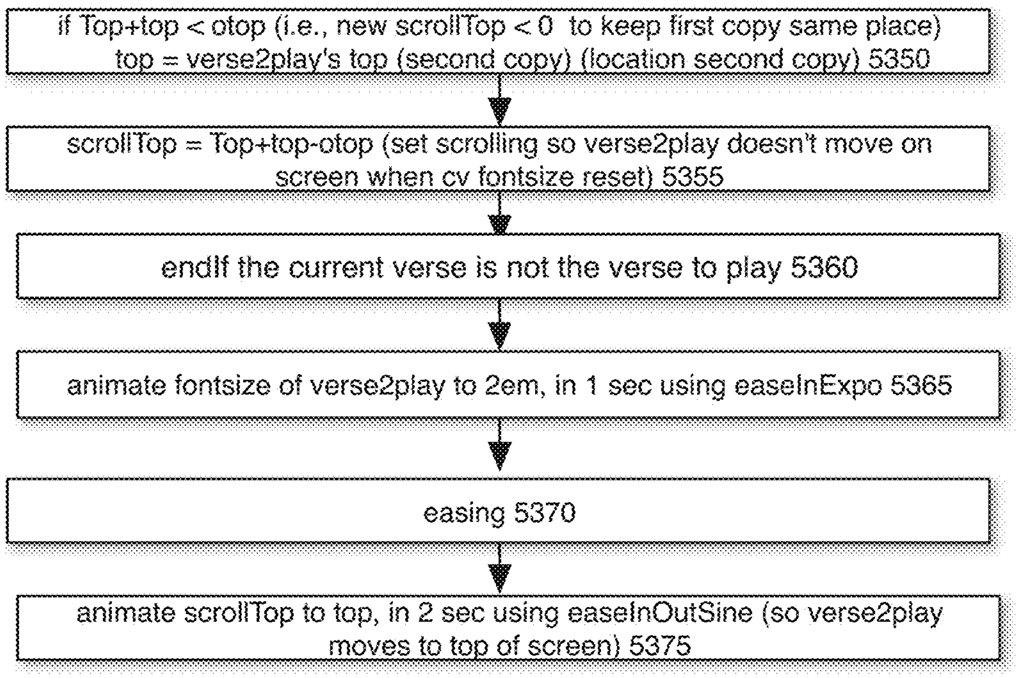

FIG. 51 depicts exemplary embodiment(s) containing exemplary functions. In step 5210, When wrapping from last verse to first: the first is probably off the screen, so it would jump. In step 5520, Repeat the set of verses a second time so that the transition is to the next verse. In step 5230, simultaneously set the scroll so the first set of verses is displayed. In step 5240, Highlight and expand the first copy. In step 5250, Pad around the text with screenfulls of emptiness. In step 5260, Replicated the text and surrounded it (at both top and bottom) with a screen's worth of padding. In step 5270, Set scrollTop to the height of the top padding (so first verse is at top of screen). In step 5280, Clear space at bottom of screen, put navigation there (fixed positioning). In step 5290, Controls are positioned absolute so they don't interfere. FIGS. 52A and 52B depict exemplary embodiment(s). In step 5305, Top=window's scrollTop (hidden part of window). In step 5310, top=Top (where scrollTop will animate to). In step 5315, If the current verse is not the verse to play: (until endif in 53B). In step 5320, otop=verse2play's top (first copy). In step 5325, otop2=verse2play's top (second copy). In step 5330, obot=top+verse2play's height (=verse2play's bottom, first copy). In step 5335, set the current verse's fontsize to 1 em. In step 5340, top=verse2play's top (where first copy will be after cv fontsize reset to 1 em). In step 5345, if obot<Top (i.e., verse2play first copy was above visible part of window): otop=otop2. In step 5350, if Top+top<otop (i.e., new scrollTop<0 to keep first copy same place) top=verse2play's top (second copy) (location second copy). In step 5355, scrollTop=Top+top-otop (set scrolling so verse2play doesn't move on screen when cv fontsize reset). In step 5360, endIf the current verse is not the verse to play. In step 5365, animate fontsize of verse2play to 2 em, in 1 sec using easeInExpo. In step 5370, easing. In step 5375, animate scrollTop to top, in 2 sec using easeIanOutSine (so verse2play moves to top of screen).

There has long been a need for an automated system to help teach students proper cantillation, and the system described herein addresses that specific need. In addition, the system described herein may be generally useful to automatically match audio to text where the aspects of the audio and text have constraints similar to what typically may be described for the Hebrew Bible.

Figure 53:
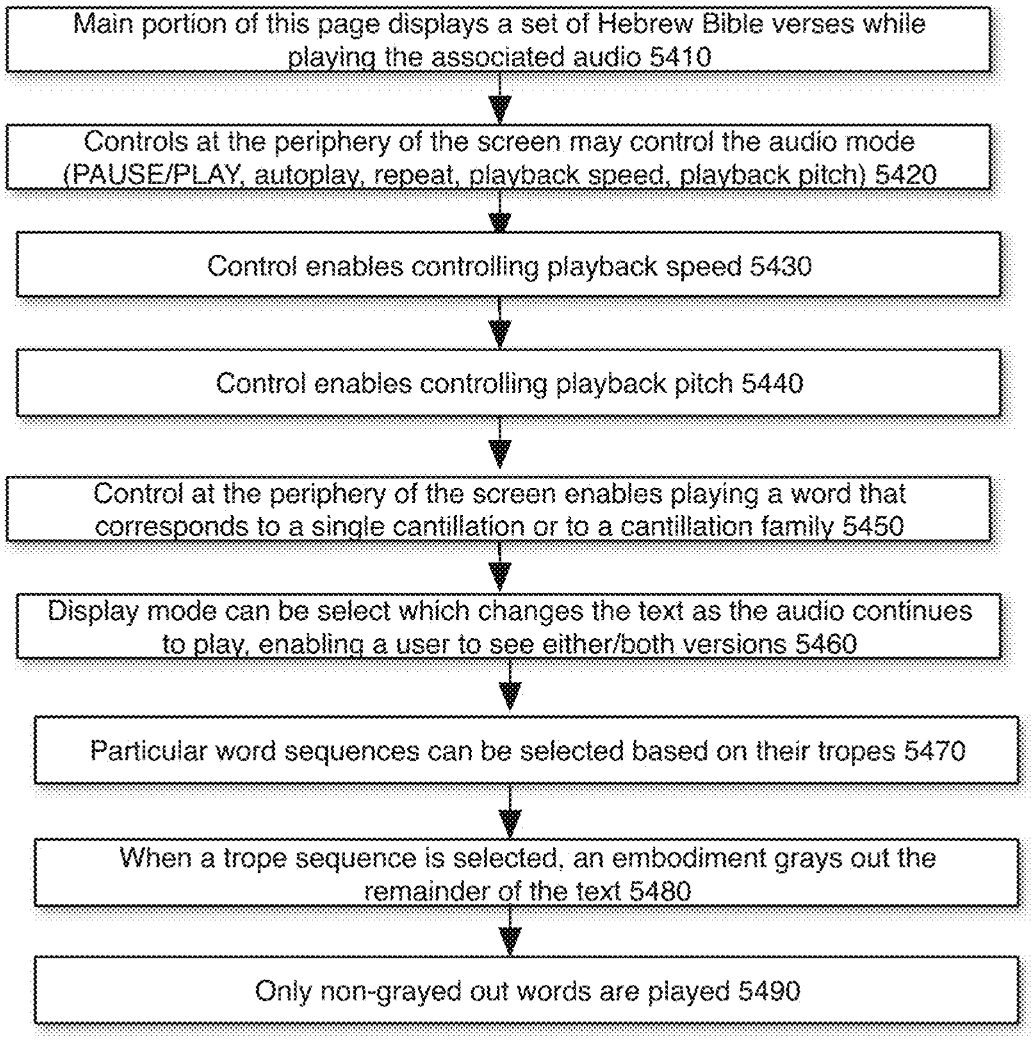
FIG. 53 depicts exemplary embodiment(s) containing exemplary functions.

FIG. 53 depicts exemplary embodiment(s) containing exemplary functions. In an exemplary embodiment, in step 5410, the main portion of this page displays a set of Hebrew Bible verses while playing the associated audio. In step 5420, controls at the periphery of the screen control the audio mode (PAUSE/PLAY, autoplay, repeat, playback speed, playback pitch). In step 5430, Control enables controlling playback speed. In step 5440, Control enables controlling playback pitch. In step 5450, a control at the periphery of the screen enables playing a word that corresponds to a single cantillation or to a cantillation family, for example, call that "chop mode." In step 5460, display mode can be select which changes the text as the audio continues to play, enabling a user to see either/both versions. These modes include asSpoken Hebrew, asWritten Hebrew, or English transliteration. In step 5470, particular word sequences can be selected based on their tropes. In step 5480, when a trope sequence is selected, an embodiment grays out the remainder of the text. In step 5490, only non-grayed out words are played.

Figure 54:
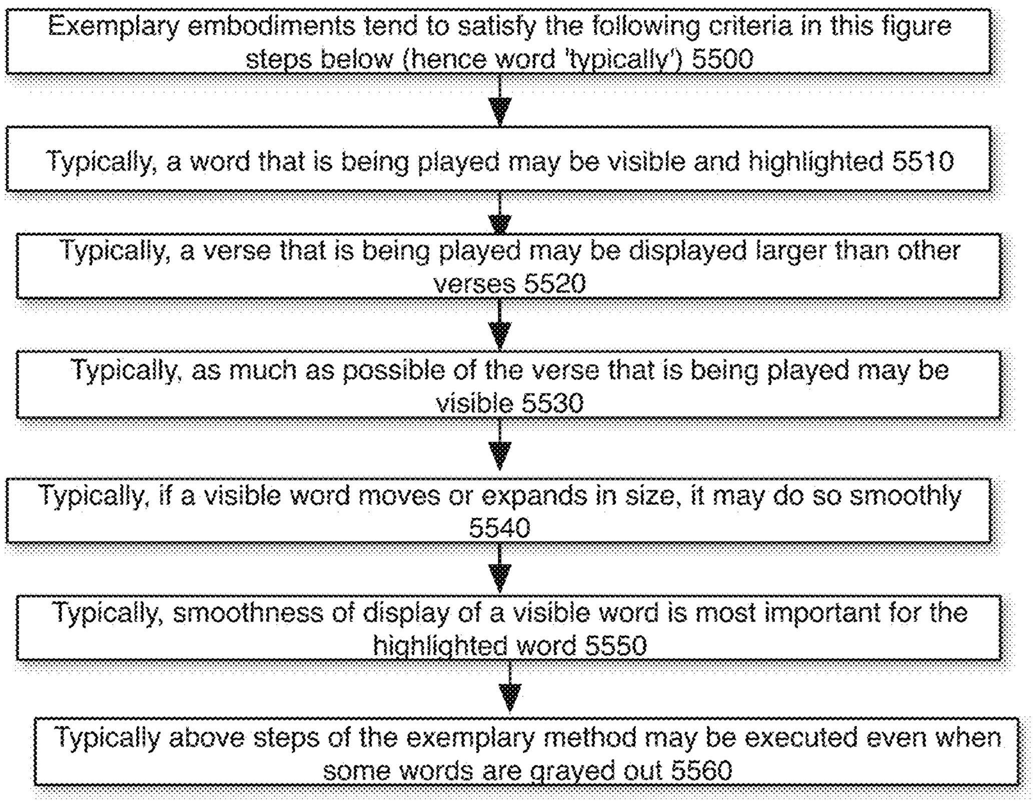
FIG. 54 depicts exemplary embodiment(s) containing exemplary functions.

FIG. 54 depicts exemplary embodiment(s) containing exemplary functions. In step 5500, exemplary embodiments tend to satisfy the following criteria in this figure steps 5510-5560. In step 5510, typically, a word that is being played may be visible and highlighted. In step 5520, typically, a verse that is being played may be displayed larger than other verses. In step 5530, typically, as much as possible of the verse that is being played may be visible. In step 5540, typically, if a visible word moves or expands in size, it may do so smoothly. In step 5550, typically, smoothness of display of a visible word is most important for the highlighted word. In step 5560, typically steps 5510-5550 of the exemplary method may be executed even when some words are grayed out.

Figure 55:
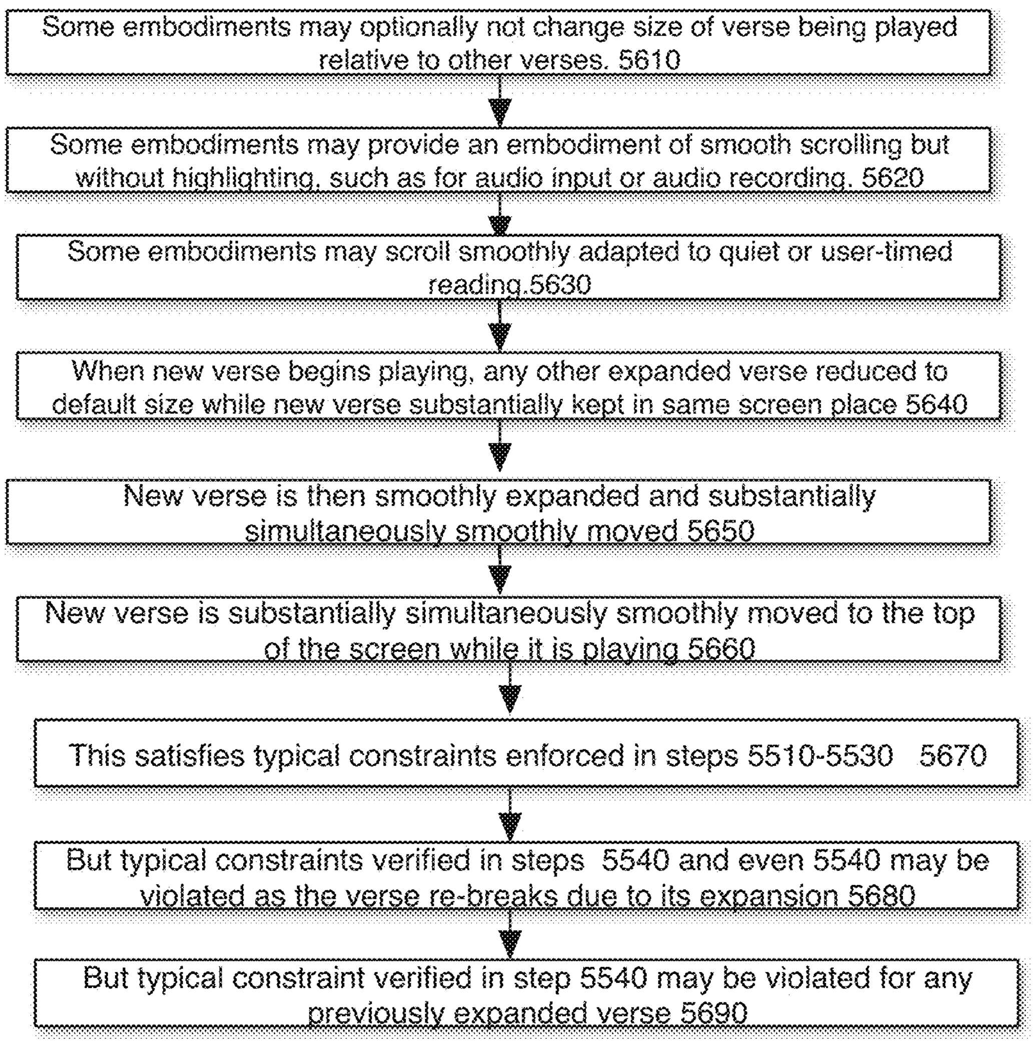
FIG. 55 contains additional exemplary embodiment(s).

FIG. 55 depicts exemplary embodiment(s) containing exemplary functions. In step 5610, some embodiments may optionally not change size of verse being played relative to other verses. In step 5620, some embodiments may provide an embodiment of smooth scrolling but without highlighting, such as for audio input or audio recording. In step 5630, Some embodiments may scroll smoothly adapted to quiet or user-timed reading.

In step 5640, In some embodiments, when a new verse begins playing, any other expanded verse is reduced to its default size while the new verse is substantially kept in its same place on the screen. In step 5650, the new verse is then smoothly expanded and substantially simultaneously smoothly moved. In step 5660, the new verse is substantially simultaneously smoothly moved to the top of the screen while it is playing. In step 5670, this satisfies typical constraints enforced in steps 5510-5530. In step 5680, But typical constraints verified in steps 5540 and even 5540 may be violated as the verse re-breaks due to its expansion. In step 5590, typical constraint verified in step 5540 may be violated for any previously expanded verse.

Figure 56:
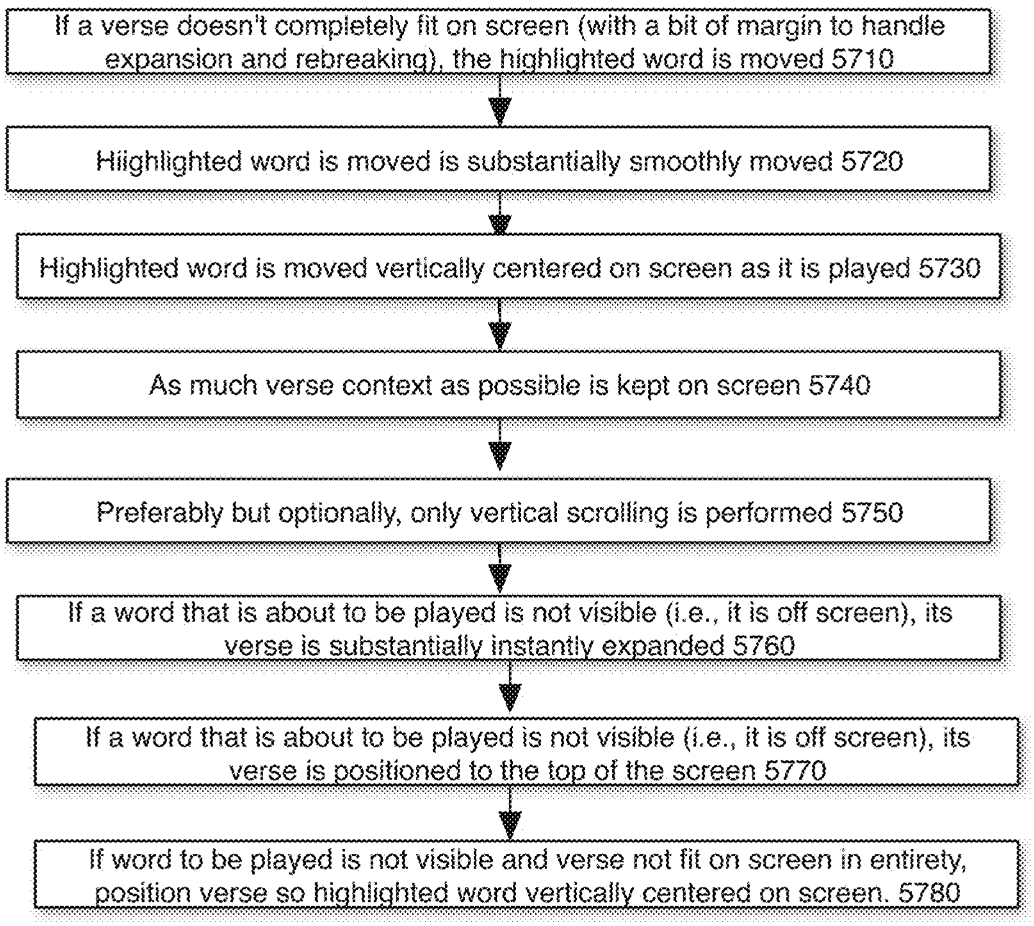
FIG. 56 contains additional exemplary embodiment(s).

FIG. 56 depicts exemplary embodiment(s) containing exemplary functions. In step 5710, if a verse doesn't completely fit on screen (with a bit of margin to handle expansion and rebreaking), the highlighted word is moved. In step 5720, the highlighted word is moved is substantially smoothly moved. In step 5730, the highlighted word is moved so it is vertically centered on screen as it is played. In step 5740, As much verse context as possible is kept on screen. In step 5750, preferably but optionally, only vertical scrolling is performed. In step 5760, If a word that is about to be played is not visible (i.e., it is off screen), its verse is substantially instantly expanded. In step 5770, If a word that is about to be played is not visible (i.e., it is off screen), its verse is positioned to the top of the screen. In step 5780, If a word that is about to be played is not visible (i.e., it is off screen) and the verse does not fit on screen in its entirety, the verse is positioned so that the highlighted word is vertically centered on screen.

Figure 57A:
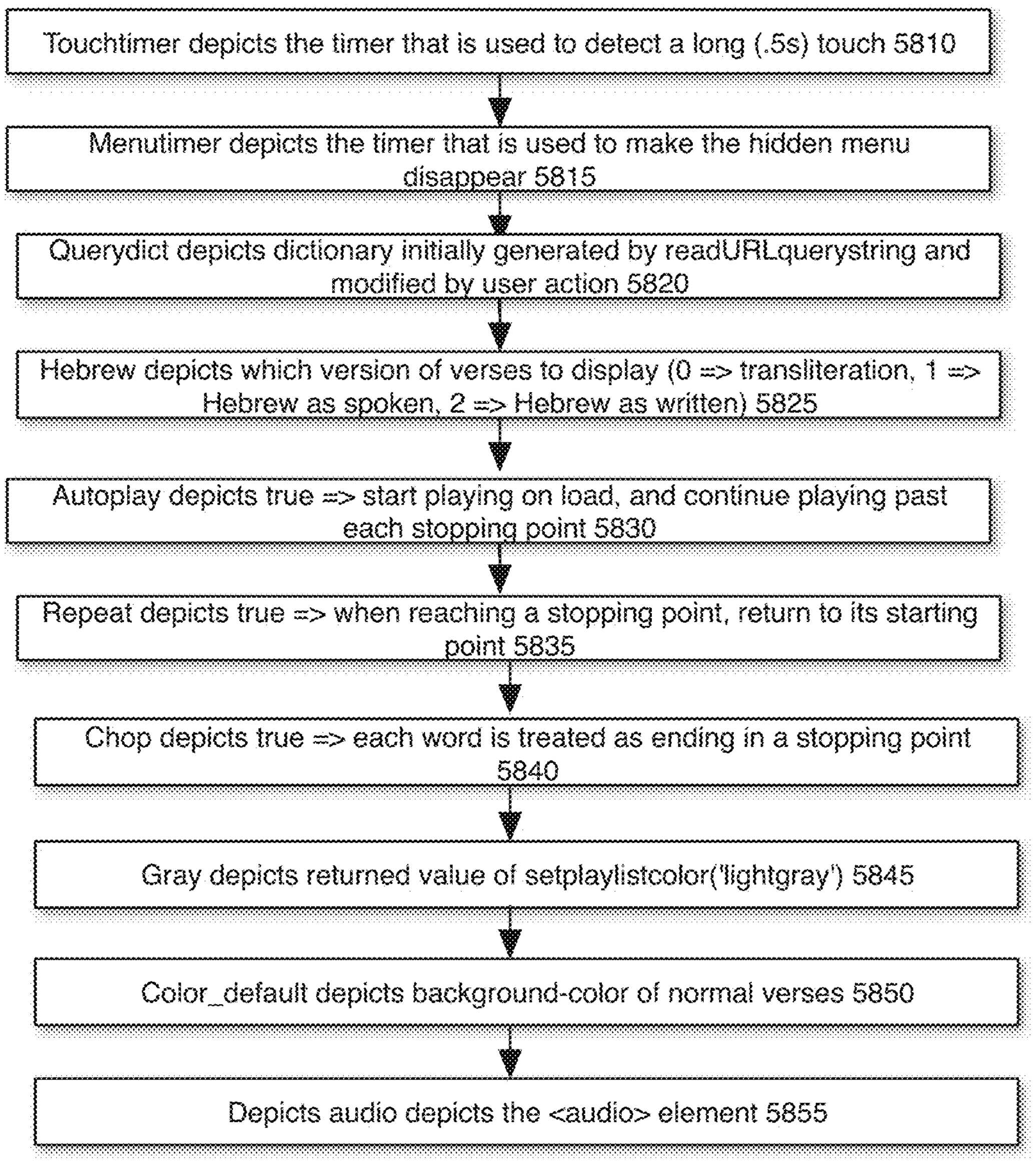
FIGS. 57A and 57B depict exemplary embodiment(s) containing exemplary functions.
Figure 57B:
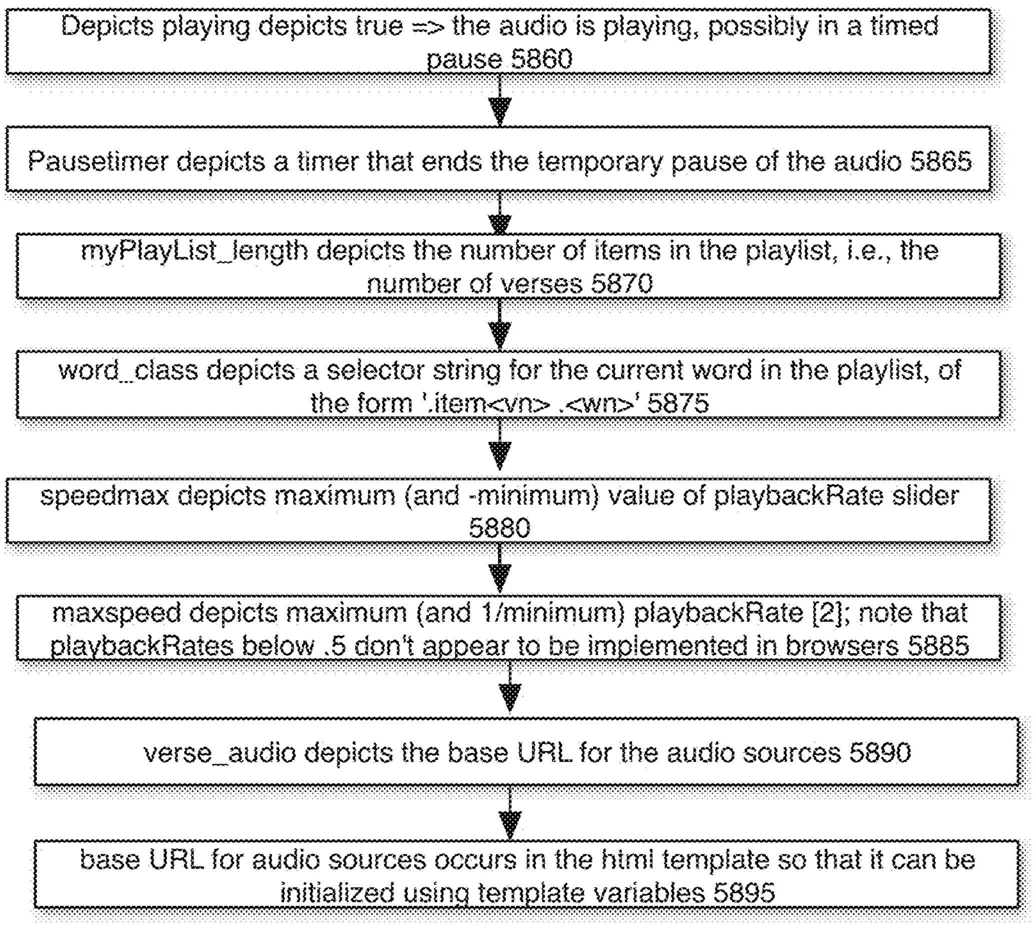

FIGS. 57A and 57B depict exemplary embodiment(s) containing exemplary functions. In step 5810, touchtimer depicts the timer that is used to detect a long (0.5 s) touch. In step 5815, menutimer depicts the timer that is used to make the hidden menu disappear. In step 5820, querydict depicts dictionary initially generated by readURLquerystring and modified by user action. In step 5825, hebrew depicts which version of verses to display (0=>transliteration, 1=>Hebrew as spoken, 2=>Hebrew as written). In step 5830, autoplay depicts true=>start playing on load, and continue playing past each stopping point. In step 5835, repeat depicts true=>when reaching a stopping point, return to its starting point. In step 5840, chop depicts true=>each word is treated as ending in a stopping point. In step 5845, gray depicts returned value of setplaylistcolor('lightgray'). In step 5850, color_default depicts background-color of normal verses. In step, 5855 depicts audio depicts the <audio> element. In step 5860, depicts playing depicts true=>the audio is playing, possibly in a timed pause. In step 5865, pausetimer depicts a timer that ends the temporary pause of the audio. In step 5870, myPlayList_length depicts the number of items in the playlist, i.e., the number of verses. In step 5875, word_class depicts a selector string for the current word in the playlist, of the form '.item<vn>.<wn>' where <vn> is the 0-based verse number in the page and <wn> is the 1-based 2-digit word number within the verse, e.g. '.item0 0.01'. In step 5880, speedmax depicts maximum (and -minimum) value of playbackRate slider. In step 5885, maxspeed depicts maximum (and 1/minimum) playbackRate [2]; note that playbackRates below 0.5 don't appear to be implemented in browsers. In step 5890, verse audio depicts the base URL for the audio sources. In step 5895, base URL for audio sources occurs in the html template so that it can be initialized using template variables. In exemplary embodiments, audio times are in seconds, usually as a floating point number, but span start and end times are in milliseconds. In those embodiments, conversions in various places.

Figure 58A:
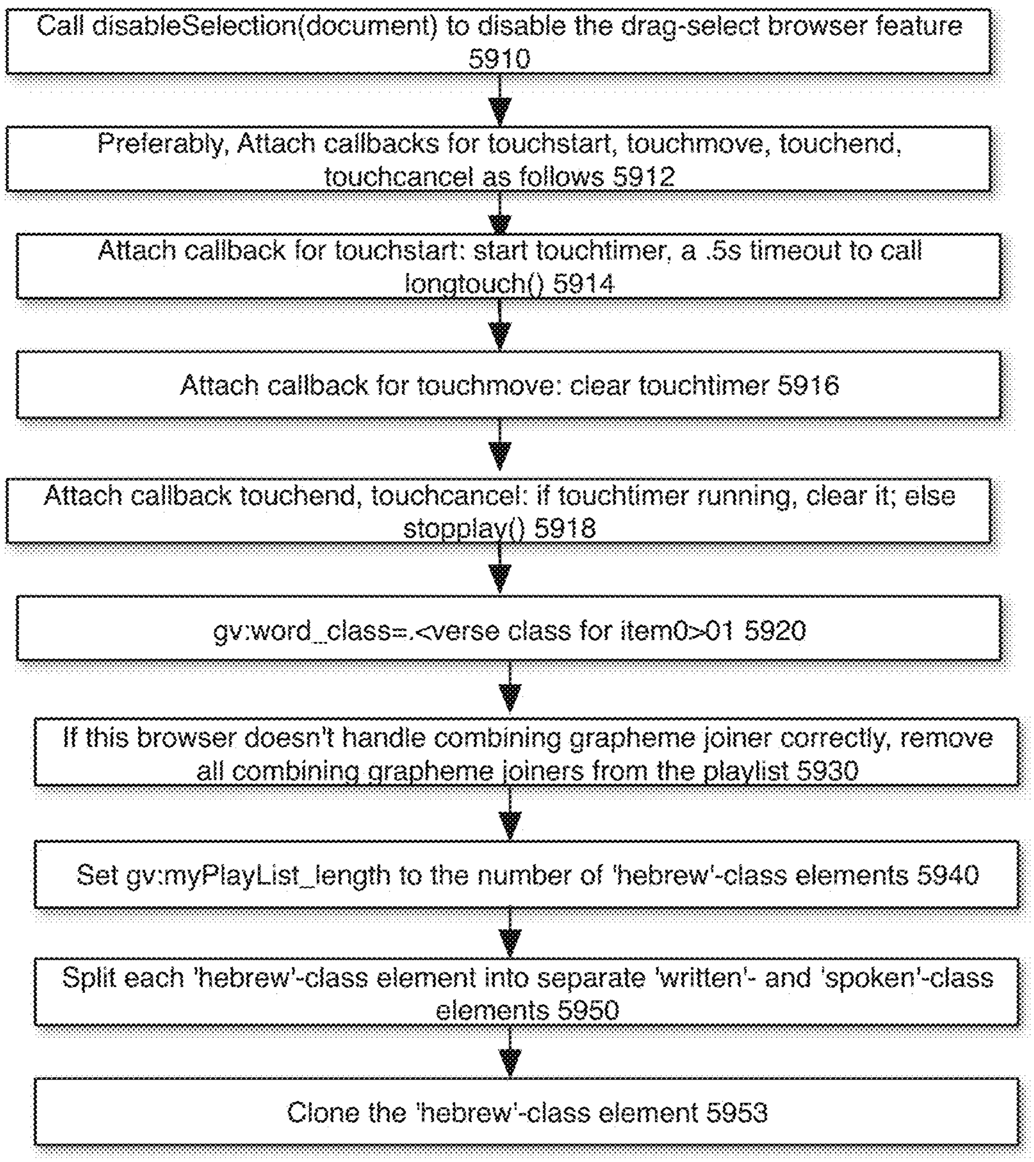
FIGS. 58A and 58B depict exemplary embodiment(s) with exemplary initialization code.
Figure 58B:
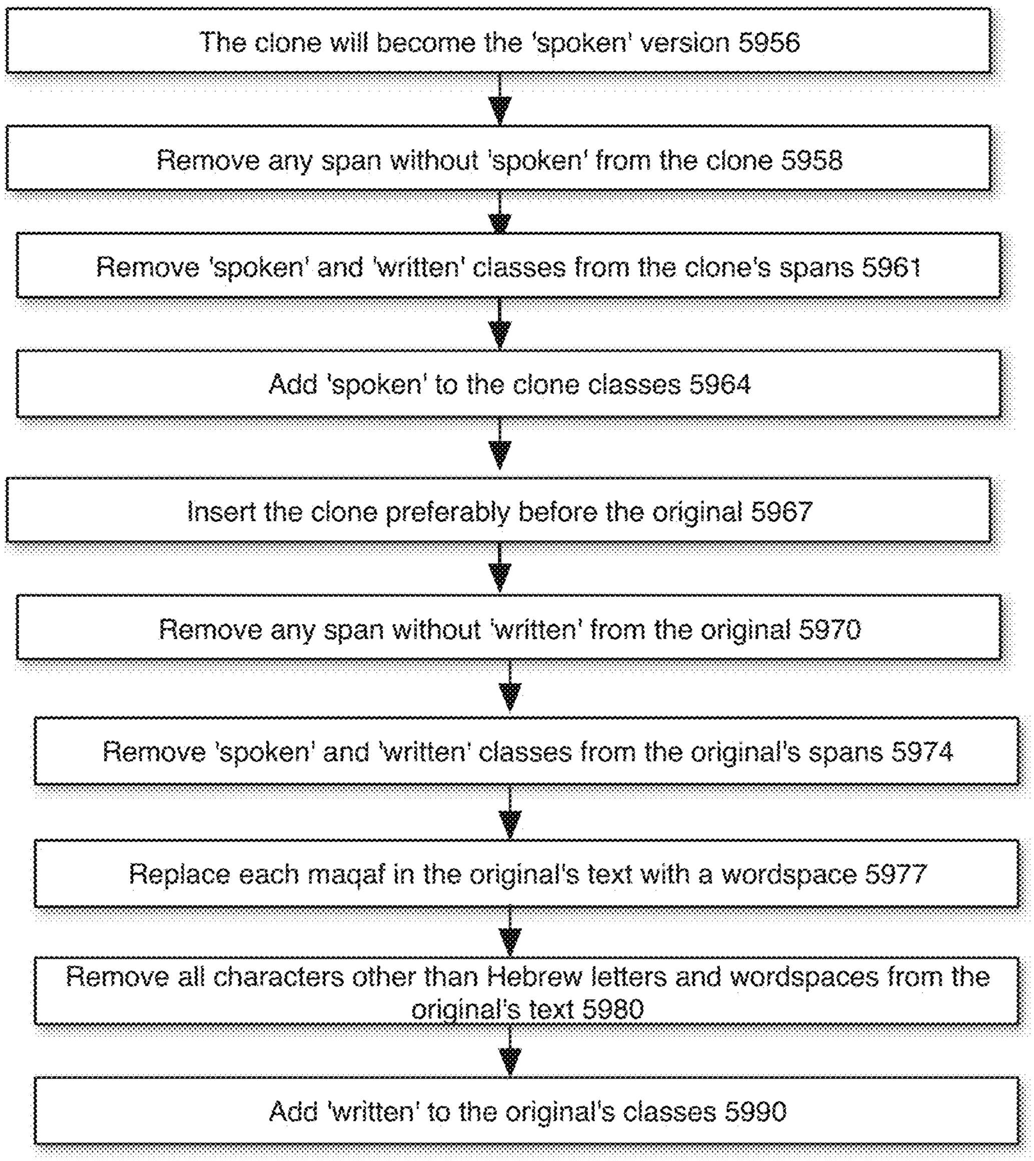

FIGS. 58A and 58B depict exemplary embodiment(s) with exemplary initialization code. In exemplary embodiments, it may be denoted in javascript by "$(document).ready( . . . )". In step 5910, Call disable Selection (document) to disable the drag-select browser feature. In step 5912, Preferably, Attach callbacks for touchstart, touchmove, touchend, touchcancel as follows. In step 5914 attach callback for touchstart: start touchtimer, a 0.5 s timeout to call longtouch( ). In step 5916, attach callback for touchmove: clear touchtimer. In step 5918, attach callback touchend, touchcancel: if touchtimer running, clear it; else stopplay( ). In step 5920, gv:word_class=.<verse class for item0>01. In step 5930, If this browser doesn't handle combining grapheme joiner correctly, remove all combining grapheme joiners from the playlist. In step 5940, Set gv:myPlayList_length to the number of 'hebrew'-class elements. In step 5950, Split each 'hebrew'-class element into separate 'written'- and 'spoken'-class elements. In step 5953, Clone the 'hebrew'-class element. In step 5956, The clone will become the 'spoken' version. In step 5958, Remove any span without 'spoken' from the clone. In step 5961, Remove 'spoken' and 'written' classes from the clone's spans. In step 5964, Add 'spoken' to the clone classes. In step 5967, insert the clone preferably before the original. In step 5870, Remove any span without 'written' from the original. In step 5974, Remove 'spoken' and 'written' classes from the original's spans. In step 5977, Replace each maqaf in the original's text with a wordspace. In step 5980, Remove all characters other than Hebrew letters and wordspaces from the original's text. In step 5990, Add 'written' to the original's classes.

Figure 59A:
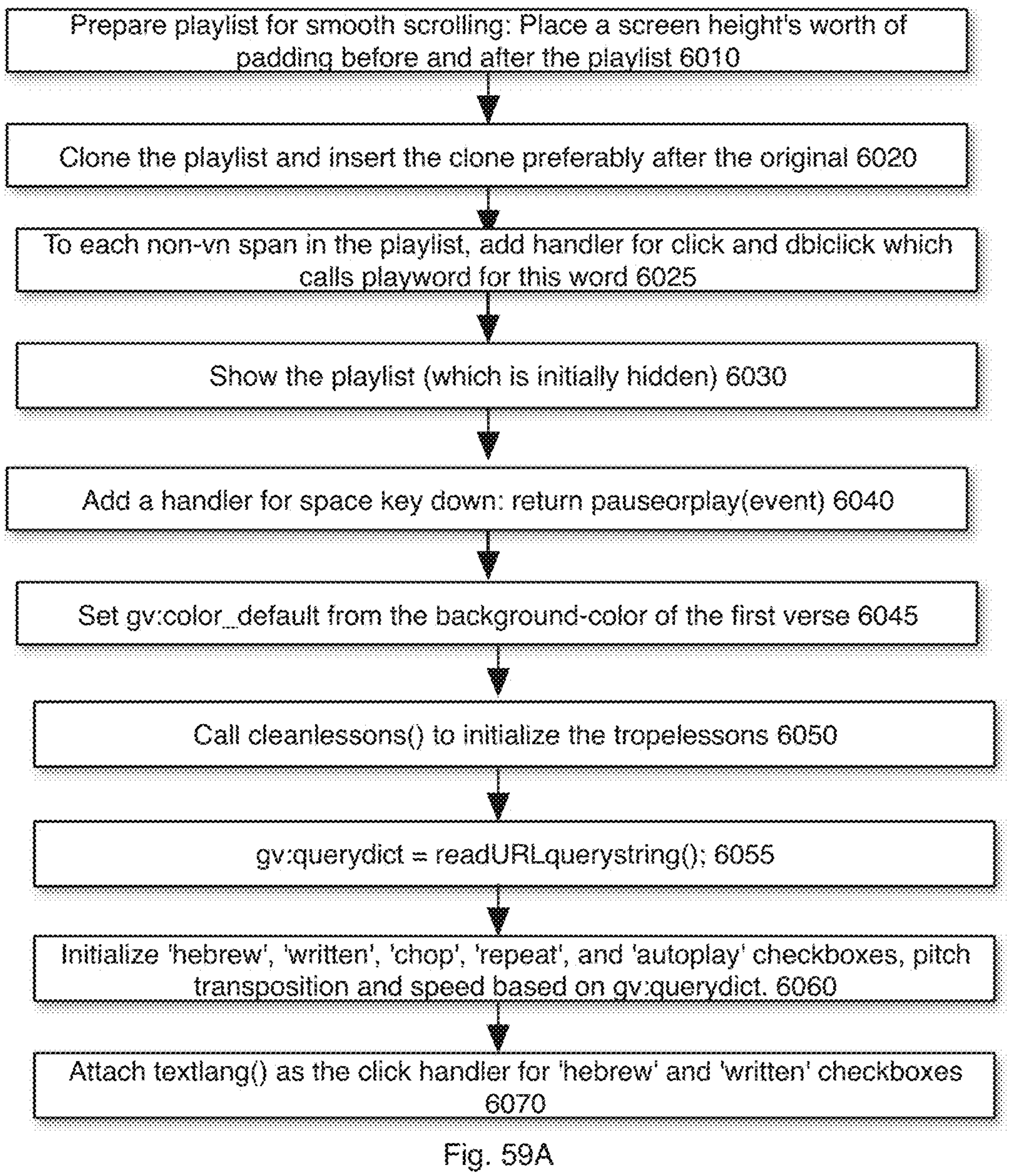
FIGS. 59A-59C depict exemplary embodiment(s) containing exemplary Initialization code.
Figure 59B:
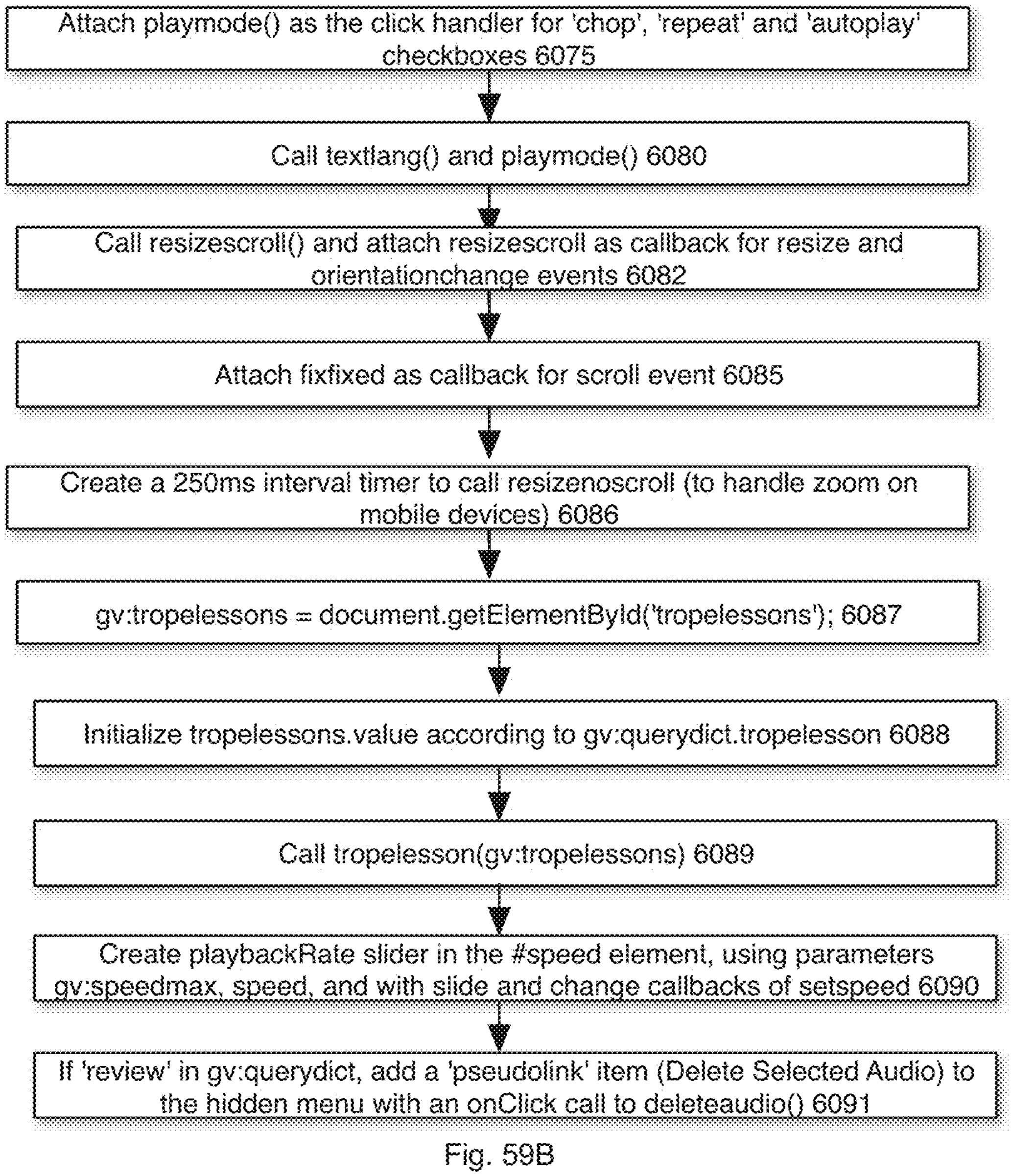
Figure 59C:
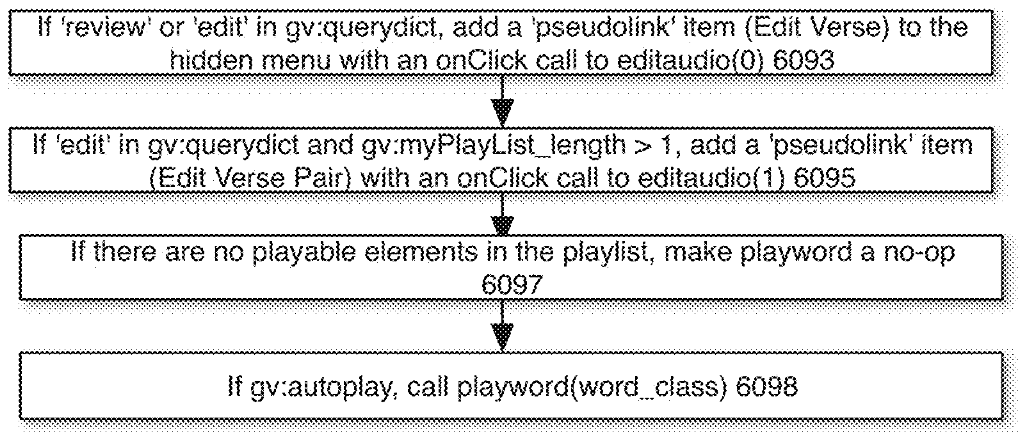

FIGS. 59A-59C depict exemplary embodiment(s) containing exemplary Initialization code. In step 6010, Prepare playlist for smooth scrolling: Place a screen height's worth of padding before and after the playlist. In step 6020, Clone the playlist and insert the clone preferably after the original. In step 6025, To each non-vn span in the playlist, add handler for click and dblclick which calls playword for this word. In step 6030, Show the playlist (which is initially hidden). In step 6040, Add a handler for space key down: return pauseorplay(event); In step 6045, Set gv:color_default from the background-color of the first verse. In step 6050, Call cleanlessons( ) to initialize the tropelessons. In 6055, gv:querydict=readURLquerystring( ). In 6060, Initialize 'hebrew', 'written', 'chop', 'repeat', and 'autoplay' checkboxes, pitch transposition and speed based on gv:querydict. In step 6070, Attach textlang( ) as the click handler for 'hebrew' and 'written' checkboxes. In step 6075, Attach playmode( ) as the click handler for 'chop', 'repeat' and 'autoplay' checkboxes. In step 6080, Call textlang( ) and playmode( ). In step 6082, Call resizescroll( ) and attach resizescroll as callback for resize and orientationchange events. In step 6085, Attach fixfixed as callback for scroll event. In step 6086, Create a 250 ms interval timer to call resizenoscroll (to handle zoom on mobile devices). In step 6087, gv:tropelessons=document.getElementById('tropelessons'); In step 6088, Initialize tropelessons.value according to gv:querydict.tropelesson. In step 6089, Call tropelesson(gv:tropelessons). In step 6090, Create the playbackRate slider in the #speed element, using parameters gv:speedmax and speed, and with slide and change callbacks of setspeed. In step 6091, If 'review' in gv:querydict, add a 'pseudolink' item (Delete Selected Audio) to the hidden menu with an onClick call to deleteaudio( ). In step 6093, If 'review' or 'edit' in gv:querydict, add a 'pseudolink' item (Edit Verse) to the hidden menu with an onClick call to editaudio(0). In step 6095, If 'edit' in gv:querydict and gv:myPlayList_length >1, add a 'pseudolink' item (Edit Verse Pair) with an onClick call to editaudio(1). In step 6097, If there are no playable elements in the playlist, make playword a no-op. In step 6098, If gv:autoplay, call playword(word_class)

Figure 60A:
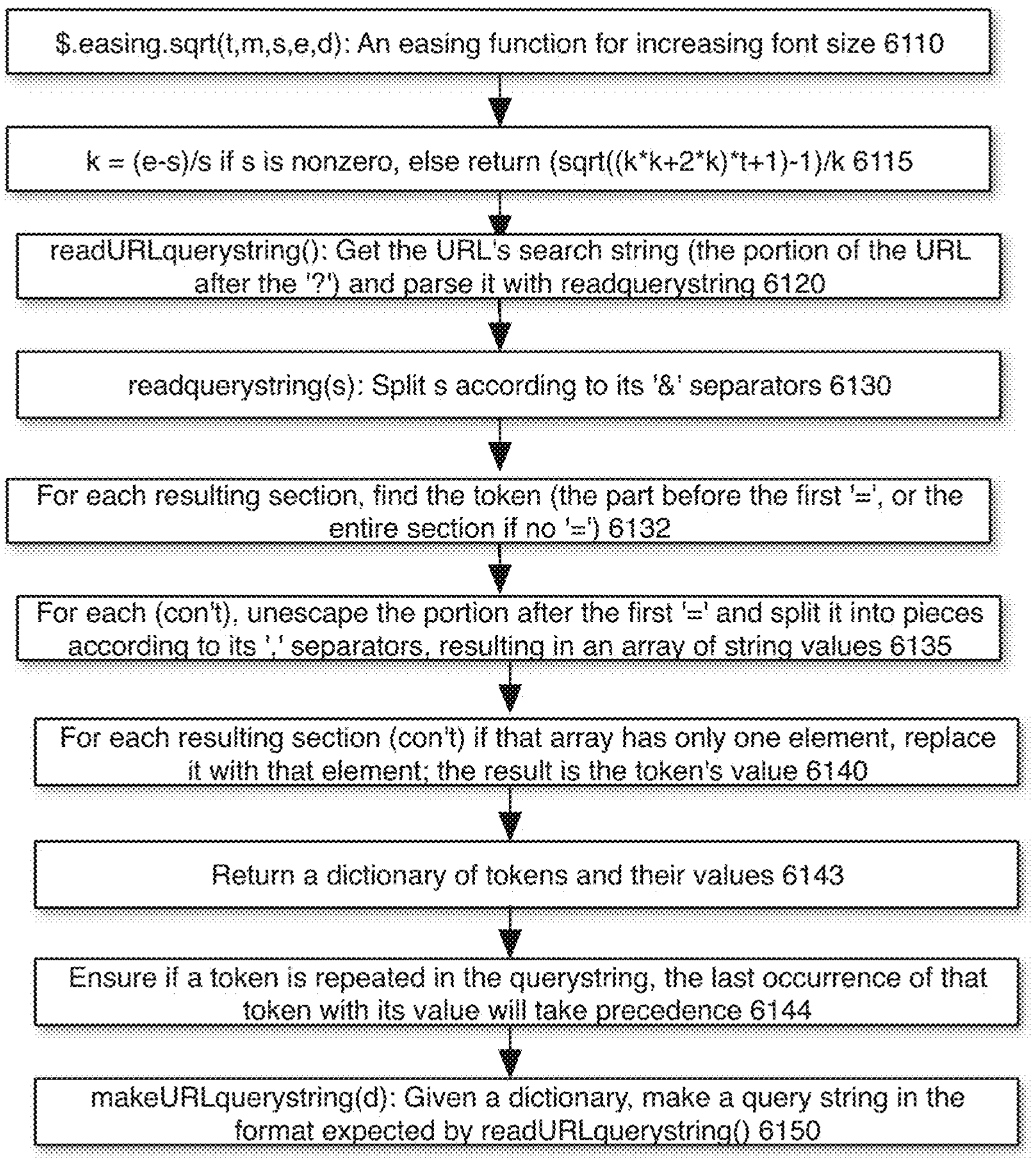
FIGS. 60A and 60B depict exemplary embodiment(s) containing exemplary functions.
Figure 60B:
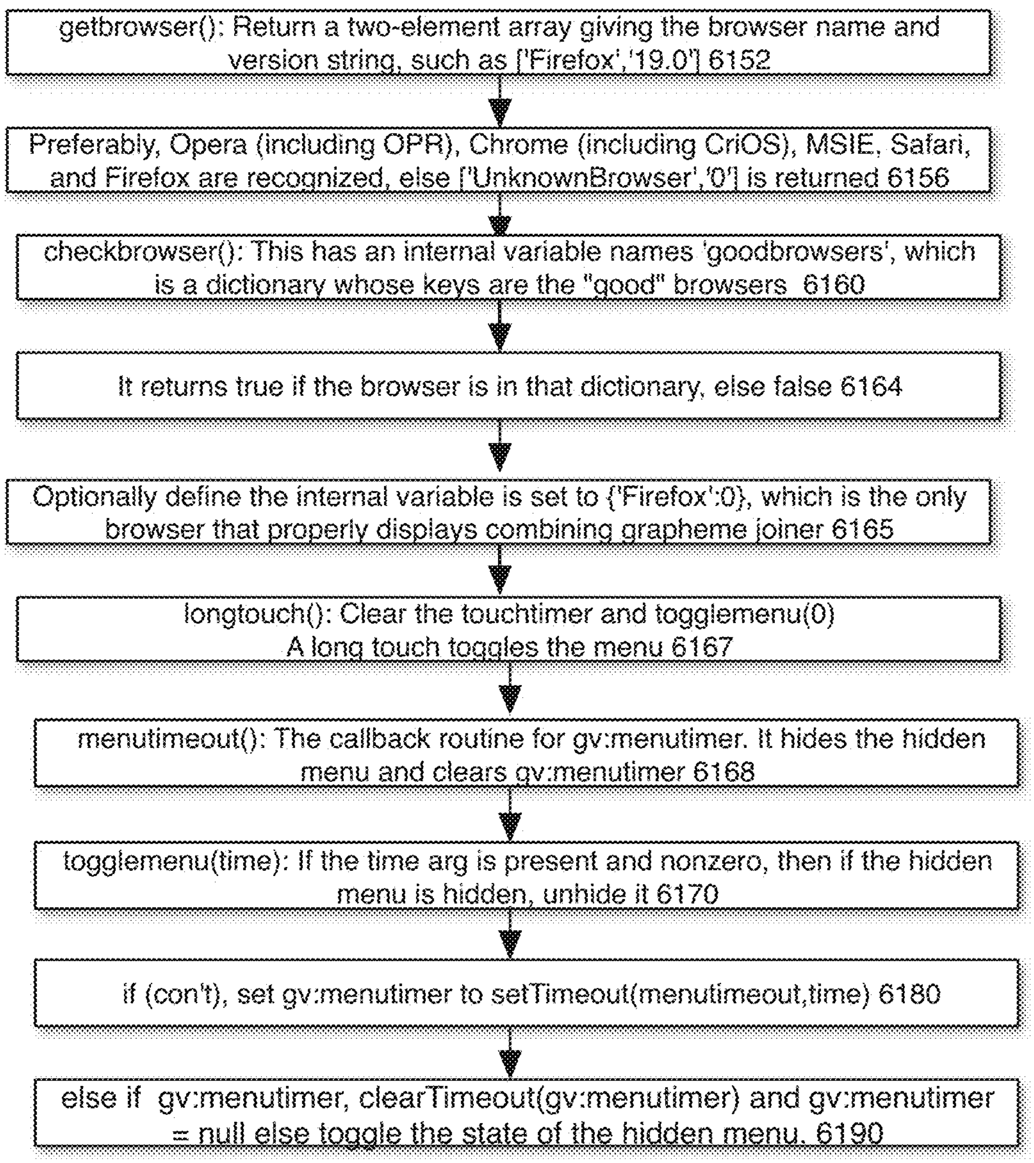

FIGS. 60A and 60B depict exemplary embodiment(s) containing exemplary functions. In step 6110, $.easing.sqrt (t,m,s,e,d): An easing function for increasing font size. In step, 6115, k=(e−s)/s ifs is nonzero, else return (sqrt((k*k+2*k)*t+1)−1)/k. In step 6120, readURLquerystring( ): Get the URL's search string (the portion of the URL after the '?') and parse it with readquerystring. In step 6130, readquerystring(s): Split s according to its '&' separators. In step 6132, For each resulting section, find the token (the part before the first '=', or the entire section if no"="). In step 6135, For each resulting section (con't), unescape the portion after the first '=' and split it into pieces according to its ',' separators, resulting in an array of string values; In step 6140, For each resulting section (con't) if that array has only one element, replace it with that element; the result is the token's value. In step 6143, Return a dictionary of tokens and their values. In step 6144, Ensure if a token is repeated in the querystring, the last occurrence of that token with its value will take precedence. In step 6150, makeURLquerystring(d): Given a dictionary, make a query string in the format expected by readURLquerystring( ). In step 6152, getbrowser( ): Return a two-element array giving the browser name and version string, such as ['Firefox','19.0']; In step 6156, only Opera (including OPR), Chrome (including CriOS), MSIE, Safari, and Firefox are recognized, else ['UnknownBrowser','0'] is returned. In step 6160, checkbrowser( ): This has an internal variable names 'goodbrowsers', which is a dictionary whose keys are the "good" browsers and whose values are irrelevant. In step 6164, It returns true if the browser is in that dictionary, else false. In step 6165, optionally define the internal variable is set to {'Firefox':0}, which is the only browser that properly displays combining grapheme joiner. In step 6167, longtouch( ): Clear the touchtimer and togglemenu(0). A long touch toggles the menu. In step 6168, menutimeout( ): The callback routine for gv:menutimer. It hides the hidden menu and clears gv:menutimer. In step 6170, togglemenu(time): If the time arg is present and nonzero, then if the hidden menu is hidden, unhide it. In step 6180, if (con't), set gv:menutimer to setTimeout(menutimeout,time). In step 6190, else if gv:menutimer, clearTimeout(gv:menutimer) and gv:menutimer=null else toggle the state of the hidden menu.

Figure 61A:
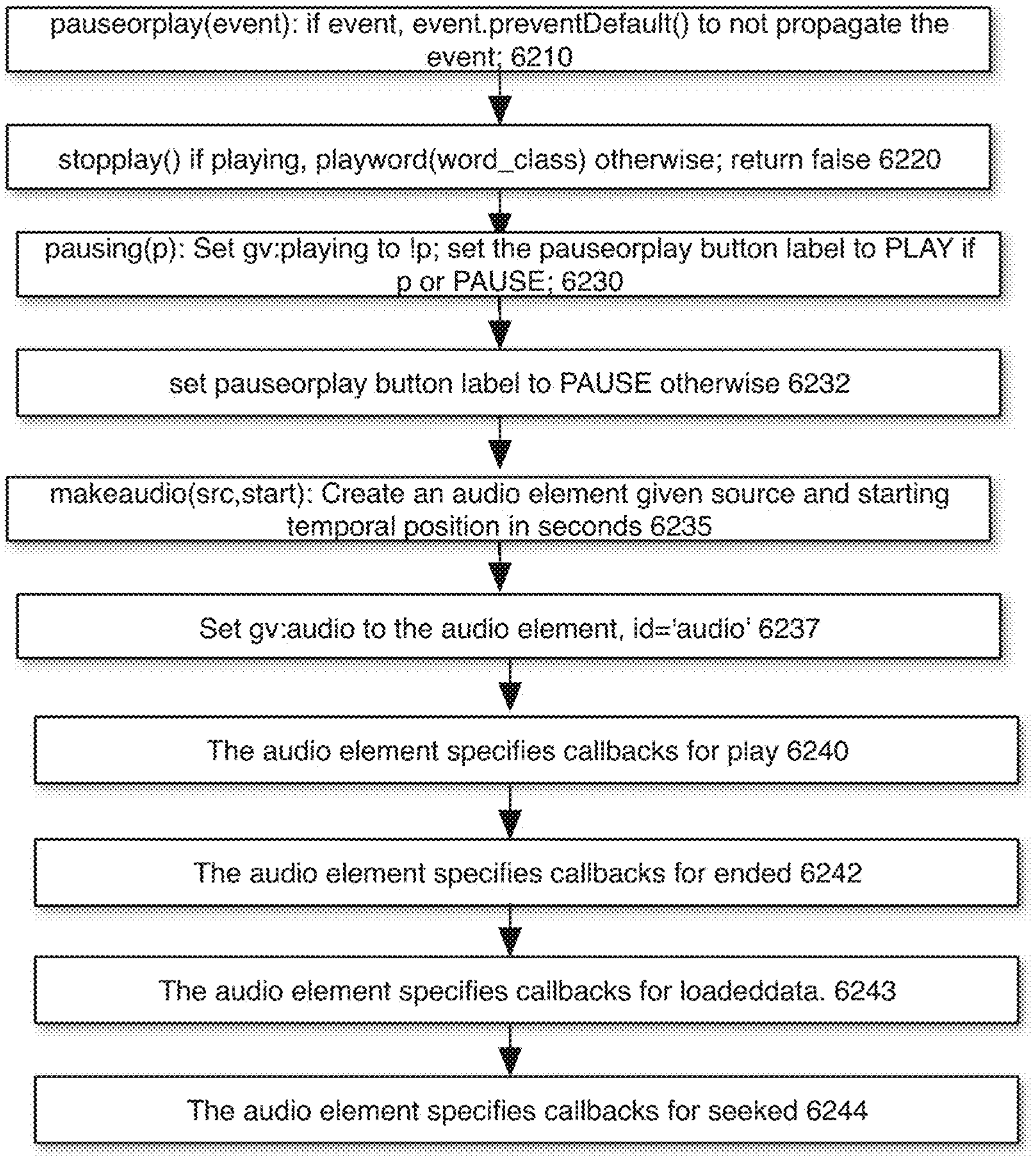
FIGS. 61A and 61B depict exemplary embodiment(s) containing exemplary functions.
Figure 61B:
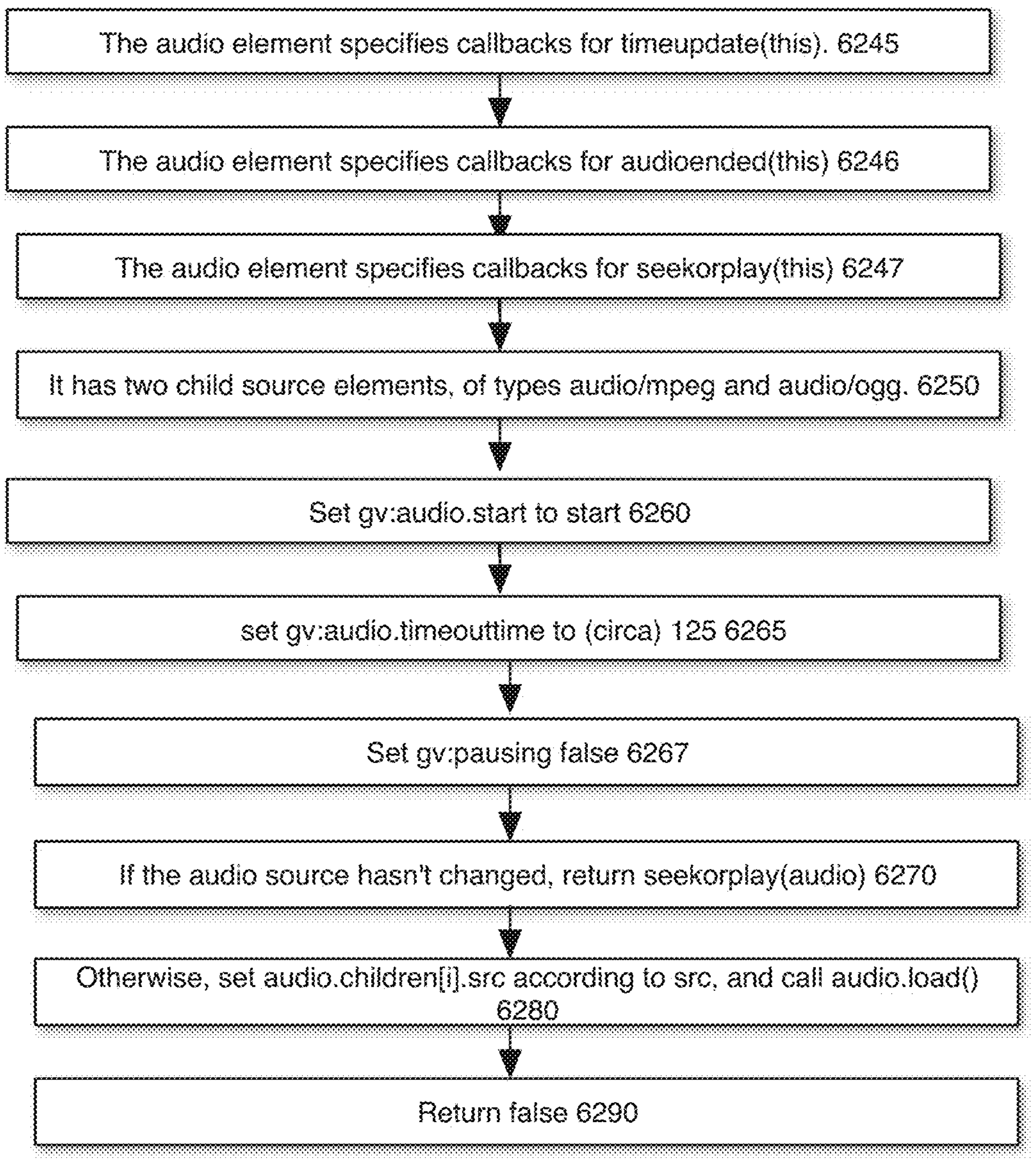

FIGS. 61A and 61B depict exemplary embodiment(s) containing exemplary functions. In step 6210, pauseorplay (event): if event, event.preventDefault( ) to not propagate the event; In step 6220, stopplay( ) if playing, playword (word_class) otherwise; return false. In step 6230, pausing (p): Set gv:playing to !p; set the pauseorplay button label to PLAY if p or PAUSE; In step 6232, set pauseorplay button label to PAUSE otherwise. In step 6235, makeaudio(src, start): Create an audio element given source and starting temporal position in seconds. In step 6237, Set gv:audio to the audio element, id='audio'. In step 6240, The audio element specifies callbacks for play. In step 6242, The audio element specifies callbacks for ended. In step 6243, The audio element specifies callbacks for loadeddata. In step 6244, The audio element specifies callbacks for seeked. In step 6245, The audio element specifies callbacks for timeupdate(this). In step 6246, The audio element specifies callbacks for audioended(this). In step 6247, The audio element specifies callbacks for seekorplay(this). In step 6250, It has two child source elements, of types audio/mpeg and audio/ogg. In step 6260, Set gv:audio.start to start and in step 6265, set gv:audio.timeouttime to 125. In step 6267, Set gv:pausing false. In step 6270, If the audio source hasn't changed, return seekorplay(audio). In step 6280, Otherwise, set audio.children[i].src according to src, and call audio.load( ). In step 6290, Return false.

Figure 62:
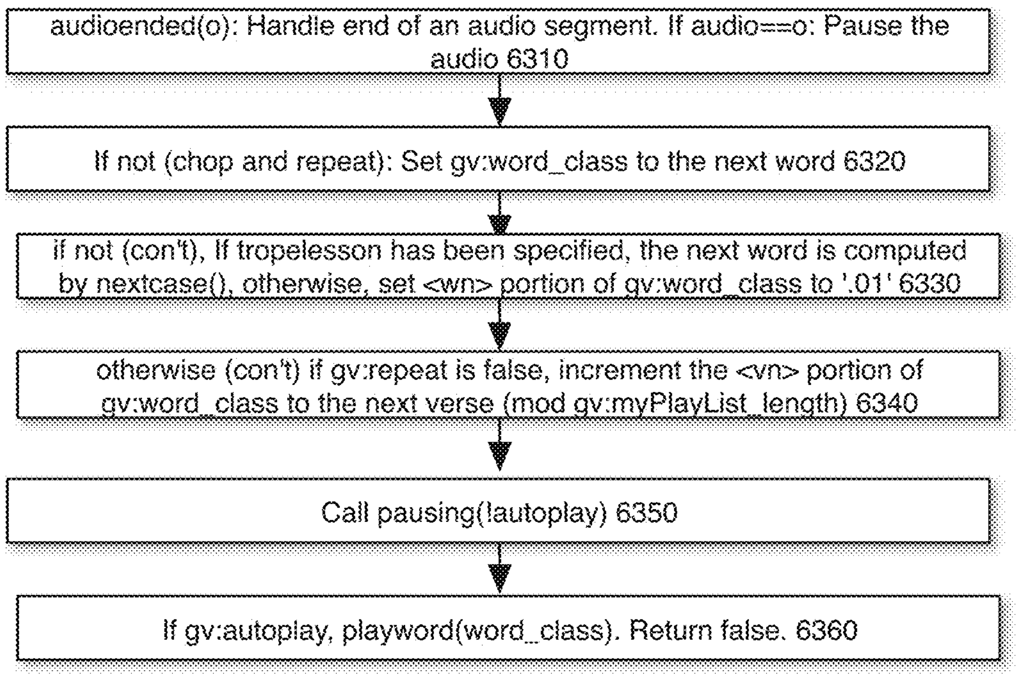
FIG. 62 depicts exemplary embodiment(s) containing exemplary functions.

FIG. 62 depicts exemplary embodiment(s) containing exemplary functions. In step 6310, audioended(o): Handle end of an audio segment. If audio==o: Pause the audio. In step 6320, If not (chop and repeat): Set gv:word_class to the next word:. In step 6330, if not (con't), If a tropelesson has been specified, the next word is computed by nextcase( ), otherwise, set the <wn> portion of gv:word_class to '0.01' and. In step 6340, otherwise (con't) if gv:repeat is false, increment the <vn> portion of gv:word_class to the next verse (mod gv:myPlayList_length). In step 6350, Call pausing(!autoplay). In step 6360, If gv:autoplay, playword (word_ class). Return false.

Figure 63A:
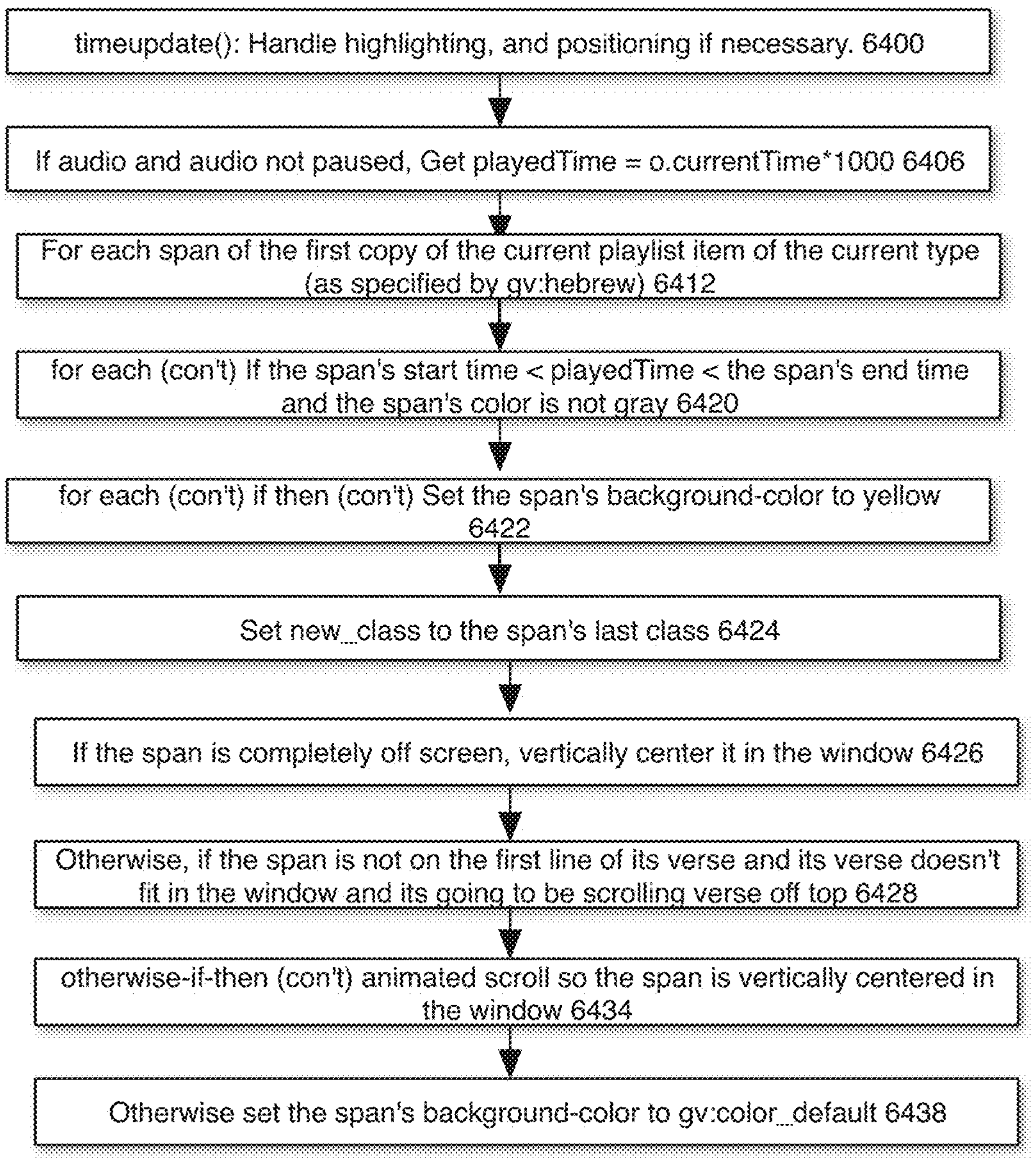
FIGS. 63A-63C depict exemplary embodiment(s) containing exemplary functions.
Figure 63B:
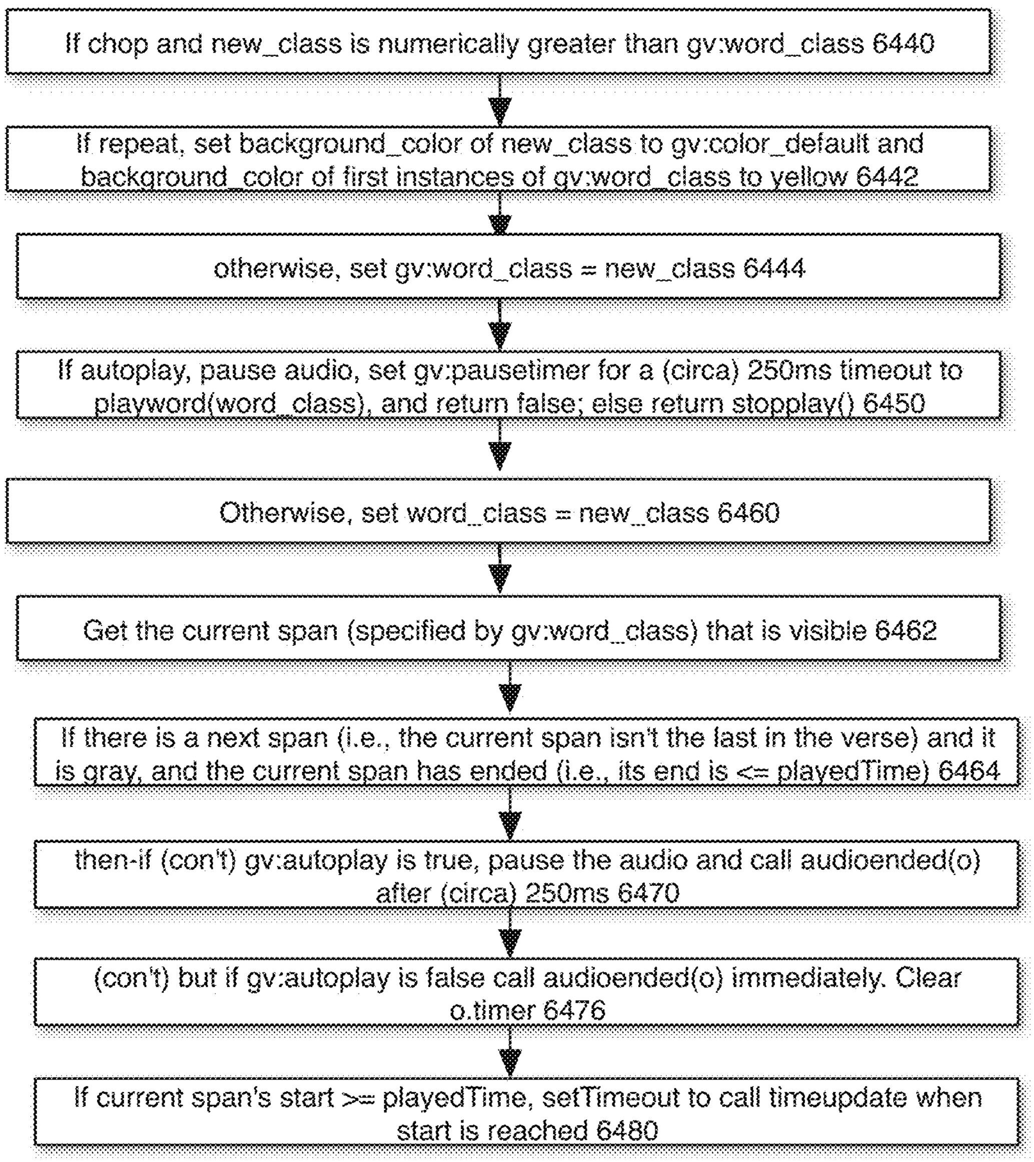
Figure 63C:
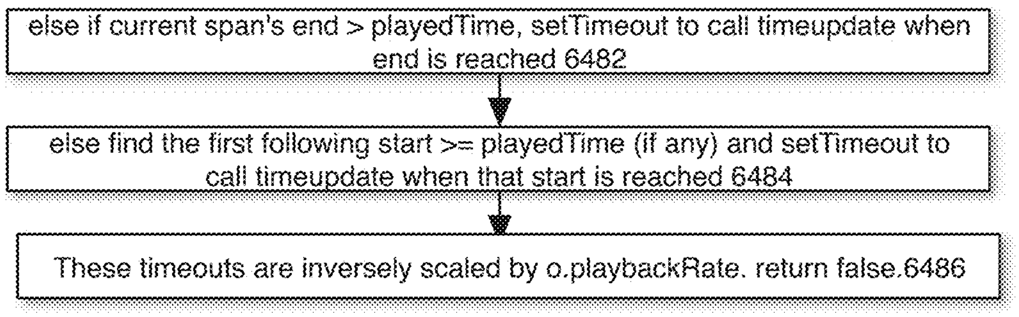

FIGS. 63A-63C depict exemplary embodiment(s) containing exemplary functions. In step 6400 timeupdate( ): Handle highlighting, and positioning if necessary. In step 6406, If audio and the audio is not paused, Get playedTime=o.currentTime*1000. In step 6412, For each span of the first copy of the current playlist item of the current type (as specified by gv:hebrew). In step 6420, for each (con't) If the span's start time<playedTime<the span's end time and the span's color is not gray. In step 6422, for each (con't) if then (con't) Set the span's background-color to yellow. In step 6424, Set new_class to the span's last class. In step 6426, If the span is completely off screen, vertically center it in the window. In step 6428, Otherwise, if the span is not on the first line of its verse and its verse doesn't fit in the window and its going to be scrolling verse off top. In step 6434, otherwise-if-then (con't) animated scroll so the span is vertically centered in the window. In step 6438, Otherwise set the span's background-color to gv:color_default. In step 6440, If chop and new_class is numerically greater than gv:word_class. In step 6442, If repeat, set background_color of new_class to gv:color_default and background_color of first instances of gv:word_class to yellow; In step 6444, otherwise, set gv:word_class=new_class. In step 6450, If autoplay, pause audio, set gv:pausetimer for a (circa) 250 ms timeout to playword(word_class), and return false; else return stopplay( ). In step 6460, Otherwise, set word_class=new_class. In step 6462, Get the current span (specified by gv:word_class) that is visible. In step 6464, If there is a next span (i.e., the current span isn't the last in the verse) and it is gray, and the current span has ended (i.e., its end is <=playedTime), then if. In step 6470, then-if (con't) gv:autoplay is true, pause the audio and call audioended(o) after (circa) 250 ms.

In step 6476, (con't) but if gv:autoplay is false call audioended(o) immediately. Clear o.timer. In step 6480, If current span's start >=playedTime, setTimeout to call timeupdate when start is reached; In step 6482, else if current span's end >playedTime, setTimeout to call timeupdate when end is reached; In step 6484, else find the first following start >=playedTime (if any) and setTimeout to call timeupdate when that start is reached. In step 6486, These timeouts are inversely scaled by o.playbackRate. return false.

Figure 64A:
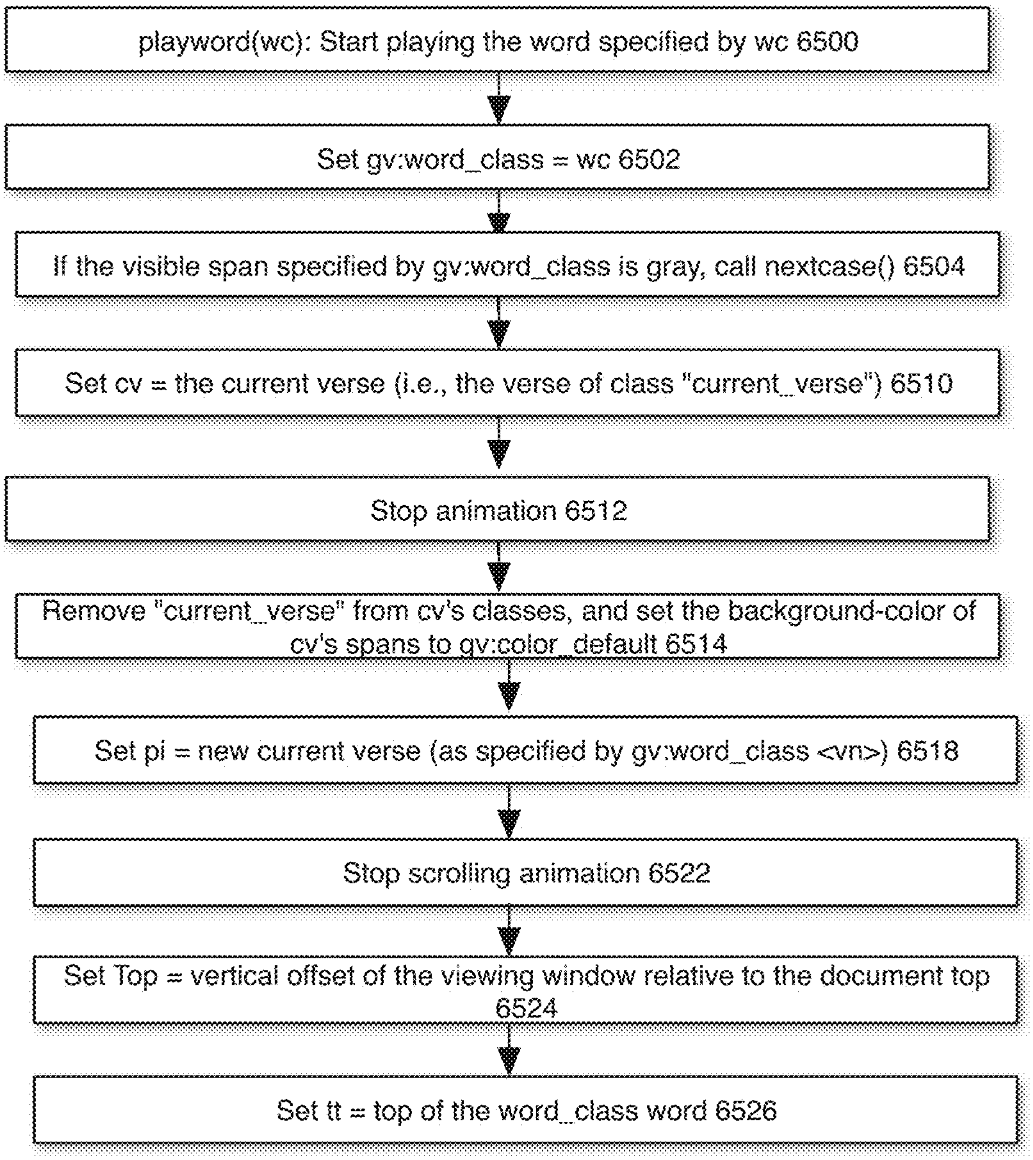
FIGS. 64A-64C depict exemplary embodiment(s) containing exemplary functions.
Figure 64B:
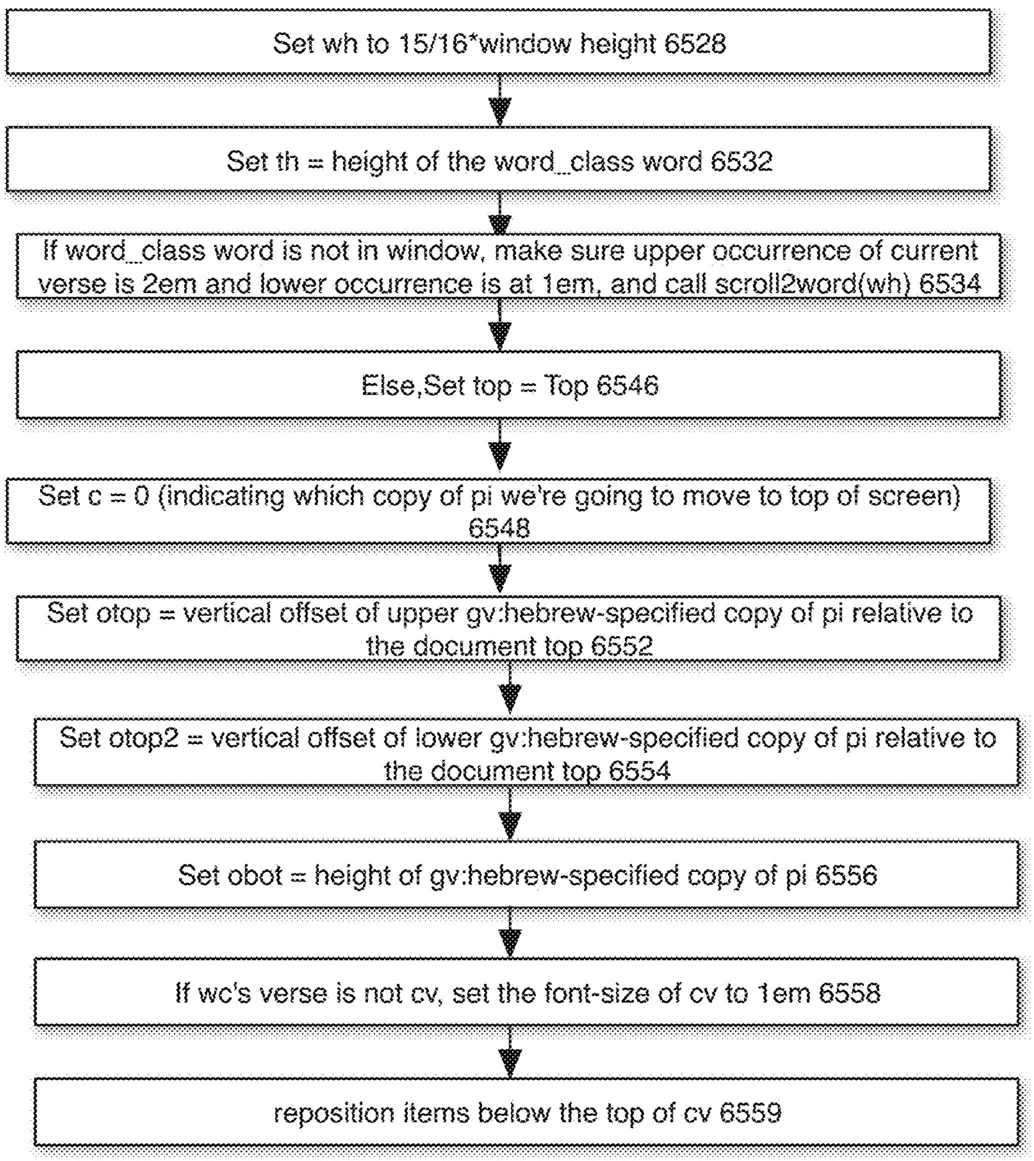
Figure 64C:
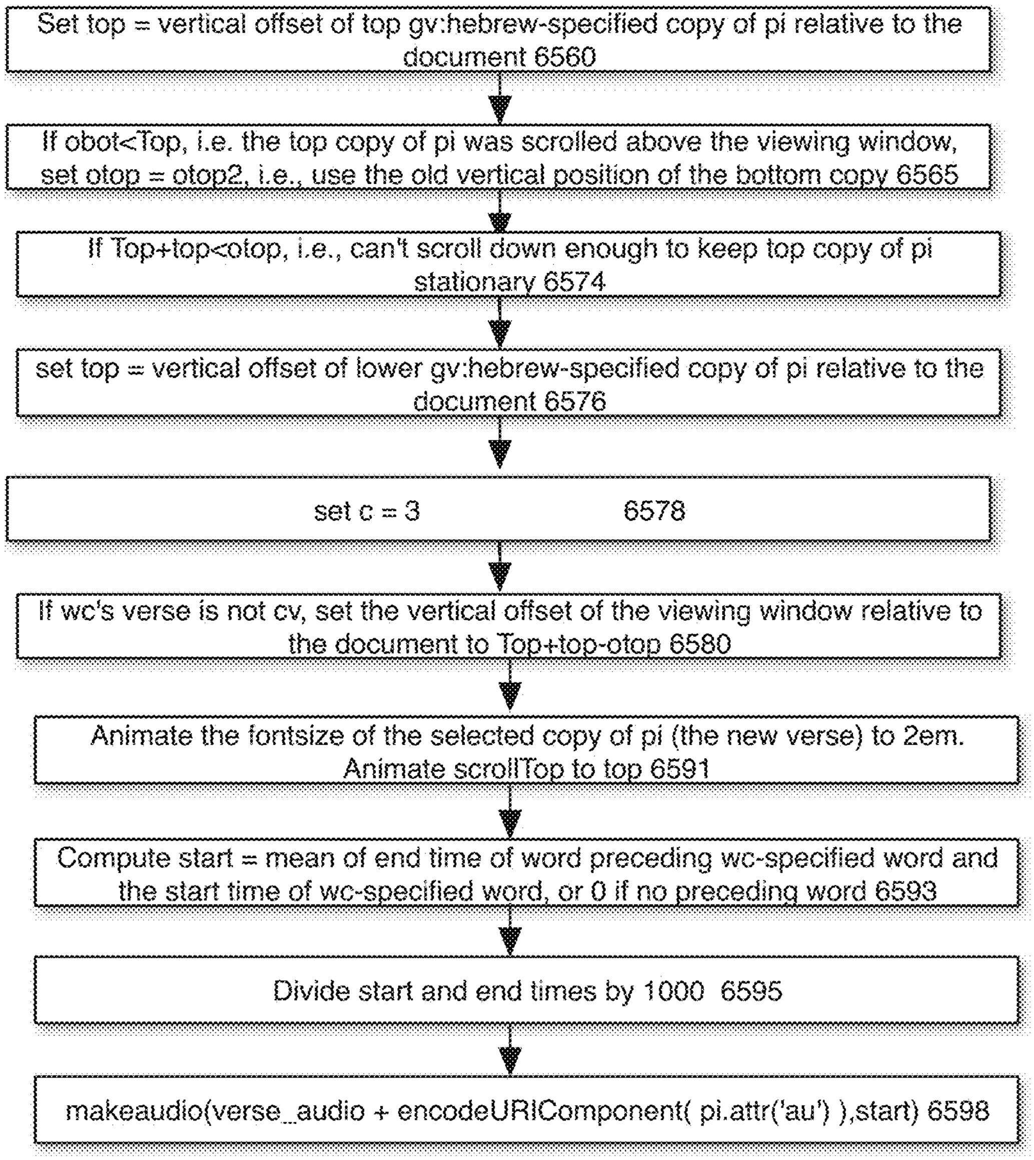

FIGS. 64A-64C depict exemplary embodiment(s) containing exemplary functions.

In step 6500, playword(wc): Start playing the word specified by wc. In step 6502, Set gv:word_class=wc. In step 6504, If the visible span specified by gv:word_class is gray, call nextcase( ). In step 6510, Set cv=the current verse (i.e., the verse of class "current_verse"). In step 6512, Stop animation. In step 6514, Remove "current_verse" from cv's classes, and set the background-color of cv's spans to gv:color_default. In step 6518, Set pi=new current verse (as specified by gv:word_class <vn>). In step 6520, Add class "current_verse" to pi. In step 6522, Stop scrolling animation. In step 6524, Set Top=vertical offset of the viewing window relative to the document top. In step 6526, Set tt=top of the word_class word. In step 6528, Set wh to 15/16*window height. In step 6532, Set th=height of the word_class word. In step 6534, If the word_class word is not in the window, make sure the upper occurrence of the current verse is at 2 em and the lower occurrence is at 1 em, and call scro112word(wh). In step 6546, Else,Set top=Top. In step 6548, Set c=0 (indicating which copy of pi we're going to move to top of screen). In step 6552, Set otop=vertical offset of upper gv:hebrew-specified copy of pi relative to the document top. In step 6554, Set otop2=vertical offset of lower gv:hebrew-specified copy of pi relative to the document top. In step 6556, Set obot=height of gv:hebrew-specified copy of pi. In step 6558, If wc's verse is not cv, set the font-size of cv to 1 em. In Step 6559, reposition items below the top of cv. In step 6560, Set top=vertical offset of top gv:hebrew-specified copy of pi relative to the document. In step 6565, If obot<Top, i.e. the top copy of pi was scrolled above the viewing window, set otop=otop2, i.e., use the old vertical position of the bottom copy. In step 6574, If Top+top<otop, i.e., can't scroll down enough to keep top copy of pi stationary. In step 6576, set top=vertical offset of lower gv:hebrew-specified copy of pi relative to the document. In step 6578, set c=3. In step 6580, If wc's verse is not cv, set the vertical offset of the viewing window relative to the document to Top+top-otop so that pi (the new verse) appears not to move, even though cv (the old verse) has changed size. In step 6591, Animate the fontsize of the selected copy of pi (the new verse) to 2 em. Animate scrollTop to top. In step 6593, Compute start=mean of the end time of the word preceding the wc-specified word and the start time of the wc-specified word, or 0 if no preceding word; In step 6595, Divide start and end times by 1000 as they are in millisecond units to convert to second units. In step 6598, makeaudio (verse_audio+encodeURIComponent(pi.attr('au')),start).

FIG. 65 depicts exemplary embodiment(s) containing exemplary functions. In step 6600, setspeed( ): Set the audio playbackRate according to the value of the playbackRate slider. In step 6610, This routine is the callback for the playbackRate slider's 'slide' and 'change' events. In step 6620, Set querydict.speed to the value of the playbackRate slider. In step 6630, If gv:audio, set gv:audio.playbackRate to maxspeed(querydict.speed/speedmax) and call timeupdate( ). writeqs(querydict). In step 6640, stopplay( ): Stop playing (pause). Clear gv:pausetimer. Call audio.pause( ). Clear audio.timer. Call pausing(true). Stop any animation. In step 6650, textlang( ): Use 'hebrew' and 'written' checkboxes to update display, gv:querydict, and links. In step 6660**, Set h=checked state of the 'hebrew' checkbox. Set w=checked state of the 'written' checkbox. Set gv:hebrew=h*(1+w). In step 6670, Set the visibility state of spoken, written, and translit verses according to gv:hebrew. Set the current verse's spans' background-color to gv:color_default. In step 6680, Set or delete gv:querydict.translit according to h. Set or delete gv:querydict.written according to w. writeqs(querydict). In step 6685, Call scroll2word.

Figure 66:
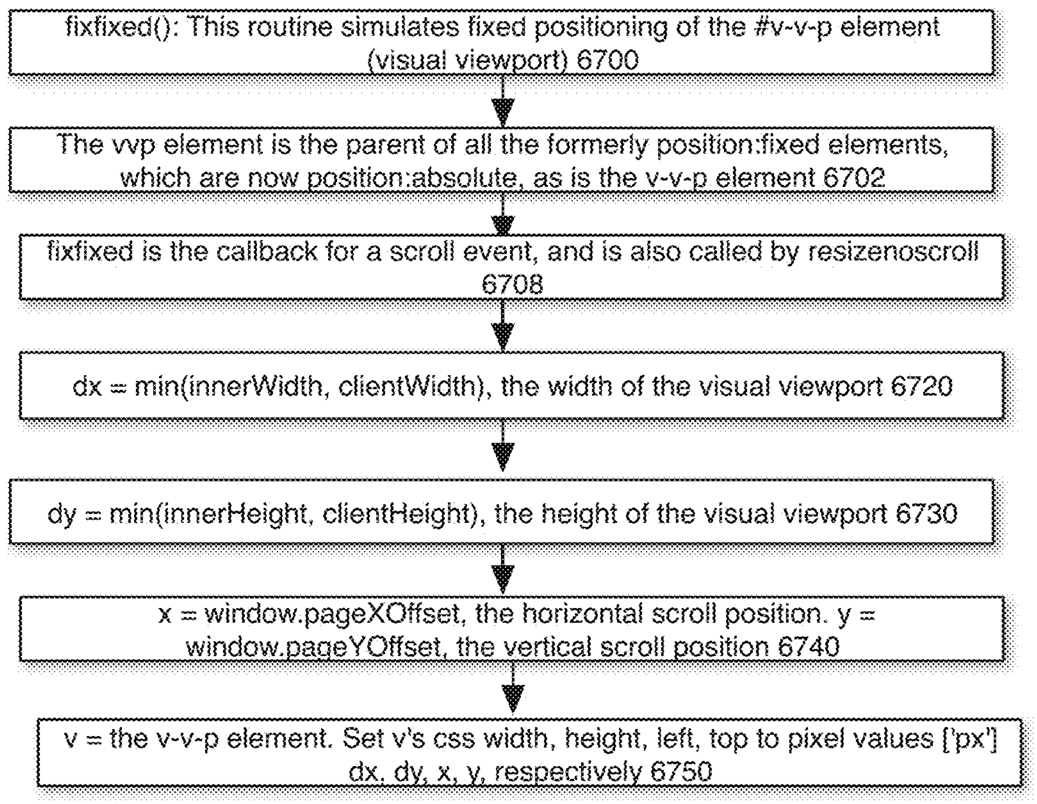
FIG. 66 depicts exemplary embodiment(s) containing exemplary functions.

FIG. 66 depicts exemplary embodiment(s) containing exemplary functions. In step 6700, fixfixed( ): This routine simulates fixed positioning of the #v-v-p element (visual viewport). In step 6702, The vvp element is the parent of all the formerly position:fixed elements, which are now position:absolute, as is the v-v-p element. One objective may be to solve problem with mobile devices treat position:fixed as position:absolute, disables position:fixed. In step 6708, fixfixed is the callback for a scroll event, and is also called by resizenoscroll. In step 6720, dx=min(innerWidth, clientWidth), the width of the visual viewport. In step 6730, dy=min(innerHeight, clientHeight), the height of the visual viewport. In step 6740, x=window.pageXOffset, the horizontal scroll position. y=window.pageYOffset, the vertical scroll position. In step 6750, v=the v-v-p element. Set v's css width, height, left, top to pixel values ['px'] dx, dy, x, y, respectively.

Figure 67:
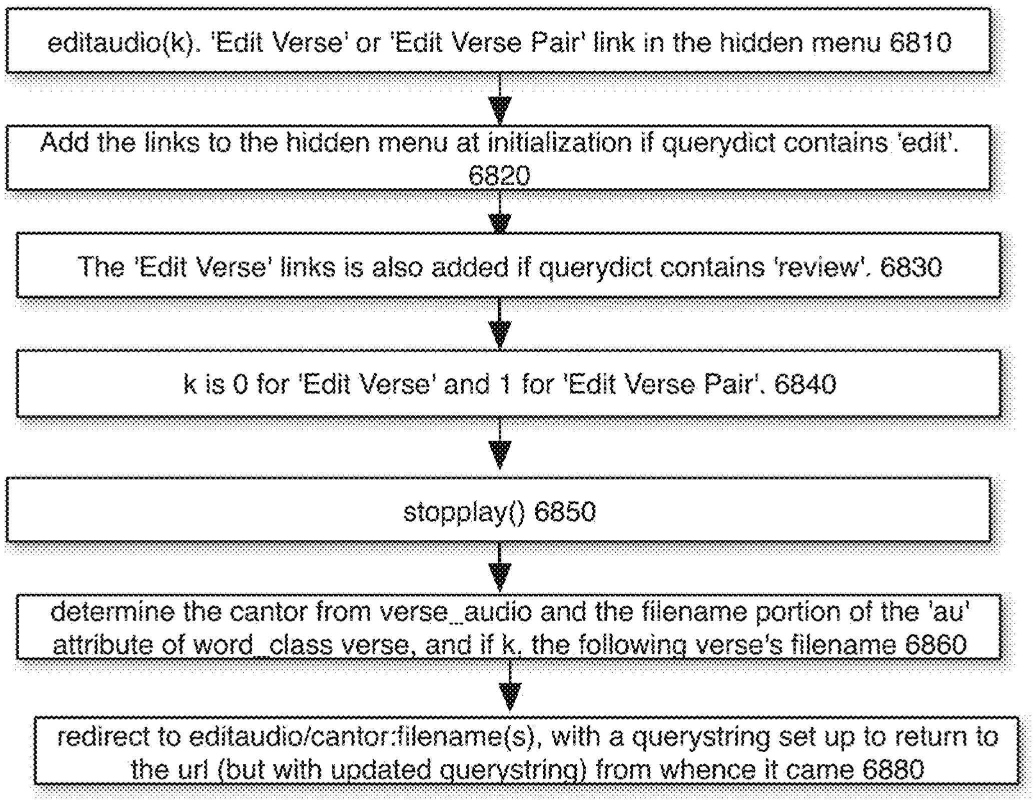
FIG. 67 depicts exemplary embodiment(s) containing exemplary functions.

FIG. 67 depicts exemplary embodiment(s) containing exemplary functions. In step 6810, editaudio(k). 'Edit Verse' or 'Edit Verse Pair' link in the hidden menu. In step 6820, Add the links to the hidden menu at initialization if querydict contains 'edit'. In step 6830, The 'Edit Verse' links is also added if querydict contains 'review'. In step 6840, k is 0 for 'Edit Verse' and 1 for 'Edit Verse Pair'. In step 6850, stopplay( ). In step 6860, determine the cantor from verse_audio and the filename portion of the 'au' attribute of the word_class verse, and if k, the following verse's filename. In step 6880, redirect to editaudio/cantor:filename(s), with a querystring set up to return to the url (but with updated querystring) from whence it came.

Figure 68:
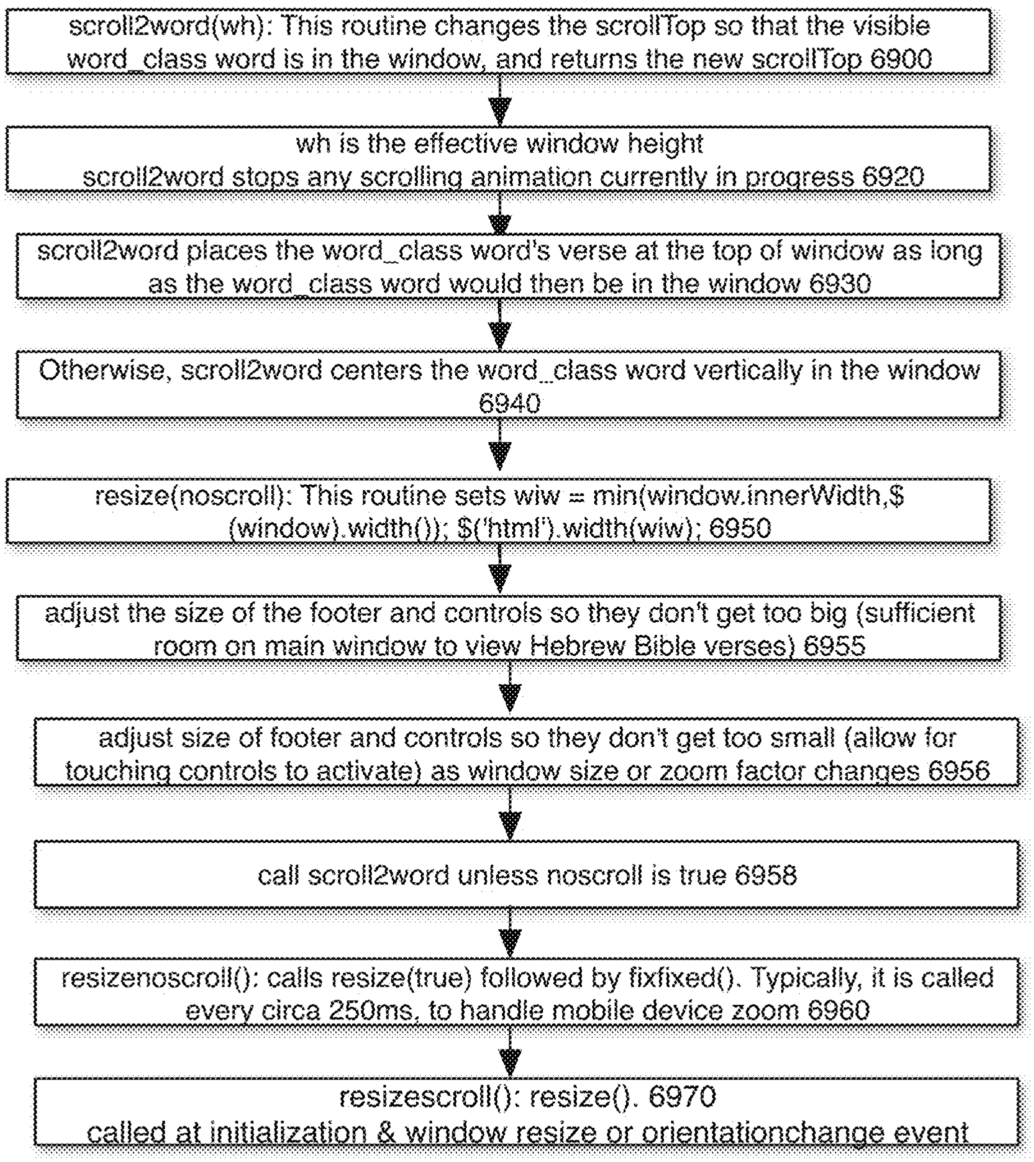
FIG. 68 depicts exemplary embodiment(s) containing exemplary functions.

FIG. 68 depicts exemplary embodiment(s) containing exemplary functions. In step 6900, scroll2word(wh): This routine changes the scrollTop so that the visible word_class word is in the window, and returns the new scrollTop. In step 6920, wh is the effective window height. scroll2word stops any scrolling animation currently in progress. In step 6930, scroll2word places the word_class word's verse at the top of window as long as the word_class word would then be in the window. In step 6940, Otherwise, scroll2word centers the word_class word vertically in the window. In step 6950, resize(noscroll): This routine sets wiw=min(window.innerWidth,$(window).width( )); $('html').width(wiw); Preferably, so on mobile devices text not scrolls horizontally off the visual viewport. In step 6955, adjust the size of the footer and controls so they don't get too big (sufficient room on main window to view Hebrew Bible verses). In step 6956, or too small (allow for touching controls to activate) as the window size or zoom factor changes. In step 6958, call scroll2word unless noscroll is true. In step 6960, resizenoscroll( ): calls resize(true) followed by fixfixed( ). Typically, it is called every circa 250 ms, to handle mobile device zoom. In step 6970, resizescroll( ): resize( ). You might think that resizescroll could just be replaced by resize, but if resize were used in a callback, it would effectively be resizenoscroll. Resizescroll is called at initialization and when a window resize or orientationchange event occurs.

Figure 69A:
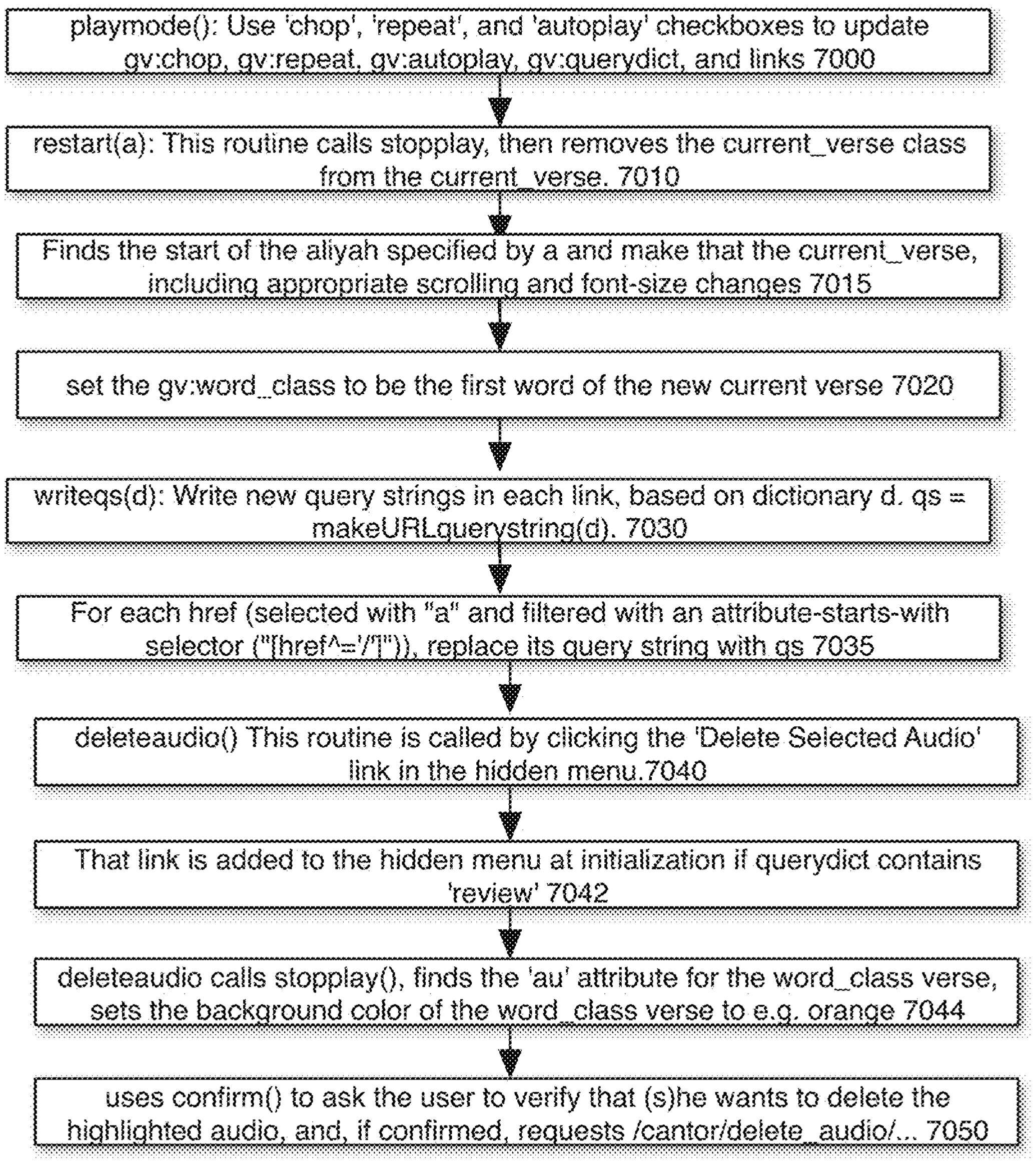
FIGS. 69A and 69B depict exemplary embodiment(s) containing exemplary functions.
Figure 69B:
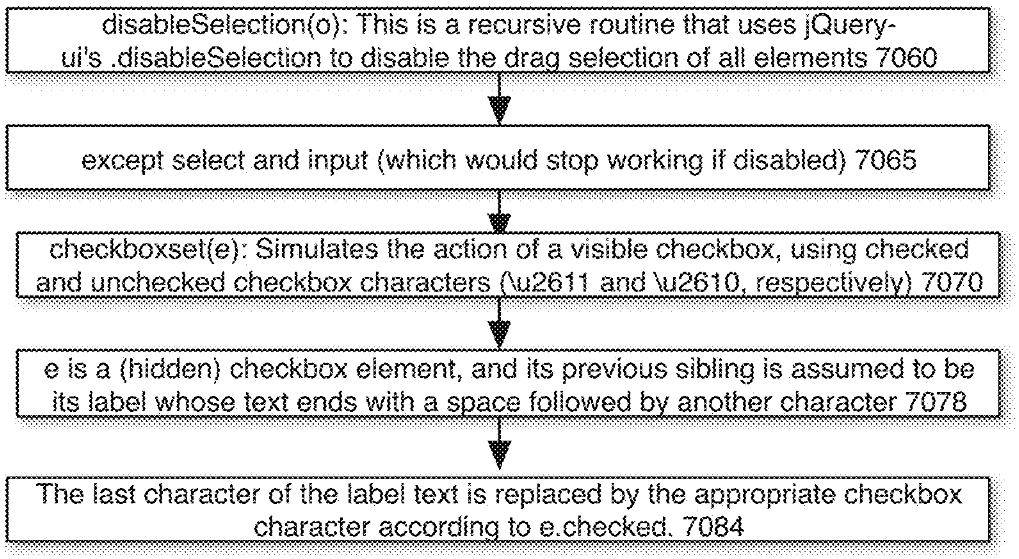

FIGS. 69A and 69B depict exemplary embodiment(s) containing exemplary functions. In step, 7000 playmode( ): Use 'chop', 'repeat', and 'autoplay' checkboxes to update gv:chop, gv:repeat, gv:autoplay, gv:querydict, and links. In step 7010, restart(a): This routine calls stopplay, then removes the current_verse class from the current_verse. In step 7015, Finds the start of the aliyah specified by a and make that the current_verse, including appropriate scrolling and font-size changes. In step 7020, set the gv:word_class to be the first word of the new current verse. In step 7025, If autoplay, playword(word_class). In step 7030, writeqs(d): Write new query strings in each link, based on dictionary d. qs=makeURLquerystring(d). In step 7035, For each href (selected with "a" and filtered with an attribute-starts-with selector ("[href ^='/']")), replace its query string with qs. In step 7040, deleteaudio( ) This routine is called by clicking the 'Delete Selected Audio' link in the hidden menu. In step 7042, That link is added to the hidden menu at initialization if querydict contains 'review'. In step 7044, deleteaudio calls stopplay( ), finds the 'au' attribute for the word_class verse, sets the background color of the word_class verse to (for example) orange. In step 7050, uses confirm( ) to ask the user to verify that (s)he wants to delete the highlighted audio, and, if confirmed, requests kantor/delete_audio/<cantor>:<au attribute>/?url=<encoded current url>. In step 7060, disableSelection(o): This is a recursive routine that uses jQuery-ui's.disableSelection to disable the drag selection of all elements. At step 7065, except select and input (which would stop working if they were disabled). In step 7070, checkboxset(e): This simulates the action of a visible checkbox, using checked and unchecked checkbox characters (\u2611 and \u2610, respectively). In step 7078, e is a (hidden) checkbox element, and its previous sibling is assumed to be its label whose text ends with a space followed by another character. In step 7084, The last character of the label text is replaced by the appropriate checkbox character according to e.checked.

Figure 70:
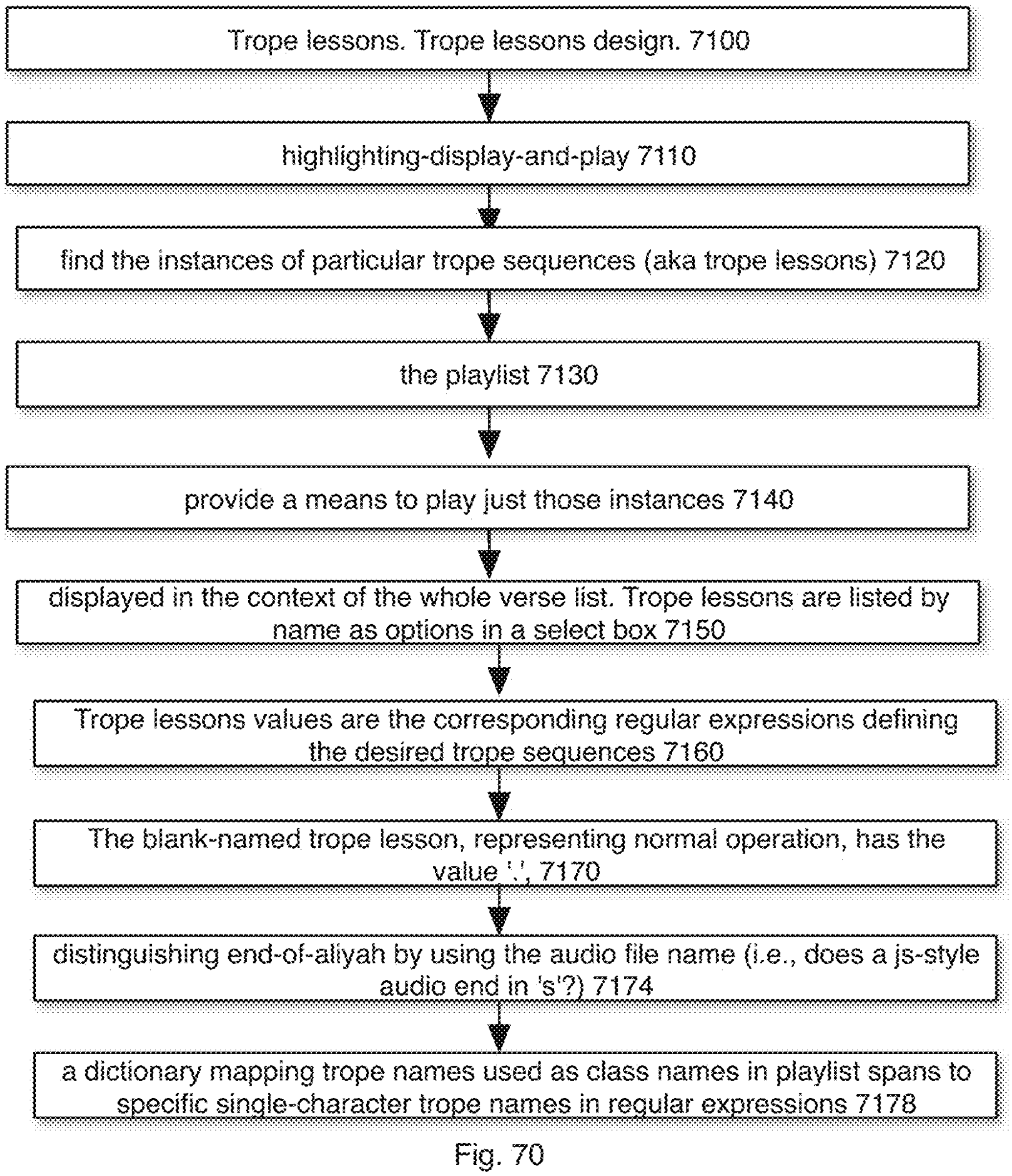
FIG. 70 depicts exemplary embodiment(s) containing exemplary functions.

FIG. 70 depicts exemplary embodiment(s) containing exemplary functions. In step 7100, Trope lessons. Trope lessons design. The main idea for adding trope lessons to the standard 7110 highlighting-display-and-play is to 7120 find the instances of particular trope sequences (aka trope lessons) in 7130 the playlist, and 7140 provide a means to play just those instances, 7150 displayed in the context of the whole verse list. Trope lessons are listed by name as options in a select box. 7160 Trope lessons values are the corresponding regular expressions defining the desired trope sequences. 7170 The blank-named trope lesson, representing normal operation, has the value '.', while, for example, the lesson named 'siluq' has the value 'a'.

If we want to distinguish between normal siluq and aliyah-ending siluq, there are a number of approaches, but many involve being able to tell the difference. In step 7174, distinguishing end-of-aliyah by using the audio file name (i.e., does a js-style audio end in 's'?). Distinguishing end-of-aliyah by knowing where aliyot end (for true aliyot as opposed to js-style readings). Distinguishing end-of-aliyah by learning based on start and end values in the siluq span elements and the corresponding lengths of those spans' words. tropelessons depicts the <select id="tropelessons"> element. In step 7178, tropes depicts a dictionary mapping the trope names used as class names in playlist spans to specific single-character trope names as used in the regular expressions.

Figure 71A:
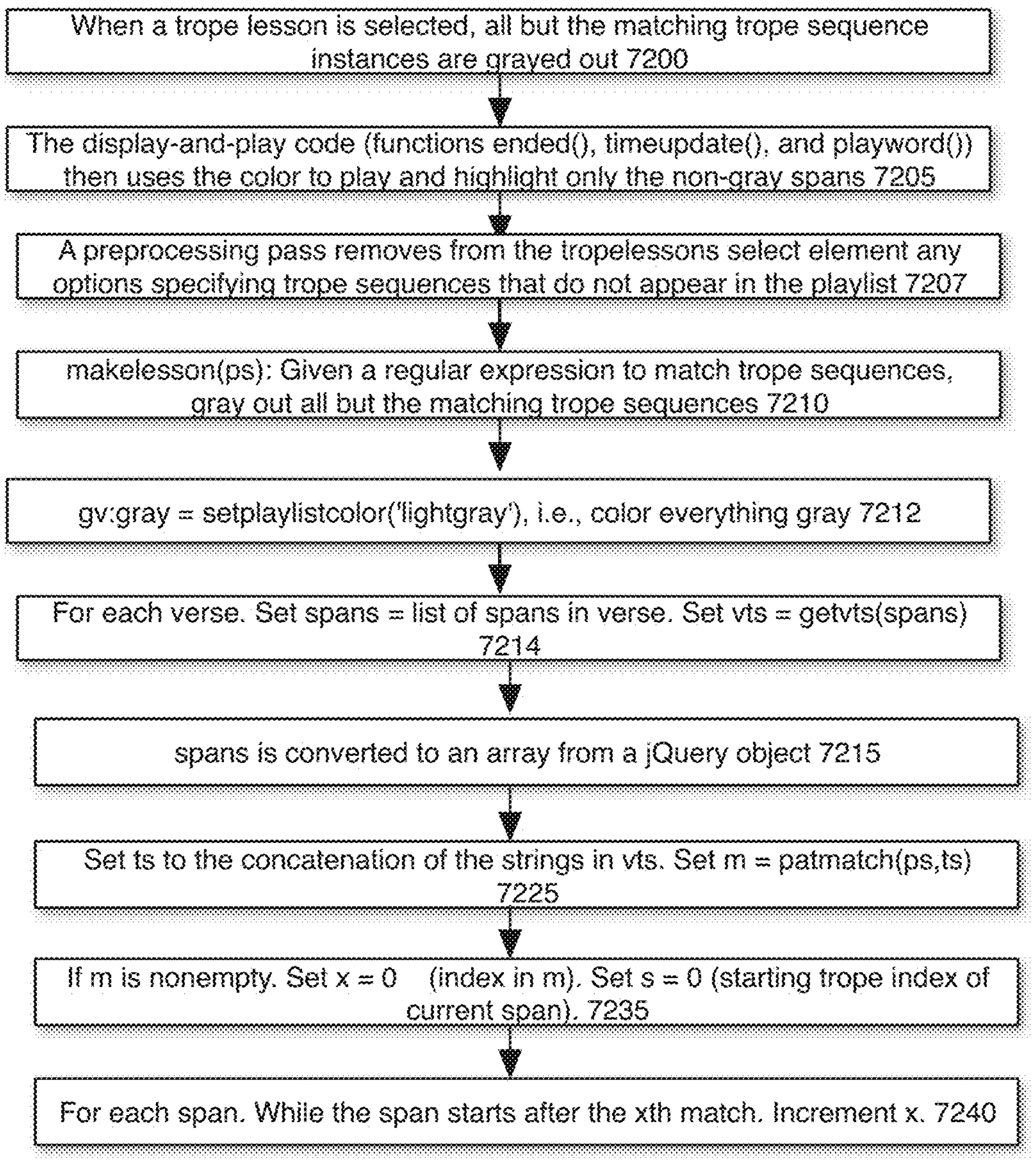
FIGS. 71A and 71B depict exemplary embodiment(s) containing exemplary functions.
Figure 71B:
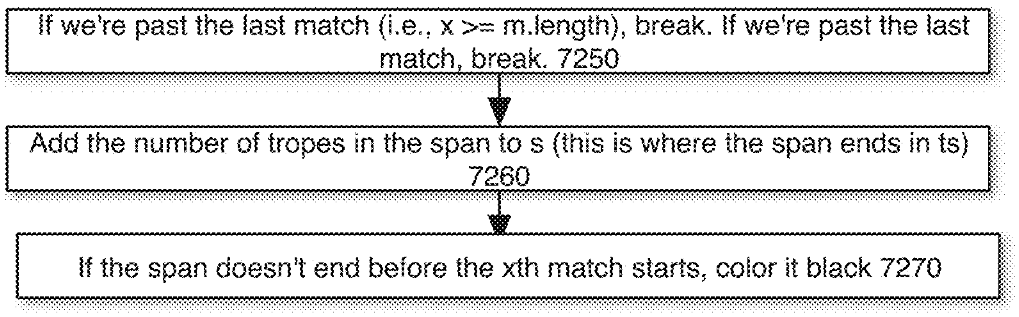

FIGS. 71A and 71B depict exemplary embodiment(s) containing exemplary functions. In step 7200, When a trope lesson is selected, all but the matching trope sequence instances are grayed out. In step 7205, The display-and-play code (functions ended( ), timeupdate( ), and playword( )) then uses the color to play and highlight only the non-gray spans. In step 7207, A preprocessing pass removes from the tropelessons select element any options specifying trope sequences that do not appear in the playlist. In step 7210, makelesson(ps): Given a regular expression to match trope sequences, gray out all but the matching trope sequences. In step 7212, gv:gray=setplaylistcolor('lightgray'), i.e., color everything gray. In step 7214, For each verse. Set spans=list of spans in verse. Set vts=getvts(spans). In step 7215, spans is converted to an array from a jQuery object. In step 7225, Set is to the concatenation of the strings in vts. Set m=patmatch(ps,ts). In step 7235, If m is nonempty. Set x=0 (index in m). Set s=0 (starting trope index of current span). In step 7240, For each span. While the span starts after the xth match. Increment x. In step 7250, If we're past the last match (i.e., x>=m.length), break. If we're past the last match, break. In step 7260, Add the number of tropes in the span to s (this is where the span ends in ts). In step 7270, If the span doesn't end before the xth match starts, color it black.

Figure 72:
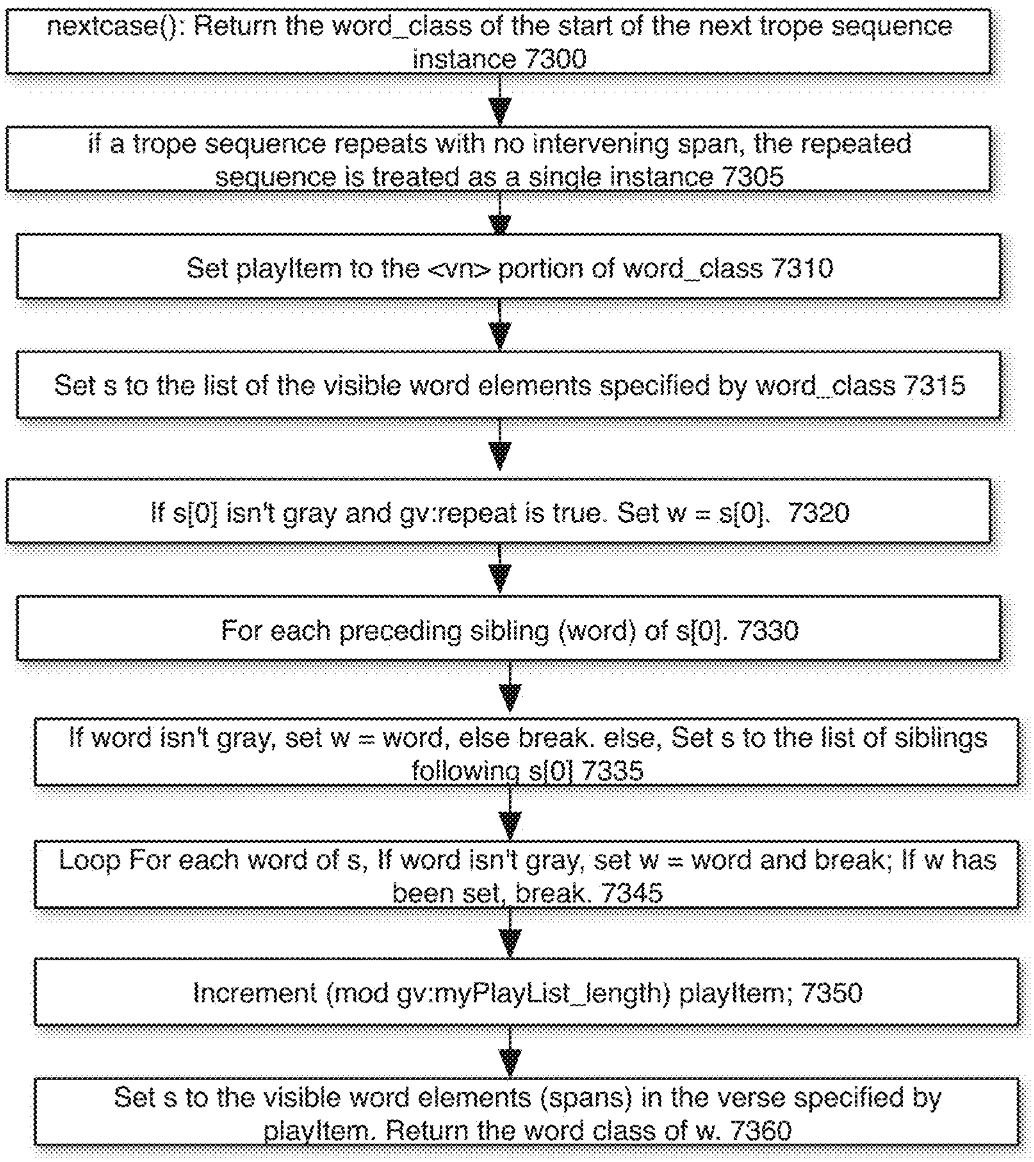
FIG. 72 depicts exemplary embodiment(s) containing exemplary functions.

FIG. 72 depicts exemplary embodiment(s) containing exemplary functions. In step 7300 nextcase( ): Return the word_class of the start of the next trope sequence instance. In step 7305, if a trope sequence repeats with no intervening span, the repeated sequence is treated as a single instance. In step 7310, Set playItem to the <vn> portion of word_class. In step 7315, Set s to the list of the visible word elements specified by word_class. In step 7320, If s[0] isn't gray and gv:repeat is true. Set w=s[0]. In step 7330, For each preceding sibling (word) of s[0]. In step 7335, If word isn't gray, set w=word, else break. else, Set s to the list of siblings following s[0]. In step 7345, Loop For each word of s, If word isn't gray, set w=word and break; If w has been set, break. In step 7350, Increment (mod gv:myPlayList_length) playItem; In step 7360, Set s to the visible word elements (spans) in the verse specified by playItem. Return the word class of w.

Figure 73:
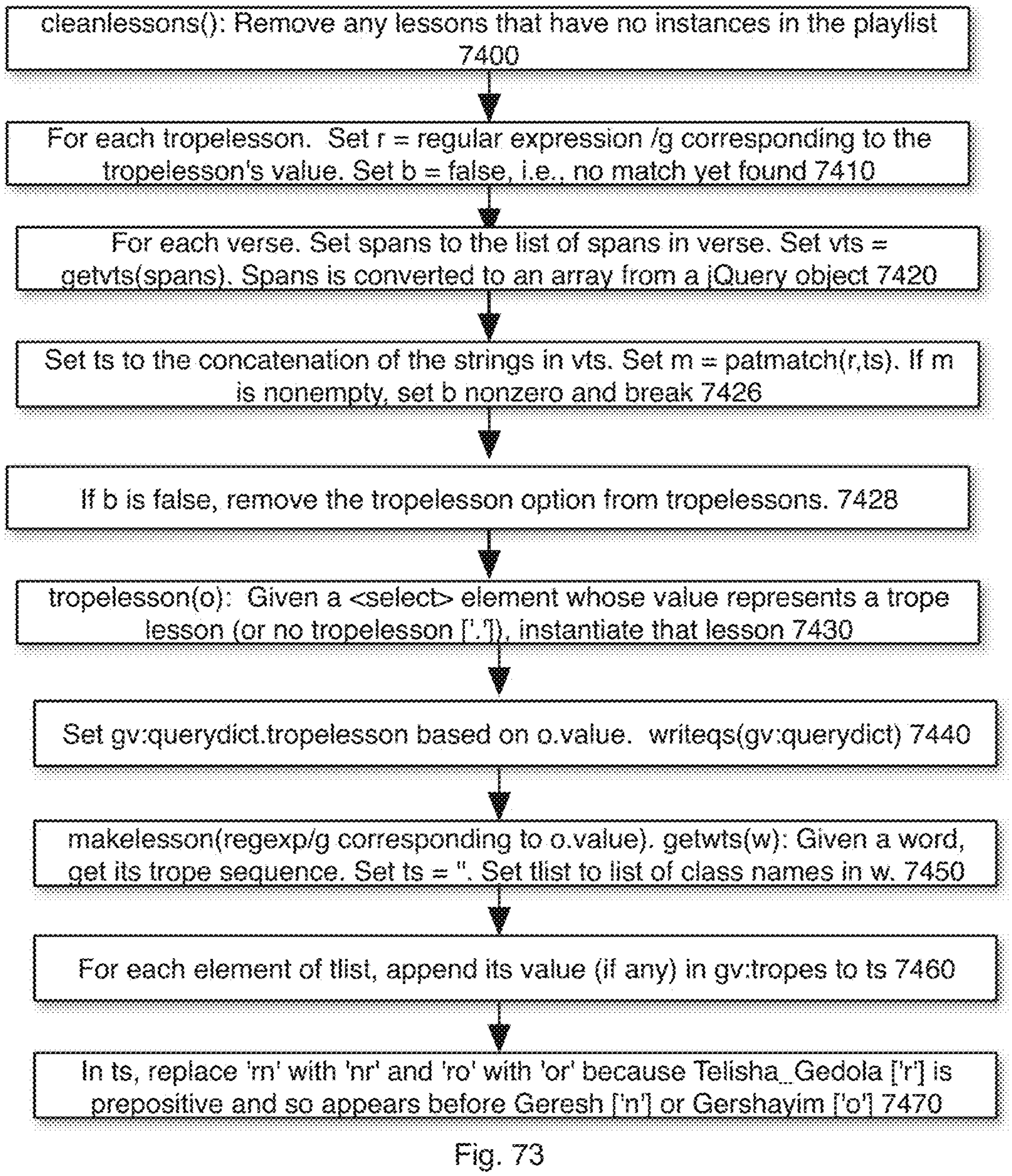
FIG. 73 depicts exemplary embodiment(s) containing exemplary functions.

FIG. 73 depicts exemplary embodiment(s) containing exemplary functions.

Figure 74:
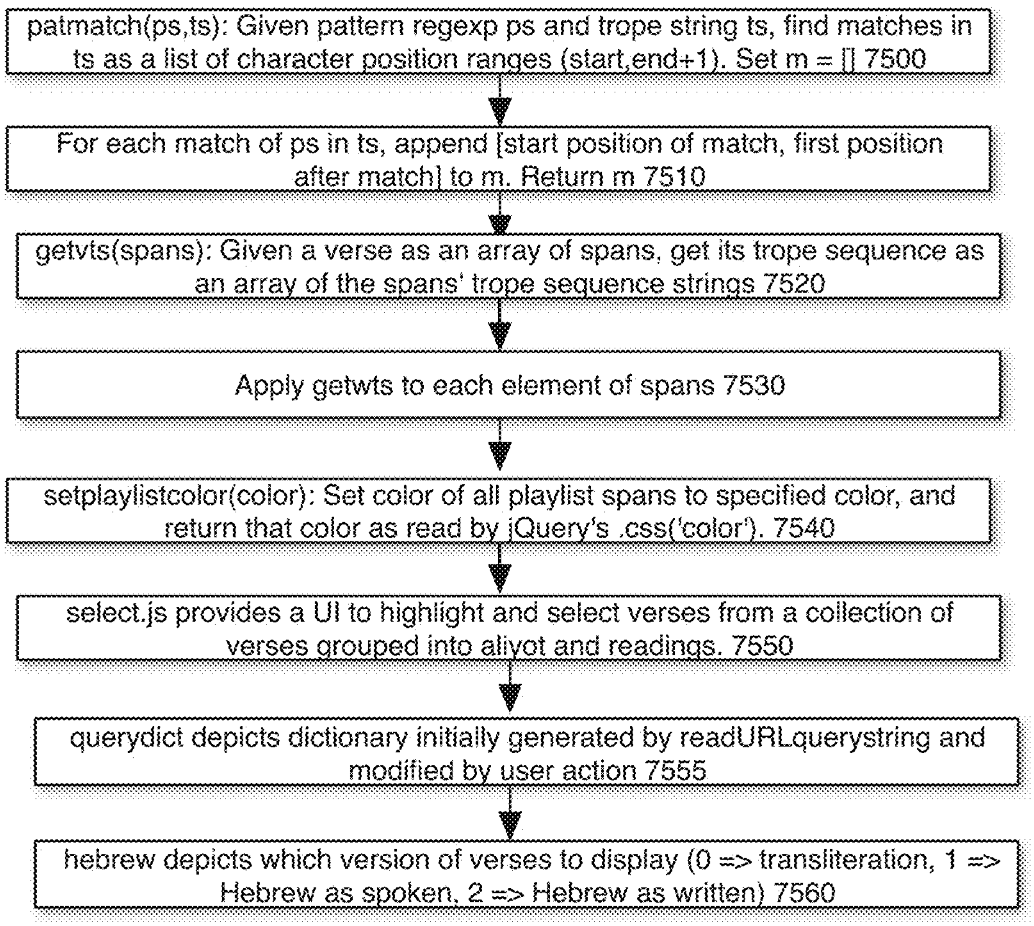
FIG. 74 depicts exemplary embodiment(s) containing exemplary functions.

In step, 7400 cleanlessons( ): Remove any lessons that have no instances in the playlist. In step 7410, For each tropelesson. Set r=regular expression /g corresponding to the tropelesson's value. Set b=false, i.e., no match yet found. In step 7420, For each verse. Set spans to the list of spans in verse. Set vts=getvts(spans). Spans is converted to an array from a jQuery object. In step 7426, Set ts to the concatenation of the strings in vts. Set m=patmatch(r,ts). If m is nonempty, set b nonzero and break. In step 7428, If b is false, remove the tropelesson option from tropelessons. In step 7430, tropelesson(o): Given a <select> element whose value represents a trope lesson (or no tropelesson ['.'], instantiate that lesson. In step 7440 Set gv:querydict.tropelesson based on o.value. writeqs(gv:querydict). In step 7450, makelesson (regexp/g corresponding to o.value). getwts(w): Given a word, get its trope sequence. Set ts=". Set tlist to the list of class names in w. In step 7460, For each element of tlist, append its value (if any) in gv:tropes to ts. In step 7470, In ts, replace 'rn' with 'nr' and 'ro' with 'or' because Telisha_Gedola ['r'] is prepositive and so appears before Geresh ['n'] or Gershayim ['o'] if in the same word, but is chanted after; return the result FIG. 74 depicts exemplary embodiment(s) containing exemplary functions. In step 7500, patmatch(ps,ts): Given pattern regexp ps and trope string ts, find matches in ts as a list of character position ranges (start,end+1). Set m=[ ]. In step 7510, For each match of ps in ts, append [start position of match, first position after match] to m. Return m. In step 7520, getvts(spans): Given a verse as an array of spans, get its trope sequence as an array of the spans' trope sequence strings. In step 7530, Apply getwts to each element of spans. In step 7540, setplaylistcolor(color): Set color of all playlist spans to specified color, and return that color as read by jQuery's.css('color'). In step 7550, select.js provides a UI to highlight and select verses from a collection of verses grouped into aliyot and demarcated into readings. editstudent.html, recordstudent.html, and recording.html each include select.js. In step 7555, querydict depicts dictionary initially generated by readURLquerystring and modified by user action. In step 7560, hebrew depicts which version of verses to display (0=>transliteration, 1=>Hebrew as spoken, 2=>Hebrew as written). Field depicts element that contains the string representation of the selected verselist. mousestate depicts state of mouse buttons. begselect depicts id of element that was first selected.

Figure 75A:
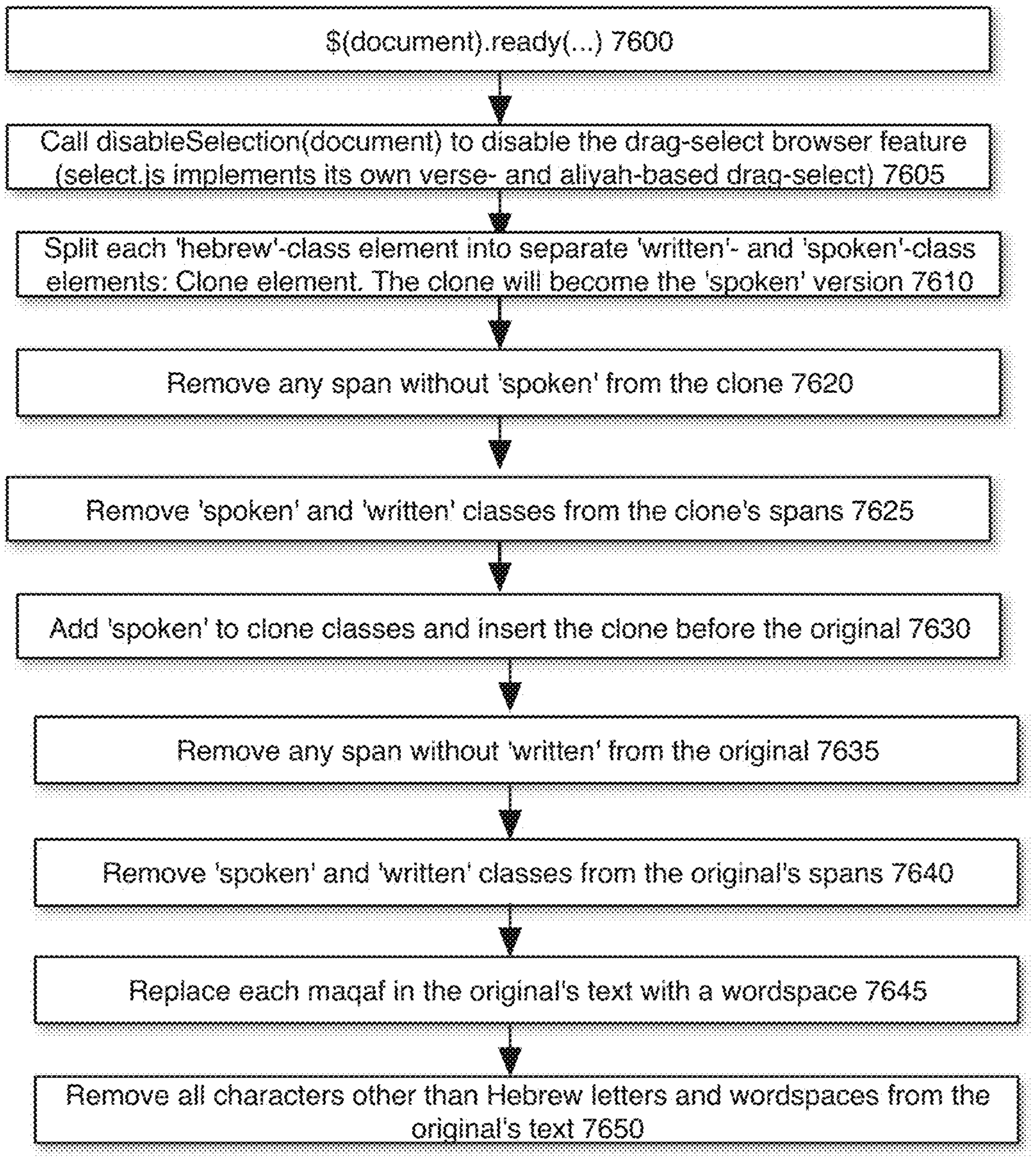
FIGS. 75A and 75B depict exemplary embodiment(s) containing exemplary initialization code.
Figure 75B:
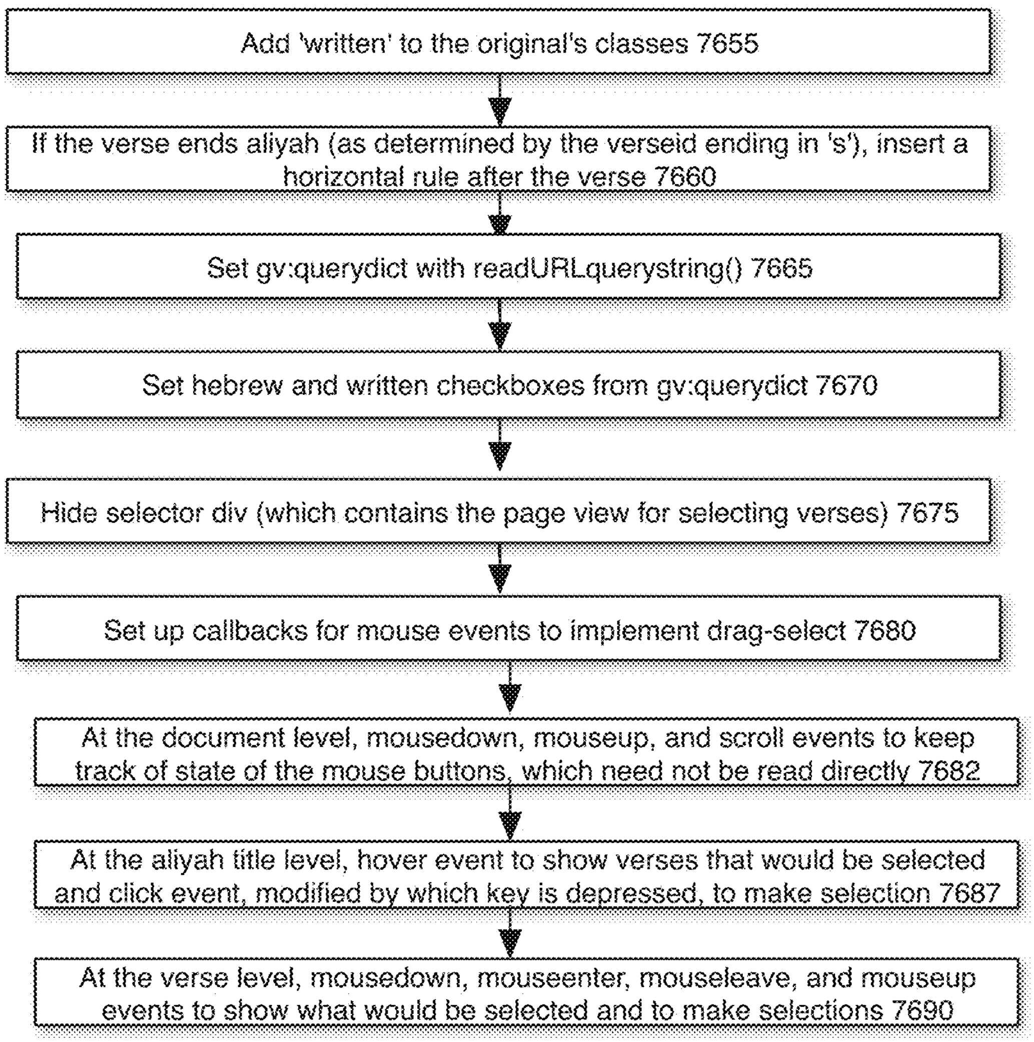

FIGS. 75A and 75B depict exemplary embodiment(s) containing exemplary initialization code. In step 7600, $(document).ready( . . . ). In step 7605, Call disableSelection (document) to attempt to disable the drag-select browser feature (select.js implements its own verse- and aliyah-based drag-select). In step 7610, Split each 'hebrew'-class element into separate 'written'- and 'spoken'-class elements: Clone the element. The clone will become the 'spoken' version. In step 7620, Remove any span without 'spoken' from the clone. In step 7625, Remove 'spoken' and 'written' classes from the clone's spans. In step 7630, Add 'spoken' to the clone classes and insert the clone before the original. In step 7635, Remove any span without 'written' from the original. In step 7640, Remove 'spoken' and 'written' classes from the original's spans. In step 7645, Replace each maqaf in the original's text with a wordspace. In step 7650, Remove all characters other than Hebrew letters and wordspaces from the original's text. In step 7655, Add 'written' to the original's classes. In step 7660, If the verse ends aliyah (as determined by the verseid ending in 's'), insert a horizontal rule after the verse. In step 7665, Set gv:querydict with readURLquerystring( ). In step 7670, Set hebrew and written checkboxes from gv:querydict. In step 7675, Hide the selector div (which contains the page view for selecting verses). In step 7680, Set up callbacks for mouse events to implement drag-select. In step 7682, At the document level, mousedown, mouseup, and scroll events to keep track of the state of the mouse buttons, which need not be read directly. In step 7687, At the aliyah title level, hover event to show verses that would be selected and click event, modified by which key is depressed, to make selection. In step 7690, At the verse level, mousedown, mouseenter, mouseleave, and mouseup events to show what would be selected and to make selections.

Figure 76:
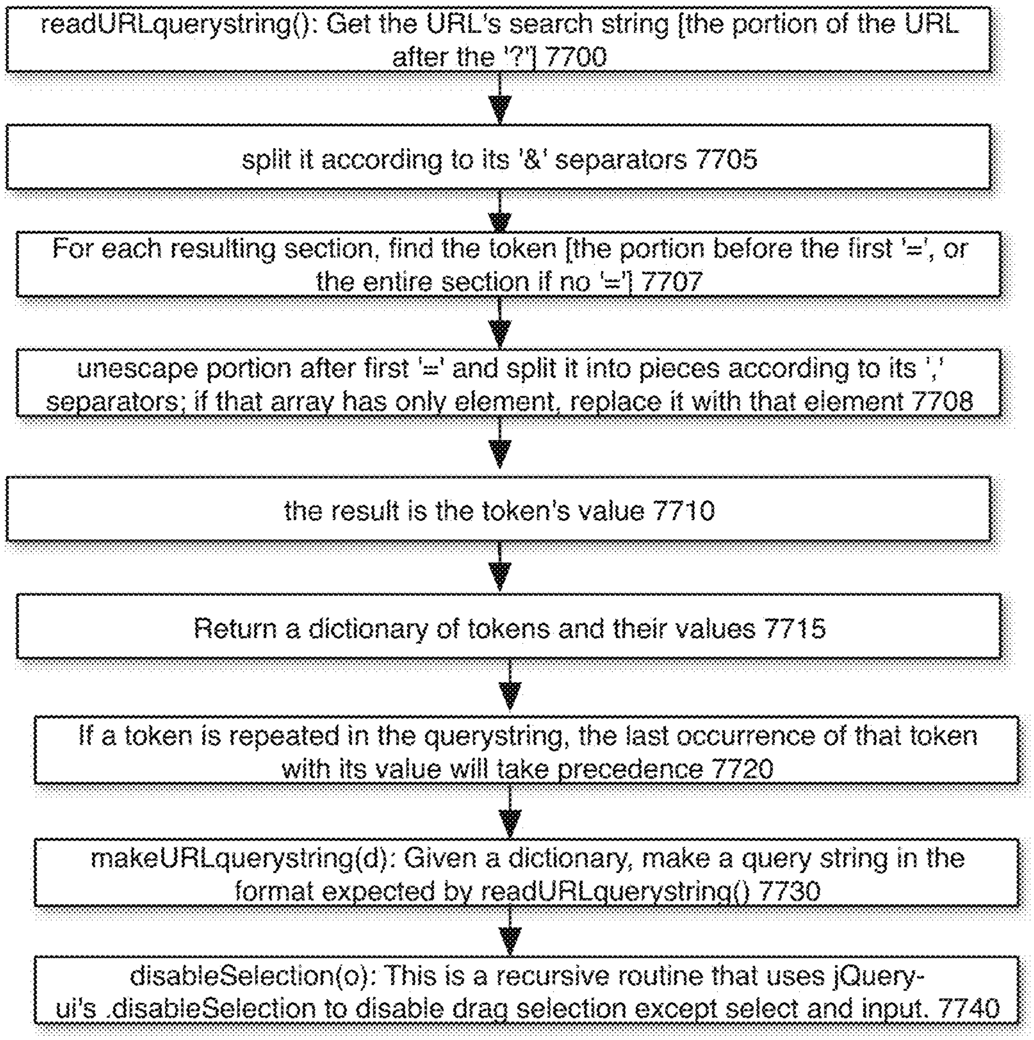
FIG. 76 depicts exemplary embodiment(s) containing exemplary functions.

FIG. 76 depicts exemplary embodiment(s) containing exemplary functions. In step 7700, readURLquerystring( ): Get the URL's search string the portion of the URL after the '?']. In step 7705, split it according to its '&' separators. In step 7707, For each resulting section, find the token [the portion before the first '=', or the entire section if no '=']; In step 7708, unescape the portion after the first '=' and split it into pieces according to its ',' separators, resulting in an array of string values; if that array has only element, replace it with that element; In step 7710, the result is the token's value. In step 7715, Return a dictionary of tokens and their values. In step 7720, If a token is repeated in the querystring, the last occurrence of that token with its value will take precedence. In step 7730, makeURLquerystring(d): Given a dictionary, make a query string in the format expected by readURLquerystring( ). In step 7740, disableSelection(o): This is a recursive routine that uses jQuery-ui's.disableSelection to disable the drag selection of all elements except select and input.

Figure 77A:
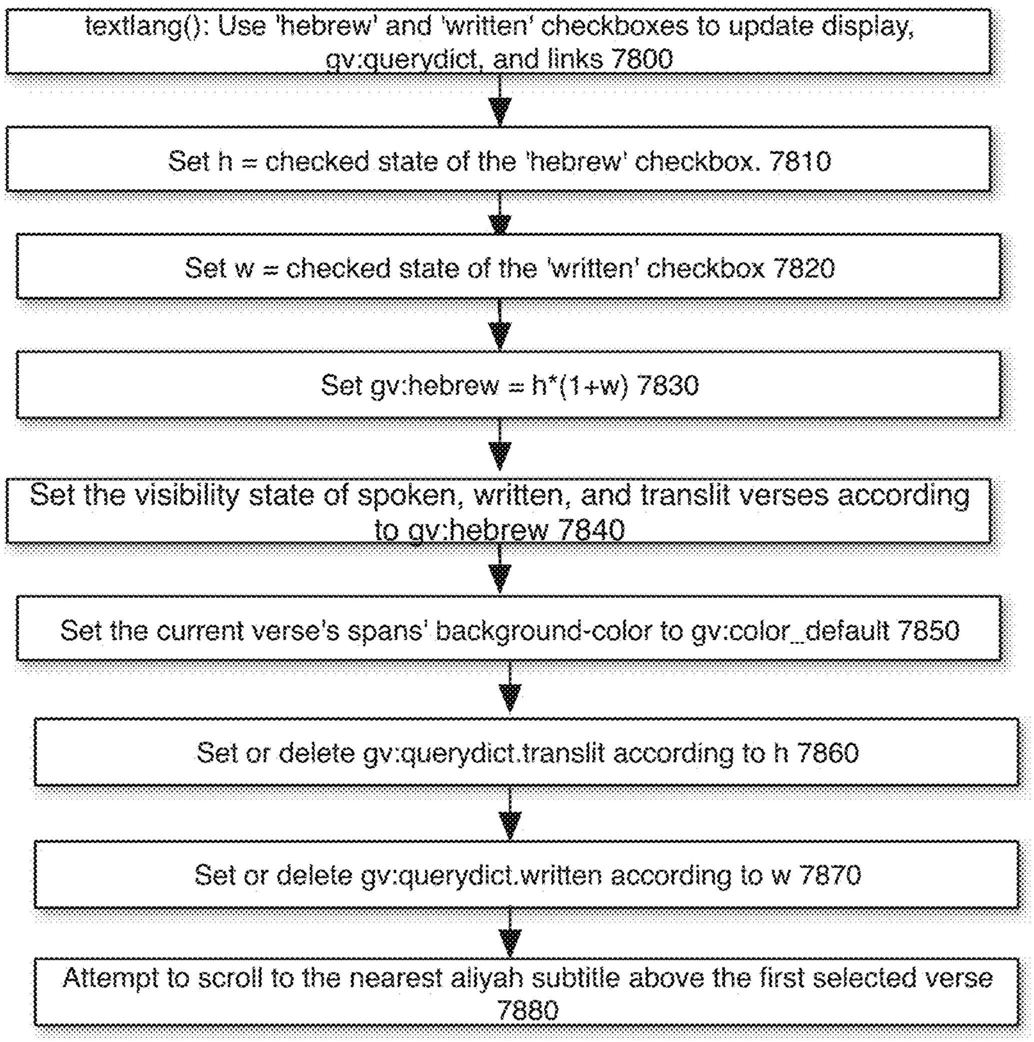
FIGS. 77A and 77B depict exemplary embodiment(s) containing exemplary functions.
Figure 77B:
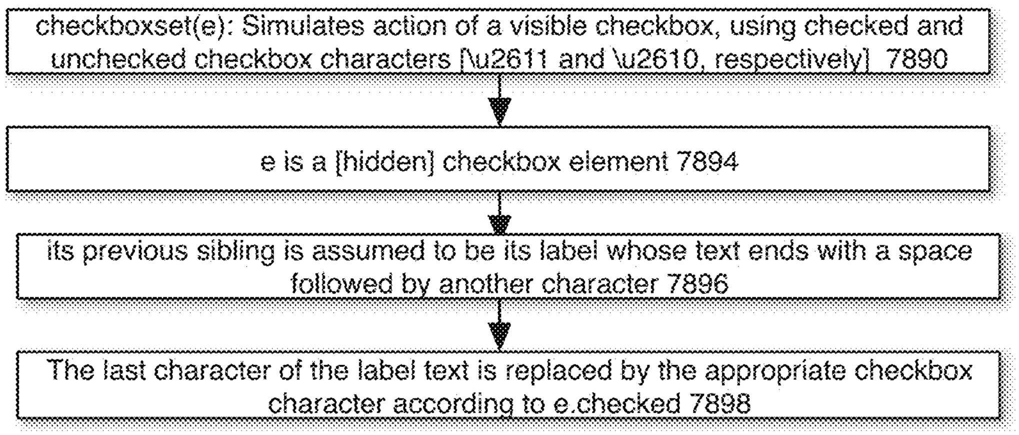

FIGS. 77A and 77B depict exemplary embodiment(s) containing exemplary functions. In step 7800, textlang( ): Use 'hebrew' and 'written' checkboxes to update display, gv:querydict, and links. In step 7810, Set h=checked state of the 'hebrew' checkbox. In step 7820, Set w=checked state of the 'written' checkbox. In step 7830, Set gv:hebrew=h*(1+w). In step 7840, Set the visibility state of spoken, written, and translit verses according to gv:hebrew. In step 7850, Set the current verse's spans' background-color to gv:color_default. In step 7860, Set or delete gv:querydict.translit according to h. In step 7870, Set or delete gv:querydict.written according to w. In step 7880, Attempt to scroll to the nearest aliyah subtitle above the first selected verse. In step 7890, checkboxset(e): This simulates the action of a visible checkbox, using checked and unchecked checkbox characters [\u2611 and \u2610, respectively]. In step 7894, e is a [hidden] checkbox element. In step 7896, its previous sibling is assumed to be its label whose text ends with a space followed by another character. In step 7898, The last character of the label text is replaced by the appropriate checkbox character according to e.checked.

Figure 78A:
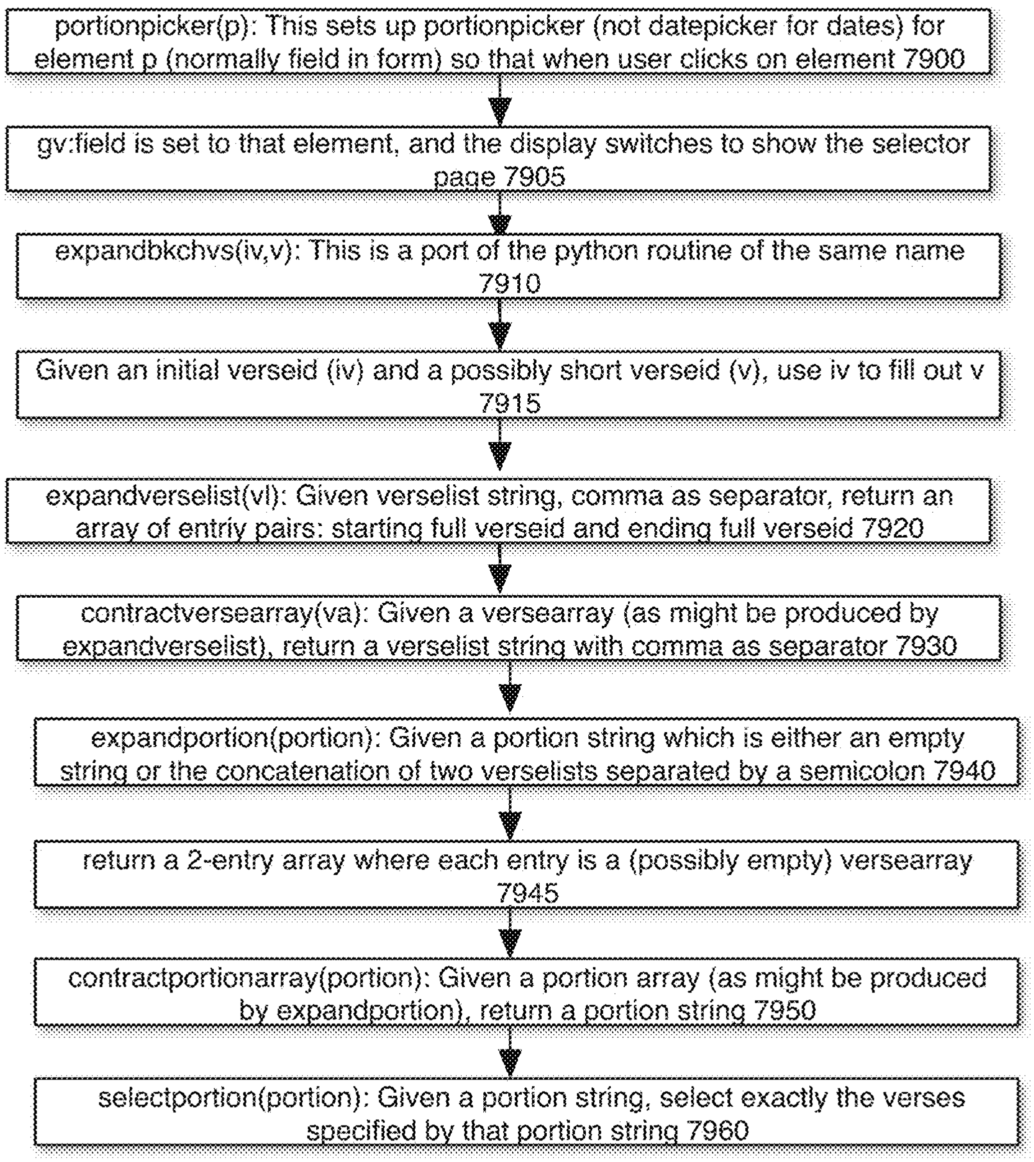
FIGS. 78A and 78B depict exemplary embodiment(s) containing exemplary functions.
Figure 78B:
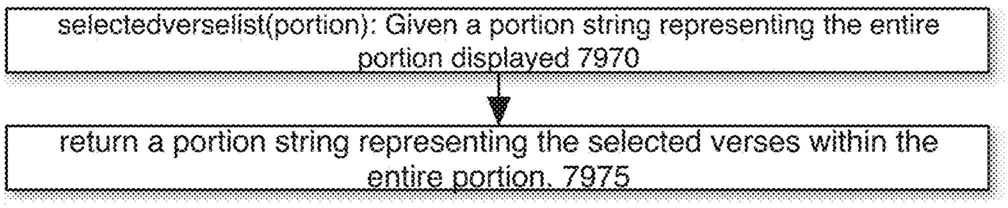

FIGS. 78A and 78B depict exemplary embodiment(s) containing exemplary functions. At step 7900, portionpicker (p): This sets up the portionpicker (not datepicker for dates) for element p (normally a field in a form) so that when the user clicks on the element. In step 7905, gv:field is set to that element, and the display switches to show the selector page. In step 7910, expandbkchvs(iv,v): This is a port of the python routine of the same name. In step 7915, Given an initial verseid (iv) and a possibly short verseid (v), use iv to fill out v. (v may specify only a verse, or only a chapter and verse, or a full verseid, and leading zeroes may be elided.) In step 7920, expandverselist(vl): Given a verselist string, assuming comma as separator, return an array where each pair of entries is a starting full verseid and an ending full verseid. In step 7930, contractversearray(va): Given a versearray (as might be produced by expandverselist), return a verselist string with comma as separator. In step 7940, expandportion(portion): Given a portion string which is either an empty string or the concatenation of two verselists separated by a semicolon. In step 7945, return a 2-entry array where each entry is a (possibly empty) versearray. In step 7950, contractportionarray(portion): Given a portion array (as might be produced by expandportion), return a portion string. In step 7960, selectportion(portion): Given a portion string, select exactly the verses specified by that portion string. In step 7970, selectedverselist(portion): Given a portion string representing the entire portion displayed. In step 7975. return a portion string representing the selected verses within the entire portion.

Figure 79:
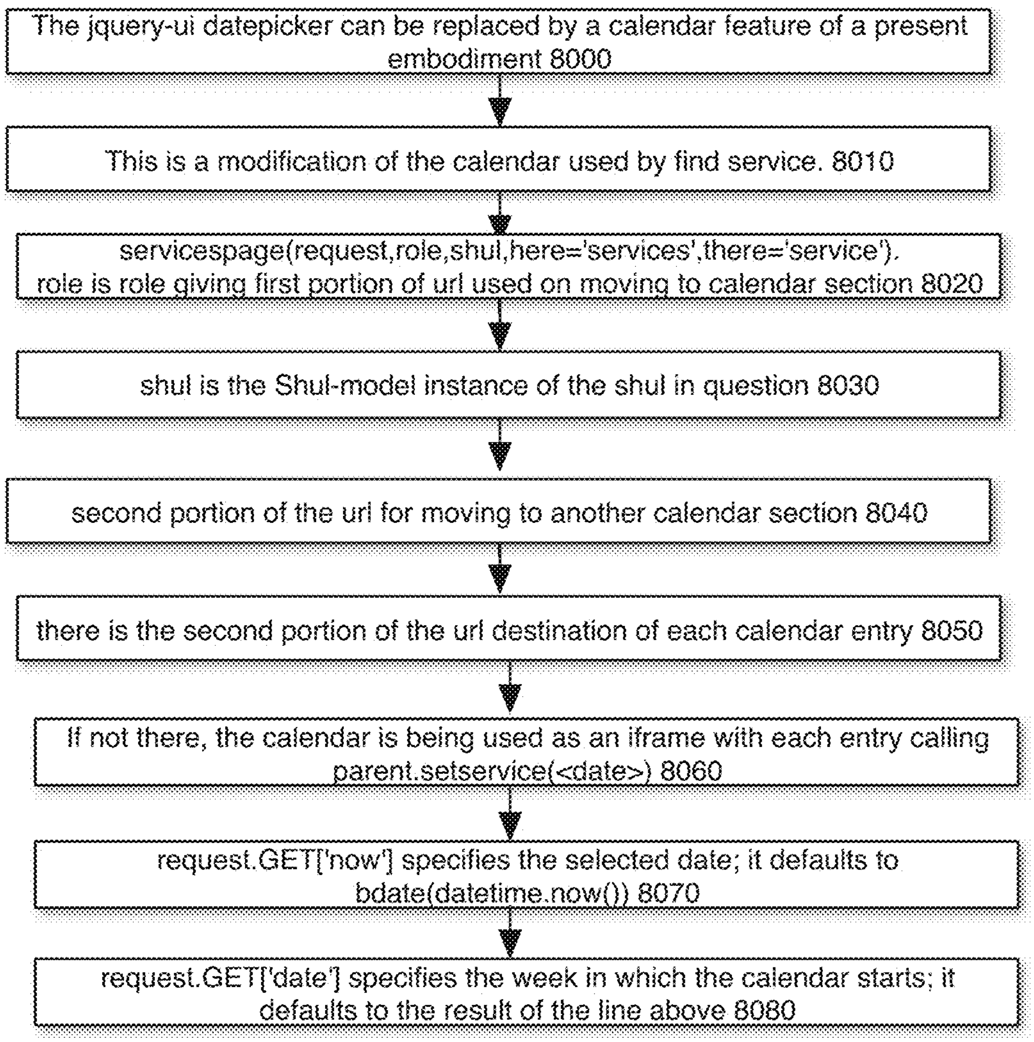
FIG. 79 depicts exemplary embodiment(s) containing exemplary functions.

FIG. 79 depicts exemplary embodiment(s) containing exemplary functions. In step 8000, The jquery-ui datepicker can be replaced by a calendar feature of a present embodiment. In step 8010, This is a modification of the calendar used by find service. In step 8020, servicespage(request,role, shul,here='services',there='service').

role is the role (string) giving (when lowercased) the first portion of the url used when moving to another calendar section. In step 8030, shul is the Shul-model instance of the shul in question. In step 8040, second portion of the url for moving to another calendar section. In step 8050, there is the second portion of the url destination of each calendar entry. In step 8060, If not there, the calendar is being used as an iframe with each entry calling parent.setservice(<date>). In step 8070, request.GET['now'] specifies the selected date; it defaults to bdate(datetime.now( ). In step 8080, request.GET ['date'] specifies the week in which the calendar starts; it defaults to the result of the line above.

Figure 80:
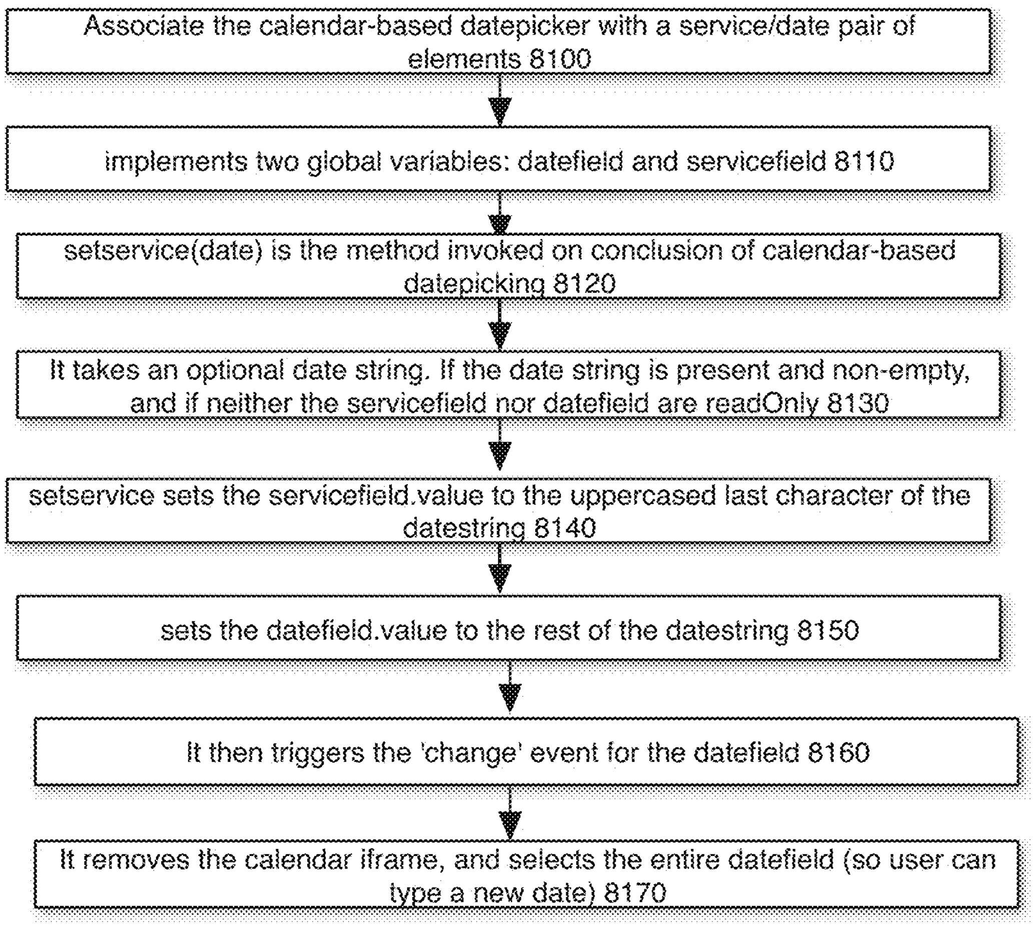
FIG. 80 depicts exemplary embodiment(s) containing exemplary functions.

FIG. 80 depicts exemplary embodiment(s) containing exemplary functions. In step 8100, Associate the calendar-based datepicker with a service/date pair of elements. In step 8110, implements two global variables: datefield and servicefield, and. In step 8120, setservice(date) is the method invoked on conclusion of calendar-based datepicking. In step 8130, It takes an optional date string. If the date string is present and non-empty, and if neither the servicefield nor datefield are readOnly. In step 8140, setservice sets the servicefield.value to the uppercased last character of the datestring. In step 8150, sets the datefield.value to the rest of the datestring. In step 8160, It then triggers the 'change' event for the datefield. In step 8170, It removes the calendar iframe, and selects the entire datefield (so user can type a new date).

Figure 81:
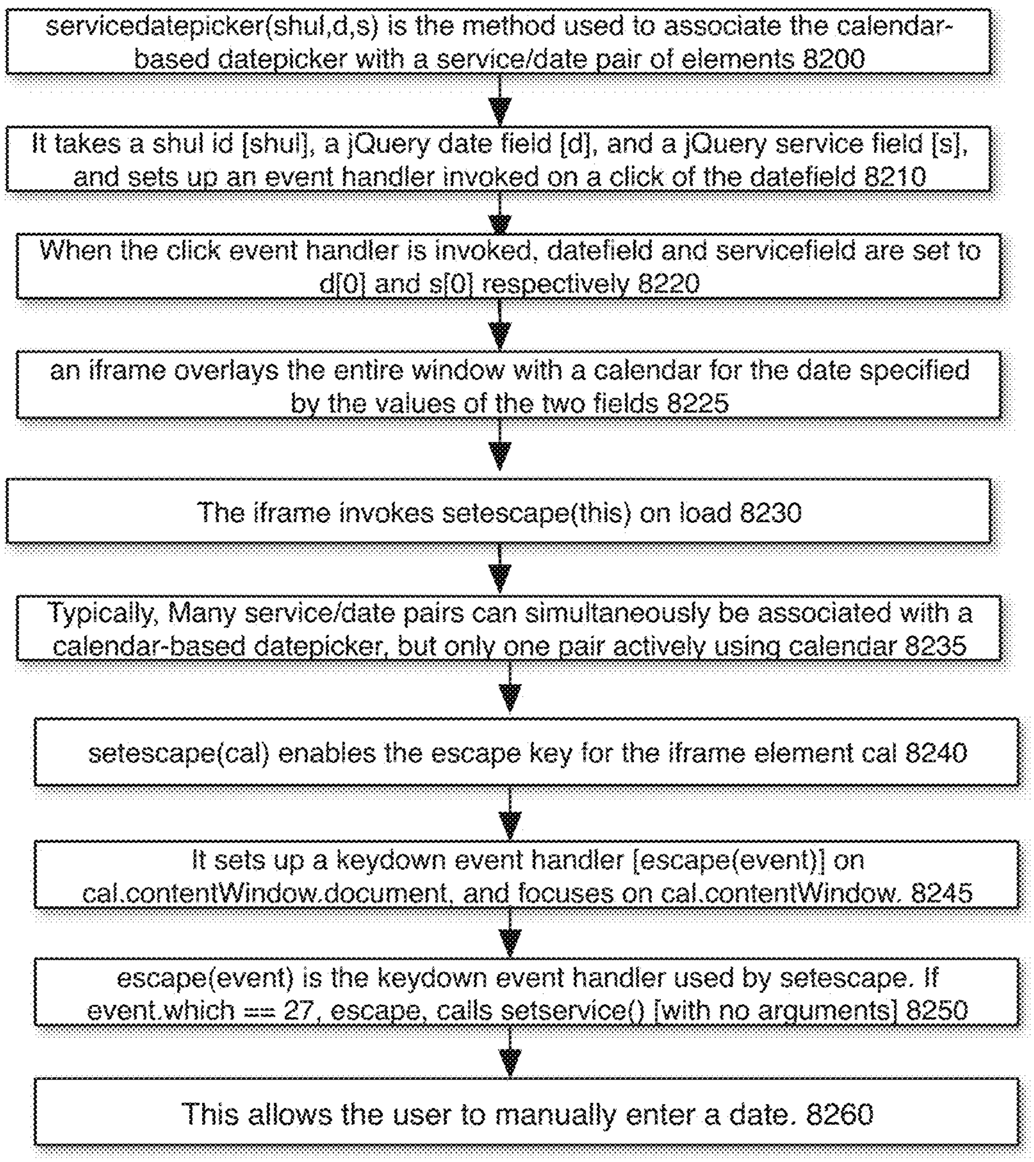
FIG. 81 depicts exemplary embodiment(s) containing exemplary functions.

FIG. 81 depicts exemplary embodiment(s) containing exemplary functions. In step 8200 servicedatepicker(shul, d,s) is the method used to associate the calendar-based datepicker with a service/date pair of elements. In step 8210, It takes a shul id [shul], a jQuery date field [d], and a jQuery service field [s], and sets up an event handler invoked on a click of the datefield. In step 8220, When the click event handler is invoked, datefield and servicefield are set to d[0] and s[0] respectively. In step 8225, an iframe overlays the entire window with a calendar for the date specified by the values of the two fields. In step 8230, The iframe invokes setescape(this) on load. In step 8235, In some embodiments, many service/date pairs can simultaneously be associated with a calendar-based datepicker, but in those embodiments, at most one pair can be actively using the calendar. In step 8240, setescape(cal) enables the escape key for the iframe element cal. In step 8245, It sets up a keydown event handler [escape(event)] on cal.contentWindow.document, and focuses on cal.contentWindow. In step 8250, escape(event) is the keydown event handler used by setescape. If event.which==27, i.e., the escape key was pressed, escape calls setservice( ) [with no arguments]. In step 8260, This allows the user to manually enter a date.

Figure 82:
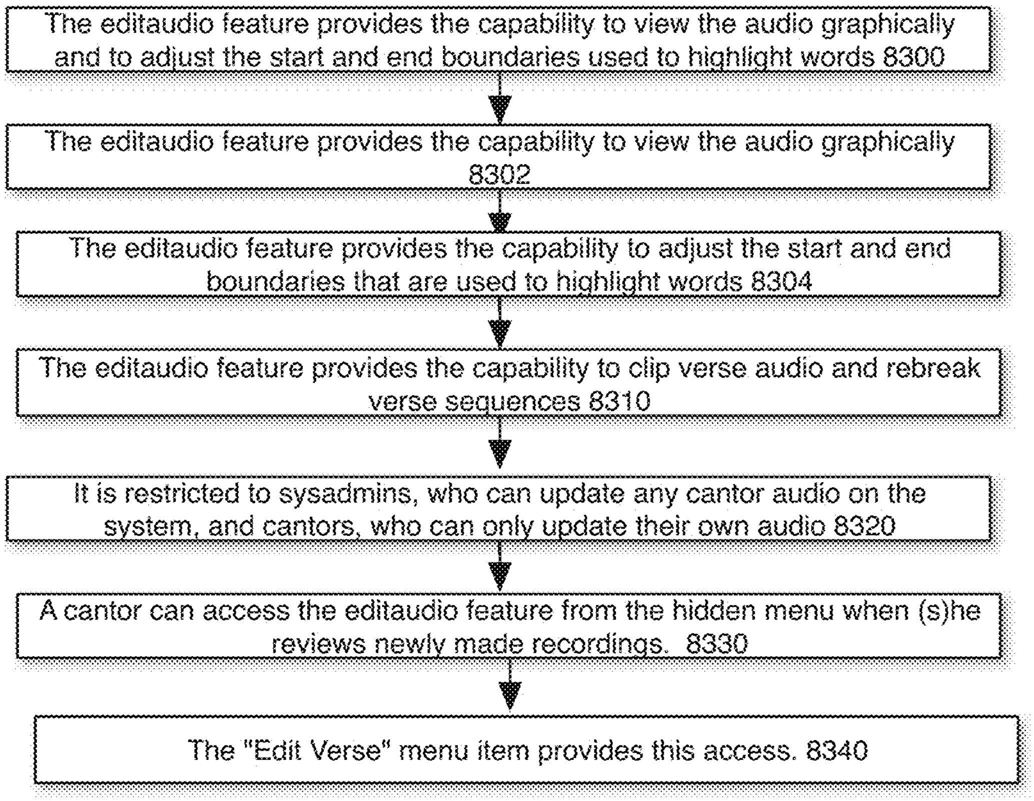
FIG. 82 depicts exemplary embodiment(s) containing exemplary functions.

FIG. 82 depicts exemplary embodiment(s) containing exemplary functions. In step 8300, The editaudio feature provides the capability to view the audio graphically and to adjust the start and end boundaries that are used to highlight words. In step 8302, The editaudio feature provides the capability to view the audio graphically. In step 8304, The editaudio feature provides the capability to adjust the start and end boundaries that are used to highlight words. In step 8310, The editaudio feature provides the capability to clip verse audio and rebreak verse sequences. In step 8320, It is restricted to sysadmins, who can update any cantor audio on the system, and cantors, who can only update their own audio. In step 8330, A cantor can access the editaudio feature from the hidden menu when (s)he reviews newly made recordings In step 8340, The "Edit Verse" menu item provides this access.

Figure 83:
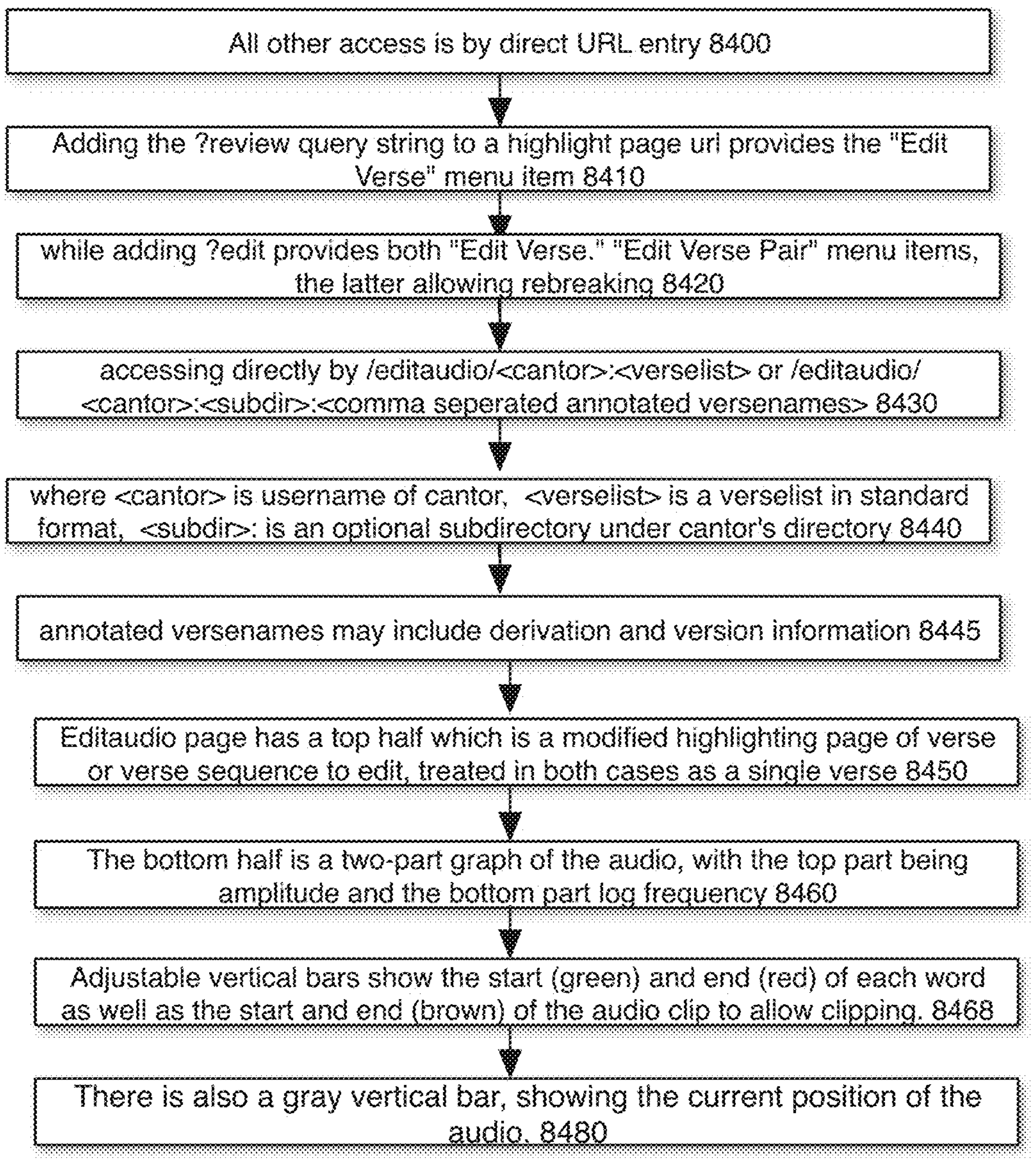
FIG. 83 depicts exemplary embodiment(s) containing exemplary functions.

FIG. 83 depicts exemplary embodiment(s) containing exemplary functions. In step 8400, All other access is by direct URL entry. In step 8410, Adding the ?review query string to a highlight page url provides the "Edit Verse" menu item. In step 8420 while adding ?edit provides both "Edit Verse." "Edit Verse Pair" menu items, the latter allowing rebreaking. In step 8430, accessing directly by /editaudio/ <cantor>:<verselist> or /editaudio/<cantor>:<subdir>: <comma seperated annotated versenames>. In step 8440, where <cantor> is the username of the cantor, <verselist> is a verselist in standard format, <subdir>: is an optional subdirectory under the cantor's directory. In step 8445, annotated versenames may include derivation and version information. In step 8450, The editaudio page has a top half which is a modified highlighting page of the verse or verse sequence to be edited, treated in both cases as a single verse. In step 8460, The bottom half is a two-part graph of the audio, with the top part being amplitude and the bottom part log frequency. In step 8466, Centered between the two parts are the words. In step 8468, Adjustable vertical bars show the start (green) and end (red) of each word as well as the start and end (brown) of the audio clip to allow clipping. In step 8480, There is also a gray vertical bar, showing the current position of the audio.

Figure 84A:
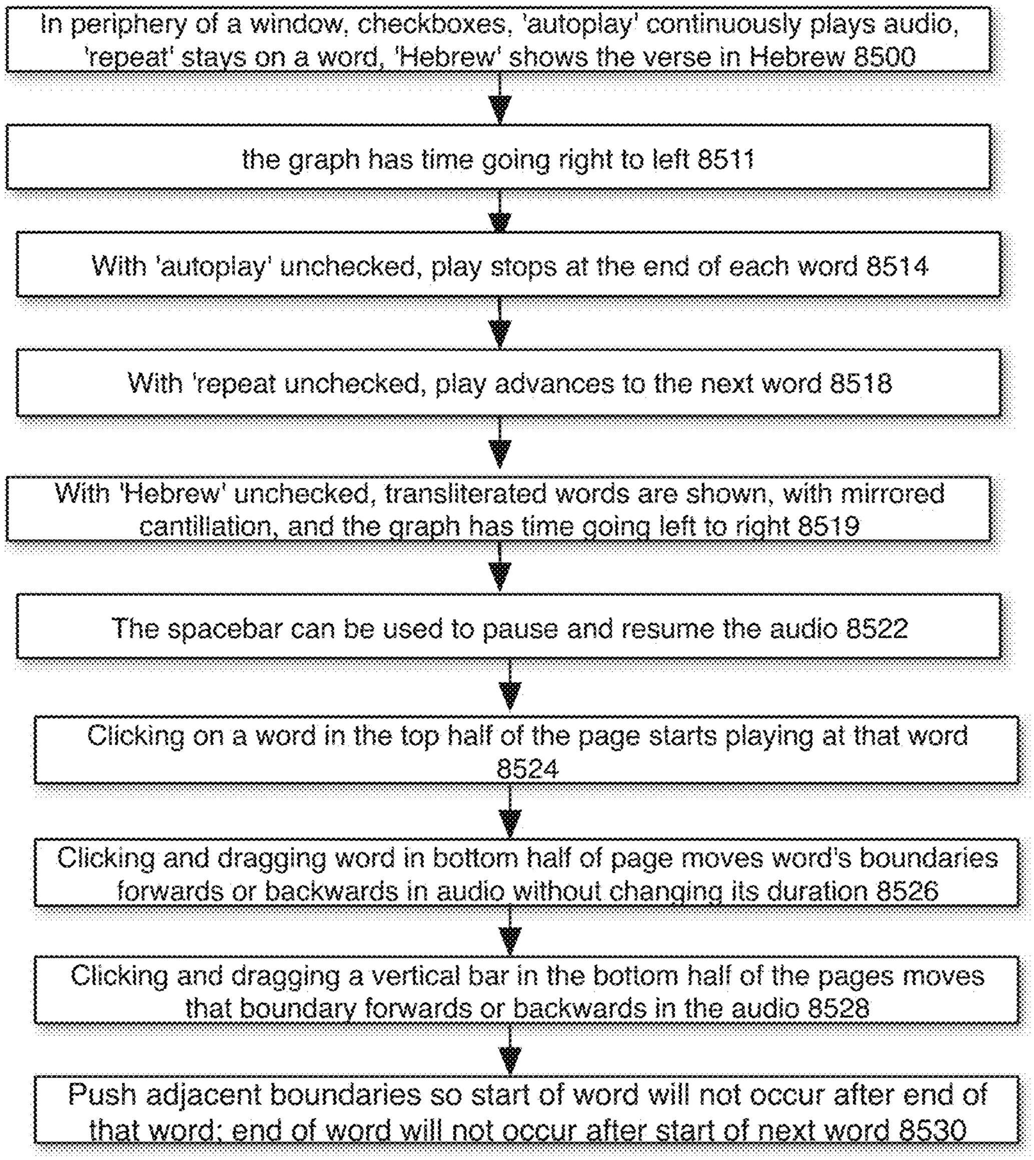
FIGS. 84A and 84B depict exemplary embodiment(s) containing exemplary functions.
Figure 84B:
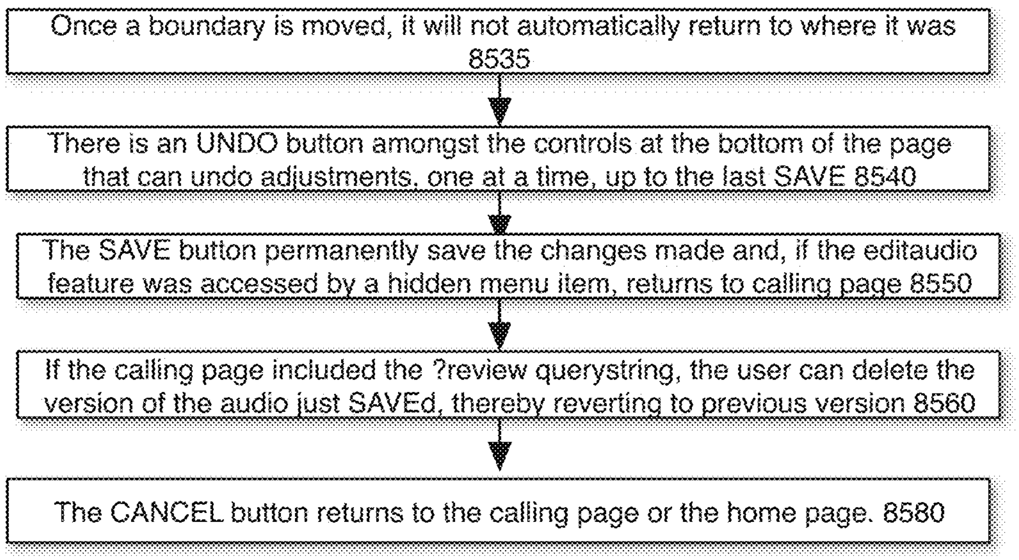

FIGS. 84A and 84B depict exemplary embodiment(s) containing exemplary functions. In step 8500, In periphery of a window, checkboxes similar to those on a normal highlighting page, 'autoplay' continuously plays audio, 'repeat' stays on a word, 'Hebrew' shows the verse in Hebrew. In step 8511, the graph has time going right to left. In step 8514, With 'autoplay' unchecked, play stops at the end of each word. In step 8518, With 'repeat' unchecked, play advances to the next word. In step 8519, With 'Hebrew' unchecked, transliterated words are shown, with mirrored cantillation, and the graph has time going left to right. User interaction. In step 8522, The spacebar can be used to pause and resume the audio. In step 8524, Clicking on a word in the top half of the page starts playing at that word. In step 8526, Clicking and dragging a word in the bottom half of the page moves the word's boundaries forwards or backwards in the audio without changing its duration. In step 8528, Clicking and dragging a vertical bar in the bottom half of the pages moves that boundary forwards or backwards in the audio. In step 8530, Either of these adjustments may push adjacent boundaries, since the start of a word cannot occur after the end of that word and the end of a word cannot occur after the start of the next word. In step 8535, Once a boundary is moved, it will not automatically return to where it was. In step 8540, There is an UNDO button amongst the controls at the bottom of the page that can undo adjustments, one at a time, up to the last SAVE. In step 8550, The SAVE button permanently save the changes made and, if the editaudio feature was accessed by a hidden menu item, returns to the calling page. In step 8560, If the calling page included the ?review querystring, the user can delete the version of the audio just SAVEd, thereby reverting to the previous version. In step 8580, The CANCEL button returns to the calling page or the home page.

Figure 85:
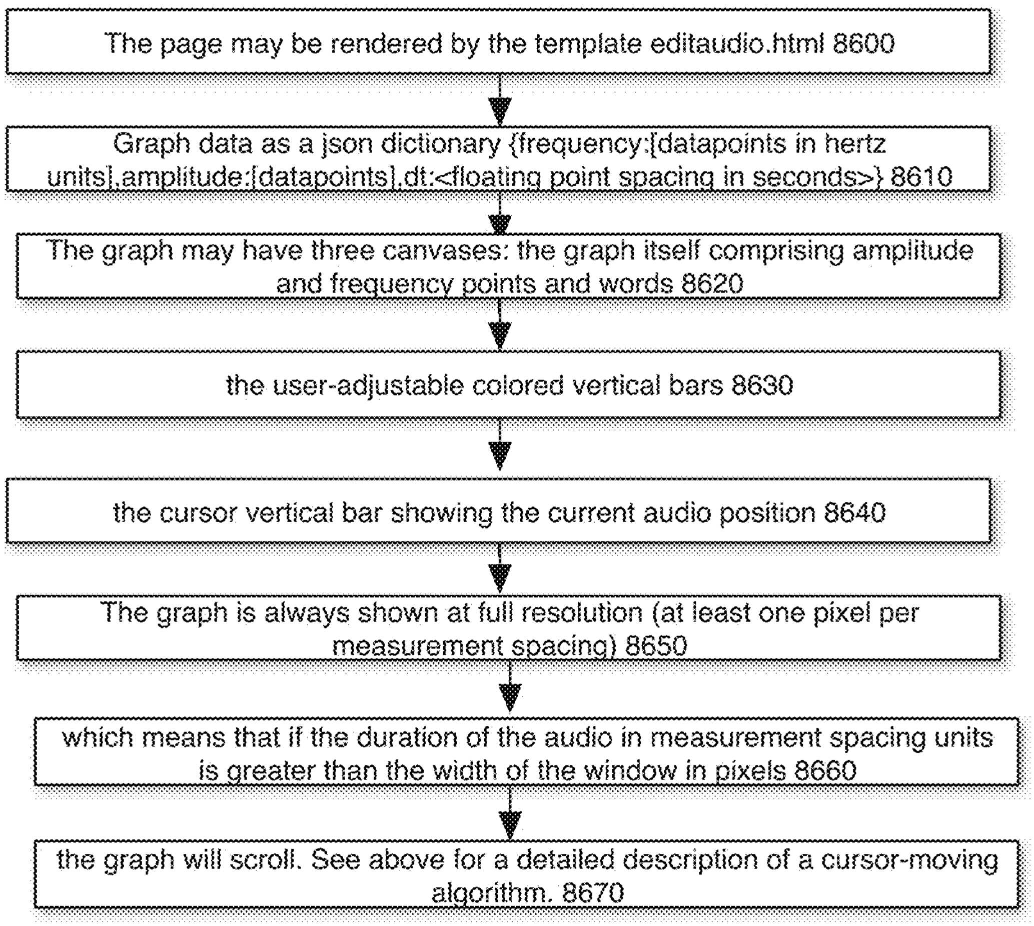
FIG. 85 depicts exemplary embodiment(s) containing exemplary implementation details.

FIG. 85 depicts exemplary embodiment(s) containing exemplary implementation details. In step 8600, The page may be rendered by the template editaudio.html. In step 8610, Graph data as a j son dictionary {frequency:[datapoints in hertz units],amplitude:[datapoints in arbitrary units],dt:<floating point measurement spacing in seconds, currently 0.0125>}. In step 8620, The graph may have three canvases: the graph itself comprising amplitude and frequency points and words; In step 8630, the user-adjustable colored vertical bars; and In step 8640, the cursor vertical bar showing the current audio position. In step 8650, The graph is shown at full resolution (at least one pixel per measurement spacing). In step 8660, which means that if the duration of the audio in measurement spacing units is greater than the width of the window in pixels, In step 8670, the graph will scroll. See above for a detailed description of a cursor-moving algorithm.

Figure 86:
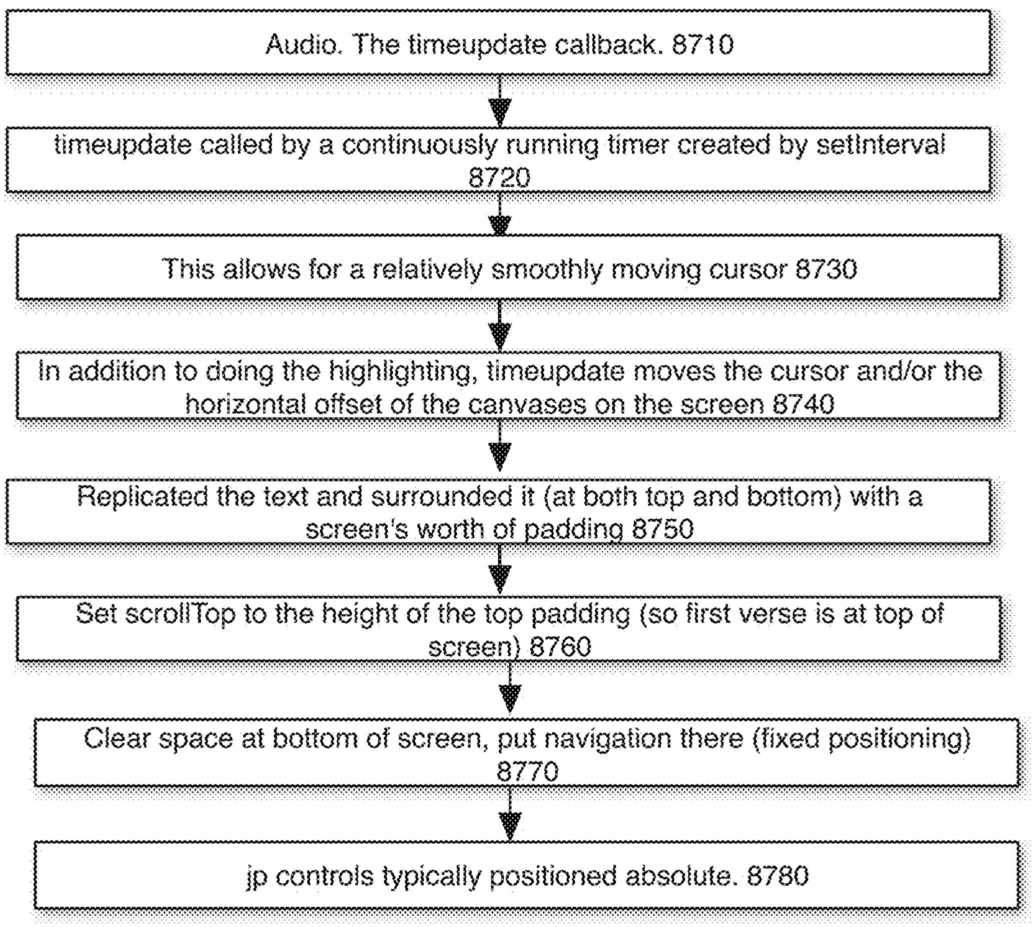
FIG. 86 depicts exemplary embodiment(s) containing exemplary functions.

FIG. 86 depicts exemplary embodiment(s) containing exemplary functions. In step 8710, Audio. The timeupdate callback. In step 8720, timeupdate is called by a continuously running timer created by setInterval. In step 8730, This allows for a relatively smoothly moving cursor. In step 8740, In addition to doing the highlighting, timeupdate moves the cursor and/or the horizontal offset of the canvases on the screen. In step 8750, Replicated the text and surrounded it (at both top and bottom) with a screen's worth of padding. In step 8760, Set scrollTop to the height of the top padding (so first verse is at top of screen). In step 8770, Clear space at bottom of screen, put navigation there (fixed positioning). In step 8780, jp controls typically positioned absolute.

Figure 87:
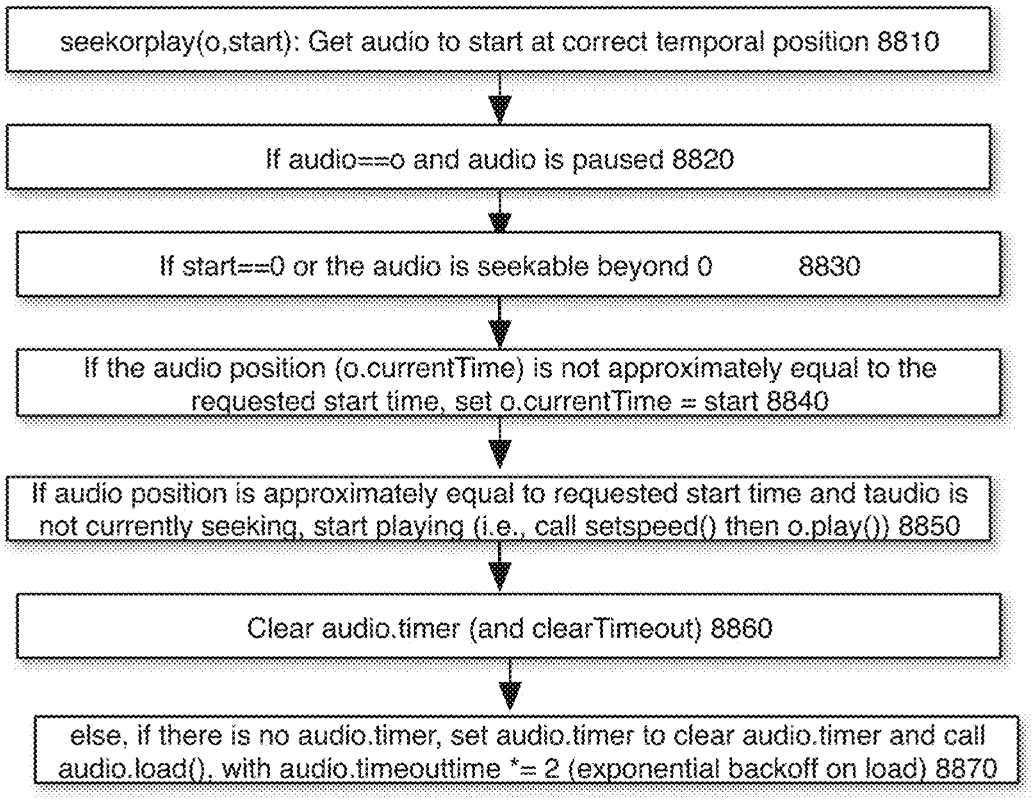
FIG. 87 depicts exemplary embodiment(s) containing exemplary functions.

FIG. 87 depicts exemplary embodiment(s) containing exemplary functions. In step 8810, seekorplay(o,start): Get audio to start at correct temporal position. In step 8820, If audio==o and audio is paused. In step 8830, If start==0 or the audio is seekable beyond 0. In step 8840, If the audio position (o.currentTime) is not approximately equal to the requested start time, set o.currentTime=start. In step 8850, If the audio position is approximately equal to the requested start time and the audio is not currently seeking, start playing (i.e., call setspeed( ) then o.play( )). In step 8860, Clear audio.timer (and clearTimeout). In step 8870, else, if there is no audio.timer, set audio.timer to clear audio.timer and call audio.load( ) with audio.timeouttime*=2 (exponential backoff on attempting load).

---

Figure 88A:
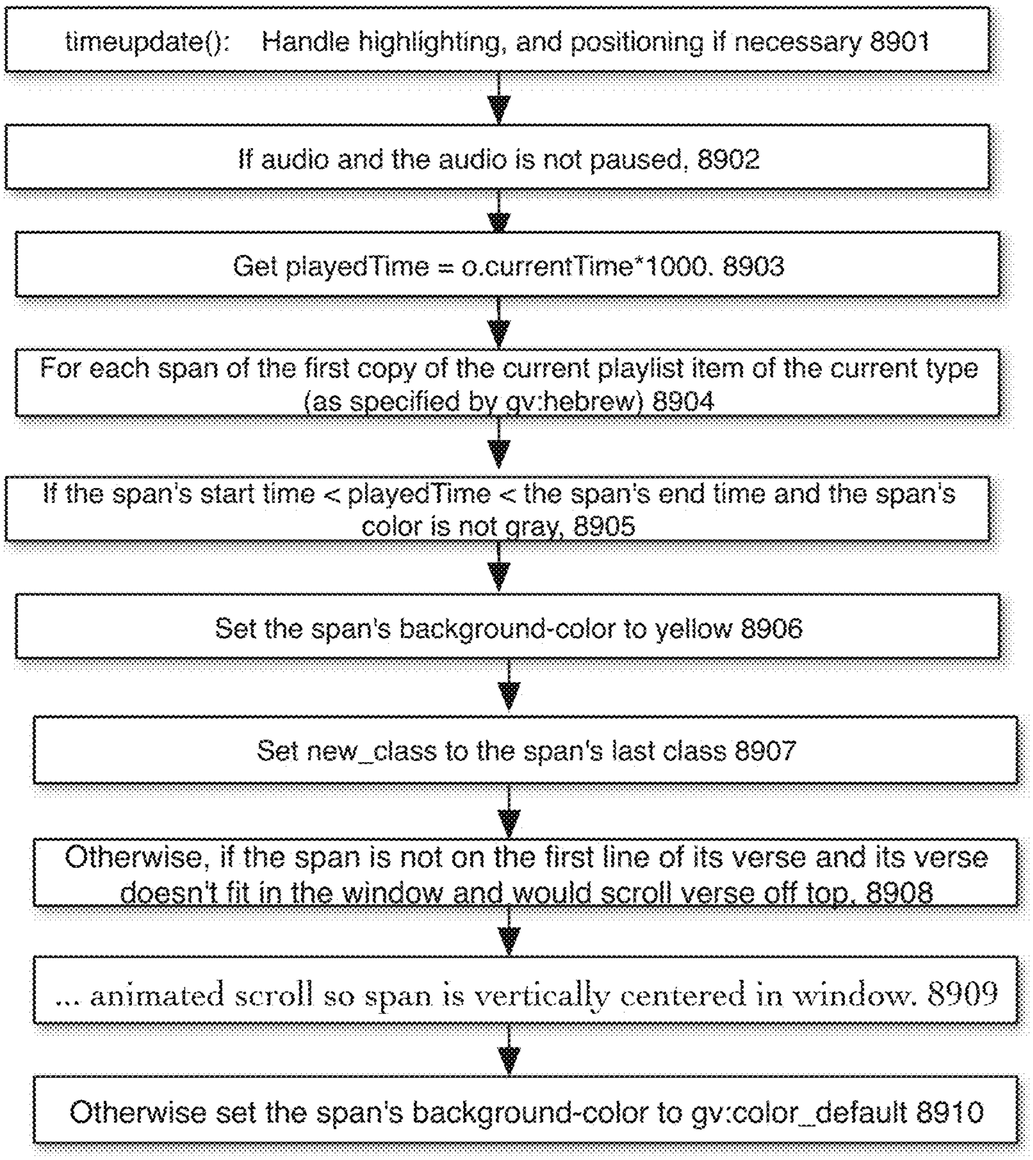
FIGS. 88A-88C depict exemplary embodiment(s) containing exemplary functions.
Figure 88B:
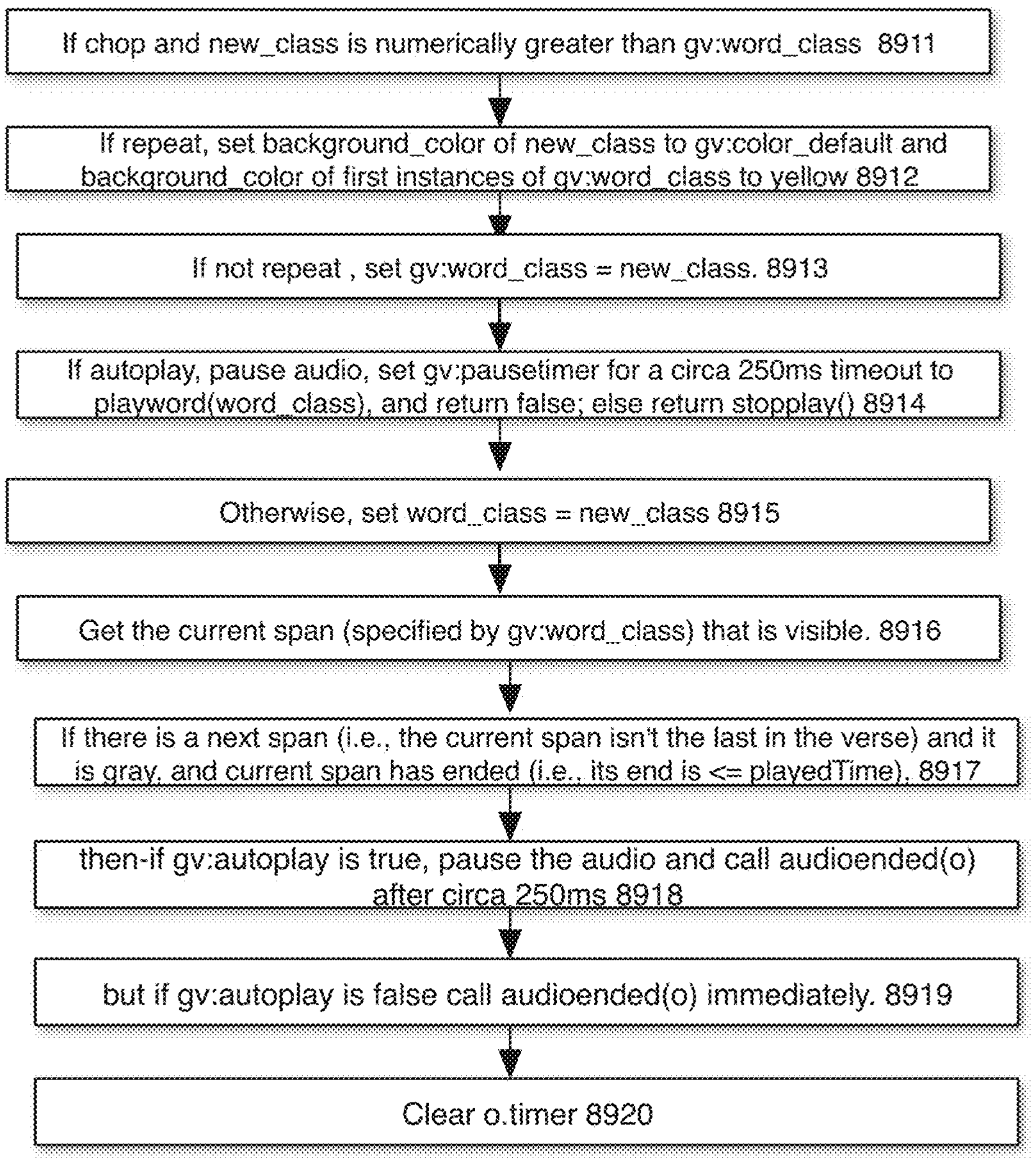
Figure 88C:
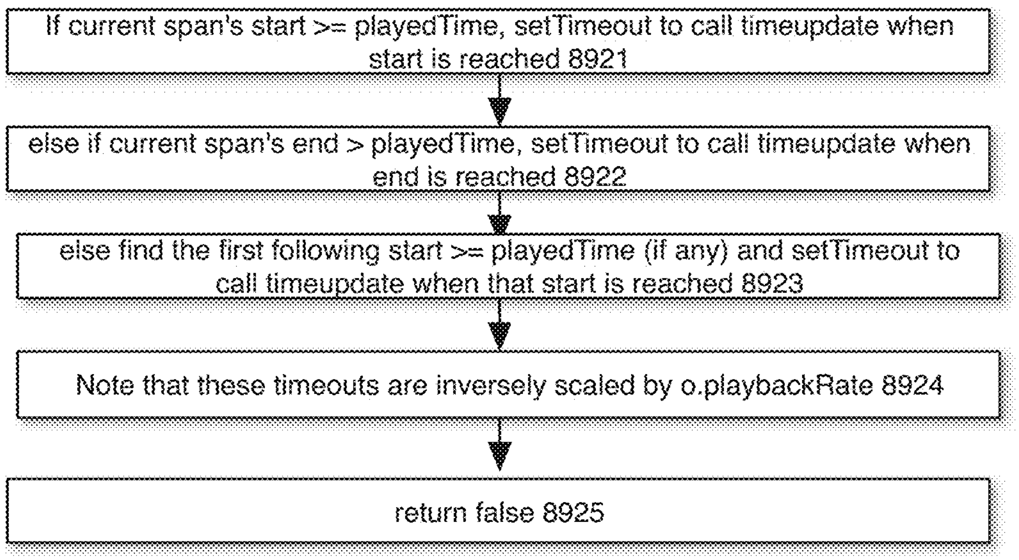

FIGS. 88A-88C depict exemplary embodiment(s) containing exemplary functions with sequential numbering found in those figures substantially corresponding to the following.
timeupdate( ): Handle highlighting, and positioning if necessary (8901)
If audio and the audio is not paused, (8902)
Get playedTime = o.currentTime*1000. (8903)
For each span of the first copy of the current playlist item of the current type (as specified by gv:hebrew), (8904)
If the span's start time < playedTime < the span's end time and the span's color is not gray, (8905)
Set the span's background-color to yellow (8906)
Set new_class to the span's last class (8907)
If the span is completely off screen, vertically center it in the window.
Otherwise, if the span is not on the first line of its verse and its verse doesn't fit in the window (8908) and would scroll verse off top, animated scroll so the span is vertically centered in the window. (8909)
Otherwise set the span's background-color to gv:color_default. (8910)
If chop and new_class is numerically greater than gv:word_class, (8911)
If repeat, set background_color of new_class to gv:color_default and background_color of first instances of gv:word_class to yellow; (8912)
If not repeat, set gv:word_class = new_class. (8913)
If autoplay, pause audio, set gv:pausetimer for a circa 250ms timeout to playword(word_class), and return false; else return stopplay( ). (8914)
Otherwise, set word_class = new_class. (8915)
Get the current span (specified by gv:word_class) that is visible. (8916)
If there is a next span (i.e., the current span isn't the last in the verse) and it is gray, and the current span has ended (i.e., its end is <= playedTime), then-if gv:autoplay is true, pause the audio and call audioended(o) after circa 250ms, but if gv:autoplay is false call audioended(o) immediately. (8917-9)
Clear o.timer. (8920)
If current span's start >= playedTime, setTimeout to call timeupdate when start is reached; (8921)
else if current span's end > playedTime, setTimeout to call timeupdate when end is reached; (8922)
else find the first following start >= playedTime (if any) and setTimeout to call timeupdate when that start is reached. (8923) [Note that these timeouts are inversely scaled by o.playbackRate](8924)
return false. (8925)

---

Figure 89A:
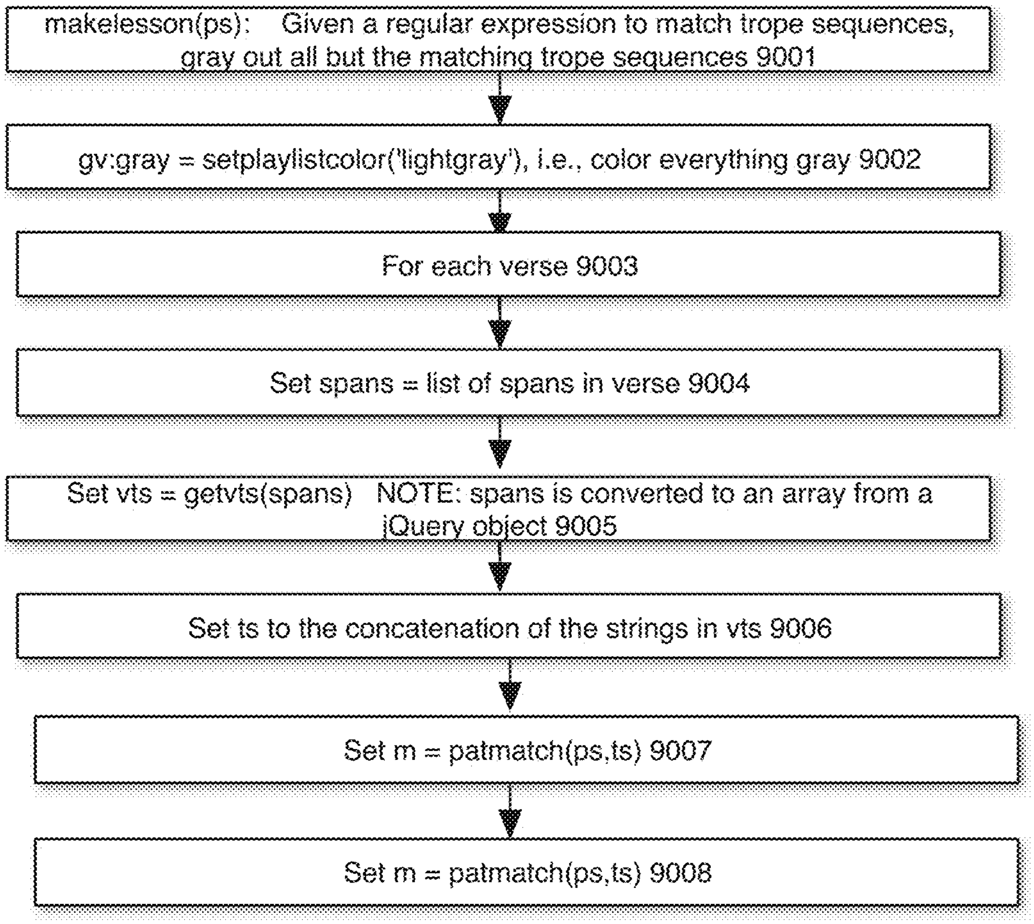
FIGS. 89A and 89B depict exemplary embodiment(s) containing exemplary functions.
Figure 89B:
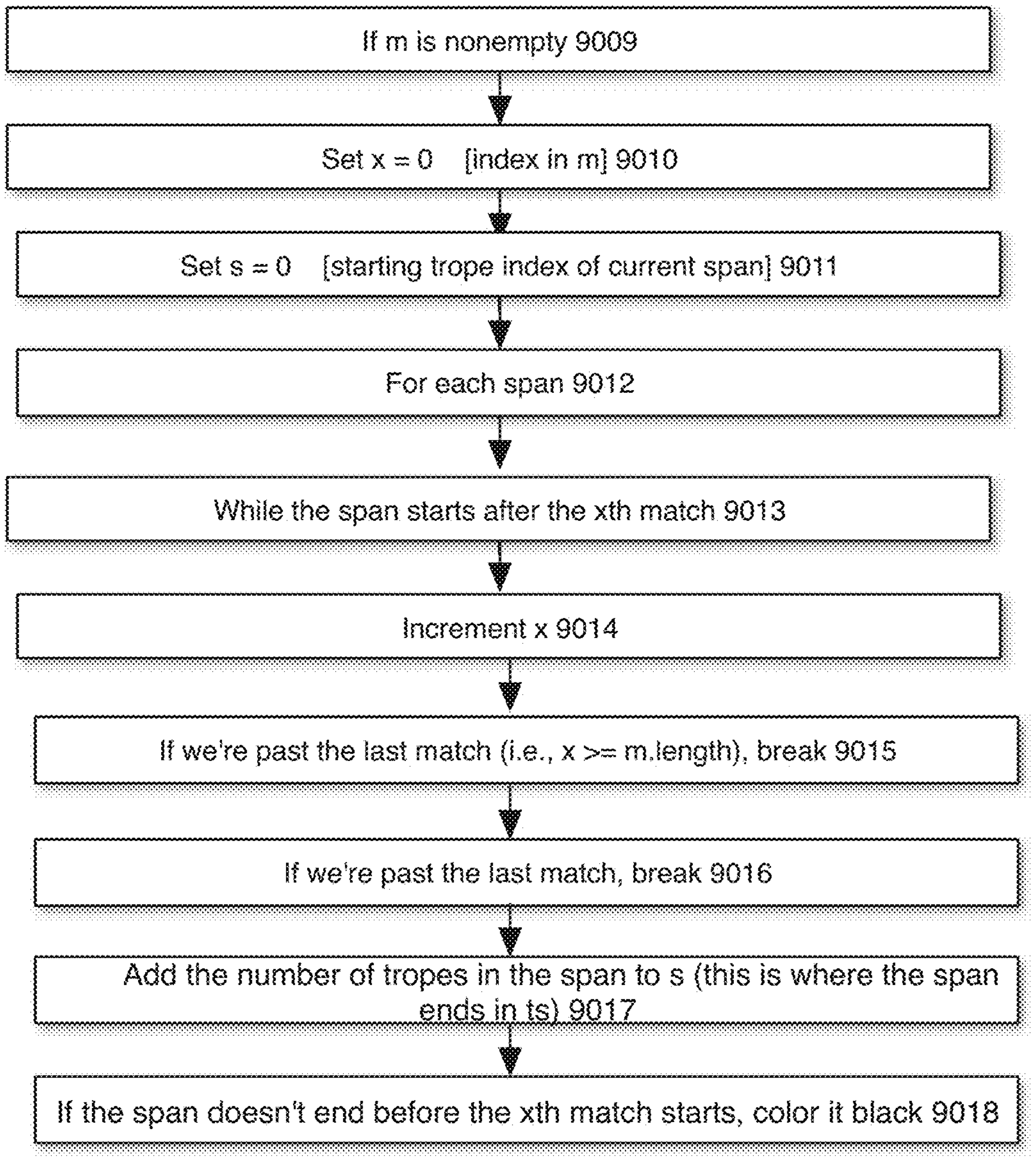
Figure 90A:
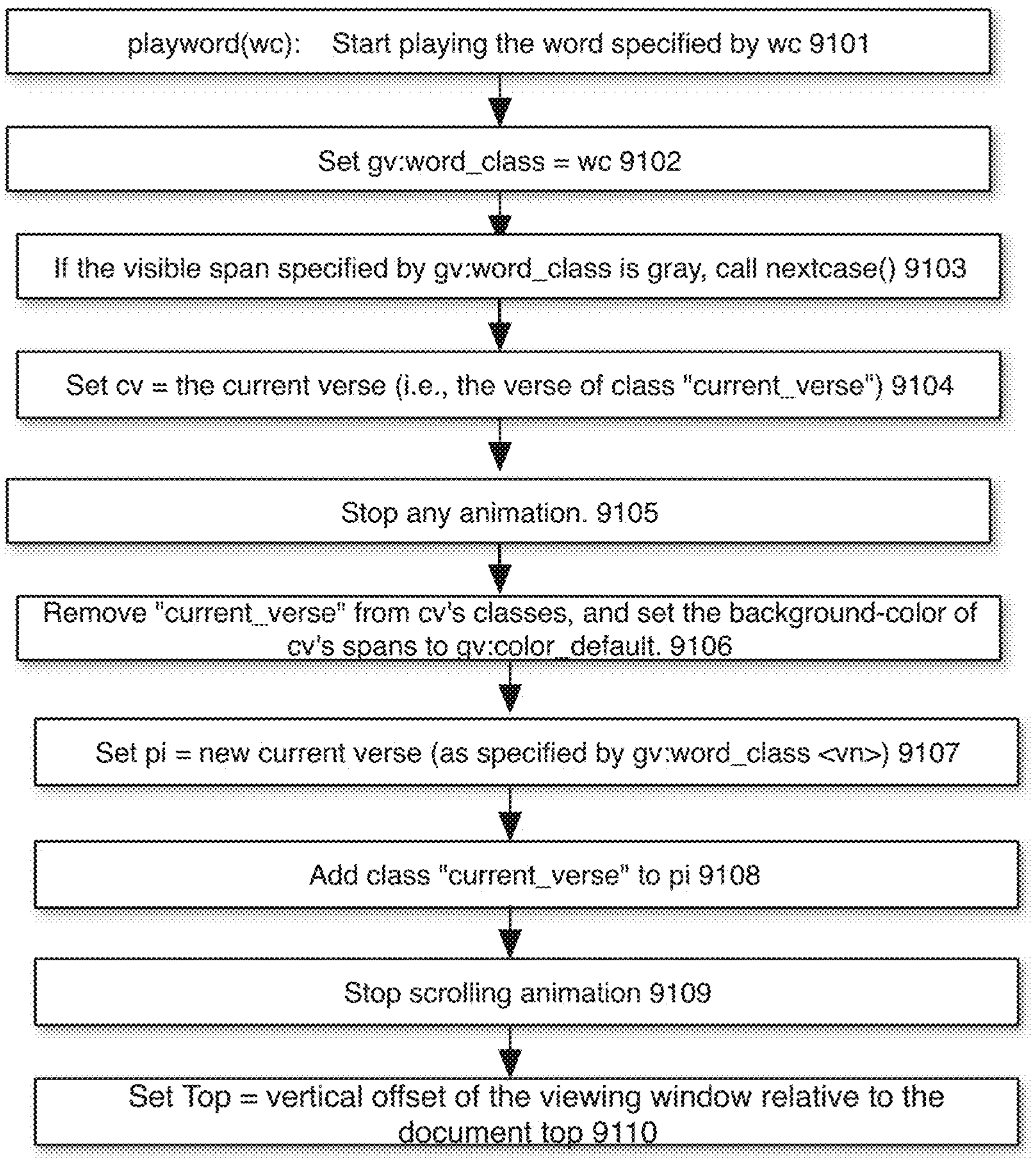
FIGS. 90A-90D depict exemplary embodiment(s) containing exemplary functions.
Figure 90B:
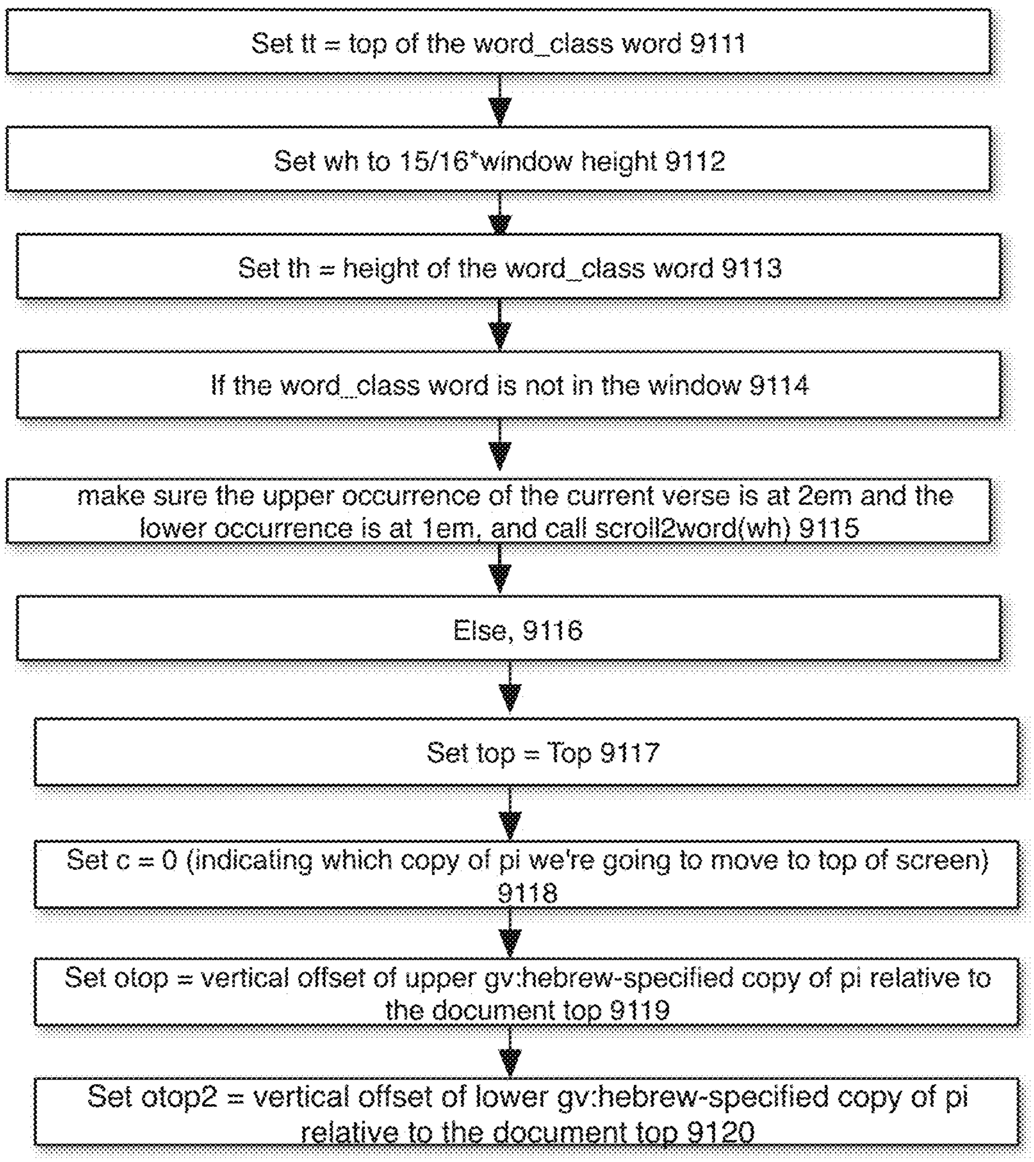
Figure 90C:
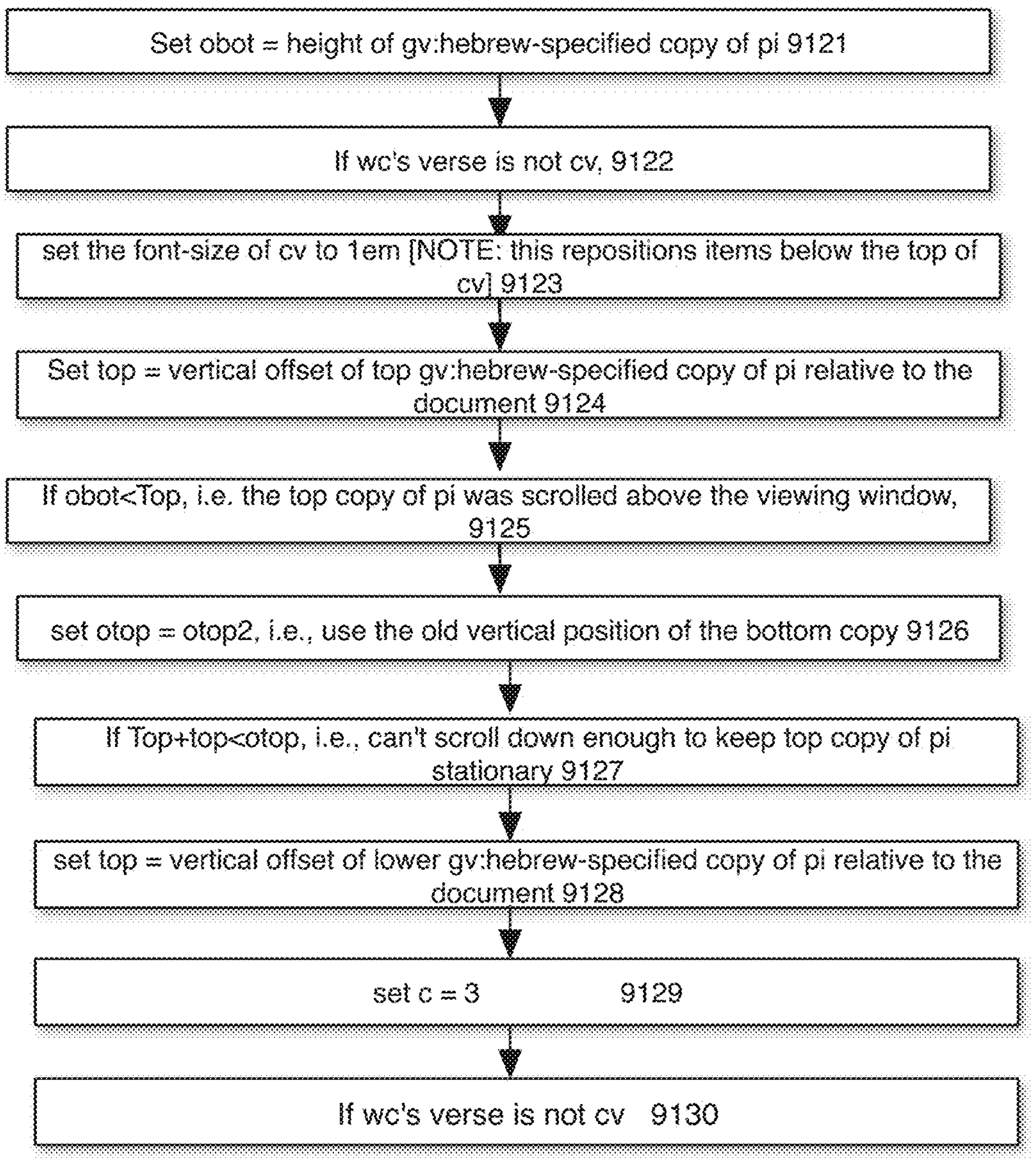
Figure 90D:
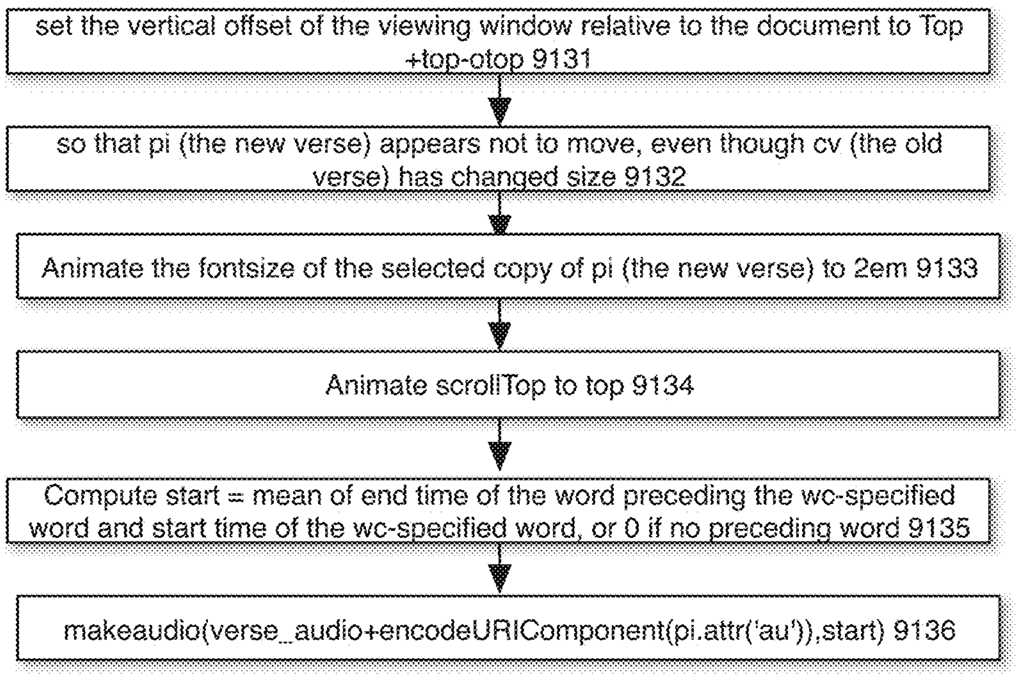

FIGS. 89A and 89B depict exemplary embodiment(s) containing exemplary functions with sequential numbering found in those figures substantially corresponding to the following.
makelesson(ps): Given a regular expression to match trope sequences, gray out all but the matching trope sequences (9001)
gv:gray = setplaylistcolor('lightgray'), i.e., color everything gray (9002)
For each verse, (9003)
Set spans = list of spans in verse (9004)
Set vts = getvts(spans) NOTE: spans is converted to an array from a jQuery object (9005)
Set ts to the concatenation of the strings in vts (9006)
Set m = patmatch(ps,ts) (9007)
If m is nonempty, (9009)
Set x = 0 [index in m] (9010)
Sets = 0 [starting trope index of current span] (9011)
For each span, (9012)
While the span starts after the xth match (9013)
Increment x (9014)
If we're past the last match (i.e., x >= m.length), break (9015)
If we're past the last match, break (9016)
Add the number of tropes in the span to s (this is where the span ends in ts) (9017)
If the span doesn't end before the xth match starts, color it black (9018)

---

FIGS. 90A-90D depict exemplary embodiment(s) containing exemplary functions with sequential numbering found in those figures substantially corresponding to the following.
playword(wc): Start playing the word specified by wc (9101)
Set gv:word_class = wc (9102)
If the visible span specified by gv:word_class is gray, call nextcase( ) (9103)
Set cv = the current verse (i.e., the verse of class "current verse") (9104)
Stop any animation. (9105)
Remove "current_verse" from cv's classes, and set the background-color of cv's spans to gv:color_default. (9106)

-continued

```
    Set pi = new current verse (as specified by gv:word_class <vn >) (9107)
    Add class "current_verse" to pi (9108)
    Stop scrolling animation (9109)
    Set Top = vertical offset of the viewing window relative to the document top (9110)
    Set tt = top of the word_class word (9111)
    Set wh to 15/16*window height (9112)
    Set th = height of the word_class word (9113)
    If the word_class word is not in the window, (9114)
      make sure the upper occurrence of the current verse is at 2em and the lower occurrence is at 1em, and
  call scroll2word(wh) (9115)
    Else, (9116)
      Set top = Top (9117)
      Set c = 0 (indicating which copy of pi we're going to move to top of screen) (9118)
      Set otop = vertical offset of upper gv:hebrew-specified copy of pi relative to the document top (9119)
      Set otop2 = vertical offset of lower gv:hebrew-specified copy of pi relative to the document top (9120)
      Set obot = height of gv:hebrew-specified copy of pi (9121)
      If wc's verse is not cv, (9122)
        set the font-size of cv to 1em [NOTE: this repositions items below the top of cv] (9123)
      Set top = vertical offset of top gv:hebrew-specified copy of pi relative to the document (9124)
      If obot<Top, i.e. the top copy of pi was scrolled above the viewing window, (9125)
        set otop = otop2, i.e., use the old vertical position of the bottom copy (9126)
      If Top+top<otop, i.e., can't scroll down enough to keep top copy of pi stationary (9127)
        set top = vertical offset of lower gv:hebrew-specified copy of pi relative to the document (9128)
        set c = 3 (9129)
      If wc's verse is not cv, (9130)
        set the vertical offset of the viewing window relative to the document to Top+top−otop (9131)
      so that pi (the new verse) appears not to move, even though cv (the old verse) has changed size (9132)
      Animate the fontsize of the selected copy of pi (the new verse) to 2em (9133)
      Animate scrollTop to top (9134)
    Compute start = mean of the end time of the word preceding the wc-specified word and the start time of
  the wc-specified word, or 0 if no preceding word; (9135)
    note that start and end times are in millisecond units and so be divided by 1000 to convert to second
  units.
    makeaudio(verse_audio+encodeURIComponent(pi.attr('au')),start) (9136)
```

FIGS. 91-135 depict exemplary embodiment(s) containing exemplary explanations written to potential users of such embodiments. Many other embodiments are possible, these are exemplary.

Figure 91:
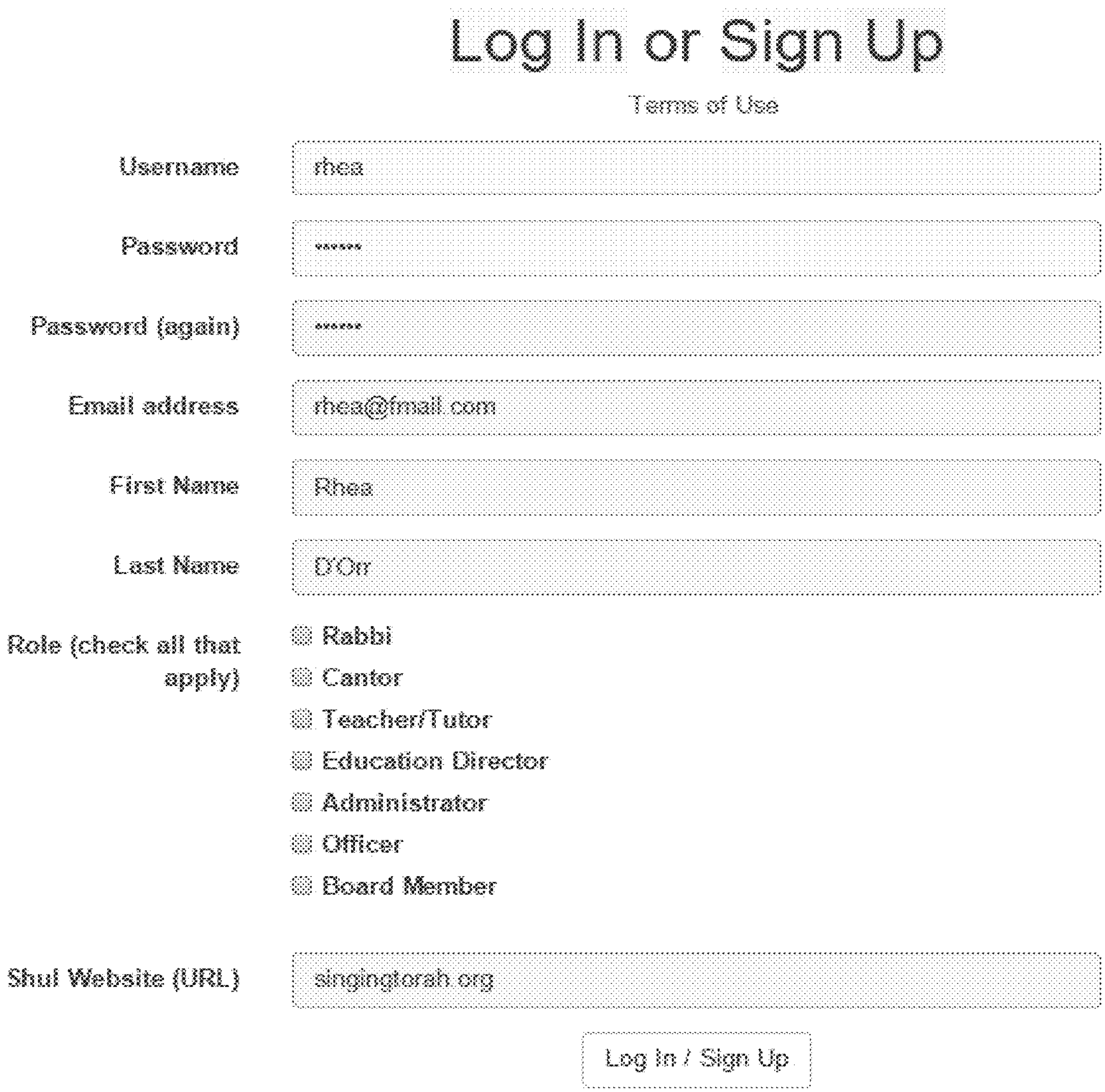

In FIG. 91, a cantor or rabbi may enter their email and shul URL. An email at the Shul URL can enable an embodiment of the computerized language instruction system to determine what shul that cantor or rabbi belongs to.

In FIG. 92, in step 10010, prompting a user with a current default Shul and associated branch, dialect, cycle and tradition. In step 10020, prompting a user to select a different Shul from a list of Shuls on this platform. Preferably, prompting user to specify its associated branch, dialect, cycle, tradition, and geographic location. Based on a clergy email gathered in FIG. 91 that corresponds to the URL of the Shul, information fields shown in steps 10010 and 10020 can enable automatically filed, and thus the correspondence between date and Jewish liturgical readings can be determined. Prompting a user with a previously chosen shul as a default, and its properties typically may be default criteria. Prompting a user to select a different shuls and to specify its properties.

Prompting user to select a shul and find a shul service based on certain criteria (or properties) such as associated branch, dialect, cycle, tradition, and geographic location.

A user may click Find Shul Service. A user can select a shul based on certain criteria.

In step 10030, prompting a user to enter a date in either Gregorian or Hebrew date formats as illustrated in that figure.

In FIG. 93, presenting a calender of a plurality of Jewish liturgical readings of Torah, Haftorah, and/or Five Scrolls in accordance with the dates and time slots for which the plurality of Jewish liturgical readings can be accessed by a user. Presenting an upcoming service and enabling user to sign up to read.

Presenting a calendar of upcoming services appropriate to the synagogue selected.

Enabling seeing the readings for that service. Enabling user to return to the calendar by clicking the date on the Readings page). User claiming an available reading by clicking the Claim button if the gabbai has opened the service for reading.

Exemplary embodiments may provide that If the user has been preapproved by the gabbai, the reading's status typically may be Claimed, but otherwise it typically may be Pending, i.e., waiting for the gabbai's approval.

Exemplary embodiments may provide whether or not a user chose to claim a reading, a user can see the text for a reading by clicking in the Verses column. In those embodiments, this brings a user to the Handout Page for that reading.

In exemplary embodiments, once the user has claimed a reading, a user typically may have a Reader menu where a user can select a Shul from those for which the user has claimed readings or whose gabbai has preapproved a user.

In exemplary embodiments, on the Reader menu, a user can a user may click Calendar to see the readings calendar for of the user selected shul. Also on the Reader menu, a user can may click My Readings to see a list of of the user claimed readings in chronological order.

In FIG. 94, enabling a user to enter a Gregorian date in the left corner date field (with a rectangle around it) to invoke the calendar display of the previous figure with the Gregorian date as its start date. By clicking on the top Hebrew date on right hand side, the calendar may be set using that date format.

Enabling a user to see additional dates, by clicking < or > to display the previous or next calendar portion, or enabling a user to click on a Gregorian or Jewish date that labels each week for a calendar starting then, or enabling a user to click on the first Gregorian date to enter an arbitrary Gregorian or Jewish date for a calendar starting then.

Exemplary embodiments support a user providing the date in a wide variety of formats, but in an exemplary embodiment, the month is specified alphabetically. Day and year can be specified numerically. In an exemplary embodiment, month names are case insensitive and are recognized by the first two letters unless one additional letter is required for disambiguation (e.g., June July). Adar is a special case: if a letter sequence starts with AD or AI, then if it doesn't end in I it specifies Adar (II) or Adar I, respectively; if it ends in II it specifies Adar (II); otherwise it specifies Adar I; we make no distinction between Adar and Adar II. Examples of legitimate and illegitimate date inputs can be seen in FIG. 92.

Exemplary embodiments provide "Listen to This Week's Torah Reading" enabling a user to select the Exemplary embodiments. Highlight Page of the first upcoming shabbat or holiday, based on of the user selected shul's schedule.

Figure 95:
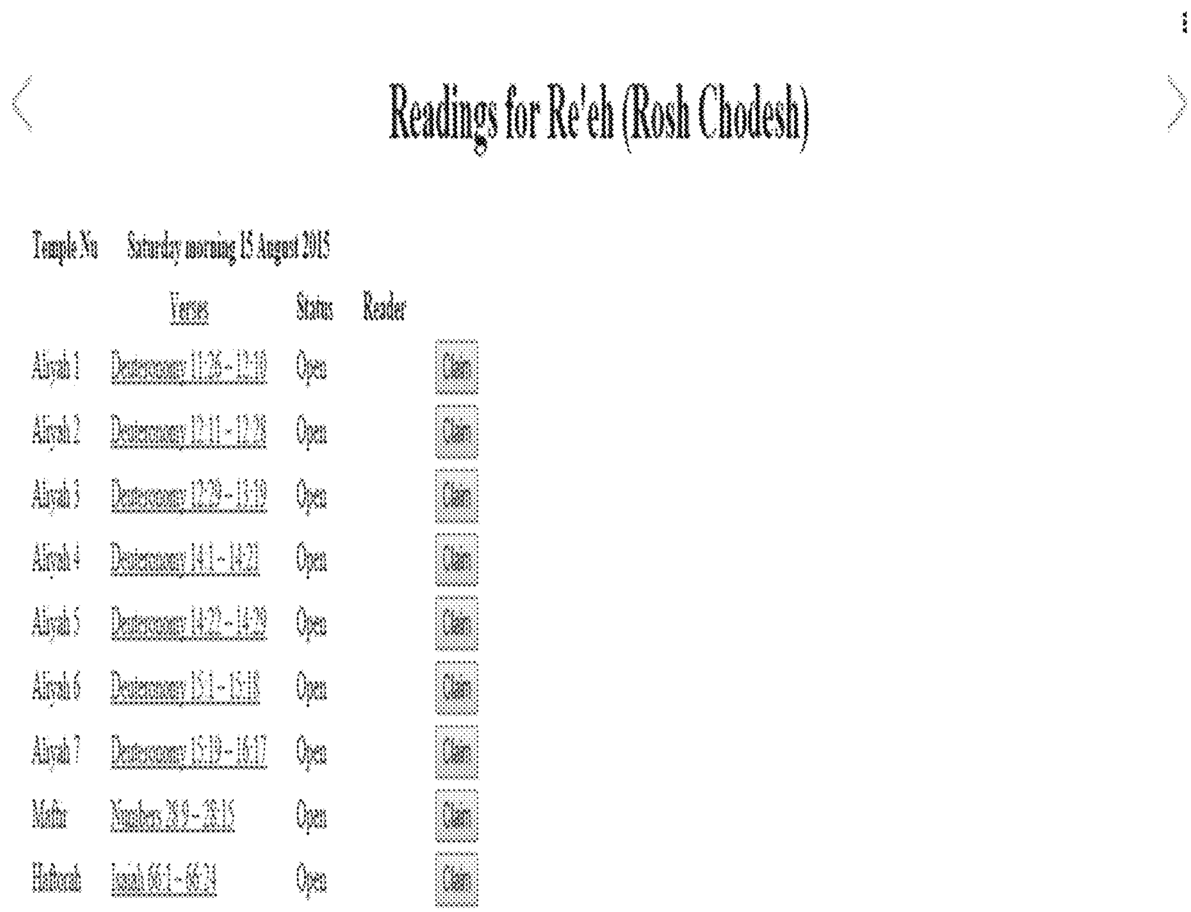

In FIG. 95, enabling a user to claim a Torah or Haftorah reading for a date selected in the previous described FIGS. 93-94. It shows the status of open readings and names of those who claimed them.

In FIG. 96, showing that a user has claimed Maftir with a pending request for Gabbai approval, enabling the user to optionally withdraw, and enabling Gabbai to approve said pending request.

Figure 97:
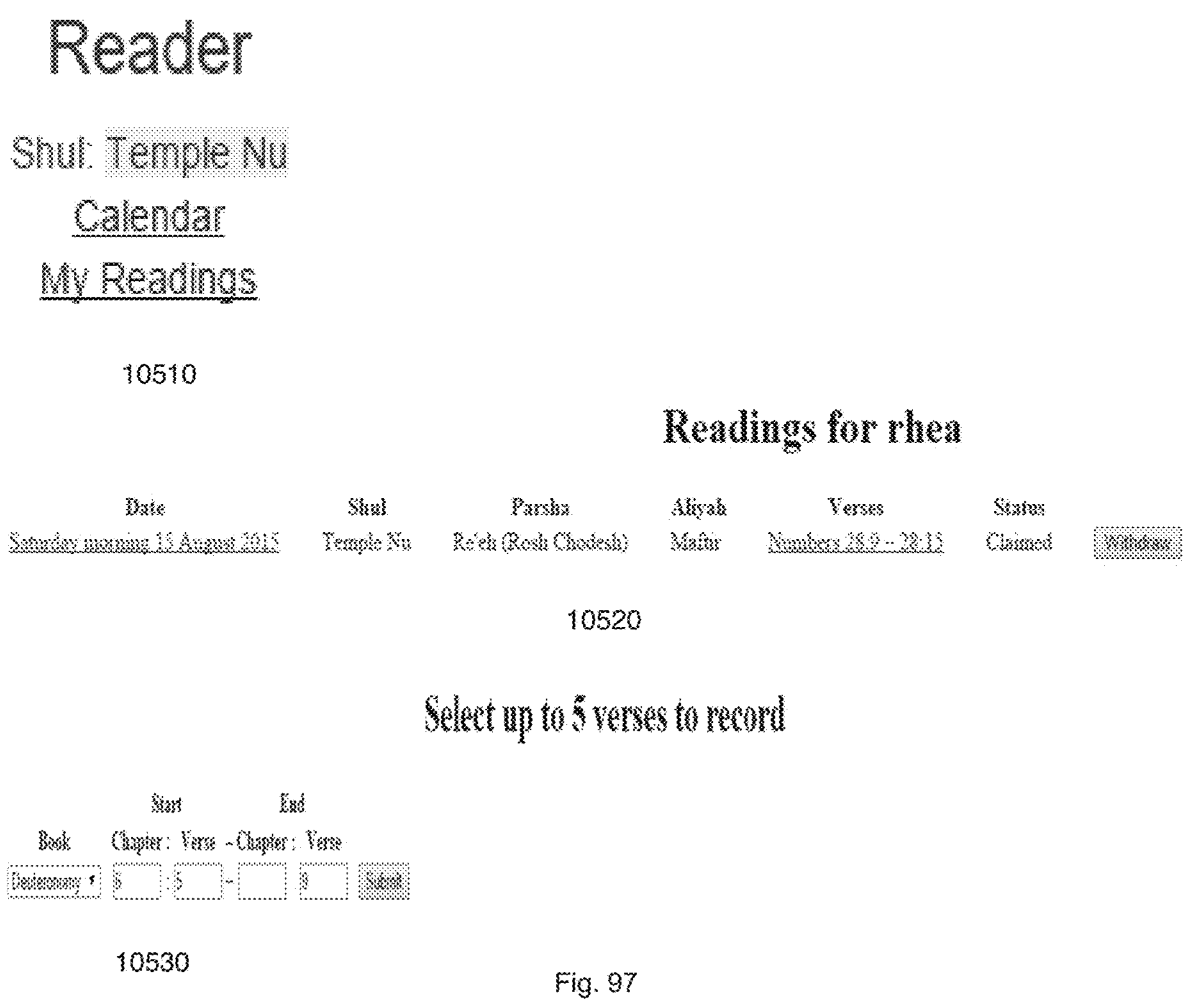

In FIG. 97, in step 10510, enabling a reader to navigate to a Jewish liturgical calendar to claim, and/or optionally withdraw from, readings through a calendar functionality. Further, displaying a plurality of readings claimed by the reader.

In step 10520, displaying said plurality of readings claimed by the reader.

In step 10530, providing selection of up to five verses to record as part of a cantor demonstration.

Exemplary embodiments may include the ability to try recording demo. For example, for user to read a few verses and have the system create a Exemplary embodiments. Highlight Page with of the user voice, a user may click on Cantor Recording Demo. a user typically may be asked to select verses to record. Once a user submits choice, a user typically may see a page with instructions for completing the demo.

Figure 98:
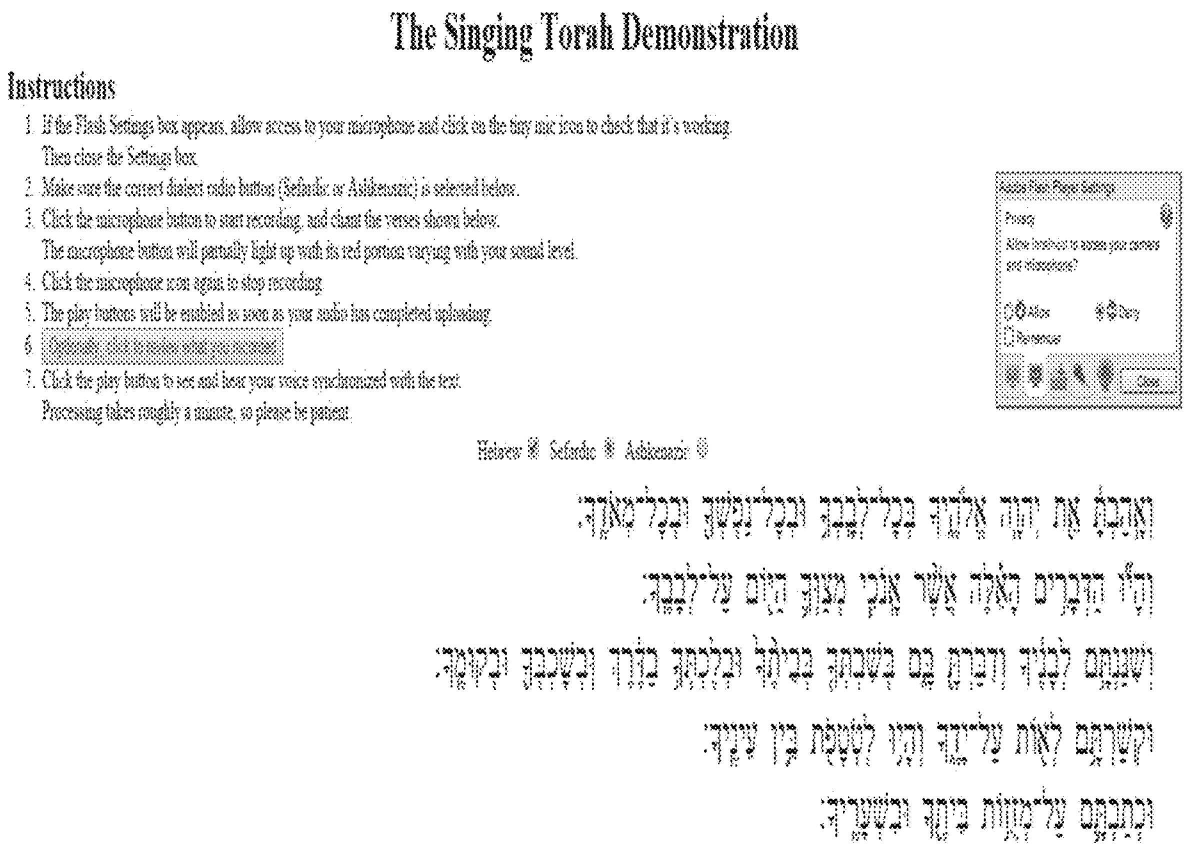

In FIG. 98, providing a cantor with ability to record (up to) five verses of Hebrew Bible, and then synchronizing the cantor's voice with the underlying Hebrew Bible text automatically.

Figure 99:
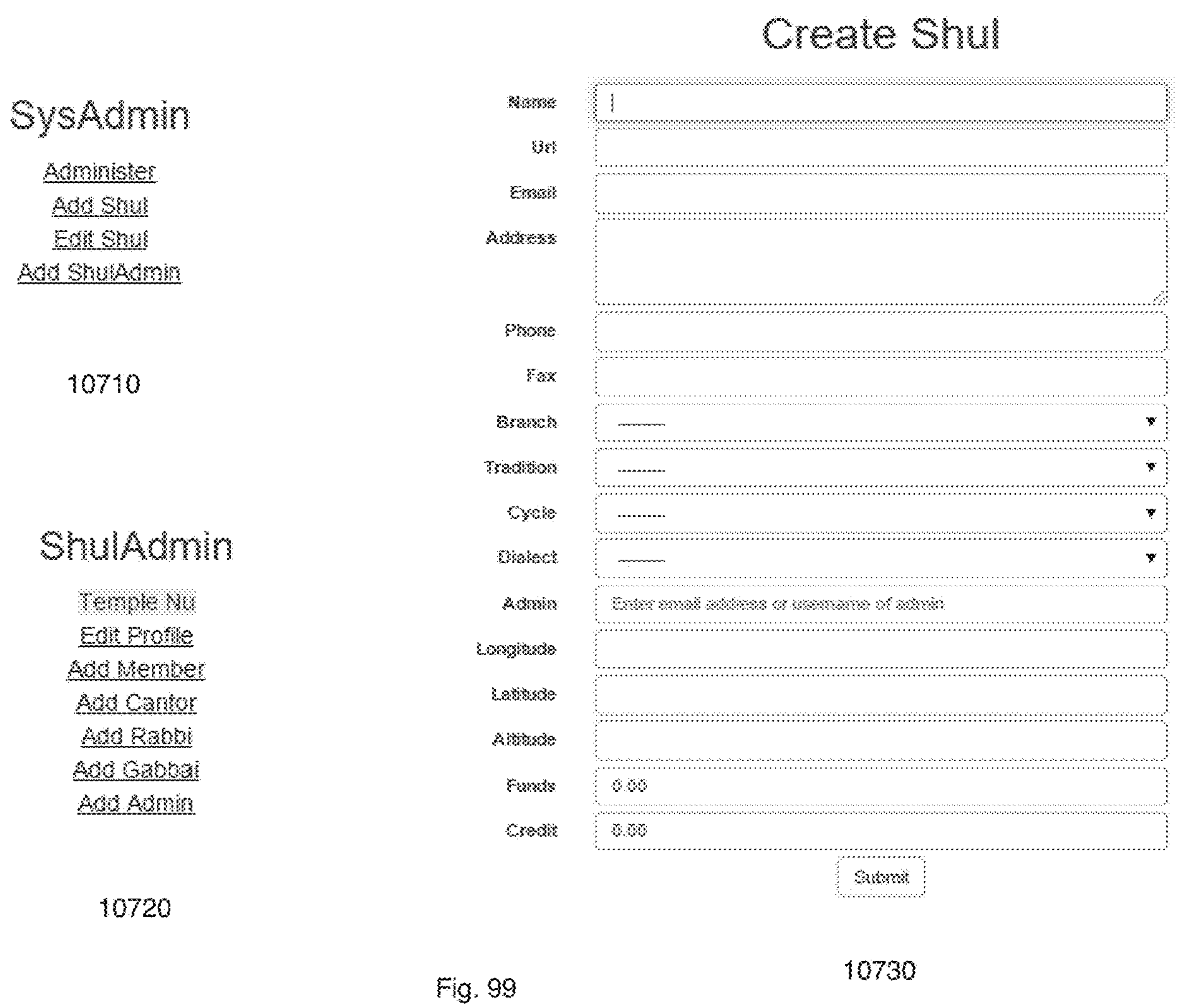

In FIG. 99, in step 10710, providing a system administration role that has general administrative control, providing ability to add a shul, providing ability to edit data about an existing shul, and providing for a shul adminstrator.

In exemplary embodiments, creating a Sys Admin. For example, clicking Administer brings a user to the Django administration page, where a user can perform a number of functions, including creating and deleting users.

In step 10720, providing a shul administrator role that has general administrative responsibility for coordinating the virtual shul on embodiments of the system. Enabling the shul admin (administrator) to add a member, to add a cantor, to add a rabbi, to add a gabbai, and/or add another shul admin for that shul.

In exemplary embodiments, adding a Shul. Clicking Add Shul allows a user to add a new shul to the system. For example, providing for a user to enter Name and URL and the url unique to the shul. Providing for a user selecting a branch, tradition, cycle, and dialect. Providing for a user specifying a shul administrator by entering an email address or an existing username in the Admin field. The system typically may send the new shul admin an email announcing the new role and typically may include a link to complete user registration if not already an existing user. Providing for the shul admin modifying any of the information a user has entered and filling in any fields the user has left blank. The location information (latitude in degrees north, longitude in degrees east, altitude in meters above sea level) can be left blank, but can help users find nearby shuls. For example, Allowing user to deposit funds in shul's account and to extend credit to shul, preferably Funds+credit provide student licenses.

In step 10730, providing ability to create a shul and to provide synagogue name, synagogue url, synagogue email, synagogue address, synagogue phone, synagogue branch, synagogue tradition, synagogue cycle, synagogue dialect, synagogue longitude, synagogue latitude, synagogue funds, and/or synagogue credits.

In exemplary embodiments, providing a Shul Admin who edits shul information. Providing a user who is an admin for more than one shul, to select a Shul from the drop-down list. The system typically may remember of the user choice when a user logs out. Optionally providing, Edit Profile to modify of the shul's information, such as its address. Providing a means to remove admins, gabbais, rabbis, cantors, and members from their respective lists by control-clicking (alt-clicking on Mac) their names. Note that there is at least one admin. Optionally providing shul admins, gabbais, cantors, rabbis, members.

In exemplary embodiments, providing another shul admin, a gabbai, a cantor, a rabbi, or a member, through the option of Add Admin, Add Gabbai, Add Cantor, Add Rabbi, or Add Member, respectively. Email address, or, if an existing user the username. The system typically may send an email announcing the new role and typically may include a link to complete user registration if not already an existing user.

Figure 100:
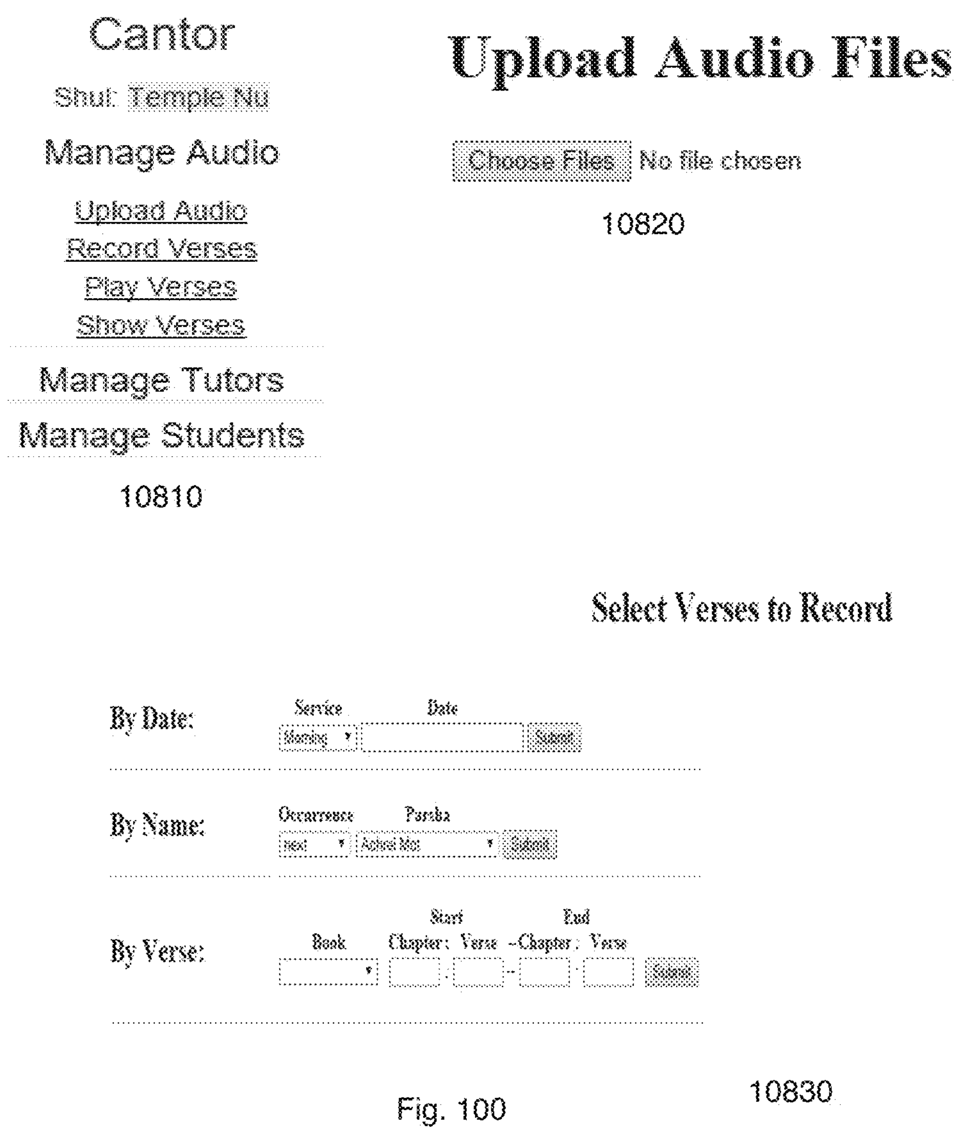

In FIG. 100, in step 10810, providing ability to create a synagogue cantor and to enable the synagogue cantor to select a shul, to manage audio, to upload audio, to record verses, to play verses, to show verses, to manage tutors, and/or to manage students.

In step 10820, providing ability to upload audio files, providing opt-in to licensing agreement.

In step 10830, providing ability to select verses to record by date, by name of parsha, or by book, chapter, and verse.

Figure 101:
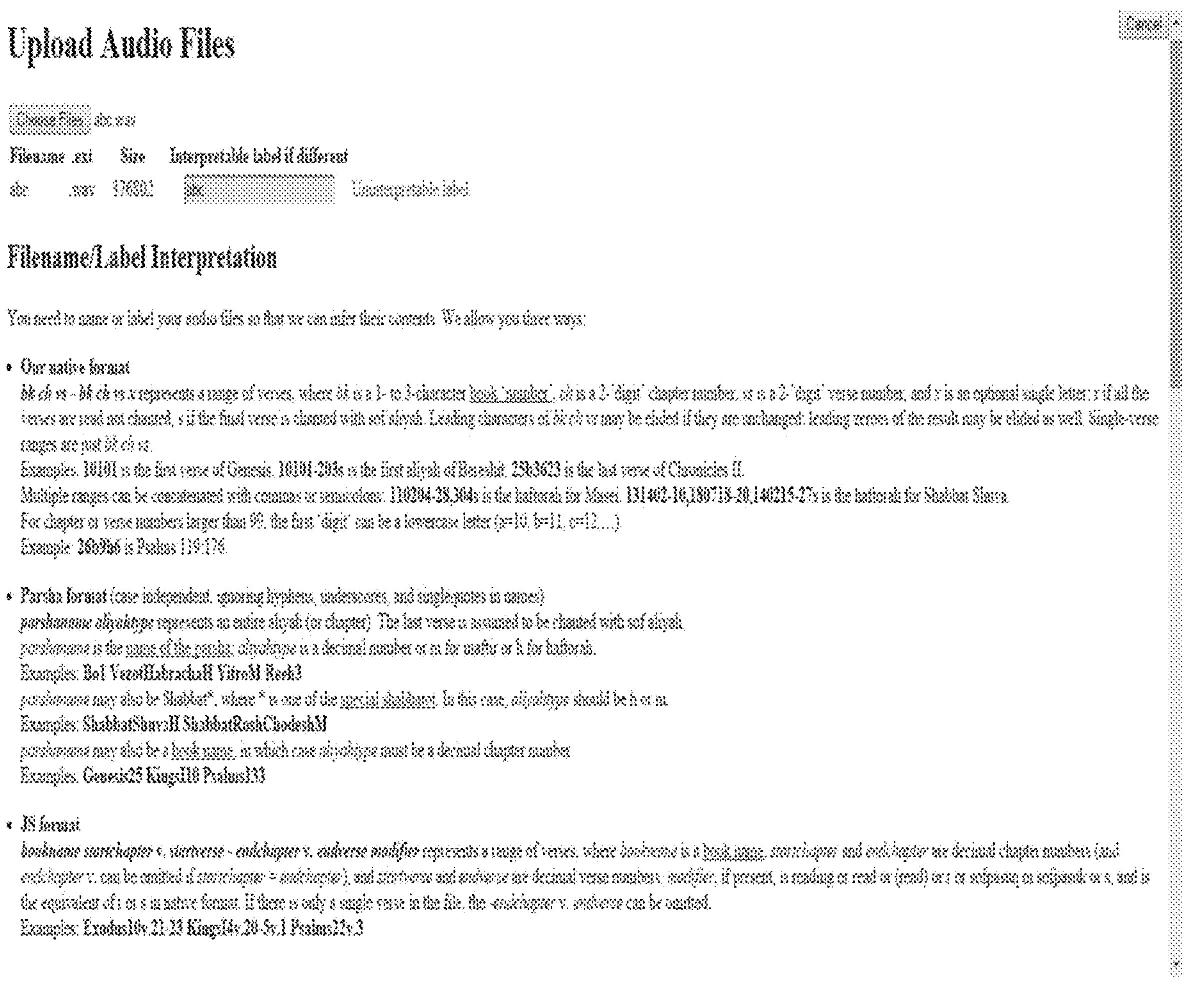

In FIG. 101, providing an interpretation system for naming audio files of one or more verses, and providing an opportunity for a user to provide an interpretable label to designate each audio file.

In FIG. 102, in step 11010, enabling user to allow audio recording.

In step 11020 displaying a plurality of verses to record. Enabling a user to click on a microphone icon to start and stop recording.

Figure 103:
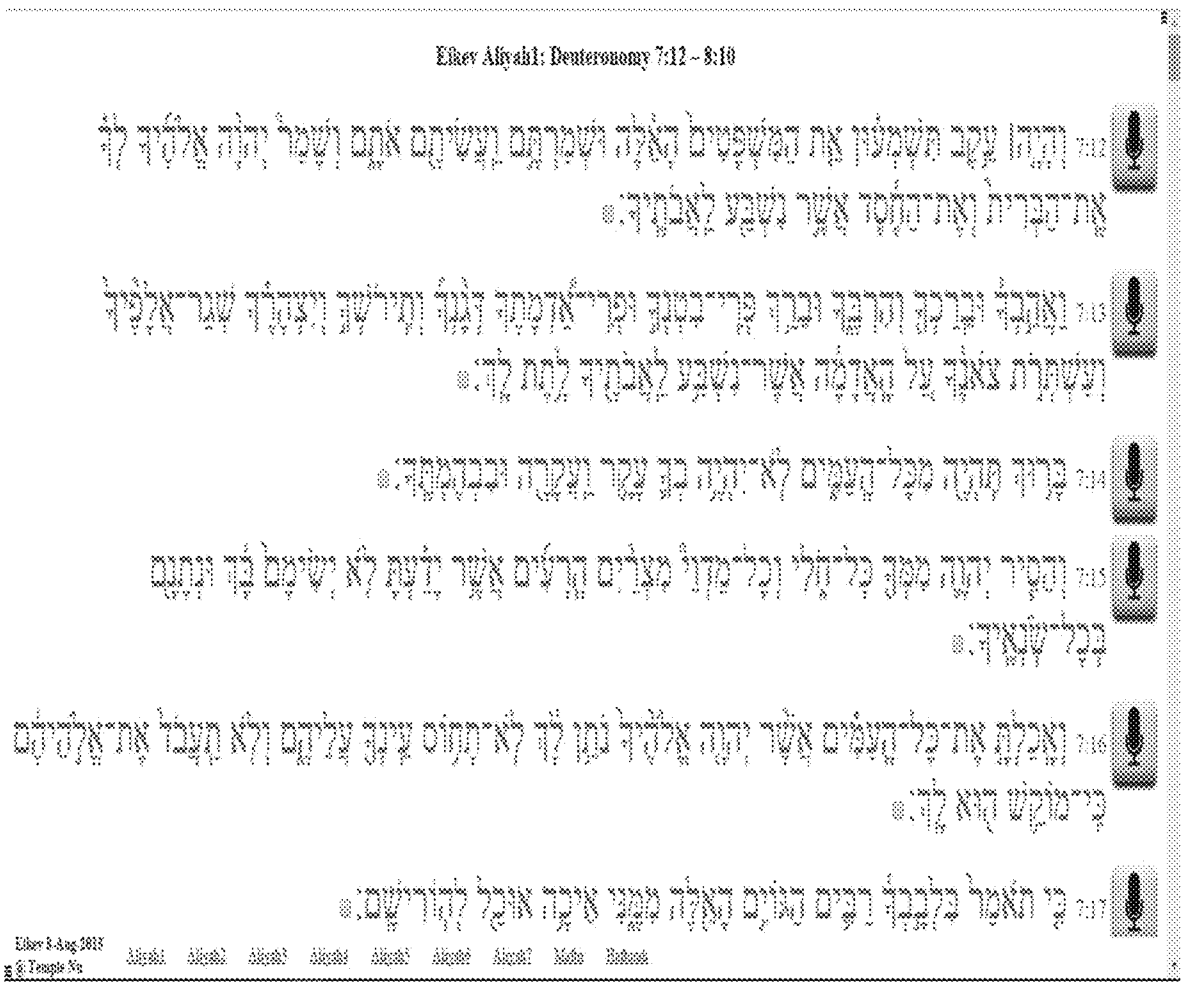

In FIG. 103, displaying a plurality of verses to record. Enabling a user to click on a microphone icon to start and stop recording.

In FIG. 104, in step 11210, enabling deletion of recorded audio and/or enabling editing word-by-word or cantillation-by-cantillation timings in Hebrew Bible verse.

In step 11220, enabling selection of plurality of verses to play by date, by parsha name or by book, chapter, and verse range.

Figure 105:
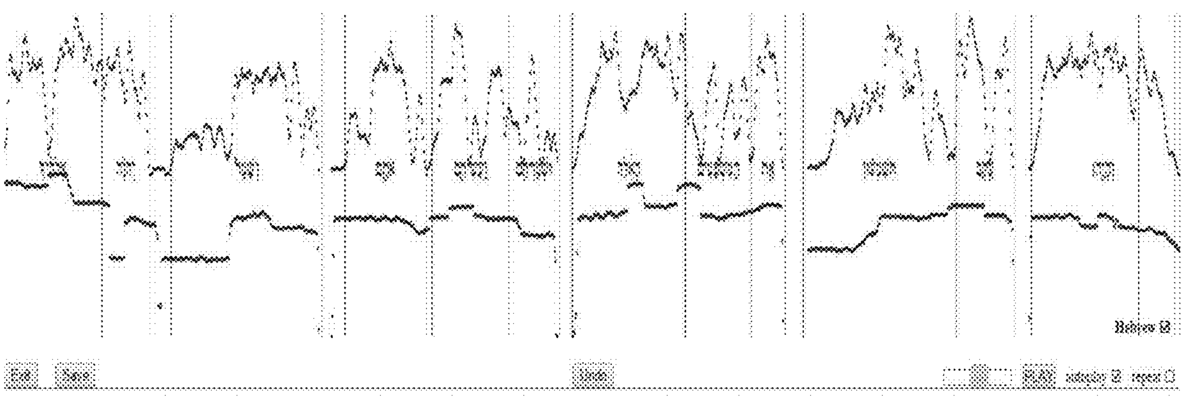

In FIG. 105, enabling editing of audio timings corresponding to words and/or cantilations.

In FIG. 106, in step 11410, selecting verses to show by date, parsha name, or book, chapter, verses range.

In step 11420, enabling for a cantor role with a synagogue, ability to manage audio, ability to manage tutors, ability to add tutors, ability to edit a tutor, and ability to manage students.

In step 11430, enabling for a cantor role with a synagogue, ability to manage audio, ability to manage tutors, ability to add tutors, ability to edit a tutor, ability to manage students, ability to assign parsha, ability to add student, ability to edit student, ability to display student handout, and ability to see student's recordings.

Figure 107:
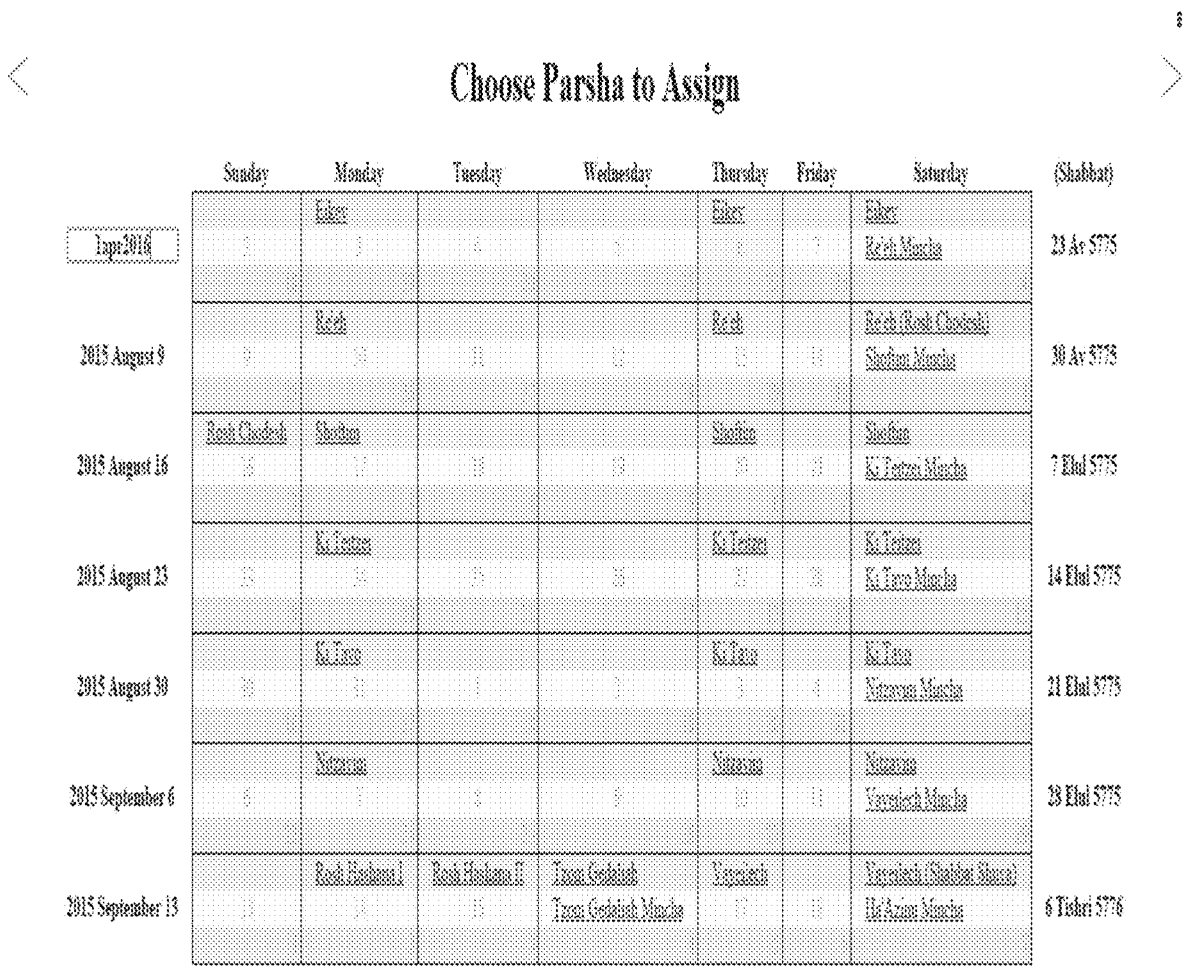

In FIG. 107, enabling a cantor to assign a parsha to a student via a Jewish liturgical calendar interface to select a parsha.

Figure 108:

In FIG. 108, enabling a cantor to assign a parsha amongst a plurality of students.

Figure 109:
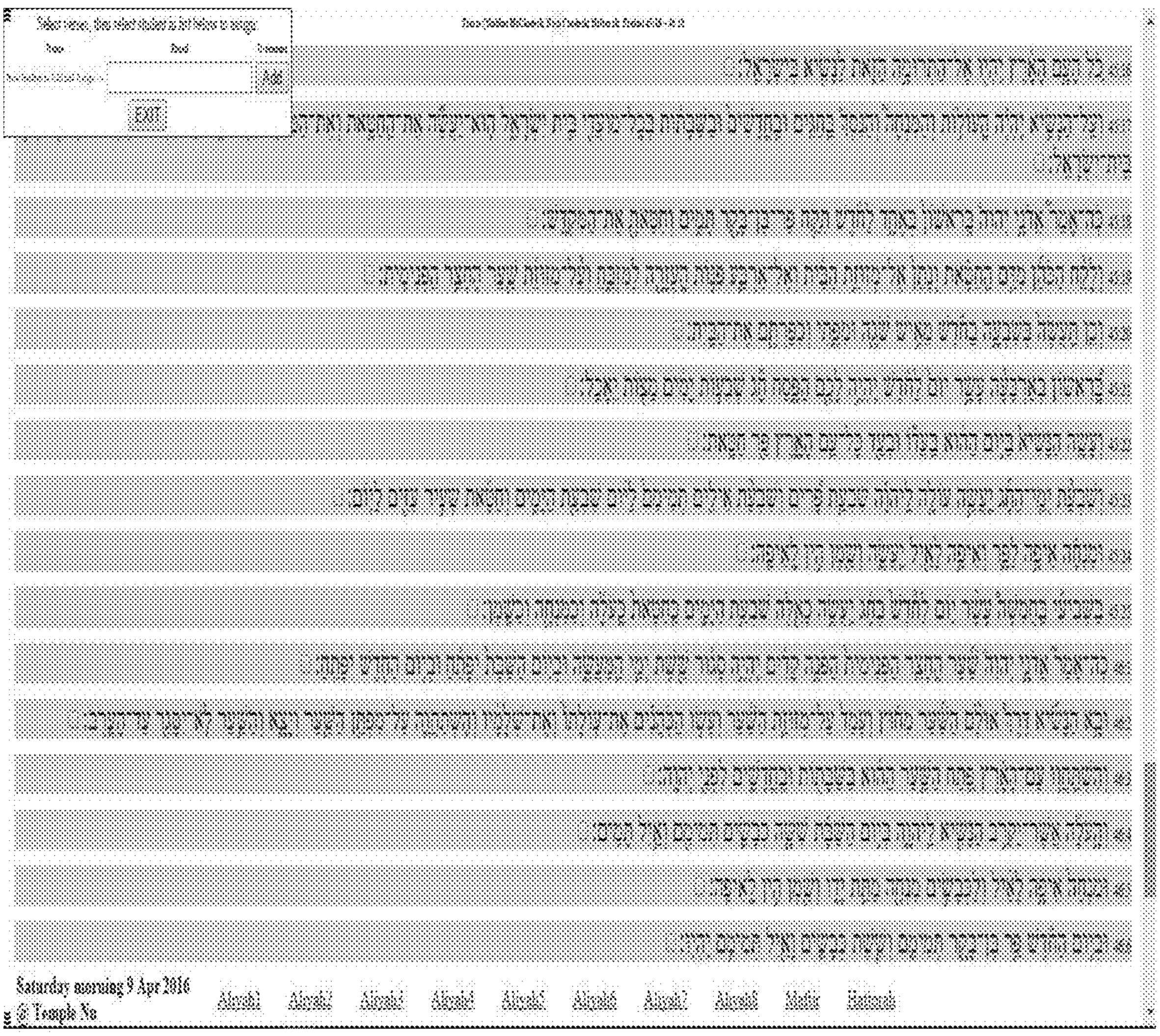

In FIG. 109, enabling a cantor to assign a parsha amongst a plurality of students by selecting specific verse ranges for each student.

Figure 110:
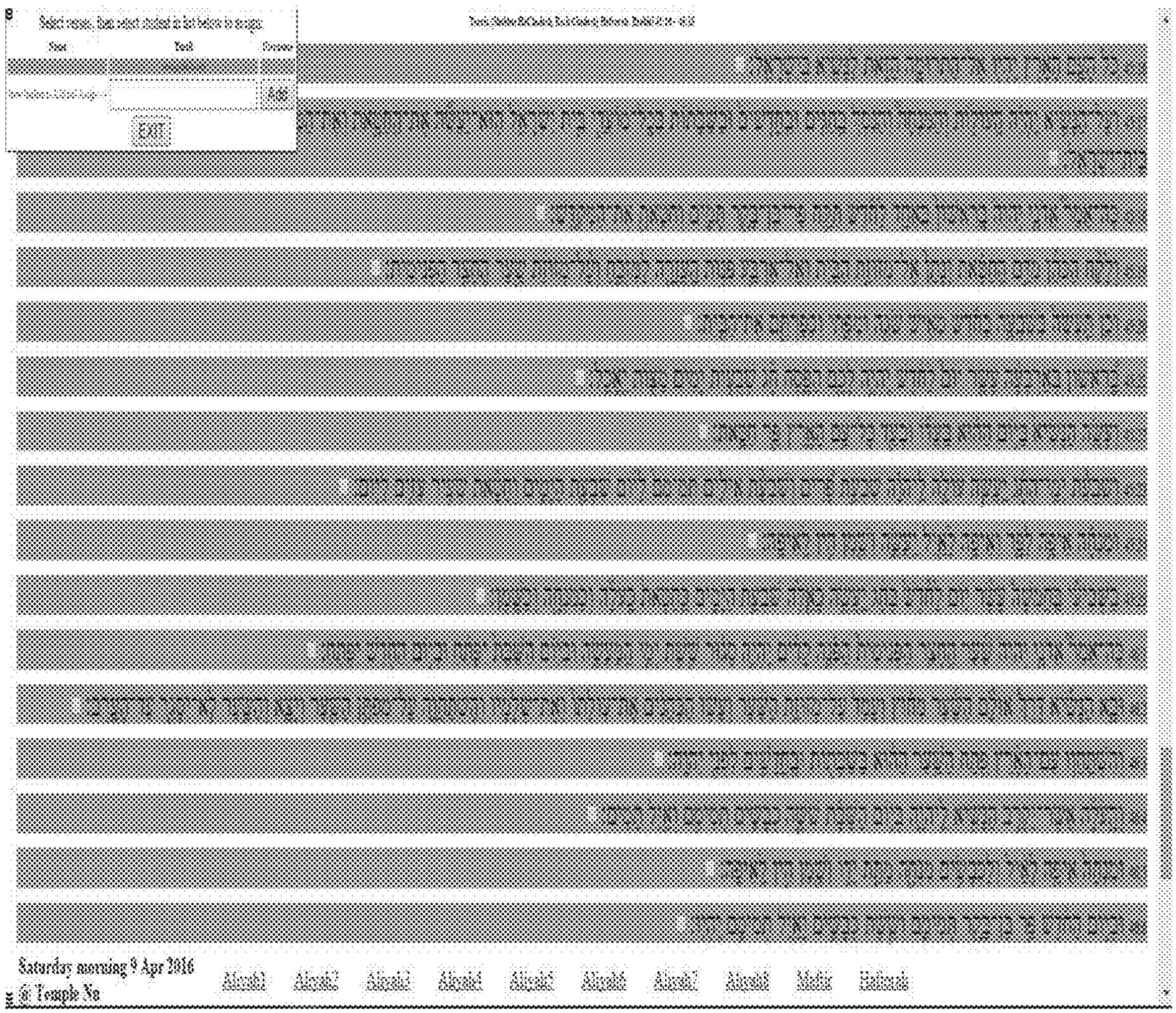

In FIG. 110, enabling a cantor to assign a parsha amongst a plurality of students by selecting specific verse ranges for each student, and assigning it to a specific student by accepting that student's email.

In FIG. 111, in step 11910, enabling a cantor to assign a parsha amongst a plurality of students by selecting specific verse ranges for each student, and assigning to a student by accepting that student's email.

In step 11920, ability to view a student's recordings, verse recorded, dialect, display mode, action and display mode of text on screen at time student made each student recording. Enabling playing of audio.

Figure 112:

In FIG. 112, ability to view a student's recordings, verse recorded, dialect, display mode, action and display mode of text on screen at time student made each student recording. Playing of audio recorded by student.

Figure 113:

In FIG. 113, ability to view a student's recordings, verse recorded, dialect, display mode, action and display mode of text on screen at time student made each student recording. Playing of audio recorded by student. Enabling providing a written, or oral, comment by cantor, rabbi, or tutor to student.

In FIG. 114, in step 12210, ability to view a student's recordings, verse recorded, dialect, display mode, action and display mode of text on screen at time student made each student recording. Enabling playing of audio. Enabling viewing of cantor comments and/or tutor comments.

In step 12220, ability to view a student's recordings, verse recorded, dialect, display mode, action and display mode of text on screen at time student made each student recording. Enabling playing of audio. Enabling viewing of cantor comments and/or tutor comments. Enabling recording audio tutor comments for student. Enabling recording audio cantor comments for student.

In FIG. 115, in step 12310, ability to create a tutor role with ability such as editing student, playing student's verses, displaying student's handout, viewing student list of recordings.

In step 12320, ability to create a student role with ability such as editing student profile, playing student's verses, displaying student's handout, seeing student list of recordings.

In step 12330, ability to create a parent role with ability such as selecting child (from amongst siblings), viewing child profile, editing child profile, playing child's verses, displaying child's handout, viewing child list of recordings, and listening to recordings of child.

In step 12340, ability to create a gabbai role with ability such as selecting a synagogue or shul, viewing a Jewish liturgical calendar, managing readers, showing pending readings, showing open readings, showing claimed readings.

In FIG. 116, in step 12410, ability to view student recordings. In step 12420, ability to record another recording in response to tutor and/or cantor's written and/or oral comments.

Figure 117:
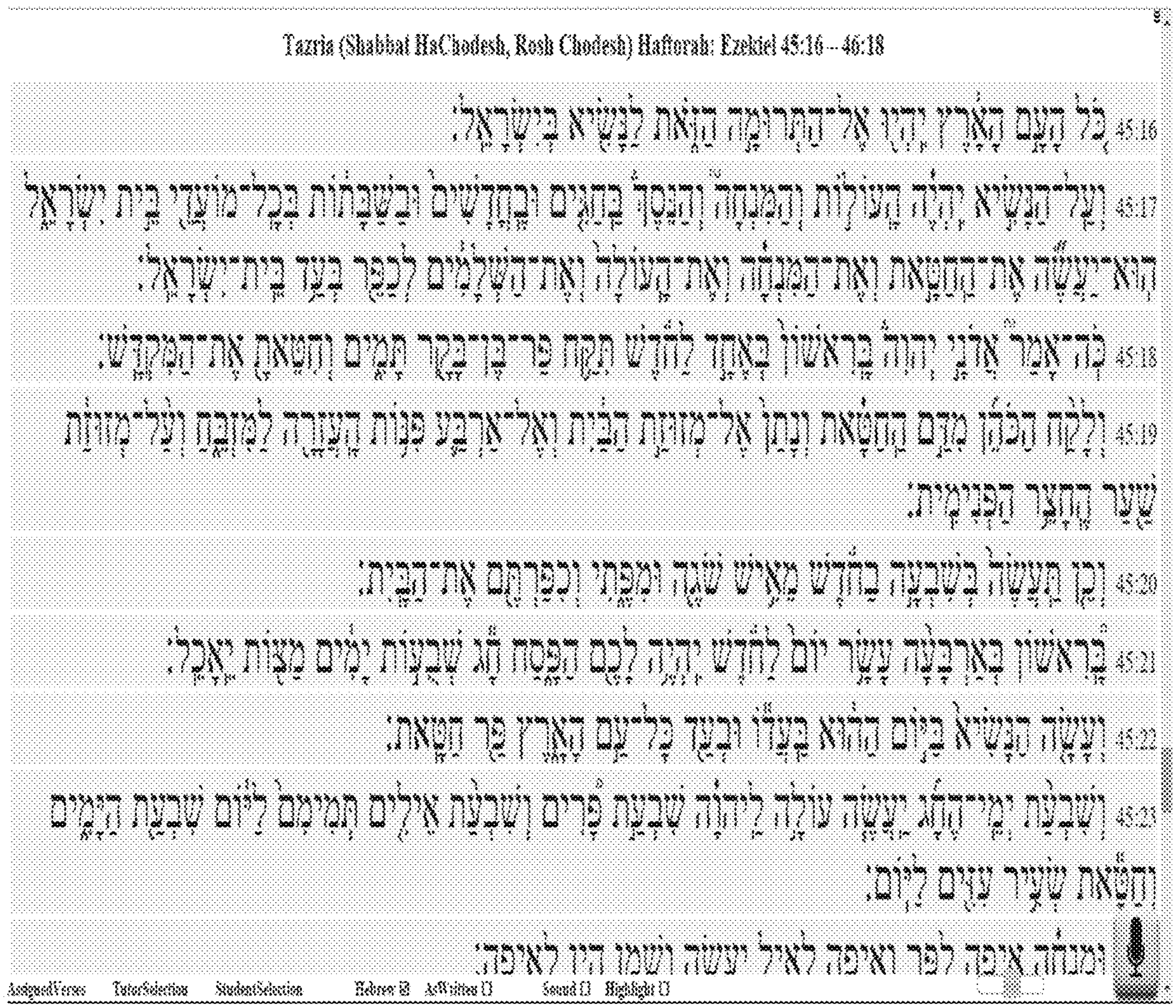

In FIG. 117, enabling recoding audio corresponding to specific student verses.

In FIG. 118, providing a Jewish liturgical calendar for signing up for and/or viewing upcoming readings at a specific synagogue.

Figure 119:

In FIG. 119, providing a gabbai interface for a Jewish liturgical calendar for signing up for and/or viewing upcoming readings at a specific synagogue, indicating which aliyot are pending and which one's are open for signup.

In FIG. 120, providing another exemplary gabbai interface for a Jewish liturgical calendar for signing up for and/or viewing upcoming readings at a specific synagogue, indicating which aliyot are pending, which one's are open for signup, and providing the ability to close aliyot to prevent future signup (for example due to being reserved for a bar mitzvah or bat mitzvah family and/or friends or an aufruf or a baby naming).

Figure 121:
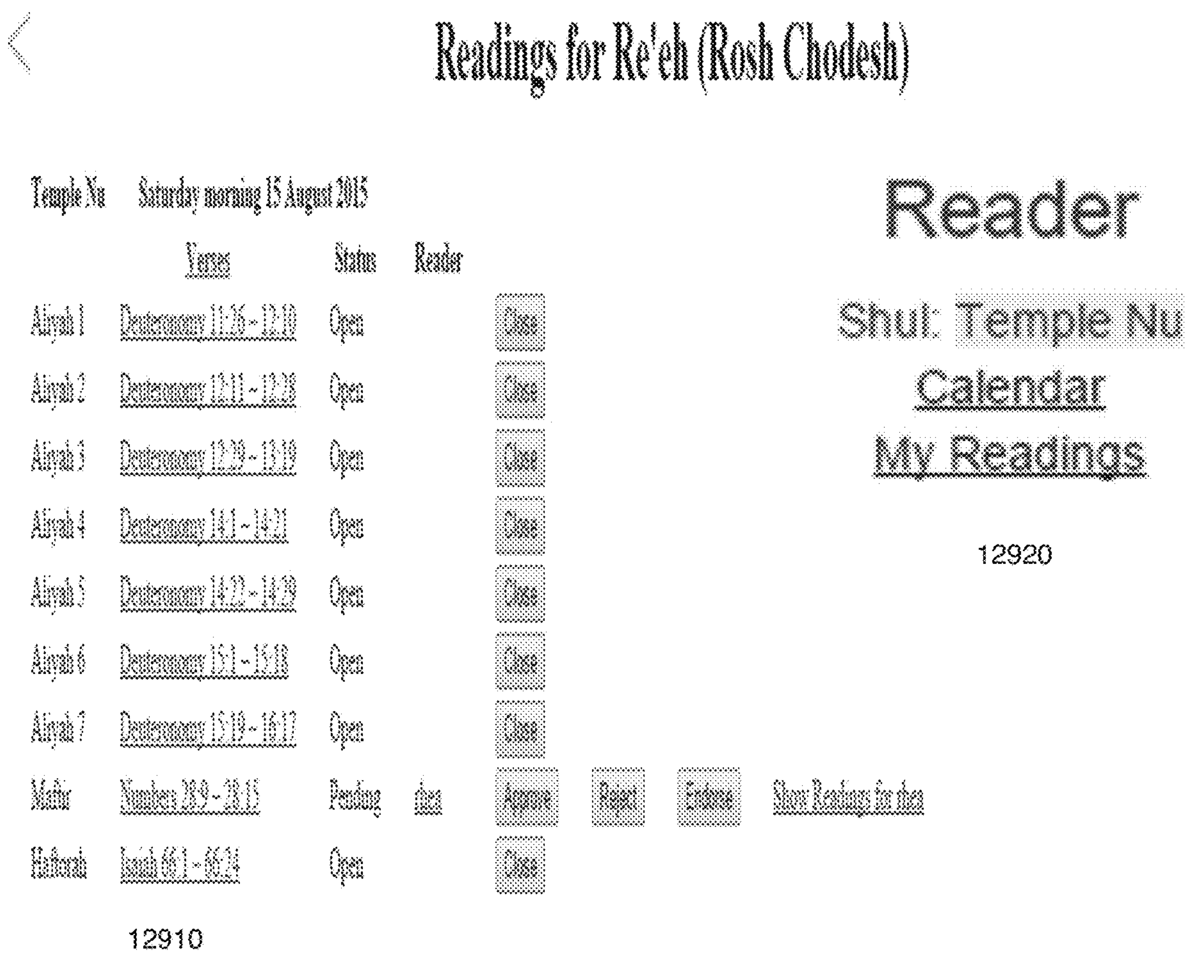

In FIG. 121, in step 12910, providing another exemplary gabbai interface for a Jewish liturgical calendar for signing up for and/or viewing upcoming readings at a specific synagogue, indicating which aliyot are pending, which one's are open for signup, and providing the ability to close aliyot to prevent future signup (for example due to being reserved for a bar mitzvah or bat mitzvah family and/or friends or an aufruf or a baby naming). In step 12910, further illustrating a gabbai interface to approve (one time), reject (one time), or endorse (as trustworthy to sign up without requiring approval in future). Further illustrating ability to show what readings a reader has already sign up to do and/or has already performed.

In step 12920, providing a reader interface to view readings that a reader has already signed up to do and/or have been approved and/or have been accomplished and completed.

Figure 122:

In FIG. 122, providing an exemplary highlighting page with vowels and cantillation. Enabling click on a word to play. Enabling selection by aliyah, maftir, or haftorah, or all-at-once. Enabling speeding up or slowing down of audio. Enabling lowing or raising pitch of audio. Enabling playing of next verse of audio after current verse completes (autoplay). Enabling repeating of a current verse of audio after current verse completes. Enabling playing of only a single word when clicked rather than the rest of a verse. Enlarging the current verse and keeping it enlarged as it is playing the corresponding audio.

Figure 123:

In FIG. 123, providing an exemplary highlighting page without vowels and without cantillation. Note that "AsWritten" is checked. Enabling click on a word to play. Enabling selection by aliyah, maftir, or haftorah, or all-at-once. Enabling speeding up or slowing down of audio. Enabling lowing or raising pitch of audio. Enabling playing of next verse of audio after current verse completes (autoplay). Enabling repeating of a current verse of audio after current verse completes. Enabling playing of only a single word when clicked rather than the rest of a verse. Enlarging the current verse and keeping it enlarged as it is playing the corresponding audio.

Figure 124:
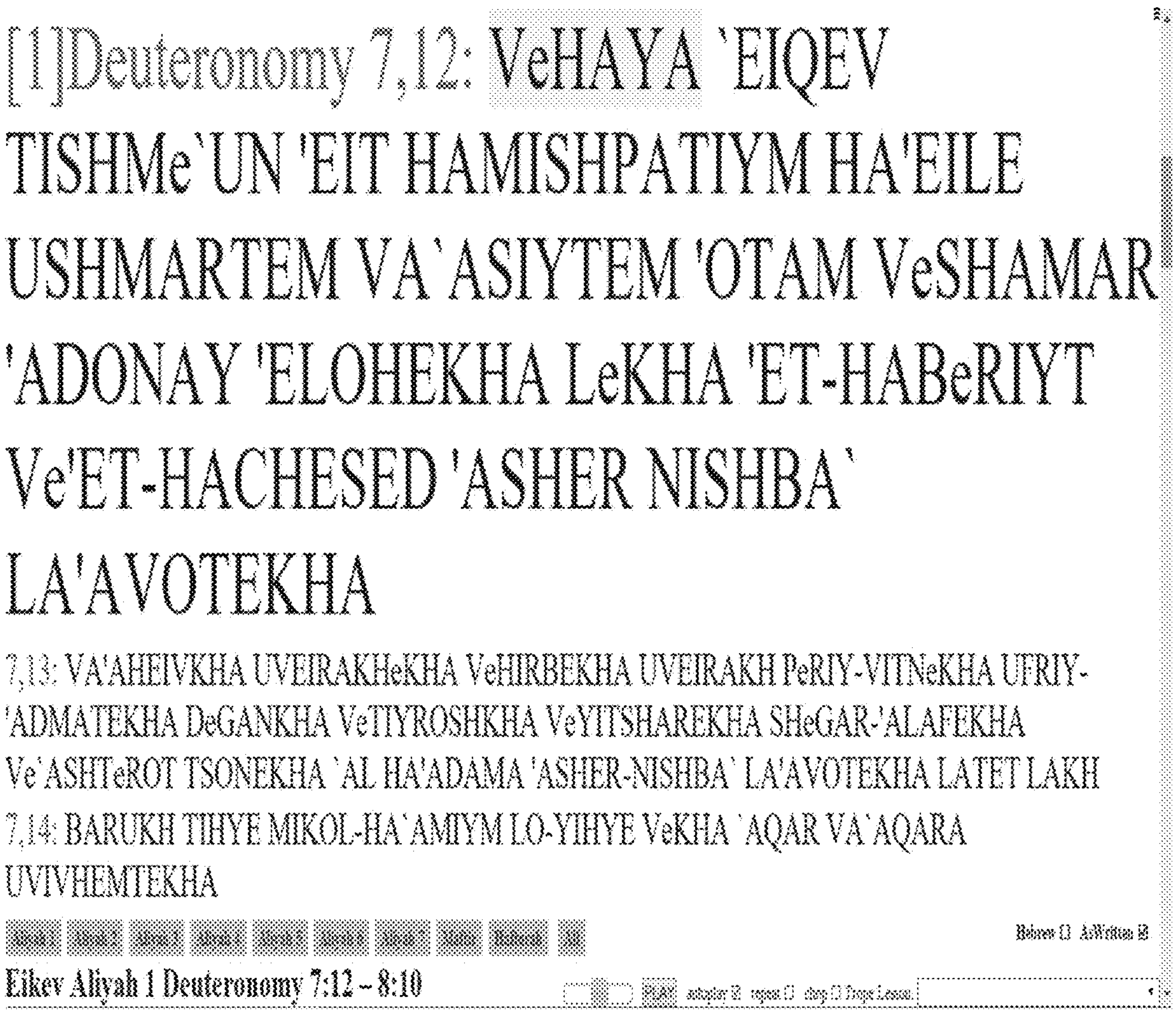

In FIG. 124, providing an exemplary transliterated highlighting page with embedded vowels and but without cantillation. Note that "Hebrew" box is not checked. Enabling click on a word to play. Enabling selection by aliyah, maftir, or haftorah, or all-at-once. Enabling speeding up or slowing down of audio. Enabling lowing or raising pitch of audio. Enabling playing of next verse of audio after current verse completes (autoplay). Enabling repeating of a current verse of audio after current verse completes. Enabling playing of only a single word when clicked rather than the rest of a verse. Enlarging the current verse and keeping it enlarged as it is playing the corresponding audio. Embodiments that support transliteration and cantillation are supported, please see FIGS. 15-16.

Figure 125:

In FIG. 125, providing an exemplary highlighting page with vowels and cantillation. Enabling selection of trope family to learn such as merkha tipeha. Greying out of words in each verse that do not match that trope family. Enabling click on a non-greyed word to play the trope family. Progressing from one example of the trope family to a next example of that trope family. Enabling selection by aliyah, maftir, or haftorah, or all-at-once. Enabling speeding up or slowing down of audio. Enabling lowing or raising pitch of audio. Enabling playing of next verse of audio after current verse completes (autoplay). Enabling repeating of a current verse of audio after current verse completes. Enabling playing of only a single word when clicked rather than the rest of a verse. Enlarging the current verse and keeping it enlarged as it is playing the corresponding audio.

In FIG. 126, in step 13410, enabling viewing a student's handout. In step 13420, enabling playing highlighting page corresponding to currently viewed handout of the student. In step 13430, providing for selection of any aliyah corresponding to the Jewish liturgical date chosen, maftir, haftorah, or tikkun within the handout.

In FIG. 127, enabling viewing a student's handout that shows both Hebrew and English in an easy-to-print format suitable specifically for cantors and/or tutors who teach bar mitzvah and/or bat mitzvahs.

Figure 128:
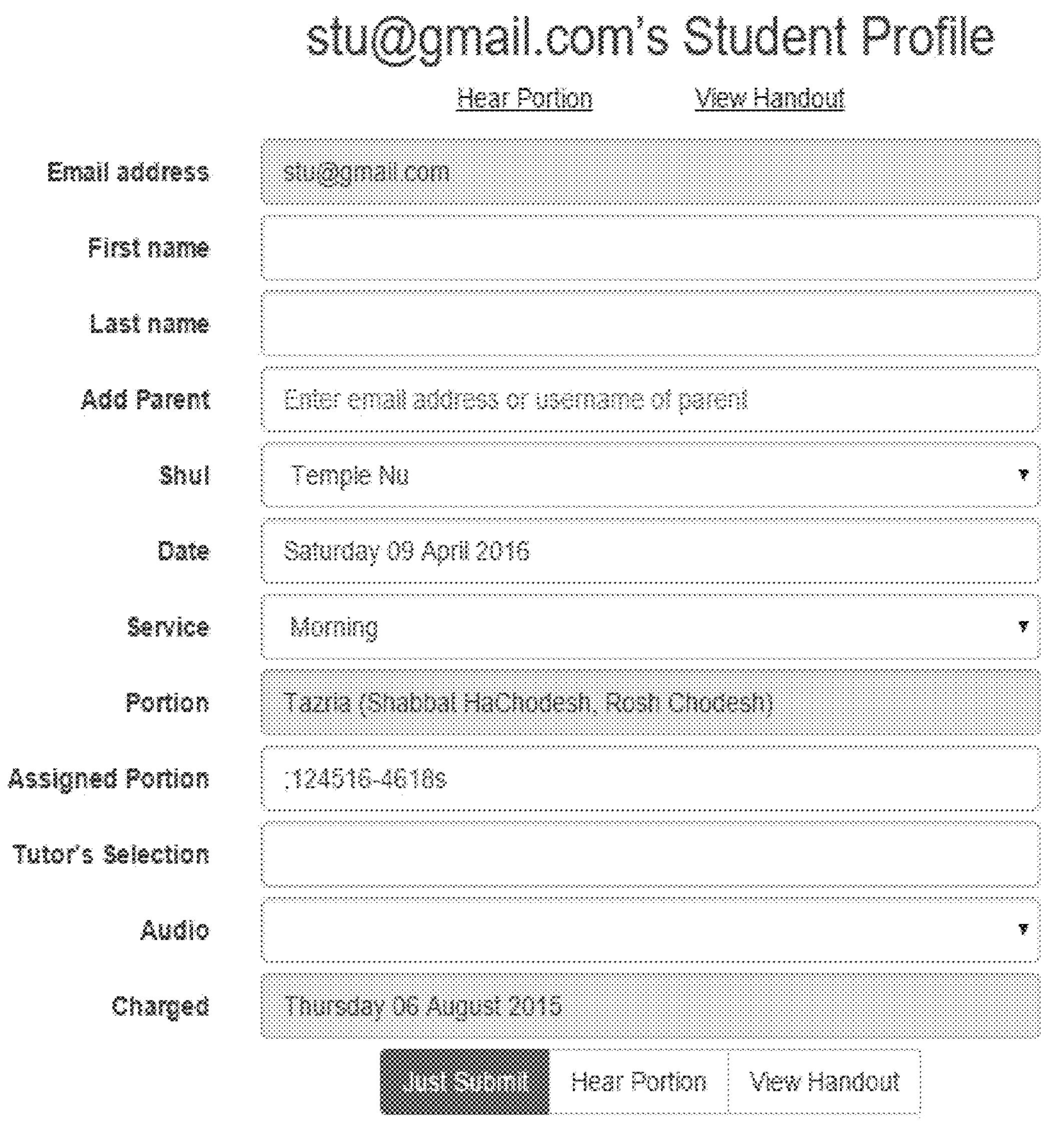

In FIG. 128, enabling a student profile page comprising one or more of: hear portion, view handout, just submit, first name, last name, add parent, shul, date, service timing, portion that shabbat, assigned portion (typically a subset of portion that shabbat), tutor selection (typically a subset of assigned portion that may change from week to week typically upon tutor selection), audio source, and date funds to cover student were donated. This is an exemplary cantor's or tutor's view.

Figure 129:
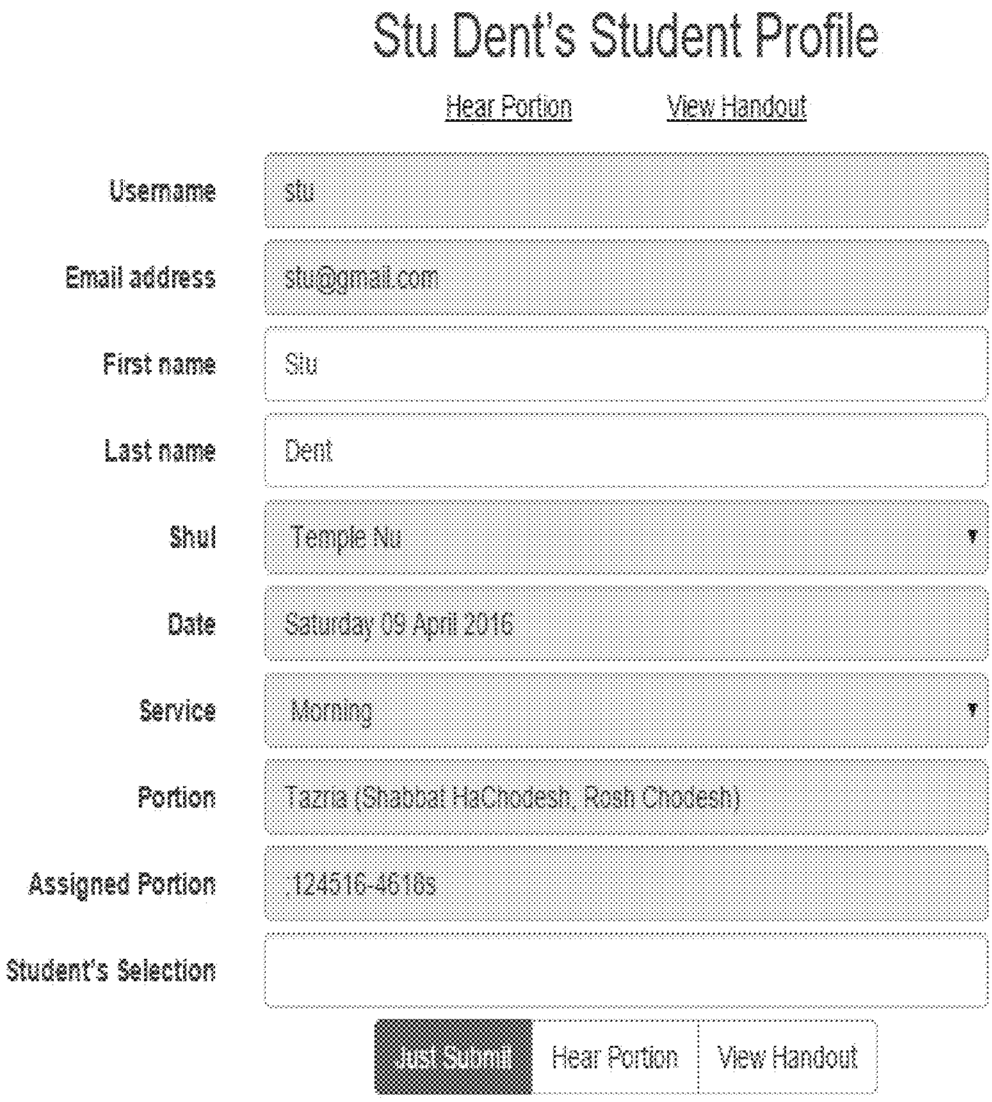

In FIG. 129, enabling a student profile page comprising one or more of: hear portion, view handout, just submit, first name, last name, add parent, shul, date, service timing, portion that shabbat, assigned portion (typically a subset of portion that shabbat), tutor selection (typically a subset of assigned portion that may change from week to week typically upon tutor selection), audio source, and date paid. This figure shows that some of the exemplary fields may be omitted from a student's view.

Figure 130:

In FIG. 130, displaying a page for a student to select one or more verses to study between tutor lessons. Providing ability for viewing selections by a tutor or for viewing selections by a cantor.

Figure 131:
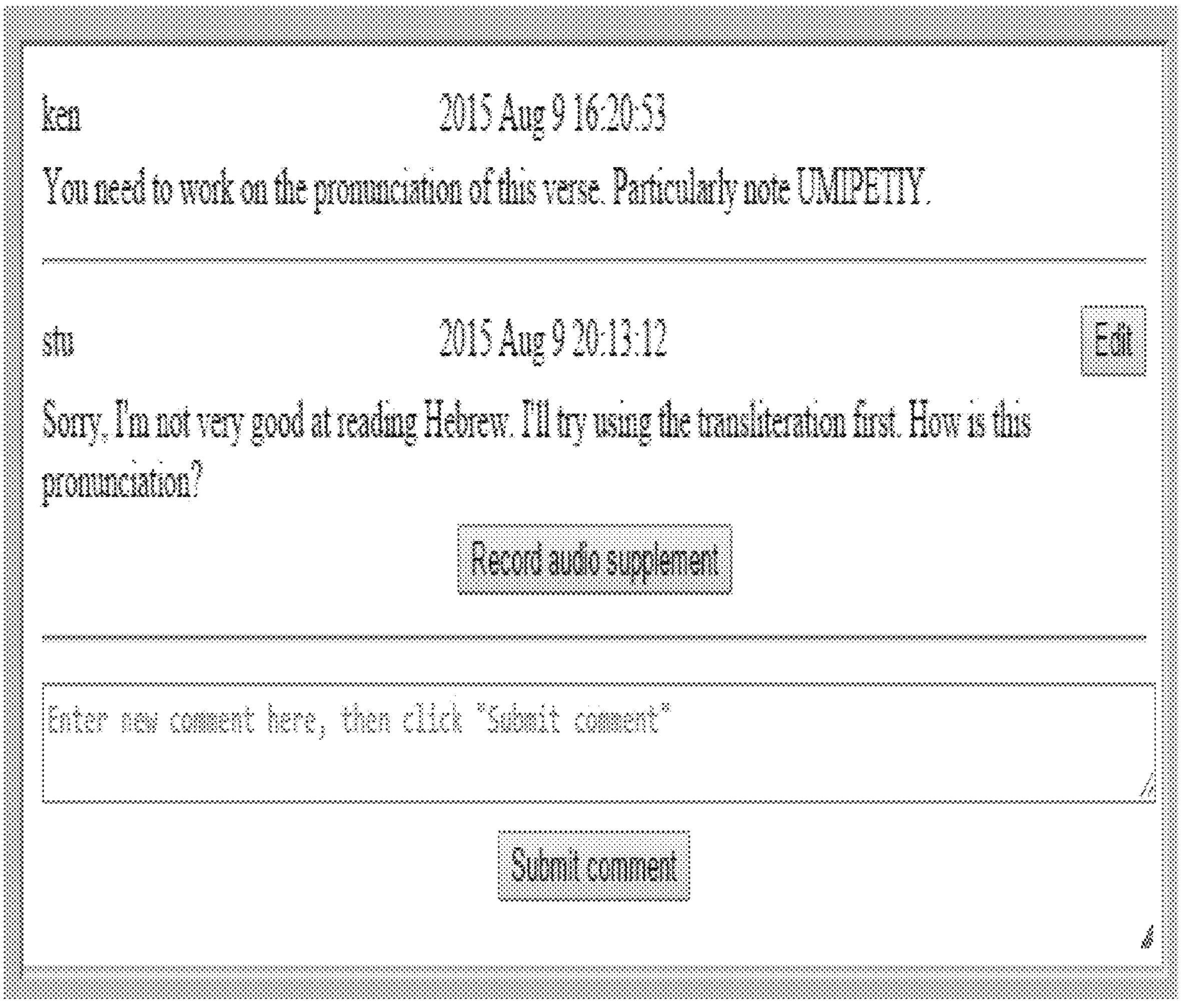

In FIG. 131, providing exemplary interface for cantor or tutor—student dialog. Providing ability for either party to provide either audio, text or both. Other exemplary embodiments may support video.

Figure 132:
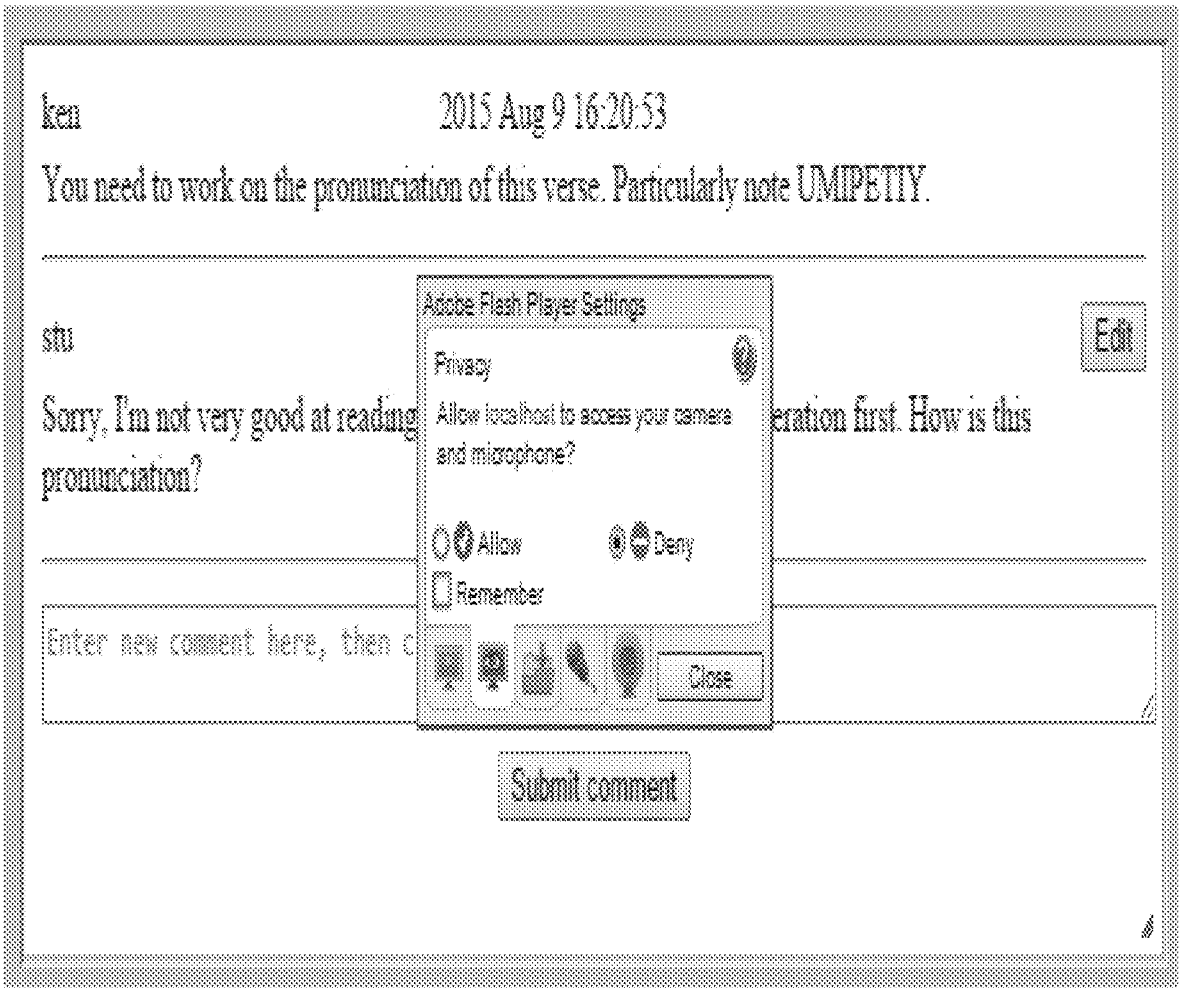

In FIG. 132, providing exemplary interface for cantor or tutor—student dialog. Providing ability for either party to provide either audio, text or both. Other exemplary embodiments may support video. Proving for user granting of permission to record audio and/or camera. Such permission embodiments may apply not only to flash, but also to Android, Java, Swift, IOS, iPad, iPhone, Mac OSX, and/or Windows.

Figure 133:
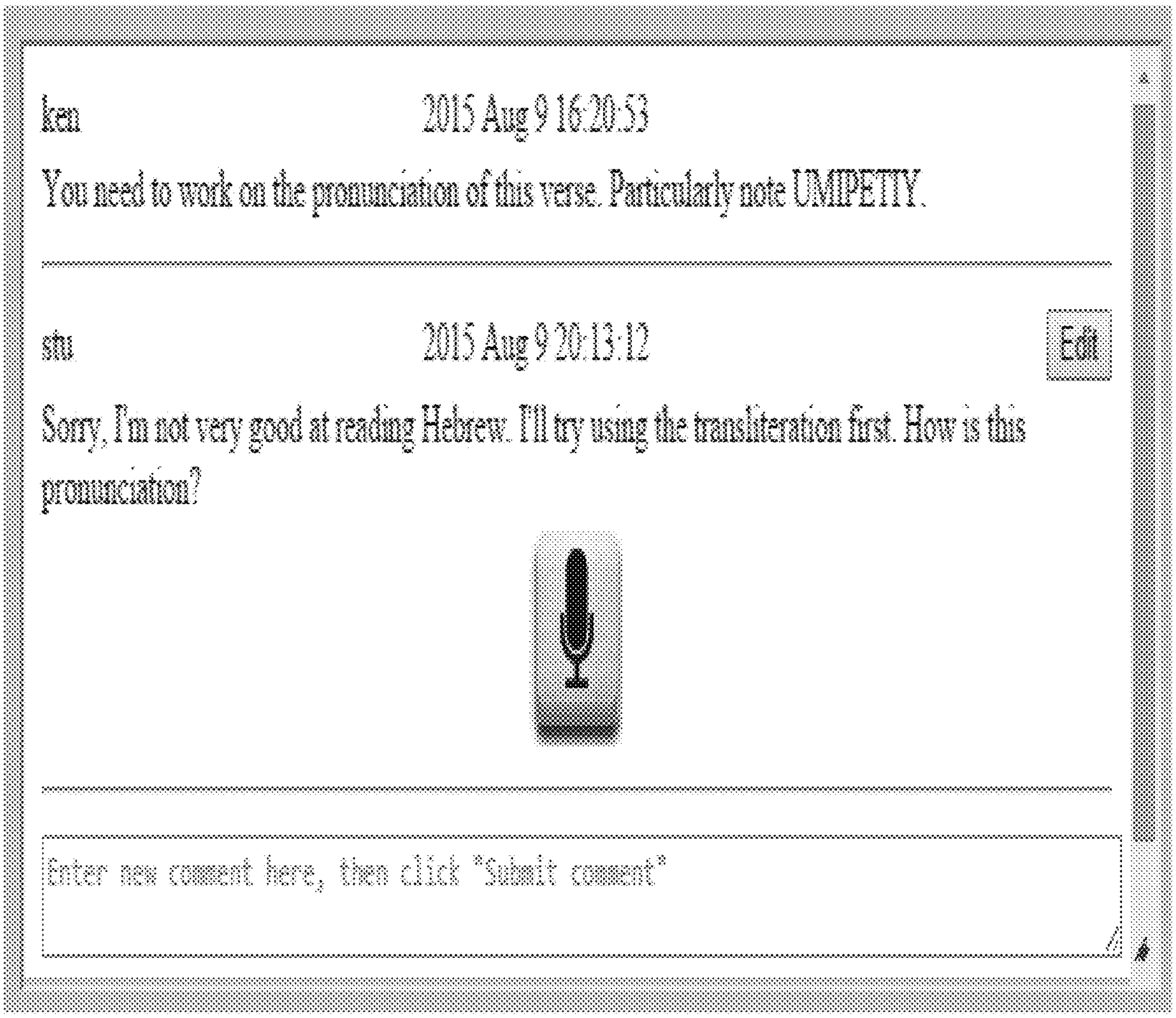

In FIG. 133, providing another exemplary interface for cantor or tutor—student dialog, where additional audio has been recorded and submitted to a tutor and/or cantor. Providing ability for either party to provide either audio, text or both. Other exemplary embodiments may support video.

Figure 134:
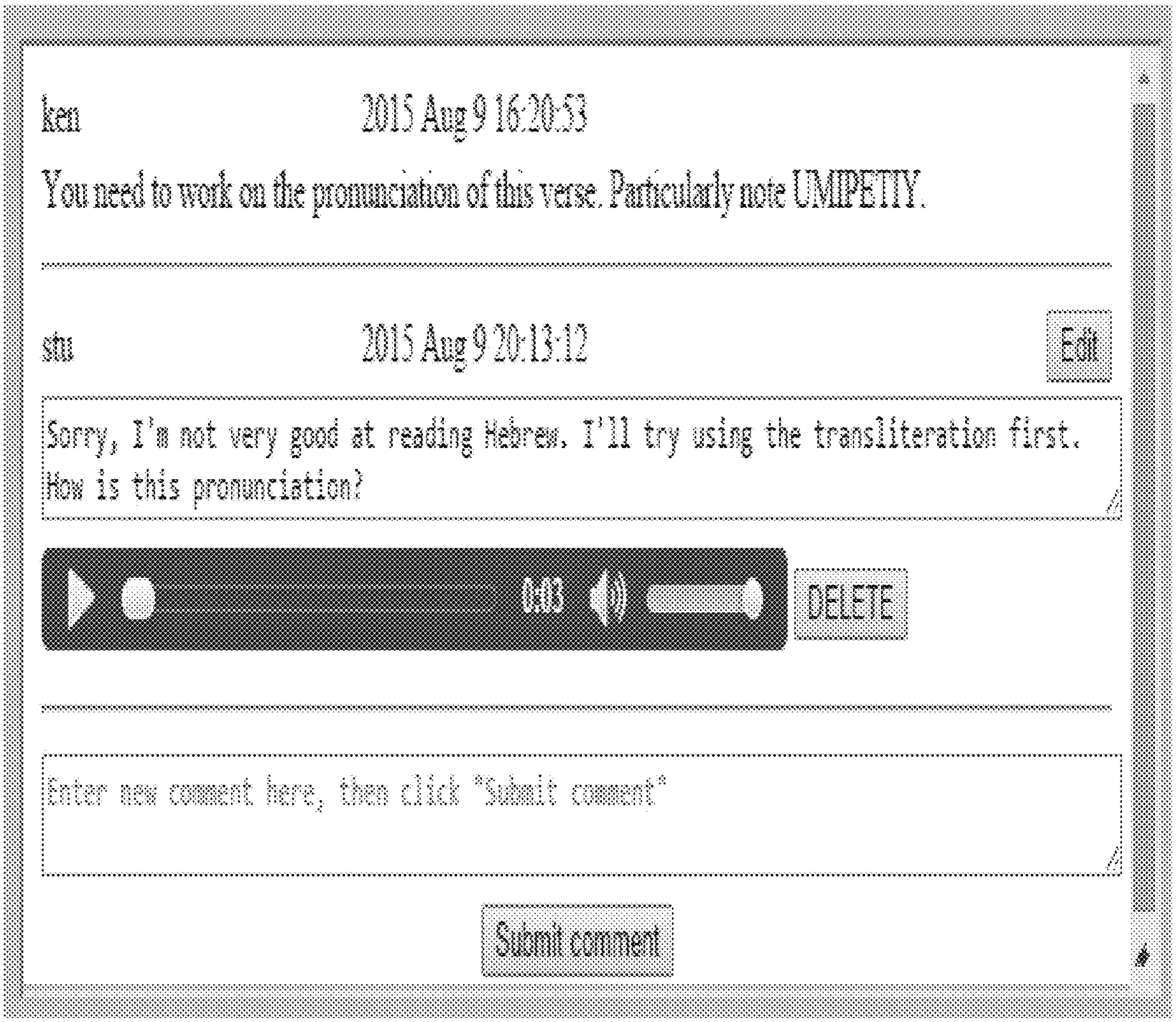

In FIG. 134, providing another exemplary interface for cantor or tutor—student dialog, where additional audio has been recorded and submitted to a tutor and/or cantor. Providing ability to play back audio prior to submitting a comment, from student to teacher. Other exemplary embodiments support ability to play back audio prior to submitting a comment from teacher to student. Providing ability for either party to provide either audio, text or both. Other exemplary embodiments may support video. In this exemplary figure, student is currently submitting a text comment.

Figure 135:
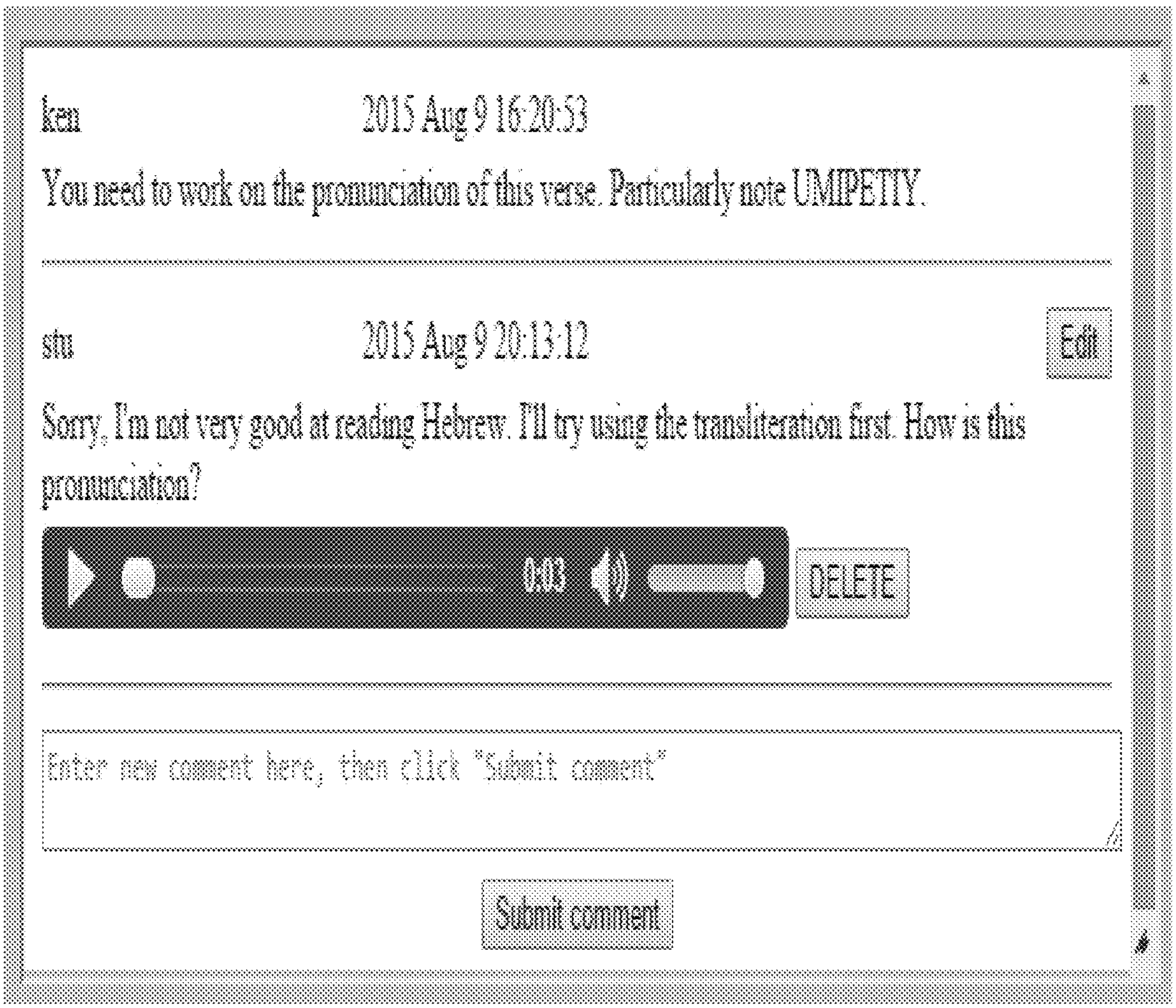

In FIG. 135, providing another exemplary interface for cantor or tutor—student dialog, where additional audio has been recorded and submitted to a tutor and/or cantor. Providing ability to play back audio prior to submitting a comment, from student to teacher. Other exemplary embodiments support ability to play back audio prior to submitting a comment from teacher to student. Providing ability for either party to provide either audio, text or both. Other exemplary embodiments may support video. In this exemplary figure, cantor or tutor may be reviewing student's audio example, student's written comment or student's audio comment.

Exemplary embodiments providing if a user is a cantor for more than one shul, providing a user selection of a shul from the drop-down list. The system typically may remember user choice when a user logs out. Providing, Manage Audio, Manage Tutors, and Manage Students. Preferably, initially, the Manage Audio submenu is shown to allow a user to provide the user voice to the system. To show or hide a submenu, a user may click on its title.

Exemplary embodiments providing user audio. If a user have digital recordings, providing uploading to the system by clicking Upload Audio. Providing for user-selecting one or more audio files to upload. Providing for accepting audio file formats, such as way, ogg, and mp3.

Exemplary embodiments. In order for the system to know what verses are included in each file, a user either name the files according to our rules, or separately specify the contents of each file. When the system can't interpret of the user filenames, it typically may ask a user to specify file contents and typically may show a user the options for doing so.

Exemplary embodiments. Once the system understands the contents of each file, an Upload button appears. a user may click Upload to initiate the upload. of the user browser may indicate progress at the lower left. Upload time typically may depend on total filesize and Internet speed. When of the user selected files have been uploaded, the system typically may return a user to of the user home page while it silently continues processing in the background. When it's completed processing, the uploaded verses typically may automatically become available for use on an Exemplary embodiments. Highlight Page.

Exemplary embodiments. Record verses. Optionally, Record verses directly on the system. a user may click Record Verses and choose the verses a user wish to record. a user do not have to record all the verses a user selects.

Exemplary embodiments. To specify verses by selecting a book and then specifying starting and ending chapter and verse. If a user just specify a starting chapter, the entire chapter is selected. If a user just specify a starting chapter and verse, only that verse is selected. If a user just specify starting and ending chapters, all verses in the included chapter range are selected.

Exemplary embodiments. To specify verses, exemplary embodiments use the user shul's Branch, Tradition, and Cycle parameters to determine the actual verses included: a user can select a parsha by date. When a user a user may click the Service or Date field, a user typically may see a calendar that typically may allow a user to a user may click a parsha. And a user can select a parsha by name from the list of parshot. Note that the parsha list is color-coded: black if a user haven't yet recorded all the verses in the parsha, brown if a user haven't yet recorded all the verses with their proper ending (sof pasuq or sof aliyah), and gray if the user has recorded the entire parsha properly. This color-coding considers all verses that might be included in some occurrence of each parsha, including special maftir and haftorah. These colors are exemplary. Note that the recordings produced typically may be associated with transliterations determined by of the user shul's Dialect.

Exemplary embodiments. Once the user has selected the verses, a user may see a box asking a user to permit use of the user microphone. a user grants permission in order to proceed.

Exemplary embodiments. Once the user has granted permission, a user typically may see a microphone icon next to each verse. At the end of each verse a user typically may see a checkbox to tell the system whether a user wish to record the verse with or without a sof aliyah. The system may preset each checkbox according to its notion of aliyah boundaries, but a user can a user may click a checkbox to override that. Make sure the box is in the desired state before recording the verse. For example, verses are red if a user haven't yet recorded them, brown if the user has recorded with a different sof aliyah state, black if the user has recorded with the specified sof aliyah state.

Exemplary embodiments. For example. To record a verse, a user may click on its microphone icon and start chanting. As a user record, the red area of the icon typically may rise and fall with the volume, and the verse a user are recording typically may be highlighted in yellow. When the user has completed the verse, a user may click the icon again. "Sending" (typically brown) typically may flash on the screen while of the user browser sends the audio to the system. Once sending is complete a user can record another verse. In the background, the system is processing the transmitted recordings so that they can be used on a Exemplary embodiments. Highlight Page. A user can a user may click Review Recorded Verses on the hamburger menu. If some or all of the verses the user has just recorded don't show up on the resulting Exemplary embodiments. Highlight Page, wait a few seconds to allow processing to complete, then use of the user browser to reload the page.

Exemplary embodiments. As a user review a verse the user has just recorded, a user may click Delete Selected Audio in the hamburger menu. a user typically may be asked for confirmation before the recording is permanently deleted. If the highlighting is incorrect, a user can adjust it by clicking Edit Verse, which typically may bring a user to a page showing the highlighted verse in the top half and a graphical representation of the audio in the bottom half.

Exemplary embodiments. In the graph, the words are placed between the amplitude on top and the pitch on bottom. As a user plays the audio, the words typically may highlight in the top half, while a gray cursor typically may move across the graph in synchrony with the audio. The graph has vertical bars showing the "start" (typically green) and "end" (typically red) of each word, and brown bars at the beginning and end. a user can adjust the highlighting by moving these bars using a user may click and drag. When a user are satisfied with the highlighting, a user can a user may click the Save button to permanently make the changes, and a user typically may be returned to the review page. Up until that point, a user can undo each change that the user has made by clicking the Undo button, or abort the process entirely by clicking the Exit button. As with the Exemplary embodiments. Highlight Page, a user can play (with highlighting) starting on any word by clicking that word (in the top half of the page), and a user can pause and resume playing by clicking the PLAY/PAUSE button or by typing a space. Move the slider to adjust the speed of playback. Uncheck autoplay to play one word at a time. Check repeat to play the same word over and over.

Exemplary embodiments. In the Manage Audio submenu. Play verses Click Play Verses to produce a Exemplary embodiments. Highlight Page with an audio source a user specify and verses a user select. Choose an audio source from the list of all available sources. If a user want to review of the user own audio, choose of the user username. Then select the verses a user wish to play. Selection is identical to that for Record verses, but the color-coding of the parsha list is different: orange (for example) if there are no available verses, orange-red (for example) if there are some, brown (for example) if all verses are available but not with proper ending (sof pasuq or sof aliyah), and black if all verses are available with their proper endings. Any verses whose audio is not available from the chosen source typically may be grayed out on the Exemplary embodiments. Highlight Page.

Exemplary embodiments. Show verses. Click Show Verses to produce a Exemplary embodiments. Handout Page. with the verses a user select. Selection is identical to that for Record verses, but there is no color-coding of the parsha list.

Exemplary embodiments. Manage tutors. The Manage Tutors submenu allows a user to assign tutors to students. Until a user assign a tutor to a student, a user are the de facto tutor. To add a tutor, a user may click Add Tutor; enter their email address or, if a user know it, their username on our system. The system typically may send the tutor an email announcing their new role and typically may include a link to complete their registration if they're not a current user. The system typically may show a user the tutor's profile page, where a user can assign students to the tutor. To get the profile page of an existing tutor, choose them from the drop-down list or a user may click Edit Tutor.

Exemplary embodiments. Manage Students. The Manage Students submenu allows a user to add students, assign their parshot and their readings, monitor their learning, and provide feedback.

Exemplary embodiments. Choose a bar/bat mitzvah service and assign student(s). Choose an Audio Default from the drop-down list. If the user has recorded or uploaded any audio to the system, a user typically may see of the user username as one of the choices. By default, of the user students typically may hear of the user selected Audio Default when they listen to verses, but a user can change the audio source for an individual student by selecting the student from the Student drop-down list or clicking Edit Student and selecting from the Audio drop-down list on the Exemplary embodiments. Student Profile Page.

Click Assign Parsha to see of the user shul's calendar from which a user can select a service. a user typically may click on the top left date to input an approximate service date and then hit enter to navigate to that date, then use < or > at the top if needed to further navigate. a user may click on the desired service. Exemplary embodiments. Showing the selected service's standard aliyot. On this page a user can select entire aliyot or arbitrary sets of verses, choose to change where sof aliyahs occur, and assign selections to students. The checkbox next to each verse does not select it; it merely indicates whether the verse is the last verse of an aliyah.

Exemplary embodiments. Select a set of verses to assign to the student. If a user find that the upper left assignment box is in of the user way, a user can make it disappear by clicking its upper left hamburger. Clicking again typically may make it reappear. Similarly, a user can a user may click the lower left hamburger to make the footer, which includes navigation to the aliyot, disappear/reappear.

Exemplary embodiments. To select a single aliyah, a user may click on the aliyah's title. To select a single verse, a user may click on that verse. To select a sequence of verses, a user may click on the first one and shift-click on the last, or a user may click on the first and a user may drag to the last before releasing the mouse button. To select non-contiguous verse, use control-click (alt-click on Mac) to add or remove aliyot or verses from of the user selection.

Exemplary embodiments. Once a user have selected verses for a student, a user may click on that student's row in the assignment box, or, if there is no such row, enter the student's email address (or, if already a user, the username or full name) in the assignment box's text box labeled New Student to Add and Assign and hit enter or a user may click Add. The page typically may redisplay with the assignment indicated in color and the assigned student now listed in the same color in the assignment box. Optionally, repeat the procedure to assign portions to additional students. Note that if a user assign an already-assigned verse to a student, it typically may be removed from the other student's assignment. a user can remove verses from a student's assignment by selecting those verses and clicking on the student's row in the upper left box. When a user are done with the parsha, a user may click EXIT in the assignment box. Note that if a user have any verses selected when a user a user may click EXIT, or if the user has made unsaved changes to any sof aliyah checkboxes the system typically may ask for confirmation before returning to of the user home page.

Exemplary embodiments. Add students. Add a student by clicking Add Student. Enter the student's email address or, if an existing user whose username a user know, their username. The system typically may send them an email announcing their new role and typically may include a link to complete their registration if they're not already an existing user. The system typically may show a user their Exemplary embodiments. Student Profile Page, where a user can add and remove parents, assign them a shul service, assign them a portion, and select an audio source for them to listen to.

Exemplary embodiments. View and update student information. Select a Student from the drop-down list of the user students or a user may click Edit Student to view and update their Exemplary embodiments. Student Profile Page. As of the user student's cantor, a user can determine who are designated as their parents, assign a shul service, assign a portion, and select an audio source for them to listen to. If not assigned them a tutor, a user can also provide their Tutor's Selection.

Exemplary embodiments. Note that this provides an alternate method for choosing a bar/bat mitzvah service for of the user student and assigning a portion. But if a user have students sharing a bar/bat mitzvah service, or if an assigned portion is not a standard aliyah, a user should use Choose Parsha, described above.

Exemplary embodiments. Review student's recordings. Select a Student from the drop-down list of the user students, then a user may click Student's Recordings to see a list of recordings of the user student has made. Recordings may be listed chronologically with the latest first. Clicking a Play button shows a page similar to the page shown to of the user student during the recording, with the recorded verses highlighted.

Exemplary embodiments. Control the display mode and the audio with controls at the bottom of the page. a user can see and make comments about the recording by clicking the Comments button at the bottom of the page to toggle the display of the Comments Strip. for that recording. When a user are done entering of the user comment, a user may click Submit comment; a user typically may then have an opportunity to record a supplementary audio comment by clicking Record audio supplement. Return to the list of the user student's recordings by clicking Return to list at the bottom of the page. As the recording now has a comment, a user typically may see a Comments button in the Actions column for that recording. Clicking Comments typically may display the Comments Strip. for that recording immediately below the Comments button a user just clicked, but a user can a user may drag it wherever a user want and expand it as well. Clicking Comments again typically may make it disappear.

Exemplary embodiments. Tutor. Select of the user Student from the drop-down list. View student profile and select verses for study. See of the user student's information and make a "tutor's selection" of verses from the student's parsha by clicking Edit Student. See Exemplary embodiments. Student Profile Page.

Exemplary embodiments. See and listen to student's parsha. Click Play Student's Verses to see and hear of the user student's Exemplary embodiments. Highlight Page. Click Display Student's Handout to see of the user student's Exemplary embodiments. Handout Page.

Exemplary embodiments. Review student's recordings. Click See Student's Recordings to see the list of recordings of the user student has made. To hear a recording and give feedback, a user may click the Play button next to that recording in the list. For more details, see cantor's Exemplary embodiments. Review student's recordings.

Exemplary embodiments. Student. View and edit of the user profile and select verses for study. Click My Profile to see and edit of the user information and make a "student's selection" of verses from of the user parsha. See Exemplary embodiments. Student Profile Page.

Exemplary embodiments. See and listen to parsha; trope lessons. Click Play Verses to get an Exemplary embodiment Highlight Page of the user assigned portion, or the entire parsha if a user have not yet been assigned a portion. The navigation links at the bottom of the page may allow a user to play a selection chosen by of the user tutor or by a user (see Exemplary embodiments. Student Profile Page), or the full parsha. The voice a user hears has been chosen by of the user cantor.

Exemplary embodiments. Click Display Handout to see Exemplary embodiments. Handout Page. for of the user assigned portion or of the user entire parsha.

Exemplary embodiments. Record verses and review recordings Click Record Verses to record sections of the user parsha. If a user haven't granted permission to use of the user microphone, a user typically may be asked to do so. Once the user has given the system microphone permission, a user typically may see of the user parsha, with of the user assigned portion highlighted. Note that a horizontal rule indicates that the immediately previous verse should be chanted with sof aliyah.

Exemplary embodiments. Select to view AsSpoken Hebrew, AsWritten Hebrew, or English Transliteration with the checkboxes at the bottom of the page. Select which verse(s) a user want to record by clicking, shift-clicking, control-clicking (alt-clicking on Mac), or click-drag-release, then a user may click the microphone icon to begin of the user recording, and a user may click it again to terminate the recording.

Exemplary embodiments. System play and/or word-by-word highlight the selected verses while a user recording by checking the Sound and/or Highlight checkboxes at the bottom of the page, and a user control the playback rate with the slider. Then, when a user a user may click the microphone icon to begin of the user recording, the display typically may change so that the unselected verses are grayed out and the screen typically may automatically scroll in synchrony with the play/highlight. When a user a user may click the microphone icon again to terminate of the user recording, the display typically may revert to its previous state. We recommend that a user use headphones when checking Sound to avoid microphone pickup. To review of the user recordings, a user may click My Recordings on the hamburger menu to see a list of all of the user recordings, each with a Play button.

Exemplary embodiments. If anyone has provided feedback on any of of the user recordings, a user typically may also see Comments buttons next to those recordings Clicking a Comments button displays a Comments Strip. for the corresponding recording. There is a Comments button at the bottom of the playback page a user get when a user a user may click a Play button, allowing a user to enter of the user own comments even if no one else has.

Exemplary embodiments. Parent. If the user has been designated a parent by of the user child's cantor, a user typically may be able to monitor of the user child's progress. If a user have more than one child, a user should select a Child from the drop-down list.

Exemplary embodiments. View child's profile. User child's information by clicking Child's Profile. See Exemplary embodiments. Student Profile Page. See and listen to child's parsha. Click Play Child's Verses to see and hear Exemplary embodiments. Highlight Page for of the user child's assignment. Click Display Child's Handout to see Exemplary embodiments. Handout Page. for of the user child's assignment. Exemplary embodiments. Listen to child's recordings. Click See Child's Recordings to see the list of recordings of the user child has made and see if anyone has commented on any of them. To hear a recording, a user may click the Play button next to that recording in the list. If anyone has commented on a recording, a user can see those comments by clicking Comments next to that recording. a user may also make comments on of the user child's recordings. For more details, see cantor's Exemplary embodiments. Review student's recordings.

Exemplary embodiments. Gabbai. Manage services. If a user is gabbai for more than one shul, a user should select a Shul from the drop-down list. The system typically may remember of the user choice when a user log out. Click Calendar to see the calendar of upcoming services. Each calendar box represents a Gregorian day, and within that day are up to three services: shacharit (background in pink, for dawn), mincha (background in yellow, for sun), maariv (background in aqua, for dusk). (To see additional dates, a user can hover near the left or right edge near the top to reveal < or > which a user can a user may click to display the previous or next calendar portion. However, past readings and future readings beyond those initially shown cannot be opened.)

Exemplary embodiments. Click on a service to get a list of readings for that service. Depending on the status of the readings, a user have a variety of actions a user can perform. If none of the readings are Open (for claiming), a user can a user may click an Open button to open an individual reading or a user may click the Open All button to open them all at once. If there is an Open reading, a user can a user may click its Close button to close it. If there is a Pending reading, a user can a user may click its Approve button to approve the claim, a user may click the Reject button to reject the claim, a user may click the Endorse button to approve the claim and preapprove all other claims by the same reader, a user may click Show Readings for . . . to see the chronological list of that reader's upcoming readings at of the user shul, or a user may click in the Reader column to send an email to the reader.

Exemplary embodiments. For a Claimed reading, a user have most of the same options as for Pending, but not Approve or Endorse. For a Withdrawn or Rejected reading (which is considered Open to everyone except the former claimant), a user can Clear the reading to also open the reading to the former claimant, or Close the reading to all users.

Exemplary embodiments. Also, a user can a user may click the date to return to the calendar starting that week, or a user can a user may click < or > to advance to the readings list for the previous or next service. Note that, as gabbai, a user typically may get an email every time the status of a reading for of the user shul changes due to reader action. The email typically may include a link to the list of readings for the affected service.

Exemplary embodiments. Manage readers. If a user want to preapprove a reader, or to withdraw preapproval for a reader, a user may click Manage Readers. a user typically may see the list of readers for the selected Shul together with an Add Reader box. Pre-approved readers are highlighted on the list. To prea-pprove readers who are not highlighted, or to withdraw pre-approval for readers who are highlighted, control-click (alt-click on Mac) each of them. To pre-approve a reader not on the list, enter the new reader's email address or username in the Add Reader box. To submit of the user changes, hit Enter or a user may click Submit.

Exemplary embodiments. Note that withdrawing pre-approval does not affect the status of any readings, while preapproving a reader changes of the user shul's Pending readings that are claimed by that reader to Claimed. In either case, the reader is sent an email stating the change in pre-approval status. Clicking the Endorse button next to a Pending reading is the same as pre-approving the reader.

Exemplary embodiments. If a user want to change the status of readings when a user withdraw preapproval for a reader, a user should navigate to a service for one of those readings, a user may click Show Readings for . . . , and individually change the status of whichever readings a user choose.

Exemplary embodiments. Show Pending Readings. If a user want to see a list of Pending readings, i.e., those needing of the user approval or rejection, a user may click Show Pending Readings. Show Open Readings. If a user want to see a list of Open readings, i.e., those currently without a reader, a user may click Show Open Readings. Show Claimed Readings. If a user want to see a list of Claimed reading, i.e., those with a reader, a user may click Show Claimed Readings.

Exemplary embodiments. Reader. Volunteer to read. Find Shul Service on their homepage hamburger menu. But if a user want to claim a reading for a service at a shul the user has volunteered for in the recent past or one whose gabbai has pre-approved a user as a reader, a user can select that Shul from the drop-down list on of the user Reader menu or a user may click Calendar.

Exemplary embodiments. See claimed readings. Click My Readings on of the user Reader menu to see a chronological list of future readings for which you're listed as the Reader. Each row is a reading. a user may click in the Date column to see all the readings for that service. a user may click in the Verses column to see the Exemplary embodiments. Handout Page. for that reading. a user may click Withdraw if a user want to withdraw a user claim. Note that if the status of one of the user readings is changed by the gabbai, a user typically may get an email with a link to the list of readings for the affected service.

Exemplary embodiments. However, if the gabbai pre-approves a user as a reader for a shul, a user typically may simply get an email to inform you, and any of the shul's readings for which of the user claim is Pending typically may automatically become Claimed without further notice.

Exemplary embodiments. If the gabbai withdraws pre-approval for a user as reader, a user typically may also get an email, but the status of of the user readings typically may remain unchanged. That user's new claims for readings typically may require gabbai approval.

Exemplary embodiments. Highlight Page. The highlight page shows and plays verses, with each word highlighted as it is chanted. If the page is for a parsha (either the entire parsha or a single aliyah), there are links to each of the parsha's aliyot near the bottom of the page. The text is initially displayed in as-spoken Hebrew, but checkboxes near the bottom of the page allow a user to instead show the as-written Hebrew or an English transliteration.

Exemplary embodiments. Optionally, audio automatically continues to the next verse, but a user can have it stop at the end of a verse by unchecking autoplay at the very bottom of the page; or a user can have it continually repeat the same verse by checking repeat. a user can treat each word separately by checking chop, which causes the audio to pause briefly after each word (or to stop if autoplay is unchecked), in which case checking repeat continually repeats the same word.

Exemplary embodiments. The rightmost control allows a user to select a trope lesson from a drop-down list. When a user select a trope lesson, the segments of the verses matching the corresponding trope sequence are displayed in black while the rest of the text is displayed in gray. The matching segments are played, and the unit for autoplay and repeat is a single segment rather than a whole verse. To return to normal play, select the blank trope lesson at the top of the drop-down list.

Exemplary embodiments. Move the slider to adjust the speed of playback. Move the slider to adjust the speed of pitch of the voice of the playback. Type a space or a user may click the PAUSE/PLAY button to pause or resume playing. a user may click on a word to start playing at that word.

Exemplary embodiments. The up and down arrow keys or the scrollbar to scroll the page.

Exemplary embodiments. The title, links, and the Hebrew and AsWritten controls disappear from the page (or reappear) by clicking in the extreme lower left corner of the page.

Exemplary embodiments. As with many of the pages, a user can use the hamburger menu at the upper right to return to the main page (Home) or to Log Out. In this case there is also a menu item (Handout) that takes a user to the corresponding Exemplary embodiments. Handout Page. Note that if a user a user may click on Handout without selecting a particular aliyah, the handout may contain the entire parsha, while if the user has chosen a particular aliyah by clicking on one of the aliyah links, the handout typically may contain only that aliyah.

Exemplary embodiments. Handout Page. The handout page shows side-by-side the Hebrew text and an English translation of the selected verses. Following that is the tikkun for those verses. The page is designed to be printed with the Print link in the hamburger menu.

Exemplary embodiments. If Play is present in that menu, it brings a user to the corresponding Exemplary embodiments. Highlight Page.

Exemplary embodiments. Some browsers allow a user to control margins, headers, and footers when a user print; best results are obtained when a user minimize margins and don't print headers and footers. On some browsers it has been observed that best results are obtained by zooming up first, and selecting Shrink Page to Fit Page Width in the print setup. If of the user browser supports print preview, a user can adjust parameters interactively. Once the user has set the print parameters the way a user like, of the user browser may remember of the user settings.

Exemplary embodiments. The handout page also has displayable navigation. Clicking the lower left hamburger toggles the in-page navigation.

Exemplary embodiments. Some handout pages have < and/or > at the top that a user can a user may click to get to the previous and/or next handout. And clicking on the date may return a user to the corresponding service page or calendar.

Exemplary embodiments. Student Profile Page. Each student has a profile page that shows information about the student. The page is accessed from of the user home page by clicking My Profile if a user is the student, Child's Profile if a user are a parent, and Edit Student if a user are the tutor or cantor.

Exemplary embodiments. One of the figures above shows the profile of a newly assigned student before he completes his registration, as seen by his cantor. The Charged entry, visible only to the cantor, indicates when the shul was last charged for the student. Charging occurs when the student is first assigned a parsha, and changes can be made to Shul, Date, and Service without further charge for one year after that date.

Exemplary embodiments. Another figure above shows the profile of the same student, as seen by himself just after he registered.

Exemplary embodiments. Some of the information is read-only and shown with a gray background. The modifiable entries, with white background, depend on the role of the user relative to the student (cantor, tutor, student, parent). Blank read-only entries are elided.

Exemplary embodiments. The entries Assigned Portion, Tutor's Selection, and Student's Selection are special. Clicking on any of them shows the student's parsha, with the selected verses (if any) highlighted. Horizontal rules indicate the ends of readings. By default, readings coincide with aliyot, but the cantor can override that. Below is the result of stu clicking on Student's Selection.

Exemplary embodiments. Checkboxes at the bottom of the page allow a user to choose between AsSpoken Hebrew, AsWritten Hebrew, and Transliteration. To the left of the checkboxes is the entry name, and to the right is the CANCEL button which returns to the profile. Only if the entry was modifible does the UPDATE button appear just to the left of the entry name. In that case, a user can change the verse selection by click-drag-release on verses. If a user have the control key (alt key on Mac) depressed when a user release, the newly selected verses typically may be removed from or added to the selection depending on whether they were already present. Otherwise, if the shift key is depressed, the newly selected verses typically may be added to the selection and any gaps typically may be filled in, resulting in a single contiguous set of verses. If neither control (alt on Mac) nor shift is depressed, the newly selected verses typically may become the selection. Click-release on an aliyah title is equivalent to click-drag-release over all the verses of the aliyah. Clicking UPDATE typically may return to the profile and replace the old entry with the current selection, but a user may click one of the submit buttons at the bottom of the profile to effect the change.

Exemplary embodiments. Links at the top of the profile provide shortcuts to the student's Exemplary embodiments. Highlight Page, exemplary embodiments. Handout Page. If he's made any recordings, his list of recordings. Submit buttons at the bottom submit the profile updates and then shortcut to those same pages.

Exemplary embodiments. Comments Strip. The Comments Strip is a scrollable, draggable and resizeable region showing chronologically ordered comments followed by a text box for entering a new comment. Each comment can be headed by its creation date and time, its author, and, if a user are the author, an Edit button to allow a user to edit the text. If there is an associated audio comment, the comment text is followed by an audio widget to play the audio, and, if a user are the author, a DELETE button for deleting the audio. If there isn't an associated audio comment and a user are the author, a user typically may see a Record Audio Supplement button which a user can a user may click to record an associated audio comment.

Exemplary embodiments. To make a new comment, a user may click inside the text box at the bottom of the Comments Strip, enter of the user text, and a user may click the Submit Comment button. Clicking the Record Audio Supplement button may bring up a Flash Settings box where a user allows microphone access in order to proceed.

Exemplary embodiments. Once the user has granted microphone access, the Record audio supplement button is replaced by a microphone icon. A user may click the microphone icon to start the recording, and a user may click it again to complete it. The red area of the microphone icon should fluctuate as a user record. A user may click the DELETE button. Clicking the Edit button replaces the comment text with an editable text box initially containing that text. A user may make any edits a user like in the text area. Clicking the Edit button a second time turns the contents of the text box back into the (edited) comment.

Exemplary embodiments. Comments buttons can be found on several pages. Clicking a Comments button displays the associated Comments Strip, and clicking it again makes the strip disappear without saving any in-progress text or audio comments. So be sure to complete any comment a user want to save, either by clicking Submit comment to submit a new comment, clicking Edit a second time to complete an edit, or clicking the microphone icon a second time to complete a recording. A user may drag the Comments Strip, a user may click anywhere on its gray border and a user may drag the user mouse with the button depressed. To a user may resize the Comments Strip, a user may click just inside its gray border on the right or bottom and a user may drag the user mouse with the button depressed. To a user may resize a text box within the Comments Strip, a user may click on the area just inside its bottom right corner and a user may drag of the user mouse with its button depressed.

X. Embodiments Displaying Using CSS

Exemplary embodiments may include a step of displaying, using an at least one CSS inline-block element. In CSS, display can have values of inline and inline-block. For example, inline-block may be placed as inline, but behave as a block. How to explain what "behave as a block" means. An exemplary explanation of differences between inline and inline-block:

X.A. Inline Elements:

I. respect left & right margins and padding, but not top & bottom

II. cannot have a width and height set

III. allow other elements to sit to their left and right.

X.B. Block Elements:

I. respect all of those

II. force a line break after a block element

X.C. Inline-block elements:

I. allow other elements to sit to their left and right

II. respect top & bottom margins and padding

III. respect height and width

Another exemplary explanation, others may be possible:

I. An inline element may have no line break before or after it, and it tolerates HTML elements next to it.

II. A block element may have some whitespace above and below it and does not tolerate any HTML elements next to it.

III. An inline-block element may be placed as an inline element (on a same line as adjacent content), but it behaves as a block element.

Another exemplary explanation. Inline: can display things before or after it, on a same line. block: demands its own line, with whitespace around it. inline-block: can have elements before or after it, but there may be whitespace around it. So inline-block may be not "inline but behaves like block," it's a combination of both, as a name would imply: on a same line, but may have borders.

Another exemplary explanation. Block: Takes up entire line+enforces whitespace specified around it in all directions. Inline-block: Happy with whitespace above and below, but not left and right. Does not take up entire line. Content fitted on same line until reaches a end of a line, then new content goes on a new line. Inline: Not agreeing to whitespace. Don't start a new line, wrap content to next line if need be.

Another exemplary explanation. display: inline-block. An inline block may be placed inline (i.e. on a same line as adjacent content), but it behaves as a block. For example, to give an inline element a width. In some circumstances some browsers may not allow a width on a real inline element, but using display: inline-block provides an option to set a width. Difference with display: inline Here. An inner element does not form a block at all but gets its dimensions from an outer block and a way a text wraps.

These elements are "inline", hereinafter an at least one "Inline Element":

TABLE 31

| Depicts exemplary in-line elements.<br>X.D. Inline Elements |
|---|
| b, big, i, small, tt |
| abbr, acronym, cite, code, dfn, em, kbd, strong, samp, var |
| a, bdo, br, img, map, object, q, script, span, sub, sup |
| button, input, label, select, textarea |

Exemplary embodiments may include a step of transforming said transliteration symbolic representation, using an at least one css transform to create a mirror-cantillated transliteration symbolic representation or transforming, using an at least one css transform selected from a group of "-webkit-transform:scaleX(−1);" and "transform:scaleX(−1);", said transliteration symbolic representation to create a mirror-cantillated transliteration symbolic representation. Exemplary embodiments may include a step of transforming, using an at least one vendor prefix, said transliteration symbolic representation to create a mirror-cantillated transliteration symbolic representation.

Exemplary embodiments may include a step of transforming, wherein said at least one css transform comprises "transform: rotateY(180 deg)". Exemplary embodiments may include a step of transforming, wherein said at least one css transform comprises "transform:scaleX(−1)".

Exemplary embodiments may include a step of transforming, using an at least one vendor prefix selected from a group of "-webkit-transform", "-moz-transform", "-o-transform", and "transform", said transliteration symbolic representation to create a mirror-cantillated transliteration symbolic representation.

Exemplary embodiments may include a step of transforming, using an at least one vendor prefix selected from a group of "-webkit-transform:scaleX(−1);", "-moz-transform:scaleX(−1);", "-o-transform:scaleX(−1);", and "transform:scaleX(−1);", said transliteration symbolic representation to create a mirror-cantillated transliteration symbolic representation.

An exemplary explanation of css transform, others may be possible, this may be exemplary.

This span may be an inline element. HTML (Hypertext Markup Language) elements may be usually "inline" elements or "block-level" elements. An inline element occupies only a space bounded by a tags that define a inline element. Inline vs. block-level Content model. Generally, inline elements may contain only data and other inline elements.

Formatting. By default, inline elements do not begin with new line.

An exemplary explanation of css transform. With CSS3 came new ways to position and alter elements, and/or ways to size, position, and change elements. New techniques possible using transform property. A transform property comes in two different settings, two-dimensional and three-dimensional. Each of these come with their own individual properties and values. Two-dimensional and three-dimensional transforms. Transform Syntax. Actual syntax for a transform property typically can be a transform property followed by a value. A value specifies a transform type followed by a specific amount inside parentheses.

For example.

```
span {
  webkit-transform: scaleX(−1);
    moz-transform: scaleX(−1);
      o-transform: scaleX(−1);
        transform: scaleX(−1);
```

Notice how this exemplary embodiment of a transform property includes multiple vendor prefixes for an at least one browser. A un-prefixed declaration comes last to overwrite prefixed versions, should a browser fully support transform property. Other embodiments may omit vendor prefixes.

These are exemplary embodiments. 2D Transforms. Elements may be distorted, or transformed, on both a two-dimensional plane or a three-dimensional plane. Two-dimensional transforms work on x and y axes, known as horizontal and vertical axes. Three-dimensional transforms work on both x and y axes, as well as z axis. These three-dimensional transforms help define not only a length and width of an element, but also a depth. How to transform elements on a two-dimensional plane, and then work our way into three-dimensional transforms. 2D Rotate. A transform property accepts a handful of different values. A rotate value provides ability to rotate an element from 0 to 360 degrees. Using a positive value will rotate an element clockwise, and using a negative value will rotate an element counterclockwise. A default point of rotation may be a center of element, 50% 50%, both horizontally and vertically.

Exemplary embodiments may include a step of receiving a transliteration symbolic representation of an at least one Hebrew Bible verse, said transliteration symbolic representation comprising an at least one cantillation symbol delineated using an at least one HTML class Attribute. Exemplary embodiments may include a step of transforming, using said at least one HTML class Attribute, said transliteration symbolic representation to create a mirror-cantillated transliteration symbolic representation. In these exemplary embodiments below, an example provides for an HTML class attribute that may be arbitrarily named "trope". That name may be exemplary and choice of name for a class attribute may be arbitrary.

```
span.trope {
  webkit-transform: rotateY(180deg);
    moz-transform: rotateY(180deg);
      o-transform: rotateY(180deg);
        transform: rotateY(180deg);
}
```

These are exemplary embodiments. 2D Scale. Using a scale value within a transform property allows to change a appeared size of an element. A default scale value may be 1, therefore any value between 0.99 and 0.01 makes an element smaller while any value greater than or equal to 1.01 makes an element larger. it may be possible to scale only a height or width of an element using a scaleX and scaleY values. A scaleX value will scale a width of an element while a scaleY value will scale a height of an element. To scale both a height and width of an element but at different sizes, a x and y axis values may be set simultaneously. To do so, use a scale transform declaring x axis value first, followed by a comma, and then y axis value.

```
css-selector-name
  transform: scale(1.3,1.3);
}
.exemplary-html-class-name {
  transform: scale(1.25);
}
.large-html-class-name {
  transform: scale(2);
}
.translit-class-name {
  transform: scale(0.75);
}
#arbitrary-html-id-name {
transform: scaleX(1.4);
}
.another-html-class-name {
  transform: scaleY(1.35);
}
```

These are exemplary embodiments. 2D Translate. A translate value works a bit like that of relative positioning, pushing and pulling an element in different directions without interrupting a normal flow of a document. Using a translateX value will change a position of an element on a horizontal axis while using a translateY value will change a position of an element on a vertical axis.

These are exemplary embodiments. As with a scale value, to set both x and y axis values at once, use a translate value and declare x axis value first, followed by a comma, and then y axis value. A distance values within a translate value may be any general length measurement, such as pixels or percentages. Positive values will push an element down and to a right of its default position while negative values will pull an element up and left of its default position.

These are exemplary embodiments. 2D Skew. Another transform value in a group, skew, may distort elements on a horizontal axis, vertical axis, or both. A syntax may be similar to that of a scale and translate values. Using a skewX value distorts an element on a horizontal axis while a skewY value distorts an element on a vertical axis. To distort an element on both axes using a skew value, declaring x axis value first, followed by a comma, and then y axis value. A distance calculation of a skew value can be measured in units of degrees.

Skew may have been used in exemplary embodiments to correct or to make more precise placement of cantillation in transliterated symbolics. Skew may have used in exemplary embodiments to fashion a cantillation mark from a similar cantillation mark, where similarity comprises except for skew orientation.

These are exemplary embodiments. Combining Transforms. Multiple transforms may have used at once, rotating and scaling a size of an element at a same time for example. In this event multiple transforms can be combined together. To combine transforms, list a transform values within a transform property one after another without a use of commas. Using multiple transform declarations will not work, as each declaration will overwrite a one above it. A behavior in that case would be a same as setting a height of an element numerous times. This exemplary transform can flip a cantillation symbol on its vertical axis (using rotateY), then flips it back (using scaleX), and then enlarges a symbol by 25% (using scale). A step of flipping it using scaleX can be referred to as flipping it horizontally or rotating it on a vertical axis.

```
.html-class-name {
  transform: rotateY(180 deg) scaleX(−1) scale(1.25);
}
```

These are exemplary embodiments. Combining Transforms Demo. Behind every transform there may be also a matrix explicitly defining a behavior of a transform. Using a rotate, scale, transition, and skew values provide a way to establish this matrix. Transform Origin. A default transform origin may be a dead center of an element, both 50% horizontally and 50% vertically. To change this default origin position a transform-origin property may have used. A transform-origin property can accept one or two values. When only one value may be specified, that value may have used for both a horizontal and vertical axes. If two values may be specified, a first may have used for a horizontal axis and a second may have used for a vertical axis. Individually a values may be treated like that of a background image position, using either a length or keyword value. That said, 0 0 may be a same value as top left, and 100% 100% may be a same value as bottom right. More specific values can also be set, for example 20 px 50 px would set an origin to 20 pixels across and 50 pixels down an element.

Exemplary embodiments may include a step of receiving a transliteration symbolic representation of an at least one Hebrew Bible verse, said transliteration symbolic representation comprising an at least one cantillation symbol delineated using an at least one HTML class Attribute. Exemplary embodiments may include a step of transforming, using said at least one HTML class Attribute, said transliteration symbolic representation to create a mirror-cantillated transliteration symbolic representation. Exemplary embodiments may include a step of receiving a transliteration symbolic representation of an at least one Hebrew Bible verse, said transliteration symbolic representation comprising an at least one cantillation symbol delineated by an at least one css selector selected from a group of an at least one html element or an at least one HTML span tag; Exemplary embodiments may include a step of transforming, using said at least one css selector, said transliteration symbolic representation to create a mirror-cantillated transliteration symbolic representation.

TABLE 7

Exemplary Predetermined List of CSS Selectors.

| Selector | Example | Example description |
|---|---|---|
| .class | .intro | Selects all elements with class="intro" |
| #id | #firstname | Selects the element with id="firstname" |
| * | * | Selects all elements |
| element | p | Selects all <p> elements |
| element,element | div, p | Selects all <div> elements and all <p> elements |
| element element | div p | Selects all <p> elements inside <div> elements |
| element>element | div > p | Selects all <p> elements where the parent is a <div> element |
| element+element | div + p | Selects all <p> elements that are placed immediately after <div> elements |
| element1~element2 | p ~ ul | Selects every <ul> element that are preceded by a <p> element |
| [attribute] | [target] | Selects all elements with a target attribute |
| [attribute=value] | [target=_blank] | Selects all elements with target ="_blank" |
| [attribute~=value] | [title~=flower] | Selects all elements with a title attribute containing the word "flower" |
| [attribute\|=value] | [lang\|=en] | Selects all elements with a lang attribute value starting with "en" |
| [attribute^= value] | a[href^="https"] | Selects every <a > element whose href attribute value begins with "https" |

TABLE 7-continued

Exemplary Predetermined List of CSS Selectors.

| Selector | Example | Example description |
|---|---|---|
| [attribute$=value] | a[href$=".pdf"] | Selects every <a> element whose href attribute value ends with ".pdf" |
| [attribute*=value] | a[href* = "cantillati on"] | Selects every <a> element whose href attribute value contains the substring "cantillation" |
| :active | a:active | Selects the active link |
| ::after | p::after | Insert something after the content of each <p> element |
| ::before | p::before | Insert something before the content of each <p> element |
| :checked | input:checked | Selects every checked <input> element |
| :disabled | input:disabled | Selects every disabled <input> element has |
| :empty | p:empty | Selects every <p> element that no children (including text nodes) |
| :enabled | input:enabled | Selects every enabled <input> element |
| :first-child | p:first-child | Selects every <p> element that is the first child of its parent |
| ::first-letter | p::first-letter | Selects the first letter of every <p> element |
| ::first-line | p::first-line | Selects the first line of every <p> element |
| :first-of-type | p:first-of-type | Selects every <p> element that is the first <p> element of its parent |
| :focus | input:focus | Selects the input element which has focus |
| :hover | a:hover | Selects links on mouse over |
| :in-range | input:in-range | Selects input elements with a value within a specified range |
| :invalid | input:invalid | Selects all input elements with an invalid value |
| :lang(language) | p:lang(it) | Selects every <p> element with a lang attribute equal to "it" (Italian) |
| :last-child | p:last-child | Selects every <p> element that is the last child of its parent |
| :last-of-type | p:last-of-type | Selects every <p> element that is the last <p> element of its parent |
| :link | a:link | Selects all unvisited links |
| :not(selector) | :not(p) | Selects every element that is not a <p> element |
| :nth-child(n) | p:nth-child(2) | Selects every <p> element that is the second child of its parent |
| :nth-last-child(n) | p:nth-last-child(2) | Selects every <p> element that is the second child of its parent, counting from the last child |
| :nth-last-of-type(n) | p:nth-last-of-type(2) | Selects every <p> element that is the second <p> element of its parent, counting from the last child |
| :nth-of-type(n) | p:nth-of-type(2) | Selects every <p> element that is the second <p> element of its parent |
| :only-of-type | p:only-of-type | Selects every <p> element that is the only <p> element of its parent |
| :only-child | p:only-child | Selects every <p> element that is the only child of its parent |
| :optional | input:optional | Selects input elements with no "required" attribute |
| :out-of-range | input:out-of-range | Selects input elements with a value outside a specified range |
| :read-only | input:read-only | Selects input elements with the "readonly" attribute specified |
| :read-write | input:read-write | Selects input elements with the "readonly" attribute NOT specified |
| :required | input:required | Selects input elements with the "required" attribute specified |
| :root | :root | Selects the document's root element |
| ::selection | ::selection | Selects the portion of an element that is selected by a user |
| :target | #news:target | Selects the current active #news element (clicked on a URL containing that anchor name) |
| :valid | input:valid | Selects all input elements with a valid value |
| :visited | a:visited | Selects all visited links |

These are exemplary embodiments. CSS Selectors. CSS selectors such as any of those shown in Table 7 allow to select and manipulate HTML elements. CSS selectors may have used to "find" (or select) HTML elements based on their id, class, type, attribute, and more. An element Selector. An element selector selects elements based on an element name. Can select all <p> elements on a page like this (in this case, increasing a font-size):

Example

```
p {
  font-size: 1.25 em;
}
```

In this example, list elements may be increased in size more if them may be Hebrew than if transliteration. A Hebrew may have vowels.

```
li.translit {font-size:1.5 em; } li.hebrew {font-size:2 em;
}
```

These are exemplary embodiments. jQuery css( ) Method. A css( ) method sets or returns one or more style properties for a selected elements. Return a CSS Property. To return a value of a specified CSS property, use this exemplary syntax: css("propertyname");

Following example will return a background-color value of a FIRST matched element:

Example

```
if ($(this).css('color') !=gray) . . . .
```

These are exemplary embodiments. Set a CSS Property. To set a specified CSS property, use this exemplary syntax: css("propertyname","value");

This example sets a font-size value for a current verse for all matched elements:

Example: cv.css('font-size','1em');

These are exemplary embodiments. Set Multiple CSS Properties. To set multiple CSS properties, use this exemplary syntax: css({"propertyname":"value","propertyname":"value", . . . });

This example will set a background-color and a font-size for ALL matched elements:

Example

```
$("p").css({"background-color": "yellow", "font-size": "200%"});
```

These are exemplary embodiments. An id Selector. An id selector at times uses an id attribute of an HTML element to select a specific element. An id should be unique within a page, so an id selector may have used if want to select a single, unique element. To select an element with a specific id, write a hash character, followed by an id of an element. A style rule below will be applied to a HTML element with id="para1":

Example

```
#para {
  text-align: center;
  color: red;
}
```

These are exemplary embodiments. A class Selector. A class selector selects elements with a specific class attribute. To select elements with a specific class, write a period character, followed by a name of a class: In example below, all HTML elements with class="center" will be red and center-aligned: can also specify that only specific HTML elements should be affected by a class.

Example

```
.center {
  text-align: center;
  color: red;
}
```

In example below, all <p> elements with class="center" will be center-aligned:

Example

```
p.center {
  text-align: center;
  color: red;
}
```

These are exemplary embodiments. Grouping Selectors. If can be elements with a same style definitions, like this:

```
h1 {
  text-align: center;
  color: red;
}
h2 {
  text-align: center;
  color: red;
}
p {
  text-align: center;
  color: red;
}
```

Can group a selectors, to minimize a code. To group selectors, separate each selector with a comma. In example below group a selectors from a code above:

Example

```
h1, h2, p {
  text-align: center;
  color: red;
}
```

These are exemplary embodiments. An HTML <span> element may be a generic inline container for phrasing content. It can be may have used to group elements for styling purposes (using a class or id attributes), or because they share attribute values. <div> may be a block-level element whereas a <span> may be an inline element. div may be a block element, span may be inline. This means that to use them semantically, divs can be may have used to wrap sections of a document, while spans can be may have used to wrap small portions of text, images, etc.

In exemplary embodiments an HTML inline element comprises an at least one HTML inline element selected from the group of "b", "big", "i", "small", "tt", "abbr", "acronym", "cite", "code", "dfn", "em", "kbd", "strong", "samp", "var", "a", "bdo", "br", "img", "map", "object", "q", "script", "span", "sub", "sup", "button", "input", "label", "select", "textarea".

These are exemplary embodiments. HTML Block and Inline Elements. Every HTML element may have a default display value depending on what type of element it may be. A default display value for at least some elements may be block or inline.

X.E. Block-Level Elements

A block-level element starts on a new line and takes up a full width available (stretches out to a left and right as far as it can). A <div> element may be a block-level element.

Examples of block-level elements:

<div>
<h1>-<h6>
<p>
<form>

X.F. Inline Elements

These are exemplary embodiments. An inline element does not start on a new line and only takes up as much width as necessary. This may be an inline <span> element inside a paragraph. Examples of inline elements:

<span>
<a>
<img>

These are exemplary embodiments. <div> Element. <div> element may be a block-level element that may be often may have used as a container for other HTML elements. A <div> element may have no required attributes, but style and class may be common. When may have used together with CSS, a <div> element can be may have used to style blocks of content.

Example

```
<div style="text-align:center"><BIG>FIG. 15</BIG></div>
```

These are exemplary embodiments. <span> Element. <span> element may be an inline element that may be often may have used as a container for some text. A <span> element may have no required attributes, but style and class may be common. When may have used together with CSS, a <span> element can be may have used to style parts of a text:

Example

```
<h1>My <span style="color:red">Important</span>Heading</h1>
```

HTML Grouping Tags

Tag Description

<div> Defines a section in a document (block-level)
<span> Defines a section in a document (inline)

These are exemplary embodiments. Ways to Insert CSS. There may be three ways of inserting a style sheet: External style sheet, Internal style sheet and Inline style.

External Style Sheet. An html page includes a reference to a external style sheet file inside a <link> element. A <link> element goes inside a <head> section:

Example

```
<head>
<link rel="stylesheet" type="text/css" href="/sitemedia/static/css/singingtorah.min.css? v=1441149300.0"/>
</head>
```

An external style sheet can be written in any text editor. A file should not contain any html tags. A style sheet file must be saved with a .css extension.

An example of a style sheet file may be shown below:

```
span.t {
font-size:1.25 em; -webkit-transform:scaleX(−1); transform:scaleX(−1);
}
.translit span { display:inline-block;
}
.vn { font-size:.75 em; color:gray;
}
.translit.vn {
font-size:1 em; }
```

These are exemplary embodiments. Internal Style Sheet. An internal style sheet may have used if one single page may have a unique style. Internal styles may be defined within a <style> element, inside a head section of an HTML page.

```
<!DOCTYPE html>
<head>
<meta charset="utf-8" />
<style>
li {
list-style:none; }
li.et {text-align:left; font-size:2 em;
}
span.vn {
font-size:.5 em;
span.cv { font-size:.8 em;
}
li.hebrew {
text-align:right; font-size:3 em; direction:rtl;
}</style></head>
```

These are exemplary embodiments. Inline Styles. An inline style may have used to apply a unique style for a single element. To use inline styles, add a style attribute to a relevant element. A style attribute can contain any CSS property.

These are exemplary embodiments. Cascading Order. An inline style (inside a specific HTML element) may have a highest priority, which means that it will override a style defined inside a <head> tag, or in an external style sheet, or a browser default value. Generally speaking styles "cascade" into a new "virtual" style sheet by this rules, where number one may have a highest priority: (1) Inline style (inside an HTML element), (2) External and internal style sheets (in a head section) and (3) Browser default.

These are exemplary embodiments. A font CSS property may be either a shorthand property for setting font-style, font-variant, font-weight, font-size, line-height and font-family, or a way to set an element's font to a system font, using specific keywords. As with any shorthand CSS properties, a values which may be not set in it may be set to their individual initial values, eventually overriding values previously set using non-shorthand properties. Alternatively, a CSS font property may refer to any CSS property pertaining to a font such as but not limited to font-size, font-stretch or line-height.

TABLE 32

| Depicts an exemplary CSS font property. |
|---|
| Initial value as each of a properties of a shorthand: |
| font-style: normal |
| font-variant: normal |
| font-weight: normal |
| font-stretch: normal |
| font-size: medium |
| line-height: normal |
| font-family: depends on user agent |
| Applies to all elements. It also applies to ::first-letter and ::first-line. |
| Inherited yes |
| Percentages as each of a properties of a shorthand: |
| font-size: refer to a parent element's font size |
| line-height: refer to a font size of an element itself |
| Media visual |
| Computed value as each of a properties of a shorthand: |
| font-style: as specified |
| font-variant: as specified |
| font-weight: a keyword or a numerical value as specified, with bolder and lighter transformed to a real value |
| font-stretch: as specified |
| font-size: as specified, but with relative lengths converted into absolute lengths |
| line-height: for percentage and length values, absolute length, otherwise as specified |
| font-family: as specified |
| Animatable as each of a properties of a shorthand: |
| font-style: no |
| font-variant: no |
| font-weight: yes, as a font weight |
| font-stretch: yes, as a font stretch |
| font-size: yes, as a length |
| line-height: yes, as a number, a length |
| font-family: no |
| Canonical order order of appearance in a formal grammar of a values |

TABLE 33

| Depicts an exemplary font CSS property. |
|---|
| Syntax |
| /* size \| family */ |
| font: 2em "Open Sans", sans-serif; |
| /* style \| size \| family */ |
| font: italic 2em "Open Sans", sans-serif; |
| /* style \| variant \| weight \| size/line-height \| family */ |
| font: italic small-caps bolder 16px/3 cursive; |
| /* a font may have used in system dialogs */ |
| font: message-box; |
| /* Global values */ |
| font: inherit; |
| font: initial; |
| font: unset; |
| a font shorthand property sets all a font properties in one declaration. |
| a properties that can be set, may be(in order): "font-style font-variant font-weight font-size/line-height font-family" |
| a font-size and font-family values may be required. If one of another values may be missing, a default values will be inserted, if any. |
| Note: a line-height property sets a space between lines. |
| Default value: a default value of all a font properties |
| Inherited: yes |
| Animatable: yes |
| JayaScript syntax: object.style.font="italic small-caps bold 12px arial,sans-serif" |

These are exemplary embodiments. Font Size. Set size of text may have used in an element by using a font-size property. font-size: value;

Such as: xx-large, x-large, larger, large, medium, small, smaller, x-small, xx-small, length, % (percent)

These are exemplary embodiments.

TABLE 34

| Depicts exemplary font-size property and/or exemplary font property. |
|---|
| Scalable vector outline. Build fonts that work at any size. Perhaps optimized for a creation of Flash-compatible pixel fonts. |
| Creating a pixel font. Just note three things: |
| 1. Use only a default square for drawing. |
| 2. When download font, in 'read_me.txt' information on an optimal pixel size for font in Flash. |
| 3. There's a special panel, accessible under "View" from a menu at a top of a screen, called "Pixel Preview". Current letter at a brick=pixel resolution: |
| Pixel Preview |
| Note that this panel, shows 1 black pixel for any brick on a canvas, whatever its shape, so it only provides an accurate preview for square pixels. |
| Using pixel font in flash and other software |
| How best to use pixel fonts, and how to avoid blurring. |
| Open source font creation tools and/or font editors may be available as may be free to use font creation tools and/or font editors with a large user base and many example custom fonts. |

TABLE 35

| Depicts exemplary font-size property and/or exemplary font property. |
|---|
| CSS Font-Size: em vs. px vs. pt vs. percent |
| Aspects of CSS styling may be a application of a font-size attribute for text scaling. In CSS, four different units by which can measure a size of text as it's displayed in a web browser. |
| Meet a Units |
| "Ems" (em): a "em" may be a scalable unit that may have used in web document media. An em may be equal to a current font-size, for instance, if a font-size of a document may be 12pt, 1em may be equal to 12pt. Ems may be scalable in nature, so 2em would equal 24pt.5em would equal 6pt, etc. |
| Pixels (px): Pixels may be fixed-size units that may have used in screen media (i.e. to be read on a computer screen). One pixel may be equal to one dot on a computer screen (a smallest division of screen's resolution). |
| Points (pt): Points may be traditionally may have used in print media (anything that may be to be printed on paper, etc.). One point may be equal to $\frac{1}{72}$ of an inch. Points may be much like pixels, in that they may be fixed-size units and cannot scale in size. |
| Percent (%): a percent unit may be much like a "em" unit, save for a few fundamental differences. First and foremost, a current font-size may be equal to 100% (i.e. 12pt = 100%). While using a percent unit, text remains fully scalable for mobile devices and for accessibility. |

TABLE 35-continued

| Depicts exemplary font-size property and/or exemplary font property. |
| --- |
| Generally, 1em = 12pt = 16px = 100%. When using these font-sizes, if increase a base font size (using a body CSS selector) from 100% to 120%. Both a em and percent units get larger as a base font-size increases, but pixels and points may not.<br>Em vs. Percent<br>Point and pixel units may not necessarily best suited for web documents, which leaves a em and percent units. In theory, both a em and a percent units may be identical, but in application, they actually differences.<br>In a example above, percent unit as our base font-size (on a body tag). If change base font-size from percent to ems (i.e. body { font-size: 1em; }). Let's see what happens when "1em" may be our body font-size, and when a client alters a "Text Size" setting of their browser.<br>Font-size as a client changes a text size in their browser. When a client's browser text size may be set to "medium," there may be no difference between ems and percent. When a setting may be altered, however, a difference may be quite large. On a "Smallest" setting, ems may be much smaller than percent, and when on a "Largest" setting, it's quite a opposite, with ems displaying much larger than percent. While some could argue that a em units may be scaling as they may be truly intended, in practical application, a em text scales too abruptly, with a smallest text becoming hardly legible on some client machines.<br>In theory, a em unit may be a new and upcoming standard for font sizes on a web, but in practice, a percent unit arguably may provide a more consistent and accessible display for users. When client settings have changed, percent text scales at a reasonable rate, allowing designers to preserve readability, accessibility, and visual design.<br>An exemplary winner: percent (%), however other embodiments are possible such as those mentioned above. |

These are exemplary embodiments.

Setting CSS Styles Using JavaScript. When it comes to styling some content, a at least some common way may be by creating a style rule and have its selector target an element or elements. A style rule would look as follows:

```
.torah-trope {
   width: 100 px;
   height: 100 px;
   background-color: #333;
}
```

An element that would be affected by this style rule could look like this:

```
<div class="torah-trope"></div>
```

These are exemplary embodiments. This isn't only approach to style content using CSS, though. It wouldn't be HTML if there weren't multiple ways to accomplish a same task! Aside from inline styles, another approach that to introduce elements to a goodness that may be CSS styling involves JavaScript. JavaScript directly can set a style on an element, and JavaScript can be may have used to add or remove class values on elements which will alter which style rules get applied.

These are exemplary embodiments. There may be many cases, especially as content gets more interactive, where styles dynamically kick in based on user input, some code having run in a background, and more. Pseudo-selectors like hover provide some support. JavaScript can style an interactive element or elements over a page. A Tale of Two Styling Approaches. To alter a style of an element using JavaScript. One way may be by setting a CSS property directly on an element. another way may be by adding or removing class values from an element which may result in certain style rules getting applied or ignored.

These are exemplary embodiments. Setting a Style Directly. HTML elements that JavaScript may have a style object. This object to specify a CSS property and set its value. For example, this may be what setting a background color of an HTML element whose id value may be cantillation looks like:

```
var myElement=document.querySelector("#cantillation");
myElement.style.backgroundColor="#D93600";
```

To affect many elements, for example, as follows:

```
var myElements=document. querySelectorAll(".tropes");
for (var i=0; i<myElements.length; i++) {
   myElements[i].style.opacity=0;
```

These are exemplary embodiments. In an exemplary embodiment, to style elements directly using JavaScript, a first step may be to access an element. querySelector method to make that happen. A second step may be just to find a CSS property and give it a value. Many values in CSS may be actually strings. Many values require a unit of measurement like px or em or something like that to actually get recognized.

These are exemplary embodiments. Special Casing Some Names of CSS Properties. JavaScript may be picky about what makes up a valid property name. At least some names in CSS would get JavaScript's seal of approval. There may be a few things to keep in mind, though. To specify a CSS property in JavaScript that contains a dash, simply remove a dash. For example, background-color becomes backgroundColor, a border-radius property transforms into borderRadius, and so on. Also, certain words in JavaScript may be reserved and can't be may have used directly. One example of a CSS property that falls into this special category may be float. In CSS it may be a layout property. In JavaScript, it stands for something else. To use a property whose name may be entirely reserved, prefix a property with css where float becomes cssFloat.

These are exemplary embodiments. Adding and Removing Classes Using JavaScript. A second approach involves adding and removing class values that, in turn, change which style rules get applied. For example, a style rule that looks as follows:

```
.disableMenu {
   display: none;
}
```

In HTML, a menu whose id may be dropDown:

```
<ul id="dropDown">
   <li>One</li>
   <li>Two</li>
   <li>Three</li>
   <li>Four</li>
   <li>Five</li>
   <li>Six</li>
</ul>
```

These are exemplary embodiments. Apply our .disable-Menu style rule to this element, add disableMenu as a class value to a dropDown element:

```
<ul class="disableMenu" id="dropDown">
  <li>One</li>
  <li>Two</li>
  <li>Three</li>
  <li>Four</li>
  <li>Five</li>
  <li>Six</li>
  </ul>
```

These are exemplary embodiments. To accomplish a same result using JavaScript, use a classList API. This API makes it simple to add or remove class values from an HTML element. To add a disableMenu class name to dropDown element, use a add method on a HTML element's classList property:

```
var theDropDown=document.querySelector("#dropDown");
theDropDown.classList.add("disableMenu");
```

These are exemplary embodiments. To remove a a disable-Menu class name, classList API's remove method:

```
var theDropDown=document.querySelector("#dropDown");
theDropDown.classList.remove("disableMenu");
```

These are exemplary embodiments. Conclusion. Two exemplary JavaScript-based approaches for styling elements. Of these two choices, if modify CSS, style elements by adding and removing classes. To add and remove style properties from a style rule in CSS as opposed to adding and removing lines of JavaScript.

TABLE 35

| Depicts exemplary alternative css frameworks and exemplary javascript frameworks and exemplary software development languages, libraries and/or platforms. |
|---|
| There exist alternative css frameworks and javascript frameworks. Such as any of this. |
| Snabbt.js may be a minimalistic Javascript animation library which allows to rotate, skey, translate, re-size and scale a design elements. Can opt for combining a transforms using matrix multiplication operations. Can set end result using CSS3 transform matrices. |
| D3.js stands for Data Driven Documents and may be a Javascript library serving as an excellent tool for manipulating data-based documents. Putting special emphasis on web standards, D3.js allows to add life to data using SVG, HTML and CSS. D3.js library offers flexibility of handling different types of content. |
| React.js may be an excellent Javascript library may have used for creating impressive user interfaces. Maintained by two renowned companies viz: Instagram and Facebook, React.js may have used by popular companies including Sony, Yahoo and Airbnb. Featuring a one-way data binding model, React.js can render static, seo-friendly versions of app pages on a server. |
| ECharts may be a Javascript charting library offering a way of adding interactive charts. Supporting column, radar, chord, funnel, force-directed chart types, line, map, pie, gauge and a combination of many of these in a single chart. A 'Drag-Recalculate' feature of ECharts allows to extract, integrate and exchange data among multiple charts; thereby helping in undertaking data mining and integration. Some other impressive features of this Javascript library include: Magic Switch, Data View, Combinations, Legend Switch, Area Zoom, Scale Roaming and many more. |
| Intercooler.js may be a Javascript library also serving as a natural HTML extended version. Using Javascript for communicating with a server, Intercooler.js sends AJAX requests in a syntax. |
| Turf.js may be a modular GIS engine written in Javascript, Turf.js performs geospatial processing tasks using a GeoJSON data. This javascript library may be compatible with server and browser. It takes a good advantage of a latest algorithms and doesn't expect to send data to a server. |
| Backbone.js offering a model portion of MVC, Backbone.js mainly deals with events, such as whether an object may be on or off, model methods including a getting or setting of an attribute. Backbone.js makes working with a model easier and convenient. |
| Rendr may be a small Javascript library developed by Airbnb and allows to run Backbone.js applications on client as well as a server. Rendr may be serving SEO-friendly and static HTML pages. Some of an at least some features included with Rendr may be: No server-side DOM, Minimize if (server) {....} else {...}, Simple Express middleware and many more. |
| Fancy Form may be a JavaScript Form library that makes it possible to add own type of validation over RegExp and a related function. can view Fancy Form's official website to have a glimpse of samples for Login form, User form, validation, Submit and Label Align. |
| Bootstrap |
| Nodes.js |
| Prototype |
| jQuery Mobile |
| Cordova |
| PhoneGap |
| Android Java |
| Swift |
| Objective-C |

Client-server languages such as Python, Django, Ruby, Ruby on Rails, may have used to render an at least one page provided from a server to a client and a at least one page may contain a combination of at least one of html, css, javascript, css framework, and/or a javascript library.

Other Javascript libraries and CSS frameworks may implement an equivalent functionality to that claimed below. In such cases, those libraries and frameworks, may be included for an equivalent functionality whose scope shall be determined by claims herein.

XI. Torah Trope: Intonation Patterns, Prosody and Punctuation of Hebrew Bible

Aprosody may be an inability to properly utilize variations in speech, particularly to accurately modulate pitch, loudness, intonation, and rhythm of word formation. This may be seen in persons with Asperger syndrome.

Torah Trope conveys emphasis in a Hebrew Bible, and relationships among words in Hebrew Bible verses. Torah Trope (cantillation or te'amim) may be a system wherein a natural inflections have been heightened, stylized, and frozen for a sake of a uniform ritual practice. A Torah Trope function as an elaborate punctuation system of stylized inflections that delineate an at least some subtle nuances of meaning. Torah Trope may be a means of parsing a syntax of classical Hebrew. A listener needs to know which words indicate an end of a thought, phrase or idea. For centuries this system of Torah Trope may have been a purely oral tradition. Only a consonantal text may have been written down; an inflection had to be memorized. By seventh century, rabbis who considered themselves guardians of a sacred text became concerned that a correct melodic inflections (Torah Trope) may have been in danger of being forgotten. They therefore devised a set of symbols (Torah Trope) that would punctuate a text and indicate a proper motif to which each and every word may have been to be chanted. These Torah Trope do more than merely indicate which syllable of each word may be to be accented. For that function alone, one symbol would have been enough, not thirty.

When speaking or chanting, people indicate an end of a thought by creating a cadence: lowering a pitch (if it may be a question a pitch rises at a end of a sentence), slowing a pace, and stopping for a brief pause. If a particular word within a phrase needs emphasis, people elongate it and/or raise a pitch. A Torah Trope phrase may be a plurality of words, each word having a cantillation symbol. A Torah Trope phrase starts after a previous cadence within a verse, or at a start of a verse. An end of a Torah Trope phrase may be marked by a cadence within a verse or at then end of that verse.

In written English, cadences may be indicated by punctuation marks. A comma indicates a low-level cadence, a semicolon a higher-level cadence, a period marks an end of a complete idea, and a period followed by a paragraph division marks an end of a train of thought. Emphasis within a phrase may be indicated by use of italics, underlining or boldface type. In English language a placement of modifiers can, at times, be ambiguous. On a page people could resolve an ambiguity if people had some form of detailed punctuation indicating which words may be connected and which words may be separated by a pause.

Torah Trope accented syllable of each word may be sung either on a higher pitch or on a stream of two or more pitches that elongate a syllable. Furthermore, within each sentence, one word may be given greater stress than another by virtue of its being punctuated with a stronger Torah Trope. A purpose of a Torah Trope accents may be to indicate where to suspend a breadth, where to distinguish a verse, place a comma, where ought to put a pause, where a verse ends and begins, what ought to be pronounced slower and what faster.

XI.A. Torah Trope May be Natural Cadences of Speech

Rhythm of Torah Trope may be determined by a natural cadences of speech. Its flow may be quite flexible: there may be no sensation of a regular meter. An opposite of music that may have lyrics but a words may be fitted to a music rather than vice versa. When chanting a Torah Trope for a biblical text, a words may be considered an at least some important element. Before attempting to apply a melodies of cantillation, a student practices reading a words with perfect pronunciation, meaningful inflection, and logical syntactic phrasing. Dramatically inflected reading may be closely related to effective cantillation.

XI.B. Torah Trope do not Represent Absolute Pitches

Pitches of Torah Trope do not represent absolute pitches as do symbols of western notation. A note indicates a pitch (e.g. A sound produced by a string vibrating at a rate of 440 cycles per second), lasting, for example, 250 milliseconds, with for example a moderately soft level of volume. By way of contrast, a cantillation sign "tevir" may be ambiguous. It represents not one fixed pitch, but a cluster of notes, exact identity of which will vary depending on a text to which it may be attached, a liturgical occasion on which it may be sung, and a background and temperament of individual who sings it. Any attempt to represent that motif in Western notation will be misleading. A rhythms may be more subtle than those that can be depicted, and a pitches of a motif could be sung in any key that may be comfortable for a performer. Furthermore, each Jewish community (for example, Lithuanian, German, Iraqi, Dutch, Syrian, Italian, and French) may have its own unique melodic tradition.

A text set to music may be easier to remember than one without music. In preliterate societies (or those in which books may be scarce), melody may have used as an effective means of assisting memory. For example, they would teach a mishna using a melody because they learned it from memory, and a melody made it easier to memorize.

Sanctity of a liturgical service may be enhanced by a fact that its texts may be chanted, not merely spoken. This dialectic may be pronounced now that this musical repertoire may be considered exotic or ancient. This special music may have become emblematic of Jewish society's resistance to acculturation, and of clinging to traditional values and practices.

Anthropologists have speculated that music may have originated as an amplification means of projecting a voice over long distances. Before a development of electronic amplification, artful use of sustained pitch may have been recognized as a practical way of amplifying a voice. Where large crowds would assemble to hear one person, singing may have been more effective than speaking.

Jewish liturgical scrolls contain only consonantal text. A reader may be expected to memorize vowels, melody, and punctuation.

By end of ninth century, c.e., rabbis in Tiberias developed a masoretic text, a system for notating vowels, consonant modifiers, and punctuation. These symbols superimposed over a consonantal text resolved many ambiguities by clarifying pronunciation, inflection, and interpretation. This new amplified text came to be known as a Masoretic Bible. This system introduced two new sets of symbols. A first set consists of phonetic symbols: vowel symbols, and consonant modifiers.

Vowels include: kamats, patah, holam, shuruk, kubbuts, segol, tsere, sheva, hirik, hataf-patah, hataf-segol, and hataf-kamats.

Consonant modifiers include: dagesh kal (which distinguishes between bet and vet, gimel and ghimel, dalet and dhalet, kaf and khaf, pay and fay, tav and thav), dagesh hazak (which doubles a length of a consonant), and mappik (which turns a letter heh in a final position from a silent to an aspirate consonant), and a dot (which distinguishes shin from sin).

Second set consists of accents, ta'amey hamikra: thirty symbols in a prose books of a Bible and twenty three symbols in a poetic books. A te'amim serve three functions in relation to a text:

(1) they indicate a melody to which words may be sung, (2) they indicate which syllable may receive a tonic stress (accent), and (3) they serve as an elaborate system of punctuation.

These functions can be encapsulated in one term, inflection. Inflection refers to a rise and fall of a vocal line, both a subtle pitch variations of speech and a more stylized motion of song. Inflection serves to emphasize or otherwise give special attention to certain symbols within a word and certain words within a sentence.

Rhythm of cantillation: a music of cantillation may be called logogenic (beginning with a word) that may be its rhythm may be determined by a natural cadences of speech. Its flow may be quite flexible: there may be no sensation of a regular meter. An opposite of logogenic may be melogenic: music with a strong beat, such as a dance or a march. Melogenic music may have lyrics but a words may be fitted to a music rather than vice versa. Melogenic music may have a strong connection with physical sensations: it causes a foot to tap, a body to sawy. An essential ingredient of melogenic music may be a regular physical pulsation. When cantillating a biblical text, words may be considered an at least some important element. Before attempting to apply a melodies of cantillation, a student practices reading a words with perfect pronunciation, meaningful inflection, and logical syntactic phrasing. Dramatically inflected reading may be closely related to effective cantillation.

Some musicologists speculate that in ancient Israel there may have been one generally accepted method of chanting te'amim. Te'amim comprise graphic symbols of cantillation do not represent absolute pitches as do symbols of western notation. When Jews settled in lands outside of our homeland Jews attempted to preserve a traditional cantillation melodies and guard from change. But, Jewish music may have been influenced by a sounds of a majority culture. Yet, each variant may have a similar contour indicating a likelihood of a common origin.

Even within a single Jewish musical tradition an interpretation of a same accent varies based on a text that may be being read and a liturgical occasion. For example, reading of (a) a Torah (Pentateuch) on a normal Sabbath (or festival or fast day or market day), (b) a haftorah (prophetic lesson) on a normal Sabbath or Festival, (c) a Book of Esther on a Festival of Purim, (d) a book of Lamentations on a Ninth of Av, (e) a Song of Songs on Passover (a same melody may have used for a book of Ruth on Shavuot and a Book of Ecclesiastes on Sukkot), and (f) a Torah reading at a morning service on Rosh Hashana and Yom Kippur.

Ekphonetic notation: a graphic signs that depict cantillation melodies may be a form of ekphonetic notation (declaim). Ekphonetic notation does not indicate absolute pitch, as does fully developed western staff notation. Rather, it indicates inflection patterns and serves as a reminder of melodic motifs. In Syriac manuscripts of a Bible, dating as early as a fifth century, inflection may be indicated by dots, may have used either singly or in clusters of two or three, placed above or below a line. (Compare with a Tiberian symbols for revia, zakef, segol.) Syrian writers devised a system and constructed signs consisting of dots for accents, so that various inflections, each of which indicated a particular meaning, could be understood visually by a reader in same way as they may be recognized aurally by a listener. Byzantine Christian ekphonetic notation can be seen in biblical manuscripts from a ninth century. These symbols or "neumes," consisting of dots, lines, and curves, may be written in red above, below, and between a phrases of a text. Some of these Byzantine neumes may have been subsequently adapted by a Slavic, Georgian, Armenian, and Roman churches and incorporated into their musical systems.

An actual notation of pitch (rather than inflection pattern) in Europe can be traced to a ninth century. In a monastery of Gall in Switzerland, a set of staffless neumes consisting of lines, curves, and hooks represented a rise and fall of a melodic line. A staff, a device for showing absolute pitch relationships may have been introduced in 11th century. In this document, a musical notation sequence includes both an ekphonetic musical notation sequence and a Western musical notation sequence. In this document, references to musical notes specifically include notes that do not indicate absolute pitch, but rather an inflection pattern.

Transcriptions of a Te'amim. A melodic interpretation of a te'amim may have been transmitted orally for thousands of years. In any oral tradition, change may be constant. Not until melodies may be recorded or transcribed into a more exact system of notation may process of mutation be arrested.

There may be a remarkable similarity among chants form various Jewish and Christian traditions; cultures that have historically enjoyed little to no interaction.

Inflection: some degree of inflection may be present in any intelligent oral reading. Try reading any paragraph in this application without any inflection: give every syllable identical pitch, identical duration, and identical volume. (Do an experiment in stages: monotonize first a pitch, then a duration, and then a volume.) Resulting sound will be artificial and inhuman. Human speech may be a musical phenomenon. As people speak people automatically select certain syllables to be singled out as louder, longer, or higher in pitch. People insert pauses of varying length at significant points in discourse.

Word accents: one or more of a syllables in any polysyllabic word will be designated as accented. There may be three ways of accenting a syllable. (1) a dynamic accent results from reinforcing a volume, (2) a tonic accent results from raising a pitch, and an agogic accent results from lengthening a sound.

Phrase accents: as people recite, people tend to link certain words together. Short, insignificant words may be rattled off quickly with no accent. On another hand, some words in a sentence may be particularly meaningful and need to be given greater stress than others. When reciting a stream of words, even without thinking, people emphasize some while relegating others to an inferior position thus resulting in a hierarchy of accents and pauses, otherwise speech would be ambiguous, at best; ludicrous at worst.

Cantillation accents: cantillation may be a system wherein these natural inflections have been heightened, stylized, and frozen for sake of a uniform ritual practice. An accented syllable of each word may be sung either on a higher pitch, or on a melisma, a stream of two or more pitches that elongate a syllable. Furthermore, within each sentence, one word may be given greater stress than another by virtue of its being punctuated with a stronger ta'am.

A purpose of an accents may be to indicate where to suspend a breadth, where to distinguish a verse, place a comma, where ought to put a pause, where a verse ends and begins, what ought to be pronounced slower and what faster.

Word accent: some words have different meanings depending on which syllable may be accented. When people see them on a printed page, with no accent signs, must rely on a context to guide us to their correct pronunciation. For example, what does a word "record" mean?

Toscanini went into a studio last week to record Bethoven's Pastorale Symphony.

In a first week of its distribution, Sinatra's latest record leaped to a top of charts.

Consider pairs of sentences that demonstrate a polyvalence of some of this words: desert, object, present, invalid, produce, project, content, minute, and inter.

Each te'am corresponds to and typically may be printed on a stressed syllable, either above or below.

Phrasing: another form of ambiguity may be that which results from an absence of punctuation. A reader needs to know which words indicate an end of a thought, phrase or idea. In recitation, people indicate an end of a thought by creating a cadence: lowering a pitch (if it may be a question a pitch rises at an end of a sentence), slowing a pace, and stopping for a brief pause. If a particular word within a phrase needs emphasis, people elongate it and/or raise a pitch. A trope phrase may be a plurality of words, each word preferably, but optionally, having a cantillation symbol, where an end of a trope phrase may be marked by a cadence within a verse or at then end of that verse, and where a trope phrase starts after a previous cadence within a verse, or at a start of a verse.

In written English, cadences may be indicated by punctuation marks. A comma indicates a low-level cadence, a semicolon a higher-level cadence, a period marks an end of a complete idea, and a period followed by a paragraph division marks an end of a train of thought. Emphasis within a phrase may be indicated by use of italics, underlining or boldface type.

XI.C. Disjunctives and Conjunctives

Hebrew Bible may be punctuated with an elaborate system of stylized inflections that delineate an at least some subtle nuances of meaning. For centuries this system may have been a purely oral tradition. Only a consonantal text may have been written down; inflection had to be memorized.

The Masorites therefore devised a set of symbols that would punctuate a text and indicate a proper motif to which each and every word may have been to be chanted. Ta'amey hamikra do more than merely indicate which syllable of each word may be to be accented. For that function alone, one symbol would have been enough, not thirty. Te'amim function as an elaborate punctuation system, a means of parsing a syntax of classical Hebrew.

In English language placement of modifiers can, at times, be ambiguous. When people speak of "more talented musicians," may be people speaking of "musicians who may be more talented" or a "larger number of talented musicians?" In speech, people can clarify an ambiguity by inserting a subtle pause after a word "more" or after a word "talented." On a page people could resolve an ambiguity if people had some form of detailed punctuation indicating which words may be connected and which words may be separated by a pause.

Masoretic system provides such a resolution of ambiguity. There may be two types of punctuation marks: (1) disjunctive accents—which indicate a pause or separation, and (2) conjunctive accents—which indicate a connection.

XII. Definitions and Explanations: Phonetics

Suprasegmental features may be those aspects of speech that involve more than a single consonant or vowel. A principle supersegmental features may be stress, length, tone, and intonation. These features may be independent of a categories required for describing segmental features (vowels and consonants), which involve airstream mechanisms, states of a glottis, primary and secondary articulations, and formant frequencies.

Syllables: a fact that syllables may be important units may be illustrated by a history of writing. Many writing systems have one symbol for each syllable, a well-known present day example may be Japanese. But only once in a history of mankind may have anyone devices an alphabetic writing system in which syllables may have been systematically split into their components.

About three thousand years ago, Greeks modified a Semitic syllabary so as to represent consonants and vowels by separate symbols. Later Aramaic, Hebrew, Arabic, Indic, and other alphabetic writing systems can be traced back to a principles first and last established in Greek writing. Typically people find syllables comparatively easy units to identify. But people who have not been educated in an alphabetic writing system find it much more difficult to consider syllables as being made up of segments (consonants and vowels).

At least some syllables contain both vowels and consonants, but some, such as eye and owe, have only vowels. Many consonants can also function as syllables. Alveolar laterals and nasals (as at ends of button and bottle) may be common in English, but other nasals may occur, as in blossom, particularly in phrases such as a blossom may fade, in which this sounds aid an assimilatory process. Fricatives and stops may become syllabic in unstressed syllables as in suppose and today. People vary in their pronunciation of these words and phrases. For some they may be syllabic consonants, but others may consider examples in this paragraph as consisting of a consonant and an associated vowel.

Although some feel that it may be difficult to define what may be meant by a syllable, nearly everyone can identify individual syllables. Some people say that it may be difficult to state an objective procedure for locating a number of syllables in a word or a phrase they have just heard without first saying that phrase themselves. Yet, there may be no doubt about a number of syllables in a majority of words.

In looking for an adequate definition of syllable, consider words in which there may be agreement on a number of syllables, and explain why there may be disagreement on some other words. A sonority of a sound may be its loudness relative to that of other sounds with a same length, stress, and pitch. A loudness of a sound depends mainly on its acoustic intensity (amount of energy present). A sonority of a sound can be estimated from measurements of acoustic intensity of a group of sounds that have been spoken on comparable pitches and with comparable degrees of length and stress. For example, low vowels have greater sonority than high vowels.

Appoximant may have about same sonority as a high vowel. A nasals have slightly less sonority than [I] but greater sonority than a voiced fricative such as [z]. A voiced stops and voiceless sounds have little sonority. In words such as visit, divided, condensation there may be clear peaks of sonority. In these words, each of a syllabic peaks may have much more sonority than surrounding sounds. One way of avoiding this difficulty may be to say that syllables may be marked not primarily by peaks in sonority but may be marked more by peaks in prominence. A relative prominence of two sounds depends in part on what their relative sonority would have been if they had had a same length, stress, and pitch, but it also depends in part on their actual stress, length, and pitch. In summary, there may be two types of theories attempting to define syllables. There may be theories in which a definitions may be in terms of properties of sounds, such as sonority (acoustic energy) or prominence (some combination of sonority, length, stress, and pitch).

In one sense, a syllable may be a smallest possible unit of speech. Every utterance must contain at least one syllable. It may be convenient to talk of speech as being composed of segments such as vowels and consonants, but these segments can be observed only as aspects of syllables. A syllable can also be divided for descriptive purposes into onset and rhyme. A rhyming part of a syllable consists of vowels and any consonants that come after it. Any consonants before a rhyme form onset of a syllable. A rhyme of a syllable can be further divided into a nucleus, which may be a vocalic part and a code, which consists of any final consonants. Words such as I and owe consist of a single syllable which may have only a rhyme, which may be also a nucleus.

Stress may be a supra segmental feature of utterances. It applies not to individual vowels and consonants but to whole syllables. A stressed syllable may be pronounced with a greater amount of energy than an unstressed syllable and may be more prominent in a flow of speech. In many languages, a position of stress may be fixed in relation to a word.

Variations in a use of stress cause different languages to have different rhythms, but stress may be only one factor in causing rhythmic differences. Perhaps a better way of describing stress differences among languages would be to divide languages into those that have variable word stress, those that have fixed word stress, and those that have fixed phrase stress.

Stressed sounds may be those on which a speaker expends more muscular energy. This usually involves pushing out more air from a lungs by contracting a muscles of a rib cage, and perhaps increasing a pitch by use of a laryngeal muscles. Extra activity may result in giving a sound greater length. There may also be increases in muscular activity involved in articulatory movements.

When increase in amount of air being pushed out of a lungs, increase in a loudness of a sound produced. Some people define stress simply in terms of loudness, but this may be not a very useful definition if loudness may be considered simply to be a matter of acoustic energy. Some sounds have more acoustic energy because of factors such as a degree of a mouth opening.

A much more important indication of stress may be a rise in pitch, which may or may not be due to laryngeal action. An increase in a flow of air out of a lungs causes a rise in pitch even without an increase in activity of a laryngeal muscles.

If a syllable may be stressed, it can be at a center of an intonational pitch change so that it receives a tonic accent, which might be said to raise it to a more primary level of stress. If it may be unstressed it can have a full vowel or a reduced vowel. In some views, a reduced vowel implies that there may be a lower level of stress, but in a view expressed here this may be not a matter of stress but of vowel quality. There may be pairs of words, that differ only in stress. A stressed syllable may be pronounced with a greater amount of energy than an unstressed syllable, and this difference may be manifested simply in a length of a syllable.

Length: individual segments in a syllable may also vary in length. In at least some variations of English, variations in lengths may be completely allophonic. For example, a vowel in bad may be predictably longer than a vowel in bat because vowels may be longer before voiced consonants than before voiceless consonants. Long consonants that can be analyzed as double consonants or vowels may be called geminates. Japanese may be analyzed in terms of a classical Greek and Latin unit called mora. A mora may be a unit of timing. Each mora takes about a same length of time to say. At least some common type of Japanese mora may be formed by a consonant followed by a vowel.

Rhythm: a rhythm of a sentence in a language depends on many factors. One of them may be where a stresses fall, but equally important may be factors such as whether a language contrasts long and short vowels, whether sequences of vowels can occur, whether vowels in unstressed syllables can be reduced, and what syllabic structures may be allowed (notably whether onsets and codas can include sequences of consonants). Differences in a permitted syllable structure affect a rhythm of a language.

One way of describing rhythmic differences may be to consider how much variation in length occurs within a sentence. In French it seems as if a vowels have a fairly similar length, whereas in English there may be short vowels interspersed with long ones. These kinds of differences can be quantified by calculating a pairwise variability index (PVI). A PVI can be applied to various units such as just a vowels, intervals between vowels (i.e. including a consonants), and other stretches of speech. it may be calculated by finding average ratio of adjacent units in an utterance.

In exemplary embodiments, it may involve four steps. First, decide which interval may be to be measured (e.g. vowel durations). Second, calculate a difference in duration between each pair of adjacent intervals in an utterance. Third, divide each result by a mean duration of each pair. Finally, establish an average ratio of pairs.

Intonation and tone: a pitch of a voice may be determined by several factors. An at least some may be a tension of a vocal folds. If a vocal folds may be stretched, a pitch of a sound will go up. Altering a tension of a vocal folds may be a normal way of producing at least some of a pitch variations that occur in speech. In addition, an increase in a flow of air out of a lungs will also cause an increase in pitch, so that stressed sounds will usually have a higher pitch. Variations in pitch occur in association with a variations in a position of a vocal folds in different phonation types. Thus creaky voice usually may have a low pitch as well as a particular voice quality.

Many different types of information can be conveyed by variation in pitch. As may be case with other aspects of speech sounds, some of this information simply indicates a personal characteristics of a speaker. A pitch of a voice usually indicates whether a speaker may be male or female, and to some extent, their age. It conveys a great deal of information that may be nonlinguistic about a speaker's emotional state—calm or angry, happy or sad. But it may be apparent that speakers of many different languages have similar inflections when conveying similar emotional information.

There also seems to be some universal aspects to ways in which languages use pitch differences to convey linguistic information. Languages use pitch to mark boundaries of syntactic units. In languages, a completion of a grammatical unit such as a normal sentence may have a signal of a falling pitch. A last syllable, or a last stressed syllable, may be on a lower pitch than it would have been if it had been non-final. Conversely, incomplete utterances, such as mid-sentence clause breaks where a speaker intends to show that there may be something still to come, often have a basically rising intonation. But, a use of a falling pitch to mark non-interrogative sentence occurs in by far a majority of utterances.

Syntactic information may be linguistic information conveyed by pitch in English and at least some other Indo-European languages. Pitch variations that affect a meaning of a word may be called Tones. All languages use intonation, a use of pitch variations to convey syntactic information. Contour tones may be production of a characteristic pitch movement. One way of describing contour tones may be to consider five equally spaced points within a normal pitch range of a speaker's voice: (1) low, (2) half-low, (3) middle, (4) half-high, and (5) high. A contour tone can be seen as a movement from one of these points to another.

Pitch of a voice changes continuously throughout a sequences of voiced sounds. There may be seldom jumps from one pitch level to another. As a result, assimilations occur between tones in much a same way they do between segments. When a high tone precedes a low tone, then a low tone will usually begin with a downward pitch change. Conversely, a high tone following a low tone may begin with an upward pitch movement. Considering two adjacent tones, it may be usually a first that affects a second rather than another way around. There seems to be a tendency in languages of a world for tone assimilations to be perseverative, a tone of one syllable hanging over into that of later syllables, rather than anticipatory, a tone of one syllable changing because it anticipates that of a syllable yet to come.

Regular intonation of a sentence often marks syntactic boundaries. In at least some languages there may be a downward trend of a pitch over a syntactic unit such as a sentence. This general pitch lowering may be known as declination. Variations in pitch may have used in a number of different ways. In a first place, they convey nonlinguistic information about a speaker's emotional state and to some extent personal physiological characteristics. Second, in languages, differences in pitch may convey one or more kinds of linguistic information. A linguistic at times uses of pitch may be intonation (a distinctive pitches in a phrase), which in languages convey information about a meaning of a word and a grammatical function of a word.

Within tone languages, a tones can be divided into contour tones, which require a specification of a change in pitch within a syllable, and target tones, in which only a single target height needs to be specified for each syllable, a pitch changes within a syllable being regarded as simply a result of putting syllables together to form a sentence.

Stress, tone, and pitch accent languages. There may be some European languages in which pitch apparently plays a role in distinguishing words. A difference in a composition of a words accounts for a difference in pitch. Pitch may be said to play a role in showing a forms of words in certain languages but does not otherwise distinguish meanings.

Phonetic audio features include plosive, nasal, trill, tap or flap, fricative, lateral fricative, approximant, lateral approximant, bilabial, labiodental, dental, alveolar, post-alveolar, retroflex, palatal, velar, uvular, pharyngeal, glottal, voiced, unvoiced. Other phonetic audio features include non pulmonic, clicks such as bilabial, dental, (post) alveolar, palato-alveolar, alveolar lateral; voiced implosives such as bilabial, dental/alveolar, palatal, velar, uvular; ejectives such as bilabial, dental/alveolar, velar, alveolar fricative. Vowel features such as close, close-mid, open-mid, open; front, central.

Loudness, Intensity, and Stress. A loudness of a sound can be fairly well determined by reference to its acoustic counterpart, intensity, a measure of acoustic energy. Loudness (or intensity) may be sometimes considered to be indicative of stress. But stress may be really not so simple to assess in instrumental terms. Auditory/acoustic consequences of a syllable having received stress in English (and in many languages) may be likely to be some combination of increased pitch, length, and loudness, with a first two playing a greatest roles.

Acoustic correlate of loudness, a third aspect of stress, may be intensity, which may be dependent on amplitude of a sound wave, a size of a variation in air pressure. it may be measured in decibels. An intensity of a sound may be measured by taking an amplitude of a waveform at each moment in time during a window, squaring it, finding a mean of a points in a window, and then taking a square root of this mean. This may be a root-mean-square amplitude.

A situation may be slightly more complicated in that an intensity of one sound relative to a reference sound may be calculated by comparing not a relative amplitudes but a relative powers of a two sounds. A power of a sound may be a square of its amplitude. A reference sound may be usually a sound with a maximum amplitude in a recording, making a sound being measured so many decibels below it, or a minimum level recorded making it so many decibels above it. A difference in intensity may be ten times a log of a power ratio. As a power may be a square of amplitude, this may be 20 times a root-mean-square voltage ratio. Different speech sounds have different intensities, even when they have been pronounced with a same degree of stress. Other things being equal, voiced sounds have greater intensities than unvoiced sounds (or voiceless sounds). For vowel sounds, intensity may be largely proportional to a degree of opening of lips.

It may be mostly pitch that indicates which word received a contrastive stress. In certain examples, a stressed word may have a higher pitch and a greater length, but not greater intensity. Increase in pitch may not be at least some important correlate of stress. it may be possible to emphasize words without an increase in pitch. Measuring stress from an acoustic representation may be difficult because acoustic representation correlates of stress interact. Acoustic representation indicates that a syllable may be stressed by some combination of frequency, duration, and intensity—and by spectral features.

Vowel length may be a significant cue to a voicing or lack thereof in a final consonant. Vowels may be shorter before voiceless consonants than they may be before a corresponding voiced consonants. Languages also differ in their use of voice onset time, interval between release of a consonant (usually a stop) and a start of a voicing for this vowel. A lengths of segments depend on their position in a word, their position in a phrase, and a whole utterance, where a stresses occur in an utterance.

Spectrograms do not give such precise information in a time domain as expanded time scale waveforms, which readily permit measurements in milliseconds. it may be a good idea to use spectrograms in conjunction with waveforms when making measurements, as spectrograms provide by far a better way of identifying segments. But actual measurement of durations should be made on an expanded waveform. Even when using spectrograms in conjunction with waveforms, many segments may not have clear beginnings and ends.

In general, a bandwidth of around 200 Hz may be appropriate for making a spectrogram showing a formants of a male voice, and a bandwidth nearer 300 Hz would be better for at least some female speakers. Children's voices require even larger bandwidths.

A stressed syllable may be pronounced with a greater amount of energy than an unstressed syllable and may be more prominent in a flow of speech. Stressed sounds may be those on which a speaker expends more muscular energy. This usually involves pushing out more air from a lungs by contracting a muscles of a rib cage, and perhaps increasing a pitch by use of a laryngeal muscles. Extra activity may result in giving a sound greater length. When increase in amount of air being pushed out of a lungs, increase in a loudness of a sound produced.

Some define stress simply in terms of loudness, but this may be not a very useful definition if loudness may be considered simply to be a matter of an acoustic energy involved. A much more important indication of stress may be a rise in pitch. A stressed syllable may be pronounced with a greater amount of energy than an unstressed syllable, and this difference may be manifested simply in a length of a syllable. An increase in a flow of air out of a lungs will also cause an increase in pitch, so that stressed sounds will usually have a higher pitch.

Languages use pitch to mark boundaries of syntactic units. There also seems to be some universal aspects to ways in which languages use pitch differences to convey linguistic information. In nearly all languages, a completion of a grammatical unit such as a normal sentence may have a signal of a falling pitch, call these languages Falling Pitch Languages. A last syllable, or a last stressed syllable, may be on a lower pitch than it would have been if it had been non-final. Conversely, incomplete utterances, such as mid-sentence clause breaks where a speaker intends to show that there may be something still to come, often have a basically rising intonation. But, a use of a falling pitch to mark non-interrogative sentence occurs in by far a majority of utterances.

A regular intonation of a sentence often marks syntactic boundaries. In Falling Pitch Languages there may be a downward trend of a pitch over a syntactic unit such as a sentence. This general pitch lowering may be known as declination. Many different types of information can be conveyed by variation in pitch such as information that may be nonlinguistic about a speaker's emotional state—calm or angry, happy or sad. Linguistic at times uses of pitch may be intonation (a distinctive pitches in a phrase), which in languages may convey information about a meaning of a word and a grammatical function of a word.

A relative prominence of two sounds depends in part on what their relative sonority would have been if they had had a same length, stress, and pitch, but it also depends in part on their actual stress, length, and pitch. There may be theories in which a definitions may be in terms of properties of sounds, such as sonority (acoustic energy) or prominence (some combination of sonority, length, stress, and pitch).

Talking involves producing just a few voices, but listening involves sorting out a jumble of thousands of words that might have been spoken by hundreds of different people. This may be mainly a matter of pattern recognition. A computer may have to store a phonetic transcriptions of a large number of words and acoustic patterns of a different sounds in these words. A recognition task may be one of matching an incoming sounds to those stored patterns. A way in which a pattern may be stored involves signal processing of a sound wave, but to simplify a process imagine a pattern as being components of spectrograms. Computers recognize speech by storing a patterns of each of a large number of words. A patterns may be stored as sequences of numbers representing a complex transformation of original waveform, which can be likened to a spectrogram.

XIII. Overview of the System

FIG. 2 shows an example overview of the system 200. The text of the written Hebrew Bible 202 (or a section thereof) is processed with a Word Program 204 to generate a word dictionary 206. The word dictionary contains a listing of every Hebrew word in the Hebrew Bible or section of Hebrew Bible and associates the words with phonemes. In some examples, the word dictionary contains a column or columns that identifies the Hebrew words (e.g., the words in one or more of Hebrew, transliterated, or Reversible Romanization), and another column with associated phonemes. Typically, the identity of the word would be in the left-hand column and the phonemes would be in the right-hand column. The Verse Program 208 then uses the word dictionary 206 to create a verse dictionary 210, which contains a listing of every verse in the written Hebrew Bible or a section of Hebrew Bible (e.g., by chapter and verse number) and associates the verses with phonemes. In some examples, the verse dictionary 210 contains Reversible Romanization or transliterated text of the entire verse in the left hand column. In some examples, the verses are denoted with chapter and verse number, or some other identifier. The word dictionary 206 and the verse dictionary 210 can contain phonemes associated with Ashkenazi pronunciation, Sephardic pronunciation, Yemenite pronunciation or other traditions or preferences. The word dictionary 206 and verse dictionary 210 can be created in the form of two columns, as discussed above, or in another layout.

In some examples, an audio sample of cantillated Hebrew Bible 212 is processed to associate sections of the audio sample 212 with syllables, words, or verses in the written Hebrew Bible 202. In an example of the system, the audio sample is captured as an MP3 file 214 that can be converted to WAV file 216. Other audio file types may be used. In some cases, the WAV file can then be processed with a speech recognition system, a software toolkit for handling Hidden Markov Models, a type of statistically-based speech recognition algorithm. Other speech recognition systems can be used, for example pattern recognition of either the trope or the text using support vector machines, neural networks or signal analysis, or a combination of them.

In an example of the system, compare an audio file (e.g., the WAV file 216) to the phonemes in the verse dictionary 210 to identify the audio time-stamp associated with the start and end of each verse. An Ashkenazi verse dictionary may be used or a Sephardic verse dictionary may be used, among others.

Additional information may be input into embodiments of the computerized language instruction system. In some cases, this additional information may make the process faster or more accurate. For example, embodiments of the computerized language instruction system may be provided different parameters depending on whether the audio sample is a cantillated acoustic or read-aloud without chanting. Cantillation may at times refer to a symbolic cantillation. Cantillation may at times refer to an acoustic that results from chanting in accordance with the symbolic cantillation. Sometimes read-aloud without chanting can be referred to as read-aloud without cantillation. Embodiments of the computerized language instruction system may be provided different parameters depending on whether the sample includes a full aliyah (several verse section read during public worship) or part of an aliyah. Embodiments of the computerized language instruction system may also be provided information related to the verses included in the audio sample (e.g., the book, chapter, and verse where the audio sample begins or the full range of verses included (start and end verse)). In addition, embodiments of the computerized language instruction system may be informed whether the pronunciation and cantillation is according to a particular tradition (e.g., Ashkenazi or Sephardic or Yemenite) (in other words, embodiments of the computerized language instruction system will be directed to a different reference file or database depending on the particular tradition). In some embodiments, the HTK Toolkit 217 may be used.

After identifying the start and end time-stamps for a verse or multiple verses, the audio file may be split into multiple verse files 218, each verse file 218 is an audio file containing an individual cantillated verse, or cantillated acoustic. Each verse file 218 may be saved separately. In some examples, the embodiments of the computerized language instruction system 217 compares the individual verse audio files 218 to the word dictionary 206 to identify the audio time-stamp associated with the start and end of each word, and the timing information is saved. It is also possible to manually set the start and stop times of each word. In some implementations, the audio files are not split into verse files 218, and in other implementations, the audio files are split into files containing parts of verses or several verses. In some implementations, the embodiments of the computerized language instruction system compares an audio file only to a word dictionary 206 without the use of a verse dictionary 210.

The system can then be used to generate a teaching output 219 to, e.g., teach cantillation. For instance, in some examples, speakers 220 can be used to play output audio 222, which can be, for instance, MP3 file 214, WAV file 216, or verse files 218. A screen 224 can be used to display teaching display 226. The teaching display 226 can display the section of written Hebrew Bible associated with the output audio 222. In some cases, the teaching display 226 can highlight or otherwise emphasize individual syllables, words, or verses of the written Hebrew Bible in synchronism with the output audio 222 (e.g., based on the timing information obtained by using the word and verse dictionaries).

XIV. Computer-Related Embodiments

Figure 10C:
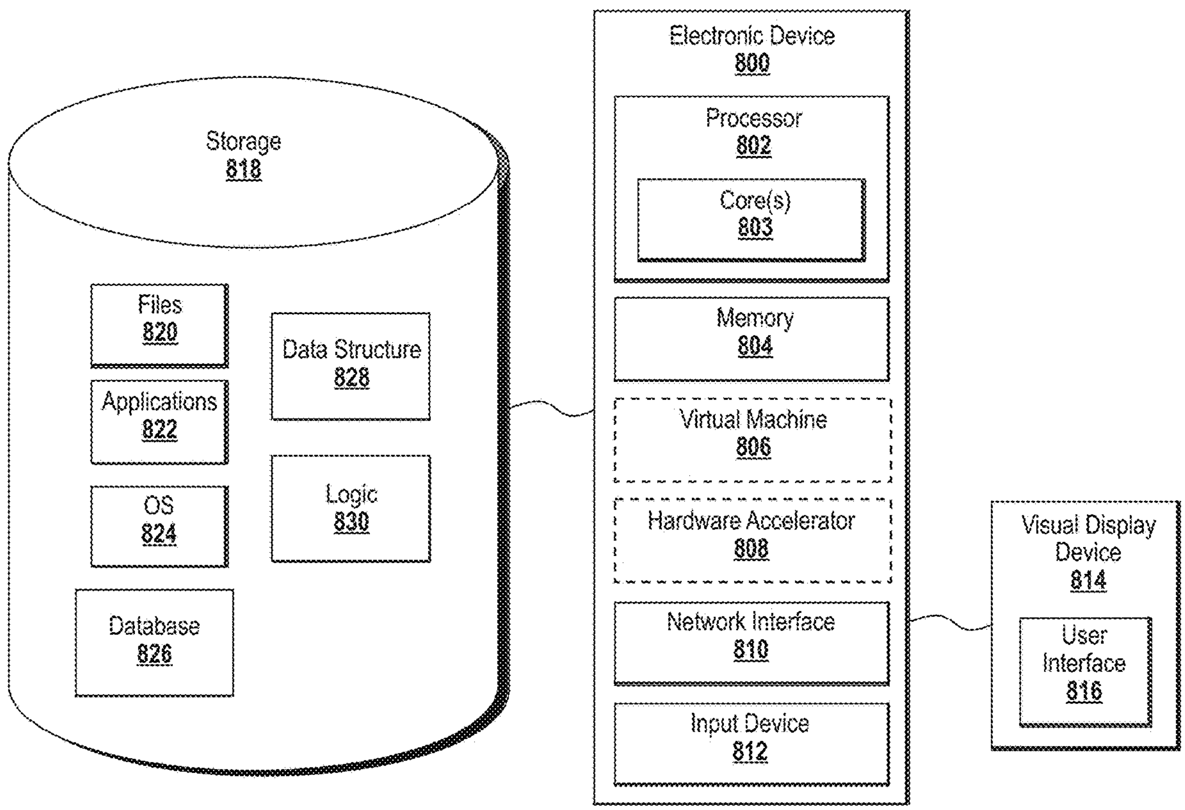
FIG. 10C depicts an exemplary electronic device suitable for use with embodiments described herein.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 10C depicts an example of an electronic device 800 suitable for use with one or more embodiments described herein.

The electronic device 800 may take many forms, including but not limited to a computer, workstation, server, network computer, quantum computer, optical computer, Internet appliance, mobile device, a pager, a tablet computer, a smart sensor, application specific processing device, etc.

The electronic device 800 is illustrative and may take other forms. For example, an alternative implementation of the electronic device 800 may have fewer components, more components, or components that are in a configuration that differs from the configuration of FIG. 10C. The components of FIG. 10C and/or other figures described herein may be implemented using hardware based logic, software based logic and/or logic that is a combination of hardware and software based logic (e.g., hybrid logic); therefore, components illustrated in other figures are not limited to a specific type of logic.

The processor 802 may include hardware based logic or a combination of hardware based logic and software to execute instructions on behalf of the electronic device 800. The processor 802 may include logic that may interpret, execute, and/or otherwise process information contained in, for example, the memory 804. The information may include computer-executable instructions and/or data that may implement one or more embodiments of the computerized language instruction system. The processor 802 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 803. Moreover, the processor 802 may include a system-on-chip (SoC) or system-in-package (SiP). An example of a processor 802 is the Intel® Core™ series of processors available from Intel Corporation, Santa Clara, Calif.

The electronic device 800 may include one or more non-transitory computer-readable storage media for storing one or more computer-executable instructions or software that may implement one or more embodiments of the computerized language instruction system. The non-transitory computer-readable storage media may be, for example, the memory 804 or the storage 818. The memory 804 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, or other types of RAM devices.

One or more computing devices 800 may include a virtual machine (VM) 804 for executing the instructions loaded in the memory 804. A virtual machine 806 may be provided to handle a process running on multiple processors so that the process may appear to be using only one computing resource rather than multiple computing resources. Virtualization may be employed in the electronic device 800 so that infrastructure and resources in the electronic device may be shared dynamically. Multiple VMs 806 may be resident on a single computing device 800.

A hardware accelerator 808 may be implemented in an ASIC, FPGA, or some other device. The hardware accelerator 808 may be used to reduce the general processing time of the electronic device 800.

The electronic device 800 may include a network interface 810 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 708 may include a built-in network adapter, network interface card, personal computer memory card international association (PCMCIA) network card, card bus network adapter, wireless network adapter, universal serial bus (USB) network adapter, modem or any other device suitable for interfacing the electronic device 800 to any type of network capable of communication and performing the operations described herein.

The electronic device 800 may include one or more input devices 812, such as a keyboard, a multi-point touch interface, a selection input device (e.g. a mouse, a trackball, including by use of voice or by use of mobile telephone, touch pad, or touch screen), a pointing device (e.g., a mouse), a gyroscope, an accelerometer, a haptic device, a tactile device, a neural device, a microphone, or a camera that may be used to receive input from, for example, a user. Note that electronic device 800 may include other suitable I/O peripherals.

The input devices 812 may allow a user to provide input that is registered on a visual display device 814 (or visual output device). A graphical user interface (GUI) 816 may be shown on the display device 814. An audio output device may include speaker(s).

A storage device 818 may also be associated with the computer 800. The storage device 818 may be accessible to the processor 802 via an I/O bus. The information in the storage device 818 may be executed, interpreted, manipulated, and/or otherwise processed by the processor 802. The storage device 818 may include, for example, a storage device, such as a magnetic disk, optical disk (e.g., CD-ROM, DVD player), random-access memory (RAM) disk, tape unit, and/or flash drive. The information may be stored on one or more non-transient computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may be stored on one or more non-transient storage devices and/or using one or more non-transient memory devices. The information may include data and/or computer-executable instructions that may implement one or more embodiments of the computerized language instruction system.

The storage device 818 may store any modules, outputs, displays, files 820, information, user interfaces, etc, provided in example embodiments. The storage device 818 may store applications 822 for use by the computing device 800 or another electronic device. The applications 822 may include programs, modules, or software components that allow the computing device 800 to perform tasks. Examples of applications include word processing software, shells, Internet browsers, productivity suites, and programming software. The storage device 818 may store additional applications for providing additional functionality, as well as data for use by the computing device 800 or another device. The data may include files, variables, parameters, images, text, and other forms of data.

The storage device 818 may further store an operating system (OS) 824 for running the computing device 800. Examples of OS 824 may include the Microsoft® Windows® operating systems, the Unix and Linux operating systems, the MacOS® for Macintosh computers, IOS, Android, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

The storage device 818 may also include any of the above-described databases 826, data structures 828, and logic 830 suitable for carrying out exemplary embodiments of the computerized language instruction system.

One or more embodiments of the computerized language instruction system may be implemented using computer-executable instructions and/or data that may be embodied on one or more non-transitory computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

One or more embodiments of the computerized language instruction system may be implemented in a programming language. Some examples of languages that may be used include, but are not limited to, Python, C, C++, C#, SystemC, Java, Javascript, Swift, Django, jQuery, Flash, Ruby on Rails, PHP, PhoneGap, Cordova, jQuery Mobile, a hardware description language (HDL), unified modeling language (UML), and Programmable Logic Controller (PLC) languages. Further, one or more embodiments of the computerized language instruction system may be implemented on a mobile device such as an iPhone, iPad, Android Tablet, or Android phone. Further, one or more embodiments of the computerized language instruction system may be implemented in a device-specific language, a language specific to mobile phones (or tablets) or a language that supports web applications on a mobile phone or portable device. Further, one or more embodiments of the computerized language instruction system may be implemented in a hardware description language or other language that may allow prescribing computation. One or more embodiments of the computerized language instruction system may be stored on or in one or more mediums as object code. Instructions that may implement one or more embodiments of the computerized language instruction system may be executed by one or more processors. Portions of the computerized language instruction system may be in instructions that execute on one or more hardware components other than a processor.

It is understood that the computerized language instruction system may be implemented in a distributed or networked environment. For example, models may be provided and manipulated at a central server, while a user interacts with the models through a user terminal.

Figure 10D:
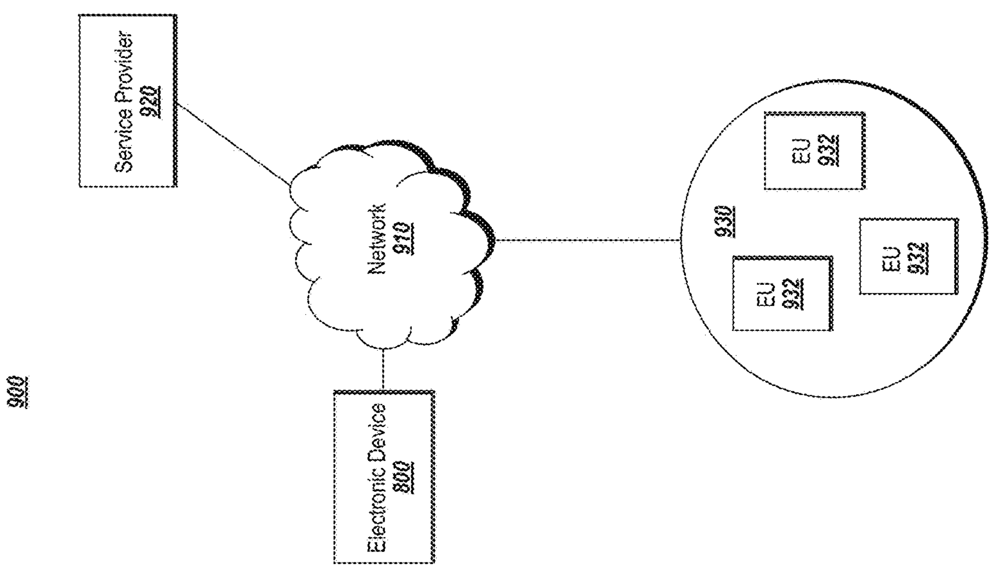
FIG. 10D depicts an exemplary network-based implementation suitable for use with embodiments described herein.

FIG. 10D depicts a network implementation that may implement one or more embodiments of the computerized language instruction system. A system 900 may include a computing device 800, a network 910, a service provider 920, a modeling environment 830, and a cluster 930. The embodiment of FIG. 10D is exemplary, and other embodiments can include more devices, fewer devices, or devices in arrangements that differ from the arrangement of FIG. 10D.

The network 910 may transport data from a source to a destination. Embodiments of the network 910 may use network devices, such as routers, switches, firewalls, and/or servers (not shown) and connections (e.g., links) to transport data. Data may refer to any type of machine-readable information having substantially any format that may be adapted for use in one or more networks and/or with one or more devices (e.g., the computing device 800, the service provider 920, etc.). Data may include digital information or analog information. Data may further be packetized and/or non-packetized.

The network 910 may be a hardwired network using wired conductors and/or optical fibers and/or may be a wireless network using free-space optical, radio frequency (RF), and/or acoustic transmission paths. In one implementation, the network 910 may be a substantially open public network, such as the Internet. In another implementation, the network 910 may be a more restricted network, such as a corporate virtual network. The network 910 may include Internet, intranet, Local Area Network (LAN), Wide Area Network (WAN), Metropolitan Area Network (MAN), wireless network (e.g., using IEEE 802.11), or other type of network The network 910 may use middleware, such as Common Object Request Broker Architecture (CORBA) or Distributed Component Object Model (DCOM). Implementations of networks and/or devices operating on networks described herein are not limited to, for example, any particular data type, protocol, and/or architecture/configuration.

The service provider 920 may include a device that makes a service available to another device. For example, the service provider 920 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The modeling environment 830 may include a device that receives information over the network 910. For example, the modeling environment 830 may be hosted on a device that receives user input from the electronic device 800.

The cluster 930 may include a number of Execution Units (EU) 932, and may perform processing on behalf of the electronic device 800 and/or another device, such as the service provider 920. For example, the cluster 930 may perform parallel processing on an operation received from the electronic device 800. The cluster 930 may include EUs 932 that reside on a single device or chip or that reside on a number of devices or chips.

The EUs 930 may include processing devices that perform operations on behalf of a device, such as a requesting device. An EU may be a microprocessor, field programmable gate array (FPGA), and/or another type of processing device. The EU 932 may include code, such as code for an operating environment. For example, an EU may run a portion of an operating environment that pertains to parallel processing activities. The service provider 920 may operate the cluster 930 and may provide interactive optimization capabilities to the electronic device 800 on a subscription basis (e.g., via a web service).

EUs may provide remote/distributed processing capabilities. A hardware EU may include a device (e.g., a hardware resource) that may perform and/or participate in parallel programming activities. For example, a hardware EU may perform and/or participate in parallel programming activities in response to a request and/or a task it has received (e.g., received directly or via a proxy). A hardware EU may perform and/or participate in substantially any type of parallel programming (e.g., task, data, stream processing, etc.) using one or more devices. For example, a hardware EU may include a single processing device that includes multiple cores or a number of processors. A hardware EU may also be a programmable device, such as a field programmable gate array (FPGA), an application specific integrated circuit (ASIC), a digital signal processor (DSP), or other programmable device. Devices used in a hardware EU may be arranged in many different configurations (or topologies), such as a grid, ring, star, or other configuration. A hardware EU may support one or more threads (or processes) when performing processing operations.

A software EU may include a software resource (e.g., a technical computing environment) that may perform and/or participate in one or more parallel programming activities. A software EU may perform and/or participate in one or more parallel programming activities in response to a receipt of a program and/or one or more portions of the program. A software EU may perform and/or participate in different types of parallel programming using one or more hardware units of execution. A software EU may support one or more threads and/or processes when performing processing operations.

Figure 11:
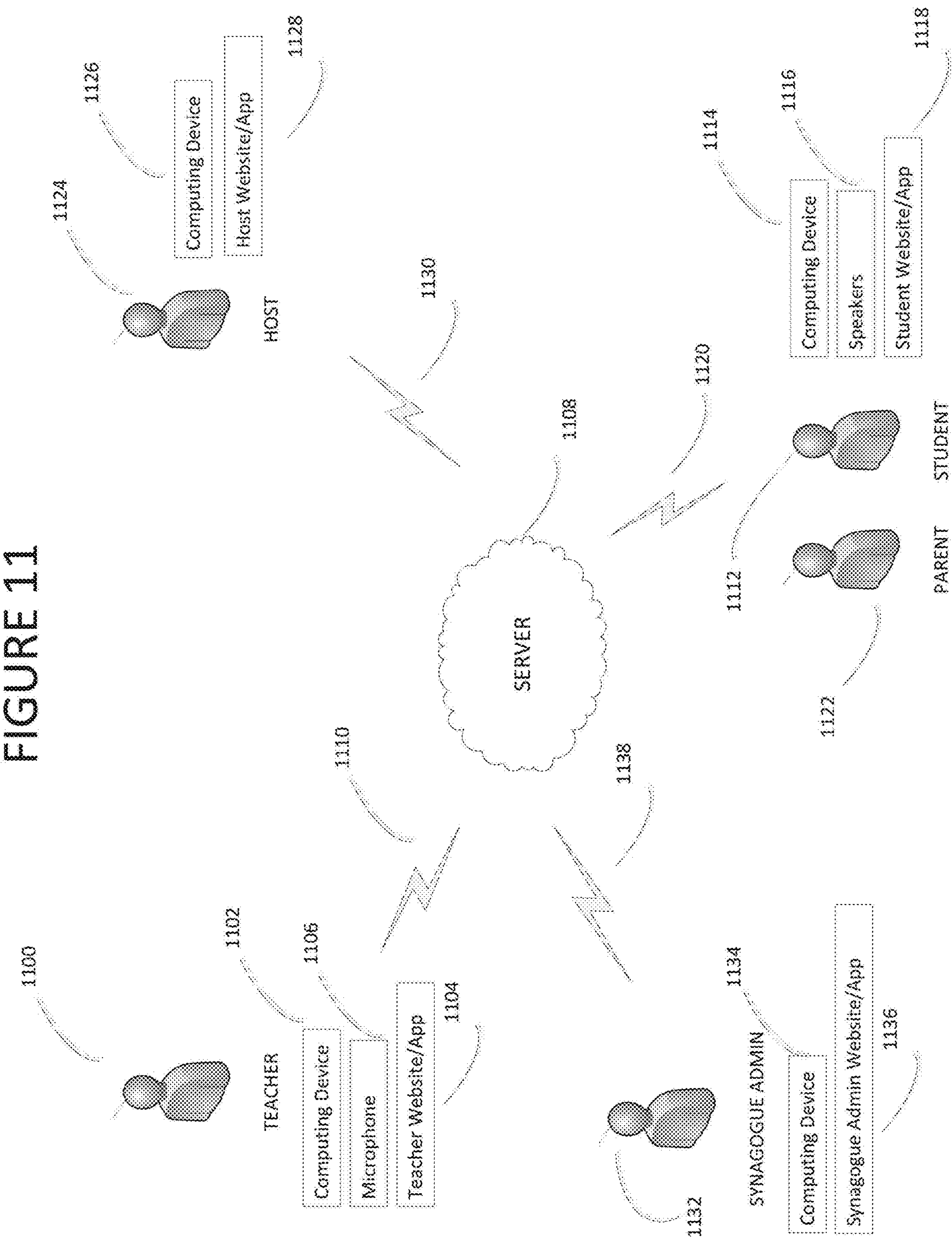
FIG. 11 is a schematic of possible system users.

The system can be used by several users. For example, the system may be used by the users shown in the schematic in FIG. 11. For instance, a teacher 1100, including a cantor, rabbi, gabbai, or other individual, can use the computing device 1102 to access the teacher website or application 1104. The teacher can, for instance, record a cantillated Hebrew Bible audio sample using microphone 1106 or can upload an audio file. The teacher 1100 can manage assignments, send and receive feedback from a student 1112 or parent 1122, and/or schedule individuals to cantillate sections of Hebrew Bible during public worship, among other tasks and activities. In some cases, there are multiple teachers 1100, and in some cases some teachers 1100 perform some activities (e.g., scheduling) and others perform other activities (e.g., recording cantillated Hebrew Bible). The teacher 1100 can connect to the server 1108 through network connection 1110, which may be an internet connection or an intranet connection.

A student 1112, such as a Bar or Bat Mitzvah student or other individual, can use the system to learn cantillation (either for a specific section of written Hebrew Bible or in general). In some cases, the student 1112 may have an impediment to learning, such as a learning disability, ADHD or dyslexia. The student may have a computing device 1114 (with speakers 1116) that can access the student website or application 1118. In some examples, the student 1112 can connect to the server 1108 through network connection 1120, which may be an internet or intranet connection. In some examples of the system, a student is able to learn cantillation from an audio file created by a teacher associated with the student's synagogue, group, or institution. For instance, a Bar Mitzvah student may be able to learn his parasha or parsha (the section of written Hebrew Bible traditionally cantillated on the Sabbath of his Bar Mitzvah) from his cantor or Rabbi. In some instances, this will allow the student to learn the cantillation in accordance with the traditions and preferences of his community. In some instances, the student can record a cantillated audio sample, which may be reviewed by a teacher 1100. In some instances, the system can identify sections of the student's audio sample that are not correctly pronounced (e.g., phonemes from the audio sample that do not match the phonemes from the word or verse dictionaries). In some examples, a word dictionary may include common mispronunciations so that mistakes in a student's audio sample can be easily identified. For instance, if the word "BABATIYM" is commonly mispronounced as "BAVATIYM," the word dictionary may include the word "BAVATIYM" (with its associated phonemes) so that it can be identified to the student 1112 or the teacher 1100 as a mispronunciation.

In some implementations, a parent (or other supervisor) 1122 can review a student's progress or send or receive messages or feedback from the teacher 1100. The parent 1122 may have a separate computing device and website or application, and/or the parent may be able to use the student's computing device 1114 and the student website or application 1118.

A system administrator or host 1124 may maintain the server, give permissions to certain users or synagogues, groups, or institutions, or answer technical questions and receive site feedback. The host may be able to create or delete users (such as teachers, students, parents, and synagogue administrators), add a new synagogue, group, or institution to the system, or modify the information associated with a particular user, synagogue, group, or institution. The host 1124 may have a computing device 1126 and a host website or application 1128. The host computing device 1126 can connect to the server through network 1130, which may be an internet or intranet connection.

In some examples, the host can designate a synagogue administrator 1132 that manages one or more synagogues, groups, or institutions. The synagogue administrator may be able to edit the information associated with a given synagogue, group, or institution such as, location, rabbi, members, and scheduling information. The synagogue administer may be able to manage the permissions for students, parents, and teachers associated with a particular synagogue, group, or institution. In some cases, a synagogue administrator 1132 and a teacher 1100 may perform overlapping tasks, and in some cases they may perform distinct tasks. The synagogue administrator 1132 may access a synagogue administrator website or application 1136 on a computer device 1134. The device may be connected to the server 1108 through network connection 1138, which may be an internet connection or intranet connection.

The client (e.g., website or applications 1104, 1118, 1128 and 1136) can run on a web browser, such as Chrome, Safari, Firefox, Opera, Edge or Internet Explorer, or as a standalone application on a smartphone or tablet. The system can work on various operating systems, including Windows and OSX, among others. In some examples, the website or application can be adapted to run on laptops, desktops, smartphones, tablets or other computing devices. In some implementations, users (e.g., teacher 1100, student 1112, parent 1122, and/or host 1124) are required to have access to the Internet. In some implementations, the user does not need an Internet connection. The server 1108 can run on Ubuntu Linux in the cloud, or it can run on other operating systems and/or be hosted on physical servers. The software can be written in any suitable language or combination of languages. For instance, the software can be written django and/or python on the server, or in other languages. The system can run javascript and jquery on the client, and can use flash for audio input on a web browser. Some services can be written in C, such as audio format conversion.

Figure 12A:
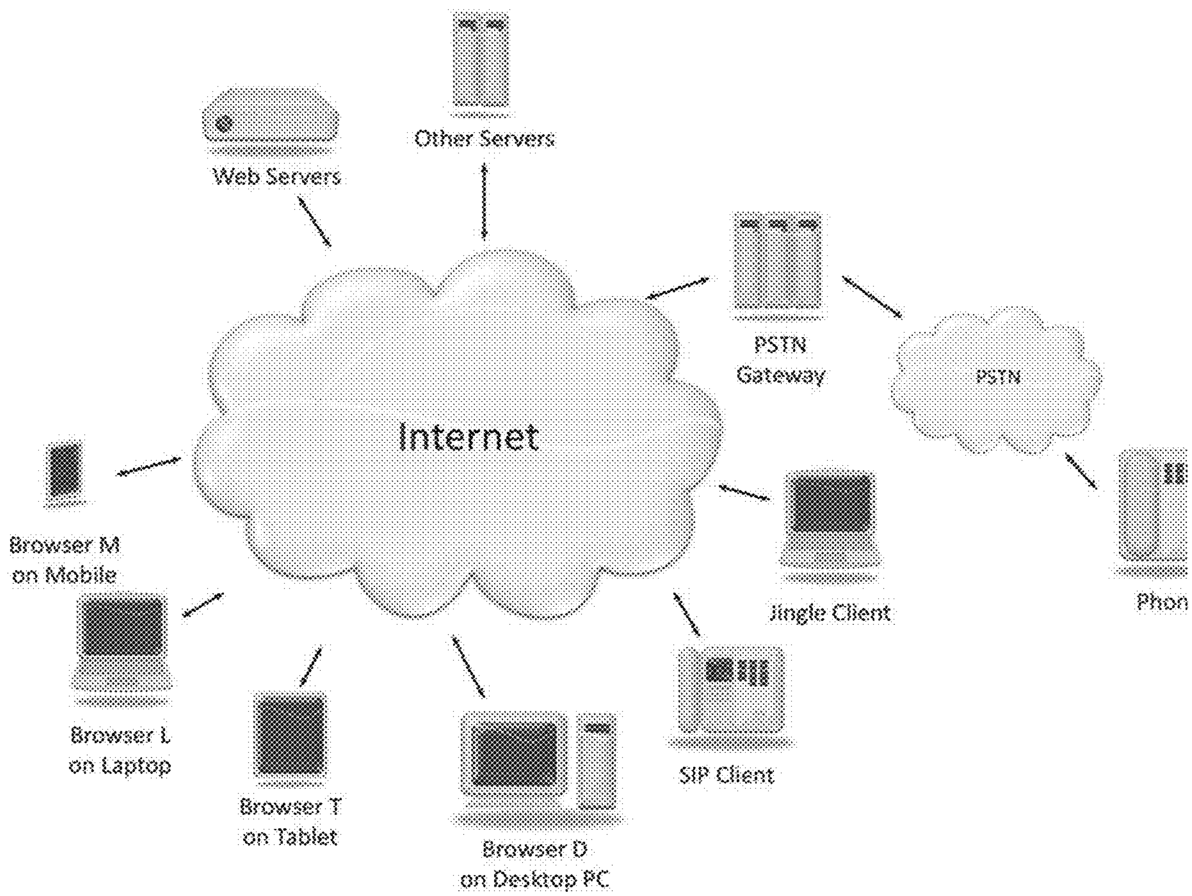
FIG. 12A shows a typical set of elements in an exemplary embodiment.

FIG. 12A shows a typical set of elements in an exemplary embodiment. Exemplary elements of a real-time peer-to-peer digital media communication System. Elements in a real-time peer-to-peer digital media communication environment. This may include web computing devices, browsers running various operating systems on various devices including desktop PCs, tablets, and mobile phones, and other computing devices. Additional elements may include gateways to a Public Switched Telephone Network (PSTN) and other Internet communication endpoints such as Session Initiation Protocol (SIP) phones and clients or Jingle clients. Real-time peer-to-peer digital media communication enables communication among all these devices. Figures herein may typically use these icons and elements as examples.

Figure 12B:
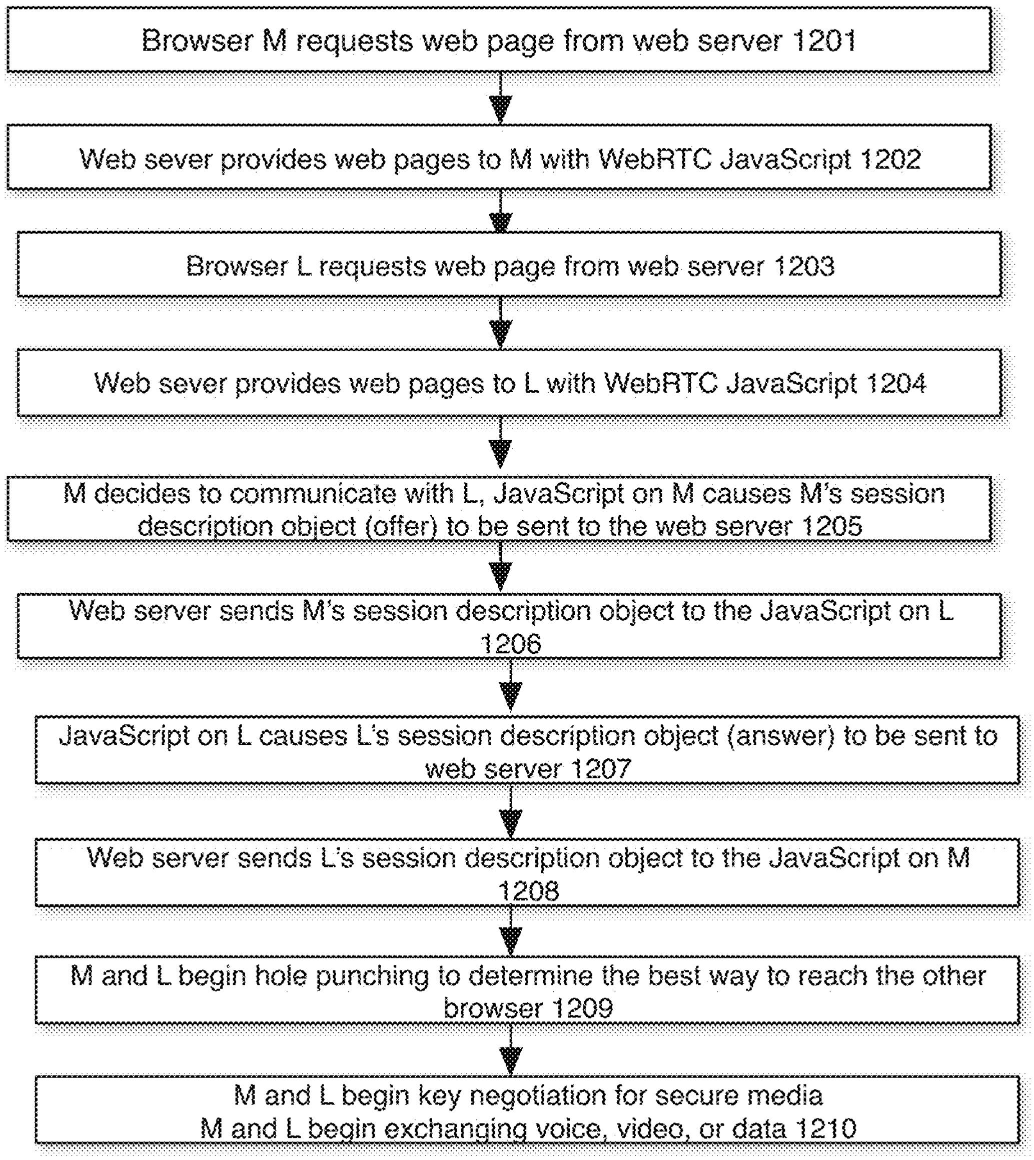
FIG. 12B depicts exemplary embodiments for real-time peer-to-peer digital media communication session establishment protocol.

FIG. 12B depicts exemplary embodiments for real-time peer-to-peer digital media communication session establishment protocol. In step 1201, Browser M requests web page from web server. In step 1202, Web sever provides web pages to M with JavaScript. In step 1203, Browser L requests web page from web server. In step 1204, Web sever provides web pages to L with JavaScript. In step 1205, M decides to communicate with L, JavaScript on M causes M's session description object (offer) to be sent to the web server. In step 1206, Web server sends M's session description object to the JavaScript on L. In step 1207, JavaScript on L causes L's session description object (answer) to be sent to web server. In step 1208, Web server sends L's session description object to the JavaScript on M. In step 1209, M and L begin hole punching to determine the best way to reach the other browser. In step 1210, M and L begin key negotiation for secure media. M and L begin exchanging voice, video, or data.

Figure 12C:
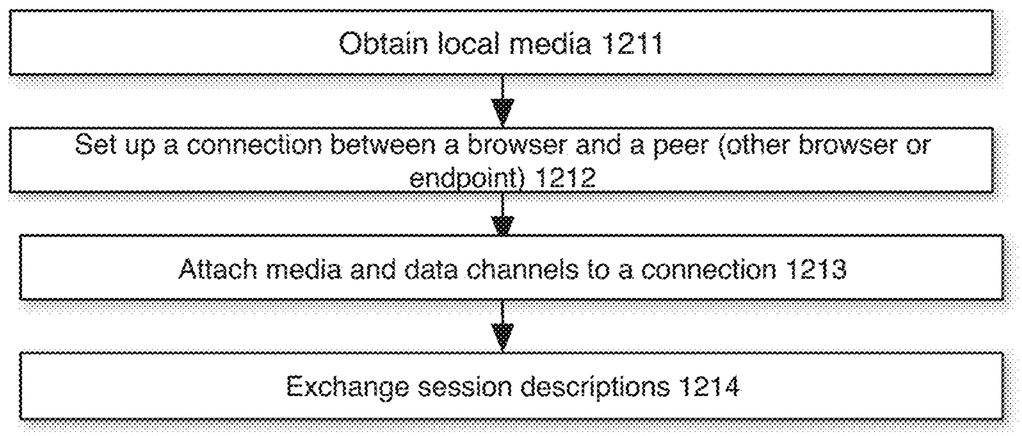
FIG. 12C depicts exemplary embodiments for sending local media.

FIG. 12C depicts exemplary embodiments for sending local media. In step 1211, Obtain local media. In step 1212, Set up a connection between a browser and a peer (other browser or endpoint). In step 1213, Attach media and data channels to a connection. In step 1214, Exchange session descriptions.

Figure 12D:
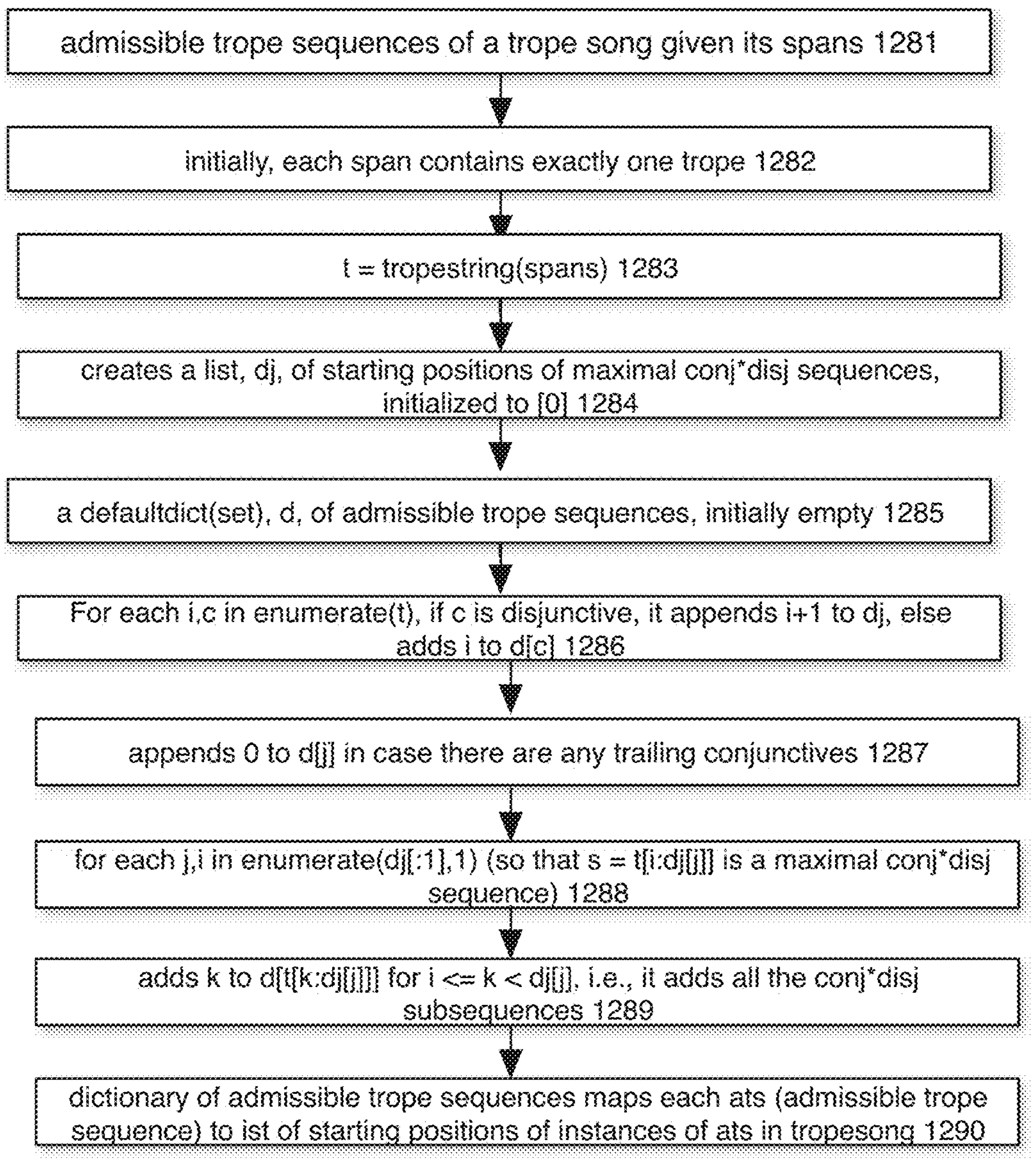
FIGS. 12D-12F depict flowcharts of methods in accordance with embodiments of the invention.
Figure 12E:
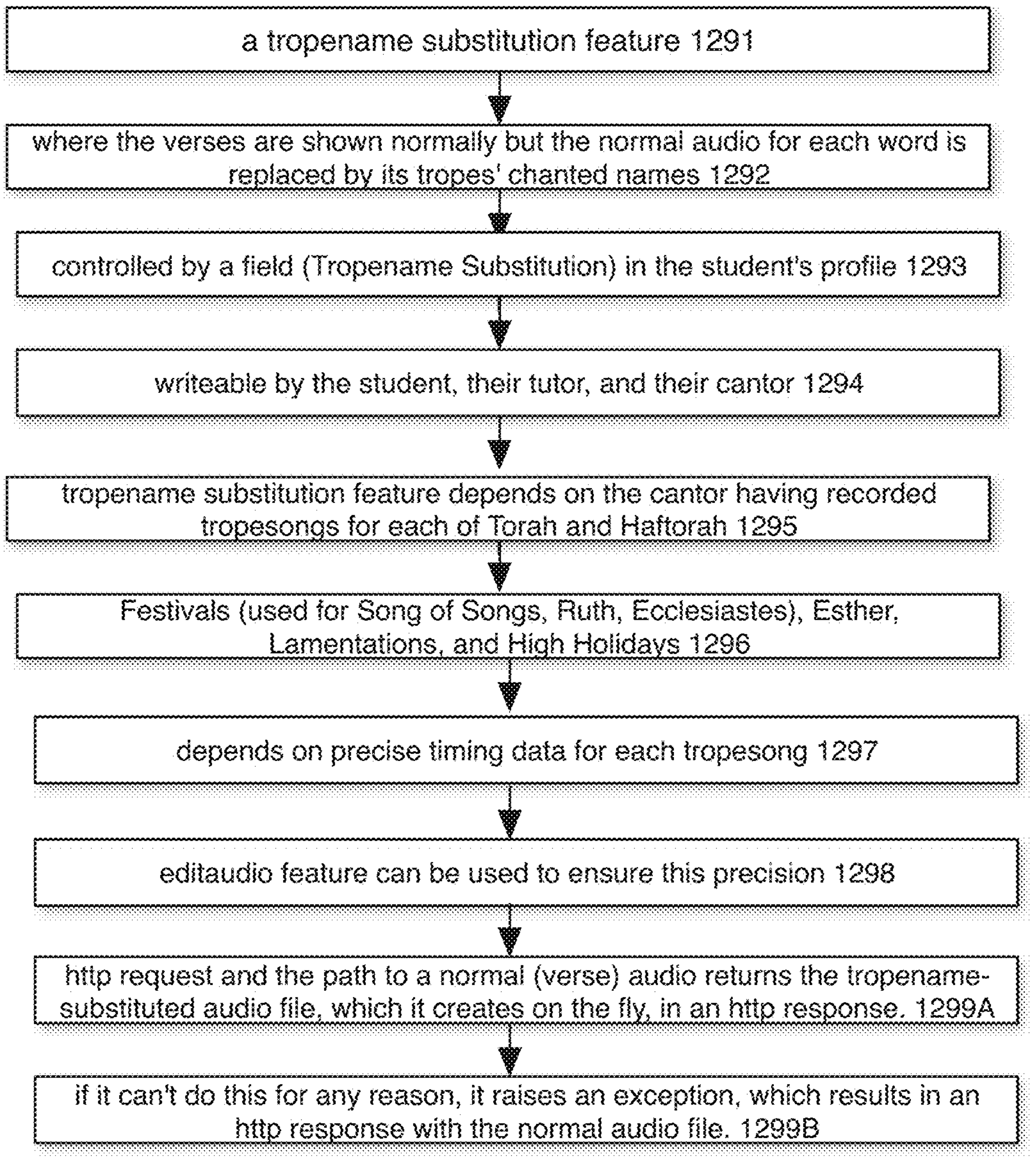
Figure 12F:
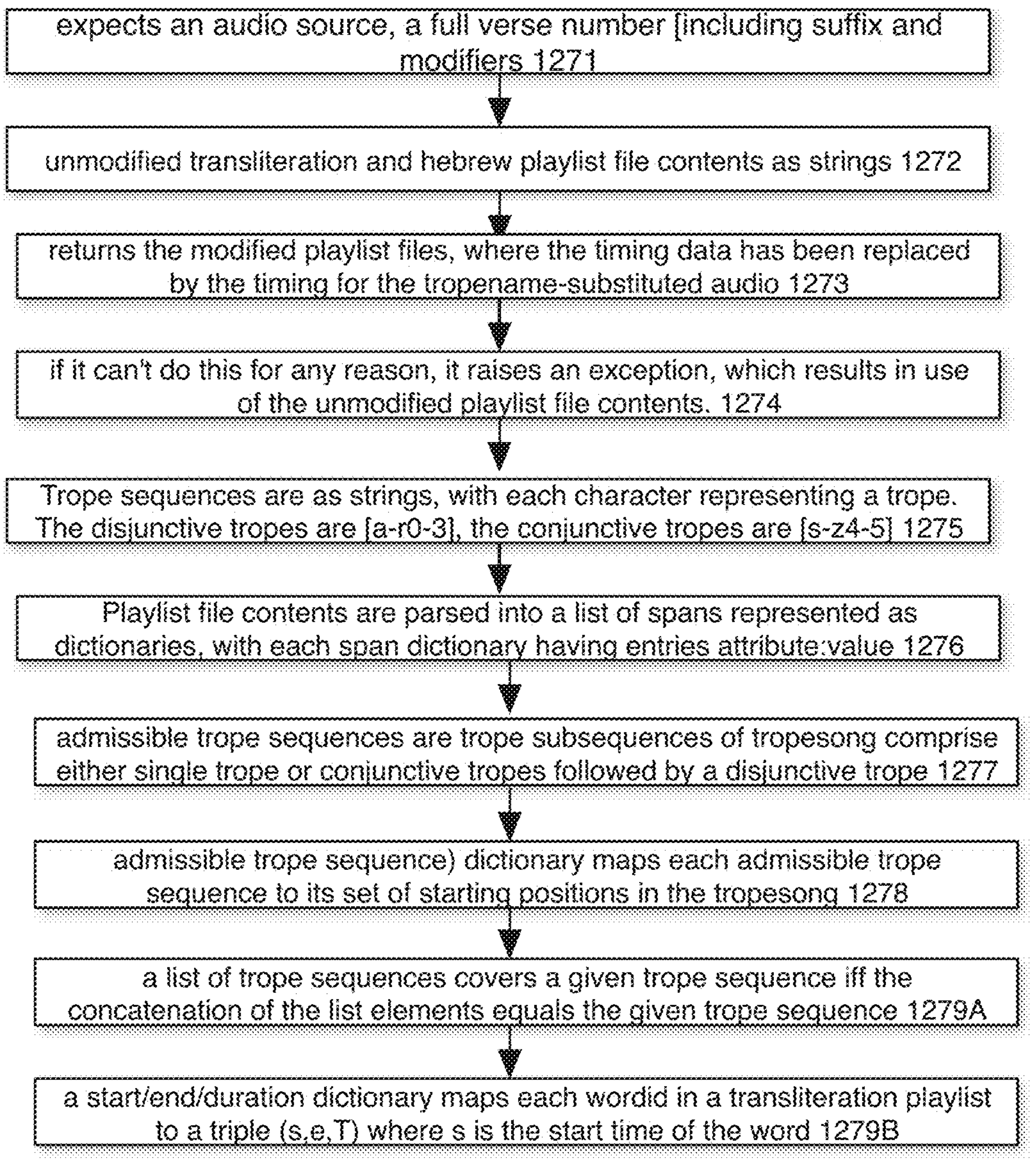
Figure 12G:
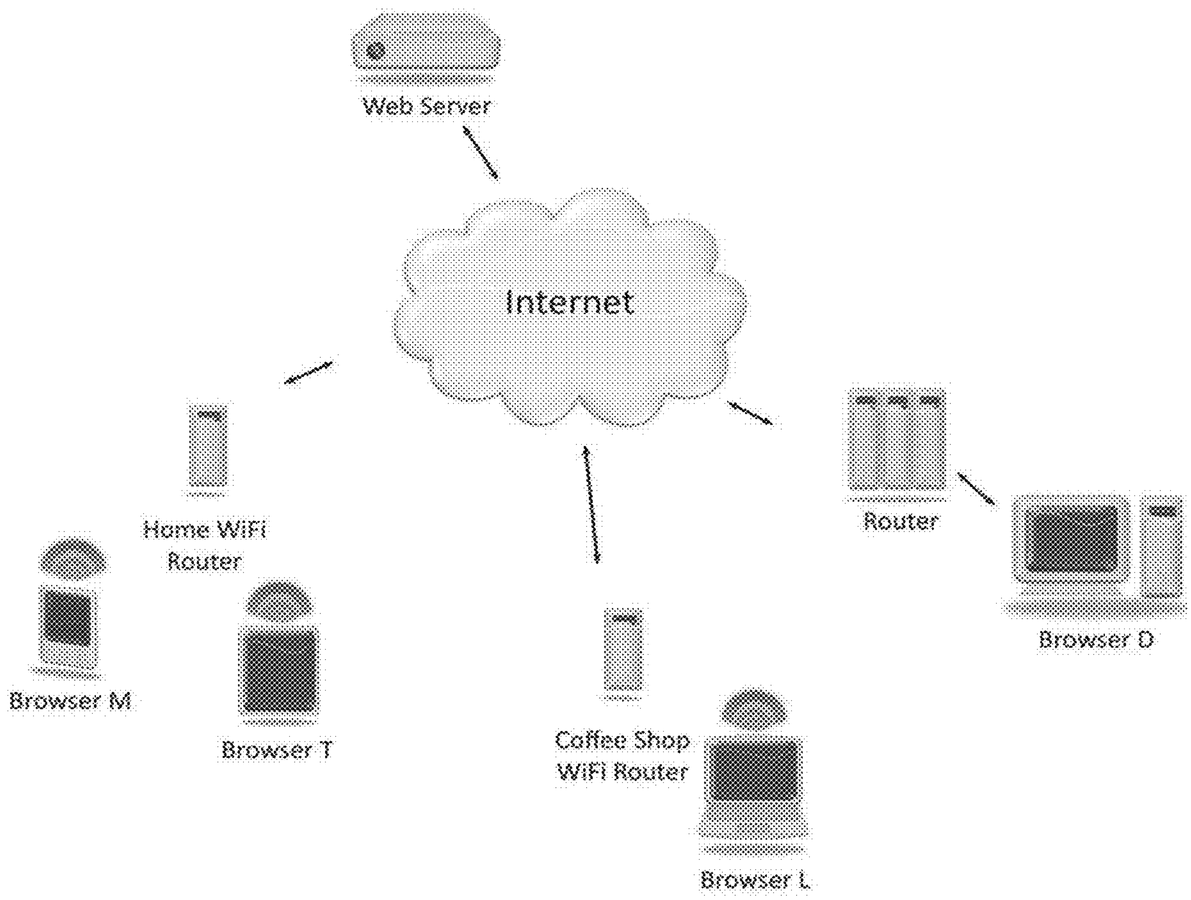
FIG. 12G shows a typical set of elements in an exemplary embodiment.

FIG. 12G shows a self-explanatory typical set of elements in an exemplary embodiment.

In exemplary embodiments, responses are typically monophonic musical forms involving different modes of antiphonal responses. For example, a Prayer Leader singing a half-verse at a time, with the response making a constant refrain; for example, the Prayer Leader singing a half-verse, with the response repeating exactly what Prayer Leader had sung; and, for example, the Prayer Leader and response singing alternate verses.

FIG. 12E depicts exemplary embodiments. In step 1291, a tropename substitution feature provides the capability to see a student's highlight page. In step 1292, where the verses are shown normally but the normal audio for each word is replaced by its tropes' chanted names. Optionally, in step 1293, the feature is controlled by a field (Tropename Substitution) in the student's profile, which can be either "On" or "Off", and in step 1294, is writeable by the student, their tutor, and their cantor.

In exemplary embodiments, in step 1295, the tropename substitution feature depends on the cantor having recorded tropesongs for each of Torah and Haftorah, and optionally for in step 1296, Festivals (used for Song of Songs, Ruth, Ecclesiastes), Esther, Lamentations, and High Holidays. Optionally, in step 1297, it also depends on precise timing data for each tropesong; optionally, in step 1298, the editaudio feature can be used to ensure this precision.

In exemplary embodiments, there may be two entry points to this feature: in step 1299A, servetropeaudio(request,path) expects an http request and the path to a normal (verse) audio file [cantors/<cantor>/verse_audio/<date-pitch>/

<versefile>.mp3 or .ogg], and returns the tropename-substituted audio file, which it creates on the fly, in an http response. Optionally, in step 1299B, if it can't do this for any reason, it raises an exception, which results in an http response with the normal audio file.

In exemplary embodiments, servetropeaudio is called from static(request,path) in the top level views module when it sees a path ending in /TS/*.mp3 or .ogg In exemplary embodiments, servetropeaudio manages timestamps so that when appropriate it can respond to HTTP_IF_MODIFIED_SINCE by returning HttpResponseNotModified( ) instead of doing its normal processing.

FIG. 12F depicts exemplary embodiments. In step 1271, tropehtm(audio,verse,vs,hs) expects an audio source, a full verse number [including suffix and modifiers], and in step 1272, the unmodified transliteration and hebrew playlist file contents as strings. Optionally, in step 1273, it returns the modified playlist files, where the timing data has been replaced by the timing for the tropename-substituted audio. Optionally, in step 1274, if it can't do this for any reason, it raises an exception, which results in use of the unmodified playlist file contents.

tropehtm is called from readhtm(audio,verse,tropesubst) in the highlight module when tropesubst is True.

In exemplary embodiments, in step 1275, Trope sequences are represented as strings, with each character representing a trope. The disjunctive tropes are [a-r0-3], the conjunctive tropes are [s-z4-5].

In exemplary embodiments, in step 1276, Playlist file contents are parsed into a list of spans represented as dictionaries, with each span dictionary having entries attribute:value for each attribute in the span plus the following two entries derived from the 'class' attribute: 'tropes': tropesequence, 'wid':list-of-wordids. Note that only h*.htm spans can have more than one wordid in a 'wid' entry.

In exemplary embodiments, in step 1277, the admissible trope sequences are the trope subsequences of a tropesong that comprise either a single trope or one or more conjunctive tropes followed by a disjunctive trope, i.e. those matching the regular expression [s-z4-5]*[a-r0-3]|[s-z4-5]. In step 1278, the ats (admissible trope sequence) dictionary maps each admissible trope sequence to its set of starting positions in the tropesong.

In exemplary embodiments, in step 1279A, a list of trope sequences covers a given trope sequence iff the concatenation of the list elements equals the given trope sequence. Optionally, a covering is represented as the cumulative sum of the lengths of the list elements, starting with 0 and ending with the length of the given trope sequence.

In exemplary embodiments, in step 1279B, a start/end/duration dictionary maps each wordid in a transliteration playlist to a triple (s,e,T) where s is the start time of the word, e is the end time of the word, and T is either None or, iff the last word, the duration of the audio. Times may be represented in ms.

In exemplary embodiments, spliter(p,s) takes p, a compiled regular expression, and s, a string, and returns a generator. Optionally, For each non-overlapping match m of p in s, the generator produces m.group(1).

In exemplary embodiments, span2dict(s) takes a string s which is a <span> element (but missing the "<span" and the "</span>"), and returns a dictionary comprising attribute: value, with an additional element 'word':innerhtml.

In exemplary embodiments, parsehtm(s) takes the playlist string s (the contents of a playlist file) and parses it into a list of spans. It first produces spans=map(span2dict,spliter (SPANRE,s)), then, for each span in spans, parses the 'class' value to add the 'wid' and 'tropes' entries.

In exemplary embodiments, tropestring(spans) returns the string representing the trope sequence of spans (a list of spans) by concatenating the spans[i]['tropes'].

FIG. 12D depicts exemplary embodiments. In step 1281, the admissible trope sequences of a trope song given its spans. gettropesequences(spans). In step 1282, optionally, it assumes that each span contains exactly one trope. In step 1283, optionally, it first sets t=tropestring(spans). In step 1284, optionally, then it creates a list, dj, of starting positions of maximal conj*disj sequences, initialized to [0]; and in step 1285, a defaultdict(set), d, of admissible trope sequences, initially empty. In step 1286, optionally, For each i,c in enumerate(t), if c is disjunctive, it appends i+1 to dj, else adds i to d[c]. In step 1287, optionally, then, it appends 0 to d[j] in case there are any trailing conjunctives, and in step 1288, for each j,i in enumerate(dj[:1],l) (so that s=t[i:dj[j]] is a maximal conj*disj sequence), in step 1289, adds k to d[t[k:dj[j]]] for i<=k<dj[j], i.e., it adds all the conj*disj subsequences. In step 1290, optionally, it returns d, the dictionary of admissible trope sequences that maps each ats (admissible trope sequence) to the list of starting positions of instances of the ats in the tropesong.

In exemplary embodiments, tropesong(audio,verse) returns the full verse number of the trope song for the specified verse from the specified audio source, based mostly on the book number of the verse. Optionally, Any verse that would need more than one trope song, or any verse whose corresponding trope song isn't available, causes tropesong to raise an exception.

In exemplary embodiments, goodness(tts,vts,ti,vi,l) returns a pair of nonnegative integers (x,y) representing (by lexicographical order) how good a particular admissible trope sequence instance [atsi] matches a matching verse trope subsequence. Optionally, tts is the trope song trope sequence, vts is the verse trope sequence, ti is the starting position of the atsi in the trope song sequence, vi is the starting position of the atsi in the verse, and 1 is the length of the atsi. We assume the atsi itself matches, i.e., tts[ti:ti+1] vts[vi:vi+1]. Optionally, x gives the number of following tropes that continue to match, i.e., x is the largest integer such that tts[ti+l:ti+l+x]==vts[vi+l:vi+l+x], but if ti+l+x==len(tts) and vi+l+x==len(vts), x is set to len(tts). Optionally, y gives the number of preceding tropes that continue to match, i.e., y is the largest integer such that tts[ti−y:ti]==vts[vi−y:vi], but if vi==ti==y, y is set to len(tts).

In exemplary embodiments, cover(S,s) returns a covering of the given trope sequence s using elements from the set S of trope sequences, but if no such covering exists it returns None. Optionally, the last element of the covering, which is the length of the given sequence, is omitted to make recursion more straightforward. cover first sees ifs is in S, and if so, returns [0]. Optionally, Otherwise it tries to find a covering with the fewest number of elements, as follows:

```
set b [best so far] to None
for len(s)>p>0 (from largest to smallest)
    if s[p:] is in S, i.e., we can cover s[p:] with a single ats,
        n=cover(S,s[:p]), i.e., attempt to cover the remainder
        if n and either not b or len(n)+1<len(b), i.e. the new
            covering is better,
            append p to n, creating the better covering of s
            b=n
return b
```

In exemplary embodiments, ttimes(tspans,i) returns timing data for a specified trope song span. tspans it the list of tropesong spans and tspans[i] is the specified span. ttimes returns a 4-tuple (s0,s,e,e0), where s is tspans[i]['start'], e is tspans[i]['end'], s0 is the average of s and tspans[i−1]['end'], or 0 if i is 0, e0 is the average of e and tspans[i+1]['start'], or tspans[i]['T'] if tspans[i] is the last span. Optionally, when the corresponding audio segment is used to replace a verse trope, s0 and e0 are the starting and ending point of the segment relative to the beginning of the trope song audio, s-s0 and e-s0 are the start and end times for highlighting, relative to the start of the segment.

In exemplary embodiments, tropetimes(tspans,c,tx) takes a list tspans of trope song spans, a covering c, and a list tx of indices into tx corresponding to the covering, and returns a generator producing timing data (from ttimes) for each trope song span (indicated by tx and c) in the covering.

In exemplary embodiments, tropeseqtimes(tspans,c,tx) takes a list tspans of trope song spans, a covering c, and a list tx of indices into tspans corresponding to the covering, and returns a generator producing segment start and end times for each trope song segment (indicated by tx and c) in the covering.

In exemplary embodiments, dict2span(sd) takes a span dictionary and returns the recreated string for that span.

In exemplary embodiments, retime(s,sedict, T=60*60*1000) takes a playlist string, a start/end/duration dictionary, and an optional "infinite" time, calls parsehtm and updates the resulting spans with timing data from the dictionary, and returns a new playlist string by mapping dict2span over the updated spans and joining the resulting strings with spaces. Optionally, note that hebrew playlist spans may have multiple wordids in which case the new start and end times are, respectively, the min of the start times and the max of the end times for those wordids. Optionally, if a span has a wordid with a duration in the sedict, that duration will become the value of the span's T attribute.

In exemplary embodiments, tropehtm(audio,verse,vs,hs) takes an audio source, a full verse number, and the corresponding playlist strings for p*.htm and h*.htm, and returns corresponding playlist strings with timing data updated to reflect tropename substitution. Optionally, it raises an exception if it can't perform its function for any reason, e.g. it can't find a tropesong for the verses or the verse has a trope not in the tropesong.

In exemplary embodiments, tropehtm first calls tropesong to find the tropesong for the verse, then reads the tropesong's transliteration playlist and calls parsehtm to get span lists for each of the verse and the tropesong. Optionally, it then calls gettropesequences to get the admissible trope sequences from the tropesong. It then calls cover to get a covering of the verse. Optionally, then it chooses the best instance for each ats in the cover, calling goodness to evaluate each instance. Optionally, next, it calls tropetimes to get a generator for producing the sequence of timing data for the covering. Optionally, It then goes through the verse spans accumulating timing data and replacing start, end, and T attributes with their new values, simultaneously creating a start/end/duration dictionary. Optionally, it creates a new (transliteration) playlist string from the verse spans by mapping dict2span over the spans and joining the resulting strings with spaces, and uses retime to create a new (hebrew) playlist string.

In exemplary embodiments, servetropeaudio(request, path) takes an http request and the path to the normal audio file [cantors/<cantor>/verse_audio/<date-pitch>/<versefile>.mp3 or .ogg], and returns the tropename-substituted audio file, which it creates on the fly, in an http response. Optionally, it may respond with HttpResponseNotModified( ) instead. It raises an exception if it can't perform its function for any reason.

In exemplary embodiments, servetropeaudio first checks that the path represents a real verse audio file [cantors/<cantor>/verse_audio/<versefile>.mp3 or .ogg], and uses the mtime of that file as the datetime for responding to HTTP_IF_MODIFIED_SINCE with HttpResponseNotModified( ) if appropriate. Optionally, next, as for tropehtm, it calls tropesong. It also parses <date-pitch> to get any pitch change requested. (In exemplary embodiments, a pitch change request results in additional parameters in the ffmpeg command.) Optionally, it reads the transliteration playlist files for the verse and the tropesong and parses them with parsehtm. Optionally, it then calls gettropesequences to get the admissible trope sequences from the tropesong. Optionally, it then calls cover to get a covering of the verse. Optionally, then it chooses the best instance for each ats in the cover, calling goodness to evaluate each instance. Optionally, it then merges contiguous instances (for efficiency), resulting in a sequence of non-contigous excerpts from the tropesong. Optionally, it builds and executes an ffmpeg command to concatenate the audio excerpts, returning the result in an HttpResponse also containing the above mtime as the Last-Modified date (to support browser caching).

In exemplary embodiments, the ffmpeg command, including pitch change, might look something like ffmpeg -loglevel fatal -y tropesong. mp3-filter complex aresample=44100,asetrate=49500,atempo=0.89090,asplit=3 [a0][a1][a2]; [a0]atrim=3:5,asetpts=PTS-STARTPTS[b0]; [a1]afifo,atrim=8:10,asetpts=PTS-STARTPTS[b1]; [a2]afifo,atrim=15:17,asetpts=PTS-STARTPTS[b2];[b0][b1][b2]concat=n=3:v=0:a=1 -fogg pipe:1

In some examples of the system, a user (e.g., a student, parent, teacher, synagogue administrator or host) must login (e.g., with a username and password) to access the system. A user may have limited access. For instance, a user may only be able to see materials associated with a specific teacher, student or synagogue, group, or institution. In some examples of the system, the user will be able to choose from a variety of sources. Thus, a user may be able to select from sources associated with a particular synagogue, teacher, student, tradition (e.g., Sephardic or Ashkenazi), movement (e.g., Orthodox, Conservative, Reform), a default audio source, among others, or some combination of them.

Using the embodiments described above, students (including those with learning disabilities) may more easily and more efficiently learn a language. The above-described embodiments may be particularly useful for students learning cantillated languages (e.g., for Jewish students learning to chant their Torah and/or Haftorah portion in preparation for the Bar or Bat Mitzvah), but the computerized language instruction system is not so limited. It is intended that the computerized language instruction system not be limited to the particular embodiments disclosed above, but that the computerized language instruction system will include any and all particular embodiments and equivalents falling within the scope of the following appended claims.

XV. Definitions

A Mainland Southeast Asia (MSEA) linguistic area stretches from Thailand to China and typically may be home to speakers of languages of a Sino-Tibetan, Hmong-Mien (or Miao-Yao), Tai-Kadai, Austronesian (typically represented by Chamic) and Austro-Asiatic families. Neighboring languages across these families often typically may have similar typological features.

Characteristic of many MSEA languages typically may be a particular syllable structure involving monosyllabic morphemes, lexical tone, a fairly large inventory of consonants, including phonemic aspiration, limited clusters at a beginning of a syllable, plentiful vowel contrasts and relatively few final consonants. Languages in a northern part of an area generally typically may have fewer vowel and final contrasts but more initial contrasts.

A feature typically may be tone systems in Chinese, Hmong-Mien, Tai languages and Vietnamese. Most of these languages passed through an earlier stage with three tones on most syllables (apart from checked syllables ending in a stop consonant), which was followed by a tone split where a distinction between voiced and voiceless consonants disappeared but in compensation a number of tones doubled.

MSEA languages tend to typically may have monosyllabic morphemes, though there typically may be exceptions. Most MSEA languages typically may be very analytic, with no inflection and little derivational morphology. Grammatical relations typically may be typically signalled by word order, particles and coverbs or adpositions. Modality typically may be expressed using sentence-final particles. A usual word order in MSEA languages typically may be subject-verb-object. Chinese and Karen typically may be thought to typically may have changed to this order from a subject-object-verb order retained by most other Sino-Tibetan languages. Order of constituents within a noun phrase varies: noun-modifier order typically may be usual in Tai languages, Vietnamese and Miao, while in Chinese varieties and Yao most modifiers typically may be placed before a noun. Bengali (especially an eastern variety) typically may be more phonologically similar to MSEA languages, with alveolar consonants replacing a retroflex consonants characteristic of other Indo-Aryan languages.

As used herein, the term "pitch-pattern" can refers to any written or spoken language, except for MSEA languages (such as Chinese) and excludes tonal languages (such as Chinese). For example, one difference between tonal languages and cantillated languages is that tonal languages lack inflection. Such tonal languages may include aspects not readily represented by a pronunciation- and/or cantillation-based dictionary. For example, one difference between tonal languages and cantillated languages is that tonal languages may include a limited number (e.g., four or five) of tones, whereas cantillated languages often rely on many more (e.g., twenty to thirty) distinct cantillations. Due to the increased number of cantillations in a cantillated language as compared to tones in a tonal language, and due to the fact that cantillations may be employed together in cantillation families, conclusions may be drawn from patterns of cantillations which cannot be drawn from patterns of tones.

As used herein, the term "pitch pattern" or "pitch contour" refers to a representation of pitches over time such that the pitch at a given time is relative to the pitch before and/or after the given time. Thus, a pitch pattern does not rely on a concept of fixed or absolute pitch, but rather a progression of pitches that are defined relative to each other. A pitch pattern may be either discrete or continuous. In the case of a continuous pitch pattern, a number of notes or the duration of the notes in the pitch pattern may be increased or decreased while broadly maintaining adherence to the continuous pitch pattern.

A pitch pattern does not rely on a fixed meter, and the pitches in the pitch pattern may progress from one to another. A pitch pattern is also distinguished from a tonal pattern, such as those exhibited in tonal languages (such as Chinese). In some cases, a pitch pattern cannot be determined simply by a pattern of primary stress, secondary stress, and unstressed syllables.

As used herein, a unit of expression is a portion of a language that represents an individual thought or expression. Units of expression may include, for example, words. Units of expression may have symbolic representations, such as strings of characters or symbols. Units of expression may also include oral representations, such as spoken or phonetic representations. Further, in some languages a unit of expression may include a pitch representation, such as a cantillation or pitch pattern.

As used herein the term "read" may encompass reading without chanting and/or reading with chanting. As used herein the term "reading-aloud" may encompass reading without chanting and/or reading with chanting. As used herein, the term "verse" may include an aliyah.

For example, some languages (such as Hebrew) may have a notational system related to chanting or singing of text, in which the word has a cantillated-symbolic representation which corresponds to an oral (pronounced) representation, and/or a cantillated aspect which involves singing or chanting the word according to a pattern of pitches. Some languages (such as Hebrew) have a written system or written notation rather than only an oral system; some languages (such as Hebrew) may have markings for how to sing ritual texts. The Haftorah Tropes and Torah Tropes are notational system(s) related to chanting or singing of text.

A symbolic representation may comprise an orthographic representation. It may include a symbolic representation of consonants and/or vowels. It may include a symbolic representation of cantillation. In the case of Hebrew Bible, a written symbolic representation can be selected from the following group, a cantillated Hebrew symbolic with vowels, Hebrew symbolic without cantillation, Hebrew symbolic without vowels, a cantillated reversible romanization of a Hebrew symbolic, a reversible romanization of a Hebrew symbolic without cantillation, a cantillated masoretic transliteration of a Hebrew symbolic, a mirror-cantillated masoretic transliteration of a Hebrew symbolic, a consonant-cantillated masoretic transliteration of a Hebrew symbolic, a vowel-cantillated masoretic transliteration of a Hebrew symbolic, a syllable-cantillated masoretic transliteration of a Hebrew symbolic, a masoretic transliteration of a Hebrew symbolic without cantillation. The masoretic transliteration may be transformed into a set of one or more phonemes. Alternatively, a written symbolic representation and a spoken symbolic representation may be used in place of a symbolic representation, and further a correspondence between the written and the spoken symbolic may rely upon a masoretic source external to the text. A pitch symbolic representation corresponds to a written symbolic representation if the pitch symbolic and written symbolic correspond to a same canonical word or verse. A pitch symbolic representation may be said to correspond to a written symbolic representation also if the written symbolic comprise canonical names of the pitch symbolic.

Ekphonetic notation is a pitch representation comprising one or more pitch patterns. Cantillation can be represented more accurately using Ekphonetic notation, in contrast to familiar western musical notation.

XVI. Computer Implementation

The foregoing description may provide illustration and description of various embodiments of the computerized language instruction system, but is not intended to be exhaustive or to limit the computerized language instruction system to the precise form disclosed. Modifications and variations may be possible in light of the above teachings or may be acquired from practice of the computerized language instruction system. For example, while a series of acts has been described above, the order of the acts may be modified in other implementations consistent with the principles of the computerized language instruction system. Further, non-dependent acts may be performed in parallel. Further, although features and accessing classes have been described above using particular syntaxes, features and accessing classes may equally be specified using in different ways and using different syntaxes.

In addition, one or more implementations consistent with principles of the computerized language instruction system may be implemented using one or more devices and/or configurations other than those illustrated in the Figures and described in the Specification without departing from the spirit of the computerized language instruction system. One or more devices and/or components may be added and/or removed from the implementations of the figures depending on specific deployments and/or applications. Also, one or more disclosed implementations may not be limited to a specific combination of hardware.

Furthermore, certain portions of the computerized language instruction system may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the computerized language instruction system should be construed critical or essential to the computerized language instruction system unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a personal computer) or a user of a electronic device, unless otherwise stated.

Various processes described herein may be implemented by appropriately programmed general purpose computers, special purpose computers, and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in one or more computer programs, one or more scripts, or in other forms. The processing may be performed on one or more microprocessors, central processing units (CPUs), computing devices, microcontrollers, digital signal processors, or like devices or any combination thereof. Programs that implement the processing, and the data operated on, may be stored and transmitted using a variety of media. In some cases, hard-wired circuitry or custom hardware may be used in place of, or in combination with, some or all of the software instructions that can implement the processes. Algorithms other than those described may be used.

Programs and data may be stored in various media appropriate to the purpose, or a combination of heterogenous media that may be read and/or written by a computer, a processor or a like device. The media may include non-volatile media, volatile media, optical or magnetic media, dynamic random access memory (DRAM), static ram, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge or other memory technologies. Transmission media include coaxial cables, copper wire and fiber optics, including the wires that comprise a system bus coupled to the processor.

Databases may be implemented using database management systems or ad hoc memory organization schemes. Alternative database structures to those described may be readily employed. Databases may be stored locally or remotely from a device which accesses data in such a database.

In some cases, the processing may be performed in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

A server computer or centralized authority may or may not be necessary or desirable. In various cases, the network may or may not include a central authority device. Various processing functions may be performed on a central authority server, one of several distributed servers, or other distributed devices.

For the convenience of the reader, the above description has focused on a representative sample of all possible embodiments, a sample that teaches the principles of the computerized language instruction system and conveys the best mode contemplated for carrying it out. Throughout this application and its associated file history, when the term "computerized language instruction system" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed variations, modifications and variations are within the literal scope of the following claims, and others are equivalent.

The invention claimed is:

1. A method for language teaching, the method comprising:

(a) accessing, using a computing device, a cantillation symbol in a transliteration symbolic representation of an at least one transliterated Hebrew Bible word from a source language of Biblical Hebrew to a target language, wherein the cantillation symbol does not correspond to a letter in the target language, and (b) displaying, using a computing device, said transliteration symbolic representation.

2. A method for Hebrew Bible language teaching, the method comprising:

(a) accessing, using a computing device, an at least one cantillation symbol in a transliteration symbolic representation of an at least one cantillated transliterated Hebrew Bible word, and (b) displaying, using a computing device, said at least one cantillation symbol as a cantillation symbol enlarged in at least one dimension, wherein said computing device is communicatively coupled to a visual display device, and wherein step (b) comprises:

(i) an at least one client-side display transformation whose cumulative effect is visually substantially equivalent to "transform:scaleX(#X)", "transform:scaleY(#Y)", (ii) wherein #Y is smaller in absolute value than #X, (iii) wherein #X is in a range between 1 and 3 inclusive, and (iv) wherein #Y is in a range between 1 and 1.5 inclusive, thus enlarging and scaling said at least one cantillation symbol.

3. A method for Hebrew Bible language teaching, the method comprising:

(a) accessing, using a computing device, an at least one cantillation symbol in a transliteration symbolic representation of an at least one cantillated transliterated Hebrew Bible word, and (b) displaying, using a computing device, said at least one cantillation symbol as a cantillation symbol enlarged in at least one dimension, wherein said computing device is communicatively coupled to a visual display device, and wherein step (b) comprises:

(i) an at least one client-side display transformation whose cumulative effect is visually substantially equivalent to "transform:scaleX(#X)", "transform: scaleY(#Y)", (ii) wherein #X is in a range between 1 and 3 inclusive, and (iii) wherein #Y is in a range between 1 and 1.5 inclusive, thus enlarging and scaling said at least one cantillation symbol.

4. A method for Hebrew Bible language teaching, the method comprising:

(a) accessing, using a computing device, an at least one cantillation symbol in a transliteration symbolic representation of an at least one cantillated transliterated Hebrew Bible word, and (b) displaying, using a computing device, said at least one cantillation symbol as a cantillation symbol enlarged in at least one dimension, wherein said computing device is communicatively coupled to a visual display device, and wherein step (b) comprises:

(i) an at least one client-side display transformation whose cumulative effect is visually substantially equivalent to "transform:scaleX(#X)", "transform: scaleY(#Y)", (ii) wherein #Y is smaller in absolute value than #X, and (iii) wherein #Y is in a range between 1 and 1.5 inclusive, thus enlarging and scaling said at least one cantillation symbol.

5. A method for Hebrew Bible language teaching, the method comprising:

(a) accessing, using a computing device, an at least one cantillation symbol in a transliteration symbolic representation of an at least one cantillated transliterated Hebrew Bible word, and (b) displaying, using a computing device, said at least one cantillation symbol as a cantillation symbol enlarged in at least one dimension, wherein said computing device is communicatively coupled to a visual display device, and wherein step (b) comprises:

(i) an at least one client-side display transformation whose cumulative effect is visually substantially equivalent to "transform:scaleX(#X)", "transform: scaleY(#Y)", (ii) wherein #Y is smaller in absolute value than #X, and (iii) wherein #X is in a range between 1 and 3 inclusive, thus enlarging and scaling said at least one cantillation symbol.

6. A method for language teaching, the method comprising:

(a) displaying, a transliteration to a target language of a Hebrew Bible word;

(b) wherein the Hebrew Bible word comprises a syllable;

(c) wherein the syllable comprises Hebrew orthography selected from the group of (i) a Hebrew consonant, (ii) a Hebrew vowel, and (iii) a Hebrew Bible cantillation;

(d) wherein the transliteration of the syllable comprises a first transliteration of the Hebrew consonant in the syllable to a first corresponding letter group in the target language;

(e) wherein the transliteration of the syllable comprises a second transliteration of the Hebrew vowel in the syllable to a second corresponding letter in the target language; and (f) wherein the transliteration of the syllable comprises the Hebrew Bible cantillation, the Hebrew Bible cantillation is orthographically positioned on the syllable.

7. The method according to claim 6, wherein the Hebrew Bible cantillation is orthographically positioned on the first corresponding letter group in the target language.

8. The method according to claim 6, wherein the Hebrew Bible cantillation is orthographically positioned on the second corresponding letter in the target language.

9. The method according to claim 6, wherein the Hebrew Bible word corresponds to a name of a Hebrew Bible Trope family.

10. A method for language teaching, the method comprising:

(a) visually presenting, a transliteration to a target language of a Hebrew Bible word;

(b) wherein the Hebrew Bible word comprises a syllable;

(c) wherein the syllable comprises Hebrew orthography selected from the group of (i) a Hebrew consonant, (ii) a Hebrew vowel, and (iii) a Hebrew Bible cantillation;

(d) wherein the transliteration of the syllable comprises a first transliteration of the Hebrew consonant in the syllable to a first corresponding letter group in the target language;

(e) wherein the transliteration of the syllable comprises a second transliteration of the Hebrew vowel in the syllable to a second corresponding letter in the target language;

(f) wherein the transliteration of the syllable comprises the Hebrew Bible cantillation, the Hebrew Bible cantillation is orthographically positioned on the syllable;

(g) wherein the first corresponding letter group in the target language comprises a first phonetic pronunciation equivalent of the Hebrew consonant; and (h) wherein the second corresponding letter in the target language comprises a second phonetic pronunciation equivalent of the Hebrew vowel.

11. The method according to claim 10, wherein the target language is English.

12. The method according to claim 11, wherein the first corresponding letter group in the target language comprises one or two letters selected from the group of [A-Z"].

13. The method according to claim 11, wherein the first corresponding letter group in the target language comprises one or two letters selected from the group of [A-Z" ], and wherein the second corresponding letter in the target language comprises a letter selected from the group of [A-Z].

14. The method according to claim 10, wherein the step of visually presenting comprises printing on paper.

15. The method according to claim 10, wherein the step of visually presenting comprises displaying on a screen.

16. The method according to claim 10, wherein the Hebrew Bible word is from a Hebrew Bible trope family.

17. A method for language teaching, the method comprising:

(a) visually presenting, a transliteration to a target language of a Hebrew Bible word, wherein the Hebrew Bible word comprises a Hebrew orthography selected from the group of (i) a Hebrew consonant, (ii) a Hebrew vowel, and (iii) a Hebrew Bible cantillation;

(b) wherein the transliteration comprises a transliteration of the Hebrew consonant to a first corresponding letter group in the target language;

(c) wherein the transliteration comprises a transliteration of the Hebrew vowel to a second corresponding letter in the target language; and (d) wherein the transliteration comprises a Hebrew Bible cantillation, orthographically positioned on the corresponding first corresponding letter group or orthographically positioned on the second corresponding letter.

* * * * *